US007790393B2

(12) United States Patent
Lyamichev et al.

(10) Patent No.: US 7,790,393 B2
(45) Date of Patent: Sep. 7, 2010

(54) AMPLIFICATION METHODS AND COMPOSITIONS

(75) Inventors: Victor I. Lyamichev, Madison, WI (US); Andrew A. Lukowiak, Stoughton, WI (US); Nancy Jarvis, Madison, WI (US); David Kurensky, Milwaukee, WI (US)

(73) Assignee: Third Wave Technologies, Inc., Madison, WI (US)

(*) Notice: Subject to any disclaimer, the term of this patent is extended or adjusted under 35 U.S.C. 154(b) by 0 days.

(21) Appl. No.: 12/174,277

(22) Filed: Jul. 16, 2008

(65) Prior Publication Data

US 2009/0068664 A1 Mar. 12, 2009

Related U.S. Application Data

(63) Continuation of application No. 10/321,039, filed on Dec. 17, 2002, now abandoned, which is a continuation-in-part of application No. 09/998,157, filed on Nov. 30, 2001, now abandoned.

(60) Provisional application No. 60/360,489, filed on Oct. 19, 2001, provisional application No. 60/329,113, filed on Oct. 12, 2001.

(51) Int. Cl.
*C12Q 1/68* (2006.01)
*C12P 19/34* (2006.01)

(52) U.S. Cl. ........................................ 435/6; 435/91.2

(58) Field of Classification Search ...................... None
See application file for complete search history.

(56) References Cited

U.S. PATENT DOCUMENTS

| | | | |
|---|---|---|---|
| 4,683,195 | A | 7/1987 | Mullis et al. |
| 4,683,202 | A | 7/1987 | Mullis et al. |
| 4,965,188 | A | 10/1990 | Mullis et al. |
| 5,538,848 | A | 7/1996 | Livak et al. |
| 5,719,028 | A | 2/1998 | Dahlberg et al. |
| 5,843,654 | A | 12/1998 | Heisler et al. |
| 5,843,669 | A | 12/1998 | Kaiser et al. |
| 5,846,717 | A | 12/1998 | Brow et al. |
| 5,888,780 | A | 3/1999 | Dahlberg et al. |
| 5,985,557 | A | 11/1999 | Prudent et al. |
| 5,994,069 | A | 11/1999 | Hall et al. |
| 6,001,567 | A | 12/1999 | Brow et al. |
| 6,090,543 | A | 7/2000 | Prudent et al. |
| 6,528,254 | B1 | 3/2003 | Sorge et al. |
| 6,548,250 | B1 | 4/2003 | Sorge et al. |

FOREIGN PATENT DOCUMENTS

| | | |
|---|---|---|
| WO | WO 97/27214 | 7/1997 |
| WO | WO 98/42873 | 10/1998 |

OTHER PUBLICATIONS

Butler et al. (Fresenius J Anal Chem, 2991, vol. 369 (3-4), 200-205, 102(a) date, Apr. 11, 2001).*
Ohnishi et al. (J. Hum Genet, 2001, vol. 46, p. 471-477).*
Wang et al. (Science, 1998, vol. 280, p. 1077-1082).*
Allawi, et al. "Thermodynamics and NMR of Internal GoT Mismatches in DNA" Biochemistry, 36:10581 (1997).
Bauer, et al., "Paternity testing after pregnancy termination using laser microdissection of chorionic villi" Int. J. Legal Med. 116: 39 (2002).
Cargill, et al. "Characterization of single-nucleotide polymorphisms in coding regions of human genes" Nature Genetics, 22: 231 (1999).
Chamberlain, et al. "Deletion screening of the Ducbenne muscular dystrophy locus via multiplex DNA amplification" Nucleic Acids Res., 16:11141 (1988).
Eis, et al, "An invasive cleavage assay for direct quantitation of specific RNAs" Nat Biotechnol; 19: 673-676 (2001).
Elnifro, et al. "Multiplex PCR: Optimization and Application in Diagnostic Virology" Microbiology Reviews, 13: 559 (2000).
Gibbs, et al, "The International HapMap Project" Nature; 426: 789-796 (2003).
Giordano, et al. "Polymerase chain reaction in polymeric microchips: DNA amplification in less than 240 seconds." Analytical Biochemistry, vol. 291, p. 124-132, 2001.
Hagmann, "A Good SNP May Be Hard to Find" Science, 285: 21 (1999).
Hall, et al, "Sensitive detection of DNA polymorphisms by the serial invasive signal amplification reaction" Proc Nati Acad Sci.; 97: 8272-8277 (2000).
Halushka, et al., "Patterns of single-nucleotide polymorphisms in candidate genes for blood-pressure homeostasis" Nature Genetics, 22: 239 (1999).
Hardenbol, et al, "Multiplexed genotyping with sequence-tagged molecular inversion probes" Nat Biotechnol; 21: 673-678 (2003).
Henegariu, et al. "Multiplex PCR: Critical Parameters and Step-by-Step Protocol" BioTechniques; 23:504-511 (1997).
Hidding, et al. "Haplotype frequencies and population data of nine V-chromosomal STR polymorphisms in a German and a Chinese population" Forensic Sci. Int., 113: 47 (2000).
Hirakawa, et al. "JSNP. a database of common gene variations in the Japanese population", Nucleic Acids Research, 2002, vol. 30, p. 158-162.
Hsu, et al. "Universal SNP Genotyping Assay with Fluorescence Polarization Detection" BioTechniques; 31:560-570 (2001).
Hudson TJ, et al. "An STS-based map of the human genome." Science, vol. 270, p. 1945-1954.
JSNP ID: IMS-JST000360 printout with detailed information about primer binding sites, 2005.

(Continued)

*Primary Examiner*—Gary Benzion
*Assistant Examiner*—Stephanie K Mummert
(74) *Attorney, Agent, or Firm*—Casimir Jones, S.C.

(57) ABSTRACT

The present invention provides methods and routines for developing and optimizing nucleic acid detection assays for use in basic research, clinical research, and for the development of clinical detection assays. In particular, the present invention provides methods for designing oligonucleotide primers to be used in multiplex amplification reactions. The present invention also provides methods to optimize multiplex amplification reactions.

10 Claims, 189 Drawing Sheets

OTHER PUBLICATIONS

JSNP ID: IMS-JST000398 printout with detailed information about primer binding sites, 2005.
Jurinke, C., "The Use of MassARRAY Technology for High Throughput Genotyping" Adv Bichem Eng Biotechnol; 77:57-74 (2002).
Kainz, P "The PCR plateau phase—towards an understanding of its limitations" Biochim Biophys Acta 1494:23-27 (2000).
Kaiser, MW et al, "A Comparison of Eubacterial and Archaeal Structure-specific 5'-Exonucleases" J. Biol Chem 274: 21387-21394 (1999).
Kwiatkowski, RW, "Clinical, Genetic, and Pharmacogenetic Applications of the Invader Assay" Mol. Diagn: 4:353-364 (1999).
Kwok, "Approaches to allele frequency Determination" Pharmacogenomics, 1: 231 (2000).
Kwok, "Single nucleotide polymorphism libraries: why and how are we building them?" Molecular Medicine Today, 5: 538-5435 (1999).
Lindblad-Toh, et al., "Large-scale discovery and genotyping of single-nucleotide polymorphisms in the mouse" Nature Genet. 24: 381 (2000).
Lyamichev, et al., "Polymorphism identification and quantitative detection of genomic DNA by invasive cleavage of oligonucleotide probes" Nature Biotechnology, 17: 292 (1999).
Lyamichev "Invader Assay for SNP Genotyping" Methods Mol Biol. vol. 212, pp. 229-240 (2003).
Lyamichev, et al, "Comparison of the 5' nuclease activities of Taq DNA polymerase and its isolated nuclease domain" Proc Natl Acad Sci.; 96: 6143-6148 (1999).
Mathews, et al., "Predicting oligonucleotide affinity to nucleic acid targets" RNA 5:1458 (1999).
Mein, et al, "Evaluation of Single Nucleotide Polymorphism Typing with Invader on PCR Amplicons and Its Automation" Genome Res; 10: 330-343 (2000).
Mullis, et al, "Specific Synthesis of DNA in Vitro via a Polymerase-Catalyzed Chain Reaction" Methods Enzymol; 155:335-350. (1987).
Ohnishi Y, "A high-throughput SNP typing system for genome-wide association studies" J Hum Genet: 46:470-477 (2001).
Oliphant A, "BeadArray Technology: Enabling an Accurate, Cost-Effective Approach to High-Throughput Genotyping" BioTechniques: Suppl: vol. 32, p. S56-S61 (2002).
Ozaki K et al, "Functional SNPs in the lymphotoxin-a gene that are associated with susceptibility to myocardial infarction" Nat Genet; 32: 650-654 (2002).
Polz, et al. "Bias in Template-to-Product Ratios in Multitemplate PCR" Applied and Environmental Microbiology, 64: 3724-30 (1998).
Primer 3.0 description, obtained from http://frodo.wi.mit.edu/cgi-bin/primer3/cautions, 2006.
Primer description, obtained from http://iubio.bio.indiana.edu/soft/molbio/primer/primer-wi.readme, 2006.
Reynaldo, et al, "The Kinetics of Oligonucleotide Replacements" J. Mol Biol; 297: 511-520 (2000).
Risch, et al. "The Future of Genetic Studies of Complex Human Diseases" Science, 273: 1516 (1996).
Rudi, et al., "Development and application of new nucleic acid-based technologies for microbial community analyses in foods" Int J Food Microbiology, 78: 171-180 (2002).
Rychlik, et al. "A computer program for choosing optimal oligonucleotides for filter hybridization, sequencing and in vitro amplification of DNA" Nucleic Acids Res, 17: 8543 (1989).
Santalucia, et al, "A unified view of polymer, dumbbell, and oligonucleotide DNA nearest-neighbor thermodynamics" Proc Natl Acad Sci; vol. 95:1460-1465. (1998).
Walsh, et al., "Preferential PCR Amplification of Alleles: Mechanisms and Solutions" PCR Methods and Applications, 1: 241 (1992).
Wang, et al. "Large scale identification, mapping and genotyping of single nucleotide polymorphisms in the human genome." Science, 1998, vol. 280, p. 1077-1082.
Williams, et al, "Laser Temperature-Jump, Spectroscopic, and Thermodynamic Study of Salt Effects on Duplex Formation by dGCATGC" Biochemist; 28:4283-429 (1989).
Zarlenga, et al. "PCR as a diagnostic and quantitative technique in veterinary parasitology" Vet Parasitol. 101: 215 (2001).
Zuker, "On Finding All Suboptimal Foldings of an RNA Molecule" Science, 244:48 (1989).
Ouhibi, et al. "Preimplantation Genetic Diagnosis" Curr Womens Health Rep. 1: 138-42 (2001).

* cited by examiner

SNP detection using the Invader™ assay in a biplex format

FIGURE 2

Automated primer selection for multiplex PCR using *Invader™ Creator Primer Designer v 1.3.3*

2A. (SEQ ID NO:700)

29043,FMO1,aagttagaagaaccaagactatcttgtcaggggtgtattttgagagtggcagacttttcagtgcct
ttccattcatgacacttcttgaatctctggcagaaccagccagccgtgttcacagtgtcaaatgaagggatgtcttt
gattgcttccaggtgttcctcagcaccaccggaggggggatgggtgatcagccgaatctttgactcgggctacccatg
ggacatggtgttcatgacacgctttcagaacatgttgagaaattccctcccaac[ct]ccaattgtgacttggttga
tggagcgaaagataaacaactggctcaatcatgcaaattacggcttaataccagaagacaggtaaatataatgtgac
tgccaagggctttaggaagaaggagcctctgcctgtccagcagcctatacaagccaggcagtaccacagcaacatg
gctgaatgtgtgggaacacttgatacaaatttgcttgataataacagctaactgttcttaagtactcagaaagtgaa
attatgtatttc

2B. (SEQ ID NO:700)

29043,FMO1,aagttagaagaaccaagactatcttgtcaggggtgtattttgagagtggcagacttttcagtgcct
ttccattcatgacacttcttgaatctctggcagaaccagccagccgtgttcacagtgtcaaatgaagggatgtcttt
gattgcttccaggtgttcctcagcaccaccggaggggggatgggtgatcagccgaatctttgactcgggctacccatg
ggacatggtgttCATGACACGCTTTCAGAACATGTTGAGAAATTCCCTCCCAAC[ct]CCAATTGTGACTTGGTTGA
TGGAGCGAAAGATAAACAACTGGctcaatcatgcaaattacggcttaataccagaagacaggtaaatataatgtgac
tgccaagggctttaggaagaaggagcctctgcctgtccagcagcctatacaagccaggcagtaccacagcaacatg
gctgaatgtgtgggaacacttgatacaaatttgcttgataataacagctaactgttcttaagtactcagaaagtgaa
attatgtatttc f,cgggctacccatgggaca,59.38 (SEQ ID NO:701)
r,tctggtattaagccgtaatttgcatgattga,60 (SEQ ID NO:702)

FIGURE 3

Basic workflow for highly multiplexed PCR using the Invader™ *Medically Associated Panel* (MAP)

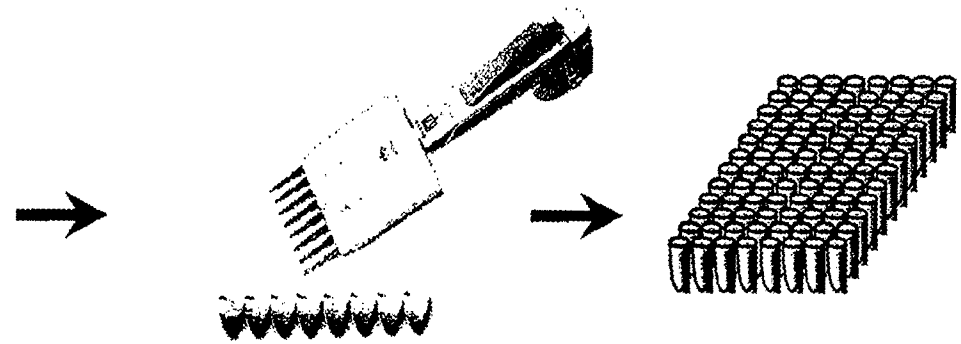

Multiplex PCR (10 ng / template) → **Dilute and add directly to Invader™ *Medically Associated Panel* → Incubate at 63°C and read**

Analysis of 101-plex PCR using the Invader™ *Medically Associated Panel*

Using primers designed by the *Invader™ Creator Primer Designer v_1.3.3* software, highly multiplexed PCR was carried out *without* prior testing of individual "primer sets" in uniplex PCR. Of the 101 possible amplicons, 94 (~93%) were detected by the Invader™ assay and made the correct call corresponding to genomic typing of the same sample.

FIGURE 5

| Primer Sequence (5' > 3') | Oligo | [Na+] (mM) | ΔΓo37 | ΔH | ΔΣ | CT (M) | Tm | [Probe] (M) | [Target] (M) | Tm |
|---|---|---|---|---|---|---|---|---|---|---|
| ctgttcttcctgaagcctc | 1117-75-1 | 75 | -17.58 | -146.35 | -415.2 | 4.0E-04 | 64.48 | 1.00E-06 | 4.00E-14 | 56.5 |
| ttgaggttggtgccttc | 1117-70-2 | 75 | -16.42 | -129.29 | -364.0 | 4.0E-04 | 65.10 | 1.00E-06 | 4.00E-14 | 56.0 |
| aagagtgtattgagagcct | 1117-75-3 | 75 | -16.24 | -140.66 | -401.2 | 4.0E-04 | 62.20 | 1.00E-06 | 4.00E-14 | 54.0 |
| tcagccttaaaaagacctcc | 1117-75-4 | 75 | -17.63 | -150.66 | -428.9 | 4.0E-04 | 63.74 | 1.00E-06 | 4.00E-14 | 56.0 |
| ctcgtcacttcctctgtcc | 1117-75-5 | 75 | -18.41 | -148.54 | -419.6 | 4.0E-04 | 66.10 | 1.00E-06 | 4.00E-14 | 58.1 |
| gggagaagtgcggcac | 1117-70-6 | 75 | -17.72 | -127.64 | -354.4 | 4.0E-04 | 69.33 | 1.00E-06 | 4.00E-14 | 59.9 |
| gaccttatgtgtttttcc | 1117-70-7 | 75 | -14.26 | -135.93 | -392.3 | 4.0E-04 | 57.91 | 1.00E-06 | 4.00E-14 | 49.6 |
| caatttcctcaaaagactttcc | 1117-70-8 | 75 | -17.78 | -167.59 | -483.0 | 4.0E-04 | 61.15 | 1.00E-06 | 4.00E-14 | 54.3 |
| aaggacttaagaattgtcac | 1117-70-9 | 75 | -15.64 | -149.50 | -431.6 | 4.0E-04 | 59.15 | 1.00E-06 | 4.00E-14 | 51.6 |
| cctcaatccttcaccgc | 1117-70-10 | 75 | -16.93 | -132.72 | -373.4 | 4.0E-04 | 65.73 | 1.00E-06 | 4.00E-14 | 56.9 |
| gaggtagtgtttacagccc | 1117-70-11 | 75 | -17.44 | -145.86 | -414.1 | 4.0E-04 | 64.23 | 1.00E-06 | 4.00E-14 | 56.2 |
| tcacatctcgagtgataatctc | 1117-75-12 | 75 | -18.35 | -167.82 | -481.9 | 4.0E-04 | 62.34 | 1.00E-06 | 4.00E-14 | 55.4 |
| tgatgggagacgagttc | 1117-70-13 | 75 | -15.84 | -129.58 | -366.8 | 4.0E-04 | 63.39 | 1.00E-06 | 4.00E-14 | 54.4 |
| tgcacacacacacatacc | 1117-75-14 | 75 | -17.30 | -139.56 | -394.2 | 4.0E-04 | 65.19 | 1.00E-06 | 4.00E-14 | 56.8 |
| aggtcccctccgctc | 1117-70-15 | 75 | -16.65 | -114.39 | -315.1 | 4.0E-04 | 69.91 | 1.00E-06 | 4.00E-14 | 59.4 |
| cacagtggtgttggac | 1117-70-16 | 75 | -15.32 | -124.06 | -350.6 | 4.0E-04 | 63.15 | 1.00E-06 | 4.00E-14 | 53.8 |
| atcctgaagagcaagtcc | 1117-70-17 | 75 | -16.43 | -135.68 | -384.5 | 4.0E-04 | 63.71 | 1.00E-06 | 4.00E-14 | 55.1 |
| attccggtttggttctcc | 1117-70-18 | 75 | -16.89 | -136.61 | -386.0 | 4.0E-04 | 64.74 | 1.00E-06 | 4.00E-14 | 56.2 |
| ctgaaacccaggactcc | 1117-70-19 | 75 | -16.20 | -129.29 | -364.7 | 4.0E-04 | 64.48 | 1.00E-06 | 4.00E-14 | 55.4 |
| ggaacaatcaccttttctc | 1117-75-20 | 75 | -15.82 | -144.52 | -415.0 | 4.0E-04 | 60.43 | 1.00E-06 | 4.00E-14 | 52.5 |

FIGURE 5 (cont'd)

SNP53530,
AGGCTCCCTTAGATGCCTGACATTCTGTTCTTCCTGAAGCCTCACTCCCTTCTCTCCTGGctGCAGACACGTCCCCATCAGAAGGCACCAACCTCAACGCGCCCAACAGCCTGGGTGTCAGC (SEQ ID NO:723)
Primers 01/02

SNP54874
TAAAATCATTTATTTATTTATCCATCCATCAAGAGTGTATTGAGAGCCTGACAACATACCagGCATCAAGCCCTGGAGGTCTTTTTAAGGCTGAGCCAATATAGCTATGGATAACATTCTAA (SEQ ID NO:724)
Primers 03/4

SNP67356
CCCTCGTCACTTCCTCTGTCCTGTGGGGTGGGGGTGCAGGCGCTctCTCCTTTAGCTGTGCCGCACTTCTCCCTACAGGCCAGGAGAAACA (SEQ ID NO:725)
Primers 05/6

SNP47950
CTTCTGTGGACCTTATGTGTTTTTCCTCTTTGCTGGAGTGCTCCTGGCCTTTACCCTGTTctACATTTTTTAAAGTTCCAGAAACCAAAGGAAAGTCTTTTGAGGAAATTGCTGCAGAATTC (SEQ ID NO:726)
Primers 07/8

SNP41846
TGGTTAAGGACTTAAGAATTGTCACTTGTGTGTGTATATTGTTGTTGTTGTTGCAACGGTgtCTGTGTACGCACGGTTACAGTGGATCAAATTTGGGGAGTTAGGAAGTGGCGTTGGTTTGT (SEQ ID NO:727)
Primers 09/10

SNP67320
CGAGGTAGTGTTTACAGCCCTCATGAACAGCAAAGGCGTGAGCCTCTTCGagCATCATCAACCCTGAGATTATCACTCGAGATGTGAGTAC (SEQ ID NO:728)
Primers 11/12

SNP67325
GGAGACGAGTTCAAGGTGAGTGGGTGGGGCTGGGCTGCTAGGGgaATCCAGATGGCATGTGGTATGTGTGTGTGTGCACACGCATGGGGAG (SEQ ID NO:729)
Primers 13/14

SNP47901
CAGCCACAGGTCCCCTCCGCTCAGGTGATGGACTTCCTGTTTGAGAAGTGGAAGCTCTACagGTGACCAGTGTCACCACAACCTGAGCCTGCTGCCCCCTCCCACGGGTGAGCCCCCCACCC (SEQ ID NO:730)
1117-70-15/16

SNP47932
AGAGCAAGTCCCCCAAGGAGGAGCTGCTGAAGATGTGGGGGGAGGAGCTGACCAGTGAAGacAAGTGTCTTTGAAGTCTTTGTTCTTTACCTCTCGGGAGAACCAAACCGGAATGGTCACAA (SEQ ID NO:731)
Primers 17/18

SNP47892
GGAACTGAAACCCAGGACTCCGTCTCTTGCCAGTGAAAGTTATGTTAGGAAGCAGTGAGGtgGTCTAAAGCAGTATGAAAGGCAAAGAGAAAAGGTGATTGTTCCCTCTTGAATGGCCCTTG (SEQ ID NO:732)
Primers 19/20

| 10 min. | 53530 | 54874 | 67356 | 47950 | 41646 | 67320 | 67325 | 47901 | 47932 | 47892 |
|---|---|---|---|---|---|---|---|---|---|---|
| FAM | 1.1 | 1.2 | 1.0 | 1.0 | 6.4 | 1.0 | 1.0 | 0.9 | 1.0 | 1.0 |
| RED | 1.0 | 1.2 | 1.0 | 1.0 | 5.1 | 2.2 | 1.3 | 0.9 | 1.1 | 1.0 |
| FOZm (m=10) | 2.0 | 2.4 | 2.0 | 2.1 | 11.5 | 3.2 | 2.3 | 1.9 | 2.1 | 2.0 |
| RED+FAM-2 | 0.0 | 0.4 | 0.0 | 0.1 | 9.5 | 1.2 | 0.3 | -0.1 | 0.1 | 0.0 |
| Genomic Calls | | | | | HET | | | | | |

| 30min. | 53530 | 54874 | 67356 | 47950 | 41646 | 67320 | 67325 | 47901 | 47932 | 47892 |
|---|---|---|---|---|---|---|---|---|---|---|
| FAM | 1.9 | 2.8 | 1.0 | 1.0 | 20.5 | 1.1 | 1.0 | 1.0 | 1.0 | 1.0 |
| RED | 0.9 | 4.2 | 1.0 | 1.1 | 26.3 | 11.4 | 3.0 | 1.0 | 1.4 | 0.9 |
| FOZm (M=30) | 2.8 | 7.0 | 2.0 | 2.1 | 46.7 | 12.5 | 4.0 | 1.9 | 2.4 | 2.0 |
| RED+FAM-2 | 0.8 | 5.0 | 0.0 | 0.1 | 44.7 | 10.5 | 2.0 | -0.1 | 0.4 | 0.0 |
| Genomic Calls | Homo F | HET | | | HET | HomoR | HomoR | | | |

| 60min. | 53530 | 54874 | 67356 | 47950 | 41646 | 67320 | 67325 | 47901 | 47932 | 47892 |
|---|---|---|---|---|---|---|---|---|---|---|
| FAM | 4.6 | 7.3 | 1.1 | 1.2 | 21.8 | 1.2 | 1.0 | 1.0 | 1.0 | 1.2 |
| RED | 1.0 | 11.4 | 1.1 | 1.2 | 34.5 | 25.6 | 8.3 | 0.9 | 2.6 | 0.9 |
| FOZm (m=60) | 5.6 | 18.7 | 2.2 | 2.5 | 56.2 | 26.8 | 9.4 | 2.0 | 3.6 | 2.2 |
| RED+FAM-2 | 3.6 | 16.7 | 0.2 | 0.5 | 54.2 | 24.8 | 7.4 | 0.0 | 1.6 | 0.2 |
| Genomic Calls | Homo F | HET | | | HET | HomoR | HomoR | | HomoR | |

1B.

| 240 min. | 53530 | 54874 | 67356 | 47950 | 41646 | 67320 | 67325 | 47901 | 47932 | 47892 |
|---|---|---|---|---|---|---|---|---|---|---|
| Genomic (RED+FAM-2) | 3.10 | 1.76 | 0.68 | 0.43 | 1.60 | 2.07 | 0.80 | 0.89 | 0.85 | 0.85 |

Linear Relationship between Primer Concentration and Amplification Factor

FIGURE 8

Amplification Factor Calculations and Apparent Primer Concentrations of Equimolar 10-plex PCR
using equation 1a'

| SNP No. | m | FOZm | FOZm-2 | 240/m | F | Log(F) | X[n] | R[n] | Concentrations (uM) based on R[n] |
|---|---|---|---|---|---|---|---|---|---|
| 53530 | 60 | 5.6 | 3.6 | 16 | 123552 | 5.09 | 1.4 | 1.8 | 0.018 |
| 54874 | 30 | 7 | 5 | 64 | 686400 | 5.84 | 1.9 | 1.4 | 0.014 |
| 67356 | 60 | 2.2 | 0.2 | 16 | 6864 | 3.84 | 0.7 | 3.8 | 0.038 |
| 47950 | 60 | 2.5 | 0.5 | 16 | 17160 | 4.23 | 0.9 | 2.8 | 0.028 |
| 41646 | 10 | 11.5 | 9.5 | 576 | 11737440 | 7.07 | 2.6 | 1.0 | 0.010 |
| 67320 | 30 | 12.5 | 10.5 | 64 | 1441440 | 6.16 | 2.1 | 1.3 | 0.013 |
| 67325 | 30 | 4 | 2 | 64 | 274560 | 5.44 | 1.6 | 1.6 | 0.016 |
| 47901 | 60 | 2 | 0 | 16 | 0 | #NUM! | N/A | 4.0 | 0.040 |
| 47932 | 60 | 3.6 | 1.6 | 16 | 54912 | 4.74 | 1.2 | 2.1 | 0.021 |
| 47892 | 60 | 2.2 | 0.2 | 16 | 6864 | 3.84 | N/A | 4.0 | 0.040 |

FOZm was chosen based on being within the dynamic range of the Instrument: 0.5-12.5 for this experiment.
FOZ240 = 1.7
D=.333
given that the values of FOZ for sample 47901 and 47892 were low, an estimate of R[n] of 4 was made.
This is a good estimate, since sample 67346 is also low and the calculated R[n] value is near 4.

FIGURE 9

Invader FOZ values for Optimized Primer Concentration of 10-plex PCR

| 10 min. | 53530 | 54874 | 67356 | 47950 | 41646 | 67320 | 67325 | 47901 | 47932 | 47892 |
|---|---|---|---|---|---|---|---|---|---|---|
| RED | 1.1 | 2.3 | 2.4 | 2.5 | 2.9 | 3.3 | 1.8 | 1.0 | 2.6 | 1.0 |
| FAM | 2.2 | 1.6 | 3.4 | 2.1 | 3.2 | 1.0 | 1.0 | 3.4 | 1.0 | 5.3 |
| RED+FAM-2 | 1.3 | 2.0 | 3.8 | 2.6 | 4.1 | 2.3 | 0.7 | 2.4 | 1.6 | 4.3 |
| Genomic Calls | Homo F | HET | HET | HET | HET | HomoR | HomoR | HomoF | HomoR | HomoF |

Primer Concentration of 9/10 (SNP41646) at 0.01uM in Multiplex PCR

FIGURE 10a

29017 (SEQ ID NO:1)
CACTAGACCGCCTGTCCCCAAGGGAGCCTCAGTGGGGCGACAGGGTGCTCGGCGGACTC
CACCTCAGGCCCTCCCCACTGTTGCTGTGCATTCCTGTGCAGGTGCATCTCTTTCTTAC
TAACTGGTATTTATTAAGGGAGGTGCTCTGTAGGTCTGGAGCCTTTCCCTCATCCTTTT
TGCGAGTCCCCACCTTTTTGTTTTTTTTTTTTTCTTTGAGGCTCACTAGAGGACGCAGA
ACCTTGGGAGATTGATTTGCACAGAACTCCCCACCTCCCACTTTTACAATTTCCAGTTT
CTGATTGAAAATTTTAGGGTTTCTCCCCACTGCCCTTCCCTATCTTTCCTTCCCCTCAA
CACCATGAAGGAAAAACACACACGGCAGGGCTTTTTGTAGCCCTGAAGGCAACTTTAGA
CATTTAAAATCCAGCACTTTAATCTCTTGTTCTCTGTGAATCACTATGAGAAGTGAATG
GTTTTAAAGGCTGTAATGCTATGTTGGAAATTGGTTTGTTTTGCCTTTTATTGAAAAGG
TAAGATCATGTGATTGGAAGAACACAACT[gt]TTGGCTTGGGAAGAGGACTTTGCTGC
TGAAGTGTTTTCTACCTTCTGAGTGTGTTTAAGGCAGGATTTGGAGGGAAGGACCAGCT
TAGGGAGAGTGTCTGAGCCACAGCGTCAGGATGGGGGAAACCACATGGGATCCATCAAG
TTCCAGTTGAACAGGAGCAAGATCAGAACTTAGGAGGGCAGTGTCAGCTCCCTTGTTGG
CTGTCAAGGAACACCGATCTAGTAGAAACCCACTTGGTTGTGACCCAGGTAGAGGTAGA
TGCCATACATTTGAGATATGCGTCCTTAAGGAACCTGACAAGCAGACTGAAGGGATGGT
AAGTGTGACAGCCTGATAAGTTTTCTCAAAGCCCAGGATACAGAGCCAGTGTTTTCTGT
AACTGGAGACCTCAGTTAGGCCAACTTCGAATTCCAGAGCAACGTAGGAAGTCTATTCA
GCAGAAACTCGACATTGTTCA cactagaccgcctgtccccaagggagcctcagtggggcgacagggtgctcggcggactc
cacctcaggccctccccactgttgctgtgcattcctgtgcaggtgcatctctttcttac
taactggtatttattaagggaggtgctctgtaggtctggagcctttccctcatcctttt
tgcgagtccccacctttttgtttttttttttttctttgaggctcactagaggacgcaga
accttgggagattgatttgcacagaactccccacctcccacttttacaatttccagttt
ctgattgaaaattttagggtttctccccactgcccttccctatctttccttcccctcaa
caccatgaaggaaaaacacacacggcagggctttttgtagccctgaaggcaactttaga
catttaaaatccagcactttaatctcttgttctctgtgaatcactatgagaagtgaatg
gttttaaaggctgtaatgctatgttggaaattggtttgttttgccttttattgaaaAGG
TAAGATCATGTGATTGGAAGAACACAACT[gt]TTGGCTTGGGAAGAGGACTTTGCTGC
TGAAGTgttttctaccttctgagtgtgtttaaggcaggatttggagggaaggaccagct
tagggagagtgtctgagccacagcgtcaggatgggggaaaccacatgggatccatcaag
ttccagttgaacaggagcaagatcagaacttaggagggcagtgtcagctcccttgttgg
ctgtcaaggaacaccgatctagtagaaacccacttggttgtgacccaggtagaggtaga
tgccatacatttgagatatgcgtccttaaggaacctgacaagcagactgaagggatggt
aagtgtgacagcctgataagttttctcaaagcccaggatacagagccagtgttttctgt
aactggagacctcagttaggccaacttcgaattccagagcaacgtaggaagtctattca
gcagaaactcgacattgttca

FIGURE 10b

29043 (SEQ ID NO:2)
ATACCAAAAGTAATTGTAGTACTGAATTTTGCTGTCATTTAAGCCAATGGTTTGCACTG
AAACTCTGTAGACAACTCTGATACTGCCATTCCCTGTTCTTACTGCCTACAATGATAGT
GAGCACACCAAGTAGCAATCACCTGTTCATTGTTTTCTTACATAGACTTTAGGTCCCTA
TGGTTTACTAAAGGCTGGCAGATAATAAGTATTCAATAATATGTCTTAAGGCATTTTAA
TACTCTAGATGCTCTGAATCCTAATCTCAAAAGGATTAACTTTAAAATAGAAGTTAGAA
GAACCAAGACTATCTTGTCAGGGGTGTATTTTGAGAGTGGCAGACTTTTCAGTGCCTTT
CCATTCATGACACTTCTTGAATCTCTGGCAGAACCAGCCAGCCGTGTTCACAGTGTCAA
ATGAAGGGATGTCTTTGATTGCTTCCAGGTGTTCCTCAGCACCACCGGAGGGGGATGGG
TGATCAGCCGAATCTTTGACTCGGGCTACCCATGGGACATGGTGTTCATGACACGCTTT
CAGAACATGTTGAGAAATTCCCTCCCAAC[ct]CCAATTGTGACTTGGTTGATGGAGCG
AAAGATAAACAACTGGCTCAATCATGCAAATTACGGCTTAATACCAGAAGACAGGTAAA
TATAATGTGACTGCCAAGGGCTTTTAGGAAGAAGGAGCCTCTGCCTGTCCAGCAGCCTA
TACAAGCCAGGCAGTACCACAGCAACATGGCTGAATGTGTGGGAACACTTGATACAAAT
TTGCTTGATAATAACAGCTAACTGTTCTTAAGTACTCAGAAAGTGAAATTATGTATTTC
ACCTTGTCAGCAACACTTTACGTATTATTATAATAATCCTTTTATTATGGAGAAACTGA
AACAGCAAAATTCAGCCATTTACCCAAGCTCACTGAGTAGTAAGTGAACTCTGTGACCT
TGGCAAGTTACTTGATCCTCAGCTGTAGCAACCAAAAGAGAATGATTTGTCTATGACTT
TGTTGATAAAAGAAACACACT ataccaaaagtaattgtagtactgaattttgctgtcatttaagccaatggtttgcactg
aaactctgtagacaactctgatactgccattccctgttcttactgcctacaatgatagt
gagcacaccaagtagcaatcacctgttcattgttttcttacatagactttaggtcccta
tggtttactaaaggctggcagataataagtattcaataatatgtcttaaggcattttaa
tactctagatgctctgaatcctaatctcaaaaggattaactttaaaatagaagttagaa
gaaccaagactatcttgtcaggggtgtattttgagagtggcagacttttcagtgccttt
ccattcatgacacttcttgaatctctggcagaaccagccagccgtgttcacagtgtcaa
atgaagggatgtctttgattgcttccaggtgttcctcagcaccaccggagggggatggg
tgatcagccgaatctttgactcgggctacccatgggacatggtgttCATGACACGCTTT
CAGAACATGTTGAGAAATTCCCTCCCAAC[ct]CCAATTGTGACTTGGTTGATGGAGCG
AAAGATAAACAACTGGctcaatcatgcaaattacggcttaataccagaagacaggtaaa
tataatgtgactgccaagggcttttaggaagaaggagcctctgcctgtccagcagccta
tacaagccaggcagtaccacagcaacatggctgaatgtgtgggaacacttgatacaaat
ttgcttgataataacagctaactgttcttaagtactcagaaagtgaaattatgtatttc
accttgtcagcaacactttacgtattattataataatccttttattatggagaaactga
aacagcaaaattcagccatttacccaagctcactgagtagtaagtgaactctgtgacct
tggcaagttacttgatcctcagctgtagcaaccaaaagagaatgatttgtctatgactt
tgttgataaaagaaacacact

FIGURE 10c 34573 (SEQ ID NO:3)
CAGCTGTGGGGTCAGGAAGGGCTTGAAGTATGGGACACTAGCCTGCCCCACCTCCACTC
TGCAGCACCCACAGGACCACCCTCATGCCCCTGGCAACAGCATGCAGGGCAGCTGCAGG
ATCCAGGTGGGACCCAGATACTATATGAAGGAGCCACCTTACCTGCTTTTTGCAAAGCT
ACTGGGATGGCATAGGCAGGTCCAATGCCCATGATGTCAGGTGGGACCCCAACCACTGC
ATAAGACCTCAGGACCCCAAGGATGGGAAGGCCCAACTCTTCTGCCTTGGACCTCCGGG
CCAGCAGGATGGCAGCTGCCCCATCACTCACCTGGCTAGAGTTTCCTAGGGGCAAACTG
TTGGGGTAAGAAGGCATCGGGGTGGGGATGAGGAGATCCCAGCCCTCCCACTTCTACTT
TGCAGAGGGGCCTGGTCTATTCCANGTTCCCAGAGTACAGCACCCAGCATGGCCATGGC
CTGCTTTCTCATACCCCTACCCCGGACCAGTNTCACCAGCTGTGGTAGAACCATCTTTC
TTGAAGGCAGGCTTCAGTTTGGCCAGGCC[ct]TCCATGGTGGTGCTGGGGCGGATACC
CTCATCCTGGGTCACAGTGATGCTCCTCTTGGTGCCCTTGTCATCATGGACCGTGGTGG
TCACAGGCACAATCTCAGCTTGGAAACAGCCCTTGCTCTGGGCTCTTGCTGCCCTGCCA
GCACCATGGACAGCCAGCTTCAGACTCCCTTGGGGTTCCCTTCCTTCCCTGCCCCCAAC
CCCTATCCATTTGGGTAGACACAAGCTCAGGCTGCTAAATTCAGGGACATGCTCGACTT
TGGGGGAGCTCTGAGGGCATGGCTAAGGCCTTACAGGGCCTTCTTCACCATCAGCCCCA
GACCTCCAGATCGTGGCCAATCCCAACCTCAAAGGGGGGAAAGGGTGTTTGGAAGTGGT
GCCTCCACTTAGAGCCCTTTGTCCAAGAGGGATTAAGCCTGCTTGATTCTCTCTGCTAA
ACTGAGGATGGAACCCCAGAA cagctgtggggtcaggaagggcttgaagtatgggacactagcctgccccacctccactc
tgcagcacccacaggaccaccctcatgcccctggcaacagcatgcagggcagctgcagg
atccaggtgggacccagatactatatgaaggagccaccttacctgctttttgcaaagct
actgggatggcataggcaggtccaatgcccatgatgtcaggtgggaccccaaccactgc
ataagacctcaggaccccaaggatgggaaggcccaactcttctgccttggacctccggg
ccagcaggatggcagctgccccatcactcacctggctagagtttcctaggggcaaactg
ttggggtaagaaggcatcggggtggggatgaggagatcccagccctcccacttctactt
tgcagaggggcctggtctattccangttcccagagtacagcacccagcatggccatggc
ctgctttctcatacccctaccccggaccagtntcaccagctgtggtagaaccatctttc
ttgaAGGCAGGCTTCAGTTTGGCCAGGCC[ct]TCCATGGTGGTGCTGGGGCGGATACc
ctcatcctgggtcacagtgatgctcctcttggtgcccttgtcatcatggaccgtggtgg
tcacaggcacaatctcagcttggaaacagcccttgctctgggctcttgctgccctgcca
gcaccatggacagccagcttcagactcccttggggttcccttccttccctgcccccaac
ccctatccatttgggtagacacaagctcaggctgctaaattcagggacatgctcgactt
tgggggagctctgagggcatggctaaggccttacagggccttcttcaccatcagcccca
gacctccagatcgtggccaatcccaacctcaaagggggaaagggtgtttggaagtggt
gcctccacttagagccctttgtccaagagggattaagcctgcttgattctctctgctaa
actgaggatggaaccccagaa

FIGURE 10d

37319 (SEQ ID NO:4)
GAGGATCAAAGCACCTGGTACAATGCCTGGCCAGAAAGTTGAATAATCGAATATAGCTA
ACGTCACTATTGCAGGCTGGCTATGTGCCTGGCGGTGTTCTTAGCCATTTACAAGTATG
AACTCATTTAATCCTCATAAGATCCTGTATGAGGTGAGTAAGCTGTTAATTCCCTTCCT
TGCCCATACTCTGTGACTCCAACCCACCACAGTTGAATTTCTCCTTATGAATTATAAAT
CAGAAAACGGCCCCAAATTCTGTCATGTCTAAGTGGGAAAATGGAAGAAGGCATTGATT
TCTCCCCTACTCAAGCAGAAGAGAATTAACCTCAGTCCCTGCTTTGCCCATATTCCTTC
CCCAGGGCCCCAGGAAGAAGACATGGAAAAACAATATTTCCACCAAAGTTTATTTCTCT
GAAACAATCACCAGTTGCTGTCCTCTATGGCACACTGAGAGCCCCAGGAGGGTCTTTAA
CTCCCTTCCTCAGATTATATTCATCCCAGAAATATAGCCTTGGACAATAATTTGGTTAC
AGCATAGTCCCAGGAATGAGGTCCCCCAA[ga]TTGCTAAGTTTTACATAGGGGAGACT
GGGAAATTCAAAGAATTGGATGGAGAAACCATAGGATCCAAGATAATGTCAGGGGGTTG
AAGATGTTGGAGAGGCATGGTAGCATCATTGAGTTTGAATCTCCTTCTCACTTGGAGTG
GAAGTTGTAGGATTCTGCCTCTAGGAAATGTGCCATCCTACAGAATAAATAAAAGGGAG
ATAATGAGGCTTCAACCCAACTTGCCCCCATCGTTTGTCACTGTAACCATCCCATGCCT
TAATACAGTGATACTGAAAACTCCAGGGCACCAACAACTAATACAAAGGAAGCACCTTC
AGCCTCCTCTCCACAGACATCCCACTTGGTAGAAGAGGAGGATGCTCCTTCCTGCTCTT
AATCCTAGCAATGGCAGCTTAAATCATGCCCTTGCCTAGATCCTCATGGAAGCTCACCC
ATATAATAATCAAGATTAGTT gaggatcaaagcacctggtacaatgcctggccagaaagttgaataatcgaatatagcta
acgtcactattgcaggctggctatgtgcctggcggtgttcttagccatttacaagtatg
aactcatttaatcctcataagatcctgtatgaggtgagtaagctgttaattcccttcct
tgcccatactctgtgactccaacccaccacagttgaatttctccttatgaattataaat
cagaaaacggccccaaattctgtcatgtctaagtgggaaaatggaagaaggcattgatt
tctcccctactcaagcagaagagaattaacctcagtccctgctttgcccatattccttc
cccagggccccaggaagaagacatggaaaaacaatatttccaccaaagtttatttctct
gaaacaatcaccagttgctgtcctctatggcacactgagagccccaggagggtctttaa
ctcccttcctcagattatattcatcccagaaatatagccTTGGACAATAATTTGGTTAC
AGCATAGTCCCAGGAATGAGGTCCCCCAA[ga]TTGCTAAGTTTTACATAGGGGAGACT
GGGAAATTCAAAGAATTGGATGGagaaaccataggatccaagataatgtcagggggttg
aagatgttggagaggcatggtagcatcattgagtttgaatctccttctcacttggagtg
gaagttgtaggattctgcctctaggaaatgtgccatcctacagaataaataaaagggag
ataatgaggcttcaacccaacttgcccccatcgtttgtcactgtaaccatcccatgcct
taatacagtgatactgaaaactccagggcaccaacaactaatacaaaggaagcaccttc
agcctcctctccacagacatcccacttggtagaagaggaggatgctccttcctgctctt
aatcctagcaatggcagcttaaatcatgcccttgcctagatcctcatggaagctcaccc
atataataatcaagattagtt

FIGURE 10e

37474 (SEQ ID NO:5)
AGGTGCACTTTTTCCAGGACCTCCTGCACAGGTGTGATATTTAGCCTGGAAGCAATGTG
TACATGGAATGCCCTACAGGCACAGGAGGCATCCCTGGAGACTGAATGGTGTCTGGGAA
GAGTAGGGCCACAGAGCTGAGCCCCTATGGACTGCAGCAGAGGGCCTGGCTCCAATCCT
AGCCTACCATATCCCAGTCCCATGATCGTGAGTAGTCCCATGGGATCAAGTGCTCTCAT
TCATAAAAGAAGGGAGGTAACAGCTGCCCCACTCACGCCCCAGGATCATCCGGCAGTCA
AAGGGGATTCAGGTGCTTCCTGGAAGACAGAGTCACAGGGGACCCTCCTTTTCCCAGCC
ACCCATATCAGTCCACCTTTTGGGTTTTGACCTTTACTATGTGGTTTTCTAGACTTCTA
TTGACAAATCCTGCTTTATGGACAGGGATGCTTTTCATTTAGATTGGGGGCCACTCCCC
AACATCTCATTTATTTTTCACAGCTCTGGTCCCATGGAGTCTTGTTTGAGTGCAAGTGA
ACTGAATTTCCCAATTCCTCAAAAAGAGC[ca]ATAGTAATAAAAACCATAATAGTGAC
ACTTACATATGGATAGTGCTTTGTAGTTTAGAAAATGCTTTCACCAACTGATTGCCATG
ACAGCCCTGAGAAGTAACCTACTCTACAGATGAGGAGCCTAGAGAGAGAAAGTGACTTT
CCTGGGCACATAGGCCCATGAGGTTCTGGTGCCAGCATAATAGACTAGTCAAATTTCCA
GACTCTGGAGTCAGACTGCCTGAGTTCAAACCATGGGTCCTCTTGGTCAGGTTTTATAA
CCACTCTAAAACTCTGTTTGCCCATCTGTAAAGTGAGCACAATTACAGAATCTACCTAA
TAGGGCTGTCTGTATGTCAATGGGCTTGGCCTGTGCCTGAGGAAATGCTANCCCCATGA
TCCTGCAGCCATGGTTAGGAAGGACATGGCAGGGAATGGGACCTTTCACAGACCGGGCT
GTGGCCAGCAGCCAGGGCCGA aggtgcactttttccaggacctcctgcacaggtgtgatatttagcctggaagcaatgtg
tacatggaatgccctacaggcacaggaggcatccctggagactgaatggtgtctgggaa
gagtagggccacagagctgagcccctatggactgcagcagagggcctggctccaatcct
agcctaccatatcccagtcccatgatcgtgagtagtcccatgggatcaagtgctctcat
tcataaaagaagggaggtaacagctgccccactcacgccccaggatcatccggcagtca
aaggggattcaggtgcttcctggaagacagagtcacaggggaccctccttttcccagcc
acccatatcagtccaccttttgggttttgacctttactatgtggttttctagacttcta
ttgacaaatcctgctttatggacagggatgcttttcatttagattgggggccactcccc
aacatctcatttatttttcacagctctgGTCCCATGGAGTCTTGTTTGAGTGCAAGTGA
ACTGAATTTCCCAATTCCTCAAAAAGAGC[ca]ATAGTAATAAAAACCATAATAGTGAC
ACTTACATATGGATAGTGCTTTGTAGTTTAGAAAatgctttcaccaactgattgccatg
acagccctgagaagtaacctactctacagatgaggagcctagagagagaaagtgacttt
cctgggcacataggcccatgaggttctggtgccagcataatagactagtcaaatttcca
gactctggagtcagactgcctgagttcaaaccatgggtcctcttggtcaggttttataa
ccactctaaaactctgtttgcccatctgtaaagtgagcacaattacagaatctacctaa
tagggctgtctgtatgtcaatgggcttggcctgtgcctgaggaaatgctancccccatga
tcctgcagccatggttaggaaggacatggcagggaatgggacctttcacagaccgggct
gtggccagcagccagggccga

FIGURE 10f

37810 (SEQ ID NO:6)
TCATACAACTCCTTGCAGTTCATGTAAGGACTCGGATTTTACCTGGAGTGGAAAAAGAA
GCACTGAAAGATTTGAGCAGGGGAGTAACCTGATAGCGTTTATGTTTAGTCCTGCCACT
TCGACAGATAAACGCACCAATGGGCTTGATGAGATTTAGGCCAACCCATAACCGCCCCT
CAACTTCTTTCCTTTCAATTTCAAAACTCCTCTATGGCTTCCTCCATCTGTTCTTCCTT
CTGAGAAGTGCTCTCTCTGCCCCTTTACAGAACTAACCACTTCGGCAACTCCTTGGACA
CTTTCCTTCTTGTTAATAATTTGCTTTCTCCGCCCCTCAAAAGCTTGCTGTTTCTGTAA
ATCATTACCTGTAAGAGGAACCGCTGGGAGTCCTGTAAACTTTAGCCCAGAGCTTGGCT
CCTCCTCCAGAATGTCTCCACCAATCAAGGAAAGTGTTTTGGGCCAGTCTTGCTCCTCC
GGATTGTCAGACTGCTCCTCCCTCTTCTTTAGACTGCCACGAGGAAAAAGCAGATGTGA
GAACTCAAGGTTCAGGGCTGCTCTTCTAA[cg]AAACAAGTCTGCCATAATCTCCATCT
GTGTTGGAATCTGTTAACTAGTGAGTACCTCATCTCCCCTCCTGTGTAAGATTTCCTGA
ACTGGCACATCTGTTTTTTGAGCAAAGATAACAAACAGATGAACAAAACCAACAATCAA
AAATGCTGTCATTAAAGTCTTGGGCAGCCAAAGTTTCTCTCAGAATTTCTCAGTTGTGT
GATACTATCTATTAAGTGATGAGGAGTATGCACACACAAAAGGCTATAAATGTAGCAGC
TGAGTTTTCATGTTGAGCCTTTTGGTGCTATTTGATTTTTTGAAAAACTATGTACATGT
ATTAAGTTGATAAATTTTTTTTTTAATTTTAATTGAACCAGATGCGGTGGCTCAAGCCT
GTAATCCCACCACTTTAGGAGGCTATGGTGGGCAGATGCAGATCACTTGAGGCCAGGAG
TTCGAGACCAGCTTGGCCAAC tcatacaactccttgcagttcatgtaaggactcggattttacctggagtggaaaaagaa
gcactgaaagatttgagcaggggagtaacctgatagcgtttatgtttagtcctgccact
tcgacagataaacgcaccaatgggcttgatgagatttaggccaacccataaccgcccct
caacttctttcctttcaatttcaaaactcctctatggcttcctccatctgttcttcctt
ctgagaagtgctctctctgcccctttacagaactaaccacttcggcaactccttggaca
ctttccttcttgttaataatttgctttctccgcccctcaaaagcttgctgtttctgtaa
atcattacctgtaagaggaaccgctgggagtcctgtaaactttagcccagagcttggct
cctcctccagaatgtctccaccaatcaaggaaagtgttttgggccagtcttgctcctcc
ggattgtcagactgctcctccctcttctttagactgccacgaggaaaaagcAGATGTGA
GAACTCAAGGTTCAGGGCTGCTCTTCTAA[cg]AAACAAGTCTGCCATAATCTCCATCT
GTGTTGGAATCtgttaactagtgagtacctcatctcccctcctgtgtaagatttcctga
actggcacatctgttttttgagcaaagataacaaacagatgaacaaaaccaacaatcaa
aaatgctgtcattaaagtcttgggcagccaaagtttctctcagaatttctcagttgtgt
gatactatctattaagtgatgaggagtatgcacacacaaaaggctataaatgtagcagc
tgagttttcatgttgagccttttggtgctatttgattttttgaaaaactatgtacatgt
attaagttgataaattttttttttaattttaattgaaccagatgcggtggctcaagcct
gtaatcccaccactttaggaggctatggtgggcagatgcagatcacttgaggccaggag
ttcgagaccagcttggccaac

FIGURE 10g

37879 (SEQ ID NO:7)
TATGTGTTGAATGAAAGGCTGGGTCATATGTGACCCTTGTGAGCAGCTGTTTCCGTGGA
CTGCTCCTGGGTCCCCTCCTCCACCCGCCCTGCCTCTCCCATTTCATCCTAGGAGGTGC
CTGTGGCCGGGCGCAGTAGCTCATGCCTGTAATCCCAGCACTTTGGGAGGCCGAGGCGG
GCGGACCACCTGAGGTCAGGAATTTGAGACTAGCCGGCCCAACATGGCGAAACCCCATC
TCTACTAAACATACAAAAAATTAGCCAGGCGTCGTGGCGGGCGCCTGTAATCCCAGCTA
CTCAGGAGGCTGAGGCAGGAGAATCGCTTGAACCCAGGAGGCGGAGCTTGCAGTGGGCC
GAGATTGCGCCACTGCACTCTAGCCTGGGGGACAACAGCGAAACTCCGTCTCAAAAATA
TATATATATATTAATTAAATAAAAAAACGAGGTGCCTTCTCCTGACTCCCTGATCCCCG
CGCTCTCCAGCTCTGCCCTCGCGATCGCTGGAGCCCCCTGAGGAACTCACGCAGACGCG
GCTGCACCGCCTCATCAATCCCAACTTCT[at]CGGCTATCAGGACGCCCCCTGGAAGA
TCTTCCTGCGCAAAGAGGTGCCGAGCACAGCCGTAGCCAGGGGAGGGGCTGAAGCGGGG
CAGGGGAGGGGCTGAAGCGAGCAGAGGAGGGTCTAGGACTTGGGGAGGGAGCCCAGGAG
GACAGAAAAAGGCCGGGCTGAAACCAGGGGTGGGGTTACAGCCGGGGCGGAACTGCATT
TAGGGGGCGGGGCCGGGTGTGAAGCAAGGCCAGGGGGCAGTCGGACAGTACCCACTGAA
GCCCCGCCCCTGCAGGTGTTTTACCCCAAGGACAGCTACAGCCATCCTGTGCAGCTTGA
CCTCCTGTTCCGGCAGGTGAGGTCCTGTCTCCCCTTTCTGCCTCAGTGAACTCAGCAGG
GCTGTGTGGACGCAAAGATGAGCTAGCTGCAAAGCCTGCCTCTGCATGTTGGGATTTGG
GGTCCTTGACAGGGGTGAGGA tatgtgttgaatgaaaggctgggtcatatgtgacccttgtgagcagctgtttccgtgga
ctgctcctgggtcccctcctccacccgccctgcctctcccatttcatcctaggaggtgc
ctgtggccgggcgcagtagctcatgcctgtaatcccagcactttgggaggccgaggcgg
gcggaccacctgaggtcaggaatttgagactagccggcccaacatggcgaaaccccatc
tctactaaacatacaaaaaattagccaggcgtcgtggcgggcgcctgtaatcccagcta
ctcaggaggctgaggcaggagaatcgcttgaacccaggaggcggagcttgcagtgggcc
gagattgcgccactgcactctagcctgggggacaacagcgaaactccgtctcaaaaata
tatatatatattaattaaataaaaaaacgaggtgccttctcctgactccctgatccccg
cgctctccagctctgccctcgcgatcgctggagccccctgaggaactcacgcagacgcg
gctGCACCGCCTCATCAATCCCAACTTCT[at]CGGCTATCAGGACGCCCCCTGGAAGA
tcttcctgcgcaaagaggtgccgagcacagccgtagccaggggaggggctgaagcgggg
caggggaggggctgaagcgagcagaggagggtctaggacttggggagggagcccaggag
gacagaaaaaggccgggctgaaaccaggggtggggttacagccggggcggaactgcatt
tagggggcggggccgggtgtgaagcaaggccagggggcagtcggacagtacccactgaa
gccccgcccctgcaggtgttttaccccaaggacagctacagccatcctgtgcagcttga
cctcctgttccggcaggtgaggtcctgtctcccctttctgcctcagtgaactcagcagg
gctgtgtggacgcaaagatgagctagctgcaaagcctgcctctgcatgttgggatttgg
ggtccttgacaggggtgagga

FIGURE 10h

41064 (SEQ ID NO:8)
CTATATGCTTGAAAGAATTTATAATTAAAATTTTTTTAAAAAAAGAGCATGAAGACTT
GCACAGCAAGATATCAGAAAGCTAAATGGAAATTTTCTTCTTAGCTATGTGAAAGACAC
AGGCAGAGCACCAGATGGTTCAGTAGCCTGAGTTCTAGAAATAATCTCAACATGGTAAG
AGGGTCTGTAAGCTAGCCTACACCTATGCGAAACAGGGTTTTATGCATGGGACACTATT
CCAGTAGAAAATGCAGGATTTGAGTAGACTTCTAGAGTTGGTTTTAAAATGATTTAATG
TAAGGCATCAAATCTAGACAATCAGTAAGAGAGTAACCCATACAGGCTATATTTTCACA
TGTTCTATAAAGTATAGTTTGGTGTCTACAGCCTGCAAACCACAGCCAGGCCCCAAATC
TTTCAAGTTGGCCCCTGACTCTTTCCTGCTGTCTCCATATGACCGAGTATGCACTGAAC
TATCAGCGTTTCCAGGTTCCTCTCCAGGCACCGCAGAGTGGTGGCGCTCTCACAAAGGC
ATGACAGGAAGACAGGGTGTGAGGTTGGA[tc]GGAGAGAGGCTGTAGCTGAGGAAAAG
CACAGCCCATGGCATTTTACTGTAATGCCTGAACAAATGCACTTAATGAATATGTGGCA
AATGTAGGCTCAGAAGTATCATTTCTTTCCTGTAAATGTAAATGCTCTCCCTCTGAAGT
TCCTGTGGGAATGGCTTCTGGATTCTGGGGGTGAGTGTGGGGCCACCCTCCACGAGGCC
TCTGCCTACCTGAAAGCATCATTCCATAGACCCTCCCATTGTTCACACACAGTGGACCT
AACTCTCCACTTTCACTTTTTCTTCTGTAATAGTTTATAACAGTCAATAGAACTCCCAC
ATTAGCTTTTAGGGTCATCACAGAATACAAAATGTTGAAGATACATATTTTATCTTTTC
TATCTTTCTCCTTAGTATCCAGGTACACTAACTCTGATATTCTAACAGAAATTATACAG
ACACCATGATCACCATCTTGA ctatatgcttgaaagaatttataattaaaattttttttaaaaaaagagcatgaagactt
gcacagcaagatatcagaaagctaaatggaaattttcttcttagctatgtgaaagacac
aggcagagcaccagatggttcagtagcctgagttctagaaataatctcaacatggtaag
agggtctgtaagctagcctacacctatgcgaaacagggttttatgcatgggacactatt
ccagtagaaaatgcaggatttgagtagacttctagagttggttttaaaatgatttaatg
taaggcatcaaatctagacaatcagtaagagagtaacccatacaggctatattttcaca
tgttctataaagtatagtttggtgtctacagcctgcaaaccacagccaggccccaaatc
tttcaagttggcccctgactctttcctgctgtctccatatgaccgagtatgcactgaac
tatcagcgtttccaggttcctctccaggcaccgcagagtggtggcgctctcacaaaGGC
ATGACAGGAAGACAGGGTGTGAGGTTGGA[tc]GGAGAGAGGCTGTAGCTGAGGAAAAG
CACAGCccatggcattttactgtaatgcctgaacaaatgcacttaatgaatatgtggca
aatgtaggctcagaagtatcatttctttcctgtaaatgtaaatgctctccctctgaagt
tcctgtgggaatggcttctggattctgggggtgagtgtggggccaccctccacgaggcc
tctgcctacctgaaagcatcattccatagaccctcccattgttcacacacagtggacct
aactctccactttcactttttcttctgtaatagtttataacagtcaatagaactcccac
attagcttttagggtcatcacagaatacaaaatgttgaagatacatattttatcttttc
tatctttctccttagtatccaggtacactaactctgatattctaacagaaattatacag
acaccatgatcaccatcttga

FIGURE 10i

41164 (SEQ ID NO:9)
GGTTCACTCACCCCTCCTCCCACCTCGGCAGCCCTGGGATGTCGCTGCTGACTCAGGAG
GAACCCGAGGTGCCGTAGCGGCTGCTCCAATATTGCAGAAGAGGTTCCTCAGGCAGCTC
TGCCCACAGCCCCAAGTCACGAATTCCGTGACTCCAGCTCCATCCCAGGCCCCAGGGTA
CCTGGCCCAGGGTTGTGCTGCCGCAGACTTGGCCTGTACCATCCAGGCGGCGGTGGGGA
GCTGGGGTTGGAAAGGCTTCTTGGAGTGGACTCCTGGGTCTGTCTGGGAGACGGGGAGG
AAGGGACACTCTGAACATCACCAGGGGCTGCTGGGGGGCCCTGGCCACCCCCAGAGTCA
GAACAGGCAGGTGGGGCAGGATCTCAGGTCATCCTATGCTACACTCAGCCATTGCGTGG
CCCCTCTCCTCCCTGTGCCTGGCCTTTTGGCCAGCCCTGGGGCCACCGAGAGGATGCAG
CACCGAACCCTCCAGGAGCCCCCAGTGCTGCCGTCTGTGGGACAGGGACAATCCCATCC
CCACTGCTACTGTCTGTGCTGTGCTGGGC[ga]CAGAGCTGGACACCTCCAAGGCCCAG
CGCCCGTAGTGGCTCTCATCATGGACAATTCACAGGCAGATGGTGGCCAGCTCTGTGGC
CTGCAGGGACTGGGAGCGGCGCCAGACCATCTAGGCCCCAACCTATCTGCATTATCCTG
GAAGACTTCCTGGAGGAGGCTTCTAAGCTGAGGCCCAAGGACCATGTCAGGTCTAGGAC
TAGGACCAGTGCAGGCCGAGGCCAGAGAGACAGCTGGGCTTCCAGGTAGGGTCAAAGTG
AGGTGGGCAGCAGGTGTGGGGGCCAGGGGACTCGGGGACTTCCTCTCCGGCTGGGCCCG
CCTGACGTGGGAGGCAGCCAGGGTTAATCATTTCCACGAAGCCTTGACCCCACCTGCCT
TGGCGCTCTGCTCCCGCCTCCCACTGCCCCTCAGGCCAGCTCAGGAGCCATGGGGCGCT
GGGCCTGGGTCCCCAGCCCCT ggttcactcacccctcctcccacctcggcagccctgggatgtcgctgctgactcaggag
gaacccgaggtgccgtagcggctgctccaatattgcagaagaggttcctcaggcagctc
tgcccacagccccaagtcacgaattccgtgactccagctccatcccaggccccagggta
cctggcccagggttgtgctgccgcagacttggcctgtaccatccaggcggcggtgggga
gctggggttggaaaggcttcttggagtggactcctgggtctgtctgggagacggggagg
aagggacactctgaacatcaccaggggctgctggggggccctggccacccccagagtca
gaacaggcaggtggggcaggatctcaggtcatcctatgctacactcagccattgcgtgg
cccctctcctccctgtgcctggccttttggccagccctggggccaccgagaggatgcag
caccgaaccctccaggagcccccagtgctgccgtctgtgggacagggacaatcccatcc
ccaCTGCTACTGTCTGTGCTGTGCTGGGC[ga]CAGAGCTGGACACCTCCAAGGCCCAG
cgcccgtagtggctctcatcatggacaattcacaggcagatggtggccagctctgtggc
ctgcagggactgggagcggcgccagaccatctaggccccaacctatctgcattatcctg
gaagacttcctggaggaggcttctaagctgaggcccaaggaccatgtcaggtctaggac
taggaccagtgcaggccgaggccagagagacagctgggcttccaggtagggtcaaagtg
aggtgggcagcaggtgtgggggccaggggactcggggacttcctctccggctgggcccg
cctgacgtgggaggcagccagggttaatcatttccacgaagccttgaccccacctgcct
tggcgctctgctcccgcctcccactgcccctcaggccagctcaggagccatggggcgct
gggcctgggtccccagcccct

FIGURE 10j

41365 (SEQ ID NO:10)
TTTATGGCACAAATGGGGCCGGGGGCAGGCCCAGGGGCAATTCAACAGGAGGCAAGAGC
CCAGGGCTCCAGAGTGGAGAGACAGGAGGCAGCTCAGTCCCCAGACCCCAGCAGAGCAT
CTGGGGCCTCGGCCCCACTCCAGAGCTTCTTCCTGAGGGAGCCATGCACAGCAATGCTG
GGAGAGGGACTGATGGGGTGGGGTCAGGCCTCCTGCCACAGAGCTGGGCTGCAGAGCCC
AGATGGAAAGACACAGTGAAGAGCTCAACCTCCTTCCAAGCTCTCCTTCTCAGGGCTTC
AGGTTCCAGAGCCCCAGGGGAGCTCCCAGCCAGGGGCAGGGTCACCTTGATATTCACAA
CTGGGCTTGTGGGGGCCATCTTCAGTGCAACCGTTGTGACAAAGTCAAGAGGCTGCCTC
CCTGAAGCAGACCCACTGCCTACGCCACACTGACGGTCCAGAGGCCCCCTCCTGAGGGC
GGCCAGCAAGGGGCACTGTGGCAGCTCCCACTGTGCCTGTCCCAGACTGGGTCAGCAGG
TCTCTCTGGACAGCACACTGCACCAAGTA[tc]GCCCACCAAAAACGCATCAGGTGTGG
CCATGGCCCACAGTACCTTCTTCATTCCCTGCCTCTAACATGTGCGGTCTGAATGAATT
TTGTCACTCTTCTGCCATTTATAAAGGAGAAGACAGTGATCCAAAGCTATGCATGTTTC
TGAAGCCCTCAAGGAAGCTCGGTGCAGGCCATCACTTCTTTTGGCAGAAGGCGGGCTGT
GGTCTCTATGTACACACGCGAGCCCGCCAGTGACGTGCGGCAGTGCGTGGCGTCCAGGC
TGGGACAGGGGCCTTTCAAGTCTCCCCAGGGACCGGTGTTTTCTACAACAGACAGGTGC
TCCCAGACCGTTGGGGTACAGGCCAGGCCGTCTACACCACAGTATTGAGGGAGCTGCGG
CTGTGGCGGCCACCCCCTGGCAGTGCCTCTGCAGCTGGGGTGCTCCCGCTCTGGGCAGG
GTCAGGGGGCACGAGCAGGGC tttatggcacaaatggggccgggggcaggcccaggggcaattcaacaggaggcaagagc
ccagggctccagagtggagagacaggaggcagctcagtccccagaccccagcagagcat
ctggggcctcggccccactccagagcttcttcctgagggagccatgcacagcaatgctg
ggagagggactgatggggtggggtcaggcctcctgccacagagctgggctgcagagccc
agatggaaagacacagtgaagagctcaacctccttccaagctctccttctcagggcttc
aggttccagagccccaggggagctcccagccaggggcagggtcaccttgatattcacaa
ctgggcttgtgggggccatcttcagtgcaaccgttgtgacaaagtcaagaggctgcctc
cctgaagcagacccactgcctacgccacactgacggtccagaggccccctcctgagggc
ggccagcaaggggcactgtggcagctcccactgtgcctgtcccagactgggtcagcagg
tcTCTCTGGACAGCACACTGCACCAAGTA[tc]GCCCACCAAAAACGCATCAGGTGTGG
Ccatggcccacagtaccttcttcattccctgcctctaacatgtgcggtctgaatgaatt
ttgtcactcttctgccatttataaaggagaagacagtgatccaaagctatgcatgtttc
tgaagccctcaaggaagctcggtgcaggccatcacttcttttggcagaaggcgggctgt
ggtctctatgtacacacgcgagcccgccagtgacgtgcggcagtgcgtggcgtccaggc
tgggacaggggcctttcaagtctccccagggaccggtgttttctacaacagacaggtgc
tcccagaccgttggggtacaggccaggccgtctacaccacagtattgagggagctgcgg
ctgtggcggccaccccctggcagtgcctctgcagctggggtgctcccgctctgggcagg
gtcagggggcacgagcagggc

FIGURE 10k

41408 (SEQ ID NO:11)
TTAATATAAATAGGATATCATAATAAATAGAAATCATGCCAGGTCAGACGCACAGCACG
CTTGGAGCTCAGGGTTCCCTGAGACCCTGACCCTAAGTTCTGCTGTTCCCTTGCCCTGG
GGACCAGAGACGGCCTCCAGTCCCCCTCAAGTACCTCTGTGTGACCTCACAAGGCCTCC
CAGGGCCTCAGATGTGAGCTGCTACTCTGAGCTACCCCAGCCCCTTCTTACAGACCTTT
ACCCAGAGGAAGAGCCTGGGTCCCTCAGAACCTCTGCACCTGACTTAGCAACCTGCCCC
TGCCCTACCCACCTCCACAAACCCCTGCTGCAGGTCCAGCCATCAGACCCTGGCCATCC
CAGGCTGCAGGGAAGATCACGGGGAAGAGAACGAAGAACCTACCAAAGCTTTCCAGGCC
TCTCCTCCTCCCAGTGTCTTCCTTCCCAGGCCTGAAGGTGGCTTCTCTGCCTCCCCAAG
AGCCTGAATGCCAAGTGACCTCCTTCTGGAAACTTCTGCCAGATTGTTCCTATGCCCAA
GTTCTCTGATCATCCTCAAAAGAAGACAG[ac]CTTCCATCCCAGAGGCCCCTCTCTAT
CTTCCACTCATCAAACTTCTAGGGGACAAGGAGTCCTTTGGGATCCTAGCCCCTCTGGC
CCACCTAAGTCCCAACCTAAGGGGCAGCAAAGGCACAGATGGTGATAATTTGCTGGGGG
CTGGTCCACTCCCCTGGGCCCTGCTGTCTCACCCTGTGGTCAGGGCTCTTGTAGATGAC
TTGTGTAGTTTGTTCACTGCACAAAGTGAGCAAGGGGCCAAAGGGACAAGTAGAGGCAG
AAGTCCAGCCCACGCTCCCCAGTCCACAATCTCCCAGAGGAAGGGGCACCTTCTTCTAG
CTCCCTCCCTATGGAAGTTTCCACTCTGCTCAGCTTCATCACAGCCCAGCCCAGAGTGG
AGTGGACTGGCCAGGCACCCTCGGGGTCTGCCAGCAGCCCCCATTTGGGTTTAGCGATG
CCCTGGGCCCCAGCCACCCTT ttaatataaataggatatcataataaatagaaatcatgccaggtcagacgcacagcacg
cttggagctcagggttccctgagaccctgaccctaagttctgctgttcccttgccctgg
ggaccagagacggcctccagtccccctcaagtacctctgtgtgacctcacaaggcctcc
cagggcctcagatgtgagctgctactctgagctaccccagccccttcttacagaccttt
acccagaggaagagcctgggtccctcagaacctctgcacctgacttagcaacctgcccc
tgccctacccacctccacaaacccctgctgcaggtccagccatcagaccctggccatcc
caggctgcagggaagatcacggggaagagaacgaagaacctaccaaagctttccaggcc
tctcctcctcccagtgtcttccttcccaggcctgaaggtggcttctctgcctccccaag
agcctgaatgccaagtgacctccttctggaaacttctgccagattgttcctatgcCCAA
GTTCTCTGATCATCCTCAAAAGAAGACAG[ac]CTTCCATCCCAGAGGCCCCTCTCTAT
CTTCCACtcatcaaacttctaggggacaaggagtcctttgggatcctagcccctctggc
ccacctaagtcccaacctaaggggcagcaaaggcacagatggtgataatttgctggggg
ctggtccactcccctgggccctgctgtctcaccctgtggtcagggctcttgtagatgac
ttgtgtagtttgttcactgcacaaagtgagcaaggggccaaagggacaagtagaggcag
aagtccagcccacgctccccagtccacaatctcccagaggaaggggcaccttcttctag
ctccctccctatggaagtttccactctgctcagcttcatcacagcccagcccagagtgg
agtggactggccaggcaccctcggggtctgccagcagcccccatttgggtttagcgatg
ccctgggccccagccaccctt

FIGURE 101

41409 (SEQ ID NO:12)
TGTGACAATCAGCAAAGCCCCACCCAGGCCCCCATCTGGGATGATGGGAGAGCTCTGGC
AGATGTCCCAATCCTGGAGGTCATCCATTAGGAATTAAATTCTCCAGCCTCACTCTCGG
CTCTTTCCTACTTGTTAGTAGTCTTGGGATGGTGGTAGTCAGAGGCAGGGACTGAAGAG
GTGAGGGAATGACAGAACCGACATTTACCAGGCACCAGCTGTATACATTACACATGCCA
TCTCCTTTAATCTGCATCACAACCCTGTGAGATCAGTGCTATTCTTAGACCCATTTCAC
AGGTGAGCGAACTGAGGCCTTTAAAAGGTTACATCAACCTCTCAAGATCAGACACCAAA
CCATAGTTCAGCTAGGTGTCGCAGGGGGGAATACTTATTAAGTGCTAAGCACTGTATAT
GTATTGGTTCACTTAATCCTCAACAACCCTATGAGGTAGCTCCTGTTTAGAGACCCCCT
TTTTTTAGAGGAGGAAACTAAGGCTTAGAGTGCAAGAGGGAGGTCCTTTGCGCAAAGGC
ATGGAGGAGATTTGAATTTAGGTTTAGGG[ac]TGGGCCAGGAAGGGCACGGCAGCCGT
TAAAAAAAGAGGCCCCCCTGGGAGGAGGGGAGCTGAAAGCCCTCTCCAACACCCACCCC
AATCCTGGATTCAGACACAGACATTTCTGTGACATCCCTAACTTCCCACCTGCTACCTC
AGGCCACAGCACCCAGGCACTAGGGCTCCCCTAGGCAGGTTTTTGAGGCATGTATTATT
TTTGCAACACGGACATACATGTACCTCCTCCTGGTACTGCCTGGGGCTGCTGCAATAAG
TTACCCTTTCCCCATTCTCATCTGTATGTGAAGTTCCCTGGCAAGGCCAAAGCCCAGGG
CATCAGAATGAGCTTCCTGAACACCACATCCAGGCATAGAAGAGTTGTGTCATACATAG
CTCAAGGTTACCCAGAACAGCAGGAGATGTGGTCCAGCATTTGGGCCTTGAGATCCCCC
CATTCATCCTCTTGATTGTCC tgtgacaatcagcaaagccccacccaggcccccatctgggatgatgggagagctctggc
agatgtcccaatcctggaggtcatccattaggaattaaattctccagcctcactctcgg
ctctttcctacttgttagtagtcttgggatggtggtagtcagaggcagggactgaagag
gtgagggaatgacagaaccgacatttaccaggcaccagctgtatacattacacatgcca
tctcctttaatctgcatcacaaccctgtgagatcagtgctattcttagacccatttcac
aggtgagcgaactgaggcctttaaaaggttacatcaacctctcaagatcagacaccaaa
ccatagttcagctaggtgtcgcaggggggaatacttattaagtgctaagcactgtatat
gtattggttcacttaatcctcaacaaccctatgaggtagctcctgtttagagaccccct
ttttttagaggaggaaactaaggcttagagtgcaagagggaggtcctttgcgcaaaggc
atggAGGAGATTTGAATTTAGGTTTAGGG[ac]TGGGCCAGGAAGGGCACGGCAGCCGt
taaaaaaagaggcccccctgggaggaggggagctgaaagccctctccaacacccacccc
aatcctggattcagacacagacatttctgtgacatccctaacttcccacctgctacctc
aggccacagcacccaggcactagggctcccctaggcaggtttttgaggcatgtattatt
tttgcaacacggacatacatgtacctcctcctggtactgcctggggctgctgcaataag
ttaccctttccccattctcatctgtatgtgaagttccctggcaaggccaaagcccaggg
catcagaatgagcttcctgaacaccacatccaggcatagaagagttgtgtcatacatag
ctcaaggttacccagaacagcaggagatgtggtccagcatttgggccttgagatccccc
cattcatcctcttgattgtcc

FIGURE 10m

41420 (SEQ ID NO:13)
CCACCACCGAGGCCGAGCTGCTGGTGTCGGGCGACGAGAACTGCGCCTACTTCGAGGTG
TCGGCCAAGAAGAACACCAACGTGGACGAGATGTTCTACGTGCTCTTCAGCATGGCCAA
GCTGCCACACGAGATGAGCCCCGCCCTGCATCGCAAGATCTCCGTGCAGTACGGTGACG
CCTTCCACCCCAGGCCCTTCTGCATGCGCCGCGTCAAGGAGATGGACGCCTATGGCATG
GTCTCGCCCTTCGCCCGCCGCCCCAGCGTCAACAGTGACCTCAAGTACATCAAGGCCAA
GGTCCTTCGGGAAGGCCAGGCCCGTGAGAGGGACAAGTGCACCATCCAGTGAGCGAGGG
ATGCTGGGGCGGGGCTTGGCCAGTGCCTTCAGGGAGGTGGCCCCAGATGCCCACTGTGC
GCATCTCCCCACCGAGGCCCCGGCAGCAGTCTTGTTCACAGACCTTAGGCACCAGACTG
GAGGCCCCCGGGCGCTGGCCTCCGCACATTCGTCTGCCTTCTCACAGCTTTCCTGAGTC
CGCTTGTCCACAGCTCCTTGGTGGTTTCA[gt]CTCCTCTGTGGGAGGACACATCTCTG
CAGCCTCAAGAGTTAGGCAGAGACTCAAGTTACACCTTCCTCTCCTGGGGTTGGAAGAA
ATGTTGATGCCAGAGGGGTGAGGATTGCTGCGTCATATGGAGCCTCCTGGGACAAGCCT
CAGGATGAAAAGGACACAGAAGGCCAGATGAGAAAGGTCTCCTCTCTCCTGGCATAACA
CCCAGCTTGGTTTGGGTGGCAGCTGGGAGAACTTCTCTCCCAGCCCTGCAACTCTTACG
CTCTGGTTCAGCTGCCTCTGCACCCCCTCCCACCCCCAGCACACACACAAGTTGGCCCC
CAGCTGCGCCTGACATTGAGCCAGTGGACTCTGTGTCTGAAGGGGGCGTGGCCACACCT
CCTAGACCACGCCCACCACTTAGACCACGCCCACCTCCTGACCGCGTTCCTCAGCCTCC
TCTCCTAGGTCCCTCCGCCCG ccaccaccgaggccgagctgctggtgtcgggcgacgagaactgcgcctacttcgaggtg
tcggccaagaagaacaccaacgtggacgagatgttctacgtgctcttcagcatggccaa
gctgccacacgagatgagccccgccctgcatcgcaagatctccgtgcagtacggtgacg
ccttccaccccaggcccttctgcatgcgccgcgtcaaggagatggacgcctatggcatg
gtctcgcccttcgcccgccgccccagcgtcaacagtgacctcaagtacatcaaggccaa
ggtccttcgggaaggccaggcccgtgagagggacaagtgcaccatccagtgagcgaggg
atgctggggcggggcttggccagtgccttcagggaggtggccccagatgcccactgtgc
gcatctccccaccgaggccccggcagcagtcttgttcacagaccttaggcaccagactg
gaggcccccgggcgctggcctccgcacattcgtctgccttctcacagctttcctgagtC
CGCTTGTCCACAGCTCCTTGGTGGTTTCA[gt]CTCCTCTGTGGGAGGACACATCTCTG
CAGCctcaagagttaggcagagactcaagttacaccttcctctcctggggttggaagaa
atgttgatgccagaggggtgaggattgctgcgtcatatggagcctcctgggacaagcct
caggatgaaaaggacacagaaggccagatgagaaaggtctcctctctcctggcataaca
cccagcttggtttgggtggcagctgggagaacttctctcccagccctgcaactcttacg
ctctggttcagctgcctctgcaccccctcccacccccagcacacacacaagttggcccc
cagctgcgcctgacattgagccagtggactctgtgtctgaagggggcgtggccacacct
cctagaccacgcccaccacttagaccacgcccacctcctgaccgcgttcctcagcctcc
tctcctaggtccctccgcccg

FIGURE 10n

41452 (SEQ ID NO:14)
GCCTATGGTGCAGGGCTGGCAGAGGCGGGGCCAGGATTCTAGCTTCCCCACACACCAGC
CCTGTGGCATCATTCTTCCCAACGTCCAAACGTTTTTCCAAGGGGGAGAAATGGACTGG
GTCATGTAAAGAAATACTCATTTTTAGGGCTTTTTATGTGGCCTTCAAAGCACGTTGCA
AACAAATCCCTTTCACTCCTCAGAGGAGGAGCCATTAGGAAGGTAGGGGGCGACAGGCA
CAGCCTACAGCCTCTCCTCAGGAGGACAGAGGGGGTCATCGCATTTGAGCCCCCTGCAG
TCATCTCGGGGGCTCCTGAGGGTCCAGGTCCACATGTTCGAGGGTCTGCAGCACATCCA
CGGCGCTGTAGGACTTCCAGGCCTGCATGTTACAGCTCTTCAGGATGGCTCCCAGCTGC
CTGCCAGGGCCTACTTCGAAAGTTTGGGGGAACCCCCTGCCCTTTTTCCTTTCGTATAT
GGCATGCATCGTCTGCTCCCACTTCACTGGGGAGACCAGCTGCTGGGCCAGCAGCTTGT
GGATGTGCCCGGGATGCCTGTATCTATGC[cg]CGTGGACGTTGGAGTAGACAGAAACC
AGAGGCTTCTTAATGTCGACTGCCTTTAAAGCTTGCGTCAGGGGCTCCACGGCTGGCTC
CATGAGGCGGGTGTGGAATGCGCCACTAACCGGCAACATCCTGGTGCGTCTGAAATGAA
ACTTAGAGGAATTCTTCTGGAGAAACCGTAGAGCCTGGGGAAGGAAGGAGGTTTCAGCC
GAGCAATGTCCCAGAAATCCGCCTTTACAGATCTGACCATTCACAGGGCCAAACTGGGA
GGGTGACCACAAAGAGACCCACAGCTGCTAGATGTGGACATGTGACCTGTCTGTCCCAG
CACCATCCCCAGGCAATTCACTTAACATCCTGGAATCTCTTCTGTCCCAGCCTTCAAAT
AAGCACAGTTCCATCTACTTCACAACGCTGCCAGGAAGAGCAAACCCTACAAGGCATGC
AACAGTGTCTGGTAGAGGAAA gcctatggtgcagggctggcagaggcggggccaggattctagcttccccacacaccagc
cctgtggcatcattcttcccaacgtccaaacgtttttccaagggggagaaatggactgg
gtcatgtaaagaaatactcatttttagggctttttatgtggccttcaaagcacgttgca
aacaaatccctttcactcctcagaggaggagccattaggaaggtagggggcgacaggca
cagcctacagcctctcctcaggaggacagagggggtcatcgcatttgagccccctgcag
tcatctcgggggctcctgagggtccaggtccacatgttcgagggtctgcagcacatcca
cggcgctgtaggacttccaggcctgcatgttacagctcttcaggatggctcccagctgc
ctgccagggcctacttcgaaagtttgggggaaccccctgccctttttcctttcgtatat
ggcatgcatcgtctgctcccacttcactggggagaccagctgctgggccagcagcTTGT
GGATGTGCCCGGGATGCCTGTATCTATGC[cg]CGTGGACGTTGGAGTAGACAGAAACC
AGAGGCTtcttaatgtcgactgcctttaaagcttgcgtcaggggctccacggctggctc
catgaggcgggtgtggaatgcgccactaaccggcaacatcctggtgcgtctgaaatgaa
acttagaggaattcttctggagaaaccgtagagcctggggaaggaaggaggtttcagcc
gagcaatgtcccagaaatccgcctttacagatctgaccattcacagggccaaactggga
gggtgaccacaaagagacccacagctgctagatgtggacatgtgacctgtctgtcccag
caccatccccaggcaattcacttaacatcctggaatctcttctgtcccagccttcaaat
aagcacagttccatctacttcacaacgctgccaggaagagcaaaccctacaaggcatgc
aacagtgtctggtagaggaaa

FIGURE 10o

41475 (SEQ ID NO:15)
ACGTTATCAGGCACAAACCCCCTCCAGACACCTGAGCCTCCCCCACAGGCTCCCAGTGA
GGAGCCATCACATGCCCAGGCCAGCCGAGGGGCCCTCAGGCATGGGGATCTGGGCAATG
GCAGCAAGCTGGGCGGGGGGTGCAGCCAGGATGACAGCAGATCTGCAGGGCGGGGTCCT
CGCCCCGGGCCACCTGGCTGGGGCCGAAGGTCACAGCTGCGTCTAACTGGGCCTTGAGC
AGCTGAAGCTGTTTCAGGGCTTGCAGCACCTCTGGGGTGGCCCCGGCCACACCCCCCAG
CAGGTTGTAGTTCTCACCAGGGTCCTTGGACAGGTCATAGAGCAGCGGGGGCTCATGAG
CAGTCAGAGAGCTGGAGGCGTGGCAGGCAGGGTCTGCAGTGGTATCACTGTGGGCAGAG
CCTGGGGAGGGGGCCAATTCTGTGCACAGGGCAAGGGCGAGAGGAGGGGCCAGGGATCT
AGGGCTCCGGGGAGGGGTCAGCAGGTCGGGGGGAGGGATCCACGGGGAGGGGTTACCCT
GGGTGAAGAAGTGAGCCTTGTACTTTCCA[cg]TCCGCACAGCAAAAACCCCACGGACC
TCGTCTGGGTAGGACGGGTAGAAGAAGAGAGACTGCCGAGGGCTCTGGGGGCAGAGTCA
GGGGTCACGGGGCGGGGCAGGCCCCAAGCACTGCACATACCTGGGGCTGCCAGCCCTGG
TGGGAGGCCCTGGACGTGCACCGCTTCTTGCCCACCCAGGAACCTGAGAGGTGGCGCCA
CTTGGATGCCACTCAGTGCAGGAGGCACTGAGGCACAGACTCTCAGGCACTGCCCACAC
TCACCCCAGGGGAAGGCCAGGACAGGGGCCAAGGATCTGGGATCAGGGGTCACCGGCCC
TACCTTGCCTGTGCCCAGCAGCAGGGGGCTGAGGTCAAAGCCATCCAAGGTGACATTGG
GCAGTGGGGCCCCAGCCAGGGCTGCCAGGGTAGGCAGCAGGTCCAGGGAGCTGGCCAGC
TCGTGGGTCACGCCTGGGGGC acgttatcaggcacaaaccccctccagacacctgagcctcccccacaggctcccagtga
ggagccatcacatgcccaggccagccgaggggccctcaggcatggggatctgggcaatg
gcagcaagctgggcggggggtgcagccaggatgacagcagatctgcagggcggggtcct
cgccccgggccacctggctggggccgaaggtcacagctgcgtctaactgggccttgagc
agctgaagctgtttcagggcttgcagcacctctggggtggccccggccacacccccccag
caggttgtagttctcaccagggtccttggacaggtcatagagcagcgggggctcatgag
cagtcagagagctggaggcgtggcaggcagggtctgcagtggtatcactgtgggcagag
cctggggagggggccaattctgtgcacagggcaagggcgagaggaggggccagggatct
agggctccggggaggggtcagcaggtcggggggagggatccacggggaggggttaccct
gggTGAAGAAGTGAGCCTTGTACTTTCCA[cg]TCCGCACAGCAAAAACCCCACGGACC
tcgtctgggtaggacgggtagaagaagagagactgccgagggctctgggggcagagtca
ggggtcacggggcggggcaggccccaagcactgcacatacctggggctgccagccctgg
tgggaggccctggacgtgcaccgcttcttgcccacccaggaacctgagaggtggcgcca
cttggatgccactcagtgcaggaggcactgaggcacagactctcaggcactgcccacac
tcaccccaggggaaggccaggacaggggccaaggatctgggatcaggggtcaccggccc
taccttgcctgtgcccagcagcagggggctgaggtcaaagccatccaaggtgacattgg
gcagtggggccccagccagggctgccagggtaggcagcaggtccagggagctggccagc
tcgtgggtcacgcctgggggc

FIGURE 10p 41541 (SEQ ID NO:16)
GAATGGTAAGAAACATTCTTCAGCTCAAGATGGTGACCAGAGGCATCCAGCACTCACTT
CCTTCACAAAGGACTCAAACAGCAAATGAATAATCACATGTCAAGTAGAGCAGCTTAGA
AAGAACACTGGAATTCAGAGGGAAAGGACAAGGAACTTCGGAAACATGCAAAGAGAATG
ATGTGAAGCAGCCGGCCCAGCCAGGATCAGCTCAGATCCAAGAGAAACTGCCCAACGTA
GGGAAAAGGTAAATGAGAGATCCCCGCAAGGCTGCATTCCCACCACAGACTCCTGTGGC
CCTAGCCACAGAGAGCCCCTTGGCCCTCATGGGCTTTGAGACTAGTATAGAGAGCCGCC
TGCATTGTTCCAAAGAGGGATTTTATGATGGGTCCTACACATCCTCTGAGACCTGAGCA
GCTGCAGCACAGCACCATTTTGAGAGCCCACCCCTGACCAGACCCCATCCCGCCCTGGG
GCTCAACAGCCCCTGCATCTCCACATCCATGGAGTCCTGCTGACATTCCGCCATGTCCA
CCCAGAAGGCTGCAGCCTCACAATGCAGG[ag]TGACTGGGTCCCCAGCAATCTAGTCT
ACACATGTCCTATAACCTGGGAATGGGTGGTGCACCACACCAGGGAGGCTGCCCCTGGG
ACAAAGGGAGCCAAAGCCCATGTTTCCCAGAGCCGCAGAGCTGCCCGCCTGGGACCACT
GCCACTGACAGCACCCCCACCATCCCCCCAGCAGCGGGGTCACTGTGCACTTGTGATAT
GGTTTGGCTGTGTCCCCACCCAAATCTCATCTCCAGTTGTAATCCAAATTGTAATCCCC
ACGTGTCAGGGGAGGGACCTGGTGGGAGGTCATTGGATTACAGGGGCGGTTTCCTCCAT
GTTGTTCTCATGATAGTGAGTAAATTCTCATGAGATCTGATGGTTTTATAAGTGTTTGA
TAGTTCCTTCTTCACACACACTCTCTCCTGTCGCCATGTGAAAATGTCCTTGCTTCCCC
TTTGCCTTCCGCCATGACTGT gaatggtaagaaacattcttcagctcaagatggtgaccagaggcatccagcactcactt
ccttcacaaaggactcaaacagcaaatgaataatcacatgtcaagtagagcagcttaga
aagaacactggaattcagagggaaaggacaaggaacttcggaaacatgcaaagagaatg
atgtgaagcagccggcccagccaggatcagctcagatccaagagaaactgcccaacgta
gggaaaaggtaaatgagagatccccgcaaggctgcattcccaccacagactcctgtggc
cctagccacagagagccccttggccctcatgggctttgagactagtatagagagccgcc
tgcattgttccaaagagggattttatgatgggtcctacacatcctctgagacctgagca
gctgcagcacagcaccattttgagagcccacccctgaccagaccccatcccgccctggg
gctcaacagcccctgcatctccacatccatggagtcctgctgacattccgccaTGTCCA
CCCAGAAGGCTGCAGCCTCACAATGCAGG[ag]TGACTGGGTCCCCAGCAATCTAGTCT
ACACATGTCctataacctgggaatgggtggtgcaccacaccagggaggctgcccctggg
acaaagggagccaaagcccatgtttcccagagccgcagagctgcccgcctgggaccact
gccactgacagcacccccaccatccccccagcagcggggtcactgtgcacttgtgatat
ggtttggctgtgtccccacccaaatctcatctccagttgtaatccaaattgtaatcccc
acgtgtcaggggagggacctggtgggaggtcattggattacaggggcggtttcctccat
gttgttctcatgatagtgagtaaattctcatgagatctgatggttttataagtgtttga
tagttccttcttcacacacactctctcctgtcgccatgtgaaaatgtccttgcttcccc
tttgccttccgccatgactgt

FIGURE 10q

41646 (SEQ ID NO:17)
CACCTCCCTTAACTCCCCAGCCATGCCCCGTGGGTATCTGTTTTCCCAGTTTTGTAGAT
GAAAGCACAGCTCAGAGAGGTTTACTCAGTTGCCTGGAGTCACACAGTCAACAAGTGGA
GAGCCAGTCATTGAATCTGGTACCACAAACTCTTCCTGCTGCAACAGCTGTGCTTTTGC
AGGCACTGACTTTGGAATACCCTCAGCTGATTCACAGGGTCCTTTGTCCTGGGGAATGG
CCTTCCCTGTCTCCTTCAGGGAAAGGGTTTCATCCTTCAGGGAAGATTCATTGAATCAG
GATTTGCTGGGTTTTTTTCATTTTTTTTTTTCATTTCTTTTTTTTTTACACGAATGGGC
TTCCTGGCCCGCATTTTGATTTGCGCTTGGGTTTATGAATTGAGGAATCACAGTCAGCC
TTGGGAATTAGTTGCAAGATAAATATTGCAATCCTGGTTAAGGACTTAAGAATTGTCAC
TTGTGTGTGTATATTGTTGTTGTTGTTGCAACGGT[gt]CTGTGTACGCACGGTTACAG
TGGATCAAATTTGGGGAGTTAGGAAGTGGCGTTGGTTTGTGGTTAGACTTGGGGGAGGT
GTCGCTTTCGGTTGTTGGTGTGCTGGTGGCTGTGTTCCTGTGATATGGAATGTACTGTC
TGAGAATGTGTTCAGGGGTCTGTGGTTATGTGGATATGGGTGTGTAGCTGCTGATGACA
TGGATGGAGGGATGTATCTGGGTGTGTTTCTGCAGAACAAGTGATACCTGTACCATGTG
ACTTTGTCAGTTCCACCATGTCCAGGCACAGGTCGGGGGGGTTGTCCATGGTTCTGAAC
GTATCTGCCCCCATTTTACAGATAGGAAACCAAGACTTAGAGAGGCCAAGTCATCTGCT
TGAAGTCATCTAGCTGAGAAGCGGCTGAGCCTGAAGGGAAACCAGGGCTGCCTTCAGAG
TCCAGCCTCTTTTCCCTGCTCCCCAGGAAAGGTTTTAGTAACAATAAAAGGTTTAAATG
CCAGCAAAAGGTCTAAACGCC cacctcccttaactccccagccatgccccgtgggtatctgttttcccagttttgtagat
gaaagcacagctcagagaggtttactcagttgcctggagtcacacagtcaacaagtgga
gagccagtcattgaatctggtaccacaaactcttcctgctgcaacagctgtgcttttgc
aggcactgactttggaataccctcagctgattcacagggtcctttgtcctggggaatgg
ccttccctgtctccttcagggaaagggtttcatccttcagggaagattcattgaatcag
gatttgctgggtttttttcatttttttttttcatttcttttttttttacacgaatgggc
ttcctggcccgcattttgatttgcgcttgggtttatgaattgaggaatcacagtcagcc
ttgggaattagttgcaagataaatattgcaatcctggttaaggacttaagaattgtcaC
TTGTGTGTGTATATTGTTGTTGTTGTTGCAACGGT[gt]CTGTGTACGCACGGTTACAG
TGGATCAAATTTGGGGagttaggaagtggcgttggtttgtggttagacttgggggaggt
gtcgctttcggttgttggtgtgctggtggctgtgttcctgtgatatggaatgtactgtc
tgagaatgtgttcaggggtctgtggttatgtggatatgggtgtgtagctgctgatgaca
tggatggagggatgtatctgggtgtgtttctgcagaacaagtgatacctgtaccatgtg
actttgtcagttccaccatgtccaggcacaggtcgggggggttgtccatggttctgaac
gtatctgcccccattttacagataggaaaccaagacttagagaggccaagtcatctgct
tgaagtcatctagctgagaagcggctgagcctgaagggaaaccagggctgccttcagag
tccagcctcttttccctgctccccaggaaaggttttagtaacaataaaaggtttaaatg
ccagcaaaaggtctaaacgcc

FIGURE 10r

44901 (SEQ ID NO:18)
TTGCCCCACAGACAAGATGATCCCCCCTGGCATGTTGTTAGGGGCAAATTGCTGTCCTG
CTCAGAGTGGCATCTTTCAATGTTGCCTCCATCTTGGCCAAGAGGTCCCTGCCTCCTGA
TCCGGCACAGCTGAGCTGAGGCAGATGTGACCAGTTTTCAAGCTACCAGCCCTGGGCAG
AGGAAGATGTCAACAATTCCAGAGCAGAGGGAAGAGGCACCTTCCTTGACCACACCAGT
GGCCTCCTGAAGTTCCATGCTTTTAAGAGCTGGGACCTTGGGAGGATGATTCAAACCCT
CAATTCCTCCTCCCTGGGAACTTTTTACCACCTTTACCTATTTATCAAAATCATATTCA
TCTTTACCATCACTGTCACTGTAATCTACATTCCATCACCTTTATCAGGTGCTGCTGAG
TACAAAGCACTTGGGATGGGAGACACAGCACTGAATTCACAAACATTGGACCAAACTGT
TTGTCCCCATCTGGGTTCATGAGGCCACCTCTTTGCTCAATCCATGCCTCTTGCCCTCA
GTCAACAAGACATTCCTAGAGGGAAAGGG[ct]TGCTGCTCTGGGAGTCAACCTGAGTT
CCTCCCTCCTGGGAAGCTGGGTTGGCAAGATTCTAGGACACTCACCTGCATGGACATCA
CCTCTGTGACAAATGCTTACCTGTTTCTCATCTTCAGACTTGGCGATATCAAGCCTGTT
CTGGACCATGACCAGGCTGGCTCATATCTCTGGTTTAGAGAAACCTATGAATAACTGGG
GACAAACAGACTCTTTGGTAGCAGCAGACACATGTGATCCATCAAGATCAACCAAGGTT
GCAACTGGAGCGTCCACTGCCAGAGACCTTTGGCTCTTCAAGCTCGGGACAAAAAAGAA
GACTCTGTTGTCCCTTGGTAACCCAGTCCCTGCTTTTGTAGCTATCACAGCAGAAAGCA
ACTCTTCCTGAAGACCAAACACTCGTCATCCACATTCCTTGAATGGCCAATCCTTCCAT
CTGGAGGCCTGGCTCAGAAAG ttgccccacagacaagatgatcccccctggcatgttgttaggggcaaattgctgtcctg
ctcagagtggcatctttcaatgttgcctccatcttggccaagaggtccctgcctcctga
tccggcacagctgagctgaggcagatgtgaccagttttcaagctaccagccctgggcag
aggaagatgtcaacaattccagagcagagggaagaggcaccttccttgaccacaccagt
ggcctcctgaagttccatgcttttaagagctgggaccttgggaggatgattcaaaccct
caattcctcctccctgggaactttttaccacctttacctatttatcaaaatcatattca
tctttaccatcactgtcactgtaatctacattccatcacctttatcaggtgctgctgag
tacaaagcacttgggatgggagacacagcactgaattcacaaacattggaccaaactgt
ttgtccccatctgggttcatgaggccacctctttgctcaatccatgcctcttgccctcA
GTCAACAAGACATTCCTAGAGGGAAAGGG[ct]TGCTGCTCTGGGAGTCAACCTGAGTT
CCTCcctcctgggaagctgggttggcaagattctaggacactcacctgcatggacatca
cctctgtgacaaatgcttacctgtttctcatcttcagacttggcgatatcaagcctgtt
ctggaccatgaccaggctggctcatatctctggtttagagaaacctatgaataactggg
gacaaacagactctttggtagcagcagacacatgtgatccatcaagatcaaccaaggtt
gcaactggagcgtccactgccagagacctttggctcttcaagctcgggacaaaaaagaa
gactctgttgtcccttggtaacccagtccctgcttttgtagctatcacagcagaaagca
actcttcctgaagaccaaacactcgtcatccacattccttgaatggccaatccttccat
ctggaggcctggctcagaaag

FIGURE 10s

44907 (SEQ ID NO:19)
GTTTGATGGGACAAGATAGGACAGTGGTTAAGAGTGTGACCTCAGCAGCTGACTGCCTG
GGTGTAAAGCCTACCATGTGGTCAAGCACACGGGTGGCTCTACCACTTACCAACCATGT
GACCTTGGGCGGTTAACAGCCCTGTGACTCGGTTTCCCCATCTGAAAAGTGAGGATCAT
AGCAGTATCTACCTCCTGCGGTGGTCGGAAGGCAGAAAAGAATTGGCACATGTGAAAGT
ACTTAGCACAGGCTTGGTGCATAGCAAGTCCTGAGGAAATGTATTCACTGTCATCAGTT
TCACCCGCTTTGAAAGGCAGGCAAAGAAAGCACCTGACAAAACCTTTTGATCCCCCACG
CCTTGTCTCCCACACCCAGGACATTCCCCTGACTCCCATCTTCACGGACACCGTGATAT
TCCGGATTGCTCCGTGGATCATGACCCCCAACATCCTGCCTCCCGTGTCGGTGTTTGTG
TGCTGGTAAGGGGTGACCCCAGCCTGGAGAGGCAGCGTGGCAGAGTGGCCAAGGGCCGA
GTCAGATGGACATGAGTCTAGTTCCTGGC[ct]CCGTCACTTACCACTGTGTTACCTTG
AGCAACTCTCTTGGCCTCTCTGAAATGCCCACATCGTAGAGTCACTGTGAGAATTAAAT
GAGATGAAGCAGGCAAAGCATTTATCCAAGGCCCAGCACACAGGGTATGCTCTAAAAAT
AATAGCTGCCATTCTGTTCTCTTGCTTAACCCTCTACCAGGCAGTTAGCAACCTCCTAT
GCAGTGGAAATGCAGCTCATCTGACTCATTCATTAAACAGACTTTTATTGACCACCTAT
TATGAGCTAGGTCCACAACAGCAAGATGAGAACCAAGGGAAAAAGTGCCTGTGATTAGA
TGGCTAGCAACCCAAAAGGGACCCTTGGGGTCCTCACGTCCATCCCATCTTCATGCCAG
GCAGAGCTCTTCTTTGAAAATCTGTGGAGTCAGAGGTGTAAGGCATTGGGACAGGTGGG
GGTGAGAGTTCCCCCCCTCAT gtttgatgggacaagataggacagtggttaagagtgtgacctcagcagctgactgcctg
ggtgtaaagcctaccatgtggtcaagcacacgggtggctctaccacttaccaaccatgt
gaccttgggcggttaacagccctgtgactcggtttccccatctgaaaagtgaggatcat
agcagtatctacctcctgcggtggtcggaaggcagaaaagaattggcacatgtgaaagt
acttagcacaggcttggtgcatagcaagtcctgaggaaatgtattcactgtcatcagtt
tcacccgctttgaaaggcaggcaaagaaagcacctgacaaaaccttttgatcccccacg
ccttgtctcccacacccaggacattcccctgactcccatcttcacggacaccgtgatat
tccggattgctccgtggatcatgacccccaacatcctgcctcccgtgtcggtgtttgtg
tgctggtaaggggtgaccccagcctggagaggcagcgtggcagagtggcCAAGGGCCGA
GTCAGATGGACATGAGTCTAGTTCCTGGC[ct]CCGTCACTTACCACTGTGTTACCTTG
AGCAACTCTCTTGgcctctctgaaatgcccacatcgtagagtcactgtgagaattaaat
gagatgaagcaggcaaagcatttatccaaggcccagcacacagggtatgctctaaaaat
aatagctgccattctgttctcttgcttaaccctctaccaggcagttagcaacctcctat
gcagtggaaatgcagctcatctgactcattcattaaacagacttttattgaccacctat
tatgagctaggtccacaacagcaagatgagaaccaagggaaaaagtgcctgtgattaga
tggctagcaacccaaaagggacccttggggtcctcacgtccatcccatcttcatgccag
gcagagctcttctttgaaaatctgtggagtcagaggtgtaaggcattgggacaggtggg
ggtgagagttccccccctcat

FIGURE 10t

44927 (SEQ ID NO:20)
GCCCTGCCCTGTAGTGGCTTCTCAATGAATATGTAGTTGCCTTATTCTCACAAACACCA
GGCTTTCCTCACATCAGCACCCGGTGTGATAGGTAAGAGTGTGTGATACTAGAAACGTC
AGCTTATCCAAAAATGTATTTCTTTCTCTCATGAGAGCCTCGTGAGCTCTCCAGCTTGC
TGGAACTTTCTAAGACCTAACACTTGCCAAATTCCTTGCAGCAATTGTCTGGTTTGTGG
TACCACAATCGAACCCACCACCCTGACGTATTTGCTGCTCAGAACCACCGATCTTCCAA
GTTCTCATCACTCCAGTGCAGCTCCTGTGACAAAACCTTCCCCAACACCATTGAGCACA
AGAAGCACATCAAAGCAGAACATGCAGGTGGAGTTTGGGTACCGCCGGCAGAGAGCGGG
AGGGGCTTGATGGTGTAGCCTCCTGGGCCCCACCAGAAATCCCCACTTCTAATAGTCTA
GTGTGATGTGCAGTGGTCATTGCCTTTGTTCTGCCCCAGCGCACCTGTCCGTAGCAGCA
GCAGTCAGTAGCAGCAGCTTGAGTGGCAG[ct]GGTTCTCAAACCTGGAAGCGTAGCGC
AGTGTAAGCTCCCACCAGCCCTGAGTGAGAGCTTGTTGGGGCACCTGGGAAGGGTGTCA
GCCTCAGTGGTAGGCAGGCCTGAGTGGAAATCCTGATTCCAGCACTTATCAGCTACATG
ACCTTGGCAAGTGACTTCCCTTTTCTGAGCCTGTTTCCTTCTCTCCAGGATGGCAGTTA
TTAAAACCTACTTTGCAGGTAAATTTGGTGATAATCACAACAGCTGTCAGTTACAGAGT
GTTTCCTATGTGCAAGACACCATGCTAAGCACCTCGTGTATATTTTCTCATTTCATTCT
CACAACATCCCTCTGAGCATCCAGGCAGTCTGGATCCAGATCTCATGCTCTTTACCACT
AGATTGTACAAATATACCATAGGTTATAAGATTCCTGGCACTTGGTAGATGCTTGCTAA
GTATTGGCCATCGCCCCAACC gccctgccctgtagtggcttctcaatgaatatgtagttgccttattctcacaaacacca
ggctttcctcacatcagcacccggtgtgataggtaagagtgtgtgatactagaaacgtc
agcttatccaaaaatgtatttctttctctcatgagagcctcgtgagctctccagcttgc
tggaactttctaagacctaacacttgccaaattccttgcagcaattgtctggtttgtgg
taccacaatcgaacccaccaccctgacgtatttgctgctcagaaccaccgatcttccaa
gttctcatcactccagtgcagctcctgtgacaaaaccttccccaacaccattgagcaca
agaagcacatcaaagcagaacatgcaggtggagtttgggtaccgccggcagagagcggg
aggggcttgatggtgtagcctcctgggccccaccagaaatccccacttctaatagtcta
gtgtgatgtgcagtggtcattgcctttgttctgccccagcgcacctgtccgtagcagCA
GCAGTCAGTAGCAGCAGCTTGAGTGGCAG[ct]GGTTCTCAAACCTGGAAGCGTAGCGC
AGTGTaagctcccaccagccctgagtgagagcttgttggggcacctgggaagggtgtca
gcctcagtggtaggcaggcctgagtggaaatcctgattccagcacttatcagctacatg
accttggcaagtgacttcccttttctgagcctgtttccttctctccaggatggcagtta
ttaaaacctactttgcaggtaaatttggtgataatcacaacagctgtcagttacagagt
gtttcctatgtgcaagacaccatgctaagcacctcgtgtatattttctcatttcattct
cacaacatccctctgagcatccaggcagtctggatccagatctcatgctctttaccact
agattgtacaaatataccataggttataagattcctggcacttggtagatgcttgctaa
gtattggccatcgccccaacc

FIGURE 10u

45046 (SEQ ID NO:21)
TAAATTTCTTACAAGGTCTCTTCTAGTTCTAATTTTTTAAAAAATGTTATGACCTCTGC
CCAGATTTTTTGTCTCACTGGAATTTTATGAAATCAAATAGTTTGTAAGTGGACCATTA
TAGGACTGTTTTGCCCAGTTCTTTGTTGTAAGGGTGTTTGACCGGTTGAATCATGGTAT
TTAAAAAATTCTTATACAACTCCAGATCTAATGGTAGGCTAAGTTGTGGTGATGCTTAT
ACTCAGTGATATTGGGTGTGTATTATAAGAATGAAGAGAGCGGAGAACAAACATAAACA
TTAATGTTAATGACAAACATTAACCCAAGTACAAGGTTAATGTTTAGTCAATATAGCAA
ACATGTAATTTACAAGATTAAAAATAATTAGGCTTGTGATAAAGTCAATGAATTTCCTA
CGTAATTGTAACATTAGACTGTTTTATTATTTGTCCTGACATTTTGCAGAATCCAAGAT
TAATTAAAGAAATGGTTTCAAGAAGAGGGTGAATACTATAAAAATAGACTTACCTTCCT
GAATTGAGGAATTCATCAGGAAAGCCTCA[ag]GTGTGCAAATGAGCCATCCTTCCAGA
GGGAAATTTCTTAGAATTATCCCACGATTTGAGCCAAAGCACTTCCGATAGAATTTTTA
ACCTCTAGTTGGTTCTGCTCCTTCCATTTTTACTAATTTTTAAGAAAATACTATGACTT
ATAATTGTATCTGGAATGATTATCAACTCCTTTTCATCCACTGACTTAAATTTGATTAT
AAATATGCTTTACATAAAGATCTAGACCTTATAATTTGAATTCAAGTGAATTGTTGTGA
CTAGCATGTAAATTATTATTATGGATTGTAAATCTTAACATAGGTAGTTCTGTGCCCTT
AAATTGATAAACCAGTTATCTCTTGTAATCATGTGTACTAAGATATACGTAGTAAAGTG
ATTGTATCAGTTTTTATCATAAGCAGTCATAGTTCAGATAGTTCAGAAGTTTAGTGTCT
GCTGTTTCTATTAGGAAAGTG taaatttcttacaaggtctcttctagttctaattttttaaaaaatgttatgacctctgc
ccagattttttgtctcactggaattttatgaaatcaaatagtttgtaagtggaccatta
taggactgttttgcccagttctttgttgtaagggtgtttgaccggttgaatcatggtat
ttaaaaaattcttatacaactccagatctaatggtaggctaagttgtggtgatgcttat
actcagtgatattgggtgtgtattataagaatgaagagagcggagaacaaacataaaca
ttaatgttaatgacaaacattaacccaagtacaaggttaatgtttagtcaatatagcaa
acatgtaatttacaagattaaaaataattaggcttgtgataaagtcaatgaatttccta
cgtaattgtaacattagactgttttattatttgtcctgacattttgcagaatccaagat
taattaaagaaatggtttcaagaagagggtgaatactataaaaatagacttaccttcct
gAATTGAGGAATTCATCAGGAAAGCCTCA[ag]GTGTGCAAATGAGCCATCCTTCCAGA
GGgaaatttcttagaattatcccacgatttgagccaaagcacttccgatagaattttta
acctctagttggttctgctccttccatttttactaatttttaagaaaatactatgactt
ataattgtatctggaatgattatcaactccttttcatccactgacttaaatttgattat
aaatatgctttacataaagatctagaccttataatttgaattcaagtgaattgttgtga
ctagcatgtaaattattattatggattgtaaatcttaacataggtagttctgtgccctt
aaattgataaaccagttatctcttgtaatcatgtgtactaagatatacgtagtaaagtg
attgtatcagtttttatcataagcagtcatagttcagatagttcagaagtttagtgtct
gctgtttctattaggaaagtg

FIGURE 10v

45076 (SEQ ID NO:22)
ACTTGGTGACTTTCTCTGCACCAGGTGAGCCCCTAGTCTACACTGCACTGCACCCCCCC
CCCACCCCGGCGCACGCACACACACACACACACACACACACACACACACACACACAGGC
ATGCACAGGCCCTCCTGTGAGAGATAGCCCTAAGGAGGGAACCGTCCCTAGAGCCGGTC
CCCAGCCGCTCGGCACTTCCCGCCCACGCGCCCGGTCCCACAGTGCAGCGGACCCTCAC
TCACCCCGCGGATGTCCCAGTACCCCAGTGTCATGGACATGATGCTGGTTGGTGTCGAT
TCTGCAGACAGGCCTCAGCTGGGCTGAACTGCGACCTCCTCTGGGGTTCCCGGCACGCA
GGGGCTGGACCTAGCGCCAGACCCGCCCCCTCGGCCCCGCTGCGCCCGCCGATCTTCAA
GGTCGTCACTTCCAACCGGCCGATCTTCAAGGTCGTCACTTCCAACCAACAGGCGCGGG
AGGCACGGAGCAGGTTGCTGGATCCTCACTGGCTGGAAGGAGTAAGATCCACCGCCACC
TCCGAGTGTTCAGGGAGCAAGGTCCGGAA[cg]CACTAGGAGGGGCTCGGCCTCGCCAG
CTTCCGTAGCCCCGCCCCGCCCCGCTCCGCTTCGGACCTCTGCTGGGTCCCCAGGGACT
CGGCTGTGCGCGTGAGAGTAAAGCCAGATCGTAAGAGAAAAGTTCTTCCCCCGTTTCTT
CTTCTCCGGACGTCGCCCAGCCTTCTGCCTCTCGGCTGCCGAGTTCCCACAGGCTCTGG
GAGACTGAGGCTGCCAGGGTCAGACTAAAGAGAGGTCTCAGAGAGTTTAATTCAACACT
TCTTGGCTACTAAGTCTTAGAAGTCTGATGGTGTGCTCTCTCTGCTGAGTTGGGGAGCG
TGAATGGAGGCTATGTCACCGAAGCTGATAGAGCTCAGTCTCTGTTGCAGATGCTCCCG
ACCCTTTTGCATTGGGCCAGTTCCCCAGCTCTGAGACTGGGTCCAGGCTCAGGAAGTGG
CCTATGTGTCAAGGTGGATTC acttggtgactttctctgcaccaggtgagcccctagtctacactgcactgcaccccccc
cccaccccggcgcacgcacacacacacacacacacacacacacacacacacacacaggc
atgcacaggccctcctgtgagagatagccctaaggagggaaccgtccctagagccggtc
cccagccgctcggcacttcccgcccacgcgcccggtcccacagtgcagcggaccctcac
tcaccccgcggatgtcccagtaccccagtgtcatggacatgatgctggttggtgtcgat
tctgcagacaggcctcagctgggctgaactgcgacctcctctggggttcccggcacgca
ggggctggacctagcgccagacccgccccctcggccccgctgcgcccgccgatcttcaa
ggtcgtcacttccaaccggccgatcttcaaggtcgtcacttccaaccaacaggcgcggg
aggcacggagcaggttgctggatcctcactggctggaaggagtaagatccaccgccacc
tccgagTGTTCAGGGAGCAAGGTCCGGAA[cg]CACTAGGAGGGGCTCGGCCTCGCcag
cttccgtagccccgccccgccccgctccgcttcggacctctgctgggtccccagggact
cggctgtgcgcgtgagagtaaagccagatcgtaagagaaaagttcttcccccgtttctt
cttctccggacgtcgcccagccttctgcctctcggctgccgagttcccacaggctctgg
gagactgaggctgccagggtcagactaaagagaggtctcagagagtttaattcaacact
tcttggctactaagtcttagaagtctgatggtgtgctctctctgctgagttggggagcg
tgaatggaggctatgtcaccgaagctgatagagctcagtctctgttgcagatgctcccg
acccttttgcattgggccagttccccagctctgagactgggtccaggctcaggaagtgg
cctatgtgtcaaggtggattc

FIGURE 10w

45080 (SEQ ID NO:23)
GAATGGTCATTTTTGATGTTTTGTTGTTGTTGCTATTTTCGTTGTTGAGGATAACTATA
ATTTTTTGTGCCAAAAATGTGGCAAACCTTTCTATGGGGAAAACGATAGAAATGGCACT
TAACCCTAACCCATTGGACATAATCTATTATCTGTTTTTACTAAAATCCACTGAACCTG
TAGAAATCTTAGATTAATCAGAAACACACTCTTTTCTTGTGCTTCTCAATAAATAATTG
AATTGTTTTTGCCCAGGAATTACCCCTGAGCAACTAAAATGTTTACCTTCCTGCAGTTA
TAAAAATCTCGGTGGGGGTTGTTTTTCAGCTCCTTTAACTCGTCCATCTCGTTAAGCAT
CTGATGGACCTGGAACTTGGAGGAGAGGAACTTCAGGCGCCGGTGGGTATAGGTCTTAC
TGTGAAAAATAAAATCACATAATTCCAAAAAGTTTCAGGCATTCAAGAAAAACAGTCAC
AATTTCAAAACTATCAGGACCTTTATCATTCATAGGAAATAATTGTTGGAACAAACCTT
TTAGTTTACTCTGCAGTTAATCCCACTGA[ga]AAGTAGTGGGCTCCAAAGGCTTAATC
TTTTCAATAATGTTGGACATAAGAATGAGGGAGAACTTGGAAAGGTATCTTAAAACTCA
ATGGAGAGAGTGTTATTCAAAGTTTGGGGTCAGCAGATTCGAGTGTGAATCCTGGCTCA
GCCAGCTGTGTCACTTTAGGCAAGTTACTTAAGTCATCAAAGTCTCAGCTCATAAAACT
GGAATTATGAAAATAACCACCTCACAGTGAAAAGTGTAAGCAATAAAAGGAACAATGTG
CATGAAGGGCTTAATACAGTGTTTGAACATAGTAAGCATTTAGTAAATACTTAGTCTCA
CTATCAGTAGAAGTAGTACTAGTTGTTGTTTAGGTCTTGTAGTACTAGTTGTTGTTGTT
TAGGTCTCACTAAACACTTACACAGGTCCTTGAGCAATTAAAGCAAGTAAAAAATTCAT
ATCGTCTAAGAAGGTGTCCAG gaatggtcatttttgatgttttgttgttgttgctattttcgttgttgaggataactata
atttttttgtgccaaaaatgtggcaaacctttctatggggaaaacgatagaaatggcact
taaccctaacccattggacataatctattatctgtttttactaaaatccactgaacctg
tagaaatcttagattaatcagaaacacactcttttcttgtgcttctcaataaataattg
aattgtttttgcccaggaattacccctgagcaactaaaatgtttaccttcctgcagtta
taaaaatctcggtgggggttgtttttcagctcctttaactcgtccatctcgttaagcat
ctgatggacctggaacttggaggagaggaacttcaggcgccggtgggtataggtcttac
tgtgaaaaataaaatcacataattccaaaaagtttcaggcattcaagaaaaacagtcac
aatttcaaaactatcaggacctttatcattcataggaaataattgttGGAACAAACCTT
TTAGTTTACTCTGCAGTTAATCCCACTGA[ga]AAGTAGTGGGCTCCAAAGGCTTAATC
TTTTCAATAATGTTGgacataagaatgagggagaacttggaaaggtatcttaaaactca
atggagagagtgttattcaaagtttggggtcagcagattcgagtgtgaatcctggctca
gccagctgtgtcactttaggcaagttacttaagtcatcaaagtctcagctcataaaact
ggaattatgaaaataaccacctcacagtgaaaagtgtaagcaataaaaggaacaatgtg
catgaagggcttaatacagtgtttgaacatagtaagcatttagtaaatacttagtctca
ctatcagtagaagtagtactagttgttgtttaggtcttgtagtactagttgttgttgtt
taggtctcactaaacacttacacaggtccttgagcaattaaagcaagtaaaaaattcat
atcgtctaagaaggtgtccag

FIGURE 10x

47848 (SEQ ID NO:24)
GAAAGCTGAGAAAGAGGCACACCAAGACTAAGGGAAAGAGGCCGGGAAGGGTAAAAAGG
TGAAATGAAAAGAGGTTGGTGAATGACTAAGAACGGTTGGATAGGACAAATAAGTTCCA
ATGTTCGATAGCAGACGAGGGTGACTACAGTTAGCAATATATTGTATATTTCAAAGTAG
CTAGAAGACTTAAAATGTTATCAACACATAGAAATGAAATATACCTAAGGTGATGTATC
CTTCAAATACCCGGACTTGATCATTACACATTCCGGGCATGTAAAAAACGCTTCCATGT
ACCCCATTTCATAAATATGTAAAATATTATGTATCATTAAAAGAAAGAACAAAAAAGAC
AGGGAAAATGCATATGCTGTGCTCCACTCAGCCAACAAACTTCTGCTCTAAGCAGGGAT
ATTGATTCCAAAGGCTAGCTTGCGTTTCTTAAAAATAATTAAAAACAACAACATGTCAT
TTATTTCAGAGCTGGAGGCTAGAAATAAATTACTCAAATCTCGCAACTATGTAAACTAT
GAAAATGAAACAAGCTAGTTACCTTTTAT[tc]GTTCAGTTTAAAAAAGTTCTTCTTCT
TTGCTCCTCCATTGCGGTCCCCTTCAAGATCCATTCCGACCTGAAGAGAAACCGCAGCT
CATTAGCCAAATGCATGAGCCTCAGGCGCGCTGGAGGTGAGACTAACCTCTAGTCCCCC
GTCGAAGCCAGAGAGCAGTAAGAGGGAGCGCCCGCCGTTGATGCCCCAGCTGCTCTGGC
CGCGATGGGCACTGCAGGGGCTTTCCTGTGCGCGGGGTCTCCAGCATCTCCACGAAGGC
AGAGTTGGGGGTCTGGCAGCGCGTTCTGGACTTTGCCCGCCGCCAGTGCGATTCTCCCT
CCCGGTTCCAGTCGCCGCGGACGATGCTTCCTCCCACCCACCGCCCGCGGGCTCAGAGA
GCAGGTCCCCGCACCGCGCGGGCTGTGCGCGCTCCGGGCAACATGGTCCAGTGCCACTA
CGGTTTGGGCGCTGCTCCAGG gaaagctgagaaagaggcacaccaagactaagggaaagaggccgggaagggtaaaaagg
tgaaatgaaaagaggttggtgaatgactaagaacggttggataggacaaataagttcca
atgttcgatagcagacgagggtgactacagttagcaatatattgtatatttcaaagtag
ctagaagacttaaaatgttatcaacacatagaaatgaaatatacctaaggtgatgtatc
cttcaaatacccggacttgatcattacacattccgggcatgtaaaaaacgcttccatgt
accccatttcataaatatgtaaaatattatgtatcattaaaagaaagaacaaaaaagac
agggaaaatgcatatgctgtgctccactcagccaacaaacttctgctctaagcagggat
attgattccaaaggctagcttgcgtttcttaaaaataattaaaaacaacaacatgtcat
ttatttcagagctggaggctagaaataaattactcaaatctcGCAACTATGTAAACTAT
GAAAATGAAACAAGCTAGTTACCTTTTAT[tc]GTTCAGTTTAAAAAAGTTCTTCTTCT
TTGCTCCTCCATTGCGGTCCccttcaagatccattccgacctgaagagaaaccgcagct
cattagccaaatgcatgagcctcaggcgcgctggaggtgagactaacctctagtccccc
gtcgaagccagagagcagtaagagggagcgcccgccgttgatgccccagctgctctggc
cgcgatgggcactgcaggggctttcctgtgcgcggggtctccagcatctccacgaaggc
agagttgggggtctggcagcgcgttctggactttgcccgccgccagtgcgattctccct
cccggttccagtcgccgcggacgatgcttcctcccacccaccgcccgcgggctcagaga
gcaggtccccgcaccgcgcgggctgtgcgcgctccgggcaacatggtccagtgccacta
cggtttgggcgctgctccagg

FIGURE 10y

47850 (SEQ ID NO:25)
GTGAGTTTTGAGGCTTGGGAGAGAGCTGCAAGGAGGAAGAAGGAAGAGAAATAGGGGAG
AGACATGGGGAGAGACAGTCATGCCTACTTCCTCAGCAGGCCAGAAGCAGCATGTGCAG
GTGGGGACCCAGACTCTGTACTTGGACTTAAAGTGAAAGGCTTTCCAGATATTGTACTT
ACCCCTAAGGCTGACAAAGGTGGAGCCTCAAGCCTATAGCTTTGGATCAAGACAATTGT
TCCAGTTCTCCTATCCCAGAAATGTTCCTCTCTCCTAAACCTGAAGTGGTCGAACACTT
TCATCCCTTCCTCACAAGGAGGGTCAGGTGATCAGGTAAAGGTAACAACTAACCCAAAC
AGGAAGTGTGGCCAGATGCTTGTATACAGGTAAGGGTGTGATTTGGTTGCTAATTTCTC
TTCACTTCTGGGAGACCAGCCCCTTATAAATCAAACTATAGGCCAGAGAGGCTGCCACA
TGCTCCCAGGCTGTTTATTTGAAGAGAGACTTACATTAGGCAGTGACTCGATGAAGGCA
TGTATGTTGGCCTCCTTTGCTGCCCTCAC[ga]ATCTCTTCCTGTGACACCACCCGGCT
GTTGTCTCCATAGGCAATGTTCTCAGCAATGCTGCAGTCAAACAGGATGGGCTCCTGGG
ACACGATGCCCAGGTGTGCTCGGAGCCACTGAACATTCAGTCGCTTTATTTCTTTGCCA
TCAAGCAGCTGAAAACAAGAGTTCACAGATCAACTTCAGGACCAGCACACTTTGAATGT
AGCACAATTAACATCATTATTTCTTACACTGAAACTGCCAAGTTACTGTGAGATTAAGG
AAAAGTTTGTGTGATTAAAATTTGGATAGTGAAGGTTAACCCAACAAGGTCATAATTGT
ATGCCTTGAGGAACTGTCATGTTTCCTGTGTTTCAACCATGGTTTCTGATGTATGCATG
TGGTAGGCAGAATAATGTTCCCTCTCCCACAAGACATCTGTGTCCTAATCCCTGGATCC
TGTGAATGTGTTATGTTACAT gtgagttttgaggcttgggagagagctgcaaggaggaagaaggaagagaaataggggag
agacatggggagagacagtcatgcctacttcctcagcaggccagaagcagcatgtgcag
gtggggacccagactctgtacttggacttaaagtgaaaggctttccagatattgtactt
acccctaaggctgacaaaggtggagcctcaagcctatagctttggatcaagacaattgt
tccagttctcctatcccagaaatgttcctctctcctaaacctgaagtggtcgaacactt
tcatcccttcctcacaaggagggtcaggtgatcaggtaaaggtaacaactaacccaaac
aggaagtgtggccagatgcttgtatacaggtaagggtgtgatttggttgctaatttctc
ttcacttctgggagaccagccccttataaatcaaactataggccagagaggctgccaca
tgctcccaggctgtttatttgaagagagacttacattaggcagtgactcgatgaaggcA
TGTATGTTGGCCTCCTTTGCTGCCCTCAC[ga]ATCTCTTCCTGTGACACCACCCGGCT
GTTGtctccataggcaatgttctcagcaatgctgcagtcaaacaggatgggctcctggg
acacgatgcccaggtgtgctcggagccactgaacattcagtcgctttatttctttgcca
tcaagcagctgaaaacaagagttcacagatcaacttcaggaccagcacactttgaatgt
agcacaattaacatcattatttcttacactgaaactgccaagttactgtgagattaagg
aaaagtttgtgtgattaaaatttggatagtgaaggttaacccaacaaggtcataattgt
atgccttgaggaactgtcatgtttcctgtgtttcaaccatggtttctgatgtatgcatg
tggtaggcagaataatgttccctctcccacaagacatctgtgtcctaatccctggatcc
tgtgaatgtgttatgttacat

FIGURE 10z

47852 (SEQ ID NO:26)
GCCTTGCCTTCCCCCAGGCAGGTTTGAGAGGTCTGGGTCTCAACTGACTGGGGCAGCAG
GACCTCATCCCCTCCCTGCCCTACACCCAGCCTGCCCCAGCCCTGCAGTCTGTTGTTCC
TTAGTCAGGGAGGAGCCCAAAAGTGTGACCAAACCAAGGGAACACTCAACTTCTGGCTT
CCTCCCTCTTTGGGTAGCCCTCAAGCCACTGGACTTTGAAGTCAGCAGGTAATTCTCCA
AATGGAAGAACTTTTTTTTTTTTTTTAAAAGCAGAGCCAAGGAAGCCACATTTTGAGT
GATGTGGTTTTTGAAGAAAAAAGAAAAAGAGATCCCAGATAAAAATGATCTTATGTGAA
GGGAGTAAATGGATGCACAGAAACAGCAGCAGCTCCCGAGCCACCTGGTGGAGCACAGG
GGCCCTCCCTGGCCTCCCCCAACACTGGGGCTGGGGTCTGGGGGCTGCCCAGCAGGGTG
ATGTGGCTCCCTTGGGCCTGAGAGCACCCTGGAGGGAGTTGACCCTGGGGGGCAATGTT
CCCAGGACGCAGTACCTGATATCCAAGTC[ga]GTCGCTGTCTCCCGCTCTGGGCTGCA
GCAGGGGAGGAAAGGCATACTGAGCTCTCATGGGAGTGAACCATATCCTCCAGGAAGAT
CCTGAGCTCCCTCCAACCCAACATGAGCATGCCTTTACAATCCCCTGGACCCAGTCTGT
AGCCACAAATGCTGCATAGAGAGGTGTGGAGAGTGGGGTGTGCCCATCTTGGGGAAGCC
TCTGCTGCCTGACCACGTGGGTGTGTGAGGAGGGCCCTGGAGGACCCAGTTAAGAGGGA
GAATGGGGAGAGGTGCCATTGGTGCAGGCTCTGGGGGGAAAACTTGTCAGATCAGGAGT
ATGAAGCCCGCAATGTGGCTCCTCCAGACCCAGCCTCTGCATTCAGGTTGGAATGAATA
GGCTGAGGTCTGAGGCTGATACAGCTGCACAAACAGCTGGGGCAAGGAGTGCTCTGGAC
AGAGCCAGGCCAGGCCAGGCA gccttgccttcccccaggcaggtttgagaggtctgggtctcaactgactggggcagcag
gacctcatcccctccctgccctacacccagcctgccccagccctgcagtctgttgttcc
ttagtcagggaggagcccaaaagtgtgaccaaaccaagggaacactcaacttctggctt
cctccctctttgggtagccctcaagccactggactttgaagtcagcaggtaattctcca
aatggaagaacttttttttttttttttaaaagcagagccaaggaagccacattttgagt
gatgtggtttttgaagaaaaaagaaaaagagatcccagataaaaatgatcttatgtgaa
gggagtaaatggatgcacagaaacagcagcagctcccgagccacctggtggagcacagg
ggccctccctggcctcccccaacactggggctggggtctgggggctgcccagcagggtg
atgtggctcccttgggcctgagagcaccctggagggagttgaccctggggggcaatgtt
cccagGACGCAGTACCTGATATCCAAGTC[ga]GTCGCTGTCTCCCGCTCTGGGCTGca
gcaggggaggaaaggcatactgagctctcatgggagtgaaccatatcctccaggaagat
cctgagctccctccaacccaacatgagcatgcctttacaatcccctggacccagtctgt
agccacaaatgctgcatagagaggtgtggagagtggggtgtgcccatcttggggaagcc
tctgctgcctgaccacgtgggtgtgtgaggagggccctggaggacccagttaagaggga
gaatggggagaggtgccattggtgcaggctctggggggaaaacttgtcagatcaggagt
atgaagcccgcaatgtggctcctccagacccagcctctgcattcaggttggaatgaata
ggctgaggtctgaggctgatacagctgcacaaacagctggggcaaggagtgctctggac
agagccaggccaggccaggca

FIGURE 10aa

47854 (SEQ ID NO:27)
TGTCAGGCAAGATTCAAATCAAAATAATTAATTTTAAATGACATGCATACTTTTTGGAG
AGAAAAGTTTGGGTTACAATTAGCCAATCTGTTAAAACTCAAAGAAATCTAATCCAAAC
GTAATACACATGTCTGTACCATTTTTTTAGCCTATTCTCTCTTCAGACTTATACTTAA
TCACAAATAACATTCTTCTTTCTATTAATTAATTCCAAAAACTGGCTCACAGCCATATA
TGACAGTCATTTATTGCTACTAGGGACATAAAATTTCTAAATAATCAGAAATCCACGTT
GTCATTTATGAATATTCTCTCTCCTTGCAAACCAAAAAAATCATCTTTAACCTTACCTG
ATAGATTTTGGCATCCCTCATTAGTTTTCTACAGGATATTCTGTATTAAATCCATTGC
CTCCAAGTATCTGCACAGCATCAGTAGCTAACTGATTTGCAATATCTCCAGCAAATGCC
TTTGCAATAGAAGCATAATAGGTATTTCGACGACCAGAATCAACCTCCCAAGCTGCTCT
CTGGTAACTCATTCTAGCTAGTTCAACTT[tc]CATTGCCATTTCAGCCAGCATAAATG
ATATTGCTTGGTGCTAGAATTAAAAAGAAAAAAATTAAAGGATATTTATTGAGAAAACT
TAAAAGTTTTTTCCTGGGGCTTTTTCATTTTTATAGTGACGGGGTCTTGCTATGTTGCC
CAGGCTGGTCTGCAACTCCTGGCCTCAAGCAATCCTCCTACTTAGGCCTCTCAAAGTGC
TGAGATTACAGGCGTGAGCCACTGTGCCTGACCTTTTTATTTTTTAAACTTTTCATTAA
CGAATTTTAGGTTTATAGAAGTTACACCCAGCTTCCTCTAATGTTAACATATTACCAAA
CCATAGTGCCATGATCGAGAACAGGACATTAACACTGGTATAGTATTAACAACTAAACT
ATAAGCCTTACTCAAATCTGGTCAAGTTTCTACTAATGTTCTTTTTCCACCATTATAC
GTTGAATTTAGTTATTTCTTC tgtcaggcaagattcaaatcaaaataattaattttaaatgacatgcatactttttggag
agaaaagtttgggttacaattagccaatctgttaaaactcaaagaaatctaatccaaac
gtaatacacatgtctgtaccatttttttagcctattctctcttcagacttatacttaa
tcacaaataacattcttctttctattaattaattccaaaaactggctcacagccatata
tgacagtcatttattgctactagggacataaaatttctaaataatcagaaatccacgtt
gtcatttatgaatattctctctccttgcaaaccaaaaaaatcatctttaaccttacctg
atagattttggcatccctcattagttttctacaggatattctgtattaaatccattgc
ctccaagtatctgcacagcatcagtagctaactgatttgcaatatctccagcaaatgcc
tttgcaatagaagcataataggtatttcgacgaccagaatcaacctcCCAAGCTGCTCT
CTGGTAACTCATTCTAGCTAGTTCAACTT[tc]CATTGCCATTTCAGCCAGCATAAATG
ATATTGCTTGGTGCTagaattaaaaagaaaaaaattaaaggatatttattgagaaaact
taaaagttttttcctggggctttttcatttttatagtgacggggtcttgctatgttgcc
caggctggtctgcaactcctggcctcaagcaatcctcctacttaggcctctcaaagtgc
tgagattacaggcgtgagccactgtgcctgacctttttattttttaaacttttcattaa
cgaattttaggtttatagaagttacacccagcttcctctaatgttaacatattaccaaa
ccatagtgccatgatcgagaacaggacattaacactggtatagtattaacaactaaact
ataagccttactcaaatctggtcaagtttctactaatgttctttttccaccattatac
gttgaatttagttatttcttc

FIGURE 10bb

47855 (SEQ ID NO:28)
AGGTAGCGGCCACAGAAGAGCCAAAAGCTCCCGGGTTGGCTGGTAAGGACACCACCTCC
AGCTTTAGCCCTCTGGGGCCAGCCAGGGTAGCCGGGAAGCAGTGGTGGCCCGCCCTCCA
GGGAGCAGTTGGGCCCCGCCCGGGCCAGCCCCAGGAGAAGGAGGGCGAGGGGAGGGGAG
GGAAAGGGGAGGAGTGCCTCGCCCCTTCGCGGCTGCCGGCGTGCCATTGGCCGAAAGTT
CCCGTACGTCACGGCGAGGGCAGTTCCCCTAAAGTCCTGTGCACATAACGGGCAGAACG
CACTGCGAAGCGGCTTCTTCAGAGCACGGGCTGGAACTGGCAGGCACCGCGAGCCCCTA
GCACCCGACAAGCTGAGTGTGCAGGACGAGTCCCCACCACACCCACACCACAGCCGCTG
AATGAGGCTTCCAGGCGTCCGCTCGCGGCCCGCAGAGCCCCGCCGTGGGTCCGCCCGCT
GAGGCGCCCCCAGCCAGTGCGCTCACCTGCCAGACTGCGCGCCATGGGGCAACCCGGGA
ACGGCAGCGCCTTCTTGCTGGCACCCAAT[ag]GAAGCCATGCGCCGGACCACGACGTC
ACGCAGGAAAGGGACGAGGTGTGGGTGGTGGGCATGGGCATCGTCATGTCTCTCATCGT
CCTGGCCATCGTGTTTGGCAATGTGCTGGTCATCACAGCCATTGCCAAGTTCGAGCGTC
TGCAGACGGTCACCAACTACTTCATCACTTCACTGGCCTGTGCTGATCTGGTCATGGGC
CTGGCAGTGGTGCCCTTTGGGGCCGCCCATATTCTTATGAAAATGTGGACTTTTGGCAA
CTTCTGGTGCGAGTTTTGGACTTCCATTGATGTGCTGTGCGTCACGGCCAGCATTGAGA
CCCTGTGCGTGATCGCAGTGGATCGCTACTTTGCCATTACTTCACCTTTCAAGTACCAG
AGCCTGCTGACCAAGAATAAGGCCCGGGTGATCATTCTGATGGTGTGGATTGTGTCAGG
CCTTACCTCCTTCTTGCCCAT aggtagcggccacagaagagccaaaagctcccgggttggctggtaaggacaccacctcc
agctttagccctctggggccagccagggtagccgggaagcagtggtggcccgccctcca
gggagcagttgggccccgcccgggccagccccaggagaaggagggcgaggggaggggag
ggaaaggggaggagtgcctcgccccttcgcggctgccggcgtgccattggccgaaagtt
cccgtacgtcacggcgagggcagttcccctaaagtcctgtgcacataacgggcagaacg
cactgcgaagcggcttcttcagagcacgggctggaactggcaggcaccgcgagccccta
gcacccgacaagctgagtgtgcaggacgagtccccaccacacccacaccacagccgctg
aatgaggcttccaggcgtccgctcgcggcccgcagagccccgccgtgggtccgcccgct
gaggcgcccccagccagtgcgctcacctgccagactgcgcgccatggggcaacccggga
acggcaGCGCCTTCTTGCTGGCACCCAAT[ag]GAAGCCATGCGCCGGACCACGACgtc
acgcaggaaagggacgaggtgtgggtggtgggcatgggcatcgtcatgtctctcatcgt
cctggccatcgtgtttggcaatgtgctggtcatcacagccattgccaagttcgagcgtc
tgcagacggtcaccaactacttcatcacttcactggcctgtgctgatctggtcatgggc
ctggcagtggtgccctttggggccgcccatattcttatgaaaatgtggacttttggcaa
cttctggtgcgagttttggacttccattgatgtgctgtgcgtcacggccagcattgaga
ccctgtgcgtgatcgcagtggatcgctactttgccattacttcacctttcaagtaccag
agcctgctgaccaagaataaggcccgggtgatcattctgatggtgtggattgtgtcagg
ccttacctccttcttgcccat

FIGURE 10cc

47857 (SEQ ID NO:29)
CAGAGCCCCGCCGTGGGTCCGCCCGCTGAGGCGCCCCCAGCCAGTGCGCTCACCTGCCA
GACTGCGCGCCATGGGGCAACCCGGGAACGGCAGCGCCTTCTTGCTGGCACCCAATaGA
AGCCATGCGCCGGACCACGACGTCACGCAGGAAAGGGACGAGGTGTGGGTGGTGGGCAT
GGGCATCGTCATGTCTCTCATCGTCCTGGCCATCGTGTTTGGCAATGTGCTGGTCATCA
CAGCCATTGCCAAGTTCGAGCGTCTGCAGACGGTCACCAACTACTTCATCACTTCACTG
GCCTGTGCTGATCTGGTCATGGGCCTGGCAGTGGTGCCCTTTGGGGCCGCCCATATTCT
TATGAAAATGTGGACTTTTGGCAACTTCTGGTGCGAGTTTTGGACTTCCATTGATGTGC
TGTGCGTCACGGCCAGCATTGAGACCCTGTGCGTGATCGCAGTGGATCGCTACTTTGCC
ATTACTTCACCTTTCAAGTACCAGAGCCTGCTGACCAAGAATAAGGCCCGGGTGATCAT
TCTGATGGTGTGGATTGTGTCAGGCCTTA[ct]CTCCTTCTTGCCCATTCAGATGCACT
GGTACCGGGCCACCCACCAGGAAGCCATCAACTGCTATGCCAATGAGACCTGCTGTGAC
TTCTTCACGAACCAAGCCTATGCCATTGCCTCTTCCATCGTGTCCTTCTACGTTCCCCT
GGTGATCATGGTCTTCGTCTACTCCAGGGTCTTTCAGGAGGCCAAAAGGCAGCTCCAGA
AGATTGACAAATCTGAGGGCCGCTTCCATGTCCAGAACCTTAGCCAGGTGGAGCAGGAT
GGGCGGACGGGGCATGGACTCCGCAGATCTTCCAAGTTCTGCTTGAAGGAGCACAAAGC
CCTCAAGACGTTAGGCATCATCATGGGCACTTTCACCCTCTGCTGGCTGCCCTTCTTCA
TCGTTAACATTGTGCATGTGATCCAGGATAACCTCATCCGTAAGGAAGTTTACATCCTC
CTAAATTGGATAGGCTATGTC cagagccccgccgtgggtccgcccgctgaggcgcccccagccagtgcgctcacctgcca
gactgcgcgccatggggcaacccgggaacggcagcgccttcttgctggcacccaataga
agccatgcgccggaccacgacgtcacgcaggaaagggacgaggtgtgggtggtgggcat
gggcatcgtcatgtctctcatcgtcctggccatcgtgtttggcaatgtgctggtcatca
cagccattgccaagttcgagcgtctgcagacggtcaccaactacttcatcacttcactg
gcctgtgctgatctggtcatgggcctggcagtggtgccctttggggccgcccatattct
tatgaaaatgtggacttttggcaacttctggtgcgagttttggacttccattgatgtgc
tgtgcgtcacggccagcattgagaccctgtgcgtgatcgcagtggatcgctactttgcc
attacttcacctttcaagtaccagagcctgctgaccaagaataaggcccgggtgaTCAT
TCTGATGGTGTGGATTGTGTCAGGCCTTA[ct]CTCCTTCTTGCCCATTCAGATGCACT
GGTACCGggccacccaccaggaagccatcaactgctatgccaatgagacctgctgtgac
ttcttcacgaaccaagcctatgccattgcctcttccatcgtgtccttctacgttcccct
ggtgatcatggtcttcgtctactccagggtctttcaggaggccaaaaggcagctccaga
agattgacaaatctgagggccgcttccatgtccagaaccttagccaggtggagcaggat
gggcggacggggcatggactccgcagatcttccaagttctgcttgaaggagcacaaagc
cctcaagacgttaggcatcatcatgggcactttcaccctctgctggctgcccttcttca
tcgttaacattgtgcatgtgatccaggataacctcatccgtaaggaagtttacatcctc
ctaaattggataggctatgtc

FIGURE 10dd

47867 (SEQ ID NO:30)
CCACTCCGGAGCACCTGGCTCTGCCCTCAGGAACTCCCTGAGCTTTGCACACAGGGCCG
AGACACCTGGATTTCTCTGGTTCCCTGAGTGGGGCCAGCTTGGAAGAATTTCCCAAAGC
CTATTAGAGCAACGGCTGCCTCCTGCCTGCCTCCTTGGGCTGGGCAGGGCTGAGGGCGG
AGGGAGAGAGAGAGAGAGGGAGGGGGAGAGGAGGAAGGAAAAAGTTGGCAGGCCGACAG
CACAGCCGTGTCTGCATCCATCCAGAGGAGGTCTGTGTGGTGTGGGGCGGGCCAGGAGC
GAAGAGAGGCCTTCCTCCCTTTGTGCTCCCCCCGCCCCCCGGCCCTATAAATAGGCCCA
GCCCAGGCTGTGGCTCAGCTCTCAGAGGGAATTGAGCACCCGGCAGCGGTCTCAGGCCA
AGCCCCCTGCCAGCATGGCCAGCGAGTTCAAGAAGAAGCTCTTCTGGAGGGCAGTGGTG
GCCGAGTTCCTGGCCACGACCCTCTTTGTCTTCATCAGCATCGGTTCTGCCCTGGGCTT
CAAATACCCGGTGGGGAACAACCAGACGG[ct]GGTCCAGGACAACGTGAAGGTGTCGC
TGGCCTTCGGGCTGAGCATCGCCACGCTGGCGCAGAGTGTGGGCCACATCAGCGGCGCC
CACCTCAACCCGGCTGTCACACTGGGGCTGCTGCTCAGCTGCCAGATCAGCATCTTCCG
TGCCCTCATGTACATCATCGCCCAGTGCGTGGGGGCCATCGTCGCCACCGCCATCCTCT
CAGGCATCACCTCCTCCCTGACTGGGAACTCGCTTGGCCGCAATGACGTGAGTGGGGTG
TCCCTGGGCTTGGGGGGGTTCTAGAATGATGCTGAAAGGCACTGGTTCCATCCTCTGCC
CATTGTGCAGATGGGGACACTGAGGAACGGAGAGGACAAGAGGTTGCTGGAGGTCACGT
AGAGAGCTGGGGGGAAGAGCTGGGGCTGGAACTCAGCTATGCATGCCTCCCAAAGCCTG
TTTTCTGCCAGGCACTGTGGG ccactccggagcacctggctctgccctcaggaactccctgagctttgcacacagggccg
agacacctggatttctctggttccctgagtggggccagcttggaagaatttcccaaagc
ctattagagcaacggctgcctcctgcctgcctccttgggctgggcagggctgagggcgg
agggagagagagagagagggagggggagaggaggaaggaaaaagttggcaggccgacag
cacagccgtgtctgcatccatccagaggaggtctgtgtggtgtggggcgggccaggagc
gaagagaggccttcctccctttgtgctccccccgccccccggccctataaataggccca
gcccaggctgtggctcagctctcagagggaattgagcacccggcagcggtctcaggcca
agccccctgccagcatggccagcgagttcaagaagaagctcttctggagggcagtggtg
gccgagttcctggccacgaccctctttgtcttcatcagcatcggttctgccctgggctt
cAAATACCCGGTGGGGAACAACCAGACGG[ct]GGTCCAGGACAACGTGAAGGTGTCGC
TGgccttcgggctgagcatcgccacgctggcgcagagtgtgggccacatcagcggcgcc
cacctcaacccggctgtcacactggggctgctgctcagctgccagatcagcatcttccg
tgccctcatgtacatcatcgcccagtgcgtgggggccatcgtcgccaccgccatcctct
caggcatcacctcctccctgactgggaactcgcttggccgcaatgacgtgagtggggtg
tccctgggcttgggggggttctagaatgatgctgaaaggcactggttccatcctctgcc
cattgtgcagatggggacactgaggaacggagaggacaagaggttgctggaggtcacgt
agagagctggggggaagagctggggctggaactcagctatgcatgcctcccaaagcctg
ttttctgccaggcactgtggg

FIGURE 10ee

47868 (SEQ ID NO:31)
CTCCTCACCAGTCCTCACCACCTCTCTCCCCTGCAGCTGGCTGATGGTGTGAACTCGGG
CCAGGGCCTGGGCATCGAGATCATCGGGACCCTCCAGCTGGTGCTATGCGTGCTGGCTA
CTACCGACCGGAGGCGCCGTGACCTTGGTGGCTCAGCCCCCCTTGCCATCGGCCTCTCT
GTAGCCCTTGGACACCTCCTGGCTGTGAGTCAGGGGCCCTCCCAGATGGAGGTGGGGGA
AGGGAGGGCGGGGGCTGGTGGGGTGCCCTGCCATGGGCAGCCAGTGGGACTCCCGACAG
GGCTCTTGCCATTGGGTGGAGGATGGCGGGTCAGCGCTGGGGGCTGGGGGCAGGGTCCT
GCCCTGGAGAGGAGCACAGGGACCTCCTGCCCAGCTTGGGGTCAGCACTCCTCTTTCCC
TGGGTCTCATTGTCCCCCACCCTGATTGTTCTCTTTCTCCCTCCAACCTCTCCCTCCTC
TCACTCTCTCTTCACCTATGACTCTCTGCCTTCGCCCCTCCCTCTGTTTCTTTCCCTCA
CAGATTGACTACACTGGCTGTGGGATTAA[ac]CCTGCTCGGTCCTTTGGCTCCGCGGT
GATCACACACAACTTCAGCAACCACTGGGTAGGAGACCCACGGGGGGTGGGGTGGGAAG
CTTTGGTGTCCCATGGTAAGCCTGACCCCACCCTCACAGTGTCCCTTCCTGTTCTGGAG
GCTCTGGGAGACAGCCAGAGGACAGGAAATCAGGAAACTGAGGCCTGCCATGTAGAGGC
AGGCTGGGGGTCACACTGCCAGCACTTTCAGGCCTAGTCTCTGCCCTCCCAGCTCGGCC
CTGCCCCATGCTGCCTGGCCTCCAGGTCTTCCCAGCTGCGTGGTTAAAAGTGGGGCTCC
AAATCCTGGCTCAGCCACTTTCGGGTTTAGCATGACCTTGCGCAGTGTGCTTGAGCTTT
GGTTTCCTGAGCTGCGGAGGGGGATATGGTGGTGCCCACCTCTCAGGGTGGCCGAGAAG
AGGAAAGGGCTCACTCCCCAT ctcctcaccagtcctcaccacctctctcccctgcagctggctgatggtgtgaactcggg
ccagggcctgggcatcgagatcatcgggaccctccagctggtgctatgcgtgctggcta
ctaccgaccggaggcgccgtgaccttggtggctcagccccccttgccatcggcctctct
gtagcccttggacacctcctggctgtgagtcaggggccctcccagatggaggtggggga
agggagggcgggggctggtggggtgccctgccatgggcagccagtgggactcccgacag
ggctcttgccattgggtggaggatggcgggtcagcgctgggggctgggggcagggtcct
gccctggagaggagcacagggacctcctgcccagcttggggtcagcactcctctttccc
tgggtctcattgtcccccaccctgattgttctctttctccctccaacctctccctcctc
tcactctctcttcacctatgactctctgccttcgcccctccctctgtttctttccctca
cagatTGACTACACTGGCTGTGGGATTAA[ac]CCTGCTCGGTCCTTTGGCTCCGCGgt
gatcacacacaacttcagcaaccactgggtaggagacccacggggggtggggtgggaag
ctttggtgtcccatggtaagcctgaccccaccctcacagtgtcccttcctgttctggag
gctctgggagacagccagaggacaggaaatcaggaaactgaggcctgccatgtagaggc
aggctgggggtcacactgccagcactttcaggcctagtctctgccctcccagctcggcc
ctgccccatgctgcctggcctccaggtcttcccagctgcgtggttaaaagtggggctcc
aaatcctggctcagccactttcgggtttagcatgaccttgcgcagtgtgcttgagcttt
ggtttcctgagctgcggagggggatatggtggtgcccacctctcagggtggccgagaag
aggaaagggctcactccccat

FIGURE 10ff

47877 (SEQ ID NO:32)
TTTGACTCCCTGTACCTTTAAGAGGGACCCTTAAATTTAAAAATCTATTGTATTTTTTT
TTTAGTAGGGGTAGGGAATATTTAGGGAATTTGGAAGGGGTTATATAGTTCTTTAAGAA
TCAAATAGCACATCTTCCTGAAAATAGCACGTAGACAAAGTTTTTTTGGAGATAACCTT
AGGAATATCGTAACTCTCTGATGCCACCTCCATATGTGATCCTATGTTGATTATAAGAT
TTTGATCAGTGGCTTTCAGACTTTTTTGACTGCAACCTAGAATAAAAGATTCATTTACA
TTGTGACCTAGAACACACACACACACACACACTCTCTCTCCGCCACTCTCCTGCACACA
GAAATCATTGATGCTTACAACAATTCTTACTCTTACTATGGGTGATTTACTTTGATATG
CTCTGTTTTTTTTTTCATTTACAAAACTGTGGATTAATTTTTTTTGACATGCTAAATTG
ATCTCAGTAATAGATTGTATTTATTCTTCCTTAGATTCTTCTTTGGAGCAGAATAAAAG
ATCTGGCCCATCAGTTCACACAGGTCCAG[ct]GGGACATGTTCACCCTGGAGGACACG
CTGCTAGGCTACCTTGCTGATGACCTCACATGGTGTGGTGAATTCAACACTTCCAGTGA
GGCTCTGGGCCCTGTGGGATTGCCCAGGGATGTGGAGGGTGAACAGAGTGACTTCTGCT
GGAGGCCCTGAATGATTAGTGTGGAGGACAGAGCCACAGGCACCCATCCTGATGCCATC
TATACTTATATTAGTCCATTTGTGTTGCTATTAAGGAATACCTGAGGCTGCGTAATTTA
TAAAGAAAAGAGGTTTATTTGACTCACAGTTACGCAGGCTGTACAAGAAGTAGGGTACC
AGCATCCACTTCGGGTGAAGGCCTGAGGCTGTTTCCACTCATGGAGAAGGGGAAGGGGA
GCTGGCATTTACAGAGATCACATGGTGAGGGAGGAAAGCAAGGAGAGGTCAGGGGAGGT
GCCAGGCTGTTTGTAATGACC tttgactccctgtacctttaagagggacccttaaatttaaaaatctattgtattttttt
tttagtaggggtagggaatatttagggaatttggaaggggttatatagttctttaagaa
tcaaatagcacatcttcctgaaaatagcacgtagacaaagtttttttggagataacctt
aggaatatcgtaactctctgatgccacctccatatgtgatcctatgttgattataagat
tttgatcagtggctttcagacttttttgactgcaacctagaataaaagattcatttaca
ttgtgacctagaacacacacacacacacacactctctctccgccactctcctgcacaca
gaaatcattgatgcttacaacaattcttactcttactatgggtgatttactttgatatg
ctctgttttttttttcatttacaaaactgtggattaattttttttgacatgctaaattg
atctcagtaatagattgtatttattcttccttagattcttctttggagcagaataaaag
aTCTGGCCCATCAGTTCACACAGGTCCAG[ct]GGGACATGTTCACCCTGGAGGACACG
CTgctaggctaccttgctgatgacctcacatggtgtggtgaattcaacacttccagtga
ggctctgggccctgtgggattgcccagggatgtggagggtgaacagagtgacttctgct
ggaggccctgaatgattagtgtggaggacagagccacaggcacccatcctgatgccatc
tatacttatattagtccatttgtgttgctattaaggaatacctgaggctgcgtaattta
taaagaaaagaggtttatttgactcacagttacgcaggctgtacaagaagtagggtacc
agcatccacttcgggtgaaggcctgaggctgtttccactcatggagaaggggaagggga
gctggcatttacagagatcacatggtgagggaggaaagcaaggagaggtcaggggaggt
gccaggctgtttgtaatgacc

FIGURE 10gg

47878 (SEQ ID NO:33)
TCAAATTATCATCGCTTTTTTATTTCAGGATTACACCAAAGACTGTTTCCAACTTGACT
GAGGTAGGTAGTCTTGGATAGACTGGGGGAAATAAGTCCTGTGGGACCTCCTGCCTTAA
AGAAAGCAGGCGGAGGGCCCTAAAGGAAATCAGGCAACCAGACCAAAAGAATGTGGACC
AGGTGGTCCATGCTGTGTCTCTTGTGACCCTTCTTCTCCCTGCCATGTCTTTTGGGAGA
GCCCTTGTGTTGCAAAAATGAGAGTGTGGTGGTATGGATTGGGGTTTAGGCAGAACAGT
ACTGGCCAAGCAGCGCCTCCCTGGACCTCAATTTTCCCTCTGTGGAATGGGCTAGCAAT
CCTGGGCCTCCCCAGGGCGAAGGAAAGACCACTCAGGAAGGGCACCGTCTGGGGCAGGA
AAACGGAGTGGGTTGGATGTATTTTTTTCACGGATGGGCATGAGGATGAATGCTTGTCC
AGGCCGTGCAGCATCTGCCTTGTGGGTCACTTCTGTGCTCCAGGGAGGACTCACCATGG
GCATTTGATTGGCAGAGCAGCTCCGAGTCC[ag]TCCAGAGCTTCCTGCAGTCAATGAT
CACCGCTGTGGGCATCCCTGAGGTCATGTCTCGTAAGTGTGGGCTGGAGGGGAAACTGG
GTGCCGAGGCTGACAGAGCTTCCCATTTCACCTTGTGGGCCCTTCCCAGGCAGAGCTTC
AGGTGCCCCTCTTCCCAGTCATTGATACTTAGCGGTCCTGGCCCCCTTTCCTCTCCCTG
CTGGTGGTATTGCACGCCAATGACTCGGCCAGATGCCCAGACCCCTGTTCTTGGTTTAC
CTGCAGAATATTATCTTTGCCACCCCGCGGGATGGCTCAACCCACTTTCAGGATGCAGG
TCTCCTAATAGCAACCTGATATAGCAGAAAGACCCCTGGGCTGGGAGTCTGAGACCTAG
TTCTAGCCCAGCCCTGAACCTCAGTTTCCCTTTCTGTGAAACAAGAATGTTGAACTTGA
TGATTCCCAATTTTCCTTTTG tcaaattatcatcgctttttatttcaggattacaccaaagactgtttccaacttgact
gaggtaggtagtcttggatagactgggggaaataagtcctgtgggacctcctgccttaa
agaaagcaggcggagggccctaaaggaaatcaggcaaccagaccaaaagaatgtggacc
aggtggtccatgctgtgtctcttgtgacccttcttctccctgccatgtcttttgggaga
gcccttgtgttgcaaaaatgagagtgtggtggtatggattggggtttaggcagaacagt
actggccaagcagcgcctccctggacctcaattttccctctgtggaatgggctagcaat
cctgggcctccccagggcgaaggaaagaccactcaggaagggcaccgtctggggcagga
aaacggagtgggttggatgtatttttttcacggatgggcatgaggatgaatgcttgtcc
aggccgtgcagcatctgccttgtgggtcacttctgtgctccagggaggactcaccatgG
GCATTTGATTGGCAGAGCAGCTCCGAGTCC[ag]TCCAGAGCTTCCTGCAGTCAATGAT
CACCGCtgtgggcatccctgaggtcatgtctcgtaagtgtgggctggaggggaaactgg
gtgccgaggctgacagagcttcccatttcaccttgtgggcccttcccaggcagagcttc
aggtgcccctcttcccagtcattgatacttagcggtcctggccccctttcctctccctg
ctggtggtattgcacgccaatgactcggccagatgcccagacccctgttcttggtttac
ctgcagaatattatctttgccaccccgcgggatggctcaacccactttcaggatgcagg
tctcctaatagcaacctgatatagcagaaagacccctgggctgggagtctgagacctag
ttctagcccagccctgaacctcagtttccctttctgtgaaacaagaatgttgaacttga
tgattcccaattttccttttg

FIGURE 10hh

47880 (SEQ ID NO:34)
GGGCCAAGGCCACAAAGTCTCAGGACAAGGCAGACTGCAGACCCAGGGGACGTGCGCGG
ACCGGGGCTTGTTTCGGTCCTGGGTGTTCTCAGCCTTGATGTGGACACTAGCGGCTCTG
GTGCACTTGCTCGGAGGAAGCAGCCACGTGTGGGTGTCCTGGCCTCAGCCGGCAGTAAC
CAGCAGACACACAGCACGGAACCCTCCACCCTACCAGGAAGCCCAGGCAAGACCCCCCA
GCAGTGCATGCTGACCCCAGACCCTGGCGACGGATCGGAGCTCCTCGGATTTGGAGTGG
ATCCTTACAAATCCTGCACACTAGACAGCAGACACAGGCCCTGCCAGAGCCAGGGACCC
GAATTTTTGTTTGGAAAAACACTGAGGTAAGTGGGGGGTGGCTCCTGTCCAGGCAGCCC
GGCCGGTGGGACAGTGGGGAGGGTCGGCTCCAAGCCCTCCTGAGCCCTAGAGGGGGTGC
GGGACGGGGACTCACAGGAGATGCAGGACGGCCCGAACATAGTAATTCCTGGTAAAGGG
CCCGAACAGCTTCACCACGGCGGTCATGT[ga]CTTCTGTCCCCTGGGGGAGGGAGGAA
GGCGAGACGGCGCGGCTGGGCCTCTCCCACTCGGGACTCCTTTGCTGCCCTGCTGACCA
CCCCAGGGCACCCAGGCCTCTTTCCTCCCACAAAACACACCGGGCAGGCACCGGCCTTG
GTTTACCCACAAGCACCAAAGGGTTGGTTCCGGAGCCTCCAAGTGAGAAACCAAGCTCC
ACCCAACCCTGTGAGCCCTGCCTGGGCCCCGCAGCCCCCGGAGAGACCCCAGAGCAGGA
GGAGACTCACCAGCGCTCCATGGTGGAGCCCTTCTTCCTCTTCCCCCGGGGGTACTCCA
GCAGGCACACAAACACGCCCGCCACACTGAAGCCATGTGGTTAAGGAACAGCCCAGCTC
AGCCTGAGGGGCCACAGGGAACTCCCTTTACTGAAGACAACACAGAGAGGGGCCCGAGC
ACGGTGGCTCATGCCTGGAAT gggccaaggccacaaagtctcaggacaaggcagactgcagacccaggggacgtgcgcgg
accggggcttgtttcggtcctgggtgttctcagccttgatgtggacactagcggctctg
gtgcacttgctcggaggaagcagccacgtgtgggtgtcctggcctcagccggcagtaac
cagcagacacacagcacggaaccctccaccctaccaggaagcccaggcaagacccccca
gcagtgcatgctgaccccagaccctggcgacggatcggagctcctcggatttggagtgg
atccttacaaatcctgcacactagacagcagacacaggccctgccagagccagggaccc
gaatttttgtttggaaaaacactgaggtaagtggggggtggctcctgtccaggcagccc
ggccggtgggacagtggggagggtcggctccaagccctcctgagccctagagggggtgc
gggacggggactcacaggagatgcaggacggcccgaacatagtaattcctggtaaaggg
ccCGAACAGCTTCACCACGGCGGTCATGT[ga]CTTCTGTCCCCTGGGGGAGGGAGGAA
Ggcgagacggcgcggctgggcctctcccactcgggactcctttgctgccctgctgacca
ccccagggcacccaggcctctttcctcccacaaaacacaccgggcaggcaccggccttg
gtttacccacaagcaccaaagggttggttccggagcctccaagtgagaaaccaagctcc
acccaaccctgtgagccctgcctgggccccgcagcccccggagagaccccagagcagga
ggagactcaccagcgctccatggtggagcccttcttcctcttcccccgggggtactcca
gcaggcacacaaacacgcccgccacactgaagccatgtggttaaggaacagcccagctc
agcctgaggggccacagggaactccctttactgaagacaacacagagaggggcccgagc
acggtggctcatgcctggaat

FIGURE 10ii

47885 (SEQ ID NO:35)
TAATACATGAAAGAAGAAGCTAGTCAATGTGGAGCTCTATTGTGTCCCGGGATCAACAA
AGACAAGATATCTTTAAAATCGTCTTCTAAATTTACCCTAATGTAAAACAAATCCAATA
AAACTCTAATGTAATTTTTTAAGAATTTAAATTTGGAATAATTCCAAAGAACAATTTTT
CTTAATTTTCTACAGCCAGAATATATACCTTTAAAAAAAATGAAAACAGAGATTAACTT
TCTCAGAATTGGTTGACTCACTCTTTCCTTTTATTTTTCTTCCATGGAATTTTCCAGTT
AACTTGAGAAAGTGGAATCGAATTCCGATGTTGAATTTTCCTTCTGGCCCCATTCATGT
GGCAGGTGGTGATTCAGGTACTACTGGGGGCTGCTCAGACAAACCTCCTCATCAGACAT
CAAGAGGCTGTTGCACCAGGAGGGCCGGTACCGTGTCTAGAGGTGGTCGGCATGGGGTT
GGAGTTGTATTACATAAACCCTACTCCAAACAAATGCATGGGGATGTGGCTGGAGTTCC
CCGTTGTCTAACCAGTGCCAAAGGGCAGG[at]CGGTACCTCACCCCACGTTCTTAACT
ATGGGTTGGCAACATGTTCCTGGATGTGTTTGCTGGCACAGTGACAGGTGCTAGCAACC
AGGGTGTTGACACAGTCCAACTCCATCCTCACCAGGTCACTGGCTGGAACCCCTGGGGG
CCACCATTGCGGGAATCAGCCTTTGAAACGATGGCCAACAGCAGCTAATAATAAACCAG
TAATTTGGGATAGACGAGTAGCAAGAGGGCATTGGTTGGTGGGTCACCCTCCTTCTCAG
AACACATTATAAAAACCTTCCGTTTCCACAGGATTGTCTCCCGGGCTGGCAGCAGGGCC
CCAGCGGCACCATGTCTGCCCTCGGAGTCACCGTGGCCCTGCTGGTGTGGGCGGCCTTC
CTCCTGCTGGTGTCCATGTGGAGGCAGGTGCACAGCAGCTGGAATCTGCCCCCAGGCCC
TTTCCCGCTTCCCATCATCGG taatacatgaaagaagaagctagtcaatgtggagctctattgtgtcccgggatcaacaa
agacaagatatctttaaaatcgtcttctaaatttaccctaatgtaaaacaaatccaata
aaactctaatgtaattttttaagaatttaaatttggaataattccaaagaacaattttt
cttaattttctacagccagaatatatacctttaaaaaaaatgaaaacagagattaactt
tctcagaattggttgactcactctttccttttatttttcttccatggaattttccagtt
aacttgagaaagtggaatcgaattccgatgttgaattttccttctggccccattcatgt
ggcaggtggtgattcaggtactactgggggctgctcagacaaacctcctcatcagacat
caagaggctgttgcaccaggagggccggtaccgtgtctagaggtggtcggcatggggtt
ggagttgtattacataaaccctactccaaacaaatgcatggggatgtggctggAGTTCC
CCGTTGTCTAACCAGTGCCAAAGGGCAGG[at]CGGTACCTCACCCCACGTTCTTAACT
ATGGGTTGGcaacatgttcctggatgtgtttgctggcacagtgacaggtgctagcaacc
agggtgttgacacagtccaactccatcctcaccaggtcactggctggaacccctggggg
ccaccattgcgggaatcagcctttgaaacgatggccaacagcagctaataataaaccag
taatttgggatagacgagtagcaagagggcattggttggtgggtcaccctccttctcag
aacacattataaaaaccttccgtttccacaggattgtctcccgggctggcagcagggcc
ccagcggcaccatgtctgccctcggagtcaccgtggccctgctggtgtgggcggccttc
ctcctgctggtgtccatgtggaggcaggtgcacagcagctggaatctgcccccaggccc
tttcccgcttcccatcatcgg

FIGURE 10jj

47887 (SEQ ID NO:36)
AAAAAGAGGAATTAAATTGTGTAGATGCCTTTAAAGAACATTTTTCTAGCATCTTTCTA
CATCTTTCCCTAAGTGGCCTCTTGAGCCCAGTCGGATTTTGGTTATATGCCATGATAGT
AATCATAAGAATCAGTTAAAAATGATCCAAAAATGCACGAATACAGTCGATTCCCTCTC
ATTTATTCCTTGTGGAAAAAGAAAAACACAAATCTTAAAAACTAAAGCAAGTCAGGGAA
GCCTGGAAAGATACCCAGATTTGATAACATGTTAGAAGGAAATCCAGGCTAAGGAATCT
CATTTTCTAGCTTTGATCTGGTTGTCAGTTGGGATGGACTTGCCCAAGTGATGGCCCAC
AGAAAGGCCAAATTTCTTGTTTTTCTCCTCATCCTGTACCTCTTTTTTCATTAAGAATC
CTGCCTGGAAGTTTAGGTCAAAGAGGCTGCTTGGAGCAAAATACAGTGGTGTCTCATCC
CAAATATTCTCCAGGCGTTTCTTCCATCCTTCCAGGATTTGAATTCGGGCGTCTGCTGG
AGTGTGCCCAATGCTATATGTCAGTTGAG[ga]TTCTAAGACTTGGAAGCCACAGAAAT
GCAGAATGCCACTCTGAGGATACAGAAAGCACAGAGAGGTAAGTCAACCAATTCCATGC
AGTTGTACTATAAACAACAGAAGTTGGTCTGGGCTTCTCAGTAAGACACTCTGATAAGG
AGGCCTCAGGCACACTAGAGAATCAGTTCAGAGCTAGCGTCTCTCTCTTACCCTCTACC
TAGCCGTTACCAATTTTAGCCTTCTCAGGTGTGTTCTTCTTTAAATGCATAAACCTTGA
AACTGTGCCAACCTGGATCCTTTGCCAAGAAGGCTGGAAGTTCTGTTACTTTAGGGAGT
CTCAGTTTCTTGGCAGGTGACTCACCAAGACCTGCGTGGGTGCATTTCTCTGCCTCTCC
ATATAACTAGATGAGTCCTTTTTTTCTTTTTCTTTTTTTTTTTTTTTTTGAGGCAGAGT
CTCGCTCGGTCGTCCAGGCTG aaaaagaggaattaaattgtgtagatgcctttaaagaacatttttctagcatctttcta
catctttccctaagtggcctcttgagcccagtcggattttggttatatgccatgatagt
aatcataagaatcagttaaaaatgatccaaaaatgcacgaatacagtcgattccctctc
atttattccttgtggaaaaagaaaaacacaaatcttaaaaactaaagcaagtcagggaa
gcctggaaagatacccagatttgataacatgttagaaggaaatccaggctaaggaatct
cattttctagctttgatctggttgtcagttgggatggacttgcccaagtgatggcccac
agaaaggccaaatttcttgtttttctcctcatcctgtacctcttttttcattaagaatc
ctgcctggaagtttaggtcaaagaggctgcttggagcaaaatacagtggtgtctcatcc
caaatattctccaggcgtttcttccatccttccaggatttgaattcgggCGTCTGCTGG
AGTGTGCCCAATGCTATATGTCAGTTGAG[ga]TTCTAAGACTTGGAAGCCACAGAAAT
GCAGAATGCCACTctgaggatacagaaagcacagagaggtaagtcaaccaattccatgc
agttgtactataaacaacagaagttggtctgggcttctcagtaagacactctgataagg
aggcctcaggcacactagagaatcagttcagagctagcgtctctctcttaccctctacc
tagccgttaccaattttagccttctcaggtgtgttcttctttaaatgcataaaccttga
aactgtgccaacctggatcctttgccaagaaggctggaagttctgttactttagggagt
ctcagtttcttggcaggtgactcaccaagacctgcgtgggtgcatttctctgcctctcc
atataactagatgagtcctttttttctttttctttttttttttttttttgaggcagagt
ctcgctcggtcgtccaggctg

FIGURE 10kk

47889 (SEQ ID NO:37)
CTCATGTAGGAACCAGCAGGCTACTAGAAATTAAAGTTTAAATCTGGGAGAAGGTTAGC
GTTAAGTGTGTGTATACGAGAGTCAAGCCAGAGAGGAGGGCAGTAATGCTGTGGGGTTG
CATGAAATTCACCAAAGGAGAGCATGCAAAGTGAAGAGGGAGGCAAATGAAGATGGAGC
CCCAAGGAGCACTTACATTTAAAAATATGGGCAGAGGAAGAGGAATCGTCAAAGGAGAC
TAAAAAGTAGCCAAGGCAGGGAGCATTTCAAGAAGGAGAGAAAGATCCACTTTGCCATA
TGCTGCAGAAAGAGTCCAACAGGTTGAGAAATGACAGTACTCGTGATTCCAAAGGTAAT
GAAAAAAATCCCCAGAATTCTATGCATGAATTAATTACGTGATTAAACATACAAATGTA
CTGTTCTCCAAGAAAACTGAGCTGTTTCCATATTCAGCATTGAATACCAAGATATTATT
TTCTTGTTTGTAGAGATATTCATGATCTAAAGAGAGAAAACACCCAGATCAAAATTTCA
AGTTGTTATTAAACATCTTCATAAGCTGA[ga]AATTACAGAATACAGTTTAAGCTCAC
AAATACCAAATAGGCATTTCTAAGTTGAGAAAACATGAATGATATTATACTAACATTCA
TTCATTTTTTCATCATTATTGTCAAGGTTTCAATTCACATTTAATTTTTTATTATACAT
GTCAAAGAAATACTTGGGTTCCTTTCAGTCTTTCTCCCTTTGCACTTCAAGTAGAAAAA
GAAAAAAAAAACTCTCTATAGAATTTTTAAAAACAAGGATTACCTCTTCTCAGTGCCAT
AAAAGCCCACATCTCGACTTAACTAGAATGAATGTAAGCATAAAATCTGCCCTACCCCA
AAAAATTCTTACCTGAAATCCATCTTAAGGAGTATAACTTCAGTCTATAAGTATTTTTT
AAGTAATCAGTTAGAGTGTAAGTTTTGCGACTGTCAGCTGTAGCATCATCTGCTGGTTG
AAAGAAAGAGCCAAATGTTCA ctcatgtaggaaccagcaggctactagaaattaaagtttaaatctgggagaaggttagc
gttaagtgtgtgtatacgagagtcaagccagagaggagggcagtaatgctgtggggttg
catgaaattcaccaaaggagagcatgcaaagtgaagagggaggcaaatgaagatggagc
cccaaggagcacttacatttaaaaatatgggcagaggaagaggaatcgtcaaaggagac
taaaaagtagccaaggcagggagcatttcaagaaggagagaaagatccactttgccata
tgctgcagaaagagtccaacaggttgagaaatgacagtactcgtgattccaaaggtaat
gaaaaaaatccccagaattctatgcatgaattaattacgtgattaaacatacaaatgta
ctgttctccaagaaaactgagctgtttccatattcagcattgaataccaagatattatt
ttcttgtttgtagagatattcatgatctaaagagaGAAAACACCCAGATCAAAATTTCA
AGTTGTTATTAAACATCTTCATAAGCTGA[ga]AATTACAGAATACAGTTTAAGCTCAC
AAATACCAAATAGGCATTTCTAAGTTGagaaaacatgaatgatattatactaacattca
ttcattttttcatcattattgtcaaggtttcaattcacatttaattttttattatacat
gtcaaagaaatacttgggttcctttcagtctttctccctttgcacttcaagtagaaaaa
gaaaaaaaaaactctctatagaatttttaaaaacaaggattacctcttctcagtgccat
aaaagcccacatctcgacttaactagaatgaatgtaagcataaaatctgccctacccca
aaaaattcttacctgaaatccatcttaaggagtataacttcagtctataagtatttttt
aagtaatcagttagagtgtaagttttgcgactgtcagctgtagcatcatctgctggttg
aaagaaagagccaaatgttca

FIGURE 10ll

47892 (SEQ ID NO:38)
AGCGTTCAGAGAAGGAGCGCAGGCAGAAGTCACCGCGGGCGGCGGAGACGCGCGTCCTG
CACCGCTGCTCCGGGCGGTGGAGTCACTCGCCGCTGGCAAGTTTCGGCCCCGAGTTAAA
CATTAGTGAGCGCCGAGCCCGCTGGGTATAAAGGCGCCGCGGGCAGGCTGCAGGGCAGG
CGGCGCGGGAGCAGGCGCGCGTGGCGCGGGGCACTGGCATCCCGGCCGGGGGGAGCCCG
CGAGGGCCCCCTGAGGGCGGTGTAGGGCGCTGGGCGGCAGCCGGGGCGCAGAGTGCGGG
GCCCGGAGGAGCCGTGGGGGAGGGGAAAGGGCGCGCGGCCTCGGATGCGCAGACCCTGG
GCCGGCGACTCGGGGACCCTGCTCCCTCTTAGCTAAAAATGACGTCGGCGTTCAGCTCC
TCCAACCTCACGTGGACAGGCGAGGGAACCGAGACCCAGAGAGGGCAGGGGACTTTGGC
AAACTCACACAGCCCACCGCAGGCAACTGGAACTGAAACCCAGGACTCCGTCTCTTGCC
AGTGAAAGTTATGTTAGGAAGCAGTGAGG[tg]GTCTAAAGCAGTATGAAAGGCAAAGA
GAAAAGGTGATTGTTCCCTCTTGAATGGCCCTTGGAAGCTGAGTATCTGGATTCACCCT
CCCTAGGGAATTTCCCGATTGTCTTGCAGGCTTACACACTCATCAAGATGACAAAAATA
ATGACAGTAACACTTATGTGGAACTTGACTTTTTCCCAGGTGCTGCTCTAAGCATTTAC
TGTGTTTGTTTTACAGGAAGGAAGACTGTACACAGAGAATAAATAACTTGGCCAAGCCA
TTCAGCTAGGAAGTTGTAGATCCTAAATTAAGAGTTCAAGGTCTTAATGGCTACTCTAT
GCGGCCTCTCATAGTCTTTTCAAGGGTTTTGGAGAAGAATAAAAGATCAGGTATGGCTT
CTCCCTCCCCCAGCTCTCTATTGTTCCCTAAAGGATTATTCATTCGTTCATTCATTCCT
ACATCCTCCCATTTATTCCAG agcgttcagagaaggagcgcaggcagaagtcaccgcgggcggcggagacgcgcgtcctg
caccgctgctccgggcggtggagtcactcgccgctggcaagtttcggccccgagttaaa
cattagtgagcgccgagcccgctgggtataaaggcgccgcgggcaggctgcagggcagg
cggcgcgggagcaggcgcgcgtggcgcggggcactggcatcccggccggggggagcccg
cgagggccccctgagggcggtgtagggcgctgggcggcagccggggcgcagagtgcggg
gcccggaggagccgtgggggaggggaaagggcgcgcggcctcggatgcgcagaccctgg
gccggcgactcggggaccctgctccctcttagctaaaaatgacgtcggcgttcagctcc
tccaacctcacgtggacaggcgagggaaccgagacccagagagggcaggggactttggc
aaactcacacagcccaccgcaggcaactggaactgaaacccAGGACTCCGTCTCTTGCC
AGTGAAAGTTATGTTAGGAAGCAGTGAGG[tg]GTCTAAAGCAGTATGAAAGGCAAAGA
GAAAAGGTGATTGTTCCCTCTtgaatggcccttggaagctgagtatctggattcaccct
ccctagggaatttcccgattgtcttgcaggcttacacactcatcaagatgacaaaaata
atgacagtaacacttatgtggaacttgactttttcccaggtgctgctctaagcatttac
tgtgtttgttttacaggaaggaagactgtacacagagaataaataacttggccaagcca
ttcagctaggaagttgtagatcctaaattaagagttcaaggtcttaatggctactctat
gcggcctctcatagtcttttcaagggttttggagaagaataaaagatcaggtatggctt
ctccctcccccagctctctattgttccctaaaggattattcattcgttcattcattcct
acatcctcccatttattccag

FIGURE 10mm

47895 (SEQ ID NO:39)
TTCTGATCAGTTTTCTATGTTAAATAAATATACATCTACCTTGTCAGTTTAGATGACTG
TACTGGACTCCAGTATACTGTCAAACTATACTTGATTAATCCTGTATTGCTGGATACGT
GGGGCTTTCTCCCTACCCTCCAGATTTTAAATTATTGAACAAGTATTTATGGAGGCCTG
CTGTGAGCCAGGAGCTGTCCTGAGCCCTGGAAACCCAGCAGTGGCTGTACAGACCTGGC
CCAGCTGTCAGGGGGCACCTCTAAGGAAACCGGGAGGCAATAATCGTAGCTCCCTTGCA
GGGAGGTTGTGAAGGCTGAGTGAGGACATCTGTGCACCTGGAGCACAGTGTGAGTGTGA
AACCAGTGTCAGCCCTTATTACTGTCAATACCATGAAGGGGCGGCGGGGGCACTAAGGG
TGGCAGGACTCAATATCTAGGCTCTGGGGGGTGCCAGAGCCTGACCGTGCAGGGTCTTC
TCTCTCCCTCCACCCTGACTGTGCTCTGTCCCCCCAGGGCTGGACATCCACTTCATCCA
CGTGAAGCCCCCCCAGCTGCCCGCAGGCC[ag]TACCCCGAAGCCCTTGCTGATGGTGC
ACGGCTGGCCCGGCTCTTTCTACGAGTTTTATAAGATCATCCCACTCCTGACTGACCCC
AAGAACCATGGCCTGAGCGATGAGCACGTTTTTGAAGTCATCTGCCCTTCCATCCCTGG
CTATGGCTTCTCAGAGGCATCCTCCAAGAAGGGTACGGGGCTGCTAGAGGTTCCATAAC
TGCCCCGTCCTCGCCAAGGGTGGGCCCGGTGTTCCCACCAGGCTCTCCTTCCGGCGGGG
TGAGCAGGGAGTTGGCCCGAGGAAGCTGGGAAAGGAGGGGCCTGAGAGGCCGGCCCCAG
ACACACCGCCCTCCGGGGCTGGAGATGCCACCCCTATATTTGGGCTCCAGGATTCCTTC
TTGCCTCTGTGAGCTTTTCTGACCTCCACCTGGGGGTAGGCGGGCCTGAGAAATTTCAT
AGAACACCAGAGGGCCCAAGG ttctgatcagttttctatgttaaataaatatacatctaccttgtcagtttagatgactg
tactggactccagtatactgtcaaactatacttgattaatcctgtattgctggatacgt
ggggctttctccctaccctccagattttaaattattgaacaagtatttatggaggcctg
ctgtgagccaggagctgtcctgagccctggaaacccagcagtggctgtacagacctggc
ccagctgtcagggggcacctctaaggaaaccgggaggcaataatcgtagctcccttgca
gggaggttgtgaaggctgagtgaggacatctgtgcacctggagcacagtgtgagtgtga
aaccagtgtcagcccttattactgtcaataccatgaaggggcggcgggggcactaaggg
tggcaggactcaatatctaggctctggggggtgccagagcctgaccgtgcagggtcttc
tctctccctccaccctgactgtgctctgtccccccagggctggacatccacttcatcca
cgtGAAGCCCCCCCAGCTGCCCGCAGGCC[ag]TACCCCGAAGCCCTTGCTGATGGTGC
acggctggcccggctctttctacgagttttataagatcatcccactcctgactgacccc
aagaaccatggcctgagcgatgagcacgtttttgaagtcatctgcccttccatccctgg
ctatggcttctcagaggcatcctccaagaagggtacggggctgctagaggttccataac
tgccccgtcctcgccaagggtgggcccggtgttcccaccaggctctccttccggcgggg
tgagcagggagttggcccgaggaagctgggaaaggaggggcctgagaggccggccccag
acacaccgccctccggggctggagatgccacccctatatttgggctccaggattccttc
ttgcctctgtgagcttttctgacctccacctgggggtaggcgggcctgagaaatttcat
agaacaccagagggcccaagg

FIGURE 10nn

47897 (SEQ ID NO:40)
TTTCTGGATCACGTTTTCATATATTCTGGTTCAGTACATCTATCTTTGAGTTATCTTTA
ATATACTGAACCAGAACATACAGGAATGTGATCCAGAACATCATTGGCCATCAGATTTT
CTAGTATATGTGATGTGCACCTCTTATAAATTATAATTGAATTCACTGCCATATCTCCA
AGGGGTGTCACTCTTGTACTCCAGAAGATACTGGTTATGCACAAGAAATCATGCAGGGA
CAAATAGACAGATACCATTTAGTGTTTTGATTTATTCTGAGGGAATTTTAAATTTGTAA
TATGTATCTTAATCATTAAATATTTTTCTTAACCCACTTTTCTTTTTTCATACTGTATC
TGCCAAAACCATTTGCTAGCATAGAAAAGAGGGATTTCTTTCTGTATTTCTCTTAGACA
TTTGTATCCAGTGTAAATAAACATCCTGATTTTGCAACTACTGGCCAGTGGGATGTTAC
CACTGAAAGGGATGGTAAAAAAGAATCGGCTGTCTTTGATGCTGTAATGGTTTGTTCCG
GACATCATGTGTATCCCAACCTACCAAAA[ag]AGTCCTTTCCAGGTAAGGCCAAAATT
TAAGCTGCTAGCCACATAACTGACAAAAATGAATATCTTGATAATGTCTTCTTTTTTCT
AAAAGTATAAGCAGGTTAAATTAAAATATACTTCTGTTATATCTAATATGCTTGGTGTG
TTAAAATAGCACATTATTGTGACTGCATCTATTCACAAGGTCGCTTCTGTTAAAGTCTT
TGTTTAAATATATGACTCAAACTGCCATGTATTTCTCACTTTTCACTCAGGACTAAACC
ACTTTAAAGGCAAATGCTTCCACAGCAGGGACTATAAAGAACCAGGTGTATTCAATGGA
AAGCGTGTCCTGGTGGTTGGCCTGGGGAATTCGGGCTGTGATATTGCCACAGAACTCAG
CCGCACAGCAGAACAGGTACTACTCCCCGGGTACTCGGGTGACTCTCGTTACTGACAGA
AGAGTTATTATCGTTTGAAAG tttctggatcacgttttcatatattctggttcagtacatctatctttgagttatcttta
atatactgaaccagaacatacaggaatgtgatccagaacatcattggccatcagatttt
ctagtatatgtgatgtgcacctcttataaattataattgaattcactgccatatctcca
aggggtgtcactcttgtactccagaagatactggttatgcacaagaaatcatgcaggga
caaatagacagataccatttagtgttttgatttattctgagggaattttaaatttgtaa
tatgtatcttaatcattaaatatttttcttaacccacttttcttttttcatactgtatc
tgccaaaaccatttgctagcatagaaaagagggatttctttctgtatttctcttagaca
tttgtatccagtgtaaataaacatcctgattttgcaactactggccagtgggatgttac
cactgaaagggatggtaaaaaagaatcggctgtctttgatgctgtaatgGTTTGTTCCG
GACATCATGTGTATCCCAACCTACCAAAA[ag]AGTCCTTTCCAGGTAAGGCCAAAATT
TAAGCTGCTAGCCacataactgacaaaaatgaatatcttgataatgtcttcttttttct
aaaagtataagcaggttaaattaaaatatacttctgttatatctaatatgcttggtgtg
ttaaaatagcacattattgtgactgcatctattcacaaggtcgcttctgttaaagtctt
tgtttaaatatatgactcaaactgccatgtatttctcacttttcactcaggactaaacc
actttaaaggcaaatgcttccacagcagggactataaagaaccaggtgtattcaatgga
aagcgtgtcctggtggttggcctggggaattcgggctgtgatattgccacagaactcag
ccgcacagcagaacaggtactactccccgggtactcgggtgactctcgttactgacaga
agagttattatcgtttgaaag

FIGURE 10oo

47899 (SEQ ID NO:41)
TCAAAGAAAATCCAACATTAAAATGTATGCCTTACGATAGGCTTGTGTTCTTATTTGCT
GCCTTCTCTCTCTATGCTGTGCAGCTAGGCTGTAATTTTAAATGCATGTCTTGGATTTT
ATTCTACAAGAAAAGGAATGCATCTGTTTCCATTCCTTACCCTTGGCTGGGGGATAATT
TTAATGTTGGGTTTGAACCCCACGAAAGAATGTTATATTTGCTCTATCTTTTGGTAGAA
ATTAGATTGGTAACCTCGTAGGTCCACAAAAGTAAACTTTCACTTTAAGGGAAAATGAG
TAAGCAAGTAAATATTGCTAGGACTACCACTGGGAAAATAATTTAAAGGCTATGTCACA
CTGGAGGTTGGGTAAGTGGTTTAGAGGGGTGCGGGTTAAGACATTCGGGGGCATAATAC
TAAGGAGAGCATCCCCAACCCTAAACATCTTCAAAATGATCAGGGCTTATGGGCACTAT
TTGACGAGCATAAGAACTTAATAATGTCAAGAGAAATTTTAGACCTATTTAATACATTT
ATAAGCAAGTTTTGAGCCAGGCTTAGACT[ct]TTACCTGTTCCTCTTGGTATTCATCA
ACCACTGCACAAAATCTTGGGCACGCCTGGAGTCCAGATACTTGCTGTAGTCACTGGTG
AATGTGCCCTGTGAATGGCGCTTGTCCTCGTTCATCTGATCAGGATCACTGAGTGGGTC
TGCCTGGGAAGCTGAGAATGATCTGTGAAGAACAGTGATTGGTACAACATAAATCTCTC
CTCAAGAGTAGACTCACTTGAGAAGCATCTTCACTACAAAATACAAGACCATATAAAAC
AGTAAGGCAGGCATCTAGAGTATTTCAATAGGTAGTTTAGAAAGATCTTCCTTAGCTTG
TCATGAGAATCCCTTCGTTTTAGTATAGTTGCATACGCTATTATTCTGAATTCTAGAAA
CATGTTTCTCAACTGACTTCTTTTTTTCTGAAATAGGATTAAACAAATCTTTTTCTACT
AATTAATCTACTCATGATTAT tcaaagaaaatccaacattaaaatgtatgccttacgataggcttgtgttcttatttgct
gccttctctctctatgctgtgcagctaggctgtaattttaaatgcatgtcttggatttt
attctacaagaaaaggaatgcatctgtttccattccttacccttggctgggggataatt
ttaatgttgggtttgaaccccacgaaagaatgttatatttgctctatcttttggtagaa
attagattggtaacctcgtaggtccacaaaagtaaactttcactttaagggaaaatgag
taagcaagtaaatattgctaggactaccactgggaaaataatttaaaggctatgtcaca
ctggaggttgggtaagtggtttagaggggtgcgggttaagacattcgggggcataatac
taaggagagcatccccaaccctaaacatcttcaaaatgatcagggcttatgggcactat
ttgacgagcataagaacttaataatgtcaagagaaattttagaCCTATTTAATACATTT
ATAAGCAAGTTTTGAGCCAGGCTTAGACT[ct]TTACCTGTTCCTCTTGGTATTCATCA
ACCACTGCACAAAATCTTGggcacgcctggagtccagatacttgctgtagtcactggtg
aatgtgccctgtgaatggcgcttgtcctcgttcatctgatcaggatcactgagtgggtc
tgcctgggaagctgagaatgatctgtgaagaacagtgattggtacaacataaatctctc
ctcaagagtagactcacttgagaagcatcttcactacaaaatacaagaccatataaaac
agtaaggcaggcatctagagtatttcaataggtagtttagaaagatcttccttagcttg
tcatgagaatcccttcgttttagtatagttgcatacgctattattctgaattctagaaa
catgtttctcaactgacttctttttttctgaaataggattaaacaaatctttttctact
aattaatctactcatgattat

FIGURE 10pp

47901 (SEQ ID NO:42)
TCTGCCTGTCCGTCTGCCTGTCTGTCTGCCTGTCCATCTGTCCATCTGCCTATCCATCT
GCCTGCCTGTCTGTCGGCCTGCCTGCCTGCCTGTCTGTCTGCTGCCTGTCTGTCCGTCT
GCCTGTCTGCCTGTCCGTCTGCCTGCCTGTCCGTCTGCCTGTCCGTCTGCCTGCCTGCC
TGTCTGTCTGCCTGCCTGTCTGCCTGCCTGTCCGTCTGCCTGTCCGTCTGCCTGCCTGT
CTGCCTGCCTGTCTGCCTGTCTGCCCGTCTGCCTGTCTGTCTGCCTGTCCGTCTGCCTG
TCTGTCCGTCTGTCCATCTGCCTATCCATCTGCCTGCCTATCTGTCTGTCCGTCTGCCT
GCCTGTCTGTCTGCCTGTCTGCCTGTCTGTCTGCCTGTCTGTCCATCTGCCTATCCATC
TACCTGCCTGCCTGTCTGCCTGTCTGTCTGCCTGTCTGTCTGCCTGCCTGTCTGTCTGT
CTGTCTGGTTGCTTGTGCATGTGTCCCCCAGCCACAGGTCCCCTCCGCTCAGGTGATGG
ACTTCCTGTTTGAGAAGTGGAAGCTCTAC[ag]GTGACCAGTGTCACCACAACCTGAGC
CTGCTGCCCCCTCCCACGGGTGAGCCCCCCACCCAGAGCCTTTCAGCCTGTGCCTGGCC
TCAGCACTTCCTGAGTTCTCTTCATGGGAAGGTTCCTGGGTGCTTATGCAGCCTTTGAG
GACCCCGCCAAGGGGCCCTGTCATTCCTCAGGCCCCCACCACCGTGGGCAGGTGAGGTA
ACGAGGTAACTGAGCCACAGAGCTGGGGACTTGCCTCAGGCCGCAGAGCCAGGAAATAA
CAGAACGGTGGCATTGCCCCAGAACCGGCTGCTGCTGCTGCCCCCAGGCCCAGATGGGT
AATACCACCTACAGCCCCGTGGAGTTTTCAGTGGGCAGACAGTGCCAGGGCGTGGAAGC
TGGGACCCAGGGGCCTGGGAGGGCTCGGGTGGAGAGTGTATATCATGGCCTGGACACTT
GGGGTGCAGGGAGAGGATAGG tctgcctgtccgtctgcctgtctgtctgcctgtccatctgtccatctgcctatccatct
gcctgcctgtctgtcggcctgcctgcctgcctgtctgtctgctgcctgtctgtccgtct
gcctgtctgcctgtccgtctgcctgcctgtccgtctgcctgtccgtctgcctgcctgcc
tgtctgtctgcctgcctgtctgcctgcctgtccgtctgcctgtccgtctgcctgcctgt
ctgcctgcctgtctgcctgtctgcccgtctgcctgtctgtctgcctgtccgtctgcctg
tctgtccgtctgtccatctgcctatccatctgcctgcctatctgtctgtccgtctgcct
gcctgtctgtctgcctgtctgcctgtctgtctgcctgtctgtccatctgcctatccatc
tacctgcctgcctgtctgcctgtctgtctgcctgtctgtctgcctgcctgtctgtctgt
ctgtctggttgcttgtgcatgtgtcccccagccacaggtcccctccgctcaggtgatgG
ACTTCCTGTTTGAGAAGTGGAAGCTCTAC[ag]GTGACCAGTGTCACCACAACCTGAGC
CTGCtgccccctcccacgggtgagccccccacccagagcctttcagcctgtgcctggcc
tcagcacttcctgagttctcttcatgggaaggttcctgggtgcttatgcagcctttgag
gaccccgccaaggggccctgtcattcctcaggcccccaccaccgtgggcaggtgaggta
acgaggtaactgagccacagagctggggacttgcctcaggccgcagagccaggaaataa
cagaacggtggcattgccccagaaccggctgctgctgctgcccccaggcccagatgggt
aataccacctacagccccgtggagttttcagtgggcagacagtgccagggcgtggaagc
tgggacccaggggcctgggagggctcgggtggagagtgtatatcatggcctggacactt
ggggtgcagggagaggatagg

FIGURE 10qq

47905 (SEQ ID NO:43)
CTGCTTTCCAAATCAGCTTGGAGAGACAGGCTGACTCCTTTCCCTCTTCCTCAGGCATC
CTCTCTGGCCACGATAACAGGGTGAGCTGCCTGGGAGTCACAGCTGACGGGATGGCTGT
GGCCACAGGTTCCTGGGACAGCTTCCTCAAAATCTGGAACTGAGGAGGCTGGAGAAAGG
GAAGTGGAAGGCAGTGAACACACTCAGCAGCCCCCTGCCCGACCCCATCTCATTCAGGT
GTTCTCTTCTATATTCCGGGTGCCATTCCCACTAAGCTTTCTCCTTTGAGGGCAGTGGG
GAGCATGGGACTGTGCCTTTGGGAGGCAGCATCAGGGACACAGGGGCAAAGAACTGCCC
CATCTCCTCCCATGGCCTTCCCTCCCCACAGTCCTCACAGCCTCTCCCTTAATGAGCAA
GGACAACCTGCCCCTCCCCAGCCCTTTGCAGGCCCAGCAGACTTGAGTCTGAGGCCCCA
GGCCCTAGGATTCCTCCCCCAGAGCCACTACCTTTGTCCAGGCCTGGGTGGTATAGGGC
GTTTGGCCCTGTGACTATGGCTCTGGCAC[ct]ACTAGGGTCCTGGCCCTCTTCTTATT
CATGCTTTCTCCTTTTTCTACCTTTTTTTCTCTCCTAAGACACCTGCAATAAAGTGTAG
CACCCTGGTACATCTGTGATGTTTGCCTTCTACTCTCTTCTGTTCCAAAAAGACCCAGG
TCCCATTTAAGGGCAGTAATGTGTTACAGGTGCTGTGATAAAGGCTGGGTACTGGATAG
CTTGTGGGCTTATGGGAGGAGGCCTGAGATGGGTCAGGGGGAGAAGGTATTCAGCAGGT
GGCTGGGGGACTGTGTGCAGCAGTTCGCTATGGCCTGCCTGTGGTGCCCATGTGTTTGT
ACGGGAGGGTTAGCTTGAGAAGGAATCAGATTATAAAAGGTCTTGAATGTCAAGCCAGA
GAGTCCAGACTTTTTCCTAAGGGCAATGAGAAGCCATTGAGGAGTTCTGAGCAGAGTAG
TAACATGATCAGTTATGCTTC ctgctttccaaatcagcttggagagacaggctgactcctttccctcttcctcaggcatc
ctctctggccacgataacagggtgagctgcctgggagtcacagctgacgggatggctgt
ggccacaggttcctgggacagcttcctcaaaatctggaactgaggaggctggagaaagg
gaagtggaaggcagtgaacacactcagcagccccctgcccgaccccatctcattcaggt
gttctcttctatattccgggtgccattcccactaagctttctcctttgagggcagtggg
gagcatgggactgtgcctttgggaggcagcatcagggacacaggggcaaagaactgccc
catctcctcccatggccttccctccccacagtcctcacagcctctcccttaatgagcaa
ggacaacctgcccctccccagccctttgcaggcccagcagacttgagtctgaggcccca
ggccctaggattcctcccccagagccactacctttgtccaggcctgggtggTATAGGGC
GTTTGGCCCTGTGACTATGGCTCTGGCAC[ct]ACTAGGGTCCTGGCCCTCTTCTTATT
CATGCTTTCTCctttttctacctttttttctctcctaagacacctgcaataaagtgtag
caccctggtacatctgtgatgtttgccttctactctcttctgttccaaaaagacccagg
tcccatttaagggcagtaatgtgttacaggtgctgtgataaaggctgggtactggatag
cttgtgggcttatgggaggaggcctgagatgggtcagggggagaaggtattcagcaggt
ggctgggggactgtgtgcagcagttcgctatggcctgcctgtggtgcccatgtgtttgt
acgggagggttagcttgagaaggaatcagattataaaaggtcttgaatgtcaagccaga
gagtccagactttttcctaagggcaatgagaagccattgaggagttctgagcagagtag
taacatgatcagttatgcttc

FIGURE 10rr 47906 (SEQ ID NO:44)
ACCATTGTTCCTGTTTTGCAAAGAAGGCAACAGGCTCAGAGAAGGCCAGTGCCTCGCCC
CAAGACATGCTAGCTCTGACTAGGATGCCATGACCACGCTGTCCCCTGCCCACTACACT
CACCCGGTGTGTAGCCCCAAGGCTCATAGTAGGAGGGGAAGACTCCAAGGTGACAGCCA
CGGACAAACTCCTCATAGTCCACAGGGAGCAGGGGGCTTGTGGAGGAGAGGAACTCCGG
GTGGAAAATCACCTGGTAGTGAAAAAGAAGGACTCAGCCCAAGTGCCTTATTTAGCTAA
GCCCTGAGATCCCAAGGTGGCCCAGAGAGGGTAAAAAGCTTGTCTAGCATCACACAGCA
TGTGTTTGGCAGGACCAATGTTCAAACCCAGGTCTGCCTGCCTCAGAAGCCAGGGTTCT
TTCTAACCACAGCAATACCTTTGATAAAACTTATAGGGGAATGGAGTGTGTGAGGCCCA
GGACCCAACCCCTTCCCTCTGCCGTGCCCAACCCAGCCCTGACCAAATGCCCTCACCTT
CACCCTGTCGGCACTGCTATTGAAGAGGC[tc]GATTCGGCGGATGGTGGTCAGGATGG
GGTCTGAGGAGTCATCCAGCATATTGTGGGTGCACACAGGGGGGAAAGACTGCCGCTGC
AGGAGCCACAAGAAGGGTAAGGGGTCATGGAAGGGACAGAGAACTCCCTACTTCCTCAT
GAGCCATGCGGACCCTGGGGGAGCCAAGGAGACCACAAATGCACCGGACGTGGGGCAAC
AAACCCAAGTGATCACCAGGAGTTGTGGATTCCCACTAGTACAACCTGTAAAGGTTTTC
TTTCTTTTCTTTTAAATTATTATTATTTATTTTTGAGGCGGAGTCTCGCTCTGTCGCCC
AGGCTGGAATGCAGTGGCACAATCTCGGCTCACTGCAAGCTCCACCTCCCAGGATCATG
CCATTCTCCTGCCTCAGCCTCCCGAGTAGCTGGAACTACAGGCGCCTACCACCACGCCC
GGTTAATTTTTTGTATTTTTA accattgttcctgttttgcaaagaaggcaacaggctcagagaaggccagtgcctcgccc
caagacatgctagctctgactaggatgccatgaccacgctgtcccctgcccactacact
cacccggtgtgtagccccaaggctcatagtaggaggggaagactccaaggtgacagcca
cggacaaactcctcatagtccacagggagcagggggcttgtggaggagaggaactccgg
gtggaaaatcacctggtagtgaaaaagaaggactcagcccaagtgccttatttagctaa
gccctgagatcccaaggtggcccagagagggtaaaaagcttgtctagcatcacacagca
tgtgtttggcaggaccaatgttcaaacccaggtctgcctgcctcagaagccagggttct
ttctaaccacagcaatacctttgataaaacttataggggaatggagtgtgtgaggccca
ggacccaaccccttccctctgccgtgcccaacccagccctgaccaaatgccctcacctt
caCCCTGTCGGCACTGCTATTGAAGAGGC[tc]GATTCGGCGGATGGTGGTCAGGATGG
Ggtctgaggagtcatccagcatattgtgggtgcacacaggggggaaagactgccgctgc
aggagccacaagaagggtaaggggtcatggaagggacagagaactccctacttcctcat
gagccatgcggaccctgggggagccaaggagaccacaaatgcaccggacgtggggcaac
aaacccaagtgatcaccaggagttgtggattcccactagtacaacctgtaaaggttttc
tttcttttcttttaaattattattatttatttttgaggcggagtctcgctctgtcgccc
aggctggaatgcagtggcacaatctcggctcactgcaagctccacctcccaggatcatg
ccattctcctgcctcagcctcccgagtagctggaactacaggcgcctaccaccacgccc
ggttaattttttgtattttta

FIGURE 10ss

47909 (SEQ ID NO:45)
CAAACTCACAGTTGGATGGCACAACAATTACATCCTGTGTGGTCAGCAGTGATGGAGGG
GCCGCAGAGATTTGGAAACAGGAGGGACACAGGATACAGATATAGGAGGGTAGAAGGCA
GACTTCCTGGAGGAGGTGAAACCTAACCTGAGTCCCTAAGGTGATAGGAAGCAGGAACC
AGGGAAGGGGAGCCTATTCTAACACAGTAGAAGCAGCAACTGCTGAGGTCTGGATGAGG
GGACCTCAACTGTGGCCCAAAACCCCAAGTTCCCATTGTGGCTCTGCCAACAACTGGCT
GTGCGACCCAGGACAAGTCCTATCTTTGCACTGTGTCTGGGTTTCCCCGTGTGTAAGAT
GAGGCGGTTGCTAGGTGCTTATTGGATGCATTCCTCAAGTCCCGCCCTCCATCTCCTAT
TCCCCTCTCTTCTGGTTTAGTGCTTTAGGAAATGTGGCAGAAATCTTTTTCTGCCTGTG
TCTAGGAAATCATAATTCATGCTGGCGTACCCTGGTTGTTGAGGTCCCTGAATCCTTGT
GCCCACACTGCTGAAGACTCCTTGTGTGA[ct]ACAAGTCAGGGGACATCTGGGTCTTG
ACTCCCCAGATGCTCCAGCTGGACCCTGCTGCCCTCCCTTGCCCACCCTCTTCCATTGT
AGATGCCAAGGGGCTGAGCGATCCAGGGAAGATCAAGCGGCTGCGTTCCCAGGTGCAGG
TGAGCTTGGAGGACTACATCAACGACCGCCAGTATGACTCGCGTGGCCGCTTTGGAGAG
CTGCTGCTGCTGCTGCCCACCTTGCAGAGCATCACCTGGCAGATGATCGAGCAGATCCA
GTTCATCAAGCTCTTCGGCATGGCCAAGATTGACAACCTGTTGCAGGAGATGCTGCTGG
GAGGTCCGTGCCAAGCCCAGGAGGGGCGGGGTTGGAGTGGGGACTCCCCAGGAGACAGG
CCTCACACAGTGAGCTCACCCCTCAGCTCCTTGGCTTCCCCACTGTGCCGCTTTGGGCA
AGTTGCTTAACCTGTCTGTGC caaactcacagttggatggcacaacaattacatcctgtgtggtcagcagtgatggaggg
gccgcagagatttggaaacaggagggacacaggatacagatataggagggtagaaggca
gacttcctggaggaggtgaaacctaacctgagtccctaaggtgataggaagcaggaacc
agggaaggggagcctattctaacacagtagaagcagcaactgctgaggtctggatgagg
ggacctcaactgtggcccaaaaccccaagttcccattgtggctctgccaacaactggct
gtgcgacccaggacaagtcctatctttgcactgtgtctgggtttccccgtgtgtaagat
gaggcggttgctaggtgcttattggatgcattcctcaagtcccgccctccatctcctat
tcccctctcttctggtttagtgctttaggaaatgtggcagaaatctttttctgcctgtg
tctaggaaatcataattcatgctggcgtaccctggttgttgaggtccctgaatcctTGT
GCCCACACTGCTGAAGACTCCTTGTGTGA[ct]ACAAGTCAGGGGACATCTGGGTCTTG
ACTCCCcagatgctccagctggaccctgctgccctcccttgcccaccctcttccattgt
agatgccaaggggctgagcgatccagggaagatcaagcggctgcgttcccaggtgcagg
tgagcttggaggactacatcaacgaccgccagtatgactcgcgtggccgctttggagag
ctgctgctgctgctgcccaccttgcagagcatcacctggcagatgatcgagcagatcca
gttcatcaagctcttcggcatggccaagattgacaacctgttgcaggagatgctgctgg
gaggtccgtgccaagcccaggaggggcggggttggagtggggactccccaggagacagg
cctcacacagtgagctcacccctcagctccttggcttccccactgtgccgctttgggca
agttgcttaacctgtctgtgc

FIGURE 10tt

47910 (SEQ ID NO:46)
TCATTTTTACACAGGATGTACGCGTTTTGAAGCACAAAACTCTCCAGTGATCACAGGTC
ATAGACTGTCTGATTTTTATGTGAAATCCCATTTTAAGAGTAAAATATAAGTAACATAG
TAGGCTCTAGTCTATAAACAAAGACTTCTATTTATAGTTTGTTTGCCCCCTGAGCCCCA
TCTCATCTGCTGGTGGCATGCACATGCTCTTTATTACCAGTGCGAATATAGCTGGGAAA
CTAATGCCACTCACCATACAGGATGGTTAACATGGACACGGGCATGACAAGGAAACCCA
GCAGCATATCAGCTATGGCAAGTGACATCAGGAAATAGTTGGTGGCATTCTGCAGCTTT
TTCTCTAGGGACACTGCCATGATGACGAGTATGTTTCCAGCAATAGTTAGAATAATCAC
TACGGCTGTCAGTAAAGCAGACCAGTTTTTTTCCTGGAGATGAAGTAAGGAGAGACACG
ACGGTGAGAGGCACCCTTCACAGGAAAGGTTGGTTCGATTTTCAGAGTCGACTGTCCAG
TTAAATGCATCAGAAGTGTTAGCTTCTCC[ga]GAGTTAAAGTCATTACTGTAGAGCCT
GGTGTCATCATTTAATTGCATTAGGGAGTTCGTAGTTGAGCTCAAAGAAGTATTTTCTT
CACAAAGAATATCCATGTCTAAGCCAGAACTTGTAGCAGATGAGGTGTAGAAGGACTAA
CAGGTTATAGTTTCTGCTCACCATTCACCTTGATGTACCCACACTCTGTAACACTGAGG
CTGGTGTACATGCTGTTCTCCCGGGGCTGGATTTTTGTCTTCCATTATTACAATGATAG
TTAAAGAACTGAACTGTGGTGGCTGTAAGTTTTCTTCATTCACAATTTTAGGAGAGTCC
ACTGTTTGGTTTTATTATTTTCTCACCAAACCGAGGACAAAAAAGCAGAATGAACTTTT
AGCATAGAGGTTGCAGGGTTTTTTTTGAGCGCTCGGGAAGATAAATGTCCTGGACAAAG
AAGAAAAGTTTTATAACTACT tcatttttacacaggatgtacgcgttttgaagcacaaaactctccagtgatcacaggtc
atagactgtctgatttttatgtgaaatcccattttaagagtaaaatataagtaacatag
taggctctagtctataaacaaagacttctatttatagtttgtttgcccccctgagcccca
tctcatctgctggtggcatgcacatgctctttattaccagtgcgaatatagctgggaaa
ctaatgccactcaccatacaggatggttaacatggacacgggcatgacaaggaaaccca
gcagcatatcagctatggcaagtgacatcaggaaatagttggtggcattctgcagcttt
ttctctagggacactgccatgatgacgagtatgtttccagcaatagttagaataatcac
tacggctgtcagtaaagcagaccagtttttttcctggagatgaagtaaggagagacacg
acggtgagaggcacccttcacaggaaaggttggttCGATTTTCAGAGTCGACTGTCCAG
TTAAATGCATCAGAAGTGTTAGCTTCTCC[ga]GAGTTAAAGTCATTACTGTAGAGCCT
GGTGTCATCATTTAATTGCATTAGGGAgttcgtagttgagctcaaagaagtattttctt
cacaaagaatatccatgtctaagccagaacttgtagcagatgaggtgtagaaggactaa
caggttatagtttctgctcaccattcaccttgatgtacccacactctgtaacactgagg
ctggtgtacatgctgttctcccggggctggatttttgtcttccattattacaatgatag
ttaaagaactgaactgtggtggctgtaagttttcttcattcacaattttaggagagtcc
actgtttggttttattattttctcaccaaaccgaggacaaaaaagcagaatgaactttt
agcatagaggttgcagggttttttttgagcgctcgggaagataaatgtcctggacaaag
aagaaaagttttataactact

FIGURE 10uu

47915 (SEQ ID NO:47)
GAAGATTGTGGAAAATGATGGAAGATTCCGGAAAGTGGTGGAAGATTCCAGAAAATGAT
GGAAGATTCCAGAAAGTGATGAAAGATTCTGGAAAGCAATGAAACATTCCAGAAAGTGA
TGAGACAGTGATAGAGTCTGGTTCCAGGCGAAGTGGGAGAGGATGGGATTTGAGAAGGG
AATGATCCCTCCTCACACCTCTAGGATGGGAAGCTTAGTGGAGTGAGGGGTGGGTAGGA
GGTTACACCCTGTGTCCTCTGTCGCTCTGTGCAGGAGGAGGAGGCAGAGAAAGGGAAGG
GTCAGGAAAGCCAGCCCATGTCCCACCCCCACTGGACTCACCACGTGATGGCAGGTGAA
GCCCTTCATGACCGAGGCCTCATTGAGGAACTCAATCCGCTCTCGGAGACTGGCTGACT
CGTTGACCGTCTTCACCGCCACGCGGGTCTCTGCCTCACCCTTGATGATGTCCCTGGCA
TTGCCCTCATACACCATGCCGAAGGAGCCCTGCCCCAGCTCTCGAAGGAGGGTGATCTT
CTCTCGAGACACCTCCCACTCGTCCGGCA[ct]GTACACAGAGCATGGAAACACTACTT
CTTACTTATCTACACAGCATCCTTGGAGGATCCCTTGGGGGTCTGCAGCCACCTTCCAC
CCAAGCCCTCACCCAAACCCCCTCGAAAACACTCATGAAATGAGTTCTGTGATCCAGGA
CCCATGCCGGGCACTGGGCATATGGCCGAGAACAGGACAGGCATCTGCACCCATGGAGA
GGGCATGGCAGAGACTCAAGGAAGGAGCCACAACTGGTCCAAGATCCTGGCCAATATGT
CCTGAGGCAAACCTGCATCCCCATCCTTCTTGTCTGATTTCAGACCCTTGCTATGGAAT
GATGCTACTTCCCACCTGAGACTACTGTTTCTGCAAAGTGCCAAGGGGATGGAAGACAG
GTTGTAATAGGTTGGGGAAAAAAAAAGCCAGGATACTTGGAGCTCTTCCCATGAAAAGG
TGGAGTCTATCTCACCACCCC gaagattgtggaaaatgatggaagattccggaaagtggtggaagattccagaaaatgat
ggaagattccagaaagtgatgaaagattctggaaagcaatgaaacattccagaaagtga
tgagacagtgatagagtctggttccaggcgaagtgggagaggatgggatttgagaaggg
aatgatccctcctcacacctctaggatgggaagcttagtggagtgaggggtgggtagga
ggttacaccctgtgtcctctgtcgctctgtgcaggaggaggaggcagagaaagggaagg
gtcaggaaagccagcccatgtcccacccccactggactcaccacgtgatggcaggtgaa
gcccttcatgaccgaggcctcattgaggaactcaatccgctctcggagactggctgact
cgttgaccgtcttcaccgccacgcgggtctctgcctcacccttgatgatgtccctggca
ttgccctcatacaccatgccgaaggagccctgccccagCTCTCGAAGGAGGGTGATCTT
CTCTCGAGACACCTCCCACTCGTCCGGCA[ct]GTACACAGAGCATGGAAACACTACTT
CTTACTTATCTACACAGCATCCTTggaggatcccttgggggtctgcagccaccttccac
ccaagccctcacccaaaccccctcgaaaacactcatgaaatgagttctgtgatccagga
cccatgccgggcactgggcatatggccgagaacaggacaggcatctgcacccatggaga
gggcatggcagagactcaaggaaggagccacaactggtccaagatcctggccaatatgt
cctgaggcaaacctgcatccccatccttcttgtctgatttcagacccttgctatggaat
gatgctacttcccacctgagactactgtttctgcaaagtgccaaggggatggaagacag
gttgtaataggttggggaaaaaaaaagccaggatacttggagctcttcccatgaaaagg
tggagtctatctcaccacccc

FIGURE 10vv

47917 (SEQ ID NO:48)
TGTATTTTTGTAGAGATGGGGTTTCACCATGTTGGCCAGGCTGGTCTCAAACTCCTGGC
CTCAAGTGATCTGCCTGCCTCGGCCTCCCAAAGTGCTTGGATTACAGGTGTGAGCCACT
GTACCCAGCAATTTATAAGGTTTTAAGACTCAAATAACTCCTTCTAAAGTGAAATGAGT
CTCCTGTTGTGGTGGGAGGCAGACATCATTCAACTTAGAGGACACAGCTGGAAAGCAAT
GTGAGAAACTAAGAAAAGTAACAAGCTGGTAGATTGGCATTTCTGACCCATCTTCCTGC
GAAGTCAGGTATCAAGGCTTTAAGTACTAATAGCACAGTACCTGATGAGAGAAGCACTG
GAATCAAAATTTCAGCAGAGGAAGGAGGTACCAAGTGCAACTCTGAAGGGGCATGCTGA
AGTGTGCAGGGGCATGCCCAAGAGTCAAGGGCCTTACCTCATCACCATATCGCCGATAA
CTCACTTCATACAGCACGATCAGACCATTGGGCTCCTTCGGCTCCTGCCACATCAAGTG
GACGACGTTGTTCTCAAAGATTTCATGCG[tc]CACAGGGCCAACAATGTCATCAGCCT
TGGCTGTAAGGAGAGGAAGTGAGAGGCAGGGATGTAACTCTTGGATGAGATCCCACTTC
TGCCACCTGTCCATGGTGCAACCTTGGGCTGGTGACGTCATTTTCCCACAACCCATTTT
CCTCGTCAGAGAACGGACATCTAAAACTCATCCCACAAGATTGTTAGGAAGATTAAATG
GGTTACTTTCTGCGTATAACTTTTTTTTTTTTTGAGACAGAGTCTTGCTCTGTCACCC
AGGCGGGAGTGCAGTGGTGTATTTTCTAAAGTTTACATAATGATTGCCTATGACTCATA
ATTTTAAAATATGACCTGGCATGGTGGCTCATGCCTGTAATCCCAGCACTTTGGGAGCT
CAAGGTTGGCGGACCACTTGAGCTCAGGCATTGGAGACCAGCCTGGGCAACATGGTGGA
ACCATCTCTACTGAAAATACA tgtatttttgtagagatggggtttcaccatgttggccaggctggtctcaaactcctggc
ctcaagtgatctgcctgcctcggcctcccaaagtgcttggattacaggtgtgagccact
gtacccagcaatttataaggttttaagactcaaataactccttctaaagtgaaatgagt
ctcctgttgtggtgggaggcagacatcattcaacttagaggacacagctggaaagcaat
gtgagaaactaagaaaagtaacaagctggtagattggcatttctgacccatcttcctgc
gaagtcaggtatcaaggctttaagtactaatagcacagtacctgatgagagaagcactg
gaatcaaaatttcagcagaggaaggaggtaccaagtgcaactctgaaggggcatgctga
agtgtgcaggggcatgcccaagagtcaagggccttacctcatcaccatatcgccgataa
ctcacttcatacagcacgatcagaccattgggctccttcggctcctgccacatcaagtG
GACGACGTTGTTCTCAAAGATTTCATGCG[tc]CACAGGGCCAACAATGTCATCAGCCT
TGGCtgtaaggagaggaagtgagaggcagggatgtaactcttggatgagatcccacttc
tgccacctgtccatggtgcaaccttgggctggtgacgtcattttcccacaacccatttt
cctcgtcagagaacggacatctaaaactcatcccacaagattgttaggaagattaaatg
ggttactttctgcgtataactttttttttttttgagacagagtcttgctctgtcaccc
aggcgggagtgcagtggtgtattttctaaagtttacataatgattgcctatgactcata
attttaaaatatgacctggcatggtggctcatgcctgtaatcccagcactttgggagct
caaggttggcggaccacttgagctcaggcattggagaccagcctgggcaacatggtgga
accatctctactgaaaataca

FIGURE 10ww

47920 (SEQ ID NO:49)
GACTGAGGTTCACCCGGGTGAAGGCGCTCATGCCCCCAGGTCCTTGTGGCCCCCCAGC
AGGGACGAGTGGGCAGCCAGCTCTGCTGCCCCTTGAGGCCCAGTCGGGGAAGCAGAGGC
TGCTGAGGATGAGGAGGCAGCAGCCATGGTGGCCCTGGGCAGGCTCACCTCCTCTGCAG
CAATGCCTGTTCGCATGTCAGCATAGCTTACAGGGGCAGCTGGCGAGGTGTCCACGTAG
CTCTGACGGGGACAACTCATCTGCATGGTCATGTAGTCACCCCGGCTGCTGGGCACTGC
CCGGGTAGGCCTGCAAATGCTAGCAGCCCCGGGAGGTGCAGGGCCCAGTCTGCCCATCT
CGACCCCAGTGCTCTCCTGCCAGGCTGCCCTCCGCCCGGCCCCAGGTCCATCTTCATGT
ACTCCTCAGTGCCAGTCTCTTCCTCTCTGGGAGCTGGCTGGAGCTGGGATGGACACCTG
ACAGAAGGTGAGCTGTGGAAAGCCACCGGGCCAGACAAGTAGCCAGACTGATCACTCCC
AAATTCAATATTGACATATTCCCCCGGGC[tc]CTTGGGCTCTGGAGGGTGCAGCAAGG
GCTGCTGCTGCTGCTGCTGCTCTCGGGCCCGAGGTAAGGTGCTGGCCTTGGGATCCCCC
AGGGACAGCCTCGTGGGCCGGGCCAGGCGGCTATTGGTCTGAGCAGCTGTGTCCACCTT
TCGAGGCAGATGGGGCTGCAGAACCTGATGGTGGGGATGTGGAAGGCTGGGCTCCAGCC
TAGCCCCGCAGTATCCCCCACCCAGGCTGTCGCTGCTGGTGGAAGAGGAAGAATCATCT
GCTGTTGCAGCATAGAGAAGGCGACCAGAGCTAGTGGAAAGGCGGAGGTGCTGATGCCG
GGCACCCTCCTCCGGCTCCCCGGGGCGCTGGGTGTGCTTAAAGGATCTTGGCAATGAGT
AGTAGGAGAGGACTGGCTTGTGCTGGGGGTCCTCAGGGCCGTAGTAGCAGTCGGAGGGG
CTGCTGGTGTTGGAGTCCCCC gactgaggttcacccgggtgaaggcgctcatgcccccaggtccttgtggccccccagc
agggacgagtgggcagccagctctgctgccccttgaggcccagtcggggaagcagaggc
tgctgaggatgaggaggcagcagccatggtggccctgggcaggctcacctcctctgcag
caatgcctgttcgcatgtcagcatagcttacaggggcagctggcgaggtgtccacgtag
ctctgacggggacaactcatctgcatggtcatgtagtcaccccggctgctgggcactgc
ccgggtaggcctgcaaatgctagcagccccgggaggtgcagggcccagtctgcccatct
cgaccccagtgctctcctgccaggctgccctccgcccggccccaggtccatcttcatgt
actcctcagtgccagtctcttcctctctgggagctggctggagctgggatggacacctg
acagaaggtgagctgtggaaagccaccgggccagacaagtagccagactgatcactccc
aaaTTCAATATTGACATATTCCCCCGGGC[tc]CTTGGGCTCTGGAGGGTGCAGCAAGG
gctgctgctgctgctgctgctctcgggcccgaggtaaggtgctggccttgggatccccc
agggacagcctcgtgggccgggccaggcggctattggtctgagcagctgtgtccacctt
tcgaggcagatggggctgcagaacctgatggtggggatgtggaaggctgggctccagcc
tagccccgcagtatcccccacccaggctgtcgctgctggtggaagaggaagaatcatct
gctgttgcagcatagagaaggcgaccagagctagtggaaaggcggaggtgctgatgccg
ggcaccctcctccggctccccggggcgctgggtgtgcttaaaggatcttggcaatgagt
agtaggagaggactggcttgtgctgggggtcctcagggccgtagtagcagtcggagggg
ctgctggtgttggagtccccc

FIGURE 10xx

47922 (SEQ ID NO:50)
GATTGGGGATCTGGTGGAAGCGGATGAACTCCCGCACCCGCAGCATCTGTGTGTGGTAG
CGGGCTGTGCCCGAGTACAGCCGCTGGATGATGGCCGACACGTTGCCGAAGATGCTAGC
ATACATGAGGGCTGGGGGCGTGGGCACGTGGGGCCGTCAGCCTCTGCAGGGACCCCACC
CACCCACAGGGACCCTGCTCAGGCCCCGCACCAGGTCAGTGTCTCAGTCTCAGCGTCGA
CATGCCCACGAGACGCCCTTGTACATCTGCGCTCCAGCACACCCCACCCTTCAGTAGTC
CCCGCCCTGGTGACCCAGCCCCCAAACCATGTCACGATGGTGGCCCCTGGAGTCTCTAA
GTTCCAGGGCCTCACTCTGGCCCGGCTAGCAGCCTCAGTTTCCTCCAACTTGGGTTCCT
CCACCGTGGGCTCTCCCCGCCGCCCGCCCCTGGGCACACTCACAGCCAATGAGCATGAC
GCAGATGGAGAAGATCTTCTCTGAGTTGGTGTTGGGAGAGACGTTGCCGAAGCCCACAC
TGGTGAGGCTGCTGAAGGTGAAGTAGAGC[ga]CCGTCACATACTTGTCCTTGATGGAG
GGGCCGCCCAGGCCGCTGCTGTTGTAGGGTTTGCCTATCTGGTCGCCCAGGTTGTGCAG
CCAGCCGATGCGTGAGTCCATGTGTGGCTGCTCCATGTTGCCGATGGCGTACCAGATGC
AGGCTAGCCAGTGCGCGATGAGCGCAAAGGTGCACATGAGCAAGAACAGCACGGCCGCG
CCGTACTCTGAGTAGCGATCCAGCTTCCGCGCCACGCGCACCAGCCGCAGCAGCCGCGC
AGTCTTCAGCAGCCCGATCAGCTGGGGGACAGGGAAGGGGCACATTCCGTTGATGGGGC
AAGGGGGGCAAGGGAGGAGGGGAGGTGCTGCGGCCCTCAGAGCGAGCATCAGAGGTCAG
ATCCCCAAAGACTTCCTAGACCCTCCTCCTAAGAGGTGAAGCCCACACTGGGCCCAGCA
CAGGTGTCTCATTAATCTTAG gattggggatctggtggaagcggatgaactcccgcacccgcagcatctgtgtgtggtag
cgggctgtgcccgagtacagccgctggatgatggccgacacgttgccgaagatgctagc
atacatgagggctgggggcgtgggcacgtggggccgtcagcctctgcagggaccccacc
cacccacagggaccctgctcaggccccgcaccaggtcagtgtctcagtctcagcgtcga
catgcccacgagacgcccttgtacatctgcgctccagcacaccccacccttcagtagtc
cccgccctggtgacccagcccccaaaccatgtcacgatggtggcccctggagtctctaa
gttccagggcctcactctggcccggctagcagcctcagtttcctccaacttgggttcct
ccaccgtgggctctccccgccgcccgcccctgggcacactcacagccaatgagcatgac
gcagatggagaagatcttctctgagttggtgttgggagagacgttgccgaagcccacAC
TGGTGAGGCTGCTGAAGGTGAAGTAGAGC[ga]CCGTCACATACTTGTCCTTGATGGAG
GGGCCgcccaggccgctgctgttgtagggtttgcctatctggtcgcccaggttgtgcag
ccagccgatgcgtgagtccatgtgtggctgctccatgttgccgatggcgtaccagatgc
aggctagccagtgcgcgatgagcgcaaaggtgcacatgagcaagaacagcacggccgcg
ccgtactctgagtagcgatccagcttccgcgccacgcgcaccagccgcagcagccgcgc
agtcttcagcagcccgatcagctgggggacagggaaggggcacattccgttgatggggc
aaggggggcaagggaggaggggaggtgctgcggccctcagagcgagcatcagaggtcag
atccccaaagacttcctagaccctcctcctaagaggtgaagcccacactgggcccagca
caggtgtctcattaatcttag

FIGURE 10yy

47924 (SEQ ID NO:51)
CATGCTCTTGCGGAGGTCACCCACACGTAGCATGAAGCAGAGGCGGCCGTGGCGCAGGG
CGATCACCGCATGCTTGCTGAAGATGAGGGTCTCAGCCCTGCGGTGGGCTTGGGCAGTC
TTCATGAAGATGCAGCCAAGCATGATGGCGTTGATCATGAGCCCCACGATGTTCTGCAC
GATGAGGATCAGGATGGCCAGTGGGCACTCCTCAGTCACCATGCGCCCCCCAAAGCCAA
TAGTCACTTGGACCTCAATGGAGAAAAGGAAGGCAGACGAGAAGGAGTGGATGCTGGTG
ACACAGGGCTCAGCAGTGCCCTCGCTGGGGGCCAGGTCACCGTGGGCGAAGGCGATGAG
CCACCAGGCCATGGCGAAGAGCAGCCAGCTGCACAGGAAGGACATGGTGAAGATGAGCA
ATGTGTGTGGCCACTTGAGGTCCACCAGCGTGGTGAACACGTCCTGCAGGAAGCGGCCC
TGCTCCCGGATGTTCTTGTGGGCCACGTTGCAGTTGCCTTTCTTGGACACAAAGCGGGC
CCTCCGCTGGCGGGCACGGTACCTGGGCT[tc]GGCAGGGTCCTCTGCCAGGCGTGTCA
GCACGTATTCCTCGGGGATGATGCCCTTGCGGGACAGCATGGCTCCGGTGACCCCCAGG
GAGGGGCTTCCCCCATCGGAGGCACCCCTCGGACGTGGCCTAGGGCCTCACTGCAGAGT
CCTCTCGGTGGGCACCTTCTCACCCTGGGGCTGCACTCAGCCTGTGCTGGCCTCACTTC
TGAGATAACTCCCCACCAGACTCTTCCTTACCTCCACCTGGGTCCCACTTCACTTCTTA
ATACCAGCCTCAGGCCGGGCGCGGTGGCTCACGCCTGTAATCCCAGTACGTTGGGAGGC
TGAGGAGGGCAGATCACTAGGTCAGGAGTTCGAGACCAGCCTGACCAACATGGTGAAAC
CCCATCTCTACTAAAAATACAAAAGTTAGCCGGGCATGGTGGTGCGCACCTGTAATCCC
AGCTACTCAGGAAGCTGAGGC catgctcttgcggaggtcacccacacgtagcatgaagcagaggcggccgtggcgcaggg
cgatcaccgcatgcttgctgaagatgagggtctcagccctgcggtgggcttgggcagtc
ttcatgaagatgcagccaagcatgatggcgttgatcatgagccccacgatgttctgcac
gatgaggatcaggatggccagtgggcactcctcagtcaccatgcgccccccaaagccaa
tagtcacttggacctcaatggagaaaaggaaggcagacgagaaggagtggatgctggtg
acacagggctcagcagtgccctcgctgggggccaggtcaccgtgggcgaaggcgatgag
ccaccaggccatggcgaagagcagccagctgcacaggaaggacatggtgaagatgagca
atgtgtgtggccacttgaggtccaccagcgtggtgaacacgtcctgcaggaagcggccc
tgctcccggatgttcttgtgggccacgttgcagttgcctttcttggacacaaagcgggc
cctccgcTGGCGGGCACGGTACCTGGGCT[tc]GGCAGGGTCCTCTGCCAGGCGTgtca
gcacgtattcctcggggatgatgcccttgcgggacagcatggctccggtgacccccagg
gaggggcttcccccatcggaggcacccctcggacgtggcctagggcctcactgcagagt
cctctcggtgggcaccttctcaccctggggctgcactcagcctgtgctggcctcacttc
tgagataactccccaccagactcttccttacctccacctgggtcccacttcacttctta
ataccagcctcaggccgggcgcggtggctcacgcctgtaatcccagtacgttgggaggc
tgaggagggcagatcactaggtcaggagttcgagaccagcctgaccaacatggtgaaac
cccatctctactaaaaatacaaaagttagccgggcatggtggtgcgcacctgtaatccc
agctactcaggaagctgaggc

FIGURE 10zz

47925 (SEQ ID NO:52)
CACTTCTTGGAGCCACAGACGCAAAGCAGCAGCCCTCGGGGATTGTTCTTCCCCAGCCA
CCGGCCCAGAGTGTGGCTGGTCAATCGTGGGGACCCAGGACTGGCTGGACGCACAGCTC
TAGGGCCCAGTACCTCCCACAGCCTCTGCAGCCTTGGGCGGGGGAGAGGGGTGAGCCAG
TCCTGAATTGGGTTGGGAGGAGCAGGGACAAAAATAACCCAGTACAGGTTCCTGCTGAG
GCCAGAAATAGCATAGTGACAAGTGCCTTGTAACACCCTGGATGAGCAGCAGGGGGAGG
CTGAGCTGAGGCTGGCCCAGCCTCACACCAGGCCCTGGCCGGGCTACATACCACATGGT
CCGTGTGTACACACGCGTGTGGGGGGCCCGAGAGACCATGGCTCAGGACAGGGAATCTG
GAGAGATGCTGAACTTGGGCTTGGCCTTGGCCATGGGCACGCTGCGCTTGCGCAGGGGC
CCGCGGGCTGAGGCGAGGGTCAGAGCTTCCAGTAGGCTGTGGTCCTCATCAAGCTGGCG
GGCCGTGCAGAGTGGTGTGGGCACTTTGA[ct]GGTGTTGCCAAACTTGGAGTAGTCCA
CAGAGTAACGTCCGTCCTCCTCAGCTACAATGGGCACAAAGCGCTGGCCCCACAGGATC
TCATCGGCCAGGTAGGAGGTGCGGGCCTGGGTGGTGATGCCCGTGGTTTCCACCACGCC
TTCCAGGATGACGATGATCTCGAGGTCCTGGTGGTGGTGCAGGTCGCTGGGTGCCAGGT
CGTAGAGTGGGCTGTTGGCATCAATGACATGGTAGATGATCAGCGGGGCCACCAGGAAG
ATGCTGTTGCCACCCACGCCGTTCTCCATGGGGATGTCCACCTGGTGGAGGGGCACCAC
CTCGCCCTCGGGGCTGGTGGTCTTGCGTACCACCTGCATGTGGATGGTGGCGCTGATGA
TCATGCTCTTGCGGAGGTCACCCACACGTAGCATGAAGCAGAGGCGGCCGTGGCGCAGG
GCGATCACCGCATGCTTGCTG cacttcttggagccacagacgcaaagcagcagccctcggggattgttcttccccagcca
ccggcccagagtgtggctggtcaatcgtggggacccaggactggctggacgcacagctc
tagggcccagtacctcccacagcctctgcagccttgggcgggggagaggggtgagccag
tcctgaattgggttgggaggagcagggacaaaaataacccagtacaggttcctgctgag
gccagaaatagcatagtgacaagtgccttgtaacaccctggatgagcagcagggggagg
ctgagctgaggctggcccagcctcacaccaggccctggccgggctacataccacatggt
ccgtgtgtacacacgcgtgtggggggcccgagagaccatggctcaggacagggaatctg
gagagatgctgaacttgggcttggccttggccatgggcacgctgcgcttgcgcaggggc
ccgcgggctgaggcgagggtcagagcttccagtaggctgtggtcctcatcaAGCTGGCG
GGCCGTGCAGAGTGGTGTGGGCACTTTGA[ct]GGTGTTGCCAAACTTGGAGTAGTCCA
CAGAGTAACGTccgtcctcctcagctacaatgggcacaaagcgctggccccacaggatc
tcatcggccaggtaggaggtgcgggcctgggtggtgatgcccgtggtttccaccacgcc
ttccaggatgacgatgatctcgaggtcctggtggtggtgcaggtcgctgggtgccaggt
cgtagagtgggctgttggcatcaatgacatggtagatgatcagcggggccaccaggaag
atgctgttgccacccacgccgttctccatggggatgtccacctggtggaggggcaccac
ctcgccctcggggctggtggtcttgcgtaccacctgcatgtggatggtggcgctgatga
tcatgctcttgcggaggtcacccacacgtagcatgaagcagaggcggccgtggcgcagg
gcgatcaccgcatgcttgctg

FIGURE 10aaa

47927 (SEQ ID NO:53)
ATCTGGTATTGTACAACACATGCAGGTAAGTAACTGAAATCTCCAGGAGTTGGATGTGT
AGTATTTTGGGAGGAGACCAGGCTTGGGCCACAAATGAGGGCACTTTGCACTTTCATCA
AATCCATGTCTACCTTGTCAATCTGAATAACTGAGAGAGGGCAGGTAGATATTTTACAC
CTTGAAGATTTGTTTTCTGGTCATGTAAAAATTAAATATAAACAAATAAAGAACAAAGC
AAGAGAGACAGAAAAAGAAAGAGAATGAGAGACAAGGAAAGATTGTGTTGGGGGGAGAA
GAGAAGGGTTTGCCCAGCTAGGGCACTAAACTTTGGATTCATTCTCCAGGTTTGCCACA
TCACCATTTCTTTCTGTTTGCTCTTCGAGGTTCTTTTCTTCCTCTTCAGTCTCCAGTTC
TGCATGTTGGTTGAGTTTGCTGGATACAGACCAACTCAGGGGCAGCTCTGCCCTGCTGG
CTAACTCGGCCAGCTCTTTGGCACTAAGGGATGGGGTGCTGGTCTCATAGGTCTCATGG
AAGCTGTTGTAGTCAACTTCGTAGAACCC[ga]TCCTCCAGGGTCAGGACAGGTGTGAA
CCGGTAACCCCACAGGATCTCACTGGTGATGTAGGAGCTTCGAGCTTGGCATGTCATCC
CTGCAGAGAGAAGAATGGAGGCTTTAGCATATGTAAGTGTGGGCTTTCCATGGCCAAGG
AGTCACAGAGAGCCAGGAGGAGTACTGCATGCAGCTGTTGAGACTGACCTGCATACGAT
GCCACACTTAGTAGGTGTCATTCATGTTGTAGACACATGCTAATGTGCCATGGAGATTC
CAGGCCTCTTAAGGGAGTCCTGGGGAACAATGAGAGAGTCCTGGCCCACATCAAGCCAC
ATTTGCCTGCATGGCCATGCACATGCAAAGGAAATCAAGTGTGCAAATGCACACAAGTT
TTCGCATGTGCATGGCTATGTCTGGTCCACTCTGCTCTGGGAGAACCCTGAAGCCATGA
CTCTGGCCTCCTACTGCTCTT atctggtattgtacaacacatgcaggtaagtaactgaaatctccaggagttggatgtgt
agtattttgggaggagaccaggcttgggccacaaatgagggcactttgcactttcatca
aatccatgtctaccttgtcaatctgaataactgagagagggcaggtagatattttacac
cttgaagatttgttttctggtcatgtaaaaattaaatataaacaaataaagaacaaagc
aagagagacagaaaaagaaagagaatgagagacaaggaaagattgtgttggggggagaa
gagaagggtttgcccagctagggcactaaactttggattcattctccaggtttgccaca
tcaccatttctttctgtttgctcttcgaggttcttttcttcctcttcagtctccagttc
tgcatgttggttgagtttgctggatacagaccaactcaggggcagctctgccctgctgg
ctaactcggccagctctttggcactaagggatggggtgctggtctcataggtctcatgg
aAGCTGTTGTAGTCAACTTCGTAGAACCC[ga]TCCTCCAGGGTCAGGACAGGTGTGAA
CCggtaaccccacaggatctcactggtgatgtaggagcttcgagcttggcatgtcatcc
ctgcagagagaagaatggaggctttagcatatgtaagtgtgggctttccatggccaagg
agtcacagagagccaggaggagtactgcatgcagctgttgagactgacctgcatacgat
gccacacttagtaggtgtcattcatgttgtagacacatgctaatgtgccatggagattc
caggcctcttaagggagtcctggggaacaatgagagagtcctggcccacatcaagccac
atttgcctgcatggccatgcacatgcaaaggaaatcaagtgtgcaaatgcacacaagtt
ttcgcatgtgcatggctatgtctggtccactctgctctgggagaaccctgaagccatga
ctctggcctcctactgctctt

FIGURE 10bbb

47932 (SEQ ID NO:54)
ACGGGTGCCGGTCAAGAGAGGGGGGCACCCCGTGCCTCCCTACCACACCTTCTGGAAGA
CATAGCCCCCGCTGGGGCCCCAGCCCACGATGGGGTCGGAGGACGGCTTCCCGTTGATG
TTGGGCTGTGAGTTGATGGTGAGGATGCCCTGGCGGTTCACCCGCAGCAGCTCCTCCTT
CAGCAGGCTGGTCTCAGCCGCCAGGGGCTCATCGTTCCAGGGCAGGCAAGTCACCTGGG
AGAGACGGTGAGCTGGCTGGGGCGACCATCAGGTTTGGCACCCTGAGTCCCTCTCACGG
CCCCCAACAAAGACCCAGCCTGTCTTTGCCTCCCTAAGCCCTTCCAGGTGGAGGTCTCC
CAACTTACCCTTCTCCCTTTGCCATGTCCACAGCATGGAGGGGAGGGCACAGGATGGGG
AAGTCACAGCCCCGCAGCCTGGCCTGCAGCTGGGGTCAGGCCAGGGGCAGGGGATGAAC
CAGGGTCCCCACTCCAGCATCACTCACTTTGTGACCATTCCGGTTTGGTTCTCCCGAGA
GGTAAAGAACAAAGACTTCAAAGACACTT[tg]CTTCACTGGTCAGCTCCTCCCCCCAC
ATCTTCAGCAGCTCCTCCTTGGGGGACTTGCTCTTCAGGTAGAAGAGGTAGTAGTCCTT
CAGCTCCCCAAAGGCAGGGGAAGAGGAATTGCCCCTGGCAGAGGGGTGCCCAGAGGTCA
GGGCACACTCCTGACAGAGGGCAGTGCCACCACATGCCCAGGAGGCCATTCCTGTAAAT
TCTGCCCCTGACTCCTCCCAGGTCAACCACAAGCATGCAAACTTCTTCTGCCCTCCCGC
TCCCAAGAACAAAGATGTATTTGCAAGGAAGGTCTGCAGGCCCTCACCAGCGGCCGTTA
GGGAACTCGTCCCACTCCTGGGTACGGTAGATGTAACTCTTTGGTCTGGAGGCCCAGAA
GATGGGACGTACATCTTCCTCTCGGCGCTTGGGGTGGGCGCTGAGAGCCCAGGGTAGGG
GACGCCTGGGTGAGGATGGGG acgggtgccggtcaagagaggggggcaccccgtgcctccctaccacaccttctggaaga
catagcccccgctggggccccagcccacgatggggtcggaggacggcttcccgttgatg
ttgggctgtgagttgatggtgaggatgccctggcggttcacccgcagcagctcctcctt
cagcaggctggtctcagccgccaggggctcatcgttccagggcaggcaagtcacctggg
agagacggtgagctggctggggcgaccatcaggtttggcaccctgagtccctctcacgg
cccccaacaaagacccagcctgtctttgcctccctaagcccttccaggtggaggtctcc
caacttacccttctccctttgccatgtccacagcatggaggggagggcacaggatgggg
aagtcacagccccgcagcctggcctgcagctggggtcaggccaggggcaggggatgaac
cagggtccccactccagcatcactcactttgtgaccattccggtttggttctcccgaga
ggTAAAGAACAAAGACTTCAAAGACACTT[tg]CTTCACTGGTCAGCTCCTCCCCCCAC
Atcttcagcagctcctccttgggggacttgctcttcaggtagaagaggtagtagtcctt
cagctccccaaaggcaggggaagaggaattgcccctggcagaggggtgcccagaggtca
gggcacactcctgacagagggcagtgccaccacatgcccaggaggccattcctgtaaat
tctgcccctgactcctcccaggtcaaccacaagcatgcaaacttcttctgccctcccgc
tcccaagaacaaagatgtatttgcaaggaaggtctgcaggccctcaccagcggccgtta
gggaactcgtcccactcctgggtacggtagatgtaactctttggtctggaggcccagaa
gatgggacgtacatcttcctctcggcgcttggggtgggcgctgagagcccagggtaggg
gacgcctgggtgaggatgggg

FIGURE 10ccc

47937 (SEQ ID NO:55)
GCCACCTCCCTGGATTCTTGGGCTCCAAATCTCTTTGGAGCAATTCTGGCCCAGGGAGC
AATTCTCTTTCCCCTTCCCCACCGCAGTCGTCACCCCGAGGTGATCTCTGCTGTCAGCG
TTGATCCCCTGAAGCTAGGCAGACCAGAAGTAACAGAGAAGAAACTTTTCTTCCCAGAC
AAGAGTTTGGGCAAGAAGGGAGAAAAGTGACCCAGCAGGAAGAACTTCCAATTCGGTTT
TGAATGCTAAACTGGCGGGGCCCCCACCTTGCACTCTCGCCGCGCGCTTCTTGGTCCCT
GAGACTTCGAACGAAGTTGCGCGAAGTTTTCAGGTGGAGCAGAGGGGCAGGTCCCGACC
GGACGGCGCCCGGAGCCCGCAAGGTGGTGCTAGCCACTCCTGGGTTCTCTCTGCGGGAC
TGGGACGAGAGCGGATTGGGGGTCGCGTGTGGTAGCAGGAGGAGGAGCGCGGGGGGCAG
AGGAGGGAGGTGCTGCGCGTGGGTGCTCTGAATCCCCAAGCCCGTCCGTTGAGCCTTCT
GTGCCTGCAGATGCTAGGTAACAAGCGAC[tc]GGGGCTGTCCGGACTGACCCTCGCCC
TGTCCCTGCTCGTGTGCCTGGGTGCGCTGGCCGAGGCGTACCCCTCCAAGCCGGACAAC
CCGGGCGAGGACGCACCAGCGGAGGACATGGCCAGATACTACTCGGCGCTGCGACACTA
CATCAACCTCATCACCAGGCAGAGGTGGGTGGGACCGCGGGACCGATTCCGGGAGCGCC
AGTGCCTGCACACCAGGAGATCCTGGGGATGTTAGGGAAAGGGATTGTTTCTTTTCCTT
CGCTCTATCCCAGGGCAGGACAGTATCAGGCACTTAGTCAGCTCTAGGTAAATGTTTGT
ACAGGGCACACTCTACACAAAATGGGTACCTTCCATTTTGTGCAACTACAGTCACAGAG
TCGTGATCCCCAGATTCAGGTTCCCCAGGCTGGTAGGCTGGCAATCTCCTCTCACTCAC
CTCTTATGGTTTGTTGTGGTT gccacctccctggattcttgggctccaaatctctttggagcaattctggcccagggagc
aattctctttccccttccccaccgcagtcgtcaccccgaggtgatctctgctgtcagcg
ttgatcccctgaagctaggcagaccagaagtaacagagaagaaacttttcttcccagac
aagagtttgggcaagaagggagaaaagtgacccagcaggaagaacttccaattcggttt
tgaatgctaaactggcggggcccccaccttgcactctcgccgcgcgcttcttggtccct
gagacttcgaacgaagttgcgcgaagttttcaggtggagcagaggggcaggtcccgacc
ggacggcgcccggagcccgcaaggtggtgctagccactcctgggttctctctgcgggac
tgggacgagagcggattgggggtcgcgtgtggtagcaggaggaggagcgcggggggcag
aggagggaggtgctgcgcgtgggtgctctgaatccccaagcccgtccgttgagccttct
gtgcctGCAGATGCTAGGTAACAAGCGAC[tc]GGGGCTGTCCGGACTGACCCTCGccc
tgtccctgctcgtgtgcctgggtgcgctggccgaggcgtacccctccaagccggacaac
ccgggcgaggacgcaccagcggaggacatggccagatactactcggcgctgcgacacta
catcaacctcatcaccaggcagaggtgggtgggaccgcgggaccgattccgggagcgcc
agtgcctgcacaccaggagatcctggggatgttagggaaagggattgtttcttttcctt
cgctctatcccagggcaggacagtatcaggcacttagtcagctctaggtaaatgtttgt
acagggcacactctacacaaaatgggtaccttccattttgtgcaactacagtcacagag
tcgtgatccccagattcaggttccccaggctggtaggctggcaatctcctctcactcac
ctcttatggtttgttgtggtt

FIGURE 10ddd

47941 (SEQ ID NO:56)
ACCCAGAATCCTGCAGTTTCTCCTGATTAACAGCTAAGTAAATTCTATAGCACTGTACT
GAAAATATAAAAAATTTAGAATATAGGGCTGATCATCCCTGATCCTAAGATTGTCCTCT
GAAGTTGATTTTCAGGGTAAATCTTTCATATCCACTTTTTAAATTGCCGATTGTTTCTT
ATGAAACAAGTAGTAAAATGTACAAAAGAAAAAGAATCTAGCTTAAATTATAGAGTTCA
GACATATTTTTTAGTAGGAGGAAGAGGAATAGAATAACAAAATAGAGTGTGAAATTTGG
AGTAAATTGACAGATTTTCAGAATAAAATGTTTCTTTTTTCTCTGTACATGTTAAAAAT
ATACTTTGTATTGATACTTTCATGTGCCATCACTAATATTACATATATAGCATATTAAA
GAGTGACATTTTAAACCATTGTTAAATTATTCAACAGGGACTAAATAGGAATAGTTTGC
CAACTCCACAGCTGAGGAGAAGCTCAGGAACTTCAGGATTGCTACCTGTTGAACAGTCT
TCAAGGTGGGATCGTAATAATGGCAAAAG[ag]CCTCACCAAGAATTTGGCATTTCAAG
GTAAAATCTGCAGAGCCTTTTAAGAAACTTGAATCAAATGCATCTACTTTGTTTCTGTC
AATAATGTTTCAAATAGTTCTGGAAGCAGAAAGGAATGGTTGAAGTATTTTAGGTATAG
GACAACATGTGTAGTAATAATATGGTAAAATAGAGAAACTGATTATTAAAGAGAAGCTA
ATGTGTCTTGTCCTAAAACTTTGATAGGCTGGGTACAAAATGTGCTGGATCCCTGAGAA
CATGAGATAGTTTAGGGAAATCAGGATCAACTCAGGACTGGATGCTGGGGAAGTTTTTA
AATCGATAGAAGTGGCCATTACAGGGTTAGCCACCAATCCAATGAATAGTATCCAAAGG
TAGGTCTGCAGAATTACTGACTTCTGAAAAGAGGAGCACGTTTCCAAGGCTCATCACAA
TTGTTAGGTTTAAGGTAACCA acccagaatcctgcagtttctcctgattaacagctaagtaaattctatagcactgtact
gaaaatataaaaaatttagaatatagggctgatcatccctgatcctaagattgtcctct
gaagttgattttcagggtaaatctttcatatccactttttaaattgccgattgtttctt
atgaaacaagtagtaaaatgtacaaaagaaaaagaatctagcttaaattatagagttca
gacatattttttagtaggaggaagaggaatagaataacaaaatagagtgtgaaatttgg
agtaaattgacagattttcagaataaaatgtttcttttttctctgtacatgttaaaaat
atactttgtattgatactttcatgtgccatcactaatattacatatatagcatattaaa
gagtgacattttaaaccattgttaaattattcaacagggactaaataggaatagtttgc
caactccacagctgaggagaagctcaggaacttcaggattgctaccTGTTGAACAGTCT
TCAAGGTGGGATCGTAATAATGGCAAAAG[ag]CCTCACCAAGAATTTGGCATTTCAAG
GTAAAATCTGCAGAGCcttttaagaaacttgaatcaaatgcatctactttgtttctgtc
aataatgtttcaaatagttctggaagcagaaaggaatggttgaagtattttaggtatag
gacaacatgtgtagtaataatatggtaaaatagagaaactgattattaaagagaagcta
atgtgtcttgtcctaaaactttgataggctgggtacaaaatgtgctggatccctgagaa
catgagatagtttagggaaatcaggatcaactcaggactggatgctggggaagttttta
aatcgatagaagtggccattacagggttagccaccaatccaatgaatagtatccaaagg
taggtctgcagaattactgacttctgaaaagaggagcacgtttccaaggctcatcacaa
ttgttaggtttaaggtaacca

FIGURE 10eee

47950 (SEQ ID NO:57)
CTCCTTTAACATAAGATATATGGGTAAGAAAATTCCAATTTAATGATATTCAAATATAT
AAATATTTGTTGCATCCTCAGGTTTCTAGTTATGTGTTAAAAAAATGATATGTTGAAAT
CTCTTCAATTTTAGAAGAACCTTGTTATAAAGAACAGAGCTAAAAATATTAGAACCACC
TGCCCTTTAGTGTAACAAAATAAACTAGCCTTTTTGGTTTACTTAATTACAGTCTTACC
ATCAAAAATATATTCTCTAACTTAAAAAAATACTTTTTTGGTAATATTTGATGACATTT
CTGATGAGAGCACATAAAAATAAAACAATACTTAAAGATGTGGATATAAAATGCTCAAG
GAATCATCATTTAAAAACAGACGGTTCCCTTATTGTTTCTGTTCATGTCAAAAAGCAGG
GTTTTTTTTTTACACAGTCTCTGTAGCTCCTAGGAATTTCATTTCTACAGCAGCTTTTG
GCCTGTGGGCTGAGCCACTCTTCTTTTGGAATTCTGCAGCAATTTCCTCAAAAGACTTT
CCTTTGGTTTCTGGAACTTTAAAAAATGT[ga]AACAGGGTAAAGGCCAGGAGCACTCC
AGCAAAGAGGAAAAACACATAAGGTCCACAGAAGTCCTGGATAGAAAGCAAACACAGAC
TTTGAGTTAGCAGTTTTTTGACCCTCTCTTCTGTTCAGTAAATCTGTGGAATATTAGGC
TGCTTACCGCAATGTACTGGAAACACAGAGCTACAATGAAATTGCAGGTCCAATTGCTG
AATGCAGCTATTGCTAAAGCAGCAGGACGTGGTCCTTGACTGAAAAACTCAGCCACCAT
GAACCAGGGGATCGGGCCTGGCCCAATTTCAAAGAAGCTGACAAAGAGGAAGATGGCTA
TCATGCTCACATAACTCATCCAAGAGAACTTATTCTGAGGAAAAAAACAAAAACAATAG
TGGGACTGAGATCATTTGGCTGCTTTTTCCTTTAGCTAAGTAGCCTCTGAGTTCACAGG
CGGCATACAACTTTTTCTAAT ctcctttaacataagatatatgggtaagaaaattccaatttaatgatattcaaatatat
aaatatttgttgcatcctcaggtttctagttatgtgttaaaaaaatgatatgttgaaat
ctcttcaattttagaagaaccttgttataaagaacagagctaaaaatattagaaccacc
tgccctttagtgtaacaaaataaactagcctttttggtttacttaattacagtcttacc
atcaaaaatatattctctaacttaaaaaaatacttttttggtaatatttgatgacattt
ctgatgagagcacataaaaataaaacaatacttaaagatgtggatataaaatgctcaag
gaatcatcatttaaaaacagacggttcccttattgtttctgttcatgtcaaaaagcagg
gttttttttttacacagtctctgtagctcctaggaatttcatttctacagcagcttttg
gcctgtgggctgagccactcttcttttggaattctgcagcaatttcctcaaaagacttt
CCTTTGGTTTCTGGAACTTTAAAAAATGT[ga]AACAGGGTAAAGGCCAGGAGCACTCC
AGCaaagaggaaaaacacataaggtccacagaagtcctggatagaaagcaaacacagac
tttgagttagcagttttttgaccctctcttctgttcagtaaatctgtggaatattaggc
tgcttaccgcaatgtactggaaacacagagctacaatgaaattgcaggtccaattgctg
aatgcagctattgctaaagcagcaggacgtggtccttgactgaaaaactcagccaccat
gaaccaggggatcgggcctggcccaatttcaaagaagctgacaaagaggaagatggcta
tcatgctcacataactcatccaagagaacttattctgaggaaaaaaacaaaaacaatag
tgggactgagatcatttggctgctttttcctttagctaagtagcctctgagttcacagg
cggcatacaactttttctaat

FIGURE 10fff

47960 (SEQ ID NO:58)
ATGGAATACAGGGGACGTTTAAGAAGATATGGCCACACACTGGGGCCCTGAGAAGTGAG
AGCTTCATGAAAAAAATCAGGGACCCCAGAGTTCCTTGGAAGCCAAGACTGAAACCAGC
ATTATGAGTCTCCGGGTCAGAATGAAAGAAGAAGGCCTGCCCCAGTGGGGTCTGTGAAT
TCCCGGGGGTGATTTCACTCCCCGGGGCTGTCCCAGGCTTGTCCCTGCTACCCCCACCC
AGCCTTTCCTGAGGCCTCAAGCCTGCCACCAAGCCCCCAGCTCCTTCTCCCCGCAGGGA
CCCAAACACAGGCCTCAGGACTCAACACAGCTTTTCCCTCCAACCCCGTTTTCTCTCCC
TCAAGGACTCAGCTTTCTGAAGCCCCTCCCAGTTCTAGTTCTATCTTTTTCCTGCATCC
TGTCTGGAAGTTAGAAGGAAACAGACCACAGACCTGGTCCCCAAAAGAAATGGAGGCAA
TAGGTTTTGAGGGGCATGGGGACGGGGTTCAGCCTCCAGGGTCCTACACACAAATCAGT
CAGTGGCCCAGAAGACCCCCCTCGGAATC[tc]GAGCAGGGAGGATGGGGAGTGTGAGG
GGTATCCTTGATGCTTGTGTGTCCCCAACTTTCCAAATCCCCGCCCCCGCGATGGAGAA
GAAACCGAGACAGAAGGTGCAGGGCCCACTACCGCTTCCTCCAGATGAGCTCATGGGTT
TCTCCACCAAGGAAGTTTTCCGCTGGTTGAATGATTCTTTCCCCGCCCTCCTCTCGCCC
CAGGGACATATAAAGGCAGTTGTTGGCACACCCAGCCAGCAGACGCTCCCTCAGCAAGG
ACAGCAGAGGACCAGCTAAGAGGGAGAGAAGCAACTACAGACCCCCCCTGAAAACAACC
CTCAGACGCCACATCCCCTGACAAGCTGCCAGGCAGGTTCTCTTCCTCTCACATACTGA
CCCACGGCTCCACCCTCTCTCCCCTGGAAAGGACACCATGAGCACTGAAAGCATGATCC
GGGACGTGGAGCTGGCCGAGG atggaatacaggggacgtttaagaagatatggccacacactggggccctgagaagtgag
agcttcatgaaaaaaatcagggaccccagagttccttggaagccaagactgaaaccagc
attatgagtctccgggtcagaatgaaagaagaaggcctgccccagtggggtctgtgaat
tcccgggggtgatttcactccccggggctgtcccaggcttgtccctgctacccccaccc
agcctttcctgaggcctcaagcctgccaccaagcccccagctccttctccccgcaggga
cccaaacacaggcctcaggactcaacacagcttttccctccaaccccgttttctctccc
tcaaggactcagctttctgaagcccctcccagttctagttctatctttttcctgcatcc
tgtctggaagttagaaggaaacagaccacagacctggtccccaaaagaaatggaggcaa
taggttttgaggggcatggggacggggttcagcctccagggtcctacacacaaatcagt
caGTGGCCCAGAAGACCCCCCTCGGAATC[tc]GAGCAGGGAGGATGGGGAGTGTGAGG
Ggtatccttgatgcttgtgtgtccccaactttccaaatccccgcccccgcgatggagaa
gaaaccgagacagaaggtgcagggcccactaccgcttcctccagatgagctcatgggtt
tctccaccaaggaagttttccgctggttgaatgattctttccccgccctcctctcgccc
cagggacatataaaggcagttgttggcacacccagccagcagacgctccctcagcaagg
acagcagaggaccagctaagagggagagaagcaactacagaccccccctgaaaacaacc
ctcagacgccacatcccctgacaagctgccaggcaggttctcttcctctcacatactga
cccacggctccaccctctctcccctggaaaggacaccatgagcactgaaagcatgatcc
gggacgtggagctggccgagg

FIGURE 10ggg 47963 (SEQ ID NO:59)
GAGTCCCCTCCTTACTGGGGTCCCTGCCCCAGCCTGAGGGGAGGGAAAGCTCTGCCTAA
GACCGCCTGCGTCCAGAGTCCAGACCTACCTTTCCACAGGCCCCTGACTCCTTCCTCCC
TGGCGATGGTTCTGTAGGCGTCCATAGTCCCGCTGTATTTTCTGTCGCTCCTGGATGGC
CCGAGGTGTATGCTGGCCTGAAATCGGACCTTCACCACATCTGTGGGCTGGGCACAGGT
CACCGCCATGGCTCCTGTGGTGCAGCCGGCCAAAATCCGGGTAGTGAGGCTGGAGTCTG
GGAGGGGCAGAGAGAGTGGGCCAGTGTCCCCTACTAAGCAGCATTCTGGGACATGCTGT
TCTCTGCGGGGCTGCCCCTGCAGCTTCCTTGATGTCCACTCAGAGCCTCCTCATAAGCG
TCCGGTACCAGCTTCCCCCCGCCCCTGGCTCTGCCTCTGAGTCTAGACTTCCCTGGTCT
CTTGACCCACACACTTTCAGCCACCCCTTTGGTGTTCAGGGACCTGGTCACTCACTGTC
CGCGCCTTTGGGGGTGTACACCTGCTTGA[ct]GGAGTCATAGAGGCCGATGCGGATGG
AGGCGAAGCTCATCTGGCGCTGCAGGCCGGCCACCAGCCCATTGTAGGGGCTGCAGGGA
CCCTCAGTCCGCACCATGGTCAGGATGGTGCCCAGCACGCCACGGTACTGCACGAGCCG
GGCCGTCTGGACCGCCTGGTTCTCCCCCTGGATCTGAGGGACAATAGCAGGGGGTGAGG
ACTCAGATGGGAAGGCAAGAAGGGGCTGCGTGCACAGGAACCCTGCTGGGGCTGGGCCT
GCCTGGGCTGGGCCTGAGAACAACCATGCTGGTCACAGTAGAAATCACTGGTGTCTGCG
CAGCATTTTACCATTCACAAAGCAGTATTATACACATGGCTTGGTGTTTGATCCTCAGA
GTAAATCAGAGGGACAGATTGTTTTTCCCATTTTATAAGTGCTTCGTGGCTTGCCCAAG
GTCACACAGTTAATTCCTTAC gagtcccctccttactggggtccctgccccagcctgaggggagggaaagctctgcctaa
gaccgcctgcgtccagagtccagacctacctttccacaggcccctgactccttcctccc
tggcgatggttctgtaggcgtccatagtcccgctgtattttctgtcgctcctggatggc
ccgaggtgtatgctggcctgaaatcggaccttcaccacatctgtgggctgggcacaggt
caccgccatggctcctgtggtgcagccggccaaaatccgggtagtgaggctggagtctg
ggaggggcagagagagtgggccagtgtcccctactaagcagcattctgggacatgctgt
tctctgcggggctgcccctgcagcttccttgatgtccactcagagcctcctcataagcg
tccggtaccagcttccccccgcccctggctctgcctctgagtctagacttccctggtct
cttgacccacacactttcagccacccctttggtgttcagggacctggtcactcactgtc
CGCGCCTTTGGGGGTGTACACCTGCTTGA[ct]GGAGTCATAGAGGCCGATGCGGATGG
AGGcgaagctcatctggcgctgcaggccggccaccagcccattgtaggggctgcaggga
ccctcagtccgcaccatggtcaggatggtgcccagcacgccacggtactgcacgagccg
ggccgtctggaccgcctggttctccccctggatctgagggacaatagcagggggtgagg
actcagatgggaaggcaagaaggggctgcgtgcacaggaaccctgctggggctgggcct
gcctgggctgggcctgagaacaaccatgctggtcacagtagaaatcactggtgtctgcg
cagcattttaccattcacaaagcagtattatacacatggcttggtgtttgatcctcaga
gtaaatcagagggacagattgtttttcccattttataagtgcttcgtggcttgcccaag
gtcacacagttaattccttac

FIGURE 10hhh

47972 (SEQ ID NO:60)
AAGAAAATCAAACTTAACTCGGACCCAGAGACATTTTAGTATGTGTTGGAAACTTTAGC
ATCTGGTCACCATCCTCCAAAGAATTATTTGGATTGGAACTCGGTCAGAGCTGTCACTC
TTCAGCTAGGAATCTAAGAGGATCATGTCTTGGATGTTACGGAGTATAGACAACCAAGT
TCCCTGCCCTCAAAAGCCCGATCACTTATAAGACAGCTTATGGAGCTTTGACAGAGGGC
AGCAGTTGATGGCATTATCCTTTGAACTCATAGCTTAGTTGGACTCCTACTGGCTTGTG
GGACCAAATCTTTCCCTACCACAGTTGGCTATAGCAAAAGTTGTGAAAAATGCCACTAG
GATATACTGGTGAGGGAAAAGGAGGTCCATTTGTAGTTATAGTATAATTGAAAAGAAAA
GCTCTGAAGAAAACTCTAGCCTACTCTTTTTCAGCCCAAGGGGAAGGCAGAGCACCTGC
TGACAGATGCTGGCGTAGCGAGCCAGGGCGTTGGCGTTTTCCTGGATAGCGAGGCTGGA
TGGACACTGGTCGGCAATCCTCAGCACAG[cg]ACGCCACTTCCCAAAGTCAACACCAT
CTTTCTTGTACTGAGCACAGCGCTCTGAGAGGCCATCAAGCCCTGCAAGTCACAAAAGA
GAGAAAGGCTTCTTTGTACCTTTGTACCTGATCCATGGGGCTTCTAATAAAGGGAAGGA
GTTCTCCCTTTGCTTAGCTTTCAATCCACTGTGCTTGAGGATTGAAAACAGCCAAGCAT
ATCAGCATTAATCACAACACTGAACCAGAAGACTTAGATTTAATAAATAGTGTTTTGAC
ATACATACTATCTACTCCATATATAGAATAGAAGAAACCAATAGTTAATATGATACTCA
TTTTACAAAGGTGGAAACTGAAGCTCCTAATGGTTAAGCAACTTTACCAAGTTTGAATT
GCTCAAGAGTGACAGAGCTGGGATTCAAATTCTGCTTAGCTAACCCAATGTTGTGAGTT
AATGCTTGTCTACTTGGGCAG aagaaaatcaaacttaactcggacccagagacattttagtatgtgttggaaactttagc
atctggtcaccatcctccaaagaattatttggattggaactcggtcagagctgtcactc
ttcagctaggaatctaagaggatcatgtcttggatgttacggagtatagacaaccaagt
tccctgccctcaaaagcccgatcacttataagacagcttatggagctttgacagagggc
agcagttgatggcattatcctttgaactcatagcttagttggactcctactggcttgtg
ggaccaaatctttccctaccacagttggctatagcaaaagttgtgaaaaatgccactag
gatatactggtgagggaaaaggaggtccatttgtagttatagtataattgaaaagaaaa
gctctgaagaaaactctagcctactctttttcagcccaaggggaaggcagagcacctgc
tgacagatgctggcgtagcgagccagggcgttggcgttttcctggatagcGAGGCTGGA
TGGACACTGGTCGGCAATCCTCAGCACAG[cg]ACGCCACTTCCCAAAGTCAACACCAT
CTTTCTTGTACTgagcacagcgctctgagaggccatcaagccctgcaagtcacaaaaga
gagaaaggcttctttgtacctttgtacctgatccatggggcttctaataaagggaagga
gttctccctttgcttagctttcaatccactgtgcttgaggattgaaaacagccaagcat
atcagcattaatcacaacactgaaccagaagacttagatttaataaatagtgttttgac
atacatactatctactccatatatagaatagaagaaaccaatagttaatatgatactca
ttttacaaaggtggaaactgaagctcctaatggttaagcaactttaccaagtttgaatt
gctcaagagtgacagagctgggattcaaattctgcttagctaacccaatgttgtgagtt
aatgcttgtctacttgggcag

FIGURE 10iii

47980 (SEQ ID NO:61)
GCCTTAGTTTTGGTAATCTGCAAAACCAAGGGCCCTGCCCTGGGTGCTGCTCTCCCAGT
GCAAAGTCCCTAACTTTGGTGTGACCCTTACCAGAGTCAAGGCTGTCTGGGCCTGGCTC
CTTGTGACATCCATCGCCATCTCTCCGAGGGGCTAAGAGGTAGATGCTTTGGGAGGCAG
AGATGCTCCTGCCTGCTGAGGCCTAGCACATGCTGTAGCCTTGGAGCGTAAGGCCCGCC
TGTGGCAGCAACGGCTGCTTGGATGGAGAGCTGCCTGAGGCTGGCAGCCCAGGGCTTCT
GCACTGAAAGGGCTCAGCCTGGCGGCTGCTCAAATACTCTGCCCCCTGCCATGGGGTCA
GAGGCAGGGCAGAAAGGGAGGGTAGGCCATGTGGGTAACAGTTGACAGGGCCACGGGGA
CAGAGCCATGGGGCAGCCGGCCACACTCTGTGAACATGGGGTAGGGATTGCTGCCCAGC
AGGAGGGGGTGTGCAGAGCCAGCCTACCCATCTTCCATTCCTCAGCCTTGTGCGGGCAG
AAAGTCACCAGGCTGCCTTGGCCACAGAA[ct]ACTTACTGAAATGCCCTTGGACAGGG
AGGGGGTCCTAAGGGGGCCTGGCCCGCGCTGGTGCAGGTCTGGACTTGCTCTTGGAGGC
AAGGGGATCCCCAGTGGATTTTCATCTGCAGAGAGGTTCGATTTGCATTTCATACAATC
CAGGGGTCTGTATGGAACTTGGGGAAGGGGTGGTGGAGGAAGGTGGCCAACTGATCAAA
AACAAACAAAAAACAGGGGTATCATTCTTAATTTTGTGACTGCAAAGTCCAGGCCTCAG
GCTTGCTTTGGGTGCCTCCATGGGCATAGACCATGACTTCCAGGCTCTGGCCCAGGCCT
CTCCTTGGGCTCACCTGGGAGTGACATCCACATGCTATGTACTTGCTGGCACCTGCCAA
AGCCTGCTAAAATTAGCTGGAGCTGGCAAGTGGGTCAGGGTATGGAGGGTGCCTTGTCA
GAATGCCAGGTCTCTCGCCAA gccttagttttggtaatctgcaaaaccaagggccctgccctgggtgctgctctcccagt
gcaaagtccctaactttggtgtgacccttaccagagtcaaggctgtctgggcctggctc
cttgtgacatccatcgccatctctccgaggggctaagaggtagatgctttgggaggcag
agatgctcctgcctgctgaggcctagcacatgctgtagccttggagcgtaaggcccgcc
tgtggcagcaacggctgcttggatggagagctgcctgaggctggcagcccagggcttct
gcactgaaagggctcagcctggcggctgctcaaatactctgccccctgccatggggtca
gaggcagggcagaaagggagggtaggccatgtgggtaacagttgacagggccacgggga
cagagccatggggcagccggccacactctgtgaacatggggtagggattgctgcccagc
aggagggggtgtgcagagccagcctacccatcttccattcctcagccttgtgcgggcAG
AAAGTCACCAGGCTGCCTTGGCCACAGAA[ct]ACTTACTGAAATGCCCTTGGACAGGG
AGGGGgtcctaagggggcctggcccgcgctggtgcaggtctggacttgctcttggaggc
aaggggatccccagtggattttcatctgcagagaggttcgatttgcatttcatacaatc
caggggtctgtatggaacttggggaaggggtggtggaggaaggtggccaactgatcaaa
aacaaacaaaaaacaggggtatcattcttaattttgtgactgcaaagtccaggcctcag
gcttgctttgggtgcctccatgggcatagaccatgacttccaggctctggcccaggcct
ctccttgggctcacctgggagtgacatccacatgctatgtacttgctggcacctgccaa
agcctgctaaaattagctggagctggcaagtgggtcagggtatggagggtgccttgtca
gaatgccaggtctctcgccaa

FIGURE 10jjj

47981 (SEQ ID NO:62)
ATAAAAGCCCCAGGCCAGGCCCCGGACACTGGTGTCCTGGGTCACCGTTAGCTCCAGGA
ATAAGTACCCTAGAACCCCTCGAGAGGCTGGACACTGGATAGCCACAGTGAGGAGGGGT
GGTGGGCAGAGGGCCAGTGGCAGGCACAGCTGCCCTAGCCAGGACCCCCAAGGCCCATG
TGCCTCCTTCCAAGGTGCCCCAAGCCTGCTCGCCTTCCCTGCCCCCAGCCTTAGTTTTG
GTAATCTGCAAAACCAAGGGCCCTGCCCTGGGTGCTGCTCTCCCAGTGCAAAGTCCCTA
ACTTTGGTGTGACCCTTACCAGAGTCAAGGCTGTCTGGGCCTGGCTCCTTGTGACATCC
ATCGCCATCTCTCCGAGGGGCTAAGAGGTAGATGCTTTGGGAGGCAGAGATGCTCCTGC
CTGCTGAGGCCTAGCACATGCTGTAGCCTTGGAGCGTAAGGCCCGCCTGTGGCAGCAAC
GGCTGCTTGGATGGAGAGCTGCCTGAGGCTGGCAGCCCAGGGCTTCTGCACTGAAAGGG
CTCAGCCTGGCGGCTGCTCAAATACTCTG[tc]CCCCTGCCATGGGGTCAGAGGCAGGG
CAGAAAGGGAGGGTAGGCCATGTGGGTAACAGTTGACAGGGCCACGGGGACAGAGCCAT
GGGGCAGCCGGCCACACTCTGTGAACATGGGGTAGGGATTGCTGCCCAGCAGGAGGGGG
TGTGCAGAGCCAGCCTACCCATCTTCCATTCCTCAGCCTTGTGCGGGCAGAAAGTCACC
AGGCTGCCTTGGCCACAGAACACTTACTGAAATGCCCTTGGACAGGGAGGGGGTCCTAA
GGGGGCCTGGCCCGCGCTGGTGCAGGTCTGGACTTGCTCTTGGAGGCAAGGGGATCCCC
AGTGGATTTTCATCTGCAGAGAGGTTCGATTTGCATTTCATACAATCCAGGGGTCTGTA
TGGAACTTGGGGAAGGGGTGGTGGAGGAAGGTGGCCAACTGATCAAAAACAAACAAAAA
ACAGGGGTATCATTCTTAATT ataaaagccccaggccaggccccggacactggtgtcctgggtcaccgttagctccagga
ataagtaccctagaacccctcgagaggctggacactggatagccacagtgaggaggggt
ggtgggcagagggccagtggcaggcacagctgccctagccaggacccccaaggcccatg
tgcctccttccaaggtgccccaagcctgctcgccttccctgcccccagccttagttttg
gtaatctgcaaaaccaagggccctgccctgggtgctgctctcccagtgcaaagtcccta
actttggtgtgacccttaccagagtcaaggctgtctgggcctggctccttgtgacatcc
atcgccatctctccgaggggctaagaggtagatgctttgggaggcagagatgctcctgc
ctgctgaggcctagcacatgctgtagccttggagcgtaaggcccgcctgtggcagcaac
ggctgcttggatggagagctgcctgaggctggcagcccagggcttctgcactgaaaggg
ctcagCCTGGCGGCTGCTCAAATACTCTG[tc]CCCCTGCCATGGGGTCAGAGGCAGgg
cagaaagggagggtaggccatgtgggtaacagttgacagggccacggggacagagccat
ggggcagccggccacactctgtgaacatggggtagggattgctgcccagcaggaggggg
tgtgcagagccagcctacccatcttccattcctcagccttgtgcgggcagaaagtcacc
aggctgccttggccacagaacacttactgaaatgcccttggacagggagggggtcctaa
gggggcctggcccgcgctggtgcaggtctggacttgctcttggaggcaaggggatcccc
agtggattttcatctgcagagaggttcgatttgcatttcatacaatccaggggtctgta
tggaacttggggaaggggtggtggaggaaggtggccaactgatcaaaaacaaacaaaaa
acaggggtatcattcttaatt

FIGURE 10kkk

47986 (SEQ ID NO:63)
CAGGCAGGGTCTGCAGTGGTATCACTGTGGGCAGAGCCTGGGGAGGGGGCCAATTCTGT
GCACAGGGCAAGGGCGAGAGGAGGGGCCAGGGATCTAGGGCTCCGGGGAGGGGTCAGCA
GGTCGGGGGGAGGGATCCACGGGGAGGGGTTACCCTGGGTGAAGAAGTGAGCCTTGTAC
TTTCCAGTCCGCACAGCAAAAACCCCACGGACCTCGTCTGGGTAGGACGGGTAGAAGAA
GAGAGACTGCCGAGGGCTCTGGGGGCAGAGTCAGGGGTCACGGGGCGGGGCAGGCCCCA
AGCACTGCACATACCTGGGGCTGCCAGCCCTGGTGGGAGGCCCTGGACGTGCACCGCTT
CTTGCCCACCCAGGAACCTGAGAGGTGGCGCCACTTGGATGCCACTCAGTGCAGGAGGC
ACTGAGGCACAGACTCTCAGGCACTGCCCACACTCACCCCAGGGGAAGGCCAGGACAGG
GGCCAAGGATCTGGGATCAGGGGTCACCGGCCCTACCTTGCCTGTGCCCAGCAGCAGGG
GGCTGAGGTCAAAGCCATCCAAGGTGACA[tc]TGGGCAGTGGGGCCCCAGCCAGGGCT
GCCAGGGTAGGCAGCAGGTCCAGGGAGCTGGCCAGCTCGTGGGTCACGCCTGGGGGCAG
GAGGCTGGTCAGTCACTCAGTTCGCCATCAAGGTTGGGGTGGTGGGGCCAGGGTTCCAA
GGAGAGGGCCTGCGGACTGACCGGGAGCGATATGACCTGGCCAGAAGGCCAAGGCAGGC
TCTCGGACACCGCCCTCGTAGGTCGTTCCCTTTCCACACCGCAAGAGACCGGAGCAGCC
GCCTCGGGACATACGCATGGTCTCAGGTCTGGGACACAGGAGGCGCTCATGAGCCATGG
AGCCACAGCCTCTGAGCCACCGAGGGTGACCAGTGGCCCCACACCTCTAAGTCACAAAG
CTTGCCCGGAGGTGCCCAGCATGAGCCCGGCACCTCCCAGGCCTACCAAGACCAGCTCT
CTGTGCACTGTGTCTCCTGAC caggcagggtctgcagtggtatcactgtgggcagagcctggggagggggccaattctgt
gcacagggcaagggcgagaggaggggccagggatctagggctccggggaggggtcagca
ggtcggggggagggatccacggggaggggttaccctgggtgaagaagtgagccttgtac
tttccagtccgcacagcaaaaaccccacggacctcgtctgggtaggacgggtagaagaa
gagagactgccgagggctctgggggcagagtcaggggtcacggggcggggcaggcccca
agcactgcacatacctggggctgccagccctggtgggaggccctggacgtgcaccgctt
cttgcccacccaggaacctgagaggtggcgccacttggatgccactcagtgcaggaggc
actgaggcacagactctcaggcactgcccacactcaccccaggggaaggccaggacagg
ggccaaggatctgggatcaggggtcaccggccctaccttgcctgtgcccagcagcaggg
ggctgaggtcAAAGCCATCCAAGGTGACA[tc]TGGGCAGTGGGGCCCCAGCcagggct
gccagggtaggcagcaggtccagggagctggccagctcgtgggtcacgcctgggggcag
gaggctggtcagtcactcagttcgccatcaaggttggggtggtggggccagggttccaa
ggagagggcctgcggactgaccgggagcgatatgacctggccagaaggccaaggcaggc
tctcggacaccgccctcgtaggtcgttccctttccacaccgcaagagaccggagcagcc
gcctcgggacatacgcatggtctcaggtctgggacacaggaggcgctcatgagccatgg
agccacagcctctgagccaccgagggtgaccagtggccccacacctctaagtcacaaag
cttgcccggaggtgcccagcatgagcccggcacctcccaggcctaccaagaccagctct
ctgtgcactgtgtctcctgac

FIGURE 10111

47987 (SEQ ID NO:64)
GTCCAGCAATGAGTCACAGACCTATGCACCACCTGCAAAGGAGCCAGAGAAAACAAACG
CCCAGCGCTTTTAGCCTGAAAATGAGAATCTGGTTTGCTGGGGAAGATAAAGGGTGTCG
GAAAATGGCTGTTGGGTAAATCATTGATGTCTGCCACTAGGAATGAAAGGCAAATCAGG
AACTGGCACACATGCTTTCAGGGAGATGGCTGCAAGGGAGAGGGCAAAGACTGGGAAGT
TGCTTATGTGGTGCCAGACTATTTGGAAGATCATGGATTGCGGTGTTTGTGTTGTGTGG
TCATCATTTTGTTCTTTGTTTACAGAACAGAGAAAGTGGATTGAACAAGGACGCATTTC
CCCAGTACATCCACAACATGCTGTCCACATCTCGTTCTCGGTTTATCAGAAATACCAAC
GAGAGCGGTGAAGAAGTCACCACCTTTTTTGATTATGATTACGGTGCTCCCTGTCATAA
ATTTGACGTGAAGCAAATTGGGGCCCAACTCCTGCCTCCGCTCTACTCGCTGGTGTTCA
TCTTTGGTTTTGTGGGCAACATGCTGGTC[ag]TCCTCATCTTAATAAACTGCAAAAAG
CTGAAGTGCTTGACTGACATTTACCTGCTCAACCTGGCCATCTCTGATCTGCTTTTTCT
TATTACTCTCCCATTGTGGGCTCACTCTGCTGCAAATGAGTGGGTCTTTGGGAATGCAA
TGTGCAAATTATTCACAGGGCTGTATCACATCGGTTATTTTGGCGGAATCTTCTTCATC
ATCCTCCTGACAATCGATAGATACCTGGCTATTGTCCATGCTGTGTTTGCTTTAAAAGC
CAGGACGGTCACCTTTGGGGTGGTGACAAGTGTGATCACCTGGTTGGTGGCTGTGTTTG
CTTCTGTCCCAGGAATCATCTTTACTAAATGCCAGAAAGAAGATTCTGTTTATGTCTGT
GGCCCTTATTTTCCACGAGGATGGAATAATTTCCACACAATAATGAGGAACATTTTGGG
GCTGGTCCTGCCGCTGCTCAT gtccagcaatgagtcacagacctatgcaccacctgcaaaggagccagagaaaacaaacg
cccagcgcttttagcctgaaaatgagaatctggtttgctggggaagataaagggtgtcg
gaaaatggctgttgggtaaatcattgatgtctgccactaggaatgaaaggcaaatcagg
aactggcacacatgctttcagggagatggctgcaagggagagggcaaagactgggaagt
tgcttatgtggtgccagactatttggaagatcatggattgcggtgtttgtgttgtgtgg
tcatcattttgttctttgtttacagaacagagaaagtggattgaacaaggacgcatttc
cccagtacatccacaacatgctgtccacatctcgttctcggtttatcagaaataccaac
gagagcggtgaagaagtcaccaccttttttgattatgattacggtgctccctgtcataa
atttgacgtgaagcaaattggggcccaactcctgcctccgctctactcGCTGGTGTTCA
TCTTTGGTTTTGTGGGCAACATGCTGGTC[ag]TCCTCATCTTAATAAACTGCAAAAAG
CTGAAGTGCTTGACtgacatttacctgctcaacctggccatctctgatctgctttttct
tattactctcccattgtgggctcactctgctgcaaatgagtgggtctttgggaatgcaa
tgtgcaaattattcacagggctgtatcacatcggttattttggcggaatcttcttcatc
atcctcctgacaatcgatagatacctggctattgtccatgctgtgtttgctttaaaagc
caggacggtcacctttggggtggtgacaagtgtgatcacctggttggtggctgtgtttg
cttctgtcccaggaatcatctttactaaatgccagaaagaagattctgtttatgtctgt
ggcccttattttccacgaggatggaataatttccacacaataatgaggaacattttggg
gctggtcctgccgctgctcat

FIGURE 10mmm

47994 (SEQ ID NO:65)
CGGGGTCCCAGAAGGTGGTTTAAGGACTGGTGTGGACACACACAGTTCTGTTGTCTGCC
CAGCGGAGGGGCCTCACGGGGGGCCGTTGGGAGCCAGATTGTCAGCTTTTGGATTTACC
AGCTGTGGGTGGCAGTGGGCGTGTAACTCAGCATCTTGCTGCCTCAGTTTCTCTCATCT
GTAAAGTGGGGATAATAACATTTACCTCATAAAGTTCCTGCGAGGATTCGATGACTTGA
TACATCAGTTGCTTAGCACAGGGCTCAGCACTCAGTACATGTTCCCTGTCAGGAAGGCA
GGGAGGCCTCACTGGCAGCATCAGGACATGGGACATCAGGACATACACCGTGGCTCTCA
GGGAAAGGAAAAAGACCCTCTCCCAGGTGTACAAGCTCGATTCTAAACCTCATGGGACC
CTGCATTGTTCGCTCCCTCATTCATTCACTAGTCCATGCGTGTACTCAGTAGTGGCATA
AGCAGACTGCTCGGGTCGGACCTGAATTAGCCTCACCCACTCTCCTCCTACACTGTCCC
TCCCCAGGGCACATTCGCCTCCCAGGTGA[ct]GCTGGAGGGGGACAAGTTGAAAGTGG
AGCGGGAGATCGATGGGGGCCTGGAGACCCTGCGCCTGAAGCTGCCAGCTGTGGTGACA
GCTGACCTGAGGCTCAACGAGCCCCGCTACGCCACGCTGCCCAACATCATGGTGAGCCC
CTGGCCAGCGGGCACTGAGGGCCTGGGGGTGGCAAGCACATTGCCAGCCCAGTGCCCCC
CGGTGGTCGCACGTGGGGAGGGAAGGATCCAAAGGAGGTCTCGTGCACAGGAAGCCGTC
ACCTGGAGTTTGGCTGATAGAGAGAGTTTGCTGGGTCATCTCTGCCAATACTGAGAGTT
CATGGGGGCTGCTTTGGCTAGCAGGGAGGGCTTGCTGGTATCTAGGCCAGTAGAAAGCC
TTCGCTGGGCAGCAGAAGGTGTTCCCTTTGTCATTCCAGCCAGTGGAACAAGTTCACTG
GGTCATCTAGGTTCATTAGGG cggggtcccagaaggtggtttaaggactggtgtggacacacacagttctgttgtctgcc
cagcggaggggcctcacggggggccgttgggagccagattgtcagcttttggatttacc
agctgtgggtggcagtgggcgtgtaactcagcatcttgctgcctcagtttctctcatct
gtaaagtggggataataacatttacctcataaagttcctgcgaggattcgatgacttga
tacatcagttgcttagcacagggctcagcactcagtacatgttccctgtcaggaaggca
gggaggcctcactggcagcatcaggacatgggacatcaggacatacaccgtggctctca
gggaaaggaaaaagaccctctcccaggtgtacaagctcgattctaaacctcatgggacc
ctgcattgttcgctccctcattcattcactagtccatgcgtgtactcagtagtggcata
agcagactgctcgggtcggacctgaattagcctcacccactctcctcctacactgtccc
TCCCCAGGGCACATTCGCCTCCCAGGTGA[ct]GCTGGAGGGGGACAAGTTGAAAGTGG
AGCgggagatcgatgggggcctggagaccctgcgcctgaagctgccagctgtggtgaca
gctgacctgaggctcaacgagccccgctacgccacgctgcccaacatcatggtgagccc
ctggccagcgggcactgagggcctgggggtggcaagcacattgccagcccagtgccccc
cggtggtcgcacgtggggagggaaggatccaaaggaggtctcgtgcacaggaagccgtc
acctggagtttggctgatagagagagtttgctgggtcatctctgccaatactgagagtt
catgggggctgctttggctagcagggagggcttgctggtatctaggccagtagaaagcc
ttcgctgggcagcagaaggtgttccctttgtcattccagccagtggaacaagttcactg
ggtcatctaggttcattaggg

FIGURE 10nnn

47997 (SEQ ID NO:66)
TACTAAAAATATATAAATTAGCTGGGTGTGGTGGCATGTGCCTGTAATCCCAGGTACTT
GGGAGGCCAAGGCAGGAGTATTGCTTGAACCCAGGAGGCAGAGGTTGCAGTGAGCCGAG
ATCGTGCCACTGCACTCCAGCCTGGGCGACAGAGCGAGACTCCATCTCAAAATAAATAA
ATAAATATAATAAAAATAAATAAACAAATAAGCTTCCTTTTGCTCATTGACCCCAGAAT
CCCAGAGAAACCACACGTCCCAGCAACCCTCGTGGCAGAATAAGCCACAGAAAACAGCC
CACCCTAAGTGCCTCGCCTCCAGCAACTGAAGTTGCACGAGTCAGCACGTGCCCTTCTG
TGGACCTCAGAATAGATCCCTTCATACAAGGGCTGCAGGAGAAAGCAGGACTCCCAGCA
ATCTCTGGGGTCTGAGCTGGCCTGGCAAGCTGCCTCTGGGGCTGCCAGGAACTGCTATC
TCTCTGCACAGAGGTCCAATCCATACCTGCGTTGCAAAGATGGCTCTCTTCATCATAGT
GAAGTCTTCCTTATCCAGCATCTTGTTCA[ct]GTCGGGAAGGCTCCCACTGCAAGGCA
AGCAGGGGGCATGCATGTGAGAACGGAGTAATGAGAGGGGTTAGTCAGGGCCTAGGAGG
GCACAGGGCTGAGGGTGGGGCACTCACACCAGTAAGGATTCATAAAGCTTCCTCCCGAA
CTTTTCCTTCACCGTGTTGGCCGTGTCCCTGGAGGAAGCAGAGCAACAGGGTCACATAC
ACACCAGCTGCCATTTACTGTTAGGCTTCTTTAGTTAGTTTGTTTGTTTATTTTGAGAC
GGAGTTTGGCTCTTGTTGCCCAGGCTGGAATGCAATGGCGTGATCTCGGCTCACTGCAA
CCTCTGCCTCCCAGGTTCAAGCAATTCTCCTGCCTCAGCCTCCCGAGTAGCTGGGATTA
CAGGCATGAGCCACCGCGCCCGGCTAATTTTCTATTTTTAGTAGAGACGGGGTTTCTCC
ATGTTGGTCAGGCTGGTCTCA tactaaaaatatataaattagctgggtgtggtggcatgtgcctgtaatcccaggtactt
gggaggccaaggcaggagtattgcttgaacccaggaggcagaggttgcagtgagccgag
atcgtgccactgcactccagcctgggcgacagagcgagactccatctcaaaataaataa
ataaatataataaaaataaataaacaaataagcttccttttgctcattgaccccagaat
cccagagaaaccacacgtcccagcaaccctcgtggcagaataagccacagaaaacagcc
caccctaagtgcctcgcctccagcaactgaagttgcacgagtcagcacgtgcccttctg
tggacctcagaatagatcccttcatacaagggctgcaggagaaagcaggactcccagca
atctctggggtctgagctggcctggcaagctgcctctggggctgccaggaactgctatc
tctctgcacagaggtccaatccatacctgcgttgcaaagatggctctcttcatcatagt
gaagTCTTCCTTATCCAGCATCTTGTTCA[ct]GTCGGGAAGGCTCCCACTGCAAGGCa
agcagggggcatgcatgtgagaacggagtaatgagaggggttagtcagggcctaggagg
gcacagggctgagggtggggcactcacaccagtaaggattcataaagcttcctcccgaa
cttttccttcaccgtgttggccgtgtccctggaggaagcagagcaacagggtcacatac
acaccagctgccatttactgttaggcttctttagttagtttgtttgtttattttgagac
ggagtttggctcttgttgcccaggctggaatgcaatggcgtgatctcggctcactgcaa
cctctgcctcccaggttcaagcaattctcctgcctcagcctcccgagtagctgggatta
caggcatgagccaccgcgcccggctaattttctatttttagtagagacggggtttctcc
atgttggtcaggctggtctca

FIGURE 10ooo

48083 (SEQ ID NO:67)
CCCTCCCCACAGTACTGTGCAGCCCTGGAATCCCTGATCAACGTGTCAGGCTGCAGTGC
CATCGAGAAGACCCAGAGGATGCTGAGCGGATTCTGCCCGCACAAGGTCTCAGCTGGGG
TAAGGCATCCCCCACCCTCTCACACCCACCCTGCACCCCCTCCTGCCAACCCTGGGCTC
GCTGAAGGGAAGCTGGCTGAATATCCATGGTGTGTGTCCACCCAGGGGTGGGGCCATTG
TGGCAGCAGGGACGTGGCCTTCGGGATTTACAGGATCTGGGCTCAAGGGCTCCTAACTC
CTACCTGGGCCTCAATTTCCACATCTGTACAGTAGAGGTACTAACAGTACCCACCTCAT
GGGGACTTCCGTGAGGACTGAATGAGACAGTCCCTGGAAAGCCCCTGGTTTGTGCGAGT
CGTCCCGGCCTCTGGCGTTCTACTCACGTGCTGACCTCTTTGTCCTGCAGCAGTTTTCC
AGCTTGCATGTCCGAGACACCAAAATCGAGGTGGCCCAGTTTGTAAAGGACCTGCTCTT
ACATTTAAAGAAACTTTTTCGCGAGGGAC[ag]GTTCAACTGAAACTTCGAAAGCATCA
TTATTTGCAGAGACAGGACCTGACTATTGAAGTTGCAGATTCATTTTTCTTTCTGATGT
CAAAAATGTCTTGGGTAGGCGGGAAGGAGGGTTAGGGAGGGGTAAAATTCCTTAGCTTA
GACCTCAGCCTGTGCTGCCCGTCTTCAGCCTAGCCGACCTCAGCCTTCCCCTTGCCCAG
GGCTCAGCCTGGTGGGCCTCCTCTGTCCAGGGCCCTGAGCTCGGTGGACCCAGGGATGA
CATGTCCCTACACCCCTCCCCTGCCCTAGAGCACACTGTAGCATTACAGTGGGTGCCCC
CCTTGCCAGACATGTGGTGGGACAGGGACCCACTTCACACACAGGCAACTGAGGCAGAC
AGCAGCTCAGGCACACTTCTTCTTGGTCTTATTTATTATTGTGTGTTATTTAAATGAGT
GTGTTTGTCACCGTTGGGGAT ccctccccacagtactgtgcagccctggaatccctgatcaacgtgtcaggctgcagtgc
catcgagaagacccagaggatgctgagcggattctgcccgcacaaggtctcagctgggg
taaggcatcccccaccctctcacacccaccctgcaccccctcctgccaaccctgggctc
gctgaagggaagctggctgaatatccatggtgtgtgtccacccaggggtggggccattg
tggcagcagggacgtggccttcgggatttacaggatctgggctcaagggctcctaactc
ctacctgggcctcaatttccacatctgtacagtagaggtactaacagtacccacctcat
ggggacttccgtgaggactgaatgagacagtccctggaaagcccctggtttgtgcgagt
cgtcccggcctctggcgttctactcacgtgctgacctctttgtcctgcagcagttttcc
agcttgcatgtccgagacaccaaaatcgaggtggcccagtttGTAAAGGACCTGCTCTT
ACATTTAAAGAAACTTTTTCGCGAGGGAC[ag]GTTCAACTGAAACTTCGAAAGCATCA
TTATTTGCAGAGACAGGACCtgactattgaagttgcagattcatttttctttctgatgt
caaaaatgtcttgggtaggcgggaaggagggttagggaggggtaaaattccttagctta
gacctcagcctgtgctgcccgtcttcagcctagccgacctcagccttccccttgcccag
ggctcagcctggtgggcctcctctgtccagggccctgagctcggtggacccagggatga
catgtccctacacccctcccctgccctagagcacactgtagcattacagtgggtgcccc
ccttgccagacatgtggtgggacagggacccacttcacacacaggcaactgaggcagac
agcagctcaggcacacttcttcttggtcttatttattattgtgtgttatttaaatgagt
gtgtttgtcaccgttggggat

FIGURE 10ppp

48088 (SEQ ID NO:68)
GTACATACACACCCATGTGATACATATACACATACCCATAGTATACAGGTAACATAAAA
TTATACACACACAACACAAACACATATTATGCACATACGCACATAACACACACACACAC
ACCCACATACAGGCATTGTGAACTAGACACATCACCTTACAATCTGTGGTTTACTGGAA
GGACATGGAACAAAACCCCCCCAGCCACAGCGTGGAAGTGCCCTCTCCAGGCACAAGAT
TCTGCCTCCATGGGGCGTGGTAGCAGCATTGCCCACCCACCCAGGGCTGAGTGAGCAGG
CCTGCCCCACACTGCGCCCATGCACAGCCACTCCAGGCTGCCTCCCACACTGCCTGCAA
GGACCCCAGTGGGGACTGCAAACGGGAAGTCTGCATCCAGGGCCCCAGGGAGGGCAGGT
GGGGCTCTGGAGTATAGCACTTTCTAGAAGGGAAGCACCCTCTTGGTTCTGAACGTAAG
TGGGTCTGCTCACAGGGAGGGGCGTGCAGCCACCCCAGGACCCCAGCTGTCCAAGGAGC
CAGGGAAAACGCACCCACGGGGCACCTAC[ct]GCTGGGAGCGCAAAGAAGGAGATGGC
AAAGACAGAGAAGCAGGAGGCGATGGTCTTCCCGACCCACGTCTGGGGCACCTTGTCCC
CATAGCCGATGGTGGTGACTGTGACCTGCAGGGAGAGGGACAGTGGTCAGCCACGGATG
GGACTGGAGCCTCGGGAGGGCCAACTGCCTAACCCAAACCCACCACTCTGATGAGCGGA
GAGGCCGGCAAGAGACCCTGACCACCAGGACGACCCCGTGTGACTCGGCGAAAGCACCA
GGAACAGAGCCGCGGGATGGCACATGTCTCCCAGGCTCTCGGCGTCACACACAAGGTAT
GTCCCACCAGCACATGTAAGGAGCCCAGCACCCACGAAGGGCCAGGCCTGCTGGCTGGG
AACGTGGGCCTGGGAGCTCGCCCCACACCGGCTGCCTCATCTGCCTGCCTGTCCCCAGG
AGGCTGGGCCCCTGGGCCACC gtacatacacacccatgtgatacatatacacatacccatagtatacaggtaacataaaa
ttatacacacacaacacaaacacatattatgcacatacgcacataacacacacacacac
acccacatacaggcattgtgaactagacacatcaccttacaatctgtggtttactggaa
ggacatggaacaaaacccccccagccacagcgtggaagtgccctctccaggcacaagat
tctgcctccatggggcgtggtagcagcattgcccacccacccagggctgagtgagcagg
cctgccccacactgcgcccatgcacagccactccaggctgcctcccacactgcctgcaa
ggaccccagtggggactgcaaacgggaagtctgcatccagggccccagggagggcaggt
ggggctctggagtatagcactttctagaagggaagcaccctcttggttctgaacgtaag
tgggtctgctcacagggaggggcgtgcagccaccccaggaccccagctgtccaaggagC
CAGGGAAAACGCACCCACGGGGCACCTAC[ct]GCTGGGAGCGCAAAGAAGGAGATGGC
AAAGacagagaagcaggaggcgatggtcttcccgacccacgtctggggcaccttgtccc
catagccgatggtggtgactgtgacctgcagggagagggacagtggtcagccacggatg
ggactggagcctcgggagggccaactgcctaacccaaacccaccactctgatgagcgga
gaggccggcaagagaccctgaccaccaggacgaccccgtgtgactcggcgaaagcacca
ggaacagagccgcgggatggcacatgtctcccaggctctcggcgtcacacacaaggtat
gtcccaccagcacatgtaaggagcccagcacccacgaagggccaggcctgctggctggg
aacgtgggcctgggagctcgccccacaccggctgcctcatctgcctgcctgtccccagg
aggctgggcccctgggccacc

FIGURE 10qqq

48094 (SEQ ID NO:69)
AGCCTGGGTGACAAGAGCAAAACTCCACATCAAAAAAAATAATAATAAATAAATTAATT
AATTAATTAAATAAAACAAGAGCTTTTCTTTTTGCTTAATAAGAGAGAGTGGTGGTGGT
GCTTTTTTATTCCTGAAGATGGGAAGTCCTCTTTTGCCCACTAACCTCAGAAGAAAGGG
ATGAGGTGTACCGTACAGGGGCAGTCACCTTCTCCTCTGTTTAGCTTCCATTTTGGCCT
CATGTCTACCCCAAAGTTGTAGCTTAGATGGGGGGAAAATTCAGAATTTTGCATAGACC
ATAGGTAGCACCCCCTAGAAAAAGAATGTTTCTCCCCAGATGTCTCCCACTAGTACCCT
AACCATCTGCTTGTCTGTCTAGTGAGGACCCTTGGAGGGCTGCTAAAATGATCAAGGGT
TACATGCAGCAACACAACATCCCCCAGAGGGAGGTGGTCGATGTCACCGGCCTGAACCA
GTCGCACCTCTCCCAGCATCTCAACAAGGGCACCCCTATGAAGACCCAGAAGCGTGCCG
CTCTGTACACCTGGTACGTCAGAAAGCAA[ct]GAGAGATCCTCCGACGTAAGTGTTTT
CATCCTGCCTCTGCCTCAACCTGAAGTGACCTTTGCCCTCTCACCCCATTGGCTGCCTC
AGTTTCCCTTTCATCGACAAGGCCTTGTGAGCACTTGGCAGATATGAGGAAGGTGGCAA
GTAGATTTGGCCTTGGTGGTTGCTGTACAATGGATTGGCTTCTGTCATGTTCTTCAGTC
ACAGCCCCCTTGCTACCCAGCCAGTTGCTCTGAGGAGCCTGTCAGTGTATGCAGCATAC
CTTAAACTTTTTGGCCCCTCCTTCCACCTCCTTCTCTTTGAAACCAAGTAGGTGACAGA
GTGAAATGTCTTCCCTGAGAGAAAACCCAGCATCTCCCCTTGATACGTGACCATCAGTC
AATTTCCAAAGAAGACATTTCGTTGCAGTCAATAATATTGATTACTATTACTGTTAATT
TCCTCCTCTCTGGAAAAAGTA agcctgggtgacaagagcaaaactccacatcaaaaaaaataataataaataaattaatt
aattaattaaataaaacaagagcttttctttttgcttaataagagagagtggtggtggt
gcttttttattcctgaagatgggaagtcctcttttgcccactaacctcagaagaaaggg
atgaggtgtaccgtacaggggcagtcaccttctcctctgtttagcttccattttggcct
catgtctaccccaaagttgtagcttagatggggggaaaattcagaattttgcatagacc
ataggtagcaccccctagaaaaagaatgtttctccccagatgtctcccactagtaccct
aaccatctgcttgtctgtctagtgaggacccttggagggctgctaaaatgatcaagggt
tacatgcagcaacacaacatcccccagagggaggtggtcgatgtcaccggcctgaacca
gtcgcacctctcccagcatctcaacaagggcacccctatgaagacccagaaGCGTGCCG
CTCTGTACACCTGGTACGTCAGAAAGCAA[ct]GAGAGATCCTCCGACGTAAGTGTTTT
CATCCTGCCTCtgcctcaacctgaagtgacctttgccctctcaccccattggctgcctc
agtttccctttcatcgacaaggccttgtgagcacttggcagatatgaggaaggtggcaa
gtagatttggccttggtggttgctgtacaatggattggcttctgtcatgttcttcagtc
acagcccccttgctacccagccagttgctctgaggagcctgtcagtgtatgcagcatac
cttaaactttttggcccctccttccacctccttctctttgaaaccaagtaggtgacaga
gtgaaatgtcttccctgagagaaaacccagcatctccccttgatacgtgaccatcagtc
aatttccaaagaagacatttcgttgcagtcaataatattgattactattactgttaatt
tcctcctctctggaaaaagta

FIGURE 10rrr

48095 (SEQ ID NO:70)
CTGACTTAGCTGGGTGATATTGGGCGGGTTTCCTCTCTCTGGCCGTTTCCCACACCTGC
AGGCTGGGAGTGGTGCCTGCTGCCTCCTGACAGTGCTGCAGTGAGCATCAAGTGAGACA
AGCCCATGAAAACCCTCTGCAGCCCCAGAATGCCACGGAAATGCAGCATTATTGTATTG
AGCTTTGCTTTGAGTTTATTATATCATCAAACATATTATTAAATGACTGAGTTGGGTGG
GGGGTTGGTCAAGAGGGCCTATACAAGACCCCAGGATTCTGTGGGACCTGAGATTCTAG
AATTCTGCCACCCTGATTCCAAAGCAAGAGAAGAGTCTCTGACATGATCAGGGCCAGAA
AACTGGCTGGAGAGGCAGACAGTACAGTGCGTTCATATAAATGACTCTAATTCAGGTGG
TGGCGTGAGACTGTGGGCATGTGTGATGTGCAACAGAGCAGGCTGGTGTCCATAAGCCA
ACGATGGCACAGTACTCACCTTCTGGGGGGCATTGATGACTCCAGTGTTGTAGCCAAAC
TGCAGGGAGCCAAGCACTGCTCCTCCCAC[ga]GCCAGCATGAGGCGACCCGTCAGCTT
CTGCGGAGAAACAAACCACACTGTTATAGGCGTGTCTGGGAGCAGGTTACTACAGGGCA
GGGCCTGGACTGGCAAGTTTCTGTGTTCAGATATCTTGCCTGACTCTTGGCACCACACC
AGTCTTTCTCCCAGGAAACTTGGCCAATTCCTGACCTTAGGTGCCCAAACCAGCCTAGC
TGACTTCAAGATACTGGGCTGGCCGGGCCATTTCCTGGGGAGAGAGGGGAAGTATGATC
TTCTCTCTCTGTAGCCAGGTCTCAGAGAGGGAGAGGCTTTGGATTCTTGGGGGTCTCAT
TTCCCTGGTGGAGCCATGCCTAGGGTCTGGTGGTTCTAGACTCTCTGACTGGGAGGCCC
AGGAACCAGCCCTCCTATGCGAGGGGGCCCAAATTACTTGGTAGGAATAGCACAGATAT
AGATAGGAGAAGCACCCTGGA ctgacttagctgggtgatattgggcgggtttcctctctctggccgtttcccacacctgc
aggctgggagtggtgcctgctgcctcctgacagtgctgcagtgagcatcaagtgagaca
agcccatgaaaaccctctgcagccccagaatgccacggaaatgcagcattattgtattg
agctttgctttgagtttattatatcatcaaacatattattaaatgactgagttgggtgg
ggggttggtcaagagggcctatacaagaccccaggattctgtgggacctgagattctag
aattctgccaccctgattccaaagcaagagaagagtctctgacatgatcagggccagaa
aactggctggagaggcagacagtacagtgcgttcatataaatgactctaattcaggtgg
tggcgtgagactgtgggcatgtgtgatgtgcaacagagcaggctggtgtccataagcca
acgatggcacagtactcaccttctggggggcattgatgactccagtgttgtagccaaac
tgcagGGAGCCAAGCACTGCTCCTCCCAC[ga]GCCAGCATGAGGCGACCCGTCAGCtt
ctgcggagaaacaaaccacactgttataggcgtgtctgggagcaggttactacagggca
gggcctggactggcaagtttctgtgttcagatatcttgcctgactcttggcaccacacc
agtctttctcccaggaaacttggccaattcctgaccttaggtgcccaaaccagcctagc
tgacttcaagatactgggctggccgggccatttcctggggagagaggggaagtatgatc
ttctctctctgtagccaggtctcagagagggagaggctttggattcttgggggtctcat
ttccctggtggagccatgcctagggtctggtggttctagactctctgactgggaggccc
aggaaccagccctcctatgcgagggggcccaaattacttggtaggaatagcacagatat
agataggagaagcaccctgga

FIGURE 10sss

48097 (SEQ ID NO:71)
CATAATTTTTCTCAAACTCGGCGGACGGTTCGTGTTTGAAAGAGAAGTTGCCATTGATG
CTGAGCGGCGGGCTGAGGGGTCCATCAAAGGAAGGGCTGGTGCAATCAGTCAGAGGGCT
TTCAAAGAAGGGCTCCAGCGCTGCGCTGTAGGCGTGCGGCGGAGGCTTAACGTGGAAGA
CATGGGAGCTGTCCATGGTACCGTAAGGCGGACTGGGCAGCCCAGGCGACTGGTAGGAG
TAGGGGTGTACAGGGAAGGAAGCGCTGGCCGTCGGCAGGTGGGGGGGCATGTCCTGGTT
CTGCTCAGGCAGAAAAGTCCGAGGATTGAGTTGCAGGCAGCCCGCAACCAGGTTGGTGG
TGGGTTGGGATAAGCCCTTGCAAAGCGTCTGAACGAAGGAGACCAGGTCTGGGCTTTTG
CCTGAGCGCAGGATCTCCGACAGAGCCCAGATGTAGTTCTTGGCCAAGCGCAGAGTCTC
GATTTTGGACAGCTTCTGCGTCTTAGAATAGCAAGGCACCACCTTGCGCAGGTTGTCTA
GCGCCGCGTTCAGTCCGTGCATGCGGTTC[ca]GCTCCCGGGCGTTAGCCTTCATGCGT
CTCAATTTAAAACGCTCCAGGCGAGCCTTAGTCATCTTCTTCTTTTTGGGGCCGCGTCT
CTTGGGCTTTTGATCGTCATCCTCCTCTTCCTCTTCTTCCTCCTCTTCCAGGTCCTCAT
CTTCGTCCTCCTCCTCTCCCCCGTTCCTCAGTGAGTCCTCCTCTGCGTTCATGGTTTCG
AGGTCGTCCTCCTTCTTGTCTGCCTCGTGCTCCTCGTCCTGAGAACTGAGACACTCGTC
TGTCCAGCTTGGAGGACCTTGGGGCTGAGGCTCGCCCATCAGCCCACTCTCGCTGTACG
ATTTGGTCATGTTTCGATTTCCTACATTCAACAAGGGAGAGGCAAACAGAAAGAAAAGC
AGAAAAACGCTATATTCAAAAGCCAGATACGCCTTCAGCTTCCACTCCCTAAACCTGTA
CAAATGCTTGCGAAAAGTACC cataatttttctcaaactcggcggacggttcgtgtttgaaagagaagttgccattgatg
ctgagcggcgggctgaggggtccatcaaaggaagggctggtgcaatcagtcagagggct
ttcaaagaagggctccagcgctgcgctgtaggcgtgcggcggaggcttaacgtggaaga
catgggagctgtccatggtaccgtaaggcggactgggcagcccaggcgactggtaggag
taggggtgtacagggaaggaagcgctggccgtcggcaggtgggggggcatgtcctggtt
ctgctcaggcagaaaagtccgaggattgagttgcaggcagcccgcaaccaggttggtgg
tgggttgggataagcccttgcaaagcgtctgaacgaaggagaccaggtctgggcttttg
cctgagcgcaggatctccgacagagcccagatgtagttcttggccaagcgcagagtctc
gattttggacagcttctgcgtcttagaatagcaaggcaccaccttgcgcaggttgtcta
gcgcCGCGTTCAGTCCGTGCATGCGGTTC[ca]GCTCCCGGGCGTTAGCCTTCATGCGt
ctcaatttaaaacgctccaggcgagccttagtcatcttcttctttttggggccgcgtct
cttgggcttttgatcgtcatcctcctcttcctcttcttcctcctcttccaggtcctcat
cttcgtcctcctcctctcccccgttcctcagtgagtcctcctctgcgttcatggtttcg
aggtcgtcctccttcttgtctgcctcgtgctcctcgtcctgagaactgagacactcgtc
tgtccagcttggaggaccttggggctgaggctcgcccatcagcccactctcgctgtacg
atttggtcatgtttcgatttcctacattcaacaagggagaggcaaacagaaagaaaagc
agaaaaacgctatattcaaaagccagatacgccttcagcttccactccctaaacctgta
caaatgcttgcgaaaagtacc

FIGURE 10ttt

53412 (SEQ ID NO:72)
GGATTTATCTAGTATAACAAACCATCGGTCTGATAATACATATCTGATAGTGTTGCTGT
GAATATAATTGAGGTAATACATGTAAAAGAGCTGGCACACAAAAAGAAGCTCAAAAAAT
TGTTCTTTCCTTACCAGGTGTTGCCCTGGTTCCTGCCATATCGCTCCCCAAAGGTGCTG
TAGGAGCCATCATAGTGTTTGTAGTTCAACTGTCTCTGGTAACCTGGAAAGGAAGATTA
ACGAAACAGCACAATGGATTAATGTGCATGCTGAGGGTGGAGAAATTACTAAAAGTACC
TTGGCTTCTCTTGTGACATTTCTTAAATTTTGTTGTCATAGATTAGGAGTTTCTGAGCC
TTAAATATTTTATTGGAGGTTGGAGAGTGGATAGTTTCCTTGAAATTAACTATCATAGC
AGCTATCATAGTGAGCTAAGCTAATGTATCATAATATTCATAAGTAACTGAAACCTACT
GGGAAATCCAGTTGAAATAACATTCAAGTTTTCCCTTACTCAAGTAATCACTCACCAGT
GTTGAGATAGCCAATGGCCTTGGACTTGA[ct]CTCTGGAGTAAGCTGCTGTGTTTCAT
TTAGATAATCCAGTACATAGATGTTAGGAGCAAAGAGGACCATATTCTGCTCTCCACAG
CCATAGGGCATCTGGAGAAGATTTTGTGTGTTTTGCATGGCAGAGCCTAATATGTCTCC
TAGAGAATGGGAGAGATGGGAAGTCATAAAGCTTGGAGATTATCATCTATCAAAGTCAT
TAAGCAGAAATAATTAGTTGAGCTTAGAAATTGAGAATTTTTAGGAAGGATGATTCTTC
CAGGGATAGAAGTATGATTGAAAGCAATAAACAAGCCCAAAGAAGAAGAGAAGAAAGAA
GTTAAAATTATAGTATTATTTTTAGTAAATATTTATGGGAAATAAAAATAGTATAATAG
AAGCTGTTAATGCCCGGATCCACTAGGGGCTGGAGACTCACCCAAAACTGAGACAGAAG
CTCGGGCAGATTCTTCTACCA ggatttatctagtataacaaaccatcggtctgataatacatatctgatagtgttgctgt
gaatataattgaggtaatacatgtaaaagagctggcacacaaaaagaagctcaaaaaat
tgttctttccttaccaggtgttgccctggttcctgccatatcgctccccaaaggtgctg
taggagccatcatagtgtttgtagttcaactgtctctggtaacctggaaaggaagatta
acgaaacagcacaatggattaatgtgcatgctgagggtggagaaattactaaaagtacc
ttggcttctcttgtgacatttcttaaattttgttgtcatagattaggagtttctgagcc
ttaaatattttattggaggttggagagtggatagtttccttgaaattaactatcatagc
agctatcatagtgagctaagctaatgtatcataatattcataagtaactgaaacctact
gggaaatccagttgaaataacattcaagttttcccttactcaagtaatCACTCACCAGT
GTTGAGATAGCCAATGGCCTTGGACTTGA[ct]CTCTGGAGTAAGCTGCTGTGTTTCAT
TTAGATAATCCAGTacatagatgttaggagcaaagaggaccatattctgctctccacag
ccatagggcatctggagaagattttgtgtgttttgcatggcagagcctaatatgtctcc
tagagaatgggagagatgggaagtcataaagcttggagattatcatctatcaaagtcat
taagcagaaataattagttgagcttagaaattgagaatttttaggaaggatgattcttc
cagggatagaagtatgattgaaagcaataaacaagcccaaagaagaagagaagaaagaa
gttaaaattatagtattatttttagtaaatatttatgggaaataaaaatagtataatag
aagctgttaatgcccggatccactaggggctggagactcacccaaaactgagacagaag
ctcgggcagattcttctacca

FIGURE 10uuu

53415 (SEQ ID NO:73)
GAAAACAGTCTGGGTTCCCTGTGGAACATCATTTCTCAAAACTGTATTTTGGGGCTTGC
TTTCTCATTTTTCCTTTCCATTTCAGATATCCTTACTGCTGTCTTTGGGCTCTTTAAAC
ACTGCCTTTTTTCCTTTTTCGATCACACCCAAAAACTTTTCTCAAAAATTACATGTAAA
TTTAAAAATTTACAAATTAAATTTAAAATTGAAATTTTAAAAATCCCGACTCTCCCTAA
TTTCAGGAAGCATGCATTTATTATACATAACAAGACGTGAAAGCCGCAAGAGTTTCAGC
CTAAACACTGAAGACCCCGCGAAGTGAATCCAGCTGCTGCTCTACAAGCAGCAACAACA
ACTGGGAAGCCTTCTCAGCTACACTTCGGGGCACTGGTCCAACCCCACGCAAAATCCCT
CGTTTCCCTTAGCGTGGTAAGACGGAGCCTGACCTGAGCTCCAACTGTCCTATCTTTTT
CAAATGTTTCAAACTTACTGCCTTTGTTCAGCAGAACCACGGGCACGGTGATGATGGTG
ACAAGCGCAGCAGCACCCAGCAGTCCCAG[ga]AGAACCTTCCACGGTGTCTGCAAGCC
GAGCAGATCAAGTCCAATTAGAGGGAAGCGTGTGGCCCCAGTTTCCGTAGGAGGGTCGG
GGCTGCTCCAGAGGCAGCAGGATTTGCAGGTGGGAGTGCGTTAGAAGAGGGAGACCGCG
GGCTGGGGGTGGGGGTGGCGTCTGGAGTGCGCCAGTTGGAGTTCTCTAAGGCGGGTGCC
CTTGAACTTGTGCCTTCAGAGCACATTAGCGTTGGTTTCTCTACCCCTGCCCGGGTTCG
GGCGTGCGTTCTGTGAGTGGCTCTCCGGGACATTCAAAGCTCGACGCCAGGGTCCTAGC
AGAAGCCAGGGTCCGAAAGCTAAGCGAGAGCTCTGGGACGTCCCTTCACCTGTCAGAGG
GTGGCCTTGGGGCTTCCGCCTAAGGGGAGTCCCTGGTCCGGTTTCGCCAGCTTTTGGGC
CATTTGGGGAGTTTGGCGAAG gaaaacagtctgggttccctgtggaacatcatttctcaaaactgtattttggggcttgc
tttctcatttttcctttccatttcagatatccttactgctgtctttgggctctttaaac
actgccttttttcctttttcgatcacacccaaaaacttttctcaaaaattacatgtaaa
tttaaaaatttacaaattaaatttaaaattgaaattttaaaaatcccgactctccctaa
tttcaggaagcatgcatttattatacataacaagacgtgaaagccgcaagagtttcagc
ctaaacactgaagaccccgcgaagtgaatccagctgctgctctacaagcagcaacaaca
actgggaagccttctcagctacacttcggggcactggtccaaccccacgcaaaatccct
cgtttcccttagcgtggtaagacggagcctgacctgagctccaactgtcctatcttttt
caaatgtttcaaacttactgcctttgttcagcagaaccacgggcacggtgatgatggtg
aCAAGCGCAGCAGCACCCAGCAGTCCCAG[ga]AGAACCTTCCACGGTGTCTGCAAGCC
GAgcagatcaagtccaattagagggaagcgtgtggccccagtttccgtaggagggtcgg
ggctgctccagaggcagcaggatttgcaggtgggagtgcgttagaagagggagaccgcg
ggctgggggtgggggtggcgtctggagtgcgccagttggagttctctaaggcgggtgcc
cttgaacttgtgccttcagagcacattagcgttggtttctctacccctgcccgggttcg
ggcgtgcgttctgtgagtggctctccgggacattcaaagctcgacgccagggtcctagc
agaagccagggtccgaaagctaagcgagagctctgggacgtcccttcacctgtcagagg
gtggccttggggcttccgcctaaggggagtccctggtccggtttcgccagcttttgggc
catttggggagtttggcgaag

FIGURE 10vvv

53418 (SEQ ID NO:74)
AGAGGCACAAGAAATTACCTTGAAAAAATGGAATTCAGTGACTGCCATCTAGGAAAGAC
AGTGATACTGTCCAGCAGCATGCAGTTCCGAGAGCTCAACTCTTAGGCCACCCTCCCTC
CACTCTACTCTAGGAACAAGGAGCATTAGGTCTGTTTTCTCTCCATACACCTCAATCGC
TCGTCCTCTCGTCTTATTAAAACACAGACACAGAACCAAACTTTTTGACAGTTAAAGAC
AAACAATTACATCTAATTAAAATGCTAAGAGATCCTGAGCTGTTAGAGATGAGGAGAGT
AGATAGTATGACCTGATCTTCCCCCCTCTTTTTTTTCCTTTAACAGTATTCTGTTTCAG
CATAAAGCACACTTTCTGAAGAGGTTCCTGGTGGAGACTGGAAATCTGACTGTGTCCTG
TGGCAACACACAGTCCCTTGCATAACTTTGGCTTCAGTCCCTGGATCTGTCCTTTGCAG
CTACGTCAGGTTCCATGGAAGGAGGAAAGAGCTGGAGGGCAGTATCACTCAGCCAAAGC
TCCCATGGGGTCCCATGCTGGCAGGATAA[tc]GGGTTCCTGCTCTAACACAGCTAGCA
CCTCTTCAGGGACATGCTTCCTGTCCACCACCACTTCGTAGACATACTCAGAGAACCAC
TCATCTGTCATGCACAGGTAACCTGGAGAAAAGAACAGAAGACTTATGAGTCCAGAGGG
CAAGGGACAAAGAGCAGAAACCCTTTTTGTAGGATAAACCTTTTACAAAACTAATATTC
ATACATATTTTTCAGCTTTCCCATCTGTAATTTCATTTAATCTAAATCTTATTAGCAAT
TCTGTGAAGCAGATAGGACAGGCATGGCTCTATTTTTAGAAAAATTAGAAAACCGGGTC
TTGAGTAACTAGGTGATGTGCCCAGGTCACATGGTGAGGTTCAGAGCTGGGCCTTGGAC
CTAAGGCTAACACCAGATCCTGTACTGATGCTCTCTTCCTCCGCTGCCTTGGTGATGGT
GAGTGATGACCTGTATACTAG agaggcacaagaaattaccttgaaaaaatggaattcagtgactgccatctaggaaagac
agtgatactgtccagcagcatgcagttccgagagctcaactcttaggccaccctccctc
cactctactctaggaacaaggagcattaggtctgttttctctccatacacctcaatcgc
tcgtcctctcgtcttattaaaacacagacacagaaccaaactttttgacagttaaagac
aaacaattacatctaattaaaatgctaagagatcctgagctgttagagatgaggagagt
agatagtatgacctgatcttcccccctcttttttttcctttaacagtattctgtttcag
cataaagcacactttctgaagaggttcctggtggagactggaaatctgactgtgtcctg
tggcaacacacagtcccttgcataactttggcttcagtccctggatctgtcctttgcag
ctacgtcaggttccatggaaggaggaaagagctggagggcagtatcactcagccAAAGC
TCCCATGGGGTCCCATGCTGGCAGGATAA[tc]GGGTTCCTGCTCTAACACAGCTAGCA
CCTCTTCAgggacatgcttcctgtccaccaccacttcgtagacatactcagagaaccac
tcatctgtcatgcacaggtaacctggagaaaagaacagaagacttatgagtccagaggg
caagggacaaagagcagaaaccctttttgtaggataaaccttttacaaaactaatattc
atacatatttttcagctttcccatctgtaatttcatttaatctaaatcttattagcaat
tctgtgaagcagataggacaggcatggctctatttttagaaaaattagaaaaccgggtc
ttgagtaactaggtgatgtgcccaggtcacatggtgaggttcagagctgggccttggac
ctaaggctaacaccagatcctgtactgatgctctcttcctccgctgccttggtgatggt
gagtgatgacctgtatactag

FIGURE 10www

53433 (SEQ ID NO:75)
CATACGCACATAACACACACACACACACCCACATACAGGCATTGTGAACTAGACACATC
ACCTTACAATCTGTGGTTTACTGGAAGGACATGGAACAAAACCCCCCCAGCCACAGCGT
GGAAGTGCCCTCTCCAGGCACAAGATTCTGCCTCCATGGGGCGTGGTAGCAGCATTGCC
CACCCACCCAGGGCTGAGTGAGCAGGCCTGCCCCACACTGCGCCCATGCACAGCCACTC
CAGGCTGCCTCCCACACTGCCTGCAAGGACCCCAGTGGGGACTGCAAACGGGAAGTCTG
CATCCAGGGCCCCAGGGAGGGCAGGTGGGGCTCTGGAGTATAGCACTTTCTAGAAGGGA
AGCACCCTCTTGGTTCTGAACGTAAGTGGGTCTGCTCACAGGGAGGGGCGTGCAGCCAC
CCCAGGACCCCAGCTGTCCAAGGAGCCAGGGAAAACGCACCCACGGGGCACCTACCGCT
GGGAGCGCAAAGAAGGAGATGGCAAAGACAGAGAAGCAGGAGGCGATGGTCTTCCCGAC
CCACGTCTGGGGCACCTTGTCCCCATAGC[ct]GATGGTGGTGACTGTGACCTGCAGGG
AGAGGGACAGTGGTCAGCCACGGATGGGACTGGAGCCTCGGGAGGGCCAACTGCCTAAC
CCAAACCCACCACTCTGATGAGCGGAGAGGCCGGCAAGAGACCCTGACCACCAGGACGA
CCCCGTGTGACTCGGCGAAAGCACCAGGAACAGAGCCGCGGGATGGCACATGTCTCCCA
GGCTCTCGGCGTCACACACAAGGTATGTCCCACCAGCACATGTAAGGAGCCCAGCACCC
ACGAAGGGCCAGGCCTGCTGGCTGGGAACGTGGGCCTGGGAGCTCGCCCCACACCGGCT
GCCTCATCTGCCTGCCTGTCCCCAGGAGGCTGGGCCCCTGGGCCACCGACGTTGCTGTG
CGCCGGCCCCCAGGAGACCGGGAGCTCCCACTGAGGCTGGTCGTCAACAAAGAGCAGGG
GCTGGGATGACGCGCTGCTTC catacgcacataacacacacacacacacccacatacaggcattgtgaactagacacatc
accttacaatctgtggtttactggaaggacatggaacaaaacccccccagccacagcgt
ggaagtgccctctccaggcacaagattctgcctccatggggcgtggtagcagcattgcc
cacccacccagggctgagtgagcaggcctgccccacactgcgcccatgcacagccactc
caggctgcctcccacactgcctgcaaggaccccagtggggactgcaaacgggaagtctg
catccagggccccagggagggcaggtggggctctggagtatagcactttctagaaggga
agcaccctcttggttctgaacgtaagtgggtctgctcacagggaggggcgtgcagccac
cccaggaccccagctgtccaaggagccagggaaaacgcacccacggggcacctaccgct
gggagcgcaaagaaggagatggcaaagacagagaagcaggaggcgatggtcttcccgaC
CCACGTCTGGGGCACCTTGTCCCCATAGC[ct]GATGGTGGTGACTGTGACCTGCAGGG
AGAGggacagtggtcagccacggatgggactggagcctcgggagggccaactgcctaac
ccaaacccaccactctgatgagcggagaggccggcaagagaccctgaccaccaggacga
ccccgtgtgactcggcgaaagcaccaggaacagagccgcgggatggcacatgtctccca
ggctctcggcgtcacacacaaggtatgtcccaccagcacatgtaaggagcccagcaccc
acgaagggccaggcctgctggctgggaacgtgggcctgggagctcgccccacaccggct
gcctcatctgcctgcctgtccccaggaggctgggcccctgggccaccgacgttgctgtg
cgccggcccccaggagaccgggagctcccactgaggctggtcgtcaacaaagagcaggg
gctgggatgacgcgctgcttc

FIGURE 10xxx

53444 (SEQ ID NO:76)
TCAGTTTGTCCAGTAAGATGGGGTGGTCTGTTTCCACCAGGTCCAGCTATCCACTGGTG
GTTCTATGGGGAGCAGTGGGGGTGGTTAAAGGAGCTCTGTGTGGCCGGGAGCGGTGGCT
GATGCCTGTAATCCCAGCTCTTTGGGATGCCAAGGCAGGAGGATCGCTTGAGCCCAGGA
GTTTGAGATCAGGCTGGGCAATATAGTGAAACCTTGTCTCTACGACAAATAAAATTAGC
TAGGCATACTGGTGGTGCACCTGTGGTACCAGCTATAGGGGGGCGCTGAGACAGGAGGA
TTGCTTGAGCTCAGGAGGTTGAGGCTGCAGTGAGCCCTGATTGTGTCACTGCATTCTAG
CCTGGGTGACAGAGTGAGACCCTGTTTAAAAAAAAAAATAGAACTCTGTGTGGCTGAGG
ACAGCTCTCCAGGGGCCCCCACACTGCCTTCCAAATTCCCCTAGGCGGCTACATTGCAC
TAGAAACTATATCCACATCAACCTGTTCACGTCTTTCATGCTGCGAGCTGCGGCCATTC
TCAGCCGAGACCGTCTGCTACCTCGACCT[gt]GCCCCTACCTTGGGGACCAGGCCCTT
GCGCTGTGGAACCAGGTGGGCATCCTCCTTCCGTTCCTCCAAATGGGAATCTTGCTTCT
CTGGTGGGACCAGGAAGTTCTCAGTCCATTTCCTATCTCCTACACTCTCCACAGTTTAT
CTGAGTTGGGAGGGTCCCTCTCCAAATGTGTCTTGGGGTGGGGGATCAAGACACATTTG
GAGAGGGAACCTCCCAACTCGGCCTCTGCCATCATTTAACTCTCCCAGCCTATCACTCC
CATACTGGAATTTTCCGTTCCTCTCCCTCATTATTTCACCCATCATTGAACTTTTTCAC
CAATGAGAGAATCCACCTGCTGGCGGTGAGGCATGGCAGGATACGAGAAAGTAAGTGGG
GGTGGGGATGTGGCAGGTGCCAGTTTGTTACTAGGAGACAGGGTGGGAGAGACTAGAGT
CTGGGAGCAGACGTGGTAAGA tcagtttgtccagtaagatggggtggtctgtttccaccaggtccagctatccactggtg
gttctatggggagcagtgggggtggttaaaggagctctgtgtggccgggagcggtggct
gatgcctgtaatcccagctctttgggatgccaaggcaggaggatcgcttgagcccagga
gtttgagatcaggctgggcaatatagtgaaaccttgtctctacgacaaataaaattagc
taggcatactggtggtgcacctgtggtaccagctataggggggcgctgagacaggagga
ttgcttgagctcaggaggttgaggctgcagtgagccctgattgtgtcactgcattctag
cctgggtgacagagtgagaccctgtttaaaaaaaaaaatagaactctgtgtggctgagg
acagctctccaggggcccccacactgccttccaaattcccctaggcggctacattgcac
tagaaactatatccacatcaacctgttcacgtctttcatgctgcgagctgcggccattc
tcagccGAGACCGTCTGCTACCTCGACCT[gt]GCCCCTACCTTGGGGACCAGGCCctt
gcgctgtggaaccaggtgggcatcctccttccgttcctccaaatgggaatcttgcttct
ctggtgggaccaggaagttctcagtccatttcctatctcctacactctccacagtttat
ctgagttgggagggtccctctccaaatgtgtcttggggtgggggatcaagacacatttg
gagagggaacctcccaactcggcctctgccatcatttaactctcccagcctatcactcc
catactggaattttccgttcctctccctcattatttcacccatcattgaactttttcac
caatgagagaatccacctgctggcggtgaggcatggcaggatacgagaaagtaagtggg
ggtggggatgtggcaggtgccagtttgttactaggagacagggtgggagagactagagt
ctgggagcagacgtggtaaga

FIGURE 10yyy

53445 (SEQ ID NO:77)
TGTTTCCACCAGGTCCAGCTATCCACTGGTGGTTCTATGGGGAGCAGTGGGGGTGGTTA
AAGGAGCTCTGTGTGGCCGGGAGCGGTGGCTGATGCCTGTAATCCCAGCTCTTTGGGAT
GCCAAGGCAGGAGGATCGCTTGAGCCCAGGAGTTTGAGATCAGGCTGGGCAATATAGTG
AAACCTTGTCTCTACGACAAATAAAATTAGCTAGGCATACTGGTGGTGCACCTGTGGTA
CCAGCTATAGGGGGGCGCTGAGACAGGAGGATTGCTTGAGCTCAGGAGGTTGAGGCTGC
AGTGAGCCCTGATTGTGTCACTGCATTCTAGCCTGGGTGACAGAGTGAGACCCTGTTTA
AAAAAAAAAATAGAACTCTGTGTGGCTGAGGACAGCTCTCCAGGGGCCCCCACACTGCC
TTCCAAATTCCCCTAGGCGGCTACATTGCACTAGAAACTATATCCACATCAACCTGTTC
ACGTCTTTCATGCTGCGAGCTGCGGCCATTCTCAGCCGAGACCGTCTGCTACCTCGACC
TGGCCCCTACCTTGGGGACCAGGCCCTTG[ct]GCTGTGGAACCAGGTGGGCATCCTCC
TTCCGTTCCTCCAAATGGGAATCTTGCTTCTCTGGTGGGACCAGGAAGTTCTCAGTCCA
TTTCCTATCTCCTACACTCTCCACAGTTTATCTGAGTTGGGAGGGTCCCTCTCCAAATG
TGTCTTGGGGTGGGGGATCAAGACACATTTGGAGAGGGAACCTCCCAACTCGGCCTCTG
CCATCATTTAACTCTCCCAGCCTATCACTCCCATACTGGAATTTTCCGTTCCTCTCCCT
CATTATTTCACCCATCATTGAACTTTTTCACCAATGAGAGAATCCACCTGCTGGCGGTG
AGGCATGGCAGGATACGAGAAAGTAAGTGGGGGTGGGGATGTGGCAGGTGCCAGTTTGT
TACTAGGAGACAGGGTGGGAGAGACTAGAGTCTGGGAGCAGACGTGGTAAGAACTAACT
TGTTGAAAGTTGGACCATACC tgtttccaccaggtccagctatccactggtggttctatggggagcagtgggggtggtta
aaggagctctgtgtggccgggagcggtggctgatgcctgtaatcccagctctttgggat
gccaaggcaggaggatcgcttgagcccaggagtttgagatcaggctgggcaatatagtg
aaaccttgtctctacgacaaataaaattagctaggcatactggtggtgcacctgtggta
ccagctatagggggggcgctgagacaggaggattgcttgagctcaggaggttgaggctgc
agtgagccctgattgtgtcactgcattctagcctgggtgacagagtgagaccctgttta
aaaaaaaaaatagaactctgtgtggctgaggacagctctccaggggcccccacactgcc
ttccaaattcccctaggcggctacattgcactagaaactatatccacatcaacctgttc
acgtctttcatgctgcgagctgcggccattctcagccgagaccgtctgctacctcgacc
tggCCCCTACCTTGGGGACCAGGCCCTTG[ct]GCTGTGGAACCAGGTGGGCATCCTCC
ttccgttcctccaaatgggaatcttgcttctctggtgggaccaggaagttctcagtcca
tttcctatctcctacactctccacagtttatctgagttgggagggtccctctccaaatg
tgtcttggggtgggggatcaagacacatttggagagggaacctcccaactcggcctctg
ccatcatttaactctcccagcctatcactcccatactggaattttccgttcctctccct
cattatttcacccatcattgaactttttcaccaatgagagaatccacctgctggcggtg
aggcatggcaggatacgagaaagtaagtgggggtggggatgtggcaggtgccagtttgt
tactaggagacagggtgggagagactagagtctgggagcagacgtggtaagaactaact
tgttgaaagttggaccatacc

FIGURE 10zzz

53459 (SEQ ID NO:78)
CCTTTTATTTTTCTTCCATGGAATTTTCCAGTTAACTTGAGAAAGTGGAATCGAATTCC
GATGTTGAATTTTCCTTCTGGCCCCATTCATGTGGCAGGTGGTGATTCAGGTACTACTG
GGGGCTGCTCAGACAAACCTCCTCATCAGACATCAAGAGGCTGTTGCACCAGGAGGGCC
GGTACCGTGTCTAGAGGTGGTCGGCATGGGGTTGGAGTTGTATTACATAAACCCTACTC
CAAACAAATGCATGGGGATGTGGCTGGAGTTCCCCGTTGTCTAACCAGTGCCAAAGGGC
AGGACGGTACCTCACCCCACGTTCTTAACTATGGGTTGGCAACATGTTCCTGGATGTGT
TTGCTGGCACAGTGACAGGTGCTAGCAACCAGGGTGTTGACACAGTCCAACTCCATCCT
CACCAGGTCACTGGCTGGAACCCCTGGGGGCCACCATTGCGGGAATCAGCCTTTGAAAC
GATGGCCAACAGCAGCTAATAATAAACCAGTAATTTGGGATAGACGAGTAGCAAGAGGG
CATTGGTTGGTGGGTCACCCTCCTTCTCA[gt]AACACATTATAAAAACCTTCCGTTTC
CACAGGATTGTCTCCCGGGCTGGCAGCAGGGCCCCAGCGGCACCATGTCTGCCCTCGGA
GTCACCGTGGCCCTGCTGGTGTGGGCGGCCTTCCTCCTGCTGGTGTCCATGTGGAGGCA
GGTGCACAGCAGCTGGAATCTGCCCCCAGGCCCTTTCCCGCTTCCCATCATCGGGAACC
TCTTCCAGTTGGAATTGAAGAATATTCCCAAGTCCTTCACCCGGGTAAGAGAAATAGTG
TTGATTTTAGGGAGAATAACTCAGCAATTGGATCTGGTATGTGTGTATTCAACTCATTT
GCAGACAAATTGTGGTTGTTCAATACCAGCCTGTTGTGAATTACCTGAATTGATAGCAT
CCTGGAGCGACACTCAAAATGTGTCGCCTGTGGTGCAGCTGGAGCCCGGAGCCTGCGTG
CCAGGCCCCGGAGGCCCCCGC cctttatttttcttccatggaattttccagttaacttgagaaagtggaatcgaattcc
gatgttgaattttccttctggccccattcatgtggcaggtggtgattcaggtactactg
ggggctgctcagacaaacctcctcatcagacatcaagaggctgttgcaccaggagggcc
ggtaccgtgtctagaggtggtcggcatggggttggagttgtattacataaaccctactc
caaacaaatgcatggggatgtggctggagttccccgttgtctaaccagtgccaaagggc
aggacggtacctcaccccacgttcttaactatgggttggcaacatgttcctggatgtgt
ttgctggcacagtgacaggtgctagcaaccagggtgttgacacagtccaactccatcct
caccaggtcactggctggaacccctgggggccaccattgcgggaatcagcctttgaaac
gatggccaacagcagctaataataaaccagtaatttgggatagacGAGTAGCAAGAGGG
CATTGGTTGGTGGGTCACCCTCCTTCTCA[gt]AACACATTATAAAAACCTTCCGTTTC
CACAGGATTGTCTCCCGggctggcagcagggccccagcggcaccatgtctgccctcgga
gtcaccgtggccctgctggtgtgggcggccttcctcctgctggtgtccatgtggaggca
ggtgcacagcagctggaatctgcccccaggccctttcccgcttcccatcatcgggaacc
tcttccagttggaattgaagaatattcccaagtccttcacccgggtaagagaaatagtg
ttgattttagggagaataactcagcaattggatctggtatgtgtgtattcaactcattt
gcagacaaattgtggttgttcaataccagcctgttgtgaattacctgaattgatagcat
cctggagcgacactcaaaatgtgtcgcctgtggtgcagctggagcccggagcctgcgtg
ccaggccccggaggcccccgc

FIGURE 10aaaa

53464 (SEQ ID NO:79)
AAGCAGTACCAGCAGCCAGAAACCGCATAACAAATACATTGGGCAATTGGGAGTTGGGG
ATGTTGACTGAACCTTTGAACTTGACTGATCCGAATGCCAAATTCTAATTTAAAAAGGG
AAAACTGGATGTTTGAGACATAGTGTGATTTGGTGAAGCAAACAATGGACTCCCAGGTT
AAAAACTCTAATTAGTCTCTTCTGCTGAGTTCCTGAGTTAACCGTTTGTGTAGTGGTCT
CCTAGTATATTTTATAACTTACAAAGCTAGAGGATCAAAGCAATTATCTAGAAATACAC
ACAAAACTCATGTTTGGTATAAATGTCTGAACAATTAACCAAACTGTCGCAACAGCTTT
TTTCATTGATTTGATCTAACACTGATATGCCTCATAGGGTCATGAGTTGAAAAAACAAC
TCTAAAGCTATTCCACAAGAAGAAAGATAATATTTTTCTAAACAAGTGTTAGGAAAATG
AAAATATGAAAGTTTCTGTTTATGCTTATTTATGAAATTTGCCTACCTTCCAAGTGTGT
CCCCAAGCCACCCACCAAAGAATGATGCA[ag]TCATTCCACCAACTGCAAAGCTGGAT
ACAGACAGGGACCAGAGCATGGTGATTAGTTGAGCAGCTGCCACAGTCTCTTCCTCAGC
CCAAGGGGTTGGTTTTGGGTTCATTGAGTATGAGATTGTGGGCAGTTCATCTGTACTGT
TGATAACATAGTTGTTGATAGCTTTTCGGTCATCCAGTGGAACACCCAAAACATGTCTA
TAGTGAGATATTATTACCTAGGAGATAAAGAAAAATAGCTTTACTATTTCAAACATTCT
ATGTATTTTTGTTTTTGTCTTTAAAGTGTTTGTTACGTGTTTAAATAGTACCATCTCAA
TTATGTGTTTTATATACATATAAACATGGATAGATTTGTTTACAGTTGGCCATATCCTA
TAAAAGAAAGGTTATAAATTACATTGCCAACAAGAACCAGGCAGGAACAAATAAATGAA
GGGAACATGTAATACTTTGAT aagcagtaccagcagccagaaaccgcataacaaatacattgggcaattgggagttgggg
atgttgactgaacctttgaacttgactgatccgaatgccaaattctaatttaaaaaggg
aaaactggatgtttgagacatagtgtgatttggtgaagcaaacaatggactcccaggtt
aaaaactctaattagtctcttctgctgagttcctgagttaaccgtttgtgtagtggtct
cctagtatattttataacttacaaagctagaggatcaaagcaattatctagaaatacac
acaaaactcatgtttggtataaatgtctgaacaattaaccaaactgtcgcaacagcttt
tttcattgatttgatctaacactgatatgcctcatagggtcatgagttgaaaaaacaac
tctaaagctattccacaagaagaaagataatatttttctaaacaagtgttaggaaaatg
aaaatatgaaagtttctgtttatgcttatttatgaaatttgcctaccttccaaGTGTGT
CCCCAAGCCACCCACCAAAGAATGATGCA[ag]TCATTCCACCAACTGCAAAGCTGGAT
ACAGACAGGgaccagagcatggtgattagttgagcagctgccacagtctcttcctcagc
ccaaggggttggttttgggttcattgagtatgagattgtgggcagttcatctgtactgt
tgataacatagttgttgatagcttttcggtcatccagtggaacacccaaaacatgtcta
tagtgagatattattacctaggagataaagaaaaatagctttactatttcaaacattct
atgtatttttgtttttgtctttaaagtgtttgttacgtgtttaaatagtaccatctcaa
ttatgtgttttatatacatataaacatggatagatttgtttacagttggccatatccta
taaaagaaaggttataaattacattgccaacaagaaccaggcaggaacaaataaatgaa
gggaacatgtaatactttgat

FIGURE 10bbbb

53470 (SEQ ID NO:80)
ATGCCCTTTGGCCTAAACCCTGGACTTGACTAAGAAATGCAGCCTCCAATGACATTGCG
GGAAAAGGGAATCTGGGAACTTCTATGACACAATTCAGTCTTGCTGAGCATTTGGGGCT
AATATTTAACTCTGAACATATATTGACATAGGCAATTCTTCCATAACAGATTCATACAA
AATTTAAAAATGCATATAGAAGCCTTAATTTTTATTTAAATTCTTTTATTTAATTGTGT
TTTAGAGGCAGAGAATAGTGTGTCTTTTTTTGCCTCTTTTATAATTTTTATTTTTTTTT
TTCATTTTTGCCACTGTCTTTCTTTGCGCTTTCTAGGGCATTACATTTTTCTTTTCCGT
TTTCTCCATGTTTCTTAGCGAGATTCTCTAAAAGGTTACTTCTATTTCCATCACATCAT
CATCTAGCTCCAGCAGGCCTACTTTTCTTCATTTCCTCTATTGTATTTTCTGCTTTTCA
TTCTTGCTGTCTGCTCCTCTCTCATCATCCTTGCCTCTGTCTGTTTAATCCTCCTGTCC
TTCATTTTCCTTTTTTGCCTCTGCATTCA[gt]CATTTCTACTTCCAATCTCCCTCCTC
TGCTCTTTCTTCTTTCCTCTGATCTGCAGACTTGCTTCTGTCCCCTCCTTCTGTTCCCC
TCCTGGATGTGTCTTTGGCCAACCTTTCCTTCTCTGAGACTTCGTGTTCTTGTTGGTAG
ATGGGGGCTGATACTGTAAACATCACAAAAATAATTGCATTGAGAACAAGTGGTTCCCA
TGGTGTCCCTTTGAATGAGCTCAGAATGCCCAGGCTCCATATGATGCAGGAGACAGCAC
TCATGCTGGAGAGGGGTCTAGACCTCAGTCACAAGACCCACCATTCCAGAACTTTGGGA
CTCATCTCTTGACACCTACCCCCTCCCCAGTTAGAAACCAAGAGGCGCTGGGTCACCTG
GGAAGAGAAAGAATGAATCTGCCTTTGCCCCAGCAAGCACGCTTTCCTGCCACATTCAC
CTAAAAGTCTTTTCTGAGATC atgccctttggcctaaaccctggacttgactaagaaatgcagcctccaatgacattgcg
ggaaaagggaatctgggaacttctatgacacaattcagtcttgctgagcatttggggct
aatatttaactctgaacatatattgacataggcaattcttccataacagattcatacaa
aatttaaaaatgcatatagaagccttaatttttatttaaattcttttatttaattgtgt
tttagaggcagagaatagtgtgtctttttttgcctcttttataatttttattttttttt
ttcatttttgccactgtctttctttgcgctttctagggcattacatttttcttttccgt
tttctccatgtttcttagcgagattctctaaaaggttacttctatttccatcacatcat
catctagctccagcaggcctacttttcttcatttcctctattgtattttctgcttttca
ttcttgctgtctgctcctctctcatcatccttgcctctgtctgTTTAATCCTCCTGTCC
TTCATTTTCCTTTTTTGCCTCTGCATTCA[gt]CATTTCTACTTCCAATCTCCCTCCTC
TGCTCTTTCTTCTTTCCTCtgatctgcagacttgcttctgtcccctccttctgttcccc
tcctggatgtgtctttggccaacctttccttctctgagacttcgtgttcttgttggtag
atgggggctgatactgtaaacatcacaaaaataattgcattgagaacaagtggttccca
tggtgtccctttgaatgagctcagaatgcccaggctccatatgatgcaggagacagcac
tcatgctggagaggggtctagacctcagtcacaagacccaccattccagaactttggga
ctcatctcttgacacctaccccctccccagttagaaaccaagaggcgctgggtcacctg
ggaagagaaagaatgaatctgcctttgccccagcaagcacgctttcctgccacattcac
ctaaaagtcttttctgagatc

FIGURE 10cccc

53475 (SEQ ID NO:81)
CCATAGCGAATGTTTTCAGCTATCGTGGTGGCAAACAATACAGGTTCCTGACTCACCAC
ACCAATGATTTCCCGTAGAAACCTTACATTTATGGTCCTAATATCCTGTCCATCAACAC
TGACCTGGAATAAAAAGTAAGTGTGACTTTCATACATTTGTAATTGAAAGGGCAACATC
AGAAAGATGTGCAATGTGACTGCTGATCACCGCAGGGTCTAGCTCGCATGGGTCATCTC
ACCATCCCCTCTGTGGGGTCATAGAGCCTCTGCATCAGCTGGACTGTTGTGCTCTTCCC
ACAGCCACTGTTTCCAACCAGGGCCACCGTCTGCCCACTCTGCACCTTCAGGTTCAGAC
CCTTCAAGATCTACCAGGACGAGTGAGAAAAAAACTTCAAGGCAATTCACAGACACAGG
ATATAGGAACTGACTGTTCACTAGGTTTAAATATACATGCACTTTTTTATAATCTCTAC
AAGAAAACATCAGAAACTCTTCATTCAATAGATTAATTGTTGATTAATCATTTATCACT
GTACCTTAACTTCTTTTCGAGATGGGTAA[ct]TGAAGTGAACATTTCTGAATTCCAAA
TTTCCCTTAATATTATCTGGTTTGTGCCCACTCTTCGAATAGCTGTCAATACTTGGCTT
CTAAACAGAATCAAATTTTAAGAGATTACTAGGTTACAATAACTACTTTTAGTGATATT
TTGTGGAGAGCTGGATAAAGTGACAAAGAAATTGACTTAACTGGACAATCTTTTAGATA
GGTGGATAGATGGCCAACTCAGACTTACATTATCAATTATCTTGAAGATTTCATAAGCT
GCTCCTCTTGCATTTGCAAATGCTTCAATGCTTGGAGATGCCTGTCCAACACTAAAAGC
CCCAATTAATACAGAAAAGAATACCTGAGGAATGTGAAGAAAAACCATCAGGCTACTGA
GATAGTGACAGCAATTTTTTTTCATACTTCTTCTGTCTTTTTCTAACATAGGTAATTAA
AATTTAAAATGGCGAGGCAAC ccatagcgaatgttttcagctatcgtggtggcaaacaatacaggttcctgactcaccac
accaatgatttcccgtagaaaccttacatttatggtcctaatatcctgtccatcaacac
tgacctggaataaaaagtaagtgtgactttcatacatttgtaattgaaagggcaacatc
agaaagatgtgcaatgtgactgctgatcaccgcagggtctagctcgcatgggtcatctc
accatcccctctgtggggtcatagagcctctgcatcagctggactgttgtgctcttccc
acagccactgtttccaaccagggccaccgtctgcccactctgcaccttcaggttcagac
ccttcaagatctaccaggacgagtgagaaaaaaacttcaaggcaattcacagacacagg
atataggaactgactgttcactaggtttaaatatacatgcacttttttataatctctac
aagaaaacatcagaaactcttcattcaatagatTAATTGTTGATTAATCATTTATCACT
GTACCTTAACTTCTTTTCGAGATGGGTAA[ct]TGAAGTGAACATTTCTGAATTCCAAA
TTTCCCTTAATATTATCTGGTTTGTGCCCactcttcgaatagctgtcaatacttggctt
ctaaacagaatcaaattttaagagattactaggttacaataactacttttagtgatatt
ttgtggagagctggataaagtgacaaagaaattgacttaactggacaatcttttagata
ggtggatagatggccaactcagacttacattatcaattatcttgaagatttcataagct
gctcctcttgcatttgcaaatgcttcaatgcttggagatgcctgtccaacactaaaagc
cccaattaatacagaaaagaatacctgaggaatgtgaagaaaaaccatcaggctactga
gatagtgacagcaattttttttcatacttcttctgtctttttctaacataggtaattaa
aatttaaaatggcgaggcaac

FIGURE 10dddd

53478 (SEQ ID NO:82)
GGACAAGAGCAGGGCTTTAAATGCCCCATAAATATGTGTGGCAAGGATGAAAGCACATA
GGACTCAAAGAGGAACAAAGGAGCAGAAAGGCAGGAAGAGTTGGTGCTGCCTTCAAAGG
AGAGTAGGAACGAGGGCAGGTGGTATCAGGTGGACCTCTATGTGGTCCTGGGTTACAAA
GGTGCCAGGAAAAAGCAAGAAATGGAAGAGTCTAAAAAGCAATGGAAGATTGTGGAAAA
TGATGGAAGATTCCGGAAAGTGGTGGAAGATTCCAGAAAATGATGGAAGATTCCAGAAA
GTGATGAAAGATTCTGGAAAGCAATGAAACATTCCAGAAAGTGATGAGACAGTGATAGA
GTCTGGTTCCAGGCGAAGTGGGAGAGGATGGGATTTGAGAAGGGAATGATCCCTCCTCA
CACCTCTAGGATGGGAAGCTTAGTGGAGTGAGGGGTGGGTAGGAGGTTACACCCTGTGT
CCTCTGTCGCTCTGTGCAGGAGGAGGAGGCAGAGAAAGGGAAGGGTCAGGAAAGCCAGC
CCATGTCCCACCCCCACTGGACTCACCAC[ga]TGATGGCAGGTGAAGCCCTTCATGAC
CGAGGCCTCATTGAGGAACTCAATCCGCTCTCGGAGACTGGCTGACTCGTTGACCGTCT
TCACCGCCACGCGGGTCTCTGCCTCACCCTTGATGATGTCCCTGGCATTGCCCTCATAC
ACCATGCCGAAGGAGCCCTGCCCCAGCTCTCGAAGGAGGGTGATCTTCTCTCGAGACAC
CTCCCACTCGTCCGGCACGTACACAGAGCATGGAAACACTACTTCTTACTTATCTACAC
AGCATCCTTGGAGGATCCCTTGGGGGTCTGCAGCCACCTTCCACCCAAGCCCTCACCCA
AACCCCCTCGAAAACACTCATGAAATGAGTTCTGTGATCCAGGACCCATGCCGGGCACT
GGGCATATGGCCGAGAACAGGACAGGCATCTGCACCCATGGAGAGGGCATGGCAGAGAC
TCAAGGAAGGAGCCACAACTG ggacaagagcagggctttaaatgccccataaatatgtgtggcaaggatgaaagcacata
ggactcaaagaggaacaaaggagcagaaaggcaggaagagttggtgctgccttcaaagg
agagtaggaacgagggcaggtggtatcaggtggacctctatgtggtcctgggttacaaa
ggtgccaggaaaaagcaagaaatggaagagtctaaaaagcaatggaagattgtggaaaa
tgatggaagattccggaaagtggtggaagattccagaaaatgatggaagattccagaaa
gtgatgaaagattctggaaagcaatgaaacattccagaaagtgatgagacagtgataga
gtctggttccaggcgaagtgggagaggatgggatttgagaagggaatgatccctcctca
cacctctaggatgggaagcttagtggagtgaggggtgggtaggaggttacaccctgtgt
cctctgtcgctctgtgcaggaggaggaggcagagaaagggaagggtcaggaaagccagc
CCATGTCCCACCCCCACTGGACTCACCAC[ga]TGATGGCAGGTGAAGCCCTTCATGAC
CGAggcctcattgaggaactcaatccgctctcggagactggctgactcgttgaccgtct
tcaccgccacgcgggtctctgcctcacccttgatgatgtccctggcattgccctcatac
accatgccgaaggagccctgccccagctctcgaaggagggtgatcttctctcgagacac
ctcccactcgtccggcacgtacacagagcatggaaacactacttcttacttatctacac
agcatccttggaggatcccttgggggtctgcagccaccttccacccaagccctcaccca
aaccccctcgaaaacactcatgaaatgagttctgtgatccaggacccatgccgggcact
gggcatatggccgagaacaggacaggcatctgcacccatggagagggcatggcagagac
tcaaggaaggagccacaactg

FIGURE 10eeee

53488 (SEQ ID NO:83)
TCCCACCTCCTGGGCAGCCTGGTAGAGGAGACATTCCTTTAATTCTTCCTGCCTAATTT
AGAGGCTGGGTGGGGGTCTGAAGGTTCACTCCCTTCACATCATCCCACTAGTCTACTTT
GGGAAGAATTACAGGTTGTTGGAGCTGGAAGCCCCATTCTAGGCATGGTCTGAAGACCT
GAACAATCCCAGGGGGTGGTGAAGGGGGCAGGGAGGAGATGGGCACCACTTACCATTTG
AGGCCGCCCAGAGAAGTCCTTGCCCTTCTTAATAAGCACCTCCTTGGCCAGCTGGTGGT
GGCCGACAATCACTGTAGTCTTGGTGCCCATACGAACCGAATAGATGGGGCCATATTTT
TTCTGCAGCTTGAAGAAGTTGTTATGCATATGGCCGTGTCTGGGGAGGAATGGCAGGCT
GCCCACCAGGGGCAGGGACAGGAGGCTCTTGGGGTACTTGGCACCAGGGCACCTTCTCT
TGGGCCAAAACAAATAAGCTAGGGTAAGCAGCAAGAGAGCCACGAGCTCCCACATGGTG
GCTGGGTGCCGGCAGGCAAGATAGACAGC[ag]GTGGAGTAGAAGAGCTGTGGCAACTC
TAGGGCACAAGGAGGCCTTTTAAAGGGCTACCCTGATCTTCACCTTGACTTTGTGTTAT
CTCTTGCCTTGTGGAAAGATTCTCCTGGAGCCCAGCCAGGCCTGAGCTCATATCCAGAA
GGGAGAGAGGCGGTGGGAGTGAAGGCCTCCTCAAGGGCTGGCTCAACTCCAGGGCAAAC
CTCCGGAGGAGGAGCTAGGTAAGGGAGGTCAGTTGATCACCCTCTGAGGAGCTCCCCAT
GCTTGAATGACTCCAGAGTGCGAATGGTATCTGGGCTCAGGAGTCAAGGCTTGGAACTT
TCCATGTTGCAAAATCAAAATCACTGGACAGATGACAGATTCAGGAGGGTCACAAGTAG
CAGGGACTGTTAAAGGTCTTTTATGCTTCTTTTTTTTTTTTTCAGAGTCTTGCTCCATC
ACCAGGCTGGTGTGCAGTGGT tcccacctcctgggcagcctggtagaggagacattcctttaattcttcctgcctaattt
agaggctgggtgggggtctgaaggttcactcccttcacatcatcccactagtctacttt
gggaagaattacaggttgttggagctggaagccccattctaggcatggtctgaagacct
gaacaatcccagggggtggtgaagggggcagggaggagatgggcaccacttaccatttg
aggccgcccagagaagtccttgcccttcttaataagcacctccttggccagctggtggt
ggccgacaatcactgtagtcttggtgcccatacgaaccgaatagatggggccatatttt
ttctgcagcttgaagaagttgttatgcatatggccgtgtctggggaggaatggcaggct
gcccaccaggggcagggacaggaggctcttggggtacttggcaccagggcaccttctct
tgggccaaaacaaataagctagggtaagcagcaagagagccacgagctcccacatGGTG
GCTGGGTGCCGGCAGGCAAGATAGACAGC[ag]GTGGAGTAGAAGAGCTGTGGCAACTC
TAGGGCAcaaggaggccttttaaagggctaccctgatcttcaccttgactttgtgttat
ctcttgccttgtggaaagattctcctggagcccagccaggcctgagctcatatccagaa
gggagagaggcggtgggagtgaaggcctcctcaagggctggctcaactccagggcaaac
ctccggaggaggagctaggtaagggaggtcagttgatcaccctctgaggagctccccat
gcttgaatgactccagagtgcgaatggtatctgggctcaggagtcaaggcttggaactt
tccatgttgcaaaatcaaaatcactggacagatgacagattcaggagggtcacaagtag
cagggactgttaaaggtcttttatgcttctttttttttttttcagagtcttgctccatc
accaggctggtgtgcagtggt

FIGURE 10ffff

53489 (SEQ ID NO:84)
CAATAGCTAGGCTAATTCTCCCCAGCAGCTTTCATGGAGGACAGTAGTCACTGCCCCCA
TTTTCCATGAAAAGTAACATGAATCCTGGCTGTATAAGGGGCACTTACTGTGCTGGGTG
CTAGGCTAAGTGCTGTACATGCACCTTCTCAGTCCATTAGAGAAGTCTAGGCTCAGAGA
GAGGAGTGGAGTGAGGATTCCTTGACCCCTCAGACCACTGTGGTCCTCCCATCCCACCT
CCTGGGCAGCCTGGTAGAGGAGACATTCCTTTAATTCTTCCTGCCTAATTTAGAGGCTG
GGTGGGGGTCTGAAGGTTCACTCCCTTCACATCATCCCACTAGTCTACTTTGGGAAGAA
TTACAGGTTGTTGGAGCTGGAAGCCCCATTCTAGGCATGGTCTGAAGACCTGAACAATC
CCAGGGGGTGGTGAAGGGGGCAGGGAGGAGATGGGCACCACTTACCATTTGAGGCCGCC
CAGAGAAGTCCTTGCCCTTCTTAATAAGCACCTCCTTGGCCAGCTGGTGGTGGCCGACA
ATCACTGTAGTCTTGGTGCCCATACGAAC[ca]GAATAGATGGGGCCATATTTTTTCTG
CAGCTTGAAGAAGTTGTTATGCATATGGCCGTGTCTGGGGAGGAATGGCAGGCTGCCCA
CCAGGGGCAGGGACAGGAGGCTCTTGGGGTACTTGGCACCAGGGCACCTTCTCTTGGGC
CAAAACAAATAAGCTAGGGTAAGCAGCAAGAGAGCCACGAGCTCCCACATGGTGGCTGG
GTGCCGGCAGGCAAGATAGACAGCGGTGGAGTAGAAGAGCTGTGGCAACTCTAGGGCAC
AAGGAGGCCTTTTAAAGGGCTACCCTGATCTTCACCTTGACTTTGTGTTATCTCTTGCC
TTGTGGAAAGATTCTCCTGGAGCCCAGCCAGGCCTGAGCTCATATCCAGAAGGGAGAGA
GGCGGTGGGAGTGAAGGCCTCCTCAAGGGCTGGCTCAACTCCAGGGCAAACCTCCGGAG
GAGGAGCTAGGTAAGGGAGGT caatagctaggctaattctccccagcagctttcatggaggacagtagtcactgccccca
ttttccatgaaaagtaacatgaatcctggctgtataaggggcacttactgtgctgggtg
ctaggctaagtgctgtacatgcaccttctcagtccattagagaagtctaggctcagaga
gaggagtggagtgaggattccttgacccctcagaccactgtggtcctcccatcccacct
cctgggcagcctggtagaggagacattcctttaattcttcctgcctaatttagaggctg
ggtgggggtctgaaggttcactcccttcacatcatcccactagtctactttgggaagaa
ttacaggttgttggagctggaagccccattctaggcatggtctgaagacctgaacaatc
ccagggggtggtgaagggggcagggaggagatgggcaccacttaccatttgaggccgcc
cagagaagtccttgcccttcttaataagcacctccttggccagctggtggtGGCCGACA
ATCACTGTAGTCTTGGTGCCCATACGAAC[ca]GAATAGATGGGGCCATATTTTTTCTG
CAGCTTGAAGAagttgttatgcatatggccgtgtctggggaggaatggcaggctgccca
ccaggggcagggacaggaggctcttggggtacttggcaccagggcaccttctcttgggc
caaaacaaataagctagggtaagcagcaagagagccacgagctcccacatggtggctgg
gtgccggcaggcaagatagacagcggtggagtagaagagctgtggcaactctagggcac
aaggaggccttttaaagggctaccctgatcttcaccttgactttgtgttatctcttgcc
ttgtggaaagattctcctggagcccagccaggcctgagctcatatccagaagggagaga
ggcggtgggagtgaaggcctcctcaagggctggctcaactccagggcaaacctccggag
gaggagctaggtaagggaggt

FIGURE 10gggg

53503 (SEQ ID NO:85)
GGGTTTCCTGTTTCCTTTTCTGATCATTCTTACAAGTTATACTCTTATTTGGAAGGCCC
TAAAGAAGGCTTATGAAATTCAGAAGAACAAACCAAGAAATGATGATATTTTTAAGATA
ATTATGGCAATTGTGCTTTTCTTTTTCTTTTCCTGGATTCCCCACCAAATATTCACTTT
TCTGGATGTATTGATTCAACTAGGCATCATACGTGACTGTAGAATTGCAGATATTGTGG
ACACGGCCATGCCTATCACCATTTGTATAGCTTATTTTAACAATTGCCTGAATCCTCTT
TTTTATGGCTTTCTGGGGAAAAAATTTAAAAGATATTTTCTCCAGCTTCTAAAATATAT
TCCCCCAAAAGCCAAATCCCACTCAAACCTTTCAACAAAAATGAGCACGCTTTCCTACC
GCCCCTCAGATAATGTAAGCTCATCCACCAAGAAGCCTGCACCATGTTTTGAGGTTGAG
TGACATGTTCGAAACCTGTCCATAAAGTAATTTTGTGAAAGAAGGAGCAAGAGAACATT
CCTCTGCAGCACTTCACTACCAAATGAGC[ac]TTAGCTACTTTTCAGAATTGAAGGAG
AAAATGCATTATGTGGACTGAACCGACTTTTCTAAAGCTCTGAACAAAAGCTTTTCTTT
CCTTTTGCAACAAGACAAAGCAAAGCCACATTTTGCATTAGACAGATGACGGCTGCTCG
AAGAACAATGTCAGAAACTCGATGAATGTGTTGATTTGAGAAATTTTACTGACAGAAAT
GCAATCTCCCTAGCCTGCTTTTGTCCTGTTATTTTTTATTTCCACATAAAGGTATTTAG
AATATATTAAATCGTTAGAGGAGCAACAGGAGATGAGAGTTCCAGATTGTTCTGTCCAG
TTTCCAAAGGGCAGTAAAGTTTTCGTGCCGGTTTTCAGCTATTAGCAACTGTGCTACAC
TTGCACCTGGTACTGCACATTTTGTACAAAGATATGCTAAGCAGTAGTCGTCAAGTTGC
AGATCTTTTTGTGAAATTCAA gggtttcctgtttccttttctgatcattcttacaagttatactcttatttggaaggccc
taaagaaggcttatgaaattcagaagaacaaaccaagaaatgatgatatttttaagata
attatggcaattgtgcttttctttttcttttcctggattccccaccaaatattcacttt
tctggatgtattgattcaactaggcatcatacgtgactgtagaattgcagatattgtgg
acacggccatgcctatcaccatttgtatagcttattttaacaattgcctgaatcctctt
ttttatggctttctggggaaaaaatttaaaagatattttctccagcttctaaaatatat
tcccccaaaagccaaatcccactcaaacctttcaacaaaaatgagcacgctttcctacc
gcccctcagataatgtaagctcatccaccaagaagcctgcaccatgttttgaggttgag
tgacatgttcgaaacctgtccataaagtaattttgtgAAAGAAGGAGCAAGAGAACATT
CCTCTGCAGCACTTCACTACCAAATGAGC[ac]TTAGCTACTTTTCAGAATTGAAGGAG
AAAATGCATTATGTGGACTGAACCGacttttctaaagctctgaacaaaagcttttcttt
ccttttgcaacaagacaaagcaaagccacattttgcattagacagatgacggctgctcg
aagaacaatgtcagaaactcgatgaatgtgttgatttgagaaattttactgacagaaat
gcaatctccctagcctgcttttgtcctgttattttttatttccacataaaggtatttag
aatatattaaatcgttagaggagcaacaggagatgagagttccagattgttctgtccag
tttccaaagggcagtaaagttttcgtgccggttttcagctattagcaactgtgctacac
ttgcacctggtactgcacattttgtacaaagatatgctaagcagtagtcgtcaagttgc
agatctttttgtgaaattcaa

FIGURE 10hhhh

53517 (SEQ ID NO:86)
GGGAGAGAGGACCTGTGACAGGATAAAGGGGCTGCCTTATTTAAACCTGGAAGGAAGAA
CGACAGTATAAGCTTCCAGGATATTAATATCAGGCTAACATGGACAGTTAAGAGCCTTT
GCCAGGAGATAGTATGACTGTAGTTCAATGGTGACTGAGCACCTGGGATGTGCTAGACA
CAAGAGTGACTTCTAAGGGTCACAGGAGAAGCTGACGTCAAAAACTTCACACAAGGGGA
CCCTGAGAGGTCACAGAAGTTCAAGATTCTGAAAGTAGTTCTGGATTCCAAGGAGCAGG
CTGGCTTCACCACTTCTGACAGGCTCTGGGAAGTAGGAGAAAGTTTGCCTCAGGTTGGA
GAGAGCAGTAGGGGAGAGGGTGGTATCCCCAAAGGGTCAGATTTCTACTCTTCTGGCAC
AAAGAAGAAGCAGAGAGGTAAAGAATAGGTCAGTATGAGCAAGGGCAACTGACCCTTTA
TGACGTAGCAAAGGAGTGGCAGCAAGTTCTGAATGTAACAAATTCTCCTTTCCTTTTTG
AAAATGTAGAACACATTAACAAATGCACT[ct]GATCAAACTGTGGTCAATCAGAAATC
GCTGCACAAAATGTCTTCCTATTAAATAAAAATCATACAGTGCTTTGCATTTGAATAGT
GTTCTATACTTTCCCATAATTCTCTCATTAGCCACCACTGGGAAATACCCTGTTATAAT
TATACAGATAAATGTGCAAATGACAGAAGAATCAATTTCTAAAAGAAGAAATACAAACT
TTTATAATGGGAGAGAGGATATATTTATTATCACTAATAAAAAAGCATATACTTCACCT
AATAAATTAATACTTTGTCACTACCAAAGTTATAATTACTATAACATTTATATATAATA
TACATTTACATTAATATTATAAATAGTAATAAATTATGAATGTTATAATTACAAATTAT
GAATTTTAAAATGTAATAACCATAATATCAATACTATATTAGTGATGGTGTTATACATT
GACACAATTTTTTTGGAAAAC gggagagaggacctgtgacaggataaaggggctgccttatttaaacctggaaggaagaa
cgacagtataagcttccaggatattaatatcaggctaacatggacagttaagagccttt
gccaggagatagtatgactgtagttcaatggtgactgagcacctgggatgtgctagaca
caagagtgacttctaagggtcacaggagaagctgacgtcaaaaacttcacacaagggga
ccctgagaggtcacagaagttcaagattctgaaagtagttctggattccaaggagcagg
ctggcttcaccacttctgacaggctctgggaagtaggagaaagtttgcctcaggttgga
gagagcagtaggggagagggtggtatccccaaagggtcagatttctactcttctggcac
aaagaagaagcagagaggtaaagaataggtcagtatgagcaagggcaactgaccettta
tgacgtagcaaaggagtggcagcaagttctgaatgtaacaaattctcctttcctttTTG
AAAATGTAGAACACATTAACAAATGCACT[ct]GATCAAACTGTGGTCAATCAGAAATC
GCTGCACaaaatgtcttcctattaaataaaaatcatacagtgctttgcatttgaatagt
gttctatactttcccataattctctcattagccaccactgggaaataccctgttataat
tatacagataaatgtgcaaatgacagaagaatcaatttctaaaagaagaaatacaaact
tttataatgggagagaggatatatttattatcactaataaaaaagcatatacttcacct
aataaattaatactttgtcactaccaaagttataattactataacatttatatataata
tacatttacattaatattataaatagtaataaattatgaatgttataattacaaattat
gaattttaaaatgtaataaccataatatcaatactatattagtgatggtgttatacatt
gacacaatttttttggaaaac

FIGURE 10iiii

53522 (SEQ ID NO:87)
TTTTCTGTAGACTCTCCCTCCGTTTGAGCTTATCTGACATTTGCTCGCCGTGAGATCCA
GGCCTTGCATTTGTACTGGACCCTGTTCTTACACACCCTGATCCAGCCCACTTGTGTAG
TCTGGGAGTCTGGGACAACCTCCGTCCGCCCTTCTAGCCGGGTCACTGCAGGCAAGCCT
TGGTGCTCTTGCCTGCGACGTGGAAATGATGCCTGCCTGCAGCGCTGTATAGTGCAGAG
CGGGCGAGGGGCATAGGGAAGTCACTGGCACGTGGTATGTGTTGGCAGGGCTGCTTCTC
ACCCCAAACCAAGGGAGGGACAGGCAGGGAGGCTGAGAGCAGCGGCTTGCCCTGGAGCT
GTCAGGTGGGAGGCAGAGGGCGGGAGAGGCTGTGGGCTGCCCAGGTCTGATCCCTGACC
CACTTGCCACCCGTGCCCTCAGTTCTTCCCCAATGGAGAGGCCATCTGCACGGGCTCGG
ATGACGCTTCCTGCCGCTTGTTTGACCTGCGGGCAGACCAGGAGCTGATCTGCTTCTCC
CACGAGAGCATCATCTGCGGCATCACGTC[ct]GTGGCCTTCTCCCTCAGTGGCCGCCT
ACTATTCGCTGGCTACGACGACTTCAACTGCAATGTCTGGGACTCCATGAAGTCTGAGC
GTGTGGGTAAGGGCCAGCCCTGGCTGCTGCTTCCTCAGCTGGAAGGACCCTCCCCAGCC
CTCCCTCCCCATTCTGTACCCCCCATCAGCTCCCATTTCGGACTCTCTTACTGCTGTCC
CTTGTCACTGGGTGACTCCACCCCTGGAATCCAGTACCCCTTGGTTCCCAACTAGGACT
GTTTTCCCTCAGTGTTGCTCTAAGCAGCCTCTCTCCACTGCCCAATGCCATGACTGCTC
CCTGCCCTAGGAGATCTGTGGACCATGACTGTCCAGTCAGTTCTGGGTTCCTGGCATTT
CAGGGGCACCCACTGAGAGGCAAGACAGCCTCAGGGAAACATGGAATCAAGGCAGAATC
AAGGAGATCTGGAGTGGCCCG ttttctgtagactctccctccgtttgagcttatctgacatttgctcgccgtgagatcca
ggccttgcatttgtactggaccctgttcttacacaccctgatccagcccacttgtgtag
tctgggagtctgggacaacctccgtccgcccttctagccgggtcactgcaggcaagcct
tggtgctcttgcctgcgacgtggaaatgatgcctgcctgcagcgctgtatagtgcagag
cgggcgaggggcatagggaagtcactggcacgtggtatgtgttggcagggctgcttctc
accccaaaccaagggagggacaggcagggaggctgagagcagcggcttgccctggagct
gtcaggtgggaggcagagggcgggagaggctgtgggctgcccaggtctgatccctgacc
cacttgccacccgtgccctcagttcttccccaatggagaggccatctgcacgggctcgg
atgacgcttcctgccgcttgtttgacctgcgggcagaccaggagctgatctgcttctcc
cacgaGAGCATCATCTGCGGCATCACGTC[ct]GTGGCCTTCTCCCTCAGTGGCCGCct
actattcgctggctacgacgacttcaactgcaatgtctgggactccatgaagtctgagc
gtgtgggtaagggccagccctggctgctgcttcctcagctggaaggaccctccccagcc
ctccctccccattctgtacccccatcagctcccatttcggactctcttactgctgtcc
cttgtcactgggtgactccacccctggaatccagtaccccttggttcccaactaggact
gttttccctcagtgttgctctaagcagcctctctccactgcccaatgccatgactgctc
cctgccctaggagatctgtggaccatgactgtccagtcagttctgggttcctggcattt
caggggcacccactgagaggcaagacagcctcagggaaacatggaatcaaggcagaatc
aaggagatctggagtggcccg

FIGURE 10jjjj

53528 (SEQ ID NO:88)
TGCCTCAGGTAAGAAAGACCTGGGCTTCCCTGGCTAAACGCATGAGTCCCTAGGAGGCC
AGGAAAGCCCCCAAACCCCAGCTTCGGGCCCTCCTCCCTGGCAGTGCTTCCTGGGCCCC
GGAGCCTACCCACTGAGGACTCAGTGCAGGAGTTAGGGTCTGGAGAGTATAAATGATCA
GAGTGGCTAAAAATTTCCACCACCTCCCAGTTCTCCAGGCATTTGAGTTGTGAACTCAC
CTGCTTTTTCTCCCATCTTGGACCCCCCTGGGAAATGTCCCCCTTGCCCAAGGACTGGG
CTAAAGGCCTGGGCTCATGGGATTTGGGACTCTGCAGAGGAGCAGTTCAGGGGCTGGAG
GCTCAAACCTCCAAGCAAGGACCCCTGGGCTCTCATGGGCCCTGTCCCCCTTCCCAGCA
ACTAGGCTAAAGGCTGAAGGTCATGGGGACTCAACTCAGAAGGGGGGCTCGTTAGGAGC
TGAGGGGGGCCCCTCTAGGCTCTCCTGGGAGCGGGGACGGGGCAGGGCTCCTTACTGCA
GAAGGGTCTCCACCACGGCTTTCTGGTGG[ga]CCGCCTCCTCAGGGCTGAGGTTCTCC
AGCTCTTTGAGGATGGGTGGCGTGAAGTCTTCCCCATCGTCGTCCGTCTCGTCCTCGGA
GCCCCGAGTCTCCCCCAGCCCATTGGGCAGCTCAGCCAGCTCCCCTCGACCGCCGCCGC
AGGACTCCCCCTTGTCCAGGGGGCCTTCTCCAGCCAGGAGGTAGGGCCCCGGCTCACCC
AGTGCCTGGATCAGTGCCTCTTTGCTCAGCCCTGACTCGAGCAGGGCCGCCAGGAGCTC
CGTCTGCAGCTGGCTCAGTTTAGAAACCATGGCTCGGCTGCCACAGGGCCACGCGGCCC
GGGTCCACCACGCTAGCCGCCTCCCCCACCGCGTGGGTTGCGTTTGCCTGCCGGCCGGC
AGACACAAACCAAACTCCTTGCACCCACTGCCCCCCCAAAACCCCACTAGCCAAGCCCT
GTGGGCACCCCCAACCCCCAA tgcctcaggtaagaaagacctgggcttccctggctaaacgcatgagtccctaggaggcc
aggaaagcccccaaaccccagcttcgggccctcctccctggcagtgcttcctgggcccc
ggagcctacccactgaggactcagtgcaggagttagggtctggagagtataaatgatca
gagtggctaaaaatttccaccacctcccagttctccaggcatttgagttgtgaactcac
ctgctttttctcccatcttggacccccctgggaaatgtcccccttgcccaaggactggg
ctaaaggcctgggctcatgggatttgggactctgcagaggagcagttcaggggctggag
gctcaaacctccaagcaaggacccctgggctctcatgggccctgtcccccttcccagca
actaggctaaaggctgaaggtcatggggactcaactcagaaggggggctcgttaggagc
tgaggggggcccctctaggctctcctgggagcggggacggggcagggctccttactgca
gaaGGGTCTCCACCACGGCTTTCTGGTGG[ga]CCGCCTCCTCAGGGCTGAGGTTCTCC
agctctttgaggatgggtggcgtgaagtcttccccatcgtcgtccgtctcgtcctcgga
gccccgagtctcccccagcccattgggcagctcagccagctcccctcgaccgccgccgc
aggactcccccttgtccagggggccttctccagccaggaggtagggccccggctcaccc
agtgcctggatcagtgcctctttgctcagccctgactcgagcagggccgccaggagctc
cgtctgcagctggctcagtttagaaaccatggctcggctgccacagggccacgcggccc
gggtccaccacgctagccgcctcccccaccgcgtgggttgcgtttgcctgccggccggc
agacacaaaccaaactccttgcacccactgcccccccaaaaccccactagccaagccct
gtgggcacccccaacccccaa

FIGURE 10kkkk

53529 (SEQ ID NO:89)
CCTCAGCCTCCCAAGTAGCTGGGACTACAGGCACGTGCCTCCACGCCTGGCTAATTTTT
GTACTTTTAGTAGAGACGGGGTTTCACCGTGTTGGCCAGGCTGGTCTTGAACTCCTGAC
CTCAAGTGATCTGCCCACCTCGGCCTTCCAAAGTGCTGGGATTACAGGCATGAGCCACC
ACGCCTGGCCCCAGATTACCTTTCTAAAATCTGAATAGATTTTAGAAATTCATATGGCC
CTAAGAGTTTCAGAGAAACACAGGCATGCACACAAATGCATGCACAACCGATACACACC
CAGACACGCACTAGGGATCTGCTCACACAAGCAGTCGTGCACACACACAGATACGTGCA
TTCACATGGGAACACACTGGCCTGCAGACACCCTCAATCACGGAAACACACTTGTCCCA
GAGACACATGCAGACTGCAATGCCTGCCAGGCACCCCTTTCCCCTGCATCCATTGACAG
CCAACCTCTATCATCATCTCCTGCTGTGTGGGGCACAGGGCGCTCACCGTGGGGGCTCT
GCAGCTGAGCCATGGTGGCCATGAAGGGG[ct]TCTGGGTCACATGGCTCTGCACAGGT
GGCATGAGCGGCTGCTGGTAGGAGGGGTGCAGCGGCTGGGAGAACTGGACGGGCTGCAG
GGTGGTCAGGCTGCTGCCCATGCTGTTGATGACCGGCACACTCTGTGCCTGCGTGGAGG
CCAGGCCTGGAGTGGAAGGGGAGGGAATCAGCTGGGCCCCCCAGTTATATCCCACCCCT
GCCCAAGACCTCCCAAGGGCACCACCTCTCCTTCCCAGAGCCCGTGGTTTGGAGGAGGG
GGCAGGGTGGTCAGGAAACAGCCCTCCACTGGGACCTGCCACTAATTTAAGTGGCTCTG
GCAAGTCATTCCCCCTCTCTGAGCCTTTAGCTCTTTGTCTAGGCTAGTGGGAGAGGCAG
GCGGTGACTTGTTCAAAAGTTGTCAAACTGCGGTTCCCTGGAGCCCTGGGTTCCACAGC
AGTGCAAAGGCCATGGGGTCA cctcagcctcccaagtagctgggactacaggcacgtgcctccacgcctggctaattttt
gtacttttagtagagacggggtttcaccgtgttggccaggctggtcttgaactcctgac
ctcaagtgatctgcccacctcggccttccaaagtgctgggattacaggcatgagccacc
acgcctggccccagattacctttctaaaatctgaatagattttagaaattcatatggcc
ctaagagtttcagagaaacacaggcatgcacacaaatgcatgcacaaccgatacacacc
cagacacgcactagggatctgctcacacaagcagtcgtgcacacacacagatacgtgca
ttcacatgggaacacactggcctgcagacaccctcaatcacggaaacacacttgtccca
gagacacatgcagactgcaatgcctgccaggcacccctttcccctgcatccattgacag
ccaacctctatcatcatctcctgctgtgtggggcacagggcgctcaccgtgggggctct
gCAGCTGAGCCATGGTGGCCATGAAGGGG[ct]TCTGGGTCACATGGCTCTGCACAGGT
GGcatgagcggctgctggtaggaggggtgcagcggctgggagaactggacgggctgcag
ggtggtcaggctgctgcccatgctgttgatgaccggcacactctgtgcctgcgtggagg
ccaggcctggagtggaaggggagggaatcagctgggccccccagttatatcccacccct
gcccaagacctcccaagggcaccacctctccttcccagagcccgtggtttggaggaggg
ggcagggtggtcaggaaacagccctccactgggacctgccactaatttaagtggctctg
gcaagtcattccccctctctgagcctttagctctttgtctaggctagtgggagaggcag
gcggtgacttgttcaaaagttgtcaaactgcggttccctggagccctgggttccacagc
agtgcaaaggccatggggtca

FIGURE 101111

53530 (SEQ ID NO:90)
GTGTAGATGCAGTAGCTTTTGCCTGTGGGATGGGAGGGATGGGAGATGTGTCCAGACCC
TCCTAGGAGGCCACATGAGTGTGACTGTTCTCGGCCCAAGTCTTTCTCGTTCCTCAGAG
AATTTGCGGGGCCCCTGGGCACACAAGCTGAGATCCACCCAGCCCTGGTCCCTTGGCAA
GAACTGAGGGACAGGACCTGGTTCTGGGGAAAATGCAGGGGAATGTTTCTCCCTTCCAC
AGCCCCCTTGCGAGTTAGGAGGCCGGCTCCCACCCCAGAAGGTGGCCAGGTTTTCATGC
CTTCCTAGAGAAAGCTGGGGCTCGTGGCCTCCACCACAGGAAGACGCAGACCCTCAGAA
ACAAGTCTGTGAAGTCACAACCAGCCCCAGTTTACAGATGTGAAACTGAAGCTCCAAAA
AGTCAGGAGGTCACTGAGTGGGGAGGTGATGGAGTGGGAACAGCCCCCAGATCTGGCTG
AGGCCGAAGCCCTGGAGAGATCCCCGCAAGGCTCCCTTAGATGCCTGACATTCTGTTCT
TCCTGAAGCCTCACTCCCTTCTCTCCTGG[ct]GCAGACACGTCCCCATCAGAAGGCAC
CAACCTCAACGCGCCCAACAGCCTGGGTGTCAGCGCCCTGTGTGCCATCTGCGGGGACC
GGGCCACGGGCAAACACTACGGTGCCTCGAGCTGTGACGGCTGCAAGGGCTTCTTCCGG
AGGAGCGTGCGGAAGAACCACATGTACTCCTGCAGGTGAGGAGCCTCAATTTCTTCAGC
TGGGAAATGGGCACACTTGGGCTCATGGCCCCAAGGTCTGTCTTCTCCCTGAGTGGGTA
GGTCCCAGAGACAGCTGCCCTTCAGGGCCTTCAAGGCTCTTCTGGTTTTGTAAAAGACT
TTGTGAATCCAAGAAGAGCATCTATTCTAGGAACCACATTTACTGATCATCAAGCTACT
GGCTGCCGTTTATTGAGCTCTTATCATATGCCAGGCACAATACTAAGTCTTTGTGTGTA
TTTACCCATCCCCTTGAGCCC gtgtagatgcagtagcttttgcctgtgggatgggagggatgggagatgtgtccagaccc
tcctaggaggccacatgagtgtgactgttctcggcccaagtctttctcgttcctcagag
aatttgcggggcccctgggcacacaagctgagatccacccagccctggtcccttggcaa
gaactgagggacaggacctggttctggggaaaatgcaggggaatgtttctcccttccac
agcccccttgcgagttaggaggccggctcccaccccagaaggtggccaggttttcatgc
cttcctagagaaagctggggctcgtggcctccaccacaggaagacgcagaccctcagaa
acaagtctgtgaagtcacaaccagccccagtttacagatgtgaaactgaagctccaaaa
agtcaggaggtcactgagtggggaggtgatggagtgggaacagcccccagatctggctg
aggccgaagccctggagagatccccgcaaggctcccttagatgcctgacattctgttct
tcCTGAAGCCTCACTCCCTTCTCTCCTGG[ct]GCAGACACGTCCCCATCAGAAGGCAC
Caacctcaacgcgcccaacagcctgggtgtcagcgccctgtgtgccatctgcggggacc
gggccacgggcaaacactacggtgcctcgagctgtgacggctgcaagggcttcttccgg
aggagcgtgcggaagaaccacatgtactcctgcaggtgaggagcctcaatttcttcagc
tgggaaatgggcacacttgggctcatggccccaaggtctgtcttctccctgagtgggta
ggtcccagagacagctgcccttcagggccttcaaggctcttctggttttgtaaaagact
ttgtgaatccaagaagagcatctattctaggaaccacatttactgatcatcaagctact
ggctgccgtttattgagctcttatcatatgccaggcacaatactaagtctttgtgtgta
tttacccatccccttgagccc

FIGURE 10mmmm

53540 (SEQ ID NO:91)
ATACACCAAATTTGTTTACTTTGAATAGCTTTCTTTGGACAGAGGAATTTTGAGTACTT
AATATTTTTTGCATATTTTTCATACTTTCCATCATGAACATGTATGGCTTTTACATTTA
GGAAGAAATAATGCTATTTTTTAAAGGAGGAAAAAAGAGAAAAGAGTTGGTGCGAATAA
TTGAAGTAATCTATTATGCAGTGTGTGAGTAATGAATTGATAGATAGGATCATCTGTAG
ATTTCAAGGAGCTATAATTTCCCCTGTAACATGTTTTTCAACATTTCTCTCCCCTTTTA
TTATAAAAAACACAAACTCTGATCTACACTCCAACAAAGTCTGCTTTTATCACAAGGAT
ACTTTAAACATTTGATCATTGTGCAGAATATTTATTCTAAATTACTGAGACCTTATTCA
CTAATCATAGTTTTCACAGGCTTTATTCCAACCATATTGATATGTTAGTTCGAGACTAC
GGATTTAATACCTGGATTTCTCCTCTGTGTCTTGAAGGGAACGTTGCCAGCTGCCTTGT
ACCAGCATTACAAATAATCCAGCCACAAA[ga]TAAATGCTTTTCATTTCTGCTGTCTG
TCAGAACACAGAATGGGGGTAGGGTGAGGGGGGCAGGCAAGGATTTTTAAACATGTCAG
GCTAAATTAATTAGATTTGACTAGATAAATATCATAAGTAGAAGGAAAAAGCTAGTGTT
ATCACTTTTATTCTGATTATATTTTCAGCTTAATTTTAAATAGTGGGTTATATTATTTC
CCCAGATTTTTTGGAGGCAAAAAAGGACACAAAAGATGTGTTCCACCATTAAGCTTTTT
CATTAATGTAGGGACACTTCTGTTTAATAATTAGAAGGCTCATTTCCAGACTGGAAATT
AAAATGTCCACAATCAACATTTAAAATACCCACTGTAGATGATATGCTACATATGGTTA
GCCTGAATGGCACCTTATCCATCATGCCACCCCCCTCACTATCAGTCTGGCTTTCAATT
AATAGTCCTTCACTTCCAAGC atacaccaaatttgtttactttgaatagctttctttggacagaggaattttgagtactt
aatattttttgcatatttttcatactttccatcatgaacatgtatggcttttacattta
ggaagaaataatgctattttttaaaggaggaaaaaagagaaaagagttggtgcgaataa
ttgaagtaatctattatgcagtgtgtgagtaatgaattgatagataggatcatctgtag
atttcaaggagctataatttcccctgtaacatgtttttcaacatttctctccccttttta
ttataaaaaacacaaactctgatctacactccaacaaagtctgcttttatcacaaggat
actttaaacatttgatcattgtgcagaatatttattctaaattactgagaccttattca
ctaatcatagttttcacaggctttattccaaccatattgatatgttagttcgagactac
ggatttaatacctggatttctcctctgtgtcttgaagggaacgtTGCCAGCTGCCTTGT
ACCAGCATTACAAATAATCCAGCCACAAA[ga]TAAATGCTTTTCATTTCTGCTGTCTG
TCAGAACACAGAATGGGGgtagggtgaggggggcaggcaaggatttttaaacatgtcag
gctaaattaattagatttgactagataaatatcataagtagaaggaaaaagctagtgtt
atcacttttattctgattatattttcagcttaattttaaatagtgggttatattatttc
cccagattttttggaggcaaaaaaggacacaaaagatgtgttccaccattaagcttttt
cattaatgtagggacacttctgtttaataattagaaggctcatttccagactggaaatt
aaaatgtccacaatcaacatttaaaatacccactgtagatgatatgctacatatggtta
gcctgaatggcaccttatccatcatgccacccccctcactatcagtctggctttcaatt
aatagtccttcacttccaagc

FIGURE 10nnnn

53544 (SEQ ID NO:92)
TAGGAATTGTGCATCAGGAAAGTGAAGAGGATTGCTAGACATTTAGTCCTGTTATAAGA
GCACTAAAGATTTGGCAGTCACCAGGTATGGAGTCTCAGGAGGAGCTTACCGATGGATG
GGGCATAGCCATTATATTTGCCCGAGTCCAGGGCATCTTTCATTGCCTGGGTAACTTCA
GGGTCTGTAGGCAGGTTTCCAAACACAGTAGGGTCCCCTTTTTATGGGAGGAAAACACA
AAAGGAGCCAAGAGGTTATTCTCCCATGTTCAGTACTCAGACTCACCCCCAACTGCCAT
CTTCTCCAACCAGCCTGTGAACATGAGAGTAGAGGAGGACAATGACAGCCCCTCAGTAG
TGTCCCCAACTCACCAATGGACAGGGAAATCATGGTTTTGTTTGGATTTGGTTTCACCT
TCATGTTGTCCACAATGGCTCGGATGGGGTTGAAAGTTTTCTTGGCCATGTCTGAGGGC
CTCACAGACCACCTGGCCTTTCTGCCTTTCATTTTTCCCGGCACAGAGCTTCTCCCACC
AACGTTGACATGCACGTCCAGAATTGAGG[ga]GAGGTTGCCTTTGCTGCTCATCTGAA
TCATGTATGGGTCCATCACTAGCGAAGCCTGCGAGGGGAAAGAAGTTCCCTGTGATGTT
GATAACATAGCGCTGGGGGACAGAGGAGCTACATTTGGACCTAAACATTGGGTGACTTC
ACTAAAAGTGTCTTTCCAAACTCTCTCTTTATTTTTTTTCTACTTTCTGTTGTAAAGT
AGCTTTACTATGAATGGGGGAGTTTTAAGAGTTTTTACTGAGATGGAAAATAAAGCAAG
AACCCATTCTACTTAAGTAGGATTTGCTACACGCATCTGCAATTCCTGTCAAAGCTTAA
CCATGCTCTATGTGAAACCAAGAAGGAATAAGATGAAAATTGTTCATCAGTCAAAGCAT
AGGTTCTCCTTCCTTTCCATGCGAGCCTATCCAAGAAAATCTACCTAATGCTTCTTGTC
ATCTGCAGAGGACCAGGAAGA taggaattgtgcatcaggaaagtgaagaggattgctagacatttagtcctgttataaga
gcactaaagatttggcagtcaccaggtatggagtctcaggaggagcttaccgatggatg
gggcatagccattatatttgcccgagtccagggcatctttcattgcctgggtaacttca
gggtctgtaggcaggtttccaaacacagtagggtcccctttttatgggaggaaaacaca
aaaggagccaagaggttattctcccatgttcagtactcagactcacccccaactgccat
cttctccaaccagcctgtgaacatgagagtagaggaggacaatgacagcccctcagtag
tgtccccaactcaccaatggacagggaaatcatggttttgtttggatttggtttcacct
tcatgttgtccacaatggctcggatggggttgaaagttttcttggccatgtctgagggc
ctcacagaccacctggcctttctgcctttcatttttcccggcacagagcttCTCCCACC
AACGTTGACATGCACGTCCAGAATTGAGG[ga]GAGGTTGCCTTTGCTGCTCATCTGAA
TCATGTATGGGtccatcactagcgaagcctgcgaggggaaagaagttccctgtgatgtt
gataacatagcgctgggggacagaggagctacatttggacctaaacattgggtgacttc
actaaaagtgtctttccaaactctctctttattttttttctactttctgttgtaaagt
agctttactatgaatgggggagttttaagagtttttactgagatggaaaataaagcaag
aacccattctacttaagtaggatttgctacacgcatctgcaattcctgtcaaagcttaa
ccatgctctatgtgaaaccaagaaggaataagatgaaaattgttcatcagtcaaagcat
aggttctccttcctttccatgcgagcctatccaagaaaatctacctaatgcttcttgtc
atctgcagaggaccaggaaga

FIGURE 10oooo

53550 (SEQ ID NO:93)
CCAACTAGAATACAGCTTCCTGAGAGGCAGGATCTTGACTGACTTGTTCATTCCTAATT
TCTCAGCATCTAGAAGAAGGTATGGCACATAGTAGGTGCTTGTTAGATACTTGCTAATA
AATGGAAATAAACATATCCCTAGTTCCTATTCCAGCTTTTTCCCTGCTGTTTTGTCCTC
CATTCTTCCAGCAGACAACAGGACTAGTTCCCTGACCCCCTGCAGGAAGCTAACAATAC
CCTAGCCTACTTCTAAGCAAAACGTCGCAGCTTCAAAGACTTTCCATGGAGGGCGATGG
GCTGAGGACAATCTTGTTCTTCACGTAAAACACAGGCCCACAATCTCAAATTTATAATT
TAAAAATATATATACTTACAATGTCTCTAAAGGCACTTATTTTTCTTAAAAATCATGTA
TTTGTAAGCTGAACTATCATTTTAACACAAAAGCTATCATTCTTGCTCAATGGAGTCAG
GCTGCTCTTGGAGTTTCTGTCCTGGGAGGAAAAAGGGCAGGGTGTAGGTACCTGATGGT
TTTCCACA[ct]GTCGAAGCCATCCAGAGGCTTTGTGCCATTGGTGTGTCCCCTGGCCA
GCTTCACGAGTGTTGGCAGCCAGTCAGAGATGTGGATGAGCTCCCGGTTCTTCACGCCC
TTCTGCTTCAGCAAGGGGCTTGCCACAAAGCCCACCCCTCGGACGCCTCCTTCCCACAG
GCTCCATTTTCTTCCTCGAAGGGGCCAGTTATTACCCCCTGCCAAAGTCTGCCCTCCGT
TATCTGAAACACAGTAAGGTCTTGGCATGAGGATGATGTTAACTCTTAAATACATTTAA
GAACAGAGACTGTATGTACATTGTTACTAAATGGTGCTTAAATAATAAAAAAAAAGAAA
ATTCCTTGCCTTTTCCCACCCTAAATTCCCTTTTCCCATTGACATAGCCTTTCATTATT
CAGACATAAGTAAGGCCCAGTGTGATACATATCTACCTTTAAATCCTCCATGGAGAGAG
CCACTGGAAAACAAGGCAGTC ccaactagaatacagcttcctgagaggcaggatcttgactgacttgttcattcctaatt
tctcagcatctagaagaaggtatggcacatagtaggtgcttgttagatacttgctaata
aatggaaataaacatatccctagttcctattccagctttttccctgctgttttgtcctc
cattcttccagcagacaacaggactagttccctgaccccctgcaggaagctaacaatac
cctagcctacttctaagcaaaacgtcgcagcttcaaagactttccatggagggcgatgg
gctgaggacaatcttgttcttcacgtaaaacacaggcccacaatctcaaatttataatt
taaaaatatatatacttacaatgtctctaaaggcacttatttttcttaaaaatcatgta
tttgtaagctgaactatcattttaacacaaaagctatcattcttgctcaatggagtcag
gctgctcttggagtttctgtcctgggaggaaaaaggGCAGGGTGTAGGTACCTGATGGT
TTTCCACA[ct]GTCGAAGCCATCCAGAGGCTTTGTGCCATTGgtgtgtcccctggcca
gcttcacgagtgttggcagccagtcagagatgtggatgagctcccggttcttcacgccc
ttctgcttcagcaaggggcttgccacaaagcccacccctcggacgcctccttcccacag
gctccattttcttcctcgaaggggccagttattaccccctgccaaagtctgccctccgt
tatctgaaacacagtaaggtcttggcatgaggatgatgttaactcttaaatacatttaa
gaacagagactgtatgtacattgttactaaatggtgcttaaataataaaaaaaaagaaa
attccttgccttttcccaccctaaattcccttttcccattgacatagcctttcattatt
cagacataagtaaggcccagtgtgatacatatctacctttaaatcctccatggagagag
ccactggaaaacaaggcagtc

FIGURE 10pppp

53551 (SEQ ID NO:94)
CTGTGGGGAGCGTGGCTTTGCTACTCAATGGCAACTGGATTTCAAGAGTTTCAGGAAGG
GTGGGGGAGCAAGATATCAAAGGCTCAAGCTCACTCCCCTTCGTCCAGACAGACTTTTC
ATTTTTTGTTTGATGAAGATTAGGAAGAAAAGAGTGAGGATTAGGCCTAATTTACTGCC
TCTGTCAAAAGCCAGCGCAGAGTAGAAGGGAAGGGAGTAAGTGGATTATGAAAAGAAAA
CAAACGGAGGGAAAGGGGGCCGAGGATGAACTGCATTCAGTGATATTTATTTATCTGAT
TGCAAAAGGAAAAGAAGGGATCTGTTCTAATGGTTCACCTTCTTATGAACCCTGGAGCT
CCCAAAACCCTGGCGAAGTCCTTCTGACACTGCTGTGAGGTAGATCGGAGCCATTCCAT
GGCTAAAGTGAGAGAGGCCACTGCTTGAGAGCAGTAATAAGGGAACCAGAGATAAAACC
CCAAATCTTGGTCTTTTCTACCCTGCTGCTCTCAGCCTGGGCCACAGAGCCTGGAGAAC
ACTAAGGTCTCATCAGGGTTTGGGTGGCA[ga]AAGGAATGGAACCAGGGGAGCTCTCT
TTGCCCTAAGCACTCACTGACTGCACAGGCAAGCCGGGTGATGGGTGCCCCTACCAAAG
CCAGCCTGCTGCTCCACGGCACCTGGACACTACCACTGAGGGAGGAGTGAAGTTCAAGG
CTGGGGTTTAGAAAACATCTCTCAGACAGAGAGCAAGAGGATGGTGAAAACCCACTTGG
TAAGGATCCCTCCTTGGGTCACATGGCCCAGTCGTCAGGTTCTGGAGGGTAGAGTGTCA
CAGCCGGGGAATCCCATGGGACTCATTCTGAACAGAGGCCAGAGGTTTTCCACAGGTTC
TGATCAACAGAGTTGTTGCTTCTTGTCCTTCAGGCCTAAGAAACTCCCCAAGAAGCCCT
GGGAAAAAAAGTGGAGATAATAGACCCTGGGGTGAAAGGAGCAACAGGTGCACTGAGGG
GAATGACAGAGATCAGAGACC ctgtggggagcgtggctttgctactcaatggcaactggatttcaagagtttcaggaagg
gtgggggagcaagatatcaaaggctcaagctcactccccttcgtccagacagacttttc
attttttgtttgatgaagattaggaagaaaagagtgaggattaggcctaatttactgcc
tctgtcaaaagccagcgcagagtagaagggaagggagtaagtggattatgaaaagaaaa
caaacggagggaaagggggccgaggatgaactgcattcagtgatatttatttatctgat
tgcaaaaggaaaagaagggatctgttctaatggttcaccttcttatgaaccctggagct
cccaaaaccctggcgaagtccttctgacactgctgtgaggtagatcggagccattccat
ggctaaagtgagagaggccactgcttgagagcagtaataagggaaccagagataaaacc
ccaaatcttggtcttttctaccctgctgctctcagcctgggccacagagcctggagaAC
ACTAAGGTCTCATCAGGGTTTGGGTGGCA[ga]AAGGAATGGAACCAGGGGAGCTCTCT
TTGCCctaagcactcactgactgcacaggcaagccgggtgatgggtgcccctaccaaag
ccagcctgctgctccacggcacctggacactaccactgagggaggagtgaagttcaagg
ctggggtttagaaaacatctctcagacagagagcaagaggatggtgaaaacccacttgg
taaggatccctccttgggtcacatggcccagtcgtcaggttctggagggtagagtgtca
cagccggggaatcccatgggactcattctgaacagaggccagaggttttccacaggttc
tgatcaacagagttgttgcttcttgtccttcaggcctaagaaactccccaagaagccct
gggaaaaaaagtggagataatagaccctggggtgaaaggagcaacaggtgcactgaggg
gaatgacagagatcagagacc

FIGURE 10qqqq 53553 (SEQ ID NO:95)
CTTTAGAAACGGCTCTAGGTTGAGACCGCCGGCATGGATCTCCACCTCTACTGCAGACA
CACACTGGAAGGCTTCGGACCAGTCGGGCTGAGGTTCGGAGAAGTTGCAGACGCAGCGG
AAATCTTCATCGTCCAGCTCACAAGGTTCTGGCGTGGTCGCAGAGACGTGCACCAGCGG
CAGCAGCAGCAGCAACAAGCAGGACGCGCGCTCCTGGGGAGAGAGCAGAGGTCTAGGAG
GCCCCATCCAACCCCTGTGGCTCCCGAGTGGCACGCGTTCGACCCCAAGACCCTACACT
CACCATGGTCGATAAGTCTTCCGAACCTCTGAGCTCCGGACAGGCTCTGGAAGTGCTTT
ACGTTCTTTCCTACACAGCGGCACCCGCCGGCTTCCAGGCTTCACACTTGTGAACTCTT
CGGCTGCCTCTGACAGTTTATGTAATCCTGGGATGTCATTCAGTTCCCTCCTCTGTGAA
CCCTGATCACCTCCCCACCTCTCTTCCTCCGAGCCAGCCCCCTTCCTTTCCTGGAAATA
TTGCAATGAAGGATGTTTCAGGGAGGGGG[ag]CCGTAACAGGAAGGATTCTGCAGGGC
ATCTAGGGTTCTGTGTCTCCTGGCAGTGTCCTGATGACTCAGGCGCCCCAGGCGGTGAA
TGCCCTGTTGACTCGGGAGCCTAAGCCTTCTCTGGTGGGTGTGGGAAAAGGATGATCCT
CAGTGCCTTAGGCCAGTACCATACTCTGCACTATCCAACCCCCCAATCCCCCTACCTTA
TATCCCAGAGAATCTACTTGATTCATTTCTTTGACTTCTTCCTTGTCTTGGTTTATGTT
GATCTCCTGCCACCAAATCCAAGTCCCTGAATATCCTCAGATATTTAACTGCATGTTTT
GTGGAAGAGATTGTGAACCTCATCTGTTGGCACCAAGGGGGGTAGAATTAGGTTCAAGA
AAAGGAAGTTGGTCTAAAGAAAAATTCCCCCTTCCTTTTTTTTTCCTTGCTCCTTTGAT
TAAGTAATAACTTTCTTTCTT ctttagaaacggctctaggttgagaccgccggcatggatctccacctctactgcagaca
cacactggaaggcttcggaccagtcgggctgaggttcggagaagttgcagacgcagcgg
aaatcttcatcgtccagctcacaaggttctggcgtggtcgcagagacgtgcaccagcgg
cagcagcagcagcaacaagcaggacgcgcgctcctggggagagagcagaggtctaggag
gccccatccaacccctgtggctcccgagtggcacgcgttcgaccccaagaccctacact
caccatggtcgataagtcttccgaacctctgagctccggacaggctctggaagtgcttt
acgttctttcctacacagcggcacccgccggcttccaggcttcacacttgtgaactctt
cggctgcctctgacagtttatgtaatcctgggatgtcattcagttccctcctctgtgaa
ccctgatcacctccccacctctcttcctccgagccagcccccttcctttcctggaAATA
TTGCAATGAAGGATGTTTCAGGGAGGGGG[ag]CCGTAACAGGAAGGATTCTGCAGGGC
ATCTAGGgttctgtgtctcctggcagtgtcctgatgactcaggcgccccaggcggtgaa
tgccctgttgactcgggagcctaagccttctctggtgggtgtgggaaaaggatgatcct
cagtgccttaggccagtaccatactctgcactatccaaccccccaatccccctacctta
tatcccagagaatctacttgattcatttctttgacttcttccttgtcttggtttatgtt
gatctcctgccaccaaatccaagtccctgaatatcctcagatatttaactgcatgtttt
gtggaagagattgtgaacctcatctgttggcaccaaggggggtagaattaggttcaaga
aaaggaagttggtctaaagaaaaattcccccttcctttttttttccttgctcctttgat
taagtaataactttctttctt

FIGURE 10rrrr

53557 (SEQ ID NO:96)
GCAGGGCTCAGCCTGCCTCCCTGCTGCTGAGGCCCCTACCAAATTGGAACCCGAGTAGC
ACCAGGGAAGCAGGGCCTGCAGGGGATGCCATTCTCACCCCTGCCTGCAAAACGCTGCA
GTGCCCGAGTCTGCTGTGGGCTGGTGGGGGAAGGGCATCGCTAGGTTGGTGGCTGCCCC
CACCCCAGCACACTCCCCCCATTCTCTTTAGATTGTCTCACAGGGGGACCCACTTGGTT
CTCATTCTGAACTTTCAGTGAATGGATTCTGCTCCCTGCCTTGCGTGTGTACCCTTGGG
TGGCCTTTGCCCGTATCTTAGTCTCAGTTTCCTGAGTTTGGGCAGGAAGGAGAGGAGGG
GTTCTGACTGATGAGTTACCTCTTCTCCCTCTCCCCACCTCGCAGGGGGCTCCTGAGAG
TGTGATCGAGCGCTGTAGCTCAGTCCGCGTGGGGAGCCGCACAGCACCCCTGACCCCCA
CCTCCAGGGAGCAGATCCTGGCAAAGATCCGGGATTGGGGCTCAGGCTCAGACACGCTG
CGCTGCCTGGCACTGGCCACCCGGGACGC[cg]CCCCCAAGGAAGGAGGACATGGAGCT
GGACGACTGCAGCAAGTTTGTGCAGTACGAGGTGGGTGCAGGAGCCGATTCTCCCTGCA
GTACGAGGTGGGTGCAGGAGCCAAGTCTCCCTGCAGCAGCTGAGCAGGTGGTAGGTCAG
GGATGGGCTCAGGCCCCGCTTGAATCTGCCCCCTCCCTACAGACGGACCTGACCTTCGT
GGGCTGCGTAGGCATGCTGGACCCGCCGCGACCTGAGGTGGCTGCCTGCATCACACGCT
GCTACCAGGCGGGCATCCGCGTGGTCATGATCACGGGGGATAACAAAGGCACTGCCGTG
GCCATCTGCCGCAGGCTTGGCATCTTTGGGGACACGGAAGACGTGGCGGGCAAGGCCTA
CACGGGCCGCGAGTTTGATGACCTCAGCCCCGAGCAGCAGCGCCAGGCCTGCCGCACCG
CCCGCTGCTTCGCCCGCGTGG gcagggctcagcctgcctccctgctgctgaggcccctaccaaattggaacccgagtagc
accagggaagcagggcctgcaggggatgccattctcacccctgcctgcaaaacgctgca
gtgcccgagtctgctgtgggctggtgggggaagggcatcgctaggttggtggctgcccc
caccccagcacactccccccattctctttagattgtctcacagggggacccacttggtt
ctcattctgaactttcagtgaatggattctgctccctgccttgcgtgtgtacccttggg
tggcctttgcccgtatcttagtctcagtttcctgagtttgggcaggaaggagaggaggg
gttctgactgatgagttacctcttctccctctccccacctcgcagggggctcctgagag
tgtgatcgagcgctgtagctcagtccgcgtggggagccgcacagcacccctgaccccca
cctccagggagcagatcctggcaaagatccgggattggggctcaggctcagacacgctg
cGCTGCCTGGCACTGGCCACCCGGGACGC[cg]CCCCCAAGGAAGGAGGACATGGAGCT
GGacgactgcagcaagtttgtgcagtacgaggtgggtgcaggagccgattctccctgca
gtacgaggtgggtgcaggagccaagtctccctgcagcagctgagcaggtggtaggtcag
ggatgggctcaggccccgcttgaatctgccccctccctacagacggacctgaccttcgt
gggctgcgtaggcatgctggacccgccgcgacctgaggtggctgcctgcatcacacgct
gctaccaggcgggcatccgcgtggtcatgatcacgggggataacaaaggcactgccgtg
gccatctgccgcaggcttggcatctttggggacacggaagacgtggcgggcaaggccta
cacgggccgcgagtttgatgacctcagccccgagcagcagcgccaggcctgccgcaccg
cccgctgcttcgcccgcgtgg

FIGURE 10ssss

54762 (SEQ ID NO:97)
AGCAGAGAAGACAAATAATAGATACTGCGAAGATAGGATGATTGAAGAATGCAGTGATA
TAAATTTGGGGGAAGAGGAGGGAGGCAGAGCAAAGAAATTCAAGGCCTTGGCCAGACGT
AATGTCTCACACCTTGTAATCCCAGCAGTTTGGGAGGCTGAGGCAGGCTGATAGCTTGT
GTCCAGGAGTTCGAGACCAGCCTGGGCAATCCAGCAAAACCCTGTGTCTACAAAAAAAT
ACAAAAATTAGCCAGGCATGGTGGCATGCGCCTGTGGTCCCAGCTACTTGGGAGGCTGA
GGTGGGAGAATCGCCGGGACGTCGAGATTGCAGTGAGCTGAGATCGTGCCACTGCACTC
CTGCCTGGGTGACAGAGCAAGAACGTCTCAAAGAAAAAACAACAACAACAACAACAACA
ACAACAACAAAAACACAAGGCCTGTGGTTGGGGGAAGGTTGTAACTCTAAAAAAGACCC
ATGTGGCTACAGCGAGGGACACTGGGTGTAGGTAGAGATAAGAAGAGTGATACTCAGTT
CTCACATCACGGCGGACTGAATACAGGCC[cg]GGGGAGTGAGAGACCATCCACCCCTG
TGATCTGGGGCAAGTCACCAGCCCTTTCAGAGAAGCTTCCGTCTTCTCTGCAAAATGGG
ACAATACCTTGCTTCACAAGCTTGCAAGGATCAAAAGAACTGGTAGTGGCCGGGCGCG
GTGGTTCACGCCCGTAATCCCAGCACTTTGGGAGGTCGAGGCAGGTGGATCACTTACTT
GAGGTCACGGGTTCGAGACCAGCCTGGGCAAAATGGTGAAACCCCGTGTCTGCTAAAAA
TACAAACATTAGCCTGGCGTGGTGGCAGGTGCCAGTGATCCCAGCTACTCGGGAGGCAG
AGGCAGGAGGATCGCTTGAACCCAAGGGGTGGAGGTTGCAGTGAGCTGAGATCGCGCGC
TGCACTCCAGTCTGGGCAACAGATCAAGACTGTCTCAGAAAAAACAAACAAAAAAGAAC
TGGTAGAGGAAGCGCTTTGCA agcagagaagacaaataatagatactgcgaagataggatgattgaagaatgcagtgata
taaatttgggggaagaggagggaggcagagcaaagaaattcaaggccttggccagacgt
aatgtctcacaccttgtaatcccagcagtttgggaggctgaggcaggctgatagcttgt
gtccaggagttcgagaccagcctgggcaatccagcaaaaccctgtgtctacaaaaaaat
acaaaaattagccaggcatggtggcatgcgcctgtggtcccagctacttgggaggctga
ggtgggagaatcgccgggacgtcgagattgcagtgagctgagatcgtgccactgcactc
ctgcctgggtgacagagcaagaacgtctcaaagaaaaaacaacaacaacaacaacaaca
acaacaacaaaaacacaaggcctgtggttgggggaaggttgtaactctaaaaaagaccc
atgtggctacagcgagggacactgggtgtaggtagagataagaagagtgatactcagtt
cTCACATCACGGCGGACTGAATACAGGCC[cg]GGGGAGTGAGAGACCATCCACCCCTG
TGatctggggcaagtcaccagccctttcagagaagcttccgtcttctctgcaaaatggg
acaataccttgcttcacaagcttgcaaggatcaaaagaactggtagtggccgggcgcg
gtggttcacgcccgtaatcccagcactttgggaggtcgaggcaggtggatcacttactt
gaggtcacgggttcgagaccagcctgggcaaaatggtgaaaccccgtgtctgctaaaaa
tacaaacattagcctggcgtggtggcaggtgccagtgatcccagctactcgggaggcag
aggcaggaggatcgcttgaacccaaggggtggaggttgcagtgagctgagatcgcgcgc
tgcactccagtctgggcaacagatcaagactgtctcagaaaaaacaaacaaaaaagaac
tggtagaggaagcgctttgca

FIGURE 10tttt

54777 (SEQ ID NO:98)
AAAAAAAAAGTGGCTGGAACTGCCATCACTATCCTAGAGATGGAAGGTTAGGCCAATGC
TACAGCAAGGTAGCTGTGGTCAGACACTAAGAATGCTCCTTCTATCTGGCTGCCAGCCA
ATGGATCTCCATTCTGGACCAGCCCACGAGAAGCAAACCTCAAAGGAAACTAATCTGAG
GTCTTAGCTCAATCTGTGGGGAACGGCATTAAAGCCTCTCCCTCTGAGTGACCTCTGCT
AGCTTCTCTACCTCCTGCTTCCTCATCTGCTTCTGCTACACACCCGCACACTGAAAACC
CTGTATATTGTATGAGTCCTCCCTGAACCCCACATCAGTCCTGAGGTGCAATTCTGCCT
AGTCATCTTTCCTCTTCCCTCAACAGCAGCTTACTTTATGTTCTTCAAGCTTCACTGAG
GCCTCTTTTGCAAATCCTCCCAGATCTCCTCAGCTGGGATGGGGCCCCTCTAGGCTTCC
TGAGCCCCATGCTTCCTCCCTTCATGGCATCTGTCATAATGCAGTGGGATTGCCATGTA
ACTCCCTTGACTGTCTCCCCAACACAGAG[ct]TGTACACTTCACATCTGGGCAGGGTC
ACCATGACTGTGTCCACCATTGCCAGCTTGGAACCTGGCATACTGGCATCAGTAAATGT
TTGCTGAAAGAATAAATGATAACAAGCTGTCCTGCCCACCGTGACCTTTGGGAGAATGG
GCATATGCTTTTGATTACCTGCAGGGCCATCAAGGTGTTGGCCAGGGCTTGACCATAGG
TGTCATGGCAGTGGACAGCCAGGGCAGCCAGAGGCACTTCCTGCATGACAGCAGATAGC
ATGTCTTTCATGATCCCTGGGGTGCCCACACCAATGGTGTCCCCCAGGGAGATCTCGTA
GCAGCCCATTGAGTAGAACTTCTTGGTGACCTAAGGAAGCAAGCAGGCACTTGGAGGAT
ACAGAATCCACCAGCCAGGGGATCCATGCACTCAGAAGAGGGGGCCTTTGCCTGGGCAG
AACACTTCTGGGTATGACGCA aaaaaaaaagtggctggaactgccatcactatcctagagatggaaggttaggccaatgc
tacagcaaggtagctgtggtcagacactaagaatgctccttctatctggctgccagcca
atggatctccattctggaccagcccacgagaagcaaacctcaaaggaaactaatctgag
gtcttagctcaatctgtggggaacggcattaaagcctctccctctgagtgacctctgct
agcttctctacctcctgcttcctcatctgcttctgctacacacccgcacactgaaaacc
ctgtatattgtatgagtcctccctgaaccccacatcagtcctgaggtgcaattctgcct
agtcatctttcctcttccctcaacagcagcttactttatgttcttcaagcttcactgag
gcctcttttgcaaatcctcccagatctcctcagctgggatggggcccctctaggcttcc
tgagccccatgcttcctcccttcatggcatctgtcataatgcagtgggattgccatGTA
ACTCCCTTGACTGTCTCCCCAACACAGAG[ct]TGTACACTTCACATCTGGGCAGGGTC
ACCATGactgtgtccaccattgccagcttggaacctggcatactggcatcagtaaatgt
ttgctgaaagaataaatgataacaagctgtcctgcccaccgtgacctttgggagaatgg
gcatatgcttttgattacctgcagggccatcaaggtgttggccagggcttgaccatagg
tgtcatggcagtggacagccagggcagccagaggcacttcctgcatgacagcagatagc
atgtctttcatgatccctggggtgcccacaccaatggtgtcccccagggagatctcgta
gcagcccattgagtagaacttcttggtgacctaaggaagcaagcaggcacttggaggat
acagaatccaccagccaggggatccatgcactcagaagagggggcctttgcctgggcag
aacacttctgggtatgacgca

FIGURE 10uuuu

54874 (SEQ ID NO:99)
ATTGGCCTTGTTCCCCAGGGTGGAGCTGTCACAAAATAGAGTGGGAACTGTCTGGCTTT
CAGCCCAAGAGAATCTGCATGGCAAGTTGCATTAACAACCAGGCATTTCCGGCAGTTCC
CAACATTTCTGGGAATTTTCTCATCCAAACGACTGAAAGCCCACTCCATTCTCTTGCTT
CTTACTCATGCTTTCTTTGTATAATGGTAATTATGTTTTAAAAAATCCTGGGCTATGTT
GTTTCATGGAACAATTTAGAACTTATTGGTCAAACTCTGAAGCAAAGGTATATAAAAGG
TAGTTAGAGATGTTTAGGGAATATTCAAAGCACATTTTTGGGTCACTCATAATTGATCT
TTATATTCATATATGTATATATATATATATAACATAATGTACCCATCTTAACATATCAA
AGCTAAACCAGTATTAAAAACAACTGACTATGGTCTATTGATACAATATATGATGCCCA
AGTACACTCTTCATTGCTACTGCATATCTAAAATCATTTATTTATTTATCCATCCATCA
AGAGTGTATTGAGAGCCTGACAACATACC[ag]GCATCAAGCCCTGGAGGTCTTTTTAA
GGCTGAGCCAATATAGCTATGGATAACATTCTAAAACTGATAGCATATTTTCATGTTTT
ATAGTCTTTCCACAGACTAGTTCAAAATGAACACTGCCTGAGAGGGGCTTTAAGATGAC
TGACTAGAGGTACTGGACACCTGTTTCCCCAGCAAAGAAGAGCCAAAATAGCAAGTAGA
TAATCATACTTTGAATAGACATCTAAGAGAGAATGCTGGAATTCAGCAGAGAAGTGACA
GAAAACACCTGAGATACTGAAGGAGAGGGAGGCAAGGTAGACAGCCTGGCTGGAATCAG
CTGGGAGCCCAGAGAGGGTCCCTAGTGAGAGGAAAGGGTAAGTGAGAGATTCCCAGTGG
TACATGTTCCCATGTTGACTGCTGAAATCCTAGTCATAAGAGTCTCTCAAACCCCAAGG
ACCCTGAAACTGGTATTCCCG attggccttgttccccagggtggagctgtcacaaaatagagtgggaactgtctggcttt
cagcccaagagaatctgcatggcaagttgcattaacaaccaggcatttccggcagttcc
caacatttctgggaattttctcatccaaacgactgaaagcccactccattctcttgctt
cttactcatgctttctttgtataatggtaattatgttttaaaaaatcctgggctatgtt
gtttcatggaacaatttagaacttattggtcaaactctgaagcaaaggtatataaaagg
tagttagagatgtttagggaatattcaaagcacatttttgggtcactcataattgatct
ttatattcatatatgtatatatatatatataacataatgtacccatcttaacatatcaa
agctaaaccagtattaaaaacaactgactatggtctattgatacaatatatgatgccca
agtacactcttcattgctactgcatatctaaaatcatttatttatttatccatcCATCA
AGAGTGTATTGAGAGCCTGACAACATACC[ag]GCATCAAGCCCTGGAGGTCTTTTTAA
GGCTGAGCcaatatagctatggataacattctaaaactgatagcatattttcatgtttt
atagtctttccacagactagttcaaaatgaacactgcctgagaggggctttaagatgac
tgactagaggtactggacacctgtttccccagcaaagaagagccaaaatagcaagtaga
taatcatactttgaatagacatctaagagagaatgctggaattcagcagagaagtgaca
gaaaacacctgagatactgaaggagagggaggcaaggtagacagcctggctggaatcag
ctgggagcccagagagggtccctagtgagaggaaagggtaagtgagagattcccagtgg
tacatgttcccatgttgactgctgaaatcctagtcataagagtctctcaaaccccaagg
accctgaaactggtattcccg

FIGURE 10vvvv

54915 (SEQ ID NO:100)
GTTTAAATTTGCCGATTAGTTTCGATGATTCACCAGTGCTTGATGATTAAGGGGTATTG
GTGCAGTGCCACTGAGTTGCTGTTCATAGTCTCCAGTAAGGGCAGTACAAGAGAGGAGA
AAAGTAAAGTTGCACATCAGGCCAATACATTTCCATGTCCCTACAGCCCATGGGTATTT
TTCTCTGAAGTTTAAAATTACAGCTCAAGAAGATCATATGTATTTATGTAATCTGCCTT
TAACCAGGCCACCTTGCTTCCCTAATGCTGTTGTTTTTTTCCCTTCGTTTATTTATCTT
TAATTGACACCTGTTGCTATTCTTATGCCTGCTCACCTTCACATAAATGTCAGCATCCA
TGCACCATGTATGTCACACACACACACACACACACACACACACACACACACACCCCTCT
AAAAGTTCTGATGAGTATTTGATAAATAGTAGAGTTTTGAGGAGAGATGGAGGAAAGTG
TTTACAAGTTTAACTTTTTGAATTTGCTTTTAACTCTCTGCTGTTCCCTCACCTGTAAA
ATCTGCCTCATCTCTGCCCCTCTTTCTTC[tc]TGCAAACCTCACTTCTCATAGCCTCC
TCCAGCAGCACTGACTTCTGGAGATTCCCTGTCAGTGAAATAAAACTGGAAAGCTGGTC
TCATAATAAAAGCCCAACAGTTTATGGGCAAAGCCCAACCACCTGTGGTTCTTCAGGTG
TGGTTTTCTTGAGGAGTGCTTATTTACCCTGCCACATTTTCCTCTCTTTCTCTCCAAGG
AGGCTTTCTCTCCAGGGTGGATTAAGTGAAATTATGCTGTTACTTAGGGACTGATTTAC
ATATTTCTTATCCCTCACACTCTGGGTTTCTCTATGTTAGCTACATCTAGGAAAAAAAT
GGGGAAAAAAATCACCTTGATTGGAAGTGCAGTTAATTCCTGAAAATAAAGCCTGATCA
CGAGTGGTAATCACAGATCAATTAGTTACTGGATCCCTAGATAATGCATCCCTGTCATT
GTGAGACAAAAGAGGGGAAAG gtttaaatttgccgattagtttcgatgattcaccagtgcttgatgattaaggggtattg
gtgcagtgccactgagttgctgttcatagtctccagtaagggcagtacaagagaggaga
aaagtaaagttgcacatcaggccaatacatttccatgtccctacagcccatgggtattt
ttctctgaagtttaaaattacagctcaagaagatcatatgtatttatgtaatctgcctt
taaccaggccaccttgcttccctaatgctgttgtttttttcccttcgtttatttatctt
taattgacacctgttgctattcttatgcctgctcaccttcacataaatgtcagcatcca
tgcaccatgtatgtcacacacacacacacacacacacacacacacacacacacccctct
aaaagttctgatgagtatttgataaatagtagagttttgaggagagatggaggaaagtg
tttacaagtttaactttttgaatttgcttttaactctctgctgttccctcacctgTAAA
ATCTGCCTCATCTCTGCCCCTCTTTCTTC[tc]TGCAAACCTCACTTCTCATAGCCTCC
TCCAGCAgcactgacttctggagattccctgtcagtgaaataaaactggaaagctggtc
tcataataaaagcccaacagtttatgggcaaagcccaaccacctgtggttcttcaggtg
tggttttcttgaggagtgcttatttaccctgccacattttcctctctttctctccaagg
aggctttctctccagggtggattaagtgaaattatgctgttacttagggactgatttac
atatttcttatccctcacactctgggtttctctatgttagctacatctaggaaaaaaat
ggggaaaaaaatcaccttgattggaagtgcagttaattcctgaaaataaagcctgatca
cgagtggtaatcacagatcaattagttactggatccctagataatgcatccctgtcatt
gtgagacaaaagaggggaaag

FIGURE 10wwww

54918 (SEQ ID NO:101)
CCCAAAATCTTAGGATGCTGCCTTAAACATCATGGTAGAATAATGTAACTAGCTACCCA
CGATTTCCTTCTTTAATTCATTTTGTGTTTTATCTCCCCAGGAAAGTATTTCAAGCCTA
AACCTTTGGGTGAAAAGAACTCTTGAAGTCATGATTGCTTCACAGTTTCTCTCAGCTCT
CACTTTGGGTAAGTCAGTGCCATTAGACCAAGATTTCTCATTCTCGCACTATAGATATT
TCAGACTGAAATATCCTTGCTTGTCTGGGGCTGTCCTGCACAGGATATCTGGCAGCATC
CTTGACCTCTACCTGCAATGTGTTCTTCCCTGGGCTTGGGGTCATTTACTTTACCTCTT
GGTGTCTCCCTTTCCTTAAGTGTAAAGTGTGGATCATAATGACCTATTTCCCAGATGCA
TTGTGAGGATTCAATAGCATGGTTCATGGAAAGTACCTCATACAGTGCTTCTTGGTGCA
TACTAAGTGCTCAATAAAGCTTAGTTATTCTGATTATTATTCTACTACAAAATGGGTAT
ACTATAATGTTGTGAGTGAGTGTGGATAA[ga]GTACCTAGTGGGTGGCAGTCACAAAA
GAGATAAACAATAAGTCGCTGTTTCTTCATACGTACTTCTTACTTTTGAAAAGATGAGA
AAAGTCTGGGCCATGTCACAAACATTGCCAAAAATAAGACAATAAAAAGCACAGTTGTC
AGAGTTAAACCACAACAGTACCAAACTCTACCATTTCTTTTCTTTTTCTCCCACTAGTG
CTTCTCATTAAAGAGAGTGGAGCCTGGTCTTACAACACCTCCACGGAAGCTATGACTTA
TGATGAGGCCAGTGCTTATTGTCAGCAAAGGTACACACACCTGGTTGCAATTCAAAACA
AAGAAGAGATTGAGTACCTAAACTCCATATTGAGCTATTCACCAAGTTATTACTGGATT
GGAATCAGAAAAGTCAACAATGTGTGGGTCTGGGTAGGAACCCAGAAACCTCTGACAGA
AGAAGCCAAGAACTGGGCTCC cccaaaatcttaggatgctgccttaaacatcatggtagaataatgtaactagctaccca
cgatttccttctttaattcattttgtgttttatctccccaggaaagtatttcaagccta
aacctttgggtgaaaagaactcttgaagtcatgattgcttcacagtttctctcagctct
cactttgggtaagtcagtgccattagaccaagatttctcattctcgcactatagatatt
tcagactgaaatatccttgcttgtctggggctgtcctgcacaggatatctggcagcatc
cttgacctctacctgcaatgtgttcttccctgggcttggggtcatttactttacctctt
ggtgtctccctttccttaagtgtaaagtgtggatcataatgacctatttcccagatgca
ttgtgaggattcaatagcatggttcatggaaagtacctcatacagtgcttcttggtgca
tactaagtgctcaataaagcttagttattctgattattattctACTACAAAATGGGTAT
ACTATAATGTTGTGAGTGAGTGTGGATAA[ga]GTACCTAGTGGGTGGCAGTCACAAAA
GAGATAAACAATAAGTCGCtgtttcttcatacgtacttcttacttttgaaaagatgaga
aaagtctgggccatgtcacaaacattgccaaaaataagacaataaaaagcacagttgtc
agagttaaaccacaacagtaccaaactctaccatttcttttctttttctcccactagtg
cttctcattaaagagagtggagcctggtcttacaacacctccacggaagctatgactta
tgatgaggccagtgcttattgtcagcaaaggtacacacacctggttgcaattcaaaaca
aagaagagattgagtacctaaactccatattgagctattcaccaagttattactggatt
ggaatcagaaaagtcaacaatgtgtgggtctgggtaggaacccagaaacctctgacaga
agaagccaagaactgggctcc

FIGURE 10xxxx

54966 (SEQ ID NO:102)
GCAGGACTGCAGACATGACTCATGGCAGGGTAGCTGCTGAGGCACGTCCCATCTCCTTT
CAGTTCAGGAGAGGCTGTGGGAAGAGGGAAGAACTGAGCACACATGAAGATTTGGCAGA
GGGAGGAGGCCAAGTAGGGAGGAAGTGGAATAATTGATATTGGAGCCAGACATATAATC
AGATGAAACCTGGGCAAAACCAAACGAGGTCCAGACATAAGGAGAAGGAGAGCAGGCGA
AAAGGCAATAGAGATCTGTGGCATGAGATAATCCTATGTCCGTGGGATTTTCCCATGGA
TGGTACAACTGGCACAGGACGATGTTATTCCTCCCCTCTGGTGAAACCAATATGGCAGC
AGAAGGCAGGGAGGGTGGGGAGGAGGGTGTAGTTTGTCTGCACAAGCATCATCAGCATA
TTTTCAGGAGCTTCTGAGAGCTGATGAAGGATCATTTGCTGCAGATACTTTATATTCAC
TCGGTCAGCCAACTTGTATTGAGCAATTGCTGGGGCACAGCAGTGAGTGAGGTGCGCTA
CAGAAACACAGTTGAAAAGAATCTGACTT[tc]GCCCTCAATGAACCTGCAGTCAAGTT
AGAAGCACAGAGGTCAACAGACAAATAAGATAAAGGCATTAGTTTCTGTACTGGAGCAT
AACACCAATACTGCCATTGCTCAGAATGTTTCTAGAACCCCTAAAAGTTCAGAACTGTC
TTCAGCATCATTTCAGGAGCCAGACAAGAAAACCAGTCTCATTTCTTTATTGTCATGAC
CTGGGTTTGACCAGAAACAATATTACTCACTTGGAGCACCTCACTCCTCAGATCTGGCT
CTAGTTCTAAATATCAAACCATTCTCAAATAGCAAAGCTTTGTCACCTCCCTATACATA
TCTCATTTAAATATGTAAAGGATCTGTAGGCAATTCCAAAAAGAAGGCTCTAAAAATAT
TTAAAAAGCAATGGTCGTACCTTATAGTTTTACCTTATAGTGTATATCAATAATAGCCT
TGTAATTAAAAAACAATCATC gcaggactgcagacatgactcatggcagggtagctgctgaggcacgtcccatctccttt
cagttcaggagaggctgtgggaagagggaagaactgagcacacatgaagatttggcaga
gggaggaggccaagtagggaggaagtggaataattgatattggagccagacatataatc
agatgaaacctgggcaaaaccaaacgaggtccagacataaggagaaggagagcaggcga
aaaggcaatagagatctgtggcatgagataatcctatgtccgtgggattttcccatgga
tggtacaactggcacaggacgatgttattcctcccctctggtgaaaccaatatggcagc
agaaggcagggagggtggggaggagggtgtagtttgtctgcacaagcatcatcagcata
ttttcaggagcttctgagagctgatgaaggatcatttgctgcagatactttatattcac
tcggtcagccaacttgtattgagcaattgctggggcacagcagtgagtgaggTGCGCTA
CAGAAACACAGTTGAAAAGAATCTGACTT[tc]GCCCTCAATGAACCTGCAGTCAAGTT
AGAAGCACAGaggtcaacagacaaataagataaaggcattagtttctgtactggagcat
aacaccaatactgccattgctcagaatgtttctagaacccctaaaagttcagaactgtc
ttcagcatcatttcaggagccagacaagaaaaccagtctcatttctttattgtcatgac
ctgggtttgaccagaaacaatattactcacttggagcacctcactcctcagatctggct
ctagttctaaatatcaaaccattctcaaatagcaaagctttgtcacctccctatacata
tctcatttaaatatgtaaaggatctgtaggcaattccaaaaagaaggctctaaaaatat
ttaaaaagcaatggtcgtaccttatagttttaccttatagtgtatatcaataatagcct
tgtaattaaaaaacaatcatc FIGURE 10yyyy 55560 (SEQ ID NO:103)
CAGGAAGTTGTTGGTGTTTGGATGGATGAATGGACTAATGGATGGATGAATAATAGATA
GATGGATTGTTGAGAGAGACAGAGAAGAGAAAAGCCTTGCCCCCAAAAGCTCACAGACT
ACTTGGAGAGAGAAGAAAGCTACCTGGAGGGAGAACCAGATGCATGAAGCAGTGCAGAT
GTGGTGCCTAATGAGTGTGTAGTCTGGAAGGGCAGCAAAAGTCGAGTGGAGTGAGAGGT
TCCTGTGTCCTGGAGCACTGAGTAGAGACTCCCTCATGGGGGTGAATCTTAAAGGATAA
AGGGGCCTCTATAATGAAAAGGAGGAGGATGGGATTTCTGGTAGAGGAAATTGCTTGAG
CAAAACCTCCAAGGTTGGAATGACTATGGTGTGTTCAGGGATGTTAGCAGACCCAGATG
GGTGGAGCGTTGAGTGTGTGTGTGTAGGAAGGAAGAGGGGAGGTGGCTGGATGAGCACA
GTGAGACCTGATTTGATTGAGAGCCTTGAACGCCACGCTGAATAATGGAGGCAATGGGA
CGCCATAGAGGGCTTTTGAGTAGACATAT[ag]TCAGTGTAGAAGGGTGAATTTCAGAT
TTTTAGACAGAATAGAGTAAGGAGAGGAGCTCTTAGAAATCATCTAGTCCAGGGCTTGT
GGCAGAGCCCTGAGGTTTTAAGAAGGCATGTCAGGGGCTACCATGACAGGCACGGAGAG
GCTGAGTGAATTGGGGTTCTTGCCACAATTCCCTTGCCTGAGATTCAACAAGAGCAGCT
GTATTACAATCTGTGCAAAATGTCATTAGGAGAAACTAGTTAGTAGCTGGGCGTGGTGG
CATGCAACTGTTGTCCCAGCTACTCGGGAGGCTGAGGCCGGAGAATCGCTTGAAGCTGG
GAGGCGGAGGTTGCAGTGAGCAGAGACTGTGCCACTGCACTCCAGCCTGGATGACAGAG
CAAGACTCTGTTTCAAAAAAAAAAAAAAAAAAAAACTAGTCAGGACTCTTTCAGATACAA
GTAATAGAAACCAACTCAAAC caggaagttgttggtgtttggatggatgaatggactaatggatggatgaataatagata
gatggattgttgagagagacagagaagagaaaagccttgcccccaaaagctcacagact
acttggagagagaagaaagctacctggagggagaaccagatgcatgaagcagtgcagat
gtggtgcctaatgagtgtgtagtctggaagggcagcaaaagtcgagtggagtgagaggt
tcctgtgtcctggagcactgagtagagactccctcatgggggtgaatcttaaaggataa
aggggcctctataatgaaaaggaggaggatgggatttctggtagaggaaattgcttgag
caaaacctccaaggttggaatgactatggtgtgttcagggatgttagcagacccagatg
ggtggagcgttgagtgtgtgtgtgtaggaaggaagaggggaggtggctggatgagcaca
gtgagacctgatttgattgagagccttgaacgcCACGCTGAATAATGGAGGCAATGGGA
CGCCATAGAGGGCTTTTGAGTAGACATAT[ag]TCAGTGTAGAAGGGTGAATTTCAGAT
TTTTAGACAGAATAGAGTAAGGAGAGGAGctcttagaaatcatctagtccagggcttgt
ggcagagccctgaggttttaagaaggcatgtcaggggctaccatgacaggcacggagag
gctgagtgaattggggttcttgccacaattcccttgcctgagattcaacaagagcagct
gtattacaatctgtgcaaaatgtcattaggagaaactagttagtagctgggcgtggtgg
catgcaactgttgtcccagctactcgggaggctgaggccggagaatcgcttgaagctgg
gaggcggaggttgcagtgagcagagactgtgccactgcactccagcctggatgacagag
caagactctgtttcaaaaaaaaaaaaaaaaaaaaactagtcaggactctttcagatacaa
gtaatagaaaccaactcaaac

FIGURE 10zzzz

56733 (SEQ ID NO:104)
TACCAAAGGGCAAGTAGGGAAACAGACCAACAGAGATGTTACCTTCTGAATAATTGGAC
CCAGGAAGAGGAGTGTAACCTAAGAGAGGAAGATACTTGATTATACCAGTCTTTGTGGA
TGAAAATATCTAGCAGTATTCATAGCAAATGCAGTAGGAAGGAGAGAGTTAATCACAAA
CAGAAAGTAAGCAGAGAGTGGGACCAAGAGTGGGGATGGGAGTTCAGCGAGTCACTCAC
TAGAGTGGCCAGCTCTCCGCCAGCTGATCACACCAAGAGAGAAGATGATGAGGCCCAGG
CCCAGAGTCACTGCAGACACAGAAACCTTCAGGGTCTGCATGGGGGACAGCCCAGGTGC
TGCAAAAAATAGAAACTTACTTGACCCAGTTTCTGTTGCTCACCCCCAGGGCAATTCCA
TTTATTGCAGCCACCTCTCAGTGGGTTAAAAGGTCCTTTATCCCAGCTCCAAGGGTCTA
GCTCACACCACCCACTCCCAAGAAAATGATCTTTCTCAAATCAAACCCTCGTCCCATGG
ACCTCTACTCCTAGAGTAAGCCTGGGGAA[ag]CCATCTCCCCAGAATTAGCATCCTGG
CTTCCAGGTCCTCTCTAATACAGTGGGGCCTCTCAAGGCATCCTCTTTCCTTCCTTTAC
CTCAAAGCCACCCTTATCAGGATAAAGGGCTCCTCACTGTCCTCTCCATTGCCCCCACG
GTAACAATGTTTGCTTCCTTACTTTCTCCAACTGAGCAGCTTCCTATTACACTGTCTTA
CCACATGTCTTAACCTCCAGTGGATCCATCCTGTGAGTTATCCTACTACTTGTGTACCT
TCTACATCTAGATCTCCCATGTGTCCTTTCAGAGCTTGTCTCCATCCCACTCCACAGCC
CCTGCACTTCCTTGGGCCGGTCCTGTTCTGAATCATGTCCCACTCAGATTCTTTTCCCA
TGATAAAATGAACACTCCATTTCTAAAGGGAGGCTCTTGTGCACGCTGTGAGGAGACGT
TCCCCAGGAAAGTTCAAGTGA taccaaagggcaagtagggaaacagaccaacagagatgttaccttctgaataattggac
ccaggaagaggagtgtaacctaagagaggaagatacttgattataccagtctttgtgga
tgaaaatatctagcagtattcatagcaaatgcagtaggaaggagagagttaatcacaaa
cagaaagtaagcagagagtgggaccaagagtggggatgggagttcagcgagtcactcac
tagagtggccagctctccgccagctgatcacaccaagagagaagatgatgaggcccagg
cccagagtcactgcagacacagaaaccttcagggtctgcatgggggacagcccaggtgc
tgcaaaaaatagaaacttacttgacccagtttctgttgctcacccccagggcaattcca
tttattgcagccacctctcagtgggttaaaaggtcctttatcccagctccaagggtcta
gctcacaccacccactcccaagaaaatgatctttctcaaatcaaaccctcgtcccATGG
ACCTCTACTCCTAGAGTAAGCCTGGGGAA[ag]CCATCTCCCCAGAATTAGCATCCTGG
CTTCCAGgtcctctctaatacagtggggcctctcaaggcatcctctttccttcctttac
ctcaaagccacccttatcaggataaagggctcctcactgtcctctccattgcccccacg
gtaacaatgtttgcttccttactttctccaactgagcagcttcctattacactgtctta
ccacatgtcttaacctccagtggatccatcctgtgagttatcctactacttgtgtacct
tctacatctagatctcccatgtgtcctttcagagcttgtctccatcccactccacagcc
cctgcacttccttgggccggtcctgttctgaatcatgtcccactcagattcttttccca
tgataaaatgaacactccatttctaaagggaggctcttgtgcacgctgtgaggagacgt
tccccaggaaagttcaagtga

FIGURE 10aaaaa

66854 (SEQ ID NO:105)
CAAAAGGTCACCCCACAGTCCCCACTCCAAGGCAGGTTGATAGCAGGGATCTCAGGGTG
CCCATGGATCAAGGACTAAGTCAGAGTCGGGGTCCCTCAGGCCGAGGGTAACGTAGGTG
GTGCCTGCCAGGCTCTCCTCGCCCAGGGGGGCTGAGAATGTCTAAACCCGGGTGGCTGT
GACCCCTAGGCAGAGCCAGCCCAGCCCTTGCCAGGGATGGAGACCGGCCTCGAGGAGGC
CAAGCCCTGGGGGTCCACAGGCCTGTGGGCTTCGGGGAGGCTCTGCTCCCTGTGGCCCT
GTGTGGCCCAGGCTGCTGAGTCATCAGAACCTCGGGGGCGCCGCGGGCCCCACATTCCG
CCCAGGCCTCTCTCTGACCCCCTTCCCAGCCCATCTGTGTTTTTGGAAAACAGAGCCAG
AGCCCCCCGCGGCCCTGCCAGCTTGCGGCTGCTCACGCTGGGACTCAAATCGCACCCTT
CTGTCTTCAAAGTCCACCTTCACTTCAAAGCTCGGTCCCACCCCAGCCCGGCCTCCACA
GGGCCACCACCTGCCCACACCCAGGCCCGCTGCTGCCCAGTTTCGGAGGGACCTTGGGC
ATCCCCTGATCCTCTCTAGAGCG[ct]GGGGTTCCTGGCATGGGCCCGTTACACATGGG
TGGCTCGGTGGGTGGTGAGGACGGGGCTGGGAGAAGATCCTGGGGACCCCATGGTGGAG
GCAATGAGGCACCCAAACCCCAACTCCAGCGATGGCTGCTTCCACGGGGCCCTCCGAGC
CCTGACCTTCAAGGTGCAAGAAAAGCTTTCAGGGGCAGGGGTGAGTGGAAGGTGGGCTT
CCTCCCTTGCCACCTGGGGGGCGGGCCCAGGACAGATGCTCCGTGAGAGCACTTCCCAA
CCTAGGCCCAGCTGTGGGGAAGGAGGGAGCAGGCGGCTGGGCTCCAGGCAGGGGGAAGA
GTTGCCTGAGAACTCAGGGAGAGAGGGAGGGCTGGGGCACCCCATGCCAGCTCCAGCTG
CAGCACCAGAGCTCAGAGCAG caaaaggtcaccccacagtccccactccaaggcaggttgatagcagggatctcagggtg
cccatggatcaaggactaagtcagagtcggggtccctcaggccgagggtaacgtaggtg
gtgcctgccaggctctcctcgcccaggggggctgagaatgtctaaacccgggtggctgt
gacccctaggcagagccagcccagcccttgccagggatggagaccggcctcgaggaggc
caagccctgggggtccacaggcctgtgggcttcggggaggctctgctccctgtggccct
gtgtggcccaggctgctgagtcatcagaacctcgggggcgccgcgggccccacattccg
cccaggcctctctctgacccccttcccagcccatctgtgtttttggaaaacagagccag
agccccccgcggccctgccagcttgcggctgctcacgctgggactcaaatcgcaccctt
ctgtcttcaaagtccaccttcacttcaaagctcggtcccaccccagcccggcctccaca
gggccaccacctgcccacacccaggcccgctgctgcccagtttcggagggaccttgggc
atCCCCTGATCCTCTCTAGAGCG[ct]GGGGTTCCTGGCATGGGCCCGttacacatggg
tggctcggtgggtggtgaggacggggctgggagaagatcctggggaccccatggtggag
gcaatgaggcacccaaaccccaactccagcgatggctgcttccacggggccctccgagc
cctgaccttcaaggtgcaagaaaagctttcaggggcaggggtgagtggaaggtgggctt
cctcccttgccacctggggggcgggcccaggacagatgctccgtgagagcacttcccaa
cctaggcccagctgtggggaaggagggagcaggcggctgggctccaggcagggggaaga
gttgcctgagaactcagggagagagggagggctggggcaccccatgccagctccagctg
cagcaccagagctcagagcag

FIGURE 10bbbbb

66865 (SEQ ID NO:106)
ATTCCCTGACCAGGGCCCTGGGACCCACCGCACAGCTGAGCTGGCCCGAGCTGAAGAGT
TGTTGGAGCAGCAGCTGGAGCTGTACCAGGCCCTCCTTGAAGGGCAGGAGGGAGCCTGG
GAGGCCCAAGCCCTGGTGCTCAAGATCCAGAAGCTGAAGGAACAGATGAGGAGGCACCA
AGAGAGCCTTGGAGGAGGTGCCTAAGTTTCCCCCAGTGCCCACAGCACCCTCCGGCACT
GAAAATACACGCACCACCCACCAGGAGCCTTGGGATCATAAACACCCCAGCGTCTTCCC
AGGCCAGAGAAAGTGGAAGAGACCACAAACCGCAGGCAATTGGCAGGCAGTGGGGGAGC
CAGGGCTCTGCAGTCTTAGTCCCATTCCCCTTTGATCTCACAGCAGGCAGGGCACCCAG
GCCTTATAGGAATTCACCCTGGACCATGCCCTAAAATAACCTCACCCCAAATACAATAA
AGGGACGAAGCACTTATAGATACCACAGACACATGTGTTTCATTTTTAGTTTTGTTAAA
AAAAAATTCTGACAAATCAGAAATGGGGGTTCAGGAGTGGTGGTGATGCAAAAGATGGA
AGCCATGGGGTGGGGGCTGTCAGGGGTGGGGGCAGTAGTGTCTCCTT[ct]ACCCCCAC
CCTGGTGTCCTCTCCTGAAGGACAGACGGTCACATTCCAAAATGGGCGAGTCTTCTACC
GTGTCTGTTCAACTGAGAAGAAAACGTAGCATGGTCAGAATAAGGCATGAAAAGGGGAA
AGTGAGGCAGGAACACACGGCACACATGCAGACACTGGTGTACTGCCTGGGTTCAGAGG
ACGGACGTGGGGGTGAGGGAAGGGATGTAATATGATGAGAGAAGACAGAAACCCCACAT
AAAGGTCAGAAAAACATCCCAACACAGCATCAAAGACCAGGGGGCATGAACCAGTCAAG
TGTCCATTATGCATCAGATGCCCATGACCTATGTGATGGGATTTAGGACAAACACACTA
AGGAACAGGGAGGACCTAAAG attccctgaccagggccctgggacccaccgcacagctgagctggcccgagctgaagagt
tgttggagcagcagctggagctgtaccaggccctccttgaagggcaggagggagcctgg
gaggcccaagccctggtgctcaagatccagaagctgaaggaacagatgaggaggcacca
agagagccttggaggaggtgcctaagtttcccccagtgcccacagcaccctccggcact
gaaaatacacgcaccacccaccaggagccttgggatcataaacaccccagcgtcttccc
aggccagagaaagtggaagagaccacaaaccgcaggcaattggcaggcagtgggggagc
cagggctctgcagtcttagtcccattcccctttgatctcacagcaggcagggcacccag
gccttataggaattcaccctggaccatgccctaaaataacctcaccccaaatacaataa
agggacgaagcacttatagataccacagacacatgtgtttcatttttagttttgttaaa
aaaaaattctgacaaatcagaaatgggggttcaggagtggtggtgatgcaaaagatgga
agccatggggtgggggctgtcagGGGTGGGGGCAGTAGTGTCTCCTT[ct]ACCCCCAC
CCTGGTGTCCTCTCCTgaaggacagacggtcacattccaaaatgggcgagtcttctacc
gtgtctgttcaactgagaagaaaacgtagcatggtcagaataaggcatgaaaaggggaa
agtgaggcaggaacacacggcacacatgcagacactggtgtactgcctgggttcagagg
acggacgtgggggtgagggaagggatgtaatatgatgagagaagacagaaaccccacat
aaaggtcagaaaaacatcccaacacagcatcaaagaccagggggcatgaaccagtcaag
tgtccattatgcatcagatgcccatgacctatgtgatgggatttaggacaaacacacta
aggaacagggaggacctaaag

FIGURE 10ccccc

66902 (SEQ ID NO:107)
CTCTGAAGGCTTGCCTGGTGCTCACTCAGCCCGTGAAGAGGGCCTGCTGGTCCTCTGGA
GCCCACAGCCCTTTGTCCAGAGGCGACTCCTAACCTTTAGCAGGCTCTGCCCTAACTTA
CAGTCCCACCATTGTCTGCCCCACATCCTGTCTGCCTGTCTGTGCTCCATTCTGGCCCA
TCCTAGGTGTCTCTGGCTGCAAAGCCTTTCCTGGGCTCAGCCTTCTGCCTTGAACGGGC
CCTGACCATGAGTCCCCATGTGCCCAGCCCATACCTTTTCCCTGTCCAGCCAGGAGCCA
ACACAGGCCTGGAGCATTGCCTGTGGTATGGCCTGCTCGCTGCTGTTCCCGGCCTGGGT
GGTCACGGACATGCAGAGGTGGCACTCAGAGTCTCGCGGCAGCCATTCTCCTGTCGGCG
ACCCTGGAGATGTGAGCATTAGGGGGAAAGCAGGCAAGGCCACCCTACAGAGGTGTTTG
GTTTCTGTCCTCCTTGGTGCATTGCAGTGGGACCACAGAGGGAGAGGGTCATGCAGTGG
CAGGGTAGGGGGAGGAGGAGAGCAGGCATTGGGCTAAGGAG[gt]GGGCAGTGGGCTCA
CTTGGGCCAGCGCTGTCATCCATGGAGCACCGGAGGACGAGGCGGCAGACCAGCTGGGG
CAGCATGCGGCCCAGCAGCGTGTCGAGCAGGATGACGGAGTAGCGCTCAGCCAGGCACT
GGCAGATGCCGCCCGCCACCAGAGGTACCACGCGGCACACCTGGGCCACTGCCACAGCT
AGCGCACCCTGGGGCGGGGGCGGAGAGAGGCCAGCATGGGACCTTCACTTGGCAAGCCT
CCACTCTCTGCCCAGCACCCAGCTGGGCACTTCCTACGCATTCCCTCATTCTCTTCTAG
AAGGGAGGGCAAGGCTATTCACAAATAAGGACACTGGGGATCAGAGAGTCCAGGGGATG
CAGGGGACTCACACAGGGTCACTGAGTGTAGGAGCCAGCTTCAGACCTACGTCTGGCCC
CAAAGGCTCTGGCCCACAGCT ctctgaaggcttgcctggtgctcactcagcccgtgaagagggcctgctggtcctctgga
gcccacagccctttgtccagaggcgactcctaacctttagcaggctctgccctaactta
cagtcccaccattgtctgccccacatcctgtctgcctgtctgtgctccattctggccca
tcctaggtgtctctggctgcaaagcctttcctgggctcagccttctgccttgaacgggc
cctgaccatgagtccccatgtgcccagcccatacctttttccctgtccagccaggagcca
acacaggcctggagcattgcctgtggtatggcctgctcgctgctgttcccggcctgggt
ggtcacggacatgcagaggtggcactcagagtctcgcggcagccattctcctgtcggcg
accctggagatgtgagcattagggggaaagcaggcaaggccaccctacagaggtgtttg
gtttctgtcctccttggtgcattgcagtgggaccacagagggagagggtcatgcagtgg
cagggtagggggaggaggAGAGCAGGCATTGGGCTAAGGAG[gt]GGGCAGTGGGCTCA
CTTGGGCCAgcgctgtcatccatggagcaccggaggacgaggcggcagaccagctgggg
cagcatgcggcccagcagcgtgtcgagcaggatgacggagtagcgctcagccaggcact
ggcagatgccgcccgccaccagaggtaccacgcggcacacctgggccactgccacagct
agcgcaccctggggcgggggcggagagaggccagcatgggaccttcacttggcaagcct
ccactctctgcccagcacccagctgggcacttcctacgcattccctcattctcttctag
aagggagggcaaggctattcacaaataaggacactggggatcagagagtccaggggatg
caggggactcacacagggtcactgagtgtaggagccagcttcagacctacgtctggccc
caaaggctctggcccacagct

FIGURE 10ddddd

66934 (SEQ ID NO:108)
GGAGAGCAGCAGCTGGAGGGCAGGCTGGGAGCGCTTGTGAGGGAGAGGAGCTATGGACG
TCTGCTTCTCTGCCAAGGGAGAGAGTGAGGTAGGCCTGGGCCCGCTGACTTCAGGGTGA
GGCCACAGCTACTGCAGCGCTTTTTATTTATTTATTTATTTACTGAGATGGAGTCTTGC
TCTGTCACCCAGGCTGGAGTGCAGTGGTGCAATCTCGGCTCACTGCAACCTCTGCCTCC
TGGGCTGCAGTGATTCTCCTGCGTTCAAGTAATTCTCCTGCCTCGGCCTTCTGAGTAGT
TGGGATTACAGGCATATGCCACCACACTTGGCTAATTTTTTGTATTTTTAGTAGAAATG
GGGTTTCACCATGTTGGCGAGGCTGGTCTCGAACTCCTGACCTCAAGGATCCTCCTGCC
TCGGCCTCCTAAGGTGCTGGGATTGCAGGTGTGAGCCACCACGTCTGGCCATACTGCAG
CACTTTAAAGGACGGTGTCTTTTTCTTTCTCATAAAAGAGAATAGGACTTTATTAGCA[
tc]TGGTGCAGACATTGTATTACACAGGAATGGGTCCCTAGCTTGCACAACCCCAGCTG
AGCTTTCAGCAGATAAATCACAGCAGAAATAGAATCACCCTAGGACTTTCAATCAAAAG
CTGGAAGTCCACCTTACAGAAAGACAAAAAGAAACCCCTTTTTATATCTTAACAAAGCA
ATAGCTCTCAAGCAGCAGAGCATCTCGAGGAAGAAAGCTTGCCCGGTCGCCATCCCATC
ATGCCAGAGCGTGCAGTGTCCACCCTTGACTACGCTGGGGAATTGCTGATTTTTTGAAA
AAGCTTAACTTAACAATTTCTGATGTCTATCTTTTAGAGTTCTGTATGTTCCCATTTTT
TATTCTTCTGAATTTTGAATTGCAAGTAGCTGTAAAATCCAATCTTTGAGTGCATGGGG
GTGGGTGTGAGGCGGGGCTCAGCTTCAACCCCCTGTCCTGTAAAGCAGTGGCTGGTTTT
TCCTGAGCCCAGCCCTGGGAG ggagagcagcagctggagggcaggctgggagcgcttgtgagggagaggagctatggacg
tctgcttctctgccaagggagagagtgaggtaggcctgggcccgctgacttcagggtga
ggccacagctactgcagcgctttttatttatttatttatttactgagatggagtcttgc
tctgtcacccaggctggagtgcagtggtgcaatctcggctcactgcaacctctgcctcc
tgggctgcagtgattctcctgcgttcaagtaattctcctgcctcggccttctgagtagt
tgggattacaggcatatgccaccacacttggctaattttttgtatttttagtagaaatg
gggtttcaccatgttggcgaggctggtctcgaactcctgacctcaaggatcctcctgcc
tcggcctcctaaggtgctgggattgcaggtgtgagccaccacgtctggccatactgcag
cactttaaaggacggtgtctttTTCTTTCTCATAAAAGAGAATAGGACTTTATTAGCA[
tc]TGGTGCAGACATTGTATTACACAGGAATGGGTCCCTagcttgcacaaccccagctg
agctttcagcagataaatcacagcagaaatagaatcaccctaggactttcaatcaaaag
ctggaagtccaccttacagaaagacaaaaagaaacccctttttatatcttaacaaagca
atagctctcaagcagcagagcatctcgaggaagaaagcttgcccggtcgccatcccatc
atgccagagcgtgcagtgtccacccttgactacgctggggaattgctgattttttgaaa
aagcttaacttaacaatttctgatgtctatcttttagagttctgtatgttcccattttt
tattcttctgaattttgaattgcaagtagctgtaaaatccaatctttgagtgcatgggg
gtgggtgtgaggcggggctcagcttcaaccccctgtcctgtaaagcagtggctggtttt
tcctgagcccagccctgggag

FIGURE 10eeeee

66938 (SEQ ID NO:109)
CAGCCATGGTTCGCGGTGCCCTCGGCTGCCCTGGGCCAGAGCTGGGGCTAGCTTTCACC
TTGTTGAGACCCAGGACTCTGTCCCCCAAGCCTGTCTTCGCCAGCGCCTTGACCCCACC
CCTCATATACTGTGTCCTGGAAAACGTGGACACGGGAGACCACAGCCAGGGCGAGGTAT
CGCCCCTCCATCCCCCCAGGCCCAATGAGAAGCAGTTGGCCAAGGTGATCCAGGTGGCA
GAGGCAGCATCAGACCCAGTCTCCTGTCAGGCACCACCTTGGGTGCCGGTCCCCAGATG
CCCTGGCGGGGAGTGTGCATGCTCCCGGAGCCCCCAGGTCACCCCATGTGAGCCAGGCC
CACAGAGCTTGGCTCTGCAATGCCTGCTGGGCTGCTGCCCATGCTCCACCCCTTCTGGG
AAGCTAAAAGACAGCCCTTCAGTGTCCAGAGACCTGCCTGGCCTTGGAGCCTGGGTTTC
ACATGCCCACCGGGCTGGCAGGGGCACTCAGCTGCCTCCAGCCCCGGCGGTCACCCTGG
CATTGGGTCCATCTAACTGCTCCCCAGTCACAAGGCAGCTGCTCCCCAAGTCTCCCCAA
A[ct]CTGCTGGCCCCTCTAGAAGCCTCTGTCCATTCCTGGAGGACCGAGGGCAGCCTG
CATGCCATCCCGCACACAGCCTTCTGTCTGGGCATCCTGCCTTCACACATGCTGCACAG
GGAGGAAACTCTTATACCACATTCCTTAAGCAGAGACTGAAGCCTGGAGCCAGGCACAT
GGCACATGCTCCCACCCACCCAGGACACACTGCGGTGTGGCTGCCTCCAGGCTGGCCCC
CTAGATTGCgTCTGCTCCTGGCATGGATAACTGGCGCCTTTGCCTGGCCGTTGGGGCAG
TGTTTGCCTTCCCCTGTCGGCAGCAAATATTTACTGTCCTCCGTCTCCAGGACTCTCCA
GGCCTGAGCAGACCCCGGGGGGATGAGTGTGGACTCAGCGGTGCTGAGGGTAGCCCCCT
GCCCTTCGGGTCCTGGTGCCC cagccatggttcgcggtgccctcggctgccctgggccagagctggggctagctttcacc
ttgttgagacccaggactctgtcccccaagcctgtcttcgccagcgccttgaccccacc
cctcatatactgtgtcctggaaaacgtggacacgggagaccacagccagggcgaggtat
cgcccctccatccccccaggcccaatgagaagcagttggccaaggtgatccaggtggca
gaggcagcatcagacccagtctcctgtcaggcaccaccttgggtgccggtccccagatg
ccctggcggggagtgtgcatgctcccggagcccccaggtcaccccatgtgagccaggcc
cacagagcttggctctgcaatgcctgctgggctgctgcccatgctccaccccttctggg
aagctaaaagacagcccttcagtgtccagagacctgcctggccttggagcctgggtttc
acatgcccaccgggctggcaggggcactcagctgcctccagccccggcggtcaccctgg
cattgggtccatctaactgctccccagtcacaAGGCAGCTGCTCCCCAAGTCTCCCCAA
A[ct]CTGCTGGCCCCTCTAGAAGCCTCTGTCCattcctggaggaccgagggcagcctg
catgccatcccgcacacagccttctgtctgggcatcctgccttcacacatgctgcacag
ggaggaaactcttataccacattccttaagcagagactgaagcctggagccaggcacat
ggcacatgctcccacccacccaggacacactgcggtgtggctgcctccaggctggcccc
ctagattgcgtctgctcctggcatggataactggcgcctttgcctggccgttggggcag
tgtttgccttcccctgtcggcagcaaatatttactgtcctccgtctccaggactctcca
ggcctgagcagaccccggggggatgagtgtggactcagcggtgctgagggtagccccct
gcccttcgggtcctggtgccc

FIGURE 10fffff

66984 (SEQ ID NO:110)
GGCAGAGGCAGCATCAGACCCAGTCTCCTGTCAGGCACCACCTTGGGTGCCGGTCCCCA
GATGCCCTGGCGGGGAGTGTGCATGCTCCCGGAGCCCCCAGGTCACCCCATGTGAGCCA
GGCCCACAGAGCTTGGCTCTGCAATGCCTGCTGGGCTGCTGCCCATGCTCCACCCCTTC
TGGGAAGCTAAAAGACAGCCCTTCAGTGTCCAGAGACCTGCCTGGCCTTGGAGCCTGGG
TTTCACATGCCCACCGGGCTGGCAGGGGCACTCAGCTGCCTCCAGCCCCGGCGGTCACC
CTGGCATTGGGTCCATCTAACTGCTCCCCAGTCACAAGGCAGCTGCTCCCCAAGTCTCC
CCAAACCTGCTGGCCCCTCTAGAAGCCTCTGTCCATTCCTGGAGGACCGAGGGCAGCCT
GCATGCCATCCCGCACACAGCCTTCTGTCTGGGCATCCTGCCTTCACACATGCTGCACA
GGGAGGAAACTCTTATACCACATTCCTTAAGCAGAGACTGAAGCCTGGAGCCAGGCACA
TGGCACATGCTCCCACCCACCCAGGACACACTGCGGTGTGGCTGCCTCCAGGCTGGCCC
CCTAGATTGC[ga]TCTGCTCCTGGCATGGATAACTGGCGCCTTTGCCTGGCCGTTGGG
GCAGTGTTTGCCTTCCCCTGTCGGCAGCAAATATTTACTGTCCTCCGTCTCCAGGACTC
TCCAGGCCTGAGCAGACCCCGGGGGGATGAGTGTGGACTCAGCGGTGCTGAGGGTAGCC
CCCTGCCCTTCGGGTCCTGGTGCCCAGCAGGGGTCCAGCCCAGGGAAGAGACTGAGGCC
AGGACAGGCAGTGTTTAAGCCTGAGTTTCTGGGAAAGGTAGCCCTGGGCAGAACTTGGG
CCGAACGTTGGCCAGTGTCTCTCTCCAGCCAGGCTGTGAGGTAGCTGTTTCCAGGATGG
GCACCTTTCCACACCCAGCAATGTGGCCAGGAGCCGCCATTCACGGGTGCGACCAGCAG
ATGGCATCAGAGCCTCACTTT ggcagaggcagcatcagacccagtctcctgtcaggcaccaccttgggtgccggtcccca
gatgccctggcggggagtgtgcatgctcccggagcccccaggtcaccccatgtgagcca
ggcccacagagcttggctctgcaatgcctgctgggctgctgcccatgctccaccccttc
tgggaagctaaaagacagcccttcagtgtccagagacctgcctggccttggagcctggg
tttcacatgcccaccgggctggcaggggcactcagctgcctccagccccggcggtcacc
ctggcattgggtccatctaactgctccccagtcacaaggcagctgctccccaagtctcc
ccaaacctgctggcccctctagaagcctctgtccattcctggaggaccgagggcagcct
gcatgccatcccgcacacagccttctgtctgggcatcctgccttcacacatgctgcaca
gggaggaaactcttataccacattccttaagcagagactgaagcctggagccaggcaca
tggcacatgctcccacccacccaggacacactgcggtgtggcTGCCTCCAGGCTGGCCC
CCTAGATTGC[ga]TCTGCTCCTGGCATGGATAACTGGCGCctttgcctggccgttggg
gcagtgtttgccttcccctgtcggcagcaaatatttactgtcctccgtctccaggactc
tccaggcctgagcagaccccggggggatgagtgtggactcagcggtgctgagggtagcc
ccctgcccttcgggtcctggtgcccagcaggggtccagcccagggaagagactgaggcc
aggacaggcagtgtttaagcctgagtttctgggaaaggtagccctgggcagaacttggg
ccgaacgttggccagtgtctctctccagccaggctgtgaggtagctgtttccaggatgg
gcacctttccacacccagcaatgtggccaggagccgccattcacgggtgcgaccagcag
atggcatcagagcctcacttt

FIGURE 10ggggg 66985 (SEQ ID NO:111)
AGAGACTGAGGCCAGGACAGGCAGTGTTTAAGCCTGAGTTTCTGGGAAAGGTAGCCCTG
GGCAGAACTTGGGCCGAACGTTGGCCAGTGTCTCTCCAGCCAGGCTGTGAGGTAGCT
GTTTCCAGGATGGGCACCTTTCCACACCCAGCAATGTGGCCAGGAGCCGCCATTCACGG
GTGCGACCAGCAGATGGCATCAGAGCCTCACTTTTGATGCACTCCGGCCACCAGCCACG
GGTCCAGGTTCTGGCCACCACCCAGGGTCTGAGCAGCTGCATCCTGCCCCTGCCGGGCA
CTCCCGGGGGCTGTGGGGCCTGTGGGGGCCCTGCCAGACACTCTTGGGGGCTGTGGGGG
GCCCTGCCAGGCACTCCCAGGGACTATGGGGGCTGTGGGGGGCCCTGCTGGGCACTCTG
AAGGGCATGGGGCTTAGGAATGAGAGGAGCTGTCTGATGATGATGGTGGGGGCACTGCA
GAGGCCCCCGGCCTGCTCAGGTCCAGTCTCGGCCCCTAAGTCAAGCCTCAGGCCAGCCT
CTCACCAGCCTGGGTTTCTCAGAGGGCCGGGACAAATGTTCTGGGTCTCTAATATTCCA
AGAAAGCCTCTGGCTGGACTCTGAGCCCCACCTGCGAG[ct]CCCTAGAATCACAGAGA
GCTAGGGTGAGAAGACCAGGGGGACTCCGTCCCACCCTCGTCGTGGCTGAGCCCACTGT
GGCCGGTGGTGGACCAGGCTGTGGCCTTTGCTGAGGGTCCCCAGGGCCCCTGGGGGCTA
CTGAGGCTGGAGGCCAGCGGTGGCCAGGAGGGTCCCTCCCTCAGCCACTCAAGCCAGAA
GGTCGAGTCCTGGTTTCTATGTGAGGAGGGGGCTTCAGGGGCTGGGACCTGGGGGCACC
GAAGGCCTGGAGCTGGGGTCCAGGCGGCTGAGGGTTAGTGCGTTCCCACGCTCCCCTCC
GCCAGCGCCGTGAGGAGAGGGAGGTCCACTCTGGAAAGAATGTTTGAGGGCAGGGGTAG
ACAGGGTCTGGGAACGCGGAG agagactgaggccaggacaggcagtgtttaagcctgagtttctgggaaaggtagccctg
ggcagaacttgggccgaacgttggccagtgtctctccagccaggctgtgaggtagct
gtttccaggatgggcacctttccacacccagcaatgtggccaggagccgccattcacgg
gtgcgaccagcagatggcatcagagcctcacttttgatgcactccggccaccagccacg
ggtccaggttctggccaccacccagggtctgagcagctgcatcctgcccctgccgggca
ctcccgggggctgtggggcctgtgggggccctgccagacactcttgggggctgtggggg
gccctgccaggcactcccagggactatgggggctgtggggggccctgctgggcactctg
aagggcatggggcttaggaatgagaggagctgtctgatgatgatggtgggggcactgca
gaggcccccggcctgctcaggtccagtctcggcccctaagtcaagcctcaggccagcct
ctcaccagcctgggtttctcagagggccgggacaaatgttctgggtctctaatattcca
aGAAAGCCTCTGGCTGGACTCTGAGCCCCACCTGCGAG[ct]CCCTAGAATCACAGAGA
GCTAGGGTGAGAAGACCAGGgggactccgtcccaccctcgtcgtggctgagcccactgt
ggccggtggtggaccaggctgtggcctttgctgagggtccccagggcccctgggggcta
ctgaggctggaggccagcggtggccaggagggtccctccctcagccactcaagccagaa
ggtcgagtcctggtttctatgtgaggagggggcttcaggggctgggacctgggggcacc
gaaggcctggagctggggtccaggcggctgagggttagtgcgttcccacgctcccctcc
gccagcgccgtgaggagagggaggtccactctggaaagaatgtttgagggcaggggtag
acagggtctgggaacgcggag

FIGURE 10hhhhh

67309 (SEQ ID NO:112)
ATGCCCCTCCTAACATGAAAGGGATTTAAGCAAGCCAATTGCTTATTTCTGCCTGGGCC
AGGGACCCCAGTTCCTGACCTTCTCAAGAGATATGAACCTGACCCTTCTGAGTGTAGAA
CTGGGCTGTGGGGCCAGGAGATGTGGGTTTCAATCCCAGGACCCCCACTGGTGGCTGTG
CCATCTTGAGCAAGGCACTTTGTTTCTCCGAGTCTCTATTTCTTCACTGGTAAACAAAG
GCACAAATACCTCTTCACCACATCATAAGGGGATTAAATGATGTAGGAAAAAGGATGTT
GTATAGTCGTGCACATAGTAGGGCAGCAGGTCCAGGAGGTGGACGGCCCATCCAGGGAC
CCAGCGGAGCAGCCACTTCCCCACTTCTCAAGGGTGGTCACCAGGTATGTCCGCAGGGC
TGCCCCCTGCCCATCTCCAAGGCCTGACTGGCTGATCTCAGCTACACATTGGATACTAA
GTCCTAGGGCCAGAGCCAGCAGAGAGGTTTGCCTTACCTTGGAAGTGGACGTAGGTGTT
GAAAGCCAGGGTGCTGTCCACACTGGCTCCC[ga]TCAGGGAGCAGCCAGTCTTCCATC
CTGTCACAGCCTGCATGAACCTGTCAATCTTCTCAGCAGCAACATCCAGTTCTGTGAAG
TCCAGAGAGCGTGGGAGGACCACAGGGGTATAGAGAGCCAGGCCCTGCACAAACGGCTG
CTTCAGGTGCAGGCCTGGGGCTGTGAACACGCCCACCACCGTGGACAGCAGCAGCTGGG
CCTGGCTATCAGCCCTGCCCTGGGCCACTAGCAGGCCCTGTACAGCCTGCAGGGCAGAC
AGGACCTTGTGCGCATCCAGCCGGGAGGTGCAGTTCTTGTCCTTCCAAGGAACACCCAG
GATTGCCTGTAGCCTGTCAGCTGTGTGGTCCAAGGCTCCCAGATAGAGAGAGGCCAGGG
TGCCAAAGACAGCCGTTGGGGAGAGGACGGTGGCCCCATGGACCACGCCCCATAGCTCA
CTGTGCATGCCATATATACGG atgcccctcctaacatgaaagggatttaagcaagccaattgcttatttctgcctgggcc
agggaccccagttcctgaccttctcaagagatatgaacctgacccttctgagtgtagaa
ctgggctgtggggccaggagatgtgggtttcaatcccaggacccccactggtggctgtg
ccatcttgagcaaggcactttgtttctccgagtctctatttcttcactggtaaacaaag
gcacaaatacctcttcaccacatcataaggggattaaatgatgtaggaaaaaggatgtt
gtatagtcgtgcacatagtagggcagcaggtccaggaggtggacggcccatccagggac
ccagcggagcagccacttccccacttctcaagggtggtcaccaggtatgtccgcagggc
tgccccctgcccatctccaaggcctgactggctgatctcagctacacattggatactaa
gtcctagggccagagccagcagagaggtttgccttaccttggaagtggacgtaggtgtt
gaAAGCCAGGGTGCTGTCCACACTGGCTCCC[ga]TCAGGGAGCAGCCAGTCTTCCATC
CTGTCacagcctgcatgaacctgtcaatcttctcagcagcaacatccagttctgtgaag
tccagagagcgtgggaggaccacaggggtatagagagccaggccctgcacaaacggctg
cttcaggtgcaggcctggggctgtgaacacgcccaccaccgtggacagcagcagctggg
cctggctatcagccctgccctgggccactagcaggccctgtacagcctgcagggcagac
aggaccttgtgcgcatccagccgggaggtgcagttcttgtccttccaaggaacacccag
gattgcctgtagcctgtcagctgtgtggtccaaggctcccagatagagagaggccaggg
tgccaaagacagccgttggggagaggacggtggccccatggaccacgccccatagctca
ctgtgcatgccatatatacgg

FIGURE 10iiiii

67320 (SEQ ID NO:113)
AGGAGAGGAAGGGCGTGGAAACTGGAATGATCCTAGTGGGGTGTCTTGGCATCTCTTGG
CCTCATTTTCCCCATCTGAACCATGAAGCTAAAACTAGGGGATGTGGATTAAATGGTTC
CTACAACTACTTGCAAGGAGACCACTCTGTGTGGTTGCAAAGAACACTTTGAGAAGCTG
TGTGGGAAAGTTTCCTTCCTAGCAGGGTAGACTCAGCTAACTGCAGGTCATGTGGCCAT
TGTGGATGGGTTGGGAGCTCAAGTTTGGGGCAGAAGGGAATTTTTTTTGGCAGCAGAGT
GGCAAGCCCTGCCGCCAGGCAAACTCTGCTCTTCCTCATCCTCAGAAGCACTTGCTCAC
TCTGCTAAATCAAAGTGAAACGCATGTTTACAGAATATTGGTCCAAAAGGGTCTCAGCA
TCTCCCACTACCCAGGGTGGCAGAGCCTCGGGCCGGCCTTGCTCCCCAAGAAGGGCTGA
CTGGGGCTCTGTCCCCTGCCCCAGGGCTCGAGGTAGTGTTTACAGCCCTCATGAACAGC
AAAGGCGTGAGCCTCTTCG[ag]CATCATCAACCCTGAGATTATCACTCGAGATGTGAG
TACAAAGCCCCCCTCACCAGCCCCTGTTCCTGGGGAGAGAGGCCCAGACAGGATTCCTG
GGGTGACTGGGGGCTGTTGGGGAGACAGACAGAGGGGCCTCTACCAGCTTGGCTCCCTC
CTGGTGGCCTGGGAGTCAGCCCAGCTCGCCCCTCTCTCCTACTGCCCCTCCCTTCAGGG
CTTCCTGCTGCTGCAGATGGACTTTGGCTTCCCTGAGCACCTGCTGGTGGATTTCCTCC
AGAGCTTGAGCTAGAAGTCTCCAAGGAGGTCGGGATGGGGCTTGTAGCAGAAGGCAAGC
ACCAGGCTCACAGCTGGAACCCTGGTGTCTCCTCCAGCGATGGTGGAAGTTGGGTTAGG
AGTACGGAGATGGAGATTGGCTCCCAACTCCTCCCTATCCTAAAGGCCCACTGGCATTA
AAGTGCTGTATCCAAGAGCTG aggagaggaagggcgtggaaactggaatgatcctagtggggtgtcttggcatctcttgg
cctcattttccccatctgaaccatgaagctaaaactaggggatgtggattaaatggttc
ctacaactacttgcaaggagaccactctgtgtggttgcaaagaacactttgagaagctg
tgtgggaaagtttccttcctagcagggtagactcagctaactgcaggtcatgtggccat
tgtggatgggttgggagctcaagtttggggcagaagggaattttttttggcagcagagt
ggcaagccctgccgccaggcaaactctgctcttcctcatcctcagaagcacttgctcac
tctgctaaatcaaagtgaaacgcatgtttacagaatattggtccaaaagggtctcagca
tctcccactacccagggtggcagagcctcgggccggccttgctccccaagaagggctga
ctggggctctgtcccctgccccagggctcgaggTAGTGTTTACAGCCCTCATGAACAGC
AAAGGCGTGAGCCTCTTCG[ag]CATCATCAACCCTGAGATTATCACTCGAGATGTGAG
TACAAAGCCcccctcaccagcccctgttcctggggagagaggcccagacaggattcctg
gggtgactgggggctgttggggagacagacagaggggcctctaccagcttggctccctc
ctggtggcctgggagtcagcccagctcgcccctctctcctactgcccctcccttcaggg
cttcctgctgctgcagatggactttggcttccctgagcacctgctggtggatttcctcc
agagcttgagctagaagtctccaaggaggtcgggatggggcttgtagcagaaggcaagc
accaggctcacagctggaaccctggtgtctcctccagcgatggtggaagttgggttagg
agtacggagatggagattggctcccaactcctccctatcctaaaggcccactggcatta
aagtgctgtatccaagagctg

FIGURE 10jjjjj

67321 (SEQ ID NO:114)
TTGGATAGACTGGGGGAAATAAGTCCTGTGGGACCTCCTGCCTTAAAGAAAGCAGGCGG
AGGGCCCTAAAGGAAATCAGGCAACCAGACCAAAAGAATGTGGACCAGGTGGTCCATGC
TGTGTCTCTTGTGACCCTTCTTCTCCCTGCCATGTCTTTTGGGAGAGCCCTTGTGTTGC
AAAAATGAGAGTGTGGTGGTATGGATTGGGGTTTAGGCAGAACAGTACTGGCCAAGCAG
CGCCTCCCTGGACCTCAATTTTCCCTCTGTGGAATGGGCTAGCAATCCTGGGCCTCCCC
AGGGCGAAGGAAAGACCACTCAGGAAGGGCACCGTCTGGGGCAGGAAAACGGAGTGGGT
TGGATGTATTTTTTTCACGGATGGGCATGAGGATGAATGCTTGTCCAGGCCGTGCAGCA
TCTGCCTTGTGGGTCACTTCTGTGCTCCAGGGAGGACTCACCATGGGCATTTGATTGGC
AGAGCAGCTCCGAGTCCGTCCAGAGCTTCCTGCAGTCAATGATCACCGCTGTGGGCATC
CCTGAGGTCATGTCTC[ga]TAAGTGTGGGCTGGAGGGGAAACTGGGTGCCGAGGCTGA
CAGAGCTTCCCATTTCACCTTGTGGGCCCTTCCCAGGCAGAGCTTCAGGTGCCCCTCTT
CCCAGTCATTGATACTTAGCGGTCCTGGCCCCCTTTCCTCTCCCTGCTGGTGGTATTGC
ACGCCAATGACTCGGCCAGATGCCCAGACCCCTGTTCTTGGTTTACCTGCAGAATATTA
TCTTTGCCACCCCGCGGGATGGCTCAACCCACTTTCAGGATGCAGGTCTCCTAATAGCA
ACCTGATATAGCAGAAAGACCCCTGGGCTGGGAGTCTGAGACCTAGTTCTAGCCCAGCC
CTGAACCTCAGTTTCCCTTTCTGTGAAACAAGAATGTTGAACTTGATGATTCCCAATTT
TCCTTTTGACCTTGAAATGGTAGAATATTTATCCCTTTGAGGTGACTCGGATGGTAGAC
TCTCAGACACCATAGCACACG ttggatagactgggggaaataagtcctgtgggacctcctgccttaaagaaagcaggcgg
agggccctaaaggaaatcaggcaaccagaccaaaagaatgtggaccaggtggtccatgc
tgtgtctcttgtgacccttcttctccctgccatgtcttttgggagagcccttgtgttgc
aaaaatgagagtgtggtggtatggattggggtttaggcagaacagtactggccaagcag
cgcctccctggacctcaattttccctctgtggaatgggctagcaatcctgggcctcccc
agggcgaaggaaagaccactcaggaagggcaccgtctggggcaggaaaacggagtgggt
tggatgtatttttttcacggatgggcatgaggatgaatgcttgtccaggccgtgcagca
tctgccttgtgggtcacttctgtgctccagggaggactcaccatgggcatttgattggc
agagcagctccgagtccgtccagagcttcctgcagtcaatgatcacCGCTGTGGGCATC
CCTGAGGTCATGTCTC[ga]TAAGTGTGGGCTGGAGGGGAAACTGGGTGccgaggctga
cagagcttcccatttcaccttgtgggcccttcccaggcagagcttcaggtgcccctctt
cccagtcattgatacttagcggtcctggccccctttcctctccctgctggtggtattgc
acgccaatgactcggccagatgcccagacccctgttcttggtttacctgcagaatatta
tctttgccaccccgcgggatggctcaacccactttcaggatgcaggtctcctaatagca
acctgatatagcagaaagacccctgggctgggagtctgagacctagttctagcccagcc
ctgaacctcagtttccctttctgtgaaacaagaatgttgaacttgatgattcccaattt
tccttttgaccttgaaatggtagaatatttatccctttgaggtgactcggatggtagac
tctcagacaccatagcacacg

FIGURE 10kkkkk

67325 (SEQ ID NO:115)
GGGGCAGGGCTGGTGGTCAGCTGGGGCGGGGTGGGAGCTGGAGGTCCGTGGTCACCAGC
TGCCCTGACTAATGTCGTTACTTGAATATAACCCTGTGAAGGCAGGAACCACGTCTGTC
TGGTTCACTTCCCACGGTGGTTGAGACATAGTGGGCACTCCGGAAGTATTTGTTGAATG
AGTGAAAGCCCCGCTGGGGGAAACTGGGTACAGCTCTTTCCTCAGTTTCCCCATCTGCA
CTCTGGGCTGAATGCTGGGGCTCCTCCCAATCTCCCTGAAGCTGGACCTGAGCCCAGTA
GGGACACACAGGGTCCAGCCAGCGTCCTGGCTTCCTCCAGGGTCATTTCATCTACAAGA
ATGTCTCAGAGGACCTCCCCCTCCCCACCTTCTCGCCCACACTGCTGGGGGACTCCCGC
ATGCTGTACTTCTGGTTCTCTGAGCGAGTCTTCCACTCGCTGGCCAAGGTAGCTTTCCA
GGATGGCCGCCTCATGCTCAGCCTGATGGGAGACGAGTTCAAGGTGAGTGGGTGGGGCT
GGGCTGCTAGGG[ga]ATCCAGATGGCATGTGGTATGTGTGTGTGTGCACACGCATGGG
GAGGAGGGAGGAAACTCGGAAACTTGGTGGTGGGCAAAAGAACTAAGCTGGAGCAATAG
CAGTGAAGTCCAGACTGGGCACAGTGGCTCACACCTGTAATCCCAATCCTTTGGGAGGC
TGAGATGTAGCAGGACGAACCGCAGACAAAACTCCTCAGACACTGAGTTAAAGAAGGAA
AGAGTTTATTCAGCCGGGAGCATGGGTAAGACTCCTGTCTCAAGAGCGGAGCTCTCCGA
GTGAGCAATTCCTGTCCCTTTTAAGGGCTCACAACTCTAAGGGGGTCTGCATGAGAGGG
TCGTGATCTATTGAGCAAGTAGCAGGTACGTGACTGGGGGCTGCATGCACCGGTAATCA
GAACGAAACAGAACAGGACAGGGATTTTTACAATGCTCTTTCATGCAATGTCTGGAATC
TATAGATAACATAACTGGTTA ggggcagggctggtggtcagctggggcggggtgggagctggaggtccgtggtcaccagc
tgccctgactaatgtcgttacttgaatataaccctgtgaaggcaggaaccacgtctgtc
tggttcacttcccacggtggttgagacatagtgggcactccggaagtatttgttgaatg
agtgaaagccccgctgggggaaactgggtacagctctttcctcagtttccccatctgca
ctctgggctgaatgctggggctcctcccaatctccctgaagctggacctgagcccagta
gggacacacagggtccagccagcgtcctggcttcctccagggtcatttcatctacaaga
atgtctcagaggacctccccctccccaccttctcgcccacactgctgggggactcccgc
atgctgtacttctggttctctgagcgagtcttccactcgctggccaaggtagctttcca
ggatggccgcctcatgctcagcctgatgggagacgagtTCAAGGTGAGTGGGTGGGGCT
GGGCTGCTAGGG[ga]ATCCAGATGGCATGTGGTATGTGTGTGTGTGCAcacgcatggg
gaggagggaggaaactcggaaacttggtggtgggcaaaagaactaagctggagcaatag
cagtgaagtccagactgggcacagtggctcacacctgtaatcccaatcctttgggaggc
tgagatgtagcaggacgaaccgcagacaaaactcctcagacactgagttaaagaaggaa
agagtttattcagccgggagcatgggtaagactcctgtctcaagagcggagctctccga
gtgagcaattcctgtcccttttaagggctcacaactctaagggggtctgcatgagaggg
tcgtgatctattgagcaagtagcaggtacgtgactgggggctgcatgcaccggtaatca
gaacgaaacagaacaggacagggatttttacaatgctctttcatgcaatgtctggaatc
tatagataacataactggtta

FIGURE 10llll1

67329 (SEQ ID NO:116)
GCAAATCCATAGAGACAGAAAGCACATTTATGGTTGCCAGGAGCTGGGAAAGGGCAGGA
TGGGGAATGACTGTTTATTGGATGTGGGGCTCTATTTTGGGGTGATGAGAATGTTCTGG
AATTAAATTCATGGCTGCATAACACTGTGAACATACTAAATGCCCCTGAATTGTACACT
TTAAAATGGTTAAAGTGGCAAGTTTTCACTAAGCAGTAAATTAAATTCTACTACAATTT
TAAAAAGACTAAAAAATAATTTAAAAAAGATTAAATGAGATAACGCAAAAAAGCATTAT
CTCGAAAATACAGCTGATATTAGTATAATTCTTACTAAGTTTTAAGAGTCTAAGGTGCA
GGATTCTAAGTTTAAAGGGATAGGCTCTTTTGGTTTTTTGGTTTAGTTATTTGGTTTTT
TTTTTTAATCCATTATCCCCACCCTTGGGAGGCCCCCAGCACCCAGTCTGCACTAGAGG
ATGGGGCCCACCTCCCTTTTCTCTCCAGGCCCAGCCACTGACCACCAGTACCCTGGCCA
GGGGCACCCT[tc]GGTCATTGCCCTCCGTGGCCCAAGGAAGGGAACAGAAACAACAGC
CAAGAAGACAATAGCCGCCGGGAAGTCCTCACATTTCTGGAGAAATAGAGCCCATTAAT
GAATGAAGTTCCTCCAGCCTGATCGGAGGACGGGGTGCTGGGGAGGCCTGGGCTAAAGG
GCTCACCTCCAGCCCCCACCCTGGCAGGGCCGATGGTACATGCTCACTCAGTGAGGGGG
CTCCAGAGGTCTGTGGGTACGAACCCAAGGGCTGGTGCCCAGGGGCAATCAGCTTATGT
CTCTGAGCCTTGGGAAACAGTGAGGGTCAGCCCGGCTCCCCACGTGCTTCTGGGCAGCT
TTGGTATTGGAGCAGGTGCAAACTCGGGACTAGGGCAGGACCCCCTGAGAGGCGACTGA
GCAAGGCCATCCCGACTCATGTTTCCTTGGCCCTGCCCGGGGCACAGCATCCTGCCCAC
ATCCCTGCAGCCCTGGCTCCT gcaaatccatagagacagaaagcacatttatggttgccaggagctgggaaagggcagga
tggggaatgactgtttattggatgtggggctctattttggggtgatgagaatgttctgg
aattaaattcatggctgcataacactgtgaacatactaaatgcccctgaattgtacact
ttaaaatggttaaagtggcaagttttcactaagcagtaaattaaattctactacaattt
taaaaagactaaaaaataatttaaaaaagattaaatgagataacgcaaaaaagcattat
ctcgaaaatacagctgatattagtataattcttactaagttttaagagtctaaggtgca
ggattctaagtttaaagggataggctcttttggttttttggtttagttatttggttttt
ttttttaatccattatccccacccttgggaggcccccagcacccagtctgcactagagg
atggggcccacctcccttttctctccaggcccagccactgaccaCCAGTACCCTGGCCA
GGGGCACCCT[tc]GGTCATTGCCCTCCGTGGCCCAAGGaagggaacagaaacaacagc
caagaagacaatagccgccgggaagtcctcacatttctggagaaatagagcccattaat
gaatgaagttcctccagcctgatcggaggacggggtgctggggaggcctgggctaaagg
gctcacctccagcccccaccctggcagggccgatggtacatgctcactcagtgaggggg
ctccagaggtctgtgggtacgaacccaagggctggtgcccaggggcaatcagcttatgt
ctctgagccttgggaaacagtgagggtcagcccggctccccacgtgcttctgggcagct
ttggtattggagcaggtgcaaactcgggactagggcaggaccccctgagaggcgactga
gcaaggccatcccgactcatgtttccttggccctgcccggggcacagcatcctgcccac
atccctgcagccctggctcct FIGURE 10mmmmm 67330 (SEQ ID NO:117)
GGGAACTAGTGCCGCCCCAGGGCCCCAAGGTGGGCGGTTCGGTGATTCAGAGAGGGCAG
CTCTGTGTTAGGACACACTGGGGCCAGCCAGGAAGGGTGGAAAAGATAGGGACCAGCGT
GAGCATAGAGGCTAAGGGACCATGGGAGCTCCAAGCGCGCTCACAGTGGGGACCAGGTC
CTGGGGGCTGGGGACACCAGGGAGGTGAAATACCCCTCCAGCGGGTAGGGAGGGTGGGC
AGAGGAGGGCCAGCGGCCAGGCATTTGGGAGGGGCTCCTGCTCTTTGGGAGAGGTGGGG
GGCCGTGCCTGGGGATCCAAGTTCCCCTCTCTCCACCTGTGCTCACCTCTCCTCCGTCC
CCAACCCTGCACAGGCAAGATCGTGGACGCCGTGATTCAGGAGCACCAGCCCTCCGTGC
TGCTGGAGCTGGGGGCCTACTGTGGCTACTCAGCTGTGCGCATGGCCCGCCTGCTGTCA
CCAGGGGCGAGGCTCATCACCATCGAGATCAACCCCGACTGTGCCGCCATCACCCAGCG
GATGGTGGATTTCGCTGGC[ag]TGAAGGACAAGGTGTGCATGCCTGACCCGTTGTCAG
ACCTGGAAAAAGGGCCGGCTGTGGGCAGGGAGGGCATGCGCACTTTGTCCTCCCCACCA
GGTGTTCACACCACGTTCACTGAAAACCCACTATCACCAGGCCCCTCAGTGCTTCCCAG
CCTGGGGCTGAGGAAAGACCCCCCCAGCAGCTCAGTGAGGGTCTCACAGCTCTGGGTAA
ACTGCCAAGGTGGCACCAGGAGGGGCAGGGACAGAGTGGGGCCTTGTCATCCCAGAACC
CTAAAGAAAACTGATGAATGCTTGTATGGGTGTGTAAAGATGGCCTCCTGTCTGTGTGG
GCGTGGGCACTGACAGGCGCTGTTGTATAGGTGTGTAGGGATGGCCTCCTGTCTGTGAG
GACGTGGGCACTGACAGGCGCTGTTCCAGGTCACCCTTGTGGTTGGAGCGTCCCAGGAC
ATCATCCCCCAGCTGAAGAAG gggaactagtgccgccccagggccccaaggtgggcggttcggtgattcagagagggcag
ctctgtgttaggacacactggggccagccaggaagggtggaaaagatagggaccagcgt
gagcatagaggctaagggaccatgggagctccaagcgcgctcacagtggggaccaggtc
ctgggggctggggacaccagggaggtgaaatacccctccagcgggtagggagggtgggc
agaggagggccagcggccaggcatttgggaggggctcctgctctttgggagaggtgggg
ggccgtgcctggggatccaagttcccctctctccacctgtgctcacctctcctccgtcc
ccaaccctgcacaggcaagatcgtggacgccgtgattcaggagcaccagccctccgtgc
tgctggagctgggggcctactgtggctactcagctgtgcgcatggcccgcctgctgtca
ccaggggcgaggctcatcaccatcgagatcaaccccgactgtgccgccatCACCCAGCG
GATGGTGGATTTCGCTGGC[ag]TGAAGGACAAGGTGTGCATGCCTGACCCgttgtcag
acctggaaaaagggccggctgtgggcagggagggcatgcgcactttgtcctccccacca
ggtgttcacaccacgttcactgaaaacccactatcaccaggcccctcagtgcttcccag
cctggggctgaggaaagacccccccagcagctcagtgagggtctcacagctctgggtaa
actgccaaggtggcaccaggaggggcagggacagagtggggccttgtcatcccagaacc
ctaaagaaaactgatgaatgcttgtatgggtgtgtaaagatggcctcctgtctgtgtgg
gcgtgggcactgacaggcgctgttgtataggtgtgtagggatggcctcctgtctgtgag
gacgtgggcactgacaggcgctgttccaggtcacccttgtggttggagcgtcccaggac
atcatcccccagctgaagaag

FIGURE 10nnnnn

67340 (SEQ ID NO:118)
AGCTTCCTGAGTAGCTGGGATTACAGGCACTCACCTCCACGCCCAGCTAACTTTTGTAT
TTTTAGTACAGATGGGGTTTCACCATGTTGGTCAGGCTGGTCTCGAACTCCTGACCTCG
TGATCCGCCCTCCTCGCCTCCCAAAGTGCTGTGATTACAGGAGTGAGCCACCGCTCCTG
GCCAGAAATCTCTTCTTTATTATGTCTACTGTCCGTTATCCAACTCCAGAAGGTAAGAA
CCTCCACTGATACATAAGGACTTGTATACCCCACGTGCCTGCAACAGTGCTTGGCACCT
AGTAGGCATACCAAAATATATAAATGTTGAACAAATGAAGAAAGTTAAAGTAAAACTAG
AGGTCCAAAAATATCACAAAAGCCATCTATGGTCGCCTTTTCCCTACCTGATTTTGCTG
AGTGGCCTTACTTTTCAGTCCTCTACACAGCTGGAACATTAATGAACACAGAGGGGGAA
GAAGTGTGTTTACTCTAGGATCACCTCTCAATGGGTCACTTGGCAAGGGCATCTTTGCT
TCTTCGTCAGCTCCTTTTGACA[ct]GGGGGTGAAGGGTTTTCTGCACCACACTTTGAC
CACAAGCATCACCAATTTCACTGAACCCAACAGAAATTTGGACCCTCTGGGGGCTCTCT
GCGTGGCAGGGCCCTTTTCTTTTTCTTTGGGCTTAGGCTGCAATTTGAAACACCACTTT
CCTGAGCCAGCATCCCCCTTGCAGCGCTGTCACAGGGAGGCTTAGGCAGCCACGTGGAA
GCCACCTACCCCGACCTTTGGCAGAATTTCCAAACACAACACAGTAGCTTTAAGTTGAT
TAATTTGGAACTCTGACCTTGGCCCCAAAAGGTAAGAATACATAACAAGGTATTTTATT
CTCAAAATGTGTCAGGATAAGAAGCACTTCTGTAAATCGACCTTTTTAAAATAGATATA
ATTAGATTTGCAGTTGGGGGCAGTAAAGAAAGGGTCTGAACAGTGGATAACATGTTGAG
AGGTTAATTATTAATGGGCAG agcttcctgagtagctgggattacaggcactcacctccacgcccagctaacttttgtat
ttttagtacagatggggtttcaccatgttggtcaggctggtctcgaactcctgacctcg
tgatccgccctcctcgcctcccaaagtgctgtgattacaggagtgagccaccgctcctg
gccagaaatctcttctttattatgtctactgtccgttatccaactccagaaggtaagaa
cctccactgatacataaggacttgtataccccacgtgcctgcaacagtgcttggcacct
agtaggcataccaaaatatataaatgttgaacaaatgaagaaagttaaagtaaaactag
aggtccaaaaatatcacaaaagccatctatggtcgccttttccctacctgattttgctg
agtggccttacttttcagtcctctacacagctggaacattaatgaacacagagggggaa
gaagtgtgtttactctaggatcacctctcaatgggtcacttggcaagggcATCTTTGCT
TCTTCGTCAGCTCCTTTTGACA[ct]GGGGGTGAAGGGTTTTCTGCACCACACTTTGac
cacaagcatcaccaatttcactgaacccaacagaaatttggaccctctgggggctctct
gcgtggcagggcccttttctttttctttgggcttaggctgcaatttgaaacaccacttt
cctgagccagcatcccccttgcagcgctgtcacagggaggcttaggcagccacgtggaa
gccacctaccccgacctttggcagaatttccaaacacaacacagtagctttaagttgat
taatttggaactctgaccttggccccaaaaggtaagaatacataacaaggtattttatt
ctcaaaatgtgtcaggataagaagcacttctgtaaatcgacctttttaaaatagatata
attagatttgcagttgggggcagtaaagaaagggtctgaacagtggataacatgttgag
aggttaattattaatgggcag

FIGURE 10ooooo

67342 (SEQ ID NO:119)
GCAGCCTGTTGTGCCTTGTGCCTCGAAGAGGTTTGGTATCTGCCAGTTTCTCCCTCGCT
GTTTTTATGGCTTTCAAAAGCAGAAGTAGGAGGCTGAGAAATTTCTCTGTTGAATACCT
GATTTCACAATCAAGTTAAAGGAAAGGGGAAAAGAGTATTGGTGGAAGCTTCTTAGGGG
AGGGGACTAATAAACTGAGATAATTCTCTGGTTCATGGAAGGGCAAGGAGTAGCAAACT
ATGACACATTTTGCAAATGTATCACCATGCAAATATGCATTGTTTTCCTGACAATCGTT
GTGCAGTTGATGTCCACATTAAAATACTGGATTTTCCCACGTTAGAAGAATGTTTAAAT
TTAGTATATGTGGGACAAAGTGGAAGACACACAGATTTATACATGCACATACTTTTCTT
CATTCACTTCTTTGTACTTAAGTTTAGGAATCTTCCCACTTACAGATGGATAAATGGGT
ACAATGAAGGGCCAATAGCCCTCCCTGTCTGTATTGAGGGTGTGGGTCTCTACCTTGGG
TGCTGTTCTCTGCCTC[ag]GGAGCTCTCTGTCAATTGCAGGAGCCTCTGAGGAGAAAA
TTGACCTTTCTTGGCTGGGGCAGAGAACATACGGTATGCAGGGTTCAGGCTCCTGACGG
AGTTGGGGCAACCCTGGAGATAAGCTCACACAACCCTGCAAGACCAGGTGCTGTTACCC
TAGCCAATCTCATGGATGAACCAGATCAATGCCAGATGAGCTCTGCCTAAAATGATTTT
TTGGTGAACTCTGAAAAGTGGAATATTGTTTCTGTAAGAATATCCATCTGAGACTCTAT
CTCTTGGTAATACCAACCAAGAGTTATCAGTTTCTCTTTAACCGAGACACCAGCAAAGT
GCCTGCTCCAGGGTACTGCCCAGGGGAGCCCTCCATTTGTAGAATGAATGAGAGTCCAG
GTTATGAACAGTGCCTGGAGTGTAGGAACACCCTCCTTTGCCTCTTTGACAGGTCTGCA
TCATAACACTTTTTTTTTTTT gcagcctgttgtgccttgtgcctcgaagaggtttggtatctgccagtttctccctcgct
gtttttatggctttcaaaagcagaagtaggaggctgagaaatttctctgttgaatacct
gatttcacaatcaagttaaaggaaaggggaaaagagtattggtggaagcttcttagggg
aggggactaataaactgagataattctctggttcatggaagggcaaggagtagcaaact
atgacacattttgcaaatgtatcaccatgcaaatatgcattgttttcctgacaatcgtt
gtgcagttgatgtccacattaaaatactggattttcccacgttagaagaatgtttaaat
ttagtatatgtgggacaaagtggaagacacacagatttatacatgcacatacttttctt
cattcacttctttgtacttaagtttaggaatcttcccacttacagatggataaatgggt
acaatgaagggccaatagccctccctgtctgtattgagggtgtGGGTCTCTACCTTGGG
TGCTGTTCTCTGCCTC[ag]GGAGCTCTCTGTCAATTGCAGGAGCCTCTGAGgagaaaa
ttgacctttcttggctggggcagagaacatacggtatgcagggttcaggctcctgacgg
agttggggcaaccctggagataagctcacacaaccctgcaagaccaggtgctgttaccc
tagccaatctcatggatgaaccagatcaatgccagatgagctctgcctaaaatgatttt
ttggtgaactctgaaaagtggaatattgtttctgtaagaatatccatctgagactctat
ctcttggtaataccaaccaagagttatcagtttctctttaaccgagacaccagcaaagt
gcctgctccagggtactgcccaggggagccctccatttgtagaatgaatgagagtccag
gttatgaacagtgcctggagtgtaggaacaccctcctttgcctctttgacaggtctgca
tcataacacttttttttttttt

FIGURE 10ppppp

67356 (SEQ ID NO:120)
GAAATACCATATTGCATCAAACCTAAGACGCCATCAAGAATAAAAGGCACTTTTCTTTA
CATTACTACCCAGACGCAAACAGAGCTGCCAATTCAACCATGATGAGTCACCAGTTATA
GGAGGTTTGATTTCAGAGCTATAAGAGTGTATGTCCTAGAACCAATGAGCTATCGTAGA
TCCAAGAATCTACATATCTGAGTTGGAAGGGCTGCCAGCCCTTGGGGCATGATCTTCCA
TCCTCAAAGACTTCTTCAGATTTGAAGAGCAAGGGGAAGGACTGCCTGGTGTCTTAACG
AAGTGTCTCCTACTCAGCCAGTAGGACCCTGAGCACTCTGGGGCATCCTGGCATCTGTT
GCCCAGCTAATGGTTCCCACCAGTCACCCGTCCCAACCCATGCCACCATCCAGTGCCCA
GCAGCTCTCAGAGATACTCACTTACTACAGGAGACACACTCGTTTTCTCTTAGAAAGAA
ACCTGCATGGCAGGTGCACACGGTGTTCTGTTTCTCCTGGCCTGTAGGGAGAAGTGCGG
CACAGCTAAAGGAG[ag]AGCGCCTGCACCCCCACCCCACAGGACAGAGGAAGTGACGA
GGGACAGGGTGGGGGCGGCCAGAGAGGAGTTGGTTGTCAGACCCACAGAATACAGGAGG
GGGAAGGAAAGGAAGTGCCACCGCATGGGGAAGGGGCCAACCCCTGGGGTGGGGAGAGG
GCTTGGCCTCAGGAGAGCTGCGCTCACAGGAGAGGTGCACGGTCCCATTGAGGCAGAGG
CTGCAATTGAAGCACTGGAAAAGGTTTTCACTCCAATAATGCCGGTACTGGTTCTTCCT
GCAGCCACACACGGTGTCCCGGTCCACTGTGCAAGAAGAGATCTCCACCTGACCCATTT
CTGGTGAGGGGAGAAGATGGGGTATGAGTCCTGCATCCTCCTGTCCCTGCATCCCCTTC
CTGACATACCCCTAAGTGTGTGTCTCTGTAATACACACTCACATCCATGCAGTGTCCCA
CCAAAACACACACCTTCCTGC gaaataccatattgcatcaaacctaagacgccatcaagaataaaaggcacttttcttta
cattactacccagacgcaaacagagctgccaattcaaccatgatgagtcaccagttata
ggaggtttgatttcagagctataagagtgtatgtcctagaaccaatgagctatcgtaga
tccaagaatctacatatctgagttggaagggctgccagcccttggggcatgatcttcca
tcctcaaagacttcttcagatttgaagagcaaggggaaggactgcctggtgtcttaacg
aagtgtctcctactcagccagtaggaccctgagcactctggggcatcctggcatctgtt
gcccagctaatggttcccaccagtcacccgtcccaacccatgccaccatccagtgccca
gcagctctcagagatactcacttactacaggagacacactcgttttctcttagaaagaa
acctgcatggcaggtgcacacggtgttctgtttctcctggcctgtagggagaagTGCGG
CACAGCTAAAGGAG[ag]AGCGCCTGCACCCCCACCCcacaggacagaggaagtgacga
gggacagggtgggggcggccagagaggagttggttgtcagacccacagaatacaggagg
gggaaggaaaggaagtgccaccgcatggggaaggggccaacccctggggtggggagagg
gcttggcctcaggagagctgcgctcacaggagaggtgcacggtcccattgaggcagagg
ctgcaattgaagcactggaaaaggttttcactccaataatgccggtactggttcttcct
gcagccacacacggtgtcccggtccactgtgcaagaagagatctccacctgacccattt
ctggtgaggggagaagatggggtatgagtcctgcatcctcctgtccctgcatccccttc
ctgacatacccctaagtgtgtgtctctgtaatacacactcacatccatgcagtgtccca
ccaaaacacacaccttcctgc

FIGURE 10qqqqq

67363 (SEQ ID NO:121)
AGATCCAGAAGCTGAAGGAACAGATGAGGAGGCACCAAGAGAGCCTTGGAGGAGGTGCC
TAAGTTTCCCCCAGTGCCCACAGCACCCTCCGGCACTGAAAATACACGCACCACCCACC
AGGAGCCTTGGGATCATAAACACCCCAGCGTCTTCCCAGGCCAGAGAAAGTGGAAGAGA
CCACAAACCGCAGGCAATTGGCAGGCAGTGGGGGAGCCAGGGCTCTGCAGTCTTAGTCC
CATTCCCCTTTGATCTCACAGCAGGCAGGGCACCCAGGCCTTATAGGAATTCACCCTGG
ACCATGCCCTAAAATAACCTCACCCCAAATACAATAAAGGGACGAAGCACTTATAGATA
CCACAGACACATGTGTTTCATTTTTAGTTTTGTTAAAAAAAAATTCTGACAAATCAGAA
ATGGGGGTTCAGGAGTGGTGGTGATGCAAAAGATGGAAGCCATGGGGTGGGGGCTGTCA
GGGGTGGGGGCAGTAGTGTCTCCTTCACCCCCACCCTGGTGTCCTCTCCTGAAGGACAG
ACGGTCACATTCCAAAATGGG[ca]GAGTCTTCTACCGTGTCTGTTCAACTGAGAAGAA
AACGTAGCATGGTCAGAATAAGGCATGAAAAGGGGAAAGTGAGGCAGGAACACACGGCA
CACATGCAGACACTGGTGTACTGCCTGGGTTCAGAGGACGGACGTGGGGGTGAGGGAAG
GGATGTAATATGATGAGAGAAGACAGAAACCCCACATAAAGGTCAGAAAAACATCCCAA
CACAGCATCAAAGACCAGGGGGCATGAACCAGTCAAGTGTCCATTATGCATCAGATGCC
CATGACCTATGTGATGGGATTTAGGACAAACACACTAAGGAACAGGGAGGACCTAAAGG
GTTTCATGAGATCAGTACTCACTGTAGGAGGAGATGTCTATCTCATCAGGCAGCTCACT
AATATTGACCTCAAAGCGATCCTGCACATCATTGAGGATCTTGGCATCATTCTCATCGG
ACACAAATGTGATAGCCAAGC agatccagaagctgaaggaacagatgaggaggcaccaagagagccttggaggaggtgcc
taagtttcccccagtgcccacagcaccctccggcactgaaaatacacgcaccacccacc
aggagccttgggatcataaacaccccagcgtcttcccaggccagagaaagtggaagaga
ccacaaaccgcaggcaattggcaggcagtgggggagccagggctctgcagtcttagtcc
cattcccctttgatctcacagcaggcagggcacccaggccttataggaattcaccctgg
accatgccctaaaataacctcaccccaaatacaataaagggacgaagcacttatagata
ccacagacacatgtgtttcatttttagttttgttaaaaaaaaattctgacaaatcagaa
atgggggttcaggagtggtggtgatgcaaaagatggaagccatggggtgggggctgtca
ggggtgggggcagtagtgtctccttcacccccaccCTGGTGTCCTCTCCTGAAGGACAG
ACGGTCACATTCCAAAATGGG[ca]GAGTCTTCTACCGTGTCTGTTCAACTGAGAAGAA
AACGTAGCATGgtcagaataaggcatgaaaaggggaaagtgaggcaggaacacacggca
cacatgcagacactggtgtactgcctgggttcagaggacggacgtgggggtgagggaag
ggatgtaatatgatgagagaagacagaaaccccacataaaggtcagaaaaacatcccaa
cacagcatcaaagaccagggggcatgaaccagtcaagtgtccattatgcatcagatgcc
catgacctatgtgatgggatttaggacaaacacactaaggaacagggaggacctaaagg
gtttcatgagatcagtactcactgtaggaggagatgtctatctcatcaggcagctcact
aatattgacctcaaagcgatcctgcacatcattgaggatcttggcatcattctcatcgg
acacaaatgtgatagccaagc

FIGURE 10rrrrr

67364 (SEQ ID NO:122)
AGGTGTGTGCCACCATGCACGGCTAATTTTTGCATTTTTAGTAGAGAGAGGGTTTCATC
CTGTTGGCCACATTGGTCTTAAACTCCTGACCTCAAATAATCCACACGCCTTGGCCTCC
CAAACTGCTGAGATTACAGGTGTAAGCCATTGTGCACTTGGCCAGAATCCTCAATATTC
ACACACCACTGGAGCTGTTTTAAAGTTTCCGGCTTTCTCTGCCACATACCCCAAAATTA
TTAAACTGATATGATTCAAAGTCAGTATAAAGTAGTAAGAAAAGGGTGGTCTTGTGTTA
AGCATCATCCATAGCCCAATTACGAATCCTCCTGTTACATAGGAACTCAACACTCTGTT
ACACCACAGCAAACTAAAGCTTCTCCAAAATTAAAGAGACTATTGGCCTACAAGTTTCT
TATCCCTCCAACTTGCCACACCCTCACTCTCAGGTCTCTTTACCTTGGCTTACCTTGAC
ATTGGGCATGTATTTAGAGAAGCGCTCATATTCCTTGCTGATCTGAAAAGCCAACTCCC
GAGTGTGACACATCACCAG[ct]ACAGACACCTTAGGCAGGAAGTATACGGAGACATAT
GGTAAATGTAGCTCTTCATTATCCCCTCTAGGGAAGTGACTGTCACAAAAACACACCTG
GGCCGATAATAAATGACTTCAATTCTGTGATCTAAATCATGAACCCCACGCTTGCGACA
GAACATCCCCCACAGCTGTCAGGTTGTCAAGGGTAACAGAGGTCATGTGCTCATGGCTC
TGCAAGCATCATGTAGTTAGGACAAAAACACCCTTCCCTTATAGTCCTAACCAAAATCC
CCTCCCCAGCACTCTCCCCAAATATACCTGCCCAGTAACTGGCTCCAGCTGTTGCAGTG
TGGCCAAGACAAACACTGCTGTCTTTCCCATGCCCGACTTGGCCTGGCACAGGACATCC
ATTCCCAGAATGGCCTGAGGGATGCACTCATGCTGGACTAAAAGTTGGGGGGGGAGGAA
GATAAATTAGACTTCAGTCTC aggtgtgtgccaccatgcacggctaatttttgcatttttagtagagagagggtttcatc
ctgttggccacattggtcttaaactcctgacctcaaataatccacacgccttggcctcc
caaactgctgagattacaggtgtaagccattgtgcacttggccagaatcctcaatattc
acacaccactggagctgttttaaagtttccggctttctctgccacataccccaaaatta
ttaaactgatatgattcaaagtcagtataaagtagtaagaaaagggtggtcttgtgtta
agcatcatccatagcccaattacgaatcctcctgttacataggaactcaacactctgtt
acaccacagcaaactaaagcttctccaaaattaaagagactattggcctacaagtttct
tatccctccaacttgccacaccctcactctcaggtctctttaccttggcttaccttgac
attgggcatgtatttagagaagcgctcatattccttgctgatctgaAAAGCCAACTCCC
GAGTGTGACACATCACCAG[ct]ACAGACACCTTAGGCAGGAAGTATACGGAGACatat
ggtaaatgtagctcttcattatcccctctagggaagtgactgtcacaaaaacacacctg
ggccgataataaatgacttcaattctgtgatctaaatcatgaaccccacgcttgcgaca
gaacatcccccacagctgtcaggttgtcaagggtaacagaggtcatgtgctcatggctc
tgcaagcatcatgtagttaggacaaaaacacccttcccttatagtcctaaccaaaatcc
cctccccagcactctccccaaatatacctgcccagtaactggctccagctgttgcagtg
tggccaagacaaacactgctgtctttcccatgcccgacttggcctggcacaggacatcc
attcccagaatggcctgagggatgcactcatgctggactaaaagttggggggggaggaa
gataaattagacttcagtctc

FIGURE 10sssss

67371 (SEQ ID NO:123)
GTGTAATGTATTAGAGCAAATCCTCTTGATTAGGCTTGAGAATGGAGCCATGGAGCCCC
ATTTTTTTCCCACCCTTCATGCAGTAGTGTTTAATTAAATATTTAAAATATTTAATGCC
CTGCACAGGCATCATTTAATTGGAATGAACAACTGCTAACTGCTGGCACAGGGCTCTAG
AAGGCCCCAGATATCAGTAATTTACCACTGTTTGCTTGCTCTTGGGATAGGAAGGATCC
GGGGATCCTAGAGGAGGAGCTAGGGCAGTTGGGTGCTGGAGGAGGCACATGGGGGCTCA
GCACAGCCACTTGTTTGCCAGCTGGTGGAGCAGTGTGGAACTCGCCTTCTTGGGAGGAA
GAAACACGTCTCCAGACTTCCATAACAAAGTACCCAGAGTTGCTGGGCTAGTTACAGTT
CCAATGACCATTCCTCCCCAGCAGGATAAGCCCAGGGCCCCACCCTACCTGGGTCCCCC
TTCTCGCCCCGAGGGCCCTCTCTCCCATCCCGTCCATCGCGACCAGGCAGGCCACTCTC
CACTGAGCTACACATGACCAGGGTGCAAGCACTGGGC[ga]TTGTTCTGTGGGAGTAGG
TCTTCATTTCTGCTTCCAGGTAGCCCAGGGGCTGTGTGAGCAGGACCAGTGCAGAGAGG
AGGAAGAGCAGCATGGCCTGGAGAGGTGAACAGAAAGAGAAAAGACATGCTTATGCTTC
ATGGACATGGTTTAGGGCTTGGCTCAGCTTCTAGAGGTGACAAGAAGCCCCCATTCCCT
CCTTCTGTCCTCTGCTATGGGGCCTAGAGCAGCAGGAATCCAAAAGCAGTTTAAGGACA
AGGAGGGCACAAGGTCTGGATGGAGAGCATGAGTTACCCAGCTGGAACTCTGACATAGG
TTGACAGCAGCATCCCCCATTCCCAGGTGCTCATGTCTTCCCTTCTTGTGCCTTCCCTT
GGGCACTAAGTTTGGCACAGTGGCTAGGATGTAGCATTCCTCACTGGGGCCATCTGTCA
CATCAAGAAGGGTTCATTGAG gtgtaatgtattagagcaaatcctcttgattaggcttgagaatggagccatggagcccc
atttttttcccacccttcatgcagtagtgtttaattaaatatttaaaatatttaatgcc
ctgcacaggcatcatttaattggaatgaacaactgctaactgctggcacagggctctag
aaggccccagatatcagtaatttaccactgtttgcttgctcttgggataggaaggatcc
ggggatcctagaggaggagctagggcagttgggtgctggaggaggcacatgggggctca
gcacagccacttgtttgccagctggtggagcagtgtggaactcgccttcttgggaggaa
gaaacacgtctccagacttccataacaaagtacccagagttgctgggctagttacagtt
ccaatgaccattcctccccagcaggataagcccagggccccaccctacctgggtccccc
ttctcgccccgagggccctctctcccatcccgtccatcgcgaccaggcaggccactctC
CACTGAGCTACACATGACCAGGGTGCAAGCACTGGGC[ga]TTGTTCTGTGGGAGTAGG
TCTTCATTTCTGCTTCCAGGtagcccaggggctgtgtgagcaggaccagtgcagagagg
aggaagagcagcatggcctggagaggtgaacagaaagagaaaagacatgcttatgcttc
atggacatggtttagggcttggctcagcttctagaggtgacaagaagcccccattccct
ccttctgtcctctgctatggggcctagagcagcaggaatccaaaagcagtttaaggaca
aggagggcacaaggtctggatggagagcatgagttacccagctggaactctgacatagg
ttgacagcagcatcccccattcccaggtgctcatgtcttcccttcttgtgccttccctt
gggcactaagtttggcacagtggctaggatgtagcattcctcactggggccatctgtca
catcaagaagggttcattgag FIGURE 10ttttt 67379 (SEQ ID NO:124)
ATGGCACCTGCCCTTTGGCACCCCAAGGTGGAGCCCCCAGCGACCTTCCCCTTCCAGCT
GAGCATTGCTGTGGGGGAGAGGGGGAAGACGGGAGGAAAGAAGGGAGTGGTTCCATCAC
GCCTCCTCACTCCTCTCCTCCCGTCTTCTCCTCTCCTGCCCTTGTCTCCCTGTCTCAGC
AGCTCCAGGGGTGGTGTGGCCCCTCCAGCCTCCTAGGTGGTGCCAGGCCAGAGTCCAA
GCTCAGGGACAGCAGTCCCTCCTGTGGGGGCCCCTGAACTGGGCTCACATCCCACACAT
TTTCCAAACCACTCCCATTGTGAGCCTTTGGTCCTGGTGGTGTCCCTCTGGTTGTGGGA
CCAAGAGCTTGTGCCCATTTTTCATCTGAGGAAGGAGGCAGCAGAGGCCACGGGCTGGT
CTGGGTCCCACTCACCTCCCCTCTCACCTCTCTTCTTCCTGGGACGCCTCTGCCTGCCA
GCTCTCACTTCCCTCCCCTGACCCGCAGGGTGGCTGCGTCCTTCCAGGGCCTGGCCTGA
GGGCAGGGGTGGTTTGCTCCC[ct]CTTCAGCCTCCGGGGGCTGGGGTCAGTGCGGTGC
TAACACGGCTCTCTCTGTGCTGTGGGACTTCCAGGCAGGCCCGCAAGCCGTGTGAGCCG
TCGCAGCCGTGGCATCGTTGAGGAGTGCTGTTTCCGCAGCTGTGACCTGGCCCTCCTGG
AGACGTACTGTGCTACCCCCGCCAAGTCCGAGAGGGACGTGTCGACCCCTCCGACCGTG
CTTCCGGTGAGGGTCCTGGGCCCCTTTCCCACTCTCTAGAGACAGAGAAATAGGGCTTC
GGGCGCCCAGCGTTTCCTGTGGCCTCTGGGACCTCTTGGCCAGGGACAAGGACCCGTGA
CTTCCTTGCTTGCTGTGTGGCCCGGGAGCAGCTCAGACGCTGGCTCCTTCTGTCCCTCT
GCCCGTGGACATTAGCTCAAGTCACTGATCAGTCACAGGGGTGGCCTGTCAGGTCAGGC
GGGCGGCTCAGGCGGAAGAGC atggcacctgccctttggcaccccaaggtggagcccccagcgaccttccccttccagct
gagcattgctgtgggggagagggggaagacgggaggaaagaagggagtggttccatcac
gcctcctcactcctctcctcccgtcttctcctctcctgcccttgtctccctgtctcagc
agctccaggggtggtgtggcccctccagcctcctaggtggtgccaggccagagtccaa
gctcagggacagcagtccctcctgtgggggcccctgaactgggctcacatcccacacat
tttccaaaccactcccattgtgagcctttggtcctggtggtgtccctctggttgtggga
ccaagagcttgtgcccatttttcatctgaggaaggaggcagcagaggccacgggctggt
ctgggtcccactcacctcccctctcacctctcttcttcctgggacgcctctgcctgcca
gctctcacttccctcccctgacccgcagggtggctgcgtccttccagggcctggcctgA
GGGCAGGGGTGGTTTGCTCCC[ct]CTTCAGCCTCCGGGGGCTGGGGtcagtgcggtgc
taacacggctctctctgtgctgtgggacttccaggcaggcccgcaagccgtgtgagccg
tcgcagccgtggcatcgttgaggagtgctgtttccgcagctgtgacctggccctcctgg
agacgtactgtgctacccccgccaagtccgagagggacgtgtcgacccctccgaccgtg
cttccggtgagggtcctgggcccctttcccactctctagagacagagaaatagggcttc
gggcgcccagcgtttcctgtggcctctgggacctcttggccagggacaaggacccgtga
cttccttgcttgctgtgtggcccgggagcagctcagacgctggctccttctgtccctct
gcccgtggacattagctcaagtcactgatcagtcacaggggtggcctgtcaggtcaggc
gggcggctcaggcggaagagc

FIGURE 10uuuuu

67382 (SEQ ID NO:125)
GAGCTGGCCCGAGCTGAAGAGTTGTTGGAGCAGCAGCTGGAGCTGTACCAGGCCCTCCT
TGAAGGGCAGGAGGGAGCCTGGGAGGCCCAAGCCCTGGTGCTCAAGATCCAGAAGCTGA
AGGAACAGATGAGGAGGCACCAAGAGAGCCTTGGAGGAGGTGCCTAAGTTTCCCCCAGT
GCCCACAGCACCCTCCGGCACTGAAAATACACGCACCACCCACCAGGAGCCTTGGGATC
ATAAACACCCCAGCGTCTTCCCAGGCCAGAGAAAGTGGAAGAGACCACAAACCGCAGGC
AATTGGCAGGCAGTGGGGGAGCCAGGGCTCTGCAGTCTTAGTCCCATTCCCCTTTGATC
TCACAGCAGGCAGGGCACCCAGGCCTTATAGGAATTCACCCTGGACCATGCCCTAAAAT
AACCTCACCCCAAATACAATAAAGGGACGAAGCACTTATAGATACCACAGACACATGTG
TTTCATTTTTAGTTTTGTTAAAAAAAAATTCTGACAAATCAGAAATGGGGGTTCAGGAG
TGGTGGTGATGCAAAAGATGGAAGCCATGGGGTGGGGGCTGTCAGGGGTGGGGGCAGTA
GTGTCTCCTT[ct]ACCCCCACCCTGGTGTCCTCTCCTGAAGGACAGACGGTCACATTC
CAAAATGGGCGAGTCTTCTACCGTGTCTGTTCAACTGAGAAGAAAACGTAGCATGGTCA
GAATAAGGCATGAAAAGGGGAAAGTGAGGCAGGAACACACGGCACACATGCAGACACTG
GTGTACTGCCTGGGTTCAGAGGACGGACGTGGGGGTGAGGGAAGGGATGTAATATGATG
AGAGAAGACAGAAACCCCACATAAAGGTCAGAAAAACATCCCAACACAGCATCAAAGAC
CAGGGGGCATGAACCAGTCAAGTGTCCATTATGCATCAGATGCCCATGACCTATGTGAT
GGGATTTAGGACAAACACACTAAGGAACAGGGAGGACCTAAAGGGTTTCATGAGATCAG
TACTCACTGTAGGAGGAGATG gagctggcccgagctgaagagttgttggagcagcagctggagctgtaccaggccctcct
tgaagggcaggagggagcctgggaggcccaagccctggtgctcaagatccagaagctga
aggaacagatgaggaggcaccaagagagccttggaggaggtgcctaagtttcccccagt
gcccacagcaccctccggcactgaaaatacacgcaccacccaccaggagccttgggatc
ataaacaccccagcgtcttcccaggccagagaaagtggaagagaccacaaaccgcaggc
aattggcaggcagtgggggagccagggctctgcagtcttagtcccattcccctttgatc
tcacagcaggcagggcacccaggccttataggaattcaccctggaccatgccctaaaat
aacctcaccccaaatacaataaagggacgaagcacttatagataccacagacacatgtg
tttcatttttagttttgttaaaaaaaaattctgacaaatcagaaatgggggttcaggag
tggtggtgatgcaaaagatggaagccatggggtgggggctgtcagGGGTGGGGGCAGTA
GTGTCTCCTT[ct]ACCCCCACCCTGGTGTCCTCTCCTgaaggacagacggtcacattc
caaaatgggcgagtcttctaccgtgtctgttcaactgagaagaaaacgtagcatggtca
gaataaggcatgaaaaggggaaagtgaggcaggaacacacggcacacatgcagacactg
gtgtactgcctgggttcagaggacggacgtgggggtgagggaagggatgtaatatgatg
agagaagacagaaaccccacataaaggtcagaaaaacatcccaacacagcatcaaagac
cagggggcatgaaccagtcaagtgtccattatgcatcagatgcccatgacctatgtgat
gggatttaggacaaacacactaaggaacagggaggacctaaagggtttcatgagatcag
tactcactgtaggaggagatg

FIGURE 10vvvvv

67386 (SEQ ID NO:126)
TTTCAATCAAAAGCTGGAAGTCCACCTTACAGAAAGACAAAAAGAAACCCCTTTTTATA
TCTTAACAAAGCAATAGCTCTCAAGCAGCAGAGCATCTCGAGGAAGAAAGCTTGCCCGG
TCGCCATCCCATCATGCCAGAGCGTGCAGTGTCCACCCTTGACTACGCTGGGGAATTGC
TGATTTTTTGAAAAAGCTTAACTTAACAATTTCTGATGTCTATCTTTTAGAGTTCTGTA
TGTTCCCATTTTTTATTCTTCTGAATTTTGAATTGCAAGTAGCTGTAAAATCCAATCTT
TGAGTGCATGGGGGTGGGTGTGAGGCGGGGCTCAGCTTCAACCCCCTGTCCTGTAAAGC
AGTGGCTGGTTTTTCCTGAGCCCAGCCCTGGGAGGTCGTGGTAGGTGTGGAGGCTGCAG
AGCTCCTCCAGATGCTGCCCTCGCTGTGCCTCACACCAGAGAGGATGGAAGTGGGCTCT
GGTGTCAGACTGTGGTTGAGCTGAGACAGACAAGGCCGACACAGGGCTGGGGGCCCGTG
GTCCACCAGTGGAAGTGACTGCCGAGGAAGGG[ca]GGTGAGGAGGGCGGTGTGGGAGC
TGAGGCTTCTTTTCAGCCTGGCAGCTGGCGAGGGCCAGGGAGCAGGGGAAGAGCCTGGT
CACCATGGTCCCAGAGCCCGTCTCACTTGGCTTTTCCTTTGCAGCTGAGGAGGATGAGG
GCCAGAGAGGGACTGTGTGTATGTCCTGCCTGGGGACCCACAGCCAGGTGATAGCAGAG
GTGGTTTGAAGCCCAGGCCTCCCACGCCAACCCACTGGTCTTGCTGTTTCAGCAGGGAA
GGCCGGGAGCCCTAGGAGCTGGGGAAAGGCGACTGCCCGGGTCCTGGGTGACTCCCCAC
CCCCAGATCCCCAGCTGTCATCACTGGGGCAAGGACACATTAAACTGGTCCCTGTGGGT
CAGGTCTGAGTGGGGGAGGACCTCCCCTCCCCACTGCCTCCCACAGGGGCTTGTGATGC
AGGGTTTCAGGAACAGGGCTG tttcaatcaaaagctggaagtccaccttacagaaagacaaaaagaaacccctttttata
tcttaacaaagcaatagctctcaagcagcagagcatctcgaggaagaaagcttgcccgg
tcgccatcccatcatgccagagcgtgcagtgtccacccttgactacgctggggaattgc
tgattttttgaaaaagcttaacttaacaatttctgatgtctatcttttagagttctgta
tgttcccattttttattcttctgaattttgaattgcaagtagctgtaaaatccaatctt
tgagtgcatgggggtgggtgtgaggcggggctcagcttcaaccccctgtcctgtaaagc
agtggctggtttttcctgagcccagccctgggaggtcgtggtaggtgtggaggctgcag
agctcctccagatgctgccctcgctgtgcctcacaccagagaggatggaagtgggctct
ggtgtcagactgtggttgagctgagacagacaaggccgacacagggctgggggcccgtg
gtccaccagTGGAAGTGACTGCCGAGGAAGGG[ca]GGTGAGGAGGGCGGTGTGGGAGC
tgaggcttcttttcagcctggcagctggcgagggccagggagcaggggaagagcctggt
caccatggtcccagagcccgtctcacttggcttttcctttgcagctgaggaggatgagg
gccagagagggactgtgtgtatgtcctgcctggggacccacagccaggtgatagcagag
gtggtttgaagcccaggcctcccacgccaacccactggtcttgctgtttcagcagggaa
ggccgggagccctaggagctggggaaaggcgactgcccgggtcctgggtgactccccac
ccccagatccccagctgtcatcactggggcaaggacacattaaactggtccctgtgggt
caggtctgagtgggggaggacctcccctccccactgcctcccacaggggcttgtgatgc
agggtttcaggaacagggctg

FIGURE 10wwwwww

67396 (SEQ ID NO:127)
TTGGTTTTTGTTGTATTCAATTCTAATTATTTATTACACAGTTACCATCCTTTGATGAG
ATGTTACTCTTCATCTGTGATTGCTTATAGTTGTTCGCGAGCTTCTGTCCATTGGTAAT
TAGAAAGTTTATTTATATCAAGTTTAATCTTCCTGTTAAAAACAGTGTTCTAATAGTCA
TCCATATTAAAATATTATATGGCAGTATTAAAAACTACAAATATTACTCTTGGGAATCA
AATCATACACTGTAGCACATCATCTTTCTTGGCAATAGTACTGCTGTTGTACACTGATG
GCCTCTAACAGAGAAGAAATCATTCCATTGAAAGAAAAGTAACTATCAAGAACAAAGTT
GGAAGTGATGCCTTAAAGCTACCGGCCCATGTCTAAATGTACTTTTGATTTTTATTTTA
TTGGTTAAGTAGAAATTATTTTTAATGTAATGACAGCCCATTAATAAATGTCTCCTCTG
TTGAAGGTAGGGTTAATTCAGTATGCCAATAATCCAAGAGTTGTGTTTAACTTGAACAC
ATATAAAACCAAAGAAGAAATGATTGTAGCAACATCCCAGACATCCCAATATGGTGGGG
ACCTCACAAACACATT[ct]GGAGCAATTCAATATGCAAGGTAAGTTTTGGTGCTAATA
GGCCAATGTTTTCATAATGTAAAACATTATATTTATGTAATAAATATGAAAAAGTAAGG
AAAAGACAAAGAAAAATAATATACCTGGTACCTAATTTAAATCAGAACTAATAAAGAAA
AAAACATCAGAGCATTCTATGTCTTGAATACTTTGAGAAGGCAGCTGGGAAAGTTAAAT
CTTTGATTTTAGGATATTTATAAGATATCACATGATATTTAAATGAATTTATGTGAAGT
AAATGAAATGAGAAGACCTTAGATTAAAACAGTAGGAAATGGGGCAATCTGTCATAATT
TGTTAATATTCATCAGAGATTCAGACAAATTGAGCTCATGGATCACTTGGTGCAAATTA
ACAAAGACCACAGAATCTTAA ttggtttttgttgtattcaattctaattatttattacacagttaccatcctttgatgag
atgttactcttcatctgtgattgcttatagttgttcgcgagcttctgtccattggtaat
tagaaagtttatttatatcaagtttaatcttcctgttaaaaacagtgttctaatagtca
tccatattaaaatattatatggcagtattaaaaactacaaatattactcttgggaatca
aatcatacactgtagcacatcatctttcttggcaatagtactgctgttgtacactgatg
gcctctaacagagaagaaatcattccattgaaagaaaagtaactatcaagaacaaagtt
ggaagtgatgccttaaagctaccggcccatgtctaaatgtacttttgatttttatttta
ttggttaagtagaaattatttttaatgtaatgacagcccattaataaatgtctcctctg
ttgaaggtagggttaattcagtatgccaataatccaagagttgtgtttaacttgaacac
atataaaaccaaagaagaaatgattgtagcaACATCCCAGACATCCCAATATGGTGGGG
ACCTCACAAACACATT[ct]GGAGCAATTCAATATGCAAGGTAAGTTTTGGTGCTAATA
GGCCAatgttttcataatgtaaaacattatatttatgtaataaatatgaaaaagtaagg
aaaagacaaagaaaaataatatacctggtacctaatttaaatcagaactaataaagaaa
aaaacatcagagcattctatgtcttgaatactttgagaaggcagctgggaaagttaaat
ctttgattttaggatatttataagatatcacatgatatttaaatgaatttatgtgaagt
aaatgaaatgagaagaccttagattaaaacagtaggaaatggggcaatctgtcataatt
tgttaatattcatcagagattcagacaaattgagctcatggatcacttggtgcaaatta
acaaagaccacagaatcttaa

FIGURE 10xxxxx

87801 (SEQ ID NO:128)
TGGATCTGCAGCTCCAGAGAAGGGCCTGGGTCAGATGTCACTGAAGCCCTATGGTGGCG
GAAAGGCGAGAAATAGTGGGTTGAGATTCCAAGTGCAATCCACTGCGGCTCCTCGCTCG
CCCTCCAGGTGGCAGCACAACCCTGCGCTTCCGAAGCCCGTTTTCTGAGCCAGACACTC
TCCACGCTCTGGGTATTTCGGCTTCTCTCCCCACACGCCGACCCTAGGTCGCGCACT
TTCTGCCTGGCAGAATTTGGCCGAGGATCCAAACCCGGAGCAGCCTCCAGAGAGCGTGT
CGTTCACGCGGCCAGCATATGCTCAGAGACCTCAGAGGCTCAGAGACCTCAGGGCTGGT
GGTGTGGTCGGTTGTGACCACTTGTCCCTCGGACCGGCTCCAGGAACCAACCTGGGGAA
TGTGTGTAGGGGAAGGGCGGATAGACAGTGCCCGGAGCAGGGAGGCGCTGAAAGACAG
GACCAAGCAGCCCGGCCACCAGACCCGTTGTGGGAACGGAATTTCCTGGCCCCCAGGGC
CACACTCGCGTGGGAAGCATGTCGCGGAC[ct]CTTTAAGGCGTCATCTCCCTGTCTCT
CCGCCCCCGCCTGGGACAGGCCGGGACGCCCGGGACCTGACATTTGGAGGCTCCCAACG
TGGGAGCTAAAAATAGCAGCCCCGGGTTACTTTGGGGCATTGCTCCTCTCCCAACCCGC
GCGCCGGCTCGCGAGCCGTCTCAGGCCGCTGGAGTTTCCCCGGGGCAAGTACACCTGGC
CCGTCCTCTCCTCTCAGACCCCACTGTCCAGACCCGCAGAGTTTAAGATGCTTCTGCAG
CCCGGGATCCTAGCTGGTGGGCGGAGTCCTAACACGTGGGTGGGCGGGGCCTTTTGTTC
CAGGGACTCTTTTCTCAAAACTTCCCAGTCGGAGGCTGGCGGGAACCCGAGAGGCGTGT
CTCGCCAGCCACGCGGAGGGGCGTGGCCTCATTGGCCCGCCCCACCAACTCCAGCCAAA
CTCTAAACCCCAGGCGGAGGG tggatctgcagctccagagaagggcctgggtcagatgtcactgaagccctatggtggcg
gaaaggcgagaaatagtgggttgagattccaagtgcaatccactgcggctcctcgctcg
ccctccaggtggcagcacaaccctgcgcttccgaagcccgttttctgagccagacactc
tccacgctctgggtatttcggcttctctccccacacgccgaccctaggtcgcgcact
ttctgcctggcagaatttggccgaggatccaaacccggagcagcctccagagagcgtgt
cgttcacgcggccagcatatgctcagagacctcagaggctcagagacctcagggctggt
ggtgtggtcggttgtgaccacttgtccctcggaccggctccaggaaccaacctggggaa
tgtgtgtaggggaagggcggatagacagtgcccggagcagggaggcgctgaaagacag
gaccaagcagcccggccaccagacccgttgtgggaacggaatttcctggcccccaggGC
CACACTCGCGTGGGAAGCATGTCGCGGAC[ct]CTTTAAGGCGTCATCTCCCTGTCTCT
CCGCCcccgcctgggacaggccgggacgcccgggacctgacatttggaggctcccaacg
tgggagctaaaaatagcagccccgggttactttggggcattgctcctctcccaacccgc
gcgccggctcgcgagccgtctcaggccgctggagtttccccggggcaagtacacctggc
ccgtcctctcctctcagaccccactgtccagacccgcagagtttaagatgcttctgcag
cccgggatcctagctggtgggcggagtcctaacacgtgggtgggcggggccttttgttc
cagggactcttttctcaaaacttcccagtcggaggctggcgggaacccgagaggcgtgt
ctcgccagccacgcggaggggcgtggcctcattggcccgccccaccaactccagccaaa
ctctaaaccccaggcggaggg

FIGURE 11

Hexanediol=v arm is already on the probe, so I just matched with FRET number

| | SNP number and oligonucleotide sequence | FRET CASSETTE |
|---|---|---|
| | 29043 | |
| Invader | CAGTTGTTTATCTTTCGCTCCATCAACCAAGTCACAATTGGT (SEQ ID NO:129) | |
| Probe | CGCGCCGAGGAGTTGGGAGGGAATTTCTV (SEQ ID NO:130) | 1 |
| Probe | ATGACGTGGCAGACGGTTGGGAGGGAATTTCV (SEQ ID NO:131) | 2 |
| | 34573 | |
| Invader | GGCAGGCTTCAGTTTGGCCAGGCCA (SEQ ID NO:132) | |
| Probe | ATGACGTGGCAGACCTCCATGGTGGTGCTV (SEQ ID NO:133) | 2 |
| Probe | CGCGCCGAGGTTCCATGGTGGTGCTV (SEQ ID NO:134) | 1 |
| | 37319 | |
| Invader | AGCATAGTCCCAGGAATGAGGTCCCCCAAT (SEQ ID NO:135) | |
| Probe | ATGACGTGGCAGACGTTGCTAAGTTTTACATAGGGV (SEQ ID NO:136) | 2 |
| Probe | CGCGCCGAGGATTGCTAAGTTTTACATAGGGGV (SEQ ID NO:137) | 1 |
| | 37810 | |
| Invader | CCAACACAGATGGAGATTATGGCAGACTTGTTTT (SEQ ID NO:138) | |
| Probe | ATGACGTGGCAGACGTTAGAAGAGCAGCCCTV (SEQ ID NO:139) | 2 |
| Probe | CGCGCCGAGGCTTAGAAGAGCAGCCCTV (SEQ ID NO:140) | 1 |
| | 37879 | |
| Invader | GCTGCACCGCCTCATCAATCCCAACTTCTC (SEQ ID NO:141) | |
| Probe | CGCGCCGAGGTCGGCTATCAGGACGV (SEQ ID NO:142) | 1 |
| Probe | ATGACGTGGCAGACACGGCTATCAGGACGV (SEQ ID NO:143) | 2 |
| | 41064 | |
| Invader | GCATGACAGGAAGACAGGGTGTGAGGTTGGAT (SEQ ID NO:144) | |
| Probe | CGCGCCGAGGAGGAGAGAGGCTGTAGV (SEQ ID NO:145) | 1 |
| Probe | ATGACGTGGCAGACGGGAGAGAGGCTGTAGV (SEQ ID NO:146) | 2 |
| | 41164 | |
| Invader | ACTGCTACTGTCTGTGCTGTGCTGGGCT (SEQ ID NO:147) | |
| Probe | ATGACGTGGCAGACGCAGAGCTGGACACCV (SEQ ID NO:148) | 2 |
| Probe | CGCGCCGAGGACAGAGCTGGACACCV (SEQ ID NO:149) | 1 |
| | 41365 | |
| Invader | GGTCTCTCTGGACAGCACACTGCACCAAGTAT (SEQ ID NO:150) | |
| Probe | CGCGCCGAGGAGCCCACCAAAAACGV (SEQ ID NO:151) | 1 |
| Probe | ATGACGTGGCAGACGGCCCACCAAAAACGV (SEQ ID NO:152) | 2 |
| | 41408 | |
| Invader | TCCTATGCCCAAGTTCTCTGATCATCCTCAAAAGAAGACAGT (SEQ ID NO:153) | |
| Probe | CGCGCCGAGGACTTCCATCCCAGAGGV (SEQ ID NO:154) | 1 |
| Probe | ATGACGTGGCAGACCCTTCCATCCCAGAGGV (SEQ ID NO:155) | 2 |

FIGURE 11 (cont'd)

| | | |
|---|---|---|
| | 41409 | |
| Invader | CTGCCRTGCCCTTCCTGGCCCAC (SEQ ID NO:156) | |
| Probe | CGCGCCGAGGTCCCTAAACCTAAATTCAAATCTV (SEQ ID NO:157) | 1 |
| Probe | ATGACGTGGCAGACGCCCTAAACCTAAATTCAAATCV (SEQ ID NO:158) | 2 |
| | 41420 | |
| Invader | GCTGCAGAGATGTGTCCTCCCACAGAGGAGT (SEQ ID NO:159) | |
| Probe | ATGACGTGGCAGACCTGAAACCACCAAGGAGV (SEQ ID NO:160) | 2 |
| Probe | CGCGCCGAGGATGAAACCACCAAGGAGV (SEQ ID NO:161) | 1 |
| | 41452 | |
| Invader | GCCTCTGGTTTCTGTCTACTCCAACGTCCACGT (SEQ ID NO:162) | |
| Probe | CGCGCCGAGGCGCATAGATACAGGCATCV (SEQ ID NO:163) | 1 |
| Probe | ATGACGTGGCAGACGGCATAGATACAGGCATCV (SEQ ID NO:164) | 2 |
| | 41475 | |
| Invader | GTCCGTGGGGTTTTTGCTGTGCGGAT (SEQ ID NO:165) | |
| Probe | ATGACGTGGCAGACGTGGAAAGTACAAGGCTCV (SEQ ID NO:166) | 2 |
| Probe | CGCGCCGAGGCTGGAAAGTACAAGGCTCV (SEQ ID NO:167) | 1 |
| | 41541 | |
| Invader | CAGAAGGCTGCAGCCTCACAATGCAGGT (SEQ ID NO:168) | |
| Probe | CGCGCCGAGGATGACTGGGTCCCCV (SEQ ID NO:169) | 1 |
| Probe | ATGACGTGGCAGACGTGACTGGGTCCCCV (SEQ ID NO:170) | 2 |
| | 41646 | |
| Invader | CCCAAATTTGATCCACTGTAACCGTGCGTACACAGT (SEQ ID NO:171) | |
| Probe | ATGACGTGGCAGACCACCGTTGCAACAACAV (SEQ ID NO:172) | 2 |
| Probe | CGCGCCGAGGAACCGTTGCAACAACAV (SEQ ID NO:173) | 1 |
| | 44907 | |
| Invader | GAGAGTTGCTCAAGGTAACACAGTGGTAAGTGACGGT (SEQ ID NO:174) | |
| Probe | ATGACGTGGCAGACGGCCAGGAACTAGACTV (SEQ ID NO:175) | 2 |
| Probe | CGCGCCGAGGAGCCAGGAACTAGACTCV (SEQ ID NO:176) | 1 |
| | 44927 | |
| Invader | GCAGTCAGTAGCAGCAGCTTGAGTGGCAGA (SEQ ID NO:177) | |
| Probe | ATGACGTGGCAGACCGGTTCTCAAACCTGGV (SEQ ID NO:178) | 2 |
| Probe | CGCGCCGAGGTGGTTCTCAAACCTGGAV (SEQ ID NO:179) | 1 |
| | 45046 | |
| Invader | CCCTCTGGAAGGATGGCTMATTTGCACACA (SEQ ID NO:180) | |
| Probe | ATGACGTGGCAGACCTGAGGCTTTCCTGATGV (SEQ ID NO:181) | 2 |
| Probe | CGCGCCGAGGTTGAGGCTTTCCTGATGAV (SEQ ID NO:182) | 1 |

FIGURE 11 (cont'd)

| | | |
|---|---|---|
| | 45076 | |
| Invader | GCGAGGCCGAGCCCCTCCTAGTGT (SEQ ID NO:183) | |
| Probe | ATGACGTGGCAGACGTTCCGGACCTTGCTV (SEQ ID NO:184) | 2 |
| Probe | CGCGCCGAGGCTTCCGGACCTTGCTV (SEQ ID NO:185) | 1 |
| | 45080 | |
| Invader | ACAAACCTTTTAGTTTACTCTGCAGTTAATCCCACTGAT (SEQ ID NO:186) | |
| Probe | ATGACGTGGCAGACGAAGTAGTGGGCTCCAV (SEQ ID NO:187) | 2 |
| Probe | CGCGCCGAGGAAAGTAGTGGGCTCCAAV (SEQ ID NO:188) | 1 |
| | 47850 | |
| Invader | TGTATGTTGGCCTCCTTTGCTGCCCTCACT (SEQ ID NO:189) | |
| Probe | ATGACGTGGCAGACGATCTCTTCCTGTGACACV (SEQ ID NO:190) | 2 |
| Probe | CGCGCCGAGGAATCTCTTCCTGTGACACV (SEQ ID NO:191) | 1 |
| | 47852 | |
| Invader | GCCCAGAGCGGGAGACAGCGACA (SEQ ID NO:192) | |
| Probe | ATGACGTGGCAGACCGACTTGGATATCAGGTACV (SEQ ID NO:193) | 2 |
| Probe | CGCGCCGAGGTGACTTGGATATCAGGTACTV (SEQ ID NO:194) | 1 |
| | 47855 | |
| Invader | TCGTGGTCCGGCGCATGGCTTCA (SEQ ID NO:195) | |
| Probe | CGCGCCGAGGTATTGGGTGCCAGCAV (SEQ ID NO:196) | 1 |
| Probe | ATGACGTGGCAGACCATTGGGTGCCAGCV (SEQ ID NO:197) | 2 |
| | 47857 | |
| Invader | GTGATCATTCTGATGGTGTGGATTGTGTCAGGCCTTAA (SEQ ID NO:198) | |
| Probe | ATGACGTGGCAGACCCTCCTTCTTGCCCAV (SEQ ID NO:199) | 2 |
| Probe | CGCGCCGAGGTCTCCTTCTTGCCCATTV (SEQ ID NO:200) | 1 |
| | 47867 | |
| Invader | AGCGACACCTTCACGTTGTCCTGGACCT (SEQ ID NO:201) | |
| Probe | ATGACGTGGCAGACGCCGTCTGGTTGTTCV (SEQ ID NO:202) | 2 |
| Probe | CGCGCCGAGGACCGTCTGGTTGTTCCV (SEQ ID NO:203) | 1 |
| | 47868 | |
| Invader | GCGGAGCCAAAGGACCGAGCAGGC (SEQ ID NO:204) | |
| Probe | CGCGCCGAGGTTTAATCCCACAGCCAGV (SEQ ID NO:205) | 1 |
| Probe | ATGACGTGGCAGACGTTAATCCCACAGCCAGV (SEQ ID NO:206) | 2 |
| | 47877 | |
| Invader | GCGTGTCCTCCAGGGTGAACATGTCCCT (SEQ ID NO:207) | |
| Probe | ATGACGTGGCAGACGCTGGACCTGTGTGAV (SEQ ID NO:208) | 2 |
| Probe | CGCGCCGAGGACTGGACCTGTGTGAAV (SEQ ID NO:209) | 1 |

FIGURE 11 (cont'd)

| | | |
|---|---|---|
| | 47878 | |
| Invader | GCATTTGATTGCAGAGCAGCTCCGAGTCCT (SEQ ID NO:210) | |
| Probe | CGCGCCGAGGATCCAGAGCTTCCTGCV (SEQ ID NO:211) | 1 |
| Probe | ATGACGTGGCAGACGTCCAGAGCTTCCTGCV (SEQ ID NO:212) | 2 |
| | 47880 | |
| Invader | GAACAGCTTCACCACGGCGGTCATGTT (SEQ ID NO:213) | |
| Probe | ATGACGTGGCAGACGCTTCTGTCCCCTGGV (SEQ ID NO:214) | 2 |
| Probe | CGCGCCGAGGACTTCTGTCCCCTGGV (SEQ ID NO:215) | 1 |
| | 47885 | |
| Invader | AACCCATAGTTAAGAACGTGGGGTGAGGTACCGC (SEQ ID NO:216) | |
| Probe | CGCGCCGAGGTCCTGCCCTTTGGCV (SEQ ID NO:217) | 1 |
| Probe | ATGACGTGGCAGACACCTGCCCTTTGGCV (SEQ ID NO:218) | 2 |
| | 47887 | |
| Invader | GCTGGAGTGTGCCCAATGCTATATGTCAGTTGAGT (SEQ ID NO:219) | |
| Probe | ATGACGTGGCAGACGTTCTAAGACTTGGAAGCCV (SEQ ID NO:220) | 2 |
| Probe | CGCGCCGAGGATTCTAAGACTTGGAAGCCV (SEQ ID NO:221) | 1 |
| | 47892 | |
| Invader | GGGAACAATCACCTTTTCTCTTTGCCTTTCATACTGCTTTAGACT (SEQ ID NO:222) | |
| Probe | CGCGCCGAGGACCTCACTGCTTCCTAAV (SEQ ID NO:223) | 1 |
| Probe | ATGACGTGGCAGACCCCTCACTGCTTCCTAAV (SEQ ID NO:224) | 2 |
| | 47897 | |
| Invader | TTTGTTCCGGACATCATGTGTATCCCAACCTACCAAAAT (SEQ ID NO:225) | |
| Probe | CGCGCCGAGGAAGTCCTTTCCAGGTAAGGV (SEQ ID NO:226) | 1 |
| Probe | ATGACGTGGCAGACGAGTCCTTTCCAGGTAAGV (SEQ ID NO:227) | 2 |
| | 47899 | |
| Invader | TTTGTGCAGTGGTTGATGAATACCAACAGGAACAGGTAAT (SEQ ID NO:228) | |
| Probe | CGCGCCGAGGAAGTCTAAGCCTGGCTV (SEQ ID NO:229) | 1 |
| Probe | ATGACGTGGCAGACGAGTCTAAGCCTGGCTV (SEQ ID NO:230) | 2 |
| | 47901 | |
| Invader | CAGGCTCAGGTTGTGGTGACACTGGTCACA (SEQ ID NO:231) | |
| Probe | CGCGCCGAGGTGTAGAGCTTCCACTTCTV (SEQ ID NO:232) | 1 |
| Probe | ATGACGTGGCAGACCGTAGAGCTTCCACTTCTV (SEQ ID NO:233) | 2 |
| | 47905 | |
| Invader | TGGCCCTGTGACTATGGCTCTGGCACA (SEQ ID NO:234) | |
| Probe | ATGACGTGGCAGACCACTAGGGTCCTGGCV (SEQ ID NO:235) | 2 |
| Probe | CGCGCCGAGGTACTAGGGTCCTGGCCV (SEQ ID NO:236) | 1 |

FIGURE 11 (cont'd)

| | | |
|---|---|---|
| | 47906 | |
| Invader | CCCATCCTGACCACCATCCGCCGAATCT (SEQ ID NO:237) | |
| Probe | CGCGCCGAGGAGCCTCTTCAATAGCAGTV (SEQ ID NO:238) | 1 |
| Probe | ATGACGTGGCAGACGGCCTCTTCAATAGCAGV (SEQ ID NO:239) | 2 |
| | 47909 | |
| Invader | GGAGTCAAGACCCAGATGTCCCCTGACTTGTT (SEQ ID NO:240) | |
| Probe | ATGACGTGGCAGACGTCACACAAGGAGTCTTCV (SEQ ID NO:241) | 2 |
| Probe | CGCGCCGAGGATCACACAAGGAGTCTTCAV (SEQ ID NO:242) | 1 |
| | 47910 | |
| Invader | CGACTGTCCAGTTAAATGCATCAGAAGTGTTAGCTTCTCCT (SEQ ID NO:243) | |
| Probe | ATGACGTGGCAGACGGAGTTAAAGTCATTACTGTAGAV (SEQ ID NO:244) | 2 |
| Probe | CGCGCCGAGGAGAGTTAAAGTCATTACTGTAGAGV (SEQ ID NO:245) | 1 |
| | 47915 | |
| Invader | GAGACACCTCCCACTCGTCCGGCAA (SEQ ID NO:246) | |
| Probe | CGCGCCGAGGTGTACACAGAGCATGGAV (SEQ ID NO:247) | 1 |
| Probe | ATGACGTGGCAGACCGTACACAGAGCATGGV (SEQ ID NO:248) | 2 |
| | 47917 | |
| Invader | CCAAGGCTGATGACATTGTTGGCCCTGTGT (SEQ ID NO:249) | |
| Probe | CGCGCCGAGGACGCATGAAATCTTTGAGAV (SEQ ID NO:250) | 1 |
| Probe | ATGACGTGGCAGACGCGCATGAAATCTTTGAGV (SEQ ID NO:251) | 2 |
| | 47920 | |
| Invader | CACTCCCAAATTCAATATTGACATATTCCCCCGGGCA (SEQ ID NO:252) | |
| Probe | CGCGCCGAGGTCTTGGGCTCTGGAGV (SEQ ID NO:253) | 1 |
| Probe | ATGACGTGGCAGACCCTTGGGCTCTGGAGV (SEQ ID NO:254) | 2 |
| | 47924 | |
| Invader | CGCCTGGCAGAGGACCCTGCCT (SEQ ID NO:255) | |
| Probe | CGCGCCGAGGAAGCCCAGGTACCGV (SEQ ID NO:256) | 1 |
| Probe | ATGACGTGGCAGACGAGCCCAGGTACCGV (SEQ ID NO:257) | 2 |
| | 47925 | |
| Invader | CCGTGCAGAGTGGTGTGGGCACTTTGAA (SEQ ID NO:258) | |
| Probe | CGCGCCGAGGTGGTGTTGCCAAACTTGV (SEQ ID NO:259) | 1 |
| Probe | ATGACGTGGCAGACCGGTGTTGCCAAACTTV (SEQ ID NO:260) | 2 |
| | 47932 | |
| Invader | GGTTCTCCCGAGAGGTAAAGAACAAAGACTTCAAAGACACTTC (SEQ ID NO:261) | |
| Probe | CGCGCCGAGGTCTTCACTGGTCAGCTCV (SEQ ID NO:262) | 1 |
| Probe | ATGACGTGGCAGACGCTTCACTGGTCAGCV (SEQ ID NO:263) | 2 |

FIGURE 11 (cont'd)

| | | |
|---|---|---|
| | 47941 | |
| Invader | TGTTGAACAGTCTTCAAGGTGGGATCGTAATAATGGCAAAAGT (SEQ ID NO:264) | |
| Probe | CGCGCCGAGGACCTCACCAAGAATTTGGV (SEQ ID NO:265) | 1 |
| Probe | ATGACGTGGCAGACGCCTCACCAAGAATTTGGV (SEQ ID NO:266) | 2 |
| | 47950 | |
| Invader | CAGCAATTTCCTCAAAAGACTTTCCTTTGGTTTCTGGAACTTTAAAAAATGTT (SEQ ID NO:267) | |
| Probe | ATGACGTGGCAGACGAACAGGGTAAAGGCCV (SEQ ID NO:268) | 2 |
| Probe | CGCGCCGAGGAAACAGGGTAAAGGCCAV (SEQ ID NO:269) | 1 |
| | 47960 | |
| Invader | GGCCCAGAAGACCCCCCTCGGAATCT (SEQ ID NO:270) | |
| Probe | CGCGCCGAGGAGAGCAGGGAGGATGV (SEQ ID NO:271) | 1 |
| Probe | ATGACGTGGCAGACGGAGCAGGGAGGATGV (SEQ ID NO:272) | 2 |
| | 47963 | |
| Invader | CTCCATCCGCATCGGCCTCTATGACTCCT (SEQ ID NO:273) | |
| Probe | CGCGCCGAGGATCAAGCAGGTGTACACV (SEQ ID NO:274) | 1 |
| Probe | ATGACGTGGCAGACGTCAAGCAGGTGTACACV (SEQ ID NO:275) | 2 |
| | 47972 | |
| Invader | GGACACTGGTCGGCAATCCTCAGCACAGT (SEQ ID NO:276) | |
| Probe | ATGACGTGGCAGACGACGCCACTTCCCAV (SEQ ID NO:277) | 2 |
| Probe | CGCGCCGAGGCACGCCACTTCCCAV (SEQ ID NO:278) | 1 |
| | 47980 | |
| Invader | CACCAGGCTGCCTTGGCCACAGAAA (SEQ ID NO:279) | |
| Probe | CGCGCCGAGGTACTTACTGAAATGCCCTTGV (SEQ ID NO:280) | 1 |
| Probe | ATGACGTGGCAGACCACTTACTGAAATGCCCTTV (SEQ ID NO:281) | 2 |
| | 47981 | |
| Invader | GCCTCTGACCCCATGGCAGGGGT (SEQ ID NO:282) | |
| Probe | CGCGCCGAGGACAGAGTATTTGAGCAGCV (SEQ ID NO:283) | 1 |
| Probe | ATGACGTGGCAGACGCAGAGTATTTGAGCAGCV (SEQ ID NO:284) | 2 |
| | 47986 | |
| Invader | GCTGGGGCCCCACTGCCCAT (SEQ ID NO:285) | |
| Probe | CGCGCCGAGGATGTCACCTTGGATGGCV (SEQ ID NO:286) | 1 |
| Probe | ATGACGTGGCAGACGTGTCACCTTGGATGGV (SEQ ID NO:287) | 2 |
| | 47987 | |
| Invader | GTTCATCTTTGGTTTTGTGGGCAACATGCTGGTCT (SEQ ID NO:288) | |
| Probe | CGCGCCGAGGATCCTCATCTTAATAAACTGCAV (SEQ ID NO:289) | 1 |
| Probe | ATGACGTGGCAGACGTCCTCATCTTAATAAACTGCAV (SEQ ID NO:290) | 2 |

FIGURE 11(cont'd)

| | | |
|---|---|---|
| | 47994 | |
| Invader | GCTCCACTTTCAACTTGTCCCCCTCCAGCT (SEQ ID NO:291) | |
| Probe | ATGACGTGGCAGACGTCACCTGGGAGGCV (SEQ ID NO:292) | 2 |
| Probe | CGCGCCGAGGATCACCTGGGAGGCV (SEQ ID NO:293) | 1 |
| | 47997 | |
| Invader | GCTCTCTTCATCATAGTGAAGTCTTCCTTATCCAGCATCTTGTTCAA (SEQ ID NO:294) | |
| Probe | CGCGCCGAGGATGAACAAGATGCTGGATAAV (SEQ ID NO:295) | 1 |
| Probe | ATGACGTGGCAGACGTGAACAAGATGCTGGATAV (SEQ ID NO:296) | 2 |
| | 48083 | |
| Invader | GTCCTGTCTCTGCAAATAATGATGCTTTCGAAGTTTCAGTTGAACA (SEQ ID NO:297) | |
| Probe | CGCGCCGAGGTGTCCCTCGCGAAAAV (SEQ ID NO:298) | 1 |
| Probe | ATGACGTGGCAGACCGTCCCTCGCGAAV (SEQ ID NO:299) | 2 |
| | 48088 | |
| Invader | GCCATCTCCTTCTTTGCGCTCCCAGCT (SEQ ID NO:300) | |
| Probe | CGCGCCGAGGAGTAGGTGCCCCGTV (SEQ ID NO:301) | 1 |
| Probe | ATGACGTGGCAGACGGTAGGTGCCCCGV (SEQ ID NO:302) | 2 |
| | 48094 | |
| Invader | GGCAGGATGAAAACACTTACGTCGGAGGATCTCTCT (SEQ ID NO:303) | |
| Probe | ATGACGTGGCAGACGTTGCTTTCTGACGTACCV (SEQ ID NO:304) | 2 |
| Probe | CGCGCCGAGGATTGCTTTCTGACGTACCV (SEQ ID NO:305) | 1 |
| | 48095 | |
| Invader | GGAGCCAAGCACTGCTCCTCCCACT (SEQ ID NO:306) | |
| Probe | ATGACGTGGCAGACGGCCAGCATGAGGCV (SEQ ID NO:307) | 2 |
| Probe | CGCGCCGAGGAGCCAGCATGAGGCV (SEQ ID NO:308) | 1 |
| | 48097 | |
| Invader | CGCGTTCAGTCCGTGCATGCGGTTCT (SEQ ID NO:309) | |
| Probe | ATGACGTGGCAGACCGCTCCCGGGCV (SEQ ID NO:310) | 2 |
| Probe | CGCGCCGAGGAGCTCCCGGGCV (SEQ ID NO:311) | 1 |
| | 53412 | |
| Invader | TGGATTATCTAAATGAAACACAGCAGCTTACTCCAGAGT (SEQ ID NO:312) | |
| Probe | CGCGCCGAGGATCAAGTCCAAGGCCAV (SEQ ID NO:313) | 1 |
| Probe | ATGACGTGGCAGACGTCAAGTCCAAGGCCAV (SEQ ID NO:314) | 2 |
| | 53415 | |
| Invader | CGGCTTGCAGACACCGTGGAAGGTTCTA (SEQ ID NO:315) | |
| Probe | ATGACGTGGCAGACCCTGGGACTGCTGGV (SEQ ID NO:316) | 2 |
| Probe | CGCGCCGAGGTCTGGGACTGCTGGV (SEQ ID NO:317) | 1 |

FIGURE 11 (cont'd)

| | | |
|---|---|---|
| | 53418 | |
| Invader | CCATGGGGTCCCATGCTGGCAGGATAAA (SEQ ID NO:318) | |
| Probe | CGCGCCGAGGTGGGTTCCTGCTCTAACV (SEQ ID NO:319) | 1 |
| Probe | ATGACGTGGCAGACCGGGTTCCTGCTCTAAV (SEQ ID NO:320) | 2 |
| | 53433 | |
| Invader | CTCCCTGCAGGTCACAGTCACCACCATCT (SEQ ID NO:321) | |
| Probe | CGCGCCGAGGAGCTATGGGGACAAGGV (SEQ ID NO:322) | 1 |
| Probe | ATGACGTGGCAGACGGCTATGGGGACAAGGV (SEQ ID NO:323) | 2 |
| | 53444 | |
| Invader | GCCTGGTCCCCAAGGTAGGGGCT (SEQ ID NO:324) | |
| Probe | ATGACGTGGCAGACCAGGTCGAGGTAGCAGV (SEQ ID NO:325) | 2 |
| Probe | CGCGCCGAGGAAGGTCGAGGTAGCAGV (SEQ ID NO:326) | 1 |
| | 53445 | |
| Invader | CCCTACCTTGGGGACCAGGCCCTTGA (SEQ ID NO:327) | |
| Probe | ATGACGTGGCAGACCGCTGTGGAACCAGV (SEQ ID NO:328) | 2 |
| Probe | CGCGCCGAGGTGCTGTGGAACCAGGV (SEQ ID NO:329) | 1 |
| | 53459 | |
| Invader | GGGAGGACAATCCTGTGGAAAGGAAGGTTTTTATAATGTGTTT (SEQ ID NO:330) | |
| Probe | ATGACGTGGCAGACCTGAGAAGGAGGGTGACV (SEQ ID NO:331) | 2 |
| Probe | CGCGCCGAGGATGAGAAGGAGGGTGACV (SEQ ID NO:332) | 1 |
| | 53464 | |
| Invader | CCTGTCTGTATCCAGCTTTGCAGTTGGTGGAATGAA (SEQ ID NO:333) | |
| Probe | ATGACGTGGCAGACCTGCATCATTCTTTGGTGV (SEQ ID NO:334) | 2 |
| Probe | CGCGCCGAGGTTGCATCATTCTTTGGTGGV (SEQ ID NO:335) | 1 |
| | 53470 | |
| Invader | GGAAAGAAGAAAGAGCAGAGGAGGGAGATTGGAAGTAGAAATGT (SEQ ID NO:336) | |
| Probe | CGCGCCGAGGATGAATGCAGAGGCAAAAV (SEQ ID NO:337) | 1 |
| Probe | ATGACGTGGCAGACCTGAATGCAGAGGCAAAV (SEQ ID NO:338) | 2 |
| | 53475 | |
| Invader | GGCACAAACCAGATAATATTAAGGGAAATTTGGAATTCAGAAATGTTCACTTCAT (SEQ ID NO:339) | |
| Probe | CGCGCCGAGGATTACCCATCTCGAAAAGAAGV (SEQ ID NO:340) | 1 |
| Probe | ATGACGTGGCAGACGTTACCCATCTCGAAAAGAAV (SEQ ID NO:341) | 2 |
| | 53478 | |
| Invader | TCCCACCCCCACTGGACTCACCACT (SEQ ID NO:342) | |
| Probe | ATGACGTGGCAGACGTGATGGCAGGTGAAGV (SEQ ID NO:343) | 2 |
| Probe | CGCGCCGAGGATGATGGCAGGTGAAGV (SEQ ID NO:344) | 1 |

FIGURE 11 (cont'd)

| | | |
|---|---|---|
| | 53488 | |
| Invader | GGTGCCGGCAGGCAAGATAGACAGCT (SEQ ID NO:345) | |
| Probe | ATGACGTGGCAGACGGTGGAGTAGAAGAGCTV (SEQ ID NO:346) | 2 |
| Probe | CGCGCCGAGGAGTGGAGTAGAAGAGCTGV (SEQ ID NO:347) | 1 |
| | 53503 | |
| Invader | GGTTCAGTCCACATAATGCATTTTCTCCTTCAATTCTGAAAAGTAGCTAAC (SEQ ID NO:348) | |
| Probe | CGCGCCGAGGTGCTCATTTGGTAGTGAAGV (SEQ ID NO:349) | 1 |
| Probe | ATGACGTGGCAGACGGCTCATTTGGTAGTGAAGV (SEQ ID NO:350) | 2 |
| | 53522 | |
| Invader | CGGCCACTGAGGGAGAAGGCCACT (SEQ ID NO:351) | |
| Probe | ATGACGTGGCAGACGGACGTGATGCCGV (SEQ ID NO:352) | 2 |
| Probe | CGCGCCGAGGAGACGTGATGCCGCV (SEQ ID NO:353) | 1 |
| | 53528 | |
| Invader | GGGTCTCCACCACGGCTTTCTGGTGGT (SEQ ID NO:354) | |
| Probe | ATGACGTGGCAGACGCCGCCTCCTCAGV (SEQ ID NO:355) | 2 |
| Probe | CGCGCCGAGGACCGCCTCCTCAGV (SEQ ID NO:356) | 1 |
| | 53529 | |
| Invader | CTGAGCCATGGTGGCCATGAAGGGGA (SEQ ID NO:357) | |
| Probe | CGCGCCGAGGTTCTGGGTCACATGGCV (SEQ ID NO:358) | 1 |
| Probe | ATGACGTGGCAGACCTCTGGGTCACATGGCV (SEQ ID NO:359) | 2 |
| | 53530 | |
| Invader | GGTGCCTTCTGATGGGGACGTGTCTGCT (SEQ ID NO:360) | |
| Probe | ATGACGTGGCAGACGCCAGGAGAGAAGGGV (SEQ ID NO:361) | 2 |
| Probe | CGCGCCGAGGACCAGGAGAGAAGGGAV (SEQ ID NO:362) | 1 |
| | 53540 | |
| Invader | CTGCCTTGTACCAGCATTACAAATAATCCAGCCACAAAT (SEQ ID NO:363) | |
| Probe | ATGACGTGGCAGACGTAAATGCTTTTCATTTCTGCTV (SEQ ID NO:364) | 2 |
| Probe | CGCGCCGAGGATAAATGCTTTTCATTTCTGCTV (SEQ ID NO:365) | 1 |
| | 53544 | |
| Invader | ACCAACGTTGACATGCACGTCCAGAATTGAGGT (SEQ ID NO:366) | |
| Probe | ATGACGTGGCAGACGGAGGTTGCCTTTGCV (SEQ ID NO:367) | 2 |
| Probe | CGCGCCGAGGAGAGGTTGCCTTTGCTV (SEQ ID NO:368) | 1 |
| | 53551 | |
| Invader | ACACTAAGGTCTCATCAGGGTTTGGGTGGCAT (SEQ ID NO:369) | |
| Probe | ATGACGTGGCAGACGAAGGAATGGAACCAGGV (SEQ ID NO:370) | 2 |
| Probe | CGCGCCGAGGAAAGGAATGGAACCAGGV (SEQ ID NO:371) | 1 |

FIGURE 11 (cont'd)

| | | |
|---|---|---|
| | 53553 | |
| Invader | CCTAGATGCCCTGCAGAATCCTTCCTGTTACGGA (SEQ ID NO:372) | |
| Probe | ATGACGTGGCAGACCCCCCCTCCCTGAV (SEQ ID NO:373) | 2 |
| Probe | CGCGCCGAGGTCCCCCTCCCTGAAV (SEQ ID NO:374) | 1 |
| | 53557 | |
| Invader | GCACTGGCCACCCGGGACGCT (SEQ ID NO:375) | |
| Probe | CGCGCCGAGGCCCCCCAAGGAAGGV (SEQ ID NO:376) | 1 |
| Probe | ATGACGTGGCAGACGCCCCCAAGGAAGGV (SEQ ID NO:377) | 2 |
| | 54762 | |
| Invader | CAGGGGTGGATGGTCTCTCACTCCCCT (SEQ ID NO:378) | |
| Probe | ATGACGTGGCAGACGGGCCTGTATTCAGTCV (SEQ ID NO:379) | 2 |
| Probe | CGCGCCGAGGCGGCCTGTATTCAGTCV (SEQ ID NO:380) | 1 |
| | 54777 | |
| Invader | TGGTGACCCTGCCCAGATGTGAAGTGTACAT (SEQ ID NO:381) | |
| Probe | CGCGCCGAGGACTCTGTGTTGGGGAGV (SEQ ID NO:382) | 1 |
| Probe | ATGACGTGGCAGACGCTCTGTGTTGGGGAV (SEQ ID NO:383) | 2 |
| | 54874 | |
| Invader | CTCAGCCTTAAAAAGACCTCCAGGGCTTGATGCA (SEQ ID NO:384) | |
| Probe | CGCGCCGAGGTGGTATGTTGTCAGGCTV (SEQ ID NO:385) | 1 |
| Probe | ATGACGTGGCAGACCGGTATGTTGTCAGGCV (SEQ ID NO:386) | 2 |
| | 54915 | |
| Invader | GCTGGAGGAGGCTATGAGAAGTGAGGTTTGCAT (SEQ ID NO:387) | |
| Probe | CGCGCCGAGGAGAAGAAAGAGGGGCAGV (SEQ ID NO:388) | 1 |
| Probe | ATGACGTGGCAGACGGAAGAAAGAGGGGCAV (SEQ ID NO:389) | 2 |
| | 55560 | |
| Invader | CAATGGGACGCCATAGAGGGCTTTTGAGTAGACATATT (SEQ ID NO:390) | |
| Probe | CGCGCCGAGGATCAGTGTAGAAGGGTGAAV (SEQ ID NO:391) | 1 |
| Probe | ATGACGTGGCAGACGTCAGTGTAGAAGGGTGAV (SEQ ID NO:392) | 2 |
| | 66865 | |
| Invader | ACACATGTGTTTCATTTTTAGTTTTGTTAAAAAAAAATTCTGACAAATCAT (SEQ ID NO:393) | |
| Probe | ATGACGTGGCAGACGAAATGGGGGTTCAGGV (SEQ ID NO:394) | 2 |
| Probe | CGCGCCGAGGAAAATGGGGGTTCAGGAV (SEQ ID NO:395) | 1 |
| | 66902 | |
| Invader | GGAGGAGAGCAGGCATTGGGCTAAGGAGC (SEQ ID NO:396) | |
| Probe | ATGACGTGGCAGACGGGGCAGTGGGCV (SEQ ID NO:397) | 2 |
| Probe | CGCGCCGAGGTGGGCAGTGGGCV (SEQ ID NO:398) | 1 |

FIGURE 11 (cont'd)

| | | |
|---|---|---|
| | 66934 | |
| Invader | GGGACCCATTCCTGTGTAATACAATGTCTGCACCAT (SEQ ID NO:399) | |
| Probe | CGCGCCGAGGATGCTAATAAAGTCCTATTCTCTTV (SEQ ID NO:400) | 1 |
| Probe | ATGACGTGGCAGACGTGCTAATAAAGTCCTATTCTCTV (SEQ ID NO:401) | 2 |
| | 66938 | |
| Invader | GACAGAGGCTTCTAGAGGGGCCAGCAGT (SEQ ID NO:402) | |
| Probe | ATGACGTGGCAGACGTTTGGGGAGACTTGGV (SEQ ID NO:403) | 2 |
| Probe | CGCGCCGAGGATTTGGGGAGACTTGGGV (SEQ ID NO:404) | 1 |
| | 66984 | |
| Invader | CCTCCAGGCTGGCCCCCTAGATTGCT (SEQ ID NO:405) | |
| Probe | ATGACGTGGCAGACGTCTGCTCCTGGCAV (SEQ ID NO:406) | 2 |
| Probe | CGCGCCGAGGATCTGCTCCTGGCATV (SEQ ID NO:407) | 1 |
| | 66985 | |
| Invader | TGGACTCTGAGCCCCACCTGCGAGA (SEQ ID NO:408) | |
| Probe | ATGACGTGGCAGACCCCCTAGAATCACAGAGAV (SEQ ID NO:409) | 2 |
| Probe | CGCGCCGAGGTCCCTAGAATCACAGAGAGV (SEQ ID NO:410) | 1 |
| | 67309 | |
| Invader | GGGTGCTGTCCACACTGGCTCCCT (SEQ ID NO:411) | |
| Probe | ATGACGTGGCAGACGTCAGGGAGCAGCCV (SEQ ID NO:412) | 2 |
| Probe | CGCGCCGAGGATCAGGGAGCAGCCV (SEQ ID NO:413) | 1 |
| | 67320 | |
| Invader | TCATGAACAGCAAAGGCGTGAGCCTCTTCGT (SEQ ID NO:414) | |
| Probe | CGCGCCGAGGACATCATCAACCCTGAGAV (SEQ ID NO:415) | 1 |
| Probe | ATGACGTGGCAGACGCATCATCAACCCTGAGV (SEQ ID NO:416) | 2 |
| | 67325 | |
| Invader | GGTGGGGCTGGGCTGCTAGGGT (SEQ ID NO:417) | |
| Probe | ATGACGTGGCAGACGATCCAGATGGCATGTGV (SEQ ID NO:418) | 2 |
| Probe | CGCGCCGAGGAATCCAGATGGCATGTGV (SEQ ID NO:419) | 1 |
| | 67329 | |
| Invader | CTTGGGCCACGGAGGGCAATGACCT (SEQ ID NO:420) | |
| Probe | CGCGCCGAGGAAGGGTGCCCCTGV (SEQ ID NO:421) | 1 |
| Probe | ATGACGTGGCAGACGAGGGTGCCCCTGV (SEQ ID NO:422) | 2 |
| | 67340 | |
| Invader | AGTGTGGTGCAGAAAACCCTTCACCCCCT (SEQ ID NO:423) | |
| Probe | ATGACGTGGCAGACGTGTCAAAAGGAGCTGACV (SEQ ID NO:424) | 2 |
| Probe | CGCGCCGAGGATGTCAAAAGGAGCTGACV (SEQ ID NO:425) | 1 |

FIGURE 11 (cont'd)

| | | |
|---|---|---|
| | 67342 | |
| Invader | GGTCTCTACCTTGGGTGCTGTTCTCTGCCTCT (SEQ ID NO:426) | |
| Probe | CGCGCCGAGGAGGAGCTCTCTGTCAATTV (SEQ ID NO:427) | 1 |
| Probe | ATGACGTGGCAGACGGGAGCTCTCTGTCAAV (SEQ ID NO:428) | 2 |
| | 67356 | |
| Invader | GTAGGGAGAAGTGCGGCACAGCTAAAGGAGT (SEQ ID NO:429) | |
| Probe | ATGACGTGGCAGACGAGCGCCTGCACCV (SEQ ID NO:430) | 2 |
| Probe | CGCGCCGAGGAAGCGCCTGCACCV (SEQ ID NO:431) | 1 |
| | 67363 | |
| Invader | GCTACGTTTTCTTCTCAGTTGAACAGACACGGTAGAAGACTCC (SEQ ID NO:432) | |
| Probe | ATGACGTGGCAGACGCCCATTTTGGAATGTGAV (SEQ ID NO:433) | 2 |
| Probe | CGCGCCGAGGTCCCATTTTGGAATGTGACV (SEQ ID NO:434) | 1 |
| | 67371 | |
| Invader | CATGACCAGGGTGCAAGCACTGGGCT (SEQ ID NO:435) | |
| Probe | ATGACGTGGCAGACGTTGTTCTGTGGGAGTAGV (SEQ ID NO:436) | 2 |
| Probe | CGCGCCGAGGATTGTTCTGTGGGAGTAGGV (SEQ ID NO:437) | 1 |
| | 67382 | |
| Invader | GGAGAGGACACCAGGGTGGGGGTT (SEQ ID NO:438) | |
| Probe | ATGACGTGGCAGACGAAGGAGACACTACTGCCV (SEQ ID NO:439) | 2 |
| Probe | CGCGCCGAGGAAAGGAGACACTACTGCCV (SEQ ID NO:440) | 1 |
| | 87801 | |
| Invader | GCGGAGAGACAGGGAGATGACGCCTTAAAGT (SEQ ID NO:441) | |
| Probe | ATGACGTGGCAGACGGTCCGCGACATGV (SEQ ID NO:442) | 2 |
| Probe | CGCGCCGAGGAGTCCGCGACATGCV (SEQ ID NO:443) | 1 |

FIGURE 12a

| SNP number | forward primer sequence | reverse primer sequence |
|---|---|---|
| 29017 | ttggaaattggtttgttttgccttttattgaaa (SEQ ID NO:444) | gccttaaacacactcagaaggtagaaaac (SEQ ID NO:445) |
| 29043 | cgggctacccatgggaca (SEQ ID NO:446) | gtcttctggtattaagccgtaatttgca (SEQ ID NO:447) |
| 34573 | cagtntcaccagctgtggtagaacca (SEQ ID NO:448) | aagaggagcatcactgtgaccca (SEQ ID NO:449) |
| 37319 | tcccttcctcagattatattcatcccagaaa (SEQ ID NO:450) | tcaaccccctgacattatcttggatcc (SEQ ID NO:451) |
| 37474 | cactccccaacatctcatttattttcaca (SEQ ID NO:452) | gtcatggcaatcagttggtgaaagca (SEQ ID NO:453) |
| 37810 | tcttctttagactgccacgaggaaaaa (SEQ ID NO:454) | gggagatgaggtactcactagttaaca (SEQ ID NO:455) |
| 37879 | ccctgaggaactcacgcagac (SEQ ID NO:456) | gcacctctttgcgcaggaaga (SEQ ID NO:457) |
| 41064 | agtggtggcgctctcacaaa (SEQ ID NO:458) | catttgttcaggcattacagtaaaatgcca (SEQ ID NO:459) |
| 41164 | cagggacaatcccatcccca (SEQ ID NO:460) | gtgaattgtccatgatgagagccactac (SEQ ID NO:461) |
| 41365 | tgtcccagactgggtcagca (SEQ ID NO:462) | gaatgaagaaggtactgtgggcca (SEQ ID NO:463) |
| 41408 | ctggaaacttctgccagattgttccta (SEQ ID NO:464) | caaaggactccttgtcccctagaa (SEQ ID NO:465) |
| 41409 | ggtcctttgcgcaaaggca (SEQ ID NO:466) | tttcagctcccctcctccca (SEQ ID NO:467) |
| 41420 | gtctgccttctcacagctttcc (SEQ ID NO:468) | aggtgtaacttgagtctctgcctaac (SEQ ID NO:469) |
| 41452 | agctgctgggccagca (SEQ ID NO:470) | caagctttaaaggcagtcgacattaaga (SEQ ID NO:471) |
| 41475 | gccagggatctagggctcc (SEQ ID NO:472) | cccgtcctacccagacga (SEQ ID NO:473) |
| 41541 | tcctgctgacattccgcca (SEQ ID NO:474) | ggtgcaccacccattccca (SEQ ID NO:475) |
| 41646 | gcaatcctggttaaggacttaagaattgtca (SEQ ID NO:476) | acaaaccaacgccacttcctaac (SEQ ID NO:477) |
| 44901 | ctcaatccatgcctcttgccc (SEQ ID NO:478) | cttgccaacccagcttccca (SEQ ID NO:479) |
| 44907 | cagcgtggcagagtggc (SEQ ID NO:480) | actctacgatgtgggcatttcagaga (SEQ ID NO:481) |
| 44927 | gcgcacctgtccgtagca (SEQ ID NO:482) | gccccaacaagctctcactca (SEQ ID NO:483) |
| 45046 | gaagagggtgaatactataaaaatagacttaccttcc (SEQ ID NO:484) | ttggctcaaatcgtgggataattctaagaaa (SEQ ID NO:485) |
| 45076 | ccaccgccacctccga (SEQ ID NO:486) | gacccagcagaggtccgaa (SEQ ID NO:487) |
| 45080 | tttcaaaactatcaggacctttatcattcataggaaataa (SEQ ID NO:488) | ttttaagatacctttccaagttctccctca (SEQ ID NO:489) |
| 47848 | cagagctggaggctagaaataaattactcaaa (SEQ ID NO:490) | tctcttcaggtcggaatggatcttgaa (SEQ ID NO:491) |
| 47850 | gacttacattaggcagtgactcgatgaa (SEQ ID NO:492) | cattgctgagaacattgcctatggaga (SEQ ID NO:493) |
| 47852 | ccctggagggagttgaccc (SEQ ID NO:494) | gctcagtatgcctttcctcccc (SEQ ID NO:495) |
| 47854 | aggtatttcgacgaccagaatcaacc (SEQ ID NO:496) | ggaaaaaacttttaagttttctcaataaatatcctttaattttttctttttaa (SEQ ID NO:497) |

FIGURE 12b

| | | |
|---|---|---|
| 47855 | gcaacccgggaacggca (SEQ ID NO:498) | tcgtccctttcctgcgtgac (SEQ ID NO:499) |
| 47857 | cctgctgaccaagaataaggccc (SEQ ID NO:500) | cattggcatagcagttgatggcttcc (SEQ ID NO:501) |
| 47867 | catcagcatcggttctgccc (SEQ ID NO:502) | ggcgatgctcagcccgaa (SEQ ID NO:503) |
| 47868 | tccctctgtttctttccctcacaga (SEQ ID NO:504) | ggttgctgaagttgtgtgtgatcac (SEQ ID NO:505) |
| 47877 | ttccttagattcttctttggagcagaataaaaga (SEQ ID NO:506) | cacaccatgtgaggtcatcagcaa (SEQ ID NO:507) |
| 47878 | gctccagggaggactcacca (SEQ ID NO:508) | catgacctcagggatgcccaca (SEQ ID NO:509) |
| 47880 | ggcccgaacatagtaattcctggtaaa (SEQ ID NO:510) | cgagtgggagaggccca (SEQ ID NO:511) |
| 47885 | tgtattacataaaccctactccaaacaaatgca (SEQ ID NO:512) | gccagcaaacacatccaggaaca (SEQ ID NO:513) |
| 47887 | cgtttcttccatccttccaggatttgaa (SEQ ID NO:514) | acctctctgtgctttctgtatcctca (SEQ ID NO:515) |
| 47889 | caagatattattttcttgtttgtagagatattcatgatctaaagaga (SEQ ID NO:516) | ccttgacaataatgatgaaaaaatgaatgaatgttagtataatatcattca (SEQ ID NO:517) |
| 47892 | caggcaactggaactgaaaccc (SEQ ID NO:518) | ctcagcttccaagggccattca (SEQ ID NO:519) |
| 47895 | ggctggacatccacttcatccac (SEQ ID NO:520) | cgtagaaagagccgggcca (SEQ ID NO:521) |
| 47897 | agaatcggctgtctttgatgctgtaa (SEQ ID NO:522) | cttatacttttagaaaaaagaagacattatcaagatattcatttttgtca (SEQ ID NO:523) |
| 47899 | acgagcataagaacttaataatgtcaagagaaatttttaga (SEQ ID NO:524) | tgactacagcaagtatctggactcca (SEQ ID NO:525) |
| 47901 | acaggtcccctccgctca (SEQ ID NO:526) | ggccaggcacaggctgaaa (SEQ ID NO:527) |
| 47905 | ccagagccactacctttgtcca (SEQ ID NO:528) | ggtgtcttaggagagaaaaaaaggtagaaaaa (SEQ ID NO:529) |
| 47906 | tgaccaaatgccctcaccttca (SEQ ID NO:530) | cacaatatgctggatgactcctcagac (SEQ ID NO:531) |
| 47909 | tggttgttgaggtccctgaatcc (SEQ ID NO:532) | cagggtccagctggagca (SEQ ID NO:533) |
| 47910 | gagaggcacccttcacaggaaa (SEQ ID NO:534) | aagaaaatacttctttgagctcaactacgaac (SEQ ID NO:535) |
| 47915 | gaaggagccctgcccca (SEQ ID NO:536) | agacccccaagggatcctcc (SEQ ID NO:537) |
| 47917 | ttcggctcctgccacatcaa (SEQ ID NO:538) | tgcctctcacttcctctccttaca (SEQ ID NO:539) |
| 47920 | gtagccagactgatcactcccaaa (SEQ ID NO:540) | gcagcagcagcagcagca (SEQ ID NO:541) |
| 47922 | gacgttgccgaagcccac (SEQ ID NO:542) | agataggcaaaccctacaacagca (SEQ ID NO:543) |
| 47924 | cacaaagcgggccctcc (SEQ ID NO:544) | ccccgaggaatacgtgctgac (SEQ ID NO:545) |
| 47925 | cagtaggctgtggtcctcatca (SEQ ID NO:546) | gcccattgtagctgaggaggac (SEQ ID NO:547) |
| 47927 | gggtgctggtctcataggtctca (SEQ ID NO:548) | agctcctacatcaccagtgagatcc (SEQ ID NO:549) |
| 47932 | ccggtttggttctcccgaga (SEQ ID NO:550) | cccaaggaggagctgctgaaga (SEQ ID NO:551) |
| 47937 | tgaatccccaagcccgtcc (SEQ ID NO:552) | ggcacacgagcagggaca (SEQ ID NO:553) |
| 47941 | gctcaggaacttcaggattgctacc (SEQ ID NO:554) | agaaacaaagtagatgcatttgattcaagtttcttaaaa (SEQ ID NO:555) |
| 47950 | ggaattctgcagcaatttcctcaaaagac (SEQ ID NO:556) | gacttctgtggaccttatgtgtttttcc (SEQ ID NO:557) |
| 47960 | cagggtcctacacacaaatcagtca (SEQ ID NO:558) | ccttctgtctcggtttcttctcca (SEQ ID NO:559) |

FIGURE 12C

| | | |
|---|---|---|
| 47963 | gttcagggacctggtcactcac (SEQ ID NO:560) | ggcctgcagcgccaga (SEQ ID NO:561) |
| 47972 | agggcgttggcgttttcc (SEQ ID NO:562) | agggcttgatggcctctcaga (SEQ ID NO:563) |
| 47980 | agcctacccatcttccattcctca (SEQ ID NO:564) | gccaggccccttaggac (SEQ ID NO:565) |
| 47981 | gcttctgcactgaaagggctca (SEQ ID NO:566) | ccacatggcctaccctccc (SEQ ID NO:567) |
| 47986 | gcctgtgcccagcagca (SEQ ID NO:568) | gcctaccctggcagccc (SEQ ID NO:569) |
| 47987 | caactcctgcctccgctctac (SEQ ID NO:570) | gccaggttgagcaggtaaatgtca (SEQ ID NO:571) |
| 47994 | ccactctcctcctacactgtccc (SEQ ID NO:572) | aggcccccatcgatctccc (SEQ ID NO:573) |
| 47997 | gcaaagatggctctcttcatcatagtgaa (SEQ ID NO:574) | cgttctcacatgcatgccccc (SEQ ID NO:575) |
| 48083 | accaaaatcgaggtggccca (SEQ ID NO:576) | catcagaaagaaaaatgaatctgcaacttcaatagtca (SEQ ID NO:577) |
| 48088 | caggaccccagctgtccaa (SEQ ID NO:578) | cgggaagaccatcgcctcc (SEQ ID NO:579) |
| 48094 | gcacccctatgaagacccagaa (SEQ ID NO:580) | caaaggtcacttcaggttgaggca (SEQ ID NO:581) |
| 48095 | tccagtgttgtagccaaactgca (SEQ ID NO:582) | gtgtggtttgtttctccgcagaa (SEQ ID NO:583) |
| 48097 | ggcaccaccttgcgca (SEQ ID NO:584) | cgcctggagcgttttaaattgaga (SEQ ID NO:585) |
| 53412 | gttgaaataacattcaagttttcccttactcaagtaa (SEQ ID NO:586) | cagaatatggtcctctttgctcctaaca (SEQ ID NO:587) |
| 53415 | cagcagaaccacgggcac (SEQ ID NO:588) | ccacacgcttccctctaattggac (SEQ ID NO:589) |
| 53418 | agctggagggcagtatcactca (SEQ ID NO:590) | ggtggacaggaagcatgtccc (SEQ ID NO:591) |
| 53433 | gaggcgatggtcttcccga (SEQ ID NO:592) | ccgtggctgaccactgtcc (SEQ ID NO:593) |
| 53444 | cgagctgcggccattctca (SEQ ID NO:594) | acctggttccacagcgcaa (SEQ ID NO:595) |
| 53445 | gaccgtctgctacctcgacc (SEQ ID NO:596) | caagattcccatttggaggaacggaa (SEQ ID NO:597) |
| 53459 | agcagctaataataaaccagtaatttgggatagac (SEQ ID NO:598) | gtgactccgagggcagaca (SEQ ID NO:599) |
| 53464 | gtttatgcttatttatgaaatttgcctaccttccaa (SEQ ID NO:600) | ggcagctgctcaactaatcacca (SEQ ID NO:601) |
| 53470 | ctgtctgctcctctctcatcatcc (SEQ ID NO:602) | ggacagaagcaagtctgcagatca (SEQ ID NO:603) |
| 53475 | tctacaagaaaacatcagaaactcttcattcaataga (SEQ ID NO:604) | gaagccaagtattgacagctattcgaaga (SEQ ID NO:605) |
| 53478 | gggaagggtcaggaaagcca (SEQ ID NO:606) | cgagagcggattgagttcctcaa (SEQ ID NO:607) |
| 53488 | gagccacgagctcccaca (SEQ ID NO:608) | ggtagccctttaaaaggcctcc (SEQ ID NO:609) |
| 53489 | cttcttaataagcacctccttggcca (SEQ ID NO:610) | cagacacggccatatgcataacaac (SEQ ID NO:611) |
| 53503 | tgacatgttcgaaacctgtccataaagtaa (SEQ ID NO:612) | ggaaagaaaagcttttgttcagagctttagaaaa (SEQ ID NO:613) |
| 53517 | gcaagttctgaatgtaacaaattctcctttcc (SEQ ID NO:614) | gcaaagcactgtatgatttttatttaataggaagaca (SEQ ID NO:615) |
| 53522 | gctgatctgcttctcccacga (SEQ ID NO:616) | agtcgtcgtagccagcgaa (SEQ ID NO:617) |
| 53528 | gcagggctccttactgcagaa (SEQ ID NO:618) | cacgccacccatcctcaaaga (SEQ ID NO:619) |
| 53529 | gcacagggcgctcacc (SEQ ID NO:620) | cctaccagcagccgctca (SEQ ID NO:621) |

FIGURE 12d

| | | |
|---|---|---|
| 53530 | aggctcccttagatgcctgaca (SEQ ID NO:622) | cagggcgctgacaccca (SEQ ID NO:623) |
| 53540 | atttctcctctgtgtcttgaagggaac (SEQ ID NO:624) | ctgcccccctcaccctac (SEQ ID NO:625) |
| 53544 | cctttcatttttcccggcacaga (SEQ ID NO:626) | gggaacttctttcccctcgca (SEQ ID NO:627) |
| 53550 | ggagtttctgtcctgggaggaaaaa (SEQ ID NO:628) | aacactcgtgaagctggcca (SEQ ID NO:629) |
| 53551 | ggccacagagcctggaga (SEQ ID NO:630) | cggcttgcctgtgcagtca (SEQ ID NO:631) |
| 53553 | gccagccccttcctttcc (SEQ ID NO:632) | acactgccaggagacacagaac (SEQ ID NO:633) |
| 53557 | ggagcagatcctggcaaagatcc (SEQ ID NO:634) | cgtactgcacaaacttgctgca (SEQ ID NO:635) |
| 54762 | ggtgtaggtagagataagaagagtgatactca (SEQ ID NO:636) | gctggtgacttgccccaga (SEQ ID NO:637) |
| 54777 | tgtcataatgcagtgggattgcca (SEQ ID NO:638) | caagctggcaatggtggacaca (SEQ ID NO:639) |
| 54874 | cttcattgctactgcatatctaaaatcatttatttatttatcca (SEQ ID NO:640) | actataaaacatgaaaatatgctatcagttttagaatgttatcca (SEQ ID NO:641) |
| 54915 | ttttaactctctgctgttccctcacc (SEQ ID NO:642) | actgacagggaatctccagaagtca (SEQ ID NO:643) |
| 54918 | cttcttggtgcatactaagtgctcaataaa (SEQ ID NO:644) | catcttttcaaaagtaagaagtacgtatgaagaaaca (SEQ ID NO:645) |
| 54966 | ggtcagccaacttgtattgagcaa (SEQ ID NO:646) | gaaactaatgcctttatcttatttgtctgttgacc (SEQ ID NO:647) |
| 55560 | gacctgatttgattgagagccttgaac (SEQ ID NO:648) | acaagccctggactagatgatttctaaga (SEQ ID NO:649) |
| 56733 | tctttctcaaatcaaaccctcgtccc (SEQ ID NO:650) | ggccccactgtattagagaggac (SEQ ID NO:651) |
| 66854 | cggagggaccttgggca (SEQ ID NO:652) | caccgagccacccatgtgtaa (SEQ ID NO:653) |
| 66865 | ggtgatgcaaaagatggaagcca (SEQ ID NO:654) | ccattttggaatgtgaccgtctgtcc (SEQ ID NO:655) |
| 66902 | gagagggtcatgcagtggca (SEQ ID NO:656) | tccggtgctccatggatgaca (SEQ ID NO:657) |
| 66934 | gccatactgcagcactttaaaggac (SEQ ID NO:658) | ctgctgtgatttatctgctgaaagctca (SEQ ID NO:659) |
| 66938 | catctaactgctccccagtcaca (SEQ ID NO:660) | gccctcggtcctccaggaa (SEQ ID NO:661) |
| 66984 | ccacccacccaggacacac (SEQ ID NO:662) | ccccaacggccaggcaaa (SEQ ID NO:663) |
| 66985 | ggacaaatgttctgggtctctaatattccaa (SEQ ID NO:664) | gggtgggacggagtccc (SEQ ID NO:665) |
| 67309 | gtttgccttaccttggaagtggac (SEQ ID NO:666) | tgctgagaagattgacaggttcatgca (SEQ ID NO:667) |
| 67320 | ctgccccagggctcga (SEQ ID NO:668) | ggcctctctccccaggaaca (SEQ ID NO:669) |
| 67321 | agagcttcctgcagtcaatgatcac (SEQ ID NO:670) | caaggtgaaatgggaagctctgtca (SEQ ID NO:671) |
| 67325 | ctcagcctgatgggagacga (SEQ ID NO:672) | agtttcctccctcctcccca (SEQ ID NO:673) |
| 67329 | ggcccagccactgacca (SEQ ID NO:674) | cttcttggctgttgtttctgttccc (SEQ ID NO:675) |
| 67330 | cccgactgtgccgcca (SEQ ID NO:676) | gcccttttttccaggtctgacaac (SEQ ID NO:677) |
| 67340 | cctctcaatgggtcacttggcaa (SEQ ID NO:678) | gtccaaatttctgttgggttcagtgaaa (SEQ ID NO:679) |
| 67342 | gaagggccaatagccctccc (SEQ ID NO:680) | gccccagccaagaaaggtcaa (SEQ ID NO:681) |
| 67356 | ttctcctggcctgtagggagaa (SEQ ID NO:682) | ccctcgtcacttcctctgtcc (SEQ ID NO:683) |

FIGURE 12e

| | | |
|---|---|---|
| 67363 | gtgtctccttcacccccacc (SEQ ID NO:684) | actttccccttttcatgccttattctgac (SEQ ID NO:685) |
| 67364 | gcatgtatttagagaagcgctcatattcc (SEQ ID NO:686) | tgtttttgtgacagtcacttccctaga (SEQ ID NO:687) |
| 67371 | cgaccaggcaggccac (SEQ ID NO:688) | gtcctgctcacacagcccc (SEQ ID NO:689) |
| 67379 | ggtggctgcgtccttcca (SEQ ID NO:690) | gccgtgttagcaccgcac (SEQ ID NO:691) |
| 67382 | ggtgatgcaaaagatggaagcca (SEQ ID NO:692) | ccattttggaatgtgaccgtctgtcc (SEQ ID NO:693) |
| 67386 | ggcccgtggtccacca (SEQ ID NO:694) | gccaggctgaaaagaagcctca (SEQ ID NO:695) |
| 67396 | gaacacatataaaaccaaagaagaaatgattgtagca (SEQ ID NO:696) | cttttccttactttttcatatttattacataaatataatgttttacattatgaaaaca (SEQ ID NO:697) |
| 87801 | cggaatttcctggcccccca (SEQ ID NO:698) | gtcccggcctgtccca (SEQ ID NO:699) |

FIGURE 13

Multiplex PCR 092701_Rxn1_Std Conditions (100mMKCl, 3mMMgCl, 10mMTris8.0, 2.5x Primers) Program (94,30s/55,44s)x50 w/hotstart

| Snp number | | 10min | | 20 min | | 40 min | | 80 min | | 160 min | | | 10 min | | 20 min | | 40 min | | 80 min | | 160 min | | Calls in agreement | Mis-calls or No-calls | |
|---|---|---|---|---|---|---|---|---|---|---|---|---|---|---|---|---|---|---|---|---|---|---|---|---|---|
| 107-plex (101) | Primer Count | **Dye Call** | **Final Call** | **Dye Call** | **Final Call** | **Dye Call** | **Final Call** | **Dye Call** | **Final Call** | **Dye Call** | **Final Call** | **Genomic Call** | | 46 | | 58 | | 78 | | 77 | | 73 | 94 | SNP No. | 7 |
| **47887** | 1 | 038 | 38 | HET | HET | HET | HET | HET | HET | HET | HET | HET | | 0 | HET | 1 | HET | 1 | HET | 1 | HET | 1 | 1 | 0 | 0 |
| **53488** | 2 | 39 | 39 | 39 | 39 | 41 | 41 | FAM | C | FAM | C | FAM | | 0 | | 0 | | 0 | FAM | 1 | FAM | 1 | 1 | 0 | 0 |
| **67329** | 3 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **67342** | 4 | HET | HET | FAM | C | FAM | C | FAM | C | FAM | C | FAM | HET | 0 | FAM | 1 | FAM | 1 | FAM | 1 | FAM | 1 | 1 | 0 | 0 |
| **67371** | 5 | 53 | 53 | HET | HET | HET | HET | HET | HET | HET | HET | HET | | 0 | HET | 1 | HET | 1 | HET | 1 | HET | 1 | 1 | 0 | 0 |
| **34573** | 6 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **37810** | 7 | 28 | 28 | RED | G | RED | G | RED | G | RED | G | RED | | 0 | RED | 1 | RED | 1 | RED | 1 | RED | 1 | 1 | 0 | 0 |
| **41420** | 8 | HET | HET | HET | HET | HET | HET | HET | HET | HET | HET | HET | HET | 1 | HET | 1 | HET | 1 | HET | 1 | HET | 1 | 1 | 0 | 0 |
| **41475** | 9 | 39 | 39 | 39 | 39 | 38 | 38 | HET | HET | HET | HET | HET | | 0 | | 0 | | 0 | HET | 1 | HET | 1 | 1 | 0 | 0 |
| **41541** | 10 | FAM | G | FAM | G | FAM | G | FAM | G | FAM | G | FAM | FAM | 1 | FAM | 1 | FAM | 1 | FAM | 1 | FAM | 1 | 1 | 0 | 0 |
| **44907** | 11 | 39 | 39 | FAM | C | FAM | C | FAM | C | FAM | C | FAM | | 0 | FAM | 1 | FAM | 1 | FAM | 1 | FAM | 1 | 1 | 0 | 0 |
| **44927** | 12 | RED | T | RED | T | RED | T | RED | T | RED | T | RED | RED | 1 | RED | 1 | RED | 1 | RED | 1 | RED | 1 | 1 | 0 | 0 |
| **45046** | 13 | HET | HET | HET | HET | HET | HET | HET | HET | 53 | 53 | HET | HET | 1 | HET | 1 | HET | 1 | HET | 1 | | 0 | 1 | 0 | 0 |
| **45076** | 14 | 39 | 39 | 39 | 39 | HET | HET | HET | HET | HET | HET | HET | | 0 | | 0 | HET | 1 | HET | 1 | HET | 1 | 1 | 0 | 0 |
| **45080** | 15 | 58 | 58 | RED | T | 53 | 53 | RED | T | RED | T | RED | | 0 | RED | 1 | | 0 | RED | 1 | RED | 1 | 1 | 0 | 0 |
| **47850** | 16 | HET | HET | HET | HET | HET | HET | HET | HET | HET | HET | HET | HET | 1 | HET | 1 | HET | 1 | HET | 1 | HET | 1 | 1 | 0 | 0 |
| **47855** | 17 | 39 | 39 | 39 | 39 | FAM | G | FAM | G | FAM | G | FAM | | 0 | | 0 | FAM | 1 | FAM | 1 | FAM | 1 | 1 | 0 | 0 |
| **47857** | 18 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **47868** | 19 | FAM | C | HET | HET | HET | HET | HET | HET | HET | HET | FAM | FAM | 1 | HET | 0 | HET | 0 | HET | 0 | HET | 0 | 1 | 0 | 0 |
| **47877** | 20 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **47878** | 21 | RED | A | RED | A | RED | A | RED | A | HET | HET | RED | RED | 1 | RED | 1 | RED | 1 | RED | 1 | HET | 0 | 1 | 0 | 0 |
| **47880** | 22 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **47899** | 23 | 17 | 17 | FAM | G | FAM | G | FAM | G | FAM | G | FAM | | 0 | FAM | 1 | FAM | 1 | FAM | 1 | FAM | 1 | 1 | 0 | 0 |
| **47905** | 24 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **47906** | 25 | FAM | G | FAM | G | FAM | G | FAM | G | FAM | G | FAM | FAM | 1 | FAM | 1 | FAM | 1 | FAM | 1 | FAM | 1 | 1 | 0 | 0 |
| **47909** | 26 | RED | T | RED | T | RED | T | RED | T | RED | T | RED | RED | 1 | RED | 1 | RED | 1 | RED | 1 | RED | 1 | 1 | 0 | 0 |
| **47917** | 27 | RED | A | RED | A | RED | A | RED | A | RED | A | RED | RED | 1 | RED | 1 | RED | 1 | RED | 1 | RED | 1 | 1 | 0 | 0 |
| **47920** | 28 | 29 | 29 | 29 | 29 | RED | A | RED | A | RED | A | RED | | 0 | | 0 | RED | 1 | RED | 1 | RED | 1 | 1 | 0 | 0 |
| **47924** | 29 | RED | A | RED | A | RED | A | RED | A | RED | A | RED | RED | 1 | RED | 1 | RED | 1 | RED | 1 | RED | 1 | 1 | 0 | 0 |
| **47941** | 30 | HET | HET | HET | HET | HET | HET | HET | HET | HET | HET | HET | HET | 1 | HET | 1 | HET | 1 | HET | 1 | HET | 1 | 1 | 0 | 0 |
| **47960** | 31 | 39 | 39 | 37 | 37 | FAM | G | FAM | G | FAM | G | FAM | | 0 | | 0 | FAM | 1 | FAM | 1 | FAM | 1 | 1 | 0 | 0 |
| **47963** | 32 | 39 | 39 | HET | HET | FAM | G | FAM | G | FAM | G | FAM | | 0 | HET | 0 | FAM | 1 | FAM | 1 | FAM | 1 | 1 | 0 | 0 |
| **47972** | 33 | RED | G | RED | G | RED | G | RED | G | RED | G | RED | RED | 1 | RED | 1 | RED | 1 | RED | 1 | RED | 1 | 1 | 0 | 0 |
| **47981** | 34 | 39 | 39 | 39 | 39 | 37 | 37 | HET | HET | HET | HET | FAM | | 0 | | 0 | | 0 | HET | 0 | HET | 0 | 0 | 47981 | 1 |

FIGURE 13 Cont'd

Multiplex PCR 092701_Rxn1_Std Conditions (100mMKCl, 3mMMgCl, 10mMTris8.0, 2.5x Primers) Program (94,30s/55,44s)x50 w/hotstart

| Snp number | | 10min | | 20 min | | 40 min | | 80 min | | 160 min | | | 10 min | | 20 min | | 40 min | | 80 min | | 160 min | | Calls in agreement | Mis-calls or No-calls | |
|---|---|---|---|---|---|---|---|---|---|---|---|---|---|---|---|---|---|---|---|---|---|---|---|---|---|
| 107-plex (101) | Primer Count | **Dye Call** | **Final Call** | **Dye Call** | **Final Call** | **Dye Call** | **Final Call** | **Dye Call** | **Final Call** | **Dye Call** | **Final Call** | **Genomic Call** | | 46 | | 58 | | 78 | | 77 | | 73 | 94 | SNP No. | 7 |
| **53478** | 35 | FAM | C | FAM | C | FAM | C | 43 | 43 | HET | HET | FAM | FAM | 1 | FAM | 1 | FAM | 1 | | 0 | HET | 0 | 1 | 0 | 0 |
| **53528** | 36 | 59 | 59 | 38 | 38 | FAM | C | 43 | 43 | FAM | C | FAM | | 0 | | 0 | FAM | 1 | | 0 | FAM | 1 | 1 | 0 | 0 |
| **53529** | 37 | FAM | G | 43 | 43 | HET | HET | HET | HET | HET | HET | HET | FAM | 0 | | 0 | HET | 1 | HET | 1 | HET | 1 | 1 | 0 | 0 |
| **53557** | 38 | 39 | 39 | FAM | G | FAM | G | FAM | G | FAM | G | FAM | | 0 | FAM | 1 | FAM | 1 | FAM | 1 | FAM | 1 | 1 | 0 | 0 |
| **53530** | 39 | 39 | 39 | 41 | 41 | FAM | C | FAM | C | FAM | C | FAM | | 0 | | 0 | FAM | 1 | FAM | 1 | FAM | 1 | 1 | 0 | 0 |
| **47986** | 40 | 29 | 29 | 39 | 39 | HET | HET | HET | HET | HET | HET | HET | | 0 | | 0 | HET | 1 | HET | 1 | HET | 1 | 1 | 0 | 0 |
| **47987** | 41 | 43 | 43 | 43 | 43 | FAM | G | 43 | 43 | HET | HET | FAM | | 0 | | 0 | FAM | 1 | | 0 | HET | 0 | 1 | 0 | 0 |
| **47994** | 42 | HET | HET | HET | HET | HET | HET | HET | HET | HET | HET | HET | HET | 1 | HET | 1 | HET | 1 | HET | 1 | HET | 1 | 1 | 0 | 0 |
| **47997** | 43 | RED | A | RED | A | RED | A | RED | A | RED | A | RED | RED | 1 | RED | 1 | RED | 1 | RED | 1 | RED | 1 | 1 | 0 | 0 |
| **48088** | 44 | 19 | 19 | FAM | G | FAM | G | FAM | G | FAM | G | FAM | | 0 | FAM | 1 | FAM | 1 | FAM | 1 | FAM | 1 | 1 | 0 | 0 |
| **48097** | 45 | 39 | 39 | 37 | 37 | FAM | G | 43 | 43 | 43 | 43 | FAM | | 0 | | 0 | FAM | 1 | | 0 | | 0 | 1 | 0 | 0 |
| **53415** | 46 | HET | HET | 43 | 43 | FAM | G | FAM | G | HET | HET | FAM | HET | 0 | | 0 | FAM | 1 | FAM | 1 | HET | 0 | 1 | 0 | 0 |
| **53418** | 47 | RED | A | RED | A | RED | A | RED | A | RED | A | RED | RED | 1 | RED | 1 | RED | 1 | RED | 1 | RED | 1 | 1 | 0 | 0 |
| **53433** | 48 | 19 | 19 | 39 | 39 | FAM | G | HET | HET | HET | HET | FAM | | 0 | | 0 | FAM | 1 | HET | 0 | HET | 0 | 1 | 0 | 0 |
| **53444** | 49 | FAM | G | FAM | G | FAM | G | FAM | G | 43 | 43 | FAM | FAM | 1 | FAM | 1 | FAM | 1 | FAM | 1 | | 0 | 1 | 0 | 0 |
| **53459** | 50 | FAM | G | FAM | G | FAM | G | FAM | G | FAM | G | FAM | FAM | 1 | FAM | 1 | FAM | 1 | FAM | 1 | FAM | 1 | 1 | 0 | 0 |
| **53522** | 51 | 52 | 52 | 53 | 53 | HET | HET | HET | HET | HET | HET | HET | | 0 | | 0 | HET | 1 | HET | 1 | HET | 1 | 1 | 0 | 0 |
| **53544** | 52 | 19 | 19 | 31 | 31 | 43 | 43 | HET | HET | HET | HET | HET | | 0 | | 0 | | 0 | HET | 1 | HET | 1 | 1 | 0 | 0 |
| **54762** | 53 | 43 | 43 | FAM | C | FAM | C | FAM | C | FAM | C | FAM | | 0 | FAM | 1 | FAM | 1 | FAM | 1 | FAM | 1 | 1 | 0 | 0 |
| **54777** | 54 | RED | A | RED | A | RED | A | RED | A | 53 | 53 | RED | RED | 1 | RED | 1 | RED | 1 | RED | 1 | | 0 | 1 | 0 | 0 |
| **54915** | 55 | RED | A | RED | A | RED | A | RED | A | 53 | 53 | RED | RED | 1 | RED | 1 | RED | 1 | RED | 1 | | 0 | 1 | 0 | 0 |
| **66865** | 56 | 39 | 39 | 39 | 39 | 39 | 39 | 59 | 59 | 58 | 58 | FAM | | 0 | | 0 | | 0 | | 0 | | 0 | 0 | 66865 | 1 |
| **66934** | 57 | 29 | 29 | 28 | 28 | RED | A | RED | A | RED | A | RED | | 0 | | 0 | RED | 1 | RED | 1 | RED | 1 | 1 | 0 | 0 |
| **66984** | 58 | FAM | G | FAM | G | FAM | G | FAM | G | FAM | G | FAM | FAM | 1 | FAM | 1 | FAM | 1 | FAM | 1 | FAM | 1 | 1 | 0 | 0 |
| **66985** | 59 | 29 | 29 | 29 | 29 | 39 | 39 | 59 | 59 | 39 | 39 | FAM | | 0 | | 0 | | 0 | | 0 | | 0 | 0 | 66985 | 1 |
| **67309** | 60 | 53 | 53 | 53 | 53 | HET | HET | HET | HET | HET | HET | HET | | 0 | | 0 | HET | 1 | HET | 1 | HET | 1 | 1 | 0 | 0 |
| **67340** | 61 | 53 | 53 | 53 | 53 | HET | HET | HET | HET | HET | HET | HET | | 0 | | 0 | HET | 1 | HET | 1 | HET | 1 | 1 | 0 | 0 |
| **67356** | 62 | HET | HET | HET | HET | HET | HET | HET | HET | HET | HET | HET | HET | 1 | HET | 1 | HET | 1 | HET | 1 | HET | 1 | 1 | 0 | 0 |
| **67363** | 63 | FAM | G | 43 | 43 | HET | HET | HET | HET | HET | HET | FAM | FAM | 1 | | 0 | HET | 0 | HET | 0 | HET | 0 | 1 | 0 | 0 |
| **67382** | 64 | 17 | 17 | FAM | G | FAM | G | FAM | G | FAM | G | FAM | | 0 | FAM | 1 | FAM | 1 | FAM | 1 | FAM | 1 | 1 | 0 | 0 |
| **87801** | 65 | 39 | 39 | 39 | 39 | 49 | 49 | 39 | 39 | 37 | 37 | FAM | | 0 | | 0 | | 0 | | 0 | | 0 | 0 | 87801 | 1 |

FIGURE 13 Cont'd

Multiplex PCR 092701_Rxn1_Std Conditions (100mMKCl, 3mMMgCl, 10mMTris8.0, 2.5x Primers) Program (94,30s/55,44s)x50 w/hotstart

| **Snp number** | | 10min | | 20 min | | 40 min | | 80 min | | 160 min | | | 10 min | | 20 min | | 40 min | | 80 min | | 160 min | | Calls in agreement | Mis-calls or No-calls | |
|---|---|---|---|---|---|---|---|---|---|---|---|---|---|---|---|---|---|---|---|---|---|---|---|---|---|
| 107-plex (101) | Primer Count | **Dye Call** | **Final Call** | **Dye Call** | **Final Call** | **Dye Call** | **Final Call** | **Dye Call** | **Final Call** | **Dye Call** | **Final Call** | **Genomic Call** | | 46 | | 58 | | 78 | | 77 | | 73 | 94 | SNP No. | 7 |
| **53551** | 66 | 17 | 17 | FAM | C | FAM | C | FAM | C | FAM | C | FAM | | 0 | FAM | 1 | FAM | 1 | FAM | 1 | FAM | 1 | 1 | 0 | 0 |
| **41064** | 67 | RED | A | RED | A | RED | A | RED | A | RED | A | RED | RED | 1 | RED | 1 | RED | 1 | RED | 1 | RED | 1 | 1 | 0 | 0 |
| **41408** | 68 | RED | A | RED | A | RED | A | RED | A | RED | A | RED | RED | 1 | RED | 1 | RED | 1 | RED | 1 | RED | 1 | 1 | 0 | 0 |
| **41452** | 69 | 39 | 39 | 29 | 29 | 58 | 58 | RED | C | RED | C | FAM | | 0 | | 0 | | 0 | RED | 0 | RED | 0 | 0 | 41452 | 1 |
| **47901** | 70 | 39 | 39 | 39 | 39 | 37 | 37 | 39 | 39 | HET | HET | FAM | | 0 | | 0 | | 0 | | 0 | HET | 0 | 0 | 47901 | 1 |
| **47932** | 71 | RED | A | RED | A | RED | A | RED | A | RED | A | RED | RED | 1 | RED | 1 | RED | 1 | RED | 1 | RED | 1 | 1 | 0 | 0 |
| **48094** | 72 | FAM | C | FAM | C | FAM | C | FAM | C | FAM | C | FAM | FAM | 1 | FAM | 1 | FAM | 1 | FAM | 1 | FAM | 1 | 1 | 0 | 0 |
| **48095** | 73 | 39 | 39 | FAM | C | FAM | C | FAM | C | FAM | C | FAM | | 0 | FAM | 1 | FAM | 1 | FAM | 1 | FAM | 1 | 1 | 0 | 0 |
| **53412** | 74 | 29 | 29 | 28 | 28 | 28 | 28 | RED | A | RED | A | RED | | 0 | | 0 | | 0 | RED | 1 | RED | 1 | 1 | 0 | 0 |
| **53475** | 75 | 39 | 39 | 39 | 39 | 39 | 39 | 47 | 47 | FAM | G | FAM | | 0 | | 0 | | 0 | | 0 | FAM | 1 | 1 | 0 | 0 |
| **53503** | 76 | 38 | 38 | 38 | 38 | 38 | 38 | HET | HET | HET | HET | HET | | 0 | | 0 | | 0 | HET | 1 | HET | 1 | 1 | 0 | 0 |
| **53540** | 77 | HET | HET | HET | HET | HET | HET | HET | HET | HET | HET | HET | HET | 1 | HET | 1 | HET | 1 | HET | 1 | HET | 1 | 1 | 0 | 0 |
| **55560** | 78 | RED | A | RED | A | RED | A | RED | A | RED | A | RED | RED | 1 | RED | 1 | RED | 1 | RED | 1 | RED | 1 | 1 | 0 | 0 |
| **66938** | 79 | 39 | 39 | HET | HET | FAM | C | FAM | C | FAM | C | FAM | | 0 | HET | 0 | FAM | 1 | FAM | 1 | FAM | 1 | 1 | 0 | 0 |
| **47867** | 80 | 53 | 53 | 53 | 53 | HET | HET | HET | HET | HET | HET | HET | | 0 | | 0 | HET | 1 | HET | 1 | HET | 1 | 1 | 0 | 0 |
| **48083** | 81 | 39 | 39 | FAM | G | FAM | G | FAM | G | FAM | G | FAM | | 0 | FAM | 1 | FAM | 1 | FAM | 1 | FAM | 1 | 1 | 0 | 0 |
| **53553** | 82 | FAM | C | FAM | C | FAM | C | FAM | C | HET | HET | FAM | FAM | 1 | FAM | 1 | FAM | 1 | FAM | 1 | HET | 0 | 1 | 0 | 0 |
| **37879** | 83 | FAM | T | FAM | T | FAM | T | FAM | T | FAM | T | FAM | FAM | 1 | FAM | 1 | FAM | 1 | FAM | 1 | FAM | 1 | 1 | 0 | 0 |
| **41365** | 84 | 19 | 19 | 39 | 39 | HET | HET | HET | HET | HET | HET | HET | | 0 | | 0 | HET | 1 | HET | 1 | HET | 1 | 1 | 0 | 0 |
| **41646** | 85 | HET | HET | HET | HET | HET | HET | HET | HET | HET | HET | HET | HET | 1 | HET | 1 | HET | 1 | HET | 1 | HET | 1 | 1 | 0 | 0 |
| **47852** | 86 | FAM | C | FAM | C | FAM | C | HET | HET | 53 | 53 | 17 | FAM | 0 | FAM | 0 | FAM | 0 | HET | 0 | | 0 | 1 | 0 | 0 |
| **47885** | 87 | 39 | 39 | 39 | 39 | FAM | T | FAM | T | FAM | T | FAM | | 0 | | 0 | FAM | 1 | FAM | 1 | FAM | 1 | 1 | 0 | 0 |
| **47892** | 88 | 17 | 17 | FAM | G | FAM | G | FAM | G | FAM | G | FAM | | 0 | FAM | 1 | FAM | 1 | FAM | 1 | FAM | 1 | 1 | 0 | 0 |
| **47915** | 89 | FAM | G | FAM | G | FAM | G | FAM | G | HET | HET | 17 | FAM | 0 | FAM | 0 | FAM | 0 | FAM | 0 | HET | 0 | 1 | 0 | 0 |
| **47925** | 90 | FAM | G | 43 | 43 | HET | HET | HET | HET | 53 | 53 | FAM | FAM | 1 | | 0 | HET | 0 | HET | 0 | | 0 | 1 | 0 | 0 |
| **47980** | 91 | FAM | G | FAM | G | 43 | 43 | HET | HET | HET | HET | FAM | FAM | 1 | FAM | 1 | | 0 | HET | 0 | HET | 0 | 1 | 0 | 0 |
| **37319** | 92 | FAM | C | FAM | C | FAM | C | HET | HET | HET | HET | FAM | FAM | 1 | FAM | 1 | FAM | 1 | HET | 0 | HET | 0 | 1 | 0 | 0 |
| **29043** | 93 | FAM | G | FAM | G | FAM | G | FAM | G | FAM | G | FAM | FAM | 1 | FAM | 1 | FAM | 1 | FAM | 1 | FAM | 1 | 1 | 0 | 0 |
| **53445** | 94 | FAM | C | FAM | C | HET | HET | HET | HET | 53 | 53 | 17 | FAM | 0 | FAM | 0 | HET | 0 | HET | 0 | | 0 | 1 | 0 | 0 |
| **41409** | 95 | 39 | 39 | 39 | 39 | HET | HET | HET | HET | HET | HET | FAM | | 0 | | 0 | HET | 0 | HET | 0 | HET | 0 | 0 | 41409 | 1 |
| **47897** | 96 | 39 | 39 | 38 | 38 | HET | HET | 43 | 43 | FAM | G | FAM | | 0 | | 0 | HET | 0 | | 0 | FAM | 1 | 1 | 0 | 0 |
| **41164** | 97 | RED | T | RED | T | RED | T | RED | T | RED | T | RED | RED | 1 | RED | 1 | RED | 1 | RED | 1 | RED | 1 | 1 | 0 | 0 |
| **66902** | 98 | 39 | 39 | 37 | 37 | FAM | G | 43 | 43 | FAM | G | FAM | | 0 | | 0 | FAM | 1 | | 0 | FAM | 1 | 1 | 0 | 0 |
| **53464** | 99 | FAM | C | FAM | C | FAM | C | FAM | C | HET | HET | FAM | FAM | 1 | FAM | 1 | FAM | 1 | FAM | 1 | HET | 0 | 1 | 0 | 0 |
| **53470** | 100 | FAM | C | FAM | C | FAM | C | FAM | C | FAM | C | 17 | FAM | 0 | FAM | 0 | FAM | 0 | FAM | 0 | FAM | 0 | 1 | 0 | 0 |
| **47910** | 101 | FAM | C | FAM | C | FAM | C | FAM | C | FAM | C | FAM | FAM | 1 | FAM | 1 | FAM | 1 | FAM | 1 | FAM | 1 | 1 | 0 | 0 |

FIGURE 14

| TWT SNP# | Fam FOZ | Red FOZ | FOZ RATIO | Dye Call | Final Call | Genomic Call | | TWT SNP# | Fam FOZ | Red FOZ | FOZ RATIO | Dye Call | Final Call | Genomic Call |
|---|---|---|---|---|---|---|---|---|---|---|---|---|---|---|
| 47887 | 4.3 | 5.6 | 0.7 | HET | HET | HET | | 53522 | 2.7 | 4.9 | 0.4 | HET | HET | HET |
| 53488 | 16.9 | 2.4 | 11.6 | FAM | C | FAM | | 53544 | 9.7 | 4.9 | 2.2 | HET | HET | HET |
| 67329 | 6.5 | 1.5 | 11.0 | FAM | C | FAM | | 54762 | 5.2 | 1.4 | 11.7 | FAM | C | FAM |
| 67342 | 4.5 | 1.2 | 19.1 | FAM | C | FAM | | 54777 | 1.1 | 11.9 | 0.0 | RED | A | RED |
| 67371 | 16.2 | 32.3 | 0.5 | HET | HET | HET | | 54915 | 1.2 | 10.4 | 0.0 | RED | A | RED |
| 34573 | 4.4 | 1.0 | 337.1 | FAM | C | FAM | | 66865 | 1.0 | 1.1 | 0.3 | 59 | 59 | FAM |
| 37810 | 1.3 | 8.3 | 0.0 | RED | G | RED | | 66934 | 1.1 | 8.0 | 0.0 | RED | A | RED |
| 41420 | 13.6 | 19.6 | 0.7 | HET | HET | HET | | 66984 | 7.8 | 2.0 | 6.5 | FAM | G | FAM |
| 41475 | 1.3 | 1.3 | 1.0 | HET | HET | HET | | 66985 | 1.1 | 1.2 | 0.5 | 39 | 39 | FAM |
| 41541 | 13.0 | 1.4 | 27.9 | FAM | G | FAM | | 67309 | 2.9 | 5.4 | 0.4 | HET | HET | HET |
| 44907 | 4.2 | 1.2 | 16.2 | FAM | C | FAM | | 67340 | 4.1 | 5.8 | 0.6 | HET | HET | HET |
| 44927 | 1.8 | 19.0 | 0.0 | RED | T | RED | | 67356 | 6.0 | 6.6 | 0.9 | HET | HET | HET |
| 45046 | 3.7 | 4.7 | 0.7 | HET | HET | HET | | 67363 | 1.8 | 1.2 | 4.7 | FAM | G | FAM |
| 45076 | 1.9 | 1.7 | 1.2 | HET | HET | HET | | 67382 | 16.4 | 1.2 | 73.8 | FAM | G | FAM |
| 45080 | 1.4 | 11.1 | 0.0 | RED | T | RED | | 87801 | 12.3 | 1.4 | 30.6 | FAM | C | FAM |
| 47850 | 3.9 | 3.6 | 1.1 | HET | HET | HET | | 53551 | 6.9 | 1.1 | 45.8 | FAM | C | FAM |
| 47855 | 1.9 | 1.4 | 2.6 | 43 | 43 | FAM | | 41064 | 1.5 | 5.4 | 0.1 | RED | A | RED |
| 47857 | 9.4 | 1.1 | 58.8 | FAM | C | FAM | | 41408 | 1.2 | 20.5 | 0.0 | RED | A | RED |
| 47868 | 29.5 | 3.8 | 10.1 | FAM | C | FAM | | 41452 | 1.3 | 1.6 | 0.5 | HET | HET | FAM |
| 47877 | 14.2 | 1.3 | 41.2 | FAM | C | FAM | | 47901 | 1.8 | 1.4 | 2.1 | HET | HET | FAM |
| 47878 | 1.4 | 5.8 | 0.1 | RED | A | RED | | 47932 | 1.3 | 13.8 | 0.0 | RED | A | RED |
| 47880 | 5.7 | 1.4 | 11.4 | FAM | C | FAM | | 48094 | 5.9 | 1.3 | 15.5 | FAM | C | FAM |
| 47899 | 11.5 | 1.5 | 21.0 | FAM | G | FAM | | 48095 | 12.1 | 1.2 | 62.3 | FAM | C | FAM |
| 47905 | 6.2 | 1.2 | 27.1 | FAM | C | FAM | | 53412 | 1.5 | 11.2 | 0.1 | RED | A | RED |
| 47906 | 20.1 | 1.4 | 52.4 | FAM | G | FAM | | 53475 | 10.4 | 1.3 | 28.2 | FAM | G | FAM |
| 47909 | 1.7 | 22.2 | 0.0 | RED | T | RED | | 53503 | 3.9 | 3.9 | 1.0 | HET | HET | HET |
| 47917 | 2.4 | 26.7 | 0.1 | RED | A | RED | | 53540 | 17.6 | 18.7 | 0.9 | HET | HET | HET |
| 47920 | 1.3 | 2.2 | 0.2 | RED | A | RED | | 55560 | 1.4 | 10.9 | 0.0 | RED | A | RED |
| 47924 | 1.3 | 5.9 | 0.1 | RED | A | RED | | 66938 | 9.3 | 1.6 | 13.5 | FAM | C | FAM |
| 47941 | 8.2 | 9.0 | 0.9 | HET | HET | HET | | 47867 | 4.9 | 7.5 | 0.6 | HET | HET | HET |
| 47960 | 5.7 | 2.1 | 4.5 | FAM | G | FAM | | 48083 | 4.3 | 1.1 | 23.8 | FAM | G | FAM |
| 47963 | 8.9 | 1.7 | 11.9 | FAM | G | FAM | | 53553 | 14.3 | 1.4 | 30.5 | FAM | C | FAM |
| 47972 | 1.6 | 40.9 | 0.0 | RED | G | RED | | 37879 | 7.5 | 1.5 | 13.1 | FAM | T | FAM |
| 47981 | 2.6 | 1.3 | 6.3 | FAM | G | FAM | | 41365 | 2.2 | 2.1 | 1.1 | HET | HET | HET |
| 53478 | 27.0 | 1.6 | 39.9 | FAM | C | FAM | | 41646 | 8.2 | 9.2 | 0.9 | HET | HET | HET |
| 53528 | 1.9 | 1.4 | 2.1 | HET | HET | FAM | | 47852 | 10.2 | 1.4 | 23.6 | FAM | C | 17 |
| 53529 | 17.1 | 10.2 | 1.8 | HET | HET | HET | | 47885 | 2.3 | 1.3 | 5.1 | FAM | T | FAM |
| 53557 | 7.6 | 1.3 | 20.9 | FAM | G | FAM | | 47892 | 9.0 | 1.2 | 38.2 | FAM | G | FAM |
| 53530 | 5.4 | 1.7 | 6.3 | FAM | C | FAM | | 47915 | 8.7 | 1.2 | 43.1 | FAM | G | 17 |
| 47986 | 1.4 | 1.7 | 0.6 | HET | HET | HET | | 47925 | 16.9 | 3.6 | 6.0 | FAM | G | FAM |
| 47987 | 12.0 | 1.7 | 15.0 | FAM | G | FAM | | 47980 | 17.0 | 1.6 | 25.1 | FAM | G | FAM |
| 47994 | 23.6 | 31.7 | 0.7 | HET | HET | HET | | 37319 | 19.5 | 1.6 | 28.6 | FAM | C | FAM |
| 47997 | 1.5 | 8.3 | 0.1 | RED | A | RED | | 29043 | 10.8 | 1.4 | 23.3 | FAM | G | FAM |
| 48088 | 6.4 | 1.2 | 27.0 | FAM | G | FAM | | 53445 | 12.6 | 1.8 | 14.5 | FAM | C | 17 |
| 48097 | 3.7 | 1.6 | 4.2 | FAM | G | FAM | | 41409 | 12.2 | 1.8 | 13.9 | FAM | C | FAM |
| 53415 | 3.6 | 1.6 | 4.0 | FAM | G | FAM | | 47897 | 5.0 | 1.7 | 6.1 | FAM | G | FAM |
| 53418 | 1.3 | 38.8 | 0.0 | RED | A | RED | | 41164 | 1.5 | 7.2 | 0.1 | RED | T | RED |
| 53433 | 1.3 | 1.2 | 1.3 | 39 | 39 | FAM | | 66902 | 13.9 | 1.7 | 18.2 | FAM | G | FAM |
| 53444 | 16.2 | 1.7 | 22.7 | FAM | G | FAM | | 53464 | 21.8 | 2.5 | 13.6 | FAM | C | FAM |
| 53459 | 5.7 | 1.4 | 11.2 | FAM | G | FAM | | 53470 | 14.5 | 1.4 | 31.8 | FAM | C | 17 |
| | | | | | | | | 47910 | 16.2 | 1.3 | 55.0 | FAM | C | FAM |

FIGURE 15

| | MAP092701_PCR1_ Optimization | | | | | | | | | | | | | | | | | | | | |
|---|---|---|---|---|---|---|---|---|---|---|---|---|---|---|---|---|---|---|---|---|---|
| Snp number | 10 min | | 20 min | | 40 min. | | 80 min | | 160 min. | | RED_FOZ + FAM_FOZ -2 values at a given time "m" | | | | | FOZm -2 (FOZm must be >2 at 10min or >2 and <12 at all other time points) | | | | | |
| 107-plex (102) | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 | 10 | 20 | 40 | 80 | 160 |
| 47887 | 1.25 | 1.375 | 1.75 | 2.5 | 1.7273 | 2.1333 | 9.1667 | 14.545 | 16.906 | 22.76 | 0.6 | 2.3 | 1.9 | 21.7 | 37.7 | 0 | 2.25 | 0 | 0 | 0 |
| 53488 | 1.1176 | 1.1 | 1.1429 | 1.0833 | 2.02 | 1.2609 | 2.3913 | 1.2381 | 3.6917 | 1.3443 | 0.2 | 0.2 | 1.3 | 1.6 | 3.0 | 0 | 0 | 0 | 0 | 3.035992 |
| 67329 | 4.6667 | 1.125 | 10.056 | 1.2 | 16.152 | 1.1667 | 10.31 | 1.6667 | 9.5 | 2.561 | 3.8 | 9.3 | 15.3 | 10.0 | 10.1 | 3.791667 | 9.255555 | 0 | 9.977011 | 10.06098 |
| 67342 | 1.7647 | 1.3333 | 3.2727 | 1.5455 | 6.2553 | 1.2632 | 7.2821 | 1.5556 | 5.7778 | 1.7143 | 1.1 | 2.8 | 5.5 | 6.8 | 5.5 | 0 | 2.818182 | 5.518477 | 6.837607 | 5.492063 |
| 67371 | 7.7333 | 18 | 13.471 | 25.9 | 20.966 | 31.778 | 11.792 | 19.286 | 11.661 | 15.39 | 23.7 | 37.4 | 50.7 | 29.1 | 25.1 | 23.73333 | 0 | 0 | 0 | 0 |
| 34573 | 1.9444 | 1 | 4.1905 | 1 | 3.9375 | 1.1429 | 6.8108 | 1.2222 | 5.4237 | 1.3621 | 0.9 | 3.2 | 3.1 | 6.0 | 4.8 | 0 | 3.190476 | 3.080357 | 6.033033 | 4.785798 |
| 37810 | 1.0667 | 1.5 | 1.1111 | 2.8889 | 1.1852 | 2.4667 | 1.3846 | 15.75 | 1.3519 | 18.176 | 0.6 | 2.0 | 1.7 | 15.1 | 17.5 | 0 | 0 | 0 | 15.13462 | 0 |
| 41420 | 2.2308 | 3 | 4.8125 | 6.8889 | 11.167 | 16.188 | 10 | 20.636 | 10.091 | 19.364 | 3.2 | 9.7 | 25.4 | 28.6 | 27.5 | 3.230769 | 9.701389 | 0 | 0 | 0 |
| 41475 | 1 | 1 | 1.1176 | 1.2222 | 1.2917 | 1.4 | 1.5 | 1.4167 | 1.551 | 1.6471 | 0.0 | 0.3 | 0.7 | 0.9 | 1.2 | 0 | 0 | 0 | 0 | 0 |
| 41541 | 3 | 1.1429 | 7.9231 | 1.375 | 13.083 | 1.3529 | 12.824 | 1.5833 | 12.911 | 2.359 | 2.1 | 7.3 | 12.4 | 12.4 | 13.3 | 2.142857 | 7.298077 | 0 | 0 | 0 |
| 44907 | 1.2308 | 1.1 | 1.7333 | 1.1667 | 5.8846 | 1.2917 | 8.25 | 1.4545 | 10.564 | 1.4545 | 0.3 | 0.9 | 5.2 | 7.7 | 10.0 | 0 | 0 | 5.176282 | 7.704545 | 10.01818 |
| 44927 | 1.125 | 3.8889 | 1.4211 | 11 | 2.5682 | 22.667 | 2.9231 | 19.944 | 3.4091 | 14.953 | 3.0 | 10.4 | 23.2 | 20.9 | 16.4 | 3.013889 | 10.42105 | 0 | 0 | 0 |
| 45046 | 1.6875 | 2 | 3.8889 | 4.6667 | 5.0667 | 5.9412 | 8.5641 | 18.467 | 5.696 | 19.029 | 1.7 | 6.6 | 9.0 | 25.0 | 22.7 | 0 | 6.555555 | 9.007843 | 0 | 0 |
| 45076 | 1.0714 | 1.1111 | 1.1333 | 1.2 | 2.3478 | 2.375 | 1.875 | 1.8667 | 5 | 3.0303 | 0.2 | 0.3 | 2.7 | 1.7 | 6.0 | 0 | 0 | 2.722826 | 0 | 6.030303 |
| 45080 | 1.1429 | 1.4444 | 1.125 | 2.5 | 1.3182 | 2.1875 | 1.28 | 10.167 | 1.5106 | 15.25 | 0.6 | 1.6 | 1.5 | 9.4 | 14.8 | 0 | 0 | 0 | 9.446667 | 0 |
| 47850 | 1.8 | 2 | 3.4706 | 4.1 | 3.4 | 3.0625 | 10.897 | 17.5 | 10.89 | 17.905 | 1.8 | 5.6 | 4.5 | 26.4 | 26.8 | 0 | 5.570588 | 4.4625 | 0 | 0 |
| 47855 | 1.125 | 1.1111 | 1.3 | 1.1818 | 10.736 | 1.2857 | 2.6098 | 1.2778 | 3.7545 | 1.3125 | 0.2 | 0.5 | 10.0 | 1.9 | 3.1 | 0 | 0 | 10.02156 | 0 | 3.066991 |
| 47857 | 2 | 1.1818 | 3.6667 | 1.2308 | 8.3415 | 1.1538 | 6.0784 | 1.3158 | 3.3187 | 1 | 1.2 | 2.9 | 7.5 | 5.4 | 2.3 | 0 | 2.897436 | 7.495309 | 5.394221 | 2.318725 |
| 47868 | 18.5 | 4 | 17.688 | 8.9091 | 30.333 | 15.278 | 14.095 | 19.385 | 18.933 | 19.368 | 20.5 | 24.6 | 43.6 | 31.5 | 36.3 | 20.5 | 0 | 0 | 0 | 0 |
| 47877 | 3.5625 | 1.2222 | 8.0526 | 1.4545 | 4.0811 | 1.1429 | 9.3448 | 2.0625 | 8.3021 | 2.2069 | 2.8 | 7.5 | 3.2 | 9.4 | 8.5 | 2.784722 | 7.507177 | 3.223938 | 9.407328 | 8.50898 |
| 47878 | 1.2143 | 5.75 | 1.5333 | 16 | 2.5455 | 33.875 | 4.05 | 22.667 | 11.543 | 21.622 | 5.0 | 15.5 | 34.4 | 24.7 | 31.2 | 4.964286 | 0 | 0 | 0 | 0 |
| 47880 | 2.25 | 1.125 | 5.0526 | 1.1 | 19.486 | 2.5294 | 9.6207 | 1.5385 | 8.5591 | 1.9318 | 1.4 | 4.2 | 20.0 | 9.2 | 8.5 | 0 | 4.152631 | 0 | 9.159151 | 8.490958 |
| 47899 | 1.3333 | 1 | 2.7647 | 1 | 2.9333 | 1.3125 | 9.6957 | 1.3077 | 11.742 | 1.8718 | 0.3 | 1.8 | 2.2 | 9.0 | 11.6 | 0 | 0 | 2.245833 | 9.003344 | 11.61373 |
| 47905 | 2.2 | 1.1429 | 4.1579 | 1.2222 | 11.946 | 1.4286 | 9.5357 | 1.7273 | 8.0698 | 2.4545 | 1.3 | 3.4 | 11.4 | 9.3 | 8.5 | 0 | 3.380117 | 11.37452 | 9.262987 | 8.524312 |
| 47906 | 15.385 | 1.25 | 17.333 | 1.3636 | 17.973 | 3.4333 | 10.292 | 1.9 | 7.5393 | 2.1075 | 14.6 | 16.7 | 19.4 | 10.2 | 7.6 | 14.63461 | 0 | 0 | 10.19167 | 7.646852 |
| 47909 | 1.0769 | 2.5 | 1.0714 | 6.125 | 1.3 | 9 | 1.3529 | 21.818 | 2.32 | 30.238 | 1.6 | 5.2 | 8.3 | 21.2 | 30.6 | 0 | 5.196429 | 8.3 | 0 | 0 |
| 47917 | 1 | 4.1111 | 1.0625 | 10.5 | 1.2286 | 12.55 | 1.5714 | 20.571 | 2.7222 | 18.486 | 3.1 | 9.6 | 11.8 | 20.1 | 19.2 | 3.111111 | 9.5625 | 11.77857 | 0 | 0 |
| 47920 | 1 | 1.1111 | 0.9412 | 1.3 | 1.122 | 5.3333 | 1.129 | 3.0769 | 1.1881 | 7.1034 | 0.1 | 0.2 | 4.5 | 2.2 | 6.3 | 0 | 0 | 4.455285 | 2.205955 | 6.291567 |
| 47924 | 1 | 1.6667 | 1 | 3.1818 | 1.3143 | 35.824 | 1.129 | 14.667 | 1.4198 | 18.553 | 0.7 | 2.2 | 35.1 | 13.8 | 18.0 | 0 | 2.181818 | 0 | 0 | 0 |
| 47941 | 3.2667 | 4.5556 | 8.25 | 12.7 | 13.708 | 15.357 | 12.917 | 20.067 | 16.957 | 23.156 | 5.8 | 18.9 | 27.1 | 31.0 | 38.1 | 5.822222 | 0 | 0 | 0 | 0 |
| 47960 | 1.1875 | 1.2222 | 1.5556 | 1.2727 | 4.5 | 1.3529 | 5.4848 | 1.5556 | 9.2619 | 1.9787 | 0.4 | 0.8 | 3.9 | 5.0 | 9.2 | 0 | 0 | 3.852941 | 5.040404 | 9.240628 |
| 47963 | 1.2143 | 1.2222 | 1.7333 | 1.5 | 5.75 | 1.6364 | 6.8571 | 1.8333 | 23.412 | 3.05 | 0.4 | 1.2 | 5.4 | 6.7 | 24.5 | 0 | 0 | 5.386364 | 6.690476 | 0 |
| 47972 | 1.0667 | 12.222 | 1.0588 | 26.2 | 1.28 | 52.385 | 1.2083 | 24.917 | 1.5636 | 33.577 | 11.3 | 25.3 | 51.7 | 24.1 | 33.1 | 11.28889 | 0 | 0 | 0 | 0 |
| 47981 | 1.1875 | 1.1111 | 1.2778 | 1.1818 | 1.5161 | 1.2273 | 1.3704 | 1.3125 | 1.6882 | 1.3968 | 0.3 | 0.5 | 0.7 | 0.7 | 1.1 | 0 | 0 | 0 | 0 | 0 |
| 53478 | 15.6 | 1.25 | 16.706 | 1.6667 | 32.478 | 2.2667 | 13.636 | 4.3333 | 22.711 | 12.056 | 14.9 | 16.4 | 32.7 | 16.0 | 32.8 | 14.85 | 0 | 0 | 0 | 0 |
| 53528 | 1.0667 | 1.25 | 1.2941 | 1.4444 | 11.13 | 1.6154 | 3.5714 | 1.9167 | 12.75 | 2.1613 | 0.3 | 0.7 | 10.7 | 3.5 | 12.9 | 0 | 0 | 10.74582 | 3.488095 | 0 |

FIGURE 15 Cont'd

| | MAP092701_PCR1_ Optimization | | | | | | | | | |
|---|---|---|---|---|---|---|---|---|---|---|
| Snp number | Calculation of Amplification Factor (F) using equation 1b. (w/ FOZ240=3.42 and a dilution factor of 0.125) | | | | | Selected Value of F | X[n] | R[n] (setting X[max] to 1.6) | Concentration of Primers in Optimized Mix (uM) | |
| 107-plex (102) | 10 | 20 | 40 | 80 | 160 | | | | | |
| 47887 | 0 | 14260.56 | 0 | 0 | 0 | 14260.6 | 0.8775 | 1.82 | 0.046 | |
| 53488 | 0 | 0 | 0 | 0 | 300.6594 | 300.0 | -0.1208 | 12.00 | 0.300 | Yellow -Low End Correction |
| 67329 | 96126.76 | 58661.97 | 0 | 3952.161 | 996.3554 | 96126.0 | 1.3707 | 1.17 | 0.029 | |
| 67342 | 0 | 17861.72 | 8744.066 | 2708.559 | 543.8883 | 17862.0 | 0.9357 | 1.71 | 0.043 | |
| 67371 | 601690.1 | 0 | 0 | 0 | 0 | 601690.0 | 1.8449 | 1.00 | 0.025 | Green - High End Correction |
| 34573 | 0 | 20221.33 | 4880.848 | 2389.846 | 473.9457 | 20221.0 | 0.9677 | 1.65 | 0.041 | |
| 37810 | 0 | 0 | 0 | 5995.226 | 0 | 5995.0 | 0.6534 | 2.45 | 0.061 | |
| 41420 | 81906.82 | 61487.68 | 0 | 0 | 0 | 81906.0 | 1.3294 | 1.20 | 0.030 | |
| 41475 | 0 | 0 | 0 | 0 | 0 | 0.0 | #NUM! | 12.00 | 0.300 | Yellow -Low End Correction |
| 41541 | 54325.96 | 46255.42 | 0 | 0 | 0 | 54325.0 | 1.2232 | 1.31 | 0.033 | |
| 44907 | 0 | 0 | 8201.855 | 3051.977 | 992.1175 | 8201.0 | 0.7344 | 2.18 | 0.054 | |
| 44927 | 76408.45 | 66048.92 | 0 | 0 | 0 | 76408.0 | 1.3114 | 1.22 | 0.031 | |
| 45046 | 0 | 41549.29 | 14272.99 | 0 | 0 | 41549.0 | 1.1539 | 1.39 | 0.035 | |
| 45076 | 0 | 0 | 4314.337 | 0 | 597.1911 | 4314.0 | 0.5684 | 2.82 | 0.070 | |
| 45080 | 0 | 0 | 0 | 3742.078 | 0 | 3742.1 | 0.5316 | 3.01 | 0.075 | |
| 47850 | 0 | 35306.54 | 7070.863 | 0 | 0 | 35307.0 | 1.1118 | 1.44 | 0.036 | |
| 47855 | 0 | 0 | 15879.24 | 0 | 303.7293 | 15879.0 | 0.9053 | 1.77 | 0.044 | |
| 47857 | 0 | 18364.03 | 11876.37 | 2136.795 | 229.6273 | 18364.0 | 0.9428 | 1.70 | 0.042 | |
| 47868 | 519718.3 | 0 | 0 | 0 | 0 | 519718.0 | 1.8070 | 1.00 | 0.025 | Green - High End Correction |
| 47877 | 70598.59 | 47580.7 | 5108.353 | 3726.494 | 842.6586 | 70598.0 | 1.2909 | 1.24 | 0.031 | |
| 47878 | 125855.1 | 0 | 0 | 0 | 0 | 125855.0 | 1.4404 | 1.11 | 0.028 | |
| 47880 | 0 | 26319.49 | 0 | 3628.185 | 840.874 | 26319.0 | 1.0359 | 1.54 | 0.039 | |
| 47899 | 0 | 0 | 3558.539 | 3566.466 | 1150.127 | 3558.0 | 0.5186 | 3.09 | 0.077 | |
| 47905 | 0 | 21423.28 | 18023 | 3669.317 | 844.1771 | 21423.0 | 0.9827 | 1.63 | 0.041 | |
| 47906 | 371018.4 | 0 | 0 | 4037.192 | 757.2807 | 371018.0 | 1.7199 | 1.00 | 0.025 | Green - High End Correction |
| 47909 | 0 | 32935.11 | 13151.41 | 0 | 0 | 32935.0 | 1.0938 | 1.46 | 0.037 | |
| 47917 | 78873.24 | 60607.39 | 18663.23 | 0 | 0 | 78873.0 | 1.3196 | 1.21 | 0.030 | |
| 47920 | 0 | 0 | 7059.43 | 873.838 | 623.0645 | 7059.0 | 0.6957 | 2.30 | 0.057 | |
| 47924 | 0 | 13828.43 | 0 | 0 | 0 | 13828.0 | 0.8695 | 1.84 | 0.046 | |
| 47941 | 147605.6 | 0 | 0 | 0 | 0 | 147606.0 | 1.4816 | 1.08 | 0.027 | |
| 47960 | 0 | 0 | 6105.012 | 1996.639 | 915.115 | 6105.0 | 0.6581 | 2.43 | 0.061 | |
| 47963 | 0 | 0 | 8534.731 | 2650.277 | 0 | 8534.0 | 0.7447 | 2.15 | 0.054 | |
| 47972 | 286197.2 | 0 | 0 | 0 | 0 | 286197.0 | 1.6528 | 1.00 | 0.025 | Green - High End Correction |
| 47981 | 0 | 0 | 0 | 0 | 0 | 1177.0 | 0.2326 | 12.00 | 0.300 | |
| 53478 | 376478.9 | 0 | 0 | 0 | 0 | 376479.0 | 1.7237 | 1.00 | 0.025 | Green - High End Correction |
| 53528 | 0 | 0 | 17026.83 | 1381.728 | 0 | 17027.0 | 0.9233 | 1.73 | 0.043 | |

FIGURE 15 Cont'd

| MAP092701_PCR1_ Optimization | | | | | | | | | | | | | | | | | | | | |
|---|---|---|---|---|---|---|---|---|---|---|---|---|---|---|---|---|---|---|---|---|
| Snp number | 10 min | | 20 min | | 40 min. | | 80 min | | 160 min. | | RED_FOZ + FAM_FOZ -2 values at a given time "m" | | | | | FOZm -2 (FOZm must be >2 at 10min or >2 and <12 at all other time points) | | | | |
| 107-plex (102) | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 | 10 | 20 | 40 | 80 | 160 |
| 53529 | 3.2143 | 1.5 | 7.8125 | 2.7778 | 21.258 | 11.286 | 11.429 | 13.091 | 11.358 | 23.138 | 2.7 | 8.6 | 30.5 | 22.5 | 32.5 | 2.714286 | 8.590278 | 0 | 0 | 0 |
| 53557 | 1.2857 | 1.125 | 2.125 | 1.2222 | 27.5 | 2.3846 | 10.35 | 1.7273 | 14.633 | 2.9375 | 0.4 | 1.3 | 27.9 | 10.1 | 15.6 | 0 | 0 | 0 | 10.07727 | 0 |
| 53530 | 1.1667 | 1.1429 | 1.9231 | 1.25 | 12.333 | 1.3529 | 9.125 | 1.5833 | 15.2 | 2 | 0.3 | 1.2 | 11.7 | 8.7 | 15.2 | 0 | 0 | 11.68627 | 8.708333 | 0 |
| 47986 | 1 | 1.125 | 1.0625 | 1.1111 | 1.96 | 2.8667 | 1.3913 | 1.6154 | 2.2128 | 2.9677 | 0.1 | 0.2 | 2.8 | 1.0 | 3.2 | 0 | 0 | 2.826667 | 0 | 3.180508 |
| 47987 | 2 | 1.3333 | 4 | 1.7778 | 8.1905 | 1.6923 | 13.667 | 4.4545 | 41.813 | 18.571 | 1.3 | 3.8 | 7.9 | 16.1 | 58.4 | 0 | 3.777778 | 7.882784 | 0 | 0 |
| 47994 | 7.4286 | 16.8 | 13.5 | 27.909 | 29.958 | 36.632 | 12.64 | 18 | 17.723 | 18.932 | 22.2 | 39.4 | 64.6 | 28.6 | 34.7 | 22.22857 | 0 | 0 | 0 | 0 |
| 47997 | 0.8889 | 10.556 | 1 | 23.5 | 1.6538 | 38.8 | 2.1538 | 22.571 | 5.8868 | 30.963 | 9.4 | 22.5 | 38.5 | 22.7 | 34.8 | 9.444444 | 0 | 0 | 0 | 0 |
| 48088 | 1.2353 | 1 | 2 | 1.0769 | 17.618 | 1.381 | 7.1944 | 1.3182 | 7.8571 | 1.625 | 0.2 | 1.1 | 17.0 | 6.5 | 7.5 | 0 | 0 | 0 | 6.512627 | 7.482143 |
| 48097 | 1.125 | 1.1111 | 1.3158 | 1.3 | 2.8947 | 1.3846 | 3.2647 | 1.6429 | 5.9223 | 2.2647 | 0.2 | 0.6 | 2.3 | 2.9 | 6.2 | 0 | 0 | 2.279352 | 2.907563 | 6.187036 |
| 53415 | 1.5 | 1.4 | 2.6842 | 1.4545 | 7.1809 | 1.8571 | 6.1053 | 1.8462 | 3.8565 | 2.6176 | 0.9 | 2.1 | 7.0 | 6.0 | 4.5 | 0 | 2.138756 | 7.037994 | 5.951417 | 4.474129 |
| 53418 | 1.3889 | 28.778 | 2 | 25.636 | 2.5556 | 42.188 | 4.6889 | 20.286 | 3.6183 | 23.385 | 28.2 | 25.6 | 42.7 | 23.0 | 25.0 | 28.16667 | 0 | 0 | 0 | 0 |
| 53433 | 1.1875 | 1 | 1.2778 | 1.2 | 4.8 | 1.1875 | 1.6364 | 1.4615 | 2.9615 | 1.9211 | 0.2 | 0.5 | 4.0 | 1.1 | 2.9 | 0 | 0 | 3.9875 | 0 | 2.882591 |
| 53444 | 10.733 | 1.25 | 15.471 | 1.4444 | 28.692 | 2.1667 | 12 | 2.4545 | 16.113 | 7 | 10.0 | 14.9 | 28.9 | 12.5 | 21.1 | 9.983334 | 0 | 0 | 0 | 0 |
| 53459 | 2.125 | 1.1111 | 4.6842 | 1.3 | 22.516 | 1.4375 | 10.154 | 1.9286 | 11.316 | 2.4634 | 1.2 | 4.0 | 22.0 | 10.1 | 11.8 | 0 | 3.98421 | 0 | 10.08242 | 11.77987 |
| 53522 | 1.2 | 1.75 | 1.7647 | 3.5556 | 5.0345 | 8.8889 | 7.1818 | 14.769 | 11.441 | 17.638 | 1.0 | 3.3 | 11.9 | 20.0 | 27.1 | 0 | 3.320261 | 11.92337 | 0 | 0 |
| 53544 | 1.1667 | 1 | 1.6923 | 1.2917 | 2.8696 | 1.7447 | 6.75 | 4.1429 | 12.16 | 5.6111 | 0.2 | 1.0 | 2.6 | 8.9 | 15.8 | 0 | 0 | 2.614246 | 8.892857 | 0 |
| 54762 | 2.4375 | 1.375 | 5.1579 | 1.5556 | 17.947 | 1.7273 | 6.4857 | 1.3846 | 6.901 | 2.3182 | 1.8 | 4.7 | 17.7 | 5.9 | 7.2 | 0 | 4.71345 | 0 | 5.87033 | 7.219172 |
| 54777 | 0.9444 | 17.167 | 1.0455 | 17.5 | 1.22 | 18.735 | 1.8837 | 10 | 3.0949 | 7.8824 | 16.1 | 16.5 | 18.0 | 9.9 | 9.0 | 16.11111 | 0 | 0 | 9.883721 | 8.977243 |
| 54915 | 1 | 12.583 | 1.0476 | 16.188 | 1.1053 | 13.727 | 1.6667 | 9.9667 | 3.019 | 7.697 | 11.6 | 15.2 | 12.8 | 9.6 | 8.7 | 11.58333 | 0 | 0 | 9.633333 | 8.716017 |
| 66865 | 1 | 1 | 1.0526 | 1.0909 | 1.0256 | 1.0526 | 1.1 | 1.2667 | 1.2255 | 1.5909 | 0.0 | 0.1 | 0.1 | 0.4 | 0.8 | 0 | 0 | 0 | 0 | 0 |
| 66934 | 1 | 1.2222 | 1.1111 | 1.5 | 1.1379 | 2.1111 | 1.3478 | 4.7692 | 1.5645 | 12.45 | 0.2 | 0.6 | 1.2 | 4.1 | 12.0 | 0 | 0 | 0 | 4.117057 | 12.01452 |
| 66984 | 1.6875 | 1.1111 | 3.5556 | 1.2 | 33.909 | 2.7143 | 9.9048 | 1.75 | 20.489 | 4.6364 | 0.8 | 2.8 | 34.6 | 9.7 | 23.1 | 0 | 2.755556 | 0 | 9.654762 | 0 |
| 66985 | 1 | 1.1 | 1 | 1.1818 | 1.1053 | 1.1154 | 1.075 | 1.2353 | 1.1222 | 1.1667 | 0.1 | 0.2 | 0.2 | 0.3 | 0.3 | 0 | 0 | 0 | 0 | 0 |
| 67309 | 1.3333 | 2.25 | 2 | 4.7 | 7.4348 | 10.059 | 9.4286 | 17.429 | 16.018 | 18.167 | 1.6 | 4.7 | 15.5 | 24.9 | 32.2 | 0 | 4.7 | 0 | 0 | 0 |
| 67340 | 1.7857 | 3.5 | 3.7333 | 8.2 | 4.5 | 5.7727 | 9.7308 | 14.444 | 11.276 | 11.429 | 3.3 | 9.9 | 8.3 | 22.2 | 20.7 | 3.285714 | 9.933333 | 8.272727 | 0 | 0 |
| 67356 | 1.8125 | 2.25 | 3.6111 | 4.8 | 18.278 | 33.889 | 9.0333 | 16.8 | 9.1975 | 16.837 | 2.1 | 6.4 | 50.2 | 23.8 | 24.0 | 2.0625 | 6.411111 | 0 | 0 | 0 |
| 67363 | 8.8636 | 1.6667 | 10.042 | 3.6 | 12.038 | 9.2105 | 7.4595 | 10.824 | 7.3365 | 12.646 | 8.5 | 11.6 | 19.2 | 16.3 | 18.0 | 8.530303 | 11.64167 | 0 | 0 | 0 |
| 67382 | 1.5625 | 1.1111 | 3.0556 | 1.0909 | 14.679 | 1.2778 | 7.875 | 1.2667 | 11.319 | 1.4615 | 0.7 | 2.1 | 14.0 | 7.1 | 10.8 | 0 | 2.146465 | 0 | 7.141667 | 10.78038 |
| 87801 | 1.0667 | 1.125 | 1.0588 | 1.1 | 1.1471 | 1.0435 | 1.125 | 1.2 | 1.3222 | 1.1579 | 0.2 | 0.2 | 0.2 | 0.3 | 0.5 | 0 | 0 | 0 | 0 | 0 |
| 53551 | 1.3125 | 1 | 2.1053 | 1.0909 | 16.065 | 1.2 | 7.5769 | 1.5 | 9.4674 | 1.4091 | 0.3 | 1.2 | 15.3 | 7.1 | 8.9 | 0 | 0 | 0 | 7.076923 | 8.876482 |
| 41064 | 1.0625 | 1.8889 | 1.0476 | 3.4167 | 1.1471 | 3.1389 | 1.2703 | 8.3182 | 1.2917 | 5.5766 | 1.0 | 2.5 | 2.3 | 7.6 | 4.9 | 0 | 2.464286 | 2.285948 | 7.588452 | 4.868309 |
| 41408 | 1.0667 | 4.125 | 1.0526 | 10.8 | 1.1455 | 16.75 | 1.2581 | 18.5 | 1.7517 | 23.286 | 3.2 | 9.9 | 15.9 | 17.8 | 23.0 | 3.191667 | 9.852632 | 0 | 0 | 0 |
| 41452 | 0.9286 | 1 | 1 | 1.2857 | 1.1724 | 1.4615 | 1.0455 | 1.625 | 1.1852 | 2.1739 | -0.1 | 0.3 | 0.6 | 0.7 | 1.4 | 0 | 0 | 0 | 0 | 0 |
| 47901 | 0.8824 | 0.8889 | 0.8571 | 1 | 1.3455 | 1.2632 | 1.0811 | 1.2 | 1.4143 | 1.4375 | -0.2 | -0.1 | 0.6 | 0.3 | 0.9 | 0 | 0 | 0 | 0 | 0 |
| 47932 | 0.9375 | 16.556 | 1.1111 | 21.6 | 1.3214 | 43.467 | 2.375 | 19.167 | 7.3529 | 27.071 | 15.5 | 20.7 | 42.8 | 19.5 | 32.4 | 15.49306 | 0 | 0 | 0 | 0 |
| 48094 | 2.0667 | 1.125 | 4.8235 | 1.2222 | 23.68 | 1.3571 | 10.261 | 1.5 | 14.291 | 2.25 | 1.2 | 4.0 | 23.0 | 9.8 | 14.5 | 0 | 4.045751 | 0 | 9.76087 | 0 |

FIGURE 15 Cont'd

| | MAP092701_PCR1_ Optimization | | | | | | | | | |
|---|---|---|---|---|---|---|---|---|---|---|
| Snp number | Calculation of Amplification Factor (F) using equation 1b. (w/ FOZ240=3.42 and a dilution factor of 0.125) | | | | | Selected Value of F | X[n] | R[n] (setting X[max] to 1.6) | Concentration of Primers in Optimized Mix (uM) | |
| 107-plex (102) | 10 | 20 | 40 | 80 | 160 | | | | | |
| 53529 | 68812.87 | 54445.42 | 0 | 0 | 0 | 68812.0 | 1.2843 | 1.25 | 0.031 | |
| 53557 | 0 | 0 | 0 | 3991.878 | 0 | 3991.0 | 0.5483 | 2.92 | 0.073 | |
| 53530 | 0 | 0 | 18516.98 | 3449.604 | 0 | 18517.0 | 0.9450 | 1.69 | 0.042 | |
| 47986 | 0 | 0 | 4478.873 | 0 | 314.9711 | 4478.0 | 0.5780 | 2.77 | 0.069 | |
| 47987 | 0 | 23943.66 | 12490.33 | 0 | 0 | 23944.0 | 1.0114 | 1.58 | 0.040 | |
| 47994 | 563541.2 | 0 | 0 | 0 | 0 | 563541.0 | 1.8279 | 1.00 | 0.025 | Green - High End Correction |
| 47997 | 239436.6 | 0 | 0 | 0 | 0 | 239436.0 | 1.6067 | 1.00 | 0.025 | Green - High End Correction |
| 48088 | 0 | 0 | 0 | 2579.826 | 740.9693 | 2579.8 | 0.4355 | 3.67 | 0.092 | |
| 48097 | 0 | 0 | 3611.65 | 1151.764 | 612.7126 | 3611.6 | 0.5224 | 3.06 | 0.077 | |
| 53415 | 0 | 13555.5 | 11151.75 | 2357.516 | 443.0805 | 13555.0 | 0.8643 | 1.85 | 0.046 | |
| 53418 | 714084.5 | 0 | 0 | 0 | 0 | 714085.0 | 1.8891 | 1.00 | 0.025 | Green - High End Correction |
| 53433 | 0 | 0 | 6318.222 | 0 | 285.4679 | 6318.0 | 0.6670 | 2.40 | 0.060 | |
| 53444 | 253098.6 | 0 | 0 | 0 | 0 | 253098.0 | 1.6210 | 1.00 | 0.025 | Green - High End Correction |
| 53459 | 0 | 25252.04 | 0 | 3993.915 | 1166.58 | 25252.0 | 1.0252 | 1.56 | 0.039 | |
| 53522 | 0 | 21043.91 | 18892.67 | 0 | 0 | 21044.0 | 0.9781 | 1.64 | 0.041 | |
| 53544 | 0 | 0 | 4142.291 | 3522.699 | 0 | 4142.3 | 0.5579 | 2.87 | 0.072 | |
| 54762 | 0 | 29873.98 | 0 | 2325.395 | 714.9268 | 29874.0 | 1.0686 | 1.50 | 0.037 | |
| 54777 | 408450.7 | 0 | 0 | 3915.206 | 889.0316 | 408451.0 | 1.7447 | 1.00 | 0.025 | Green - High End Correction |
| 54915 | 293662 | 0 | 0 | 3816.021 | 863.1619 | 293662.0 | 1.6594 | 1.00 | 0.025 | Green - High End Correction |
| 66865 | 0 | 0 | 0 | 0 | 0 | 80.0 | -0.4624 | 12.00 | 0.300 | |
| 66934 | 0 | 0 | 0 | 1630.876 | 1189.818 | 1630.0 | 0.3168 | 5.05 | 0.126 | |
| 66984 | 0 | 17464.79 | 0 | 3824.51 | 0 | 17465.0 | 0.9299 | 1.72 | 0.043 | |
| 66985 | 0 | 0 | 0 | 0 | 0 | | #NUM! | 12.00 | 0.300 | |
| 67309 | 0 | 29788.73 | 0 | 0 | 0 | 29789.0 | 1.0679 | 1.50 | 0.037 | |
| 67340 | 83299.8 | 62957.75 | 13108.19 | 0 | 0 | 83300.0 | 1.3337 | 1.20 | 0.030 | |
| 67356 | 52288.73 | 40633.8 | 0 | 0 | 0 | 52289.0 | 1.2133 | 1.32 | 0.033 | |
| 67363 | 216261.2 | 73785.21 | 0 | 0 | 0 | 216261.0 | 1.5803 | 1.01 | 0.025 | |
| 67382 | 0 | 13604.35 | 0 | 2829.005 | 1067.599 | 13604.0 | 0.8653 | 1.85 | 0.046 | |
| 87801 | 0 | 0 | 0 | 0 | 0 | | #NUM! | 12.00 | 0.300 | |
| 53551 | 0 | 0 | 0 | 2803.359 | 879.053 | 2803.0 | 0.4569 | 3.50 | 0.088 | |
| 41064 | 0 | 15618.71 | 3622.1 | 3005.989 | 482.1169 | 15619.0 | 0.9010 | 1.78 | 0.044 | |
| 41408 | 80915.49 | 62446.26 | 0 | 0 | 0 | 80915.0 | 1.3262 | 1.21 | 0.030 | |
| 41452 | 0 | 0 | 0 | 0 | 0 | 1004.0 | 0.1915 | 12.00 | 0.300 | |
| 47901 | 0 | 0 | 0 | 0 | 0 | 964.0 | 0.1810 | 12.00 | 0.300 | |
| 47932 | 392781.7 | 0 | 0 | 0 | 0 | 392782.0 | 1.7346 | 1.00 | 0.025 | Green - High End Correction |
| 48094 | 0 | 25642.09 | 0 | 3866.542 | 0 | 25642.0 | 1.0291 | 1.55 | 0.039 | |

FIGURE 15 Cont'd

| | MAP092701_PCR1_ Optimization | | | | | | | | | | | | | | | | | | | | | | | | |
|---|---|---|---|---|---|---|---|---|---|---|---|---|---|---|---|---|---|---|---|---|---|---|---|---|---|
| Snp number | 10 min | | 20 min | | 40 min. | | 80 min | | 160 min. | | RED_FOZ + FAM_FOZ -2 values at a given time "m" | | | | | FOZm -2 (FOZm must be >2 at 10min or >2 and <12 at all other time points) | | | | |
| 107-plex (102) | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 | 10 | 20 | 40 | 80 | 160 |
| 48095 | 1.1765 | 1.1 | 1.8421 | 1.0769 | 4.6944 | 1.125 | 5.7333 | 1.2105 | 7.6082 | 1.473 | 0.3 | 0.9 | 3.8 | 4.9 | 7.1 | 0 | 0 | 3.819445 | 4.943859 | 7.08122 |
| 53412 | 1 | 1.2857 | 1 | 1.5 | 1.087 | 1.5385 | 1.05 | 3.5 | 1.6316 | 17.75 | 0.3 | 0.5 | 0.6 | 2.5 | 17.4 | 0 | 0 | 0 | 2.55 | 17.38158 |
| 53475 | 1 | 1 | 1 | 1 | 1.1481 | 1.2667 | 1.5714 | 1.1818 | 4.9531 | 1.7 | 0.0 | 0.0 | 0.4 | 0.8 | 4.7 | 0 | 0 | 0 | 0 | 4.653125 |
| 53503 | 1.2 | 1.375 | 1.2353 | 1.5556 | 1.2 | 1.4615 | 1.7143 | 2.6667 | 4.3654 | 5.625 | 0.6 | 0.8 | 0.7 | 2.4 | 8.0 | 0 | 0 | 0 | 2.380952 | 7.990385 |
| 53540 | 7.8235 | 13.875 | 8.7 | 16.2 | 6.0968 | 6.1333 | 7.875 | 13.308 | 13.706 | 21.725 | 19.7 | 22.9 | 10.2 | 19.2 | 33.4 | 19.69853 | 0 | 10.23011 | 0 | 0 |
| 55560 | 0.875 | 3 | 0.9412 | 8 | 1.1905 | 10.222 | 1.2632 | 13.167 | 2.2647 | 17.696 | 1.9 | 6.9 | 9.4 | 12.4 | 18.0 | 0 | 6.941176 | 9.412699 | 0 | 0 |
| 66938 | 1.2667 | 1.125 | 2.2353 | 1.5 | 23.692 | 2 | 9.1053 | 2.2 | 14.64 | 2.6667 | 0.4 | 1.7 | 23.7 | 9.3 | 15.3 | 0 | 0 | 0 | 9.305263 | 15.30667 |
| 47867 | 2 | 4 | 3.75 | 9.4444 | 20.889 | 25.5 | 7.875 | 11.75 | 10.759 | 10.305 | 4.0 | 11.2 | 44.4 | 17.6 | 19.1 | 4 | 11.19444 | 0 | 0 | 0 |
| 48083 | 1.2632 | 1.1111 | 1.7308 | 1.1818 | 2.3908 | 1.069 | 3.6667 | 1.1579 | 2.9367 | 1.3043 | 0.4 | 0.9 | 1.5 | 2.8 | 2.2 | 0 | 0 | 0 | 2.824561 | 2.241057 |
| 53553 | 11.667 | 1 | 11.045 | 1.2222 | 15.133 | 4.5 | 7.0857 | 2 | 6.6777 | 4.3143 | 10.7 | 10.3 | 17.6 | 7.1 | 9.0 | 10.66667 | 10.26768 | 0 | 7.085714 | 8.991971 |
| 37879 | 3.2 | 1 | 8.1176 | 1.2222 | 17.242 | 1.3571 | 8.7917 | 1.5 | 10.737 | 2.5 | 2.2 | 7.3 | 16.6 | 8.3 | 11.2 | 2.2 | 7.339869 | 0 | 8.291667 | 11.23684 |
| 41365 | 1.0667 | 1 | 1.1765 | 1.1667 | 3.8333 | 2.913 | 2.7917 | 2.4 | 9.875 | 6.0725 | 0.1 | 0.3 | 4.7 | 3.2 | 13.9 | 0 | 0 | 4.746377 | 3.191667 | 0 |
| 41646 | 1.4375 | 1.375 | 1.85 | 1.9091 | 1.8723 | 1.8519 | 4.0606 | 5.8333 | 5.1355 | 8.2727 | 0.8 | 1.8 | 1.7 | 7.9 | 11.4 | 0 | 0 | 0 | 7.893939 | 11.40821 |
| 47852 | 8.2381 | 1.125 | 7.9615 | 1.6667 | 9.8533 | 2.8947 | 4.3023 | 4.1538 | 4.0084 | 10.667 | 7.4 | 7.6 | 10.7 | 6.5 | 12.7 | 7.363095 | 7.628205 | 10.74807 | 6.456172 | 0 |
| 47885 | 1.0667 | 1.1429 | 1.2941 | 1.25 | 3.8065 | 1.4286 | 3.087 | 1.5 | 8.5132 | 1.9143 | 0.2 | 0.5 | 3.2 | 2.6 | 8.4 | 0 | 0 | 3.235023 | 2.586957 | 8.427444 |
| 47892 | 1.5882 | 1.125 | 2.6818 | 1.2222 | 13.479 | 1.2941 | 5.9677 | 1.4545 | 6.5887 | 1.814 | 0.7 | 1.9 | 12.8 | 5.4 | 6.4 | 0 | 0 | 0 | 5.422287 | 6.402663 |
| 47915 | 4.5714 | 1 | 6.6296 | 1.1 | 7.1263 | 1.5 | 3.6226 | 1.375 | 3.0478 | 2.1515 | 3.6 | 5.7 | 6.6 | 3.0 | 3.2 | 3.571429 | 5.72963 | 6.626316 | 2.997642 | 3.199297 |
| 47925 | 10.294 | 1.75 | 9.8571 | 4 | 13.385 | 29.5 | 6.0968 | 11.083 | 5.4259 | 14.56 | 10.0 | 11.9 | 40.9 | 15.2 | 18.0 | 10.04412 | 11.85714 | 0 | 0 | 0 |
| 47980 | 12.313 | 1.375 | 12.789 | 2.2222 | 16.116 | 6.75 | 8.0714 | 8.7273 | 7.4261 | 16.641 | 11.7 | 13.0 | 20.9 | 14.8 | 22.1 | 11.6875 | 0 | 0 | 0 | 0 |
| 37319 | 8.75 | 1.2857 | 11.615 | 1.75 | 20.682 | 1.625 | 10.294 | 6.4545 | 15.325 | 12.917 | 8.0 | 11.4 | 20.3 | 14.7 | 26.2 | 8.035714 | 11.36539 | 0 | 0 | 0 |
| 29043 | 1.6923 | 1.1429 | 2.7333 | 1.25 | 2.5405 | 1.3 | 7.9565 | 1.5385 | 7.8077 | 1.8864 | 0.8 | 2.0 | 1.8 | 7.5 | 7.7 | 0 | 0 | 0 | 7.494983 | 7.694056 |
| 53445 | 11.667 | 1.2857 | 14.059 | 1.875 | 18.561 | 9.0769 | 9.2593 | 6.5 | 8.6477 | 21.2 | 11.0 | 13.9 | 25.6 | 13.8 | 27.8 | 10.95238 | 0 | 0 | 0 | 0 |
| 41409 | 1.0833 | 1.1429 | 1.2308 | 1.2857 | 1.84 | 1.4615 | 1.6471 | 1.5556 | 3.7143 | 2.4286 | 0.2 | 0.5 | 1.3 | 1.2 | 4.1 | 0 | 0 | 0 | 0 | 4.142857 |
| 47897 | 1.0714 | 1.1429 | 1.2667 | 1.375 | 1.4783 | 1.4167 | 3.4737 | 1.8 | 12.462 | 2.7619 | 0.2 | 0.6 | 0.9 | 3.3 | 13.2 | 0 | 0 | 0 | 3.273684 | 0 |
| 41164 | 1.1429 | 2.125 | 1.0588 | 5 | 1.75 | 36.176 | 1.2609 | 16.154 | 1.8421 | 16.222 | 1.3 | 4.1 | 35.9 | 15.4 | 16.1 | 0 | 4.058824 | 0 | 0 | 0 |
| 66902 | 1.1538 | 1.1429 | 1.3125 | 1.25 | 15.903 | 1.5 | 3.3913 | 1.7 | 8.9412 | 2.75 | 0.3 | 0.6 | 15.4 | 3.1 | 9.7 | 0 | 0 | 0 | 3.091304 | 9.691176 |
| 53464 | 1.7692 | 1.1429 | 3.7333 | 1.25 | 3.4444 | 1.5833 | 8.6 | 2.5556 | 15.537 | 10.381 | 0.9 | 3.0 | 3.0 | 9.2 | 23.9 | 0 | 2.983333 | 3.027778 | 9.155556 | 0 |
| 53470 | 10.231 | 1.2857 | 12.8 | 1.2222 | 24.333 | 1.3684 | 10.944 | 1.6667 | 15.308 | 2.5385 | 9.5 | 12.0 | 23.7 | 10.6 | 15.8 | 9.516483 | 0 | 0 | 10.61111 | 0 |
| 47910 | 3.4 | 1.25 | 7.2778 | 1.3 | 17.514 | 1.2917 | 8.3077 | 1.6471 | 10.185 | 3.25 | 2.7 | 6.6 | 16.8 | 8.0 | 11.4 | 2.65 | 6.577778 | 0 | 7.954751 | 11.43519 |

FIGURE 15 Cont'd

| | MAP092701_PCR1_ Optimization | | | | | | | | | |
|---|---|---|---|---|---|---|---|---|---|---|
| Snp number | Calculation of Amplification Factor (F) using equation 1b. (w/ FOZ240=3.42 and a dilution factor of 0.125) | | | | | Selected Value of F | X[n] | R[n] (setting X[max] to 1.6) | Concentration of Primers in Optimized Mix (uM) | |
| 107-plex (102) | 10 | 20 | 40 | 80 | 160 | | | | | |
| 48095 | 0 | 0 | 6051.937 | 1958.395 | 701.2652 | 6051.9 | 0.6559 | 2.44 | 0.061 | |
| 53412 | 0 | 0 | 0 | 1010.123 | 1721.327 | 1010.0 | 0.1930 | 8.29 | 0.207 | |
| 53475 | 0 | 0 | 0 | 0 | 460.8068 | 460.0 | -0.0103 | 12.00 | 0.300 | |
| 53503 | 0 | 0 | 0 | 943.159 | 791.3013 | 943.0 | 0.1753 | 9.13 | 0.228 | |
| 53540 | 499399.3 | 0 | 16209.68 | 0 | 0 | 499399.0 | 1.7967 | 1.00 | 0.025 | Green - High End Correction |
| 55560 | 0 | 43993.37 | 14914.49 | 0 | 0 | 47535.0 | 1.1887 | 1.35 | 0.034 | |
| 66938 | 0 | 0 | 0 | 3686.064 | 1515.845 | 3686.0 | 0.5277 | 3.03 | 0.076 | |
| 47867 | 101408.5 | 70950.71 | 0 | 0 | 0 | 101408.0 | 1.3846 | 1.16 | 0.029 | |
| 48083 | 0 | 0 | 0 | 1118.884 | 221.9356 | 1118.9 | 0.2195 | 7.29 | 0.182 | |
| 53553 | 270422.5 | 65076.83 | 0 | 2806.841 | 890.4901 | 270423.0 | 1.6381 | 1.00 | 0.025 | Green - High End Correction |
| 37879 | 55774.65 | 46520.3 | 0 | 3284.551 | 1112.803 | 55774.0 | 1.2300 | 1.30 | 0.033 | |
| 41365 | 0 | 0 | 7520.667 | 1264.305 | 0 | 7520.0 | 0.7120 | 2.25 | 0.056 | |
| 41646 | 0 | 0 | 0 | 3127.001 | 1129.774 | 3127.0 | 0.4852 | 3.30 | 0.082 | |
| 47852 | 186670 | 48347.78 | 17030.39 | 2557.462 | 0 | 186670.0 | 1.5423 | 1.04 | 0.026 | |
| 47885 | 0 | 0 | 5125.917 | 1024.763 | 834.584 | 5125.0 | 0.6129 | 2.61 | 0.065 | |
| 47892 | 0 | 0 | 0 | 2147.913 | 634.0666 | 2147.0 | 0.3880 | 4.12 | 0.103 | |
| 47915 | 90543.26 | 36314.55 | 10499.44 | 1187.446 | 316.8318 | 90543.0 | 1.3553 | 1.18 | 0.030 | |
| 47925 | 254639.6 | 75150.9 | 0 | 0 | 0 | 254640.0 | 1.6226 | 1.00 | 0.025 | Green - High End Correction |
| 47980 | 296302.8 | 0 | 0 | 0 | 0 | 296303.0 | 1.6617 | 1.00 | 0.025 | Green - High End Correction |
| 37319 | 203722.3 | 72034.13 | 0 | 0 | 0 | 203722.0 | 1.5649 | 1.02 | 0.026 | |
| 29043 | 0 | 0 | 0 | 2968.963 | 761.9554 | 2969.0 | 0.4718 | 3.39 | 0.085 | |
| 53445 | 277666 | 0 | 0 | 0 | 0 | 277666.0 | 1.6450 | 1.00 | 0.025 | Green - High End Correction |
| 41409 | 0 | 0 | 0 | 0 | 410.2741 | 410.0 | -0.0400 | 12.00 | 0.300 | |
| 47897 | 0 | 0 | 0 | 1296.794 | 0 | 1296.0 | 0.2575 | 6.21 | 0.155 | |
| 41164 | 0 | 25724.94 | 0 | 0 | 0 | 32142.0 | 1.0875 | 1.47 | 0.037 | |
| 66902 | 0 | 0 | 0 | 1224.548 | 959.7336 | 1224.0 | 0.2427 | 6.59 | 0.165 | |
| 53464 | 0 | 18908.45 | 4797.535 | 3626.761 | 0 | 4797.0 | 0.5958 | 2.69 | 0.067 | |
| 53470 | 241263 | 0 | 0 | 4203.345 | 0 | 241263.0 | 1.6086 | 1.00 | 0.025 | Green - High End Correction |
| 47910 | 67183.1 | 41690.14 | 0 | 3151.09 | 1132.446 | 67183.0 | 1.2781 | 1.25 | 0.031 | |

FIGURE 16a

| 107 Plex | 40 minute read | | | | | Optimized Primer ConcentrationCalls Made at 40 min read |
|---|---|---|---|---|---|---|
| 101 SNPs | Fam FOZ | Red FOZ | Dye Call | Final Call | Genomic Call | 94 |
| 47887 | 4.2632 | 5.6 | HET | HET | HET | 1 |
| 53488 | 16.897 | 2.375 | FAM | C | FAM | 1 |
| 67329 | 6.5172 | 1.5 | FAM | C | FAM | 1 |
| 67342 | 4.4773 | 1.1818 | FAM | C | FAM | 1 |
| 67371 | 16.233 | 32.278 | HET | HET | HET | 1 |
| 34573 | 4.371 | 1 | FAM | C | FAM | 1 |
| 37810 | 1.2727 | 8.2632 | RED | G | RED | 1 |
| 41420 | 13.606 | 19.65 | HET | HET | HET | 1 |
| 41475 | 1.3333 | 1.3333 | HET | HET | HET | 1 |
| 41541 | 12.963 | 1.4286 | FAM | G | FAM | 1 |
| 44907 | 4.24 | 1.2 | FAM | C | FAM | 1 |
| 44927 | 1.7727 | 19.048 | RED | T | RED | 1 |
| 45046 | 3.6923 | 4.6667 | HET | HET | HET | 1 |
| 45076 | 1.8696 | 1.7222 | HET | HET | HET | 1 |
| 45080 | 1.4348 | 11.111 | RED | T | RED | 1 |
| 47850 | 3.9259 | 3.5789 | HET | HET | HET | 1 |
| 47855 | 1.9268 | 1.35 | 43 | 43 | FAM | 0 |
| 47857 | 9.3951 | 1.1429 | FAM | C | FAM | 1 |
| 47868 | 29.519 | 3.8182 | FAM | C | FAM | 1 |
| 47877 | 14.171 | 1.32 | FAM | C | FAM | 1 |
| 47878 | 1.4074 | 5.75 | RED | A | RED | 1 |
| 47880 | 5.6571 | 1.4091 | FAM | C | FAM | 1 |
| 47899 | 11.484 | 1.5 | FAM | G | FAM | 1 |
| 47905 | 6.1591 | 1.1905 | FAM | C | FAM | 1 |
| 47906 | 20.053 | 1.3636 | FAM | G | FAM | 1 |
| 47909 | 1.7222 | 22.214 | RED | T | RED | 1 |
| 47917 | 2.4231 | 26.706 | RED | A | RED | 1 |
| 47920 | 1.3077 | 2.2353 | RED | A | RED | 1 |
| 47924 | 1.2667 | 5.8889 | RED | A | RED | 1 |
| 47941 | 8.2174 | 9 | HET | HET | HET | 1 |
| 47960 | 5.6897 | 2.0526 | FAM | G | FAM | 1 |
| 47963 | 8.9091 | 1.6667 | FAM | G | FAM | 1 |
| 47972 | 1.56 | 40.941 | RED | G | RED | 1 |
| 47981 | 2.6316 | 1.2593 | FAM | G | FAM | 1 |
| 53478 | 26.963 | 1.65 | FAM | C | FAM | 1 |
| 53528 | 1.8571 | 1.4 | HET | HET | FAM | 0 |
| 53529 | 17.103 | 10.19 | HET | HET | HET | 1 |
| 53557 | 7.6364 | 1.3182 | FAM | G | FAM | 1 |
| 53530 | 5.3846 | 1.7 | FAM | C | FAM | 1 |
| 47986 | 1.4 | 1.6875 | HET | HET | HET | 1 |
| 47987 | 12 | 1.7333 | FAM | G | FAM | 1 |
| 47994 | 23.583 | 31.714 | HET | HET | HET | 1 |
| 47997 | 1.4615 | 8.3125 | RED | A | RED | 1 |
| 48088 | 6.4 | 1.2 | FAM | G | FAM | 1 |
| 48097 | 3.7222 | 1.65 | FAM | G | FAM | 1 |
| 53415 | 3.5904 | 1.6471 | FAM | G | FAM | 1 |
| 53418 | 1.3176 | 38.85 | RED | A | RED | 1 |
| 53433 | 1.2903 | 1.2273 | 39 | 39 | FAM | 0 |
| 53444 | 16.152 | 1.6667 | FAM | G | FAM | 1 |
| 53459 | 5.675 | 1.4167 | FAM | G | FAM | 1 |
| 53522 | 2.7273 | 4.8696 | HET | HET | HET | 1 |
| 53544 | 9.6774 | 4.8955 | HET | HET | HET | 1 |
| 54762 | 5.1944 | 1.3571 | FAM | C | FAM | 1 |
| 54777 | 1.1136 | 11.912 | RED | A | RED | 1 |

FIGURE 16a (cont'd.)

| 107 Plex | 40 minute read | | | | | Optimized Primer ConcentrationCalls Made at 40 min read |
|---|---|---|---|---|---|---|
| 101 SNPs | Fam FOZ | Red FOZ | Dye Call | Final Call | Genomic Call | 94 |
| 54915 | 1.2143 | 10.368 | RED | A | RED | 1 |
| 66865 | 1.05 | 1.1429 | 59 | 59 | FAM | 0 |
| 66934 | 1.1389 | 7.9565 | RED | A | RED | 1 |
| 66984 | 7.7931 | 2.05 | FAM | G | FAM | 1 |
| 66985 | 1.1 | 1.2 | 39 | 39 | FAM | 0 |
| 67309 | 2.9444 | 5.4483 | HET | HET | HET | 1 |
| 67340 | 4.0769 | 5.6095 | HET | HET | HET | 1 |
| 67356 | 6.0303 | 6.55 | HET | HET | HET | 1 |
| 67363 | 1.8298 | 1.1765 | FAM | G | FAM | 1 |
| 67382 | 16.367 | 1.2083 | FAM | G | FAM | 1 |
| 67801 | 12.333 | 1.3704 | FAM | C | FAM | 1 |
| 53551 | 6.913 | 1.129 | FAM | C | FAM | 1 |
| 41064 | 1.4545 | 5.3864 | RED | A | RED | 1 |
| 41408 | 1.1688 | 20.522 | RED | A | RED | 1 |
| 41452 | 1.3158 | 1.6111 | HET | HET | FAM | 0 |
| 47901 | 1.7692 | 1.3636 | HET | HET | FAM | 0 |
| 47932 | 1.3214 | 13.765 | RED | A | RED | 1 |
| 48094 | 5.8519 | 1.3125 | FAM | C | FAM | 1 |
| 48095 | 12.122 | 1.1786 | FAM | C | FAM | 1 |
| 53412 | 1.5172 | 11.222 | RED | A | RED | 1 |
| 53475 | 10.412 | 1.3333 | FAM | G | FAM | 1 |
| 53503 | 3.9375 | 3.9444 | HET | HET | HET | 1 |
| 53540 | 17.595 | 18.727 | HET | HET | HET | 1 |
| 55560 | 1.4333 | 10.923 | RED | A | RED | 1 |
| 66938 | 9.3333 | 1.619 | FAM | C | FAM | 1 |
| 47867 | 4.9259 | 7.4762 | HET | HET | HET | 1 |
| 48083 | 4.3 | 1.1389 | FAM | G | FAM | 1 |
| 53553 | 14.34 | 1.4375 | FAM | C | FAM | 1 |
| 37879 | 7.5429 | 1.5 | FAM | T | FAM | 1 |
| 41365 | 2.2333 | 2.1071 | HET | HET | HET | 1 |
| 41646 | 8.2105 | 9.2059 | HET | HET | HET | 1 |
| 47852 | 10.244 | 1.3913 | FAM | C | 17 | 1 |
| 47885 | 2.3421 | 1.2632 | FAM | T | FAM | 1 |
| 47892 | 8.9508 | 1.2083 | FAM | G | FAM | 1 |
| 47915 | 8.6887 | 1.1786 | FAM | G | 17 | 1 |
| 47925 | 16.898 | 3.6364 | FAM | G | FAM | 1 |
| 47980 | 16.963 | 1.6364 | FAM | G | FAM | 1 |
| 37319 | 19.478 | 1.6471 | FAM | C | FAM | 1 |
| 29043 | 10.818 | 1.4211 | FAM | G | FAM | 1 |
| 53445 | 12.615 | 1.8 | FAM | C | 17 | 1 |
| 41409 | 12.154 | 1.8 | FAM | C | FAM | 1 |
| 47897 | 5.0417 | 1.6667 | FAM | G | FAM | 1 |
| 41164 | 1.5357 | 7.2 | RED | T | RED | 1 |
| 66902 | 13.675 | 1.7059 | FAM | G | FAM | 1 |
| 53464 | 21.75 | 2.5294 | FAM | C | FAM | 1 |
| 53470 | 14.467 | 1.4231 | FAM | C | 17 | 1 |
| 47910 | 16.159 | 1.2759 | FAM | C | FAM | 1 |

CNR; "Call Not Reproduced", NS; "New Signal"

FIGURE 16b

Compare 10 min Read of Balanced Mix (MAP Invader 092701) v. Optimized Mix (MAP Invader 100301)

| Primer Set Used | 10 min Calls with Balanced Mix | | | | | 10 min Calls w/ Optimized Mix | | | | | | Bal. | Opt. |
|---|---|---|---|---|---|---|---|---|---|---|---|---|---|
| 107-plex (101) | Fam FOZ | Red FOZ | FOZ RATIO | Dye Call | Final Call | Fam FOZ | Red FOZ | FOZ RATIO | Dye Call | Final Call | Genomic Call | 50 | 71 |
| 47887 | 1.25 | 1.375 | 0.6666 | 038 | 38 | 1.4375 | 1.4167 | 1.0500 | HET | HET | HET | 0 | 1 |
| 53488 | 1.1176 | 1.1 | 1.1764 | 39 | 39 | 13.5 | 1.0667 | 187.4900 | FAM | C | FAM | 0 | 1 |
| 67329 | 4.6667 | 1.125 | 29.3330 | FAM | C | 1.65 | 1 | 64.9990 | FAM | C | FAM | 1 | 1 |
| 67342 | 1.7647 | 1.3333 | 2.2941 | HET | HET | 1.44 | 0.9333 | 44.0000 | 17 | 17 | FAM | 0 | 0 |
| 67371 | 7.7333 | 18 | 0.3960 | 53 | 53 | 3.6316 | 6.5385 | 0.4751 | HET | HET | HET | 0 | 1 |
| 34573 | 1.9444 | 1 | 94.4440 | FAM | C | 1.5 | 0.8235 | 50.0000 | 17 | 17 | FAM | 1 | 0 |
| 37810 | 1.0667 | 1.5 | 0.1333 | 28 | 28 | 1.0833 | 1.7857 | 0.1060 | RED | G | RED | 0 | 1 |
| 41420 | 2.2308 | 3 | 0.6153 | HET | HET | 2.9545 | 3.3571 | 0.8292 | HET | HET | HET | 1 | 1 |
| 41475 | 1 | 1 | 1.0000 | 39 | 39 | 1.0909 | 1.0667 | 1.3636 | 39 | 39 | HET | 0 | 0 |
| 41541 | 3 | 1.1429 | 13.9990 | FAM | G | 2.7368 | 1.0714 | 24.3150 | FAM | G | FAM | 1 | 1 |
| 44907 | 1.2308 | 1.1 | 2.3076 | 39 | 39 | 1.4444 | 1 | 44.4440 | 17 | 17 | FAM | 0 | 0 |
| 44927 | 1.125 | 3.8889 | 0.0432 | RED | T | 1.2727 | 3.4 | 0.1136 | RED | T | RED | 1 | 1 |
| 45046 | 1.6875 | 2 | 0.6875 | HET | HET | 1.4091 | 1.4615 | 0.8863 | HET | HET | HET | 1 | 1 |
| 45076 | 1.0714 | 1.1111 | 0.6428 | 39 | 39 | 1.1053 | 1 | 10.5260 | 19 | 19 | HET | 0 | 0 |
| 45080 | 1.1429 | 1.4444 | 0.3214 | 58 | 58 | 1.1111 | 1.9231 | 0.1203 | RED | T | RED | 0 | 1 |
| 47850 | 1.8 | 2 | 0.7999 | HET | HET | 1.4737 | 1.3846 | 1.2315 | HET | HET | HET | 1 | 1 |
| 47855 | 1.125 | 1.1111 | 1.1249 | 39 | 39 | 1.1905 | 1.0714 | 2.6666 | 49 | 49 | FAM | 0 | 0 |
| 47857 | 2 | 1.1818 | 5.5000 | FAM | C | 6.2667 | 0.95 | 526.6600 | FAM | C | FAM | 1 | 1 |
| 47868 | 18.5 | 4 | 5.8333 | FAM | C | 20.3 | 1.1765 | 109.3600 | FAM | C | FAM | 1 | 1 |
| 47877 | 3.5625 | 1.2222 | 11.5310 | FAM | C | 3.36 | 0.9412 | 235.9900 | FAM | C | FAM | 1 | 1 |
| 47878 | 1.2143 | 5.75 | 0.0451 | RED | A | 1.0952 | 1.4667 | 0.2040 | 28 | 28 | RED | 1 | 0 |
| 47880 | 2.25 | 1.125 | 10.0000 | FAM | C | 1.56 | 1.0625 | 8.9599 | 17 | 17 | FAM | 1 | 0 |
| 47899 | 1.3333 | 1 | 33.3330 | 17 | 17 | 2.3478 | 1.1333 | 10.1080 | FAM | G | FAM | 0 | 1 |
| 47905 | 2.2 | 1.1429 | 8.3999 | FAM | C | 1.7692 | 1.0667 | 11.5380 | FAM | C | FAM | 1 | 1 |
| 47906 | 15.385 | 1.25 | 57.5380 | FAM | G | 7.6667 | 1.1053 | 63.3330 | FAM | G | FAM | 1 | 1 |
| 47909 | 1.0769 | 2.5 | 0.0512 | RED | T | 1.25 | 3.25 | 0.1111 | RED | T | RED | 1 | 1 |
| 47917 | 1 | 4.1111 | 0.0032 | RED | A | 1.4762 | 4.5385 | 0.1345 | RED | A | RED | 1 | 1 |
| 47920 | 1 | 1.1111 | 0.0899 | 29 | 29 | 1.1053 | 1.1538 | 0.6842 | 39 | 39 | RED | 0 | 0 |
| 47924 | 1 | 1.6667 | 0.0150 | RED | A | 1.0909 | 1.4286 | 0.2121 | 28 | 28 | RED | 1 | 0 |
| 47941 | 3.2667 | 4.5556 | 0.6375 | HET | HET | 1.8235 | 1.75 | 1.0980 | HET | HET | HET | 1 | 1 |
| 47960 | 1.1875 | 1.2222 | 0.8437 | 39 | 39 | 1.6316 | 1.2308 | 2.7368 | 41 | 41 | FAM | 0 | 0 |
| 47963 | 1.2143 | 1.2222 | 0.9642 | 39 | 39 | 1.875 | 1 | 87.5000 | FAM | G | FAM | 0 | 1 |
| 47972 | 1.0667 | 12.222 | 0.0059 | RED | G | 1.2222 | 7.7692 | 0.0328 | RED | G | RED | 1 | 1 |
| 47981 | 1.1875 | 1.1111 | 1.6874 | 39 | 39 | 1.2609 | 1 | 26.0860 | 19 | 19 | FAM | 0 | 0 |
| 53478 | 15.6 | 1.25 | 58.4000 | FAM | C | 5.35 | 1.1333 | 32.6250 | FAM | C | FAM | 1 | 1 |
| 53528 | 1.0667 | 1.25 | 0.2666 | 59 | 59 | 1.1364 | 1 | 13.6360 | 19 | 19 | FAM | 0 | 0 |
| 53529 | 3.2143 | 1.5 | 4.4285 | FAM | G | 4.28 | 1.8824 | 3.7173 | 43 | 43 | HET | 0 | 0 |
| 53557 | 1.2857 | 1.125 | 2.2857 | 39 | 39 | 1.68 | 0.9412 | 67.9990 | FAM | G | FAM | 0 | 1 |
| 53530 | 1.1667 | 1.1429 | 1.1666 | 39 | 39 | 1.55 | 1.2143 | 2.5666 | 47 | 47 | FAM | 0 | 0 |
| 47986 | 1 | 1.125 | 0.0800 | 29 | 29 | 1.1111 | 1.0769 | 1.4444 | 39 | 39 | HET | 0 | 0 |
| 47987 | 2 | 1.3333 | 2.9999 | 43 | 43 | 2.1176 | 1 | 111.7600 | FAM | G | FAM | 0 | 1 |
| 47994 | 7.4286 | 16.8 | 0.4068 | HET | HET | 4.5294 | 5.9333 | 0.7154 | HET | HET | HET | 1 | 1 |
| 47997 | 0.8889 | 10.556 | 0.0010 | RED | A | 1.1053 | 1.6154 | 0.1710 | RED | A | RED | 1 | 1 |
| 48088 | 1.2353 | 1 | 23.5290 | 19 | 19 | 1.7 | 1 | 70.0000 | FAM | G | FAM | 0 | 1 |
| 48097 | 1.125 | 1.1111 | 1.1249 | 39 | 39 | 1.3636 | 1.1538 | 2.3636 | 37 | 37 | FAM | 0 | 0 |
| 53415 | 1.5 | 1.4 | 1.2500 | HET | HET | 2.1111 | 1.0769 | 14.4440 | FAM | G | FAM | 0 | 1 |
| 53418 | 1.3889 | 28.778 | 0.0139 | RED | A | 1.12 | 12.071 | 0.0108 | RED | A | RED | 1 | 1 |
| 53433 | 1.1875 | 1 | 18.7500 | 19 | 19 | 1 | 0.875 | 1.0000 | 39 | 39 | FAM | 0 | 0 |
| 53444 | 10.733 | 1.25 | 38.9330 | FAM | G | 3.2727 | 1.1333 | 17.0450 | FAM | G | FAM | 1 | 1 |
| 53459 | 2.125 | 1.1111 | 10.1240 | FAM | G | 1.6538 | 1 | 65.3840 | FAM | G | FAM | 1 | 1 |
| 53522 | 1.2 | 1.75 | 0.2666 | 52 | 52 | 1.3478 | 1.4706 | 0.7391 | HET | HET | HET | 0 | 1 |
| 53544 | 1.1667 | 1 | 16.6660 | 19 | 19 | 2.2273 | 1.3636 | 3.3749 | 43 | 43 | HET | 0 | 0 |
| 54762 | 2.4375 | 1.375 | 3.8333 | 43 | 43 | 1.6 | 1.0833 | 7.1999 | FAM | C | FAM | 0 | 1 |
| 54777 | 0.9444 | 17.167 | 0.0006 | RED | A | 1 | 2.9412 | 0.0051 | RED | A | RED | 1 | 1 |
| 54915 | 1 | 12.583 | 0.0008 | RED | A | 1 | 2.5 | 0.0066 | RED | A | RED | 1 | 1 |
| 66865 | 1 | 1 | 1.0000 | 39 | 39 | 0.9524 | 1 | 1.0000 | 39 | 39 | FAM | 0 | 0 |
| 66934 | 1 | 1.2222 | 0.0450 | 29 | 29 | 1 | 1.625 | 0.0160 | RED | A | RED | 0 | 1 |
| 66984 | 1.6875 | 1.1111 | 6.1874 | FAM | G | 1.75 | 1.1333 | 5.6250 | FAM | G | FAM | 1 | 1 |
| 66985 | 1 | 1.1 | 0.0999 | 29 | 29 | 0.9706 | 1 | 1.0000 | 39 | 39 | FAM | 0 | 0 |
| 67309 | 1.3333 | 2.25 | 0.2666 | 53 | 53 | 1.25 | 1.5263 | 0.4749 | 38 | 38 | HET | 0 | 0 |

FIGURE 16b (cont'd)

| Primer Set Used | 10 min Calls with Balanced Mix | | | | | 10 min Calls w/ Optimized Mix | | | | | | Bal. | Opt. |
|---|---|---|---|---|---|---|---|---|---|---|---|---|---|
| 107-plex (101) | Fam FOZ | Red FOZ | FOZ RATIO | Dye Call | Final Call | Fam FOZ | Red FOZ | FOZ RATIO | Dye Call | Final Call | Genomic Call | 50 | 71 |
| 67340 | 1.7857 | 3.5 | 0.3142 | 53 | 53 | 1.3889 | 1.5714 | 0.6805 | HET | HET | HET | 0 | 1 |
| 67356 | 1.8125 | 2.25 | 0.6500 | HET | HET | 1.5455 | 1.5 | 1.0909 | HET | HET | HET | 1 | 1 |
| 67363 | 8.8636 | 1.6667 | 11.7950 | FAM | G | 1.04 | 1 | 3.9999 | 49 | 49 | FAM | 1 | 0 |
| 67382 | 1.5625 | 1.1111 | 5.0624 | 17 | 17 | 4.05 | 1 | 305.0000 | FAM | G | FAM | 0 | 1 |
| 87801 | 1.0667 | 1.125 | 0.5333 | 39 | 39 | 2.8261 | 1.0625 | 29.2170 | FAM | C | FAM | 0 | 1 |
| 53551 | 1.3125 | 1 | 31.2500 | 17 | 17 | 1.7778 | 1.0526 | 14.7770 | FAM | C | FAM | 0 | 1 |
| 41064 | 1.0625 | 1.8889 | 0.0703 | RED | A | 1.1429 | 1.8182 | 0.1746 | RED | A | RED | 1 | 1 |
| 41408 | 1.0667 | 4.125 | 0.0213 | RED | A | 1.1852 | 3.6471 | 0.0699 | RED | A | RED | 1 | 1 |
| 41452 | 0.9286 | 1 | 1.0000 | 39 | 39 | 1.1304 | 1.2308 | 0.5652 | 39 | 39 | FAM | 0 | 0 |
| 47901 | 0.8824 | 0.8889 | 1.0000 | 39 | 39 | 1.2174 | 1.1538 | 1.4130 | 39 | 39 | FAM | 0 | 0 |
| 47932 | 0.9375 | 16.556 | 0.0006 | RED | A | 1.0526 | 2.3077 | 0.0402 | RED | A | RED | 1 | 1 |
| 48094 | 2.0667 | 1.125 | 8.5333 | FAM | C | 1.5294 | 1.0909 | 5.8235 | 17 | 17 | FAM | 1 | 0 |
| 48095 | 1.1765 | 1.1 | 1.7647 | 39 | 39 | 2.8095 | 1.0667 | 27.1420 | FAM | C | FAM | 0 | 1 |
| 53412 | 1 | 1.2857 | 0.0350 | 29 | 29 | 1.2105 | 2.2308 | 0.1710 | RED | A | RED | 0 | 1 |
| 53475 | 1 | 1 | 1.0000 | 39 | 39 | 2.1429 | 1.0769 | 14.8570 | FAM | G | FAM | 0 | 1 |
| 53503 | 1.2 | 1.375 | 0.5333 | 38 | 38 | 1.4762 | 1.3333 | 1.4285 | HET | HET | HET | 0 | 1 |
| 53540 | 7.8235 | 13.875 | 0.5299 | HET | HET | 3.56 | 3.6 | 0.9846 | HET | HET | HET | 1 | 1 |
| 55560 | 0.875 | 3 | 0.0050 | RED | A | 1.0417 | 2.1667 | 0.0357 | RED | A | RED | 1 | 1 |
| 66938 | 1.2667 | 1.125 | 2.1333 | 39 | 39 | 2.04 | 1.2 | 5.1999 | FAM | C | FAM | 0 | 1 |
| 47867 | 2 | 4 | 0.3333 | 53 | 53 | 1.4 | 1.8667 | 0.4615 | HET | HET | HET | 0 | 1 |
| 48083 | 1.2632 | 1.1111 | 2.3684 | 39 | 39 | 1.6563 | 1 | 65.6250 | FAM | G | FAM | 0 | 1 |
| 53553 | 11.667 | 1 | 1066.6000 | FAM | C | 4.8261 | 1.0833 | 45.9130 | FAM | C | FAM | 1 | 1 |
| 37879 | 3.2 | 1 | 220.0000 | FAM | T | 1.8947 | 1.0833 | 10.7360 | FAM | T | FAM | 1 | 1 |
| 41365 | 1.0667 | 1 | 6.6666 | 19 | 19 | 1.1579 | 1.1333 | 1.1842 | 39 | 39 | HET | 0 | 0 |
| 41646 | 1.4375 | 1.375 | 1.1666 | HET | HET | 2.48 | 2.2941 | 1.1436 | HET | HET | HET | 1 | 1 |
| 47852 | 8.2381 | 1.125 | 57.9040 | FAM | C | 5.7027 | 1.0714 | 65.8370 | FAM | C | 17 | 1 | 1 |
| 47885 | 1.0667 | 1.1429 | 0.4666 | 39 | 39 | 1.2381 | 1.0769 | 3.0952 | 49 | 49 | FAM | 0 | 0 |
| 47892 | 1.5882 | 1.125 | 4.7058 | 17 | 17 | 2.3548 | 1 | 135.4800 | FAM | G | FAM | 0 | 1 |
| 47915 | 4.5714 | 1 | 357.1400 | FAM | G | 6.95 | 1 | 594.9900 | FAM | G | 17 | 1 | 1 |
| 47925 | 10.294 | 1.75 | 12.3920 | FAM | G | 22.452 | 1.4286 | 50.0530 | FAM | G | FAM | 1 | 1 |
| 47980 | 12.313 | 1.375 | 30.1660 | FAM | G | 10.036 | 1.125 | 72.2850 | FAM | G | FAM | 1 | 1 |
| 37319 | 8.75 | 1.2857 | 27.1250 | FAM | C | 3.8824 | 1.0769 | 37.4700 | FAM | C | FAM | 1 | 1 |
| 29043 | 1.6923 | 1.1429 | 4.8461 | FAM | G | 2.4286 | 1.0769 | 18.5710 | FAM | G | FAM | 1 | 1 |
| 53445 | 11.667 | 1.2857 | 37.3330 | FAM | C | 2.7727 | 1.1667 | 10.6360 | FAM | C | 17 | 1 | 1 |
| 41409 | 1.0833 | 1.1429 | 0.5833 | 39 | 39 | 2.2222 | 1.0833 | 14.6660 | FAM | C | FAM | 0 | 1 |
| 47897 | 1.0714 | 1.1429 | 0.4999 | 39 | 39 | 1.3889 | 1.0909 | 4.2777 | 17 | 17 | FAM | 0 | 0 |
| 41164 | 1.1429 | 2.125 | 0.1269 | RED | T | 1.2222 | 1.6923 | 0.3209 | 52 | 52 | RED | 1 | 0 |
| 66902 | 1.1538 | 1.1429 | 1.0769 | 39 | 39 | 2.8947 | 1.0833 | 22.7360 | FAM | G | FAM | 0 | 1 |
| 53464 | 1.7692 | 1.1429 | 5.3846 | FAM | C | 4.6 | 1.1538 | 23.4000 | FAM | C | FAM | 1 | 1 |
| 53470 | 10.231 | 1.2857 | 32.3070 | FAM | C | 3.25 | 1.0714 | 31.5000 | FAM | C | 17 | 1 | 1 |
| 47910 | 3.4 | 1.25 | 9.6000 | FAM | C | 4.25 | 1.0625 | 52.0000 | FAM | C | FAM | 1 | 1 |

FIGURE 17

MAP092701_PCR1_ Optimization

| Snp number | | 10 min | | 20 min | | 40 min. | | 80 min | | 160 min. | | RED-FOZ + FAM-FOZ -2 | | | | |
|---|---|---|---|---|---|---|---|---|---|---|---|---|---|---|---|---|
| 107-plex (102) | Primers not added | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 |
| 47887 | | 1.25 | 1.38 | 1.75 | 2.5 | 1.73 | 2.13 | 9.17 | 14.5 | 16.9 | 22.8 | 0.6 | 2.3 | 1.9 | 21.7 | 37.7 |
| 53488 | | 1.12 | 1.1 | 1.14 | 1.08 | 2.02 | 1.26 | 2.39 | 1.24 | 3.69 | 1.34 | 0.2 | 0.2 | 1.3 | 1.6 | 3.0 |
| 67329 | | 4.67 | 1.13 | 10.1 | 1.2 | 16.2 | 1.17 | 10.3 | 1.67 | 9.5 | 2.56 | 3.8 | 9.3 | 15.3 | 10.0 | 10.1 |
| 67342 | | 1.76 | 1.33 | 3.27 | 1.55 | 6.26 | 1.26 | 7.28 | 1.56 | 5.78 | 1.71 | 1.1 | 2.8 | 5.5 | 6.8 | 5.5 |
| 67371 | | 7.73 | 18 | 13.5 | 25.9 | 21 | 31.8 | 11.8 | 19.3 | 11.7 | 15.4 | 23.7 | 37.4 | 50.7 | 29.1 | 25.1 |
| 34573 | | 1.94 | 1 | 4.19 | 1 | 3.94 | 1.14 | 6.81 | 1.22 | 5.42 | 1.36 | 0.9 | 3.2 | 3.1 | 6.0 | 4.8 |
| 37810 | | 1.07 | 1.5 | 1.11 | 2.89 | 1.19 | 2.47 | 1.38 | 15.8 | 1.35 | 18.2 | 0.6 | 2.0 | 1.7 | 15.1 | 17.5 |
| 41420 | | 2.23 | 3 | 4.81 | 6.89 | 11.2 | 16.2 | 10 | 20.6 | 10.1 | 19.4 | 3.2 | 9.7 | 25.4 | 28.6 | 27.5 |
| 41475 | | 1 | 1 | 1.12 | 1.22 | 1.29 | 1.4 | 1.5 | 1.42 | 1.55 | 1.65 | 0.0 | 0.3 | 0.7 | 0.9 | 1.2 |
| 41541 | | 3 | 1.14 | 7.92 | 1.38 | 13.1 | 1.35 | 12.8 | 1.58 | 12.9 | 2.36 | 2.1 | 7.3 | 12.4 | 12.4 | 13.3 |
| 44907 | | 1.23 | 1.1 | 1.73 | 1.17 | 5.88 | 1.29 | 8.25 | 1.45 | 10.6 | 1.45 | 0.3 | 0.9 | 5.2 | 7.7 | 10.0 |
| 44927 | | 1.13 | 3.89 | 1.42 | 11 | 2.57 | 22.7 | 2.92 | 19.9 | 3.41 | 15 | 3.0 | 10.4 | 23.2 | 20.9 | 16.4 |
| 45046 | | 1.69 | 2 | 3.89 | 4.67 | 5.07 | 5.94 | 8.56 | 18.5 | 5.7 | 19 | 1.7 | 6.6 | 9.0 | 25.0 | 22.7 |
| 45076 | | 1.07 | 1.11 | 1.13 | 1.2 | 2.35 | 2.38 | 1.88 | 1.87 | 5 | 3.03 | 0.2 | 0.3 | 2.7 | 1.7 | 6.0 |
| 45080 | | 1.14 | 1.44 | 1.13 | 2.5 | 1.32 | 2.19 | 1.28 | 10.2 | 1.51 | 15.3 | 0.6 | 1.6 | 1.5 | 9.4 | 14.8 |
| 47850 | | 1.8 | 2 | 3.47 | 4.1 | 3.4 | 3.06 | 10.9 | 17.5 | 10.9 | 17.9 | 1.8 | 5.6 | 4.5 | 26.4 | 26.8 |
| 47855 | | 1.13 | 1.11 | 1.3 | 1.18 | 10.7 | 1.29 | 2.61 | 1.28 | 3.75 | 1.31 | 0.2 | 0.5 | 10.0 | 1.9 | 3.1 |
| 47857 | | 2 | 1.18 | 3.67 | 1.23 | 8.34 | 1.15 | 6.08 | 1.32 | 3.32 | 1 | 1.2 | 2.9 | 7.5 | 5.4 | 2.3 |
| 47868 | | 18.5 | 4 | 17.7 | 8.91 | 30.3 | 15.3 | 14.1 | 19.4 | 18.9 | 19.4 | 20.5 | 24.6 | 43.6 | 31.5 | 36.3 |
| 47877 | | 3.56 | 1.22 | 8.05 | 1.45 | 4.08 | 1.14 | 9.34 | 2.06 | 8.3 | 2.21 | 2.8 | 7.5 | 3.2 | 9.4 | 8.5 |
| 47878 | | 1.21 | 5.75 | 1.53 | 16 | 2.55 | 33.9 | 4.05 | 22.7 | 11.5 | 21.6 | 5.0 | 15.5 | 34.4 | 24.7 | 31.2 |
| 47880 | | 2.25 | 1.13 | 5.05 | 1.1 | 19.5 | 2.53 | 9.62 | 1.54 | 8.56 | 1.93 | 1.4 | 4.2 | 20.0 | 9.2 | 8.5 |
| 47899 | | 1.33 | 1 | 2.76 | 1 | 2.93 | 1.31 | 9.7 | 1.31 | 11.7 | 1.87 | 0.3 | 1.8 | 2.2 | 9.0 | 11.6 |
| 47905 | | 2.2 | 1.14 | 4.16 | 1.22 | 11.9 | 1.43 | 9.54 | 1.73 | 8.07 | 2.45 | 1.3 | 3.4 | 11.4 | 9.3 | 8.5 |
| 47906 | | 15.4 | 1.25 | 17.3 | 1.36 | 18 | 3.43 | 10.3 | 1.9 | 7.54 | 2.11 | 14.6 | 16.7 | 19.4 | 10.2 | 7.6 |
| 47909 | | 1.08 | 2.5 | 1.07 | 6.13 | 1.3 | 9 | 1.35 | 21.8 | 2.32 | 30.2 | 1.6 | 5.2 | 8.3 | 21.2 | 30.6 |

FIGURE 17 Cont'd

MAP092701_PCR1_ Optimization

| Snp number | Limited RED-FOZ + FAM-FOZ -2 | | | | | Calculation of Amplification Factor (F) | | | | |
|---|---|---|---|---|---|---|---|---|---|---|
| 107-plex (102) | 10 | 20 | 40 | 80 | 160 | 10 | 20 | 40 | 80 | 160 |
| 47887 | 0 | 2.25 | 0 | 0 | 0 | 0 | 14260.6 | 0 | 0 | 0 |
| 53488 | 0 | 0 | 0 | 0 | 3.03599 | 0 | 0 | 0 | 0 | 300.659 |
| 67329 | 3.79167 | 9.25556 | 0 | 9.97701 | 10.061 | 96126.8 | 58662 | 0 | 3952.16 | 996.355 |
| 67342 | 0 | 2.81818 | 5.51848 | 6.83761 | 5.49206 | 0 | 17861.7 | 8744.07 | 2708.56 | 543.888 |
| 67371 | 23.7333 | 0 | 0 | 0 | 0 | 601690 | 0 | 0 | 0 | 0 |
| 34573 | 0 | 3.19048 | 3.08036 | 6.03303 | 4.7858 | 0 | 20221.3 | 4880.85 | 2389.85 | 473.946 |
| 37810 | 0 | 0 | 0 | 15.1346 | 0 | 0 | 0 | 0 | 5995.23 | 0 |
| 41420 | 3.23077 | 9.70139 | 0 | 0 | 0 | 81906.8 | 61487.7 | 0 | 0 | 0 |
| 41475 | 0 | 0 | 0 | 0 | 0 | 0 | 0 | 0 | 0 | 0 |
| 41541 | 2.14286 | 7.29808 | 0 | 0 | 0 | 54326 | 46255.4 | 0 | 0 | 0 |
| 44907 | 0 | 0 | 5.17628 | 7.70455 | 10.0182 | 0 | 0 | 8201.86 | 3051.98 | 992.118 |
| 44927 | 3.01389 | 10.4211 | 0 | 0 | 0 | 76408.4 | 66048.9 | 0 | 0 | 0 |
| 45046 | 0 | 6.55556 | 9.00784 | 0 | 0 | 0 | 41549.3 | 14273 | 0 | 0 |
| 45076 | 0 | 0 | 2.72283 | 0 | 6.0303 | 0 | 0 | 4314.34 | 0 | 597.191 |
| 45080 | 0 | 0 | 0 | 9.44667 | 0 | 0 | 0 | 0 | 3742.08 | 0 |
| 47850 | 0 | 5.57059 | 4.4625 | 0 | 0 | 0 | 35306.5 | 7070.86 | 0 | 0 |
| 47855 | 0 | 0 | 10.0216 | 0 | 3.06699 | 0 | 0 | 15879.2 | 0 | 303.729 |
| 47857 | 0 | 2.89744 | 7.49531 | 5.39422 | 2.31873 | 0 | 18364 | 11876.4 | 2136.8 | 229.627 |
| 47868 | 20.5 | 0 | 0 | 0 | 0 | 519718 | 0 | 0 | 0 | 0 |
| 47877 | 2.78472 | 7.50718 | 3.22394 | 9.40733 | 8.50898 | 70598.6 | 47580.7 | 5108.35 | 3726.49 | 842.659 |
| 47878 | 4.96429 | 0 | 0 | 0 | 0 | 125855 | 0 | 0 | 0 | 0 |
| 47880 | 0 | 4.15263 | 0 | 9.15915 | 8.49096 | 0 | 26319.5 | 0 | 3628.18 | 840.874 |
| 47899 | 0 | 0 | 2.24583 | 9.00334 | 11.6137 | 0 | 0 | 3558.54 | 3566.47 | 1150.13 |
| 47905 | 0 | 3.38012 | 11.3745 | 9.26299 | 8.52431 | 0 | 21423.3 | 18023 | 3669.32 | 844.177 |
| 47906 | 14.6346 | 0 | 0 | 10.1917 | 7.64685 | 371018 | 0 | 0 | 4037.19 | 757.281 |
| 47909 | 0 | 5.19643 | 8.3 | 0 | 0 | 0 | 32935.1 | 13151.4 | 0 | 0 |

FIGURE 17 Cont'd

MAP092701_PCR1_ Optimization

| Snp number | Selected Value of F | Apparent Primer Concentration | Snp number | | Corrected Primer Concentration (Rel 1.6) | Amount of Primers in Optimized Mix (1x=25ul) | |
|---|---|---|---|---|---|---|---|
| 107-plex (102) | | | 107-plex (101) | Primers not added | 3.06 | 3864.18 | |
| 47887 | 15845 | 0.904697764 | 47887 | | 1.768546429 | 22.11 | |
| 53488 | 300 | -0.120761158 | 53488 | | 12 | 150.00 | Yellow -Low End Correction |
| 67329 | 96126 | 1.370738614 | 67329 | | 1.167253905 | 14.59 | |
| 67342 | 17862 | 0.93567267 | 67342 | | 1.709999717 | 21.37 | |
| 67371 | 601690 | 1.844864758 | 67371 | | 1 | 12.50 | Green - High End Correction |
| 34573 | 20221 | 0.96773966 | 34573 | | 1.65333722 | 20.67 | |
| 37810 | 5995 | 0.653445945 | 37810 | | 2.448557547 | 30.61 | |
| 41420 | 81906 | 1.329354593 | 41420 | | 1.203591583 | 15.04 | |
| 41475 | 1095 | 0.213936976 | 41475 | | 12 | 150.00 | Yellow -Low End Correction |
| 41541 | 54325 | 1.223214128 | 41541 | | 1.308029366 | 16.35 | |
| 44907 | 8201 | 0.734444531 | 44907 | | 2.178517141 | 27.23 | |
| 44927 | 76408 | 1.311392162 | 44927 | | 1.220077446 | 15.25 | |
| 45046 | 41549 | 1.153905105 | 45046 | | 1.386595825 | 17.33 | |
| 45076 | 4314 | 0.568381036 | 45076 | | 2.81501299 | 35.19 | |
| 45080 | 3742.1 | 0.531616303 | 45080 | | 3.009689491 | 37.62 | |
| 47850 | 35307 | 1.111821915 | 47850 | | 1.439079387 | 17.99 | |
| 47855 | 15879 | 0.905251874 | 47855 | | 1.767463891 | 22.09 | |
| 47857 | 18364 | 0.942837669 | 47857 | | 1.697004747 | 21.21 | |
| 47868 | 519718 | 1.807004618 | 47868 | | 1 | 12.50 | Green - High End Correction |
| 47877 | 70598 | 1.290947856 | 47877 | | 1.239399402 | 15.49 | |
| 47878 | 125855 | 1.440399092 | 47878 | | 1.110803255 | 13.89 | |
| 47880 | 26319 | 1.035874633 | 47880 | | 1.544588455 | 19.31 | |
| 47899 | 3558 | 0.518574967 | 47899 | | 3.085378399 | 38.57 | |
| 47905 | 21423 | 0.982666838 | 47905 | | 1.62822224 | 20.35 | |
| 47906 | 371018 | 1.719877964 | 47906 | | 1 | 12.50 | Green - High End Correction |
| 47909 | 32935 | 1.09384385 | 47909 | | 1.462731632 | 18.28 | |

FIGURE 17 Cont'd

MAP092701_PCR1_ Optimization

| Snp number |
| --- |
| 107-plex (102) |
| 47887 |
| 53488 |
| 67329 |
| 67342 |
| 67371 |
| 34573 |
| 37810 |
| 41420 |
| 41475 |
| 41541 |
| 44907 |
| 44927 |
| 45046 |
| 45076 |
| 45080 |
| 47850 |
| 47855 |
| 47857 |
| 47868 |
| 47877 |
| 47878 |
| 47880 |
| 47899 |
| 47905 |
| 47906 |
| 47909 |

Plate Layout for Oligo Sets

| | A | B | C | D | E | F | G | H | I | J | K | L |
| --- | --- | --- | --- | --- | --- | --- | --- | --- | --- | --- | --- | --- |
| 1 | 0 | 42.3916 | 20.6667 | 12.7803 | 0 | 30.607 | 16.2599 | 22.198 | 18.3901 | 28.0885 | 15.0806 | 150 |
| 5 | 23.0017 | 12.5 | 0 | 12.5 | #REF! | 13.4988 | 0 | 30.3884 | 26.8552 | 12.5 | 12.5 | 150 |
| 8 | 20.4488 | 21.6615 | 15.5724 | 21.1644 | 12.5 | 35.8499 | 0 | 43.7715 | 12.5 | 36.4788 | 18.7156 | 12.5 |

| | A | B | C | D | E | F | G | H | I | J | K | L |
| --- | --- | --- | --- | --- | --- | --- | --- | --- | --- | --- | --- | --- |
| 2 | 18.7285 | 0 | 0 | 0 | 14.5907 | 0 | 14.9957 | 21.375 | 16.4834 | 12.6555 | 0 | 12.5 |
| 3 | 0 | 23.114 | 0 | 150 | | | | | | | | |
| 4 | | | | | | | | | | | | |
| 5 | | | | | | | | | | | | |
| 7 | | | | | | | | | | | | |
| 8 | | | | | | | | | | | | |

Bring to 6.25 mls for 1x Mix

FIGURE 17 Cont'd

MAP092701_PCR1_ Optimization

| Snp number | | 10 min | | 20 min | | 40 min. | | 80 min | | 160 min. | | RED-FOZ + FAM-FOZ -2 | | | | |
|---|---|---|---|---|---|---|---|---|---|---|---|---|---|---|---|---|
| 107-plex (102) | Primers not added | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 |
| 47917 | | 1 | 4.11 | 1.06 | 10.5 | 1.23 | 12.6 | 1.57 | 20.6 | 2.72 | 18.5 | 3.1 | 9.6 | 11.8 | 20.1 | 19.2 |
| 47920 | | 1 | 1.11 | 0.94 | 1.3 | 1.12 | 5.33 | 1.13 | 3.08 | 1.19 | 7.1 | 0.1 | 0.2 | 4.5 | 2.2 | 6.3 |
| 47924 | | 1 | 1.67 | 1 | 3.18 | 1.31 | 35.8 | 1.13 | 14.7 | 1.42 | 18.6 | 0.7 | 2.2 | 35.1 | 13.8 | 18.0 |
| 47941 | | 3.27 | 4.56 | 8.25 | 12.7 | 13.7 | 15.4 | 12.9 | 20.1 | 17 | 23.2 | 5.8 | 18.9 | 27.1 | 31.0 | 38.1 |
| 47960 | | 1.19 | 1.22 | 1.56 | 1.27 | 4.5 | 1.35 | 5.48 | 1.56 | 9.26 | 1.98 | 0.4 | 0.8 | 3.9 | 5.0 | 9.2 |
| 47963 | | 1.21 | 1.22 | 1.73 | 1.5 | 5.75 | 1.64 | 6.86 | 1.83 | 23.4 | 3.05 | 0.4 | 1.2 | 5.4 | 6.7 | 24.5 |
| 47972 | | 1.07 | 12.2 | 1.06 | 26.2 | 1.28 | 52.4 | 1.21 | 24.9 | 1.56 | 33.6 | 11.3 | 25.3 | 51.7 | 24.1 | 33.1 |
| 47981 | | 1.19 | 1.11 | 1.28 | 1.18 | 1.52 | 1.23 | 1.37 | 1.31 | 1.69 | 1.4 | 0.3 | 0.5 | 0.7 | 0.7 | 1.1 |
| 53478 | | 15.6 | 1.25 | 16.7 | 1.67 | 32.5 | 2.27 | 13.6 | 4.33 | 22.7 | 12.1 | 14.9 | 16.4 | 32.7 | 16.0 | 32.8 |
| 53528 | | 1.07 | 1.25 | 1.29 | 1.44 | 11.1 | 1.62 | 3.57 | 1.92 | 12.8 | 2.16 | 0.3 | 0.7 | 10.7 | 3.5 | 12.9 |
| 53529 | | 3.21 | 1.5 | 7.81 | 2.78 | 21.3 | 11.3 | 11.4 | 13.1 | 11.4 | 23.1 | 2.7 | 8.6 | 30.5 | 22.5 | 32.5 |
| 53557 | | 1.29 | 1.13 | 2.13 | 1.22 | 27.5 | 2.38 | 10.4 | 1.73 | 14.6 | 2.94 | 0.4 | 1.3 | 27.9 | 10.1 | 15.6 |
| 53530 | | 1.17 | 1.14 | 1.92 | 1.25 | 12.3 | 1.35 | 9.13 | 1.58 | 15.2 | 2 | 0.3 | 1.2 | 11.7 | 8.7 | 15.2 |
| 47986 | | 1 | 1.13 | 1.06 | 1.11 | 1.96 | 2.87 | 1.39 | 1.62 | 2.21 | 2.97 | 0.1 | 0.2 | 2.8 | 1.0 | 3.2 |
| 47987 | | 2 | 1.33 | 4 | 1.78 | 8.19 | 1.69 | 13.7 | 4.45 | 41.8 | 18.6 | 1.3 | 3.8 | 7.9 | 16.1 | 58.4 |
| 47994 | | 7.43 | 16.8 | 13.5 | 27.9 | 30 | 36.6 | 12.6 | 18 | 17.7 | 18.9 | 22.2 | 39.4 | 64.6 | 28.6 | 34.7 |
| 47997 | | 0.89 | 10.6 | 1 | 23.5 | 1.65 | 38.8 | 2.15 | 22.6 | 5.89 | 31 | 9.4 | 22.5 | 38.5 | 22.7 | 34.8 |
| 48088 | | 1.24 | 1 | 2 | 1.08 | 17.6 | 1.38 | 7.19 | 1.32 | 7.86 | 1.63 | 0.2 | 1.1 | 17.0 | 6.5 | 7.5 |
| 48097 | | 1.13 | 1.11 | 1.32 | 1.3 | 2.89 | 1.38 | 3.26 | 1.64 | 5.92 | 2.26 | 0.2 | 0.6 | 2.3 | 2.9 | 6.2 |
| 53415 | | 1.5 | 1.4 | 2.68 | 1.45 | 7.18 | 1.86 | 6.11 | 1.85 | 3.86 | 2.62 | 0.9 | 2.1 | 7.0 | 6.0 | 4.5 |
| 53418 | | 1.39 | 28.8 | 2 | 25.6 | 2.56 | 42.2 | 4.69 | 20.3 | 3.62 | 23.4 | 28.2 | 25.6 | 42.7 | 23.0 | 25.0 |
| 53433 | | 1.19 | 1 | 1.28 | 1.2 | 4.8 | 1.19 | 1.64 | 1.46 | 2.96 | 1.92 | 0.2 | 0.5 | 4.0 | 1.1 | 2.9 |
| 53444 | | 10.7 | 1.25 | 15.5 | 1.44 | 28.7 | 2.17 | 12 | 2.45 | 16.1 | 7 | 10.0 | 14.9 | 28.9 | 12.5 | 21.1 |
| 53459 | | 2.13 | 1.11 | 4.68 | 1.3 | 22.5 | 1.44 | 10.2 | 1.93 | 11.3 | 2.46 | 1.2 | 4.0 | 22.0 | 10.1 | 11.8 |
| 53522 | | 1.2 | 1.75 | 1.76 | 3.56 | 5.03 | 8.89 | 7.18 | 14.8 | 11.4 | 17.6 | 1.0 | 3.3 | 11.9 | 20.0 | 27.1 |
| 53544 | | 1.17 | 1 | 1.69 | 1.29 | 2.87 | 1.74 | 6.75 | 4.14 | 12.2 | 5.61 | 0.2 | 1.0 | 2.6 | 8.9 | 15.8 |
| 54762 | | 2.44 | 1.38 | 5.16 | 1.56 | 17.9 | 1.73 | 6.49 | 1.38 | 6.9 | 2.32 | 1.8 | 4.7 | 17.7 | 5.9 | 7.2 |

MAP092701_PCR1_ Optimization

FIGURE 17 Cont'd

| Snp number | Limited RED-FOZ + FAM-FOZ -2 | | | | | Calculation of Amplification Factor (F) | | | | |
|---|---|---|---|---|---|---|---|---|---|---|
| 107-plex (102) | 10 | 20 | 40 | 80 | 160 | 10 | 20 | 40 | 80 | 160 |
| 47917 | 3.11111 | 9.5625 | 11.7786 | 0 | 0 | 78873.2 | 60607.4 | 18663.2 | 0 | 0 |
| 47920 | 0 | 0 | 4.45528 | 2.20596 | 6.29157 | 0 | 0 | 7059.43 | 873.838 | 623.065 |
| 47924 | 0 | 2.18182 | 0 | 0 | 0 | 0 | 13828.4 | 0 | 0 | 0 |
| 47941 | 5.82222 | 0 | 0 | 0 | 0 | 147606 | 0 | 0 | 0 | 0 |
| 47960 | 0 | 0 | 3.85294 | 5.0404 | 9.24063 | 0 | 0 | 6105.01 | 1996.64 | 915.115 |
| 47963 | 0 | 0 | 5.38636 | 6.69048 | 0 | 0 | 0 | 8534.73 | 2650.28 | 0 |
| 47972 | 11.2889 | 0 | 0 | 0 | 0 | 286197 | 0 | 0 | 0 | 0 |
| 47981 | 0 | 0 | 0 | 0 | 0 | 0 | 0 | 0 | 0 | 0 |
| 53478 | 14.85 | 0 | 0 | 0 | 0 | 376479 | 0 | 0 | 0 | 0 |
| 53528 | 0 | 0 | 10.7458 | 3.4881 | 0 | 0 | 0 | 17026.8 | 1381.73 | 0 |
| 53529 | 2.71429 | 8.59028 | 0 | 0 | 0 | 68812.9 | 54445.4 | 0 | 0 | 0 |
| 53557 | 0 | 0 | 0 | 10.0773 | 0 | 0 | 0 | 0 | 3991.88 | 0 |
| 53530 | 0 | 0 | 11.6863 | 8.70833 | 0 | 0 | 0 | 18517 | 3449.6 | 0 |
| 47986 | 0 | 0 | 2.82667 | 0 | 3.18051 | 0 | 0 | 4478.87 | 0 | 314.971 |
| 47987 | 0 | 3.77778 | 7.88278 | 0 | 0 | 0 | 23943.7 | 12490.3 | 0 | 0 |
| 47994 | 22.2286 | 0 | 0 | 0 | 0 | 563541 | 0 | 0 | 0 | 0 |
| 47997 | 9.44444 | 0 | 0 | 0 | 0 | 239437 | 0 | 0 | 0 | 0 |
| 48088 | 0 | 0 | 0 | 6.51263 | 7.48214 | 0 | 0 | 0 | 2579.83 | 740.969 |
| 48097 | 0 | 0 | 2.27935 | 2.90756 | 6.18704 | 0 | 0 | 3611.65 | 1151.76 | 612.713 |
| 53415 | 0 | 2.13876 | 7.03799 | 5.95142 | 4.47413 | 0 | 13555.5 | 11151.8 | 2357.52 | 443.081 |
| 53418 | 28.1667 | 0 | 0 | 0 | 0 | 714085 | 0 | 0 | 0 | 0 |
| 53433 | 0 | 0 | 3.9875 | 0 | 2.88259 | 0 | 0 | 6318.22 | 0 | 285.468 |
| 53444 | 9.98333 | 0 | 0 | 0 | 0 | 253099 | 0 | 0 | 0 | 0 |
| 53459 | 0 | 3.98421 | 0 | 10.0824 | 11.7799 | 0 | 25252 | 0 | 3993.92 | 1166.58 |
| 53522 | 0 | 3.32026 | 11.9234 | 0 | 0 | 0 | 21043.9 | 18892.7 | 0 | 0 |
| 53544 | 0 | 0 | 2.61425 | 8.89286 | 0 | 0 | 0 | 4142.29 | 3522.7 | 0 |
| 54762 | 0 | 4.71345 | 0 | 5.87033 | 7.21917 | 0 | 29874 | 0 | 2325.39 | 714.927 |

MAP092701_PCR1_ Optimization

FIGURE 17 Cont'd

| Snp number | Selected Value of F | Apparent Primer Concentration | Snp number | | Corrected Primer Concentration (Rel 1.6) | Amount of Primers in Optimized Mix (1x=25ul) | |
|---|---|---|---|---|---|---|---|
| 107-plex (102) | | | 107-plex (101) | Primers not added | 3.06 | 3864.18 | |
| **47917** | 78873 | 1.319600214 | **47917** | | 1.212488436 | 15.16 | |
| **47920** | 7059 | 0.695680465 | **47920** | | 2.299906465 | 28.75 | |
| **47924** | 13828 | 0.869499626 | **47924** | | 1.840138803 | 23.00 | |
| **47941** | 147606 | 1.481609531 | **47941** | | 1.07990666 | 13.50 | |
| **47960** | 6105 | 0.658146231 | **47960** | | 2.431070671 | 30.39 | |
| **47963** | 8534 | 0.744733713 | **47963** | | 2.14841892 | 26.86 | |
| **47972** | 286197 | 1.652776832 | **47972** | | 1 | 12.50 | Green - High End Correction |
| **47981** | 1177 | 0.232605037 | **47981** | | 12 | 150.00 | Yellow -Low End Correction |
| **53478** | 376479 | 1.723655212 | **53478** | | 1 | 12.50 | Green - High End Correction |
| **53528** | 17027 | 0.92329651 | **53528** | | 1.732921097 | 21.66 | |
| **53529** | 68812 | 1.284323917 | **53529** | | 1.245791641 | 15.57 | |
| **53557** | 3991 | 0.548262933 | **53557** | | 2.91830781 | 36.48 | |
| **53530** | 18517 | 0.944982516 | **53530** | | 1.693153019 | 21.16 | |
| **47986** | 4478 | 0.578026244 | **47986** | | 2.768040409 | 34.60 | |
| **47987** | 23944 | 1.011426609 | **47987** | | 1.581923973 | 19.77 | |
| **47994** | 563541 | 1.827931856 | **47994** | | 1 | 12.50 | Green - High End Correction |
| **47997** | 239436 | 1.606660386 | **47997** | | 1 | 12.50 | Green - High End Correction |
| **48088** | 2579.8 | 0.43546788 | **48088** | | 3.674208991 | 45.93 | |
| **48097** | 3611.6 | 0.522440264 | **48097** | | 3.062551087 | 38.28 | |
| **53415** | 13555 | 0.864344954 | **53415** | | 1.851112792 | 23.14 | |
| **53418** | 714085 | 1.889136851 | **53418** | | 1 | 12.50 | Green - High End Correction |
| **53433** | 6318 | 0.66701168 | **53433** | | 2.398758596 | 29.98 | |
| **53444** | 253098 | 1.621005187 | **53444** | | 1 | 12.50 | Green - High End Correction |
| **53459** | 25252 | 1.02517606 | **53459** | | 1.560707534 | 19.51 | |
| **53522** | 21044 | 0.978052555 | **53522** | | 1.63590391 | 20.45 | |
| **53544** | 4142.3 | 0.557881874 | **53544** | | 2.867990651 | 35.85 | |
| **54762** | 29874 | 1.06862701 | **54762** | | 1.497248324 | 18.72 | |

MAP092701_PCR1_ Optimization

FIGURE 17 Cont'd

| Snp number | | 10 min | | 20 min | | 40 min. | | 80 min | | 160 min. | | RED-FOZ + FAM-FOZ -2 | | | | |
|---|---|---|---|---|---|---|---|---|---|---|---|---|---|---|---|---|
| 107-plex (102) | Primers not added | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 |
| 54777 | | 0.94 | 17.2 | 1.05 | 17.5 | 1.22 | 18.7 | 1.88 | 10 | 3.09 | 7.88 | 16.1 | 16.5 | 18.0 | 9.9 | 9.0 |
| 54915 | | 1 | 12.6 | 1.05 | 16.2 | 1.11 | 13.7 | 1.67 | 9.97 | 3.02 | 7.7 | 11.6 | 15.2 | 12.8 | 9.6 | 8.7 |
| 66865 | | 1 | 1 | 1.05 | 1.09 | 1.03 | 1.05 | 1.1 | 1.27 | 1.23 | 1.59 | 0.0 | 0.1 | 0.1 | 0.4 | 0.8 |
| 66934 | | 1 | 1.22 | 1.11 | 1.5 | 1.14 | 2.11 | 1.35 | 4.77 | 1.56 | 12.4 | 0.2 | 0.6 | 1.2 | 4.1 | 12.0 |
| 66984 | | 1.69 | 1.11 | 3.56 | 1.2 | 33.9 | 2.71 | 9.9 | 1.75 | 20.5 | 4.64 | 0.8 | 2.8 | 34.6 | 9.7 | 23.1 |
| 66985 | | 1 | 1.1 | 1 | 1.18 | 1.11 | 1.12 | 1.08 | 1.24 | 1.12 | 1.17 | 0.1 | 0.2 | 0.2 | 0.3 | 0.3 |
| 67309 | | 1.33 | 2.25 | 2 | 4.7 | 7.43 | 10.1 | 9.43 | 17.4 | 16 | 18.2 | 1.6 | 4.7 | 15.5 | 24.9 | 32.2 |
| 67340 | | 1.79 | 3.5 | 3.73 | 8.2 | 4.5 | 5.77 | 9.73 | 14.4 | 11.3 | 11.4 | 3.3 | 9.9 | 8.3 | 22.2 | 20.7 |
| 67356 | | 1.81 | 2.25 | 3.61 | 4.8 | 18.3 | 33.9 | 9.03 | 16.8 | 9.2 | 16.8 | 2.1 | 6.4 | 50.2 | 23.8 | 24.0 |
| 67363 | | 8.86 | 1.67 | 10 | 3.6 | 12 | 9.21 | 7.46 | 10.8 | 7.34 | 12.6 | 8.5 | 11.6 | 19.2 | 16.3 | 18.0 |
| 67382 | | 1.56 | 1.11 | 3.06 | 1.09 | 14.7 | 1.28 | 7.88 | 1.27 | 11.3 | 1.46 | 0.7 | 2.1 | 14.0 | 7.1 | 10.8 |
| 87801 | | 1.07 | 1.13 | 1.06 | 1.1 | 1.15 | 1.04 | 1.13 | 1.2 | 1.32 | 1.16 | 0.2 | 0.2 | 0.2 | 0.3 | 0.5 |
| 53551 | | 1.31 | 1 | 2.11 | 1.09 | 16.1 | 1.2 | 7.58 | 1.5 | 9.47 | 1.41 | 0.3 | 1.2 | 15.3 | 7.1 | 8.9 |
| 41064 | | 1.06 | 1.89 | 1.05 | 3.42 | 1.15 | 3.14 | 1.27 | 8.32 | 1.29 | 5.58 | 1.0 | 2.5 | 2.3 | 7.6 | 4.9 |
| 41408 | | 1.07 | 4.13 | 1.05 | 10.8 | 1.15 | 16.8 | 1.26 | 18.5 | 1.75 | 23.3 | 3.2 | 9.9 | 15.9 | 17.8 | 23.0 |
| 41452 | | 0.93 | 1 | 1 | 1.29 | 1.17 | 1.46 | 1.05 | 1.63 | 1.19 | 2.17 | -0.1 | 0.3 | 0.6 | 0.7 | 1.4 |
| 47901 | | 0.88 | 0.89 | 0.86 | 1 | 1.35 | 1.26 | 1.08 | 1.2 | 1.41 | 1.44 | -0.2 | -0.1 | 0.6 | 0.3 | 0.9 |
| 47932 | | 0.94 | 16.6 | 1.11 | 21.6 | 1.32 | 43.5 | 2.38 | 19.2 | 7.35 | 27.1 | 15.5 | 20.7 | 42.8 | 19.5 | 32.4 |
| 48094 | | 2.07 | 1.13 | 4.82 | 1.22 | 23.7 | 1.36 | 10.3 | 1.5 | 14.3 | 2.25 | 1.2 | 4.0 | 23.0 | 9.8 | 14.5 |
| 48095 | | 1.18 | 1.1 | 1.84 | 1.08 | 4.69 | 1.13 | 5.73 | 1.21 | 7.61 | 1.47 | 0.3 | 0.9 | 3.8 | 4.9 | 7.1 |
| 53412 | | 1 | 1.29 | 1 | 1.5 | 1.09 | 1.54 | 1.05 | 3.5 | 1.63 | 17.8 | 0.3 | 0.5 | 0.6 | 2.5 | 17.4 |
| 53475 | | 1 | 1 | 1 | 1 | 1.15 | 1.27 | 1.57 | 1.18 | 4.95 | 1.7 | 0.0 | 0.0 | 0.4 | 0.8 | 4.7 |
| 53503 | | 1.2 | 1.38 | 1.24 | 1.56 | 1.2 | 1.46 | 1.71 | 2.67 | 4.37 | 5.63 | 0.6 | 0.8 | 0.7 | 2.4 | 8.0 |
| 53540 | | 7.82 | 13.9 | 8.7 | 16.2 | 6.1 | 6.13 | 7.88 | 13.3 | 13.7 | 21.7 | 19.7 | 22.9 | 10.2 | 19.2 | 33.4 |
| 55560 | | 0.88 | 3 | 0.94 | 8 | 1.19 | 10.2 | 1.26 | 13.2 | 2.26 | 17.7 | 1.9 | 6.9 | 9.4 | 12.4 | 18.0 |
| 66938 | | 1.27 | 1.13 | 2.24 | 1.5 | 23.7 | 2 | 9.11 | 2.2 | 14.6 | 2.67 | 0.4 | 1.7 | 23.7 | 9.3 | 15.3 |
| 47867 | | 2 | 4 | 3.75 | 9.44 | 20.9 | 25.5 | 7.88 | 11.8 | 10.8 | 10.3 | 4.0 | 11.2 | 44.4 | 17.6 | 19.1 |

FIGURE 17 Cont'd

MAP092701_PCR1_ Optimization

| Snp number | Limited RED-FOZ + FAM-FOZ -2 | | | | | Calculation of Amplification Factor (F) | | | | |
|---|---|---|---|---|---|---|---|---|---|---|
| 107-plex (102) | 10 | 20 | 40 | 80 | 160 | 10 | 20 | 40 | 80 | 160 |
| 54777 | 16.1111 | 0 | 0 | 9.88372 | 8.97724 | 408451 | 0 | 0 | 3915.21 | 889.032 |
| 54915 | 11.5833 | 0 | 0 | 9.63333 | 8.71602 | 293662 | 0 | 0 | 3816.02 | 863.162 |
| 66865 | 0 | 0 | 0 | 0 | 0 | 0 | 0 | 0 | 0 | 0 |
| 66934 | 0 | 0 | 0 | 4.11706 | 12.0145 | 0 | 0 | 0 | 1630.88 | 1189.82 |
| 66984 | 0 | 2.75556 | 0 | 9.65476 | 0 | 0 | 17464.8 | 0 | 3824.51 | 0 |
| 66985 | 0 | 0 | 0 | 0 | 0 | 0 | 0 | 0 | 0 | 0 |
| 67309 | 0 | 4.7 | 0 | 0 | 0 | 0 | 29788.7 | 0 | 0 | 0 |
| 67340 | 3.28571 | 9.93333 | 8.27273 | 0 | 0 | 83299.8 | 62957.7 | 13108.2 | 0 | 0 |
| 67356 | 2.0625 | 6.41111 | 0 | 0 | 0 | 52288.7 | 40633.8 | 0 | 0 | 0 |
| 67363 | 8.5303 | 11.6417 | 0 | 0 | 0 | 216261 | 73785.2 | 0 | 0 | 0 |
| 67382 | 0 | 2.14646 | 0 | 7.14167 | 10.7804 | 0 | 13604.4 | 0 | 2829.01 | 1067.6 |
| 87801 | 0 | 0 | 0 | 0 | 0 | 0 | 0 | 0 | 0 | 0 |
| 53551 | 0 | 0 | 0 | 7.07692 | 8.87648 | 0 | 0 | 0 | 2803.36 | 879.053 |
| 41064 | 0 | 2.46429 | 2.28595 | 7.58845 | 4.86831 | 0 | 15618.7 | 3622.1 | 3005.99 | 482.117 |
| 41408 | 3.19167 | 9.85263 | 0 | 0 | 0 | 80915.5 | 62446.3 | 0 | 0 | 0 |
| 41452 | 0 | 0 | 0 | 0 | 0 | 0 | 0 | 0 | 0 | 0 |
| 47901 | 0 | 0 | 0 | 0 | 0 | 0 | 0 | 0 | 0 | 0 |
| 47932 | 15.4931 | 0 | 0 | 0 | 0 | 392782 | 0 | 0 | 0 | 0 |
| 48094 | 0 | 4.04575 | 0 | 9.76087 | 0 | 0 | 25642.1 | 0 | 3866.54 | 0 |
| 48095 | 0 | 0 | 3.81944 | 4.94386 | 7.08122 | 0 | 0 | 6051.94 | 1958.4 | 701.265 |
| 53412 | 0 | 0 | 0 | 2.55 | 17.3816 | 0 | 0 | 0 | 1010.12 | 1721.33 |
| 53475 | 0 | 0 | 0 | 0 | 4.65313 | 0 | 0 | 0 | 0 | 460.807 |
| 53503 | 0 | 0 | 0 | 2.38095 | 7.99038 | 0 | 0 | 0 | 943.159 | 791.301 |
| 53540 | 19.6985 | 0 | 10.2301 | 0 | 0 | 499399 | 0 | 16209.7 | 0 | 0 |
| 55560 | 0 | 6.94118 | 9.4127 | 0 | 0 | 0 | 43993.4 | 14914.5 | 0 | 0 |
| 66938 | 0 | 0 | 0 | 9.30526 | 15.3067 | 0 | 0 | 0 | 3686.06 | 1515.85 |
| 47867 | 4 | 11.1944 | 0 | 0 | 0 | 101408 | 70950.7 | 0 | 0 | 0 |

MAP092701_PCR1_ Optimization

FIGURE 17 Cont'd

| Snp number | Selected Value of F | Apparent Primer Concentration | Snp number | | Corrected Primer Concentration (Rel 1.6) | Amount of Primers in Optimized Mix (1x=25ul) | |
|---|---|---|---|---|---|---|---|
| 107-plex (102) | | | 107-plex (101) | Primers not added | 3.06 | 3864.18 | |
| 54777 | 408451 | 1.744726169 | 54777 | | 1 | 12.50 | Green - High End Correction |
| 54915 | 293662 | 1.659433186 | 54915 | | 1 | 12.50 | Green - High End Correction |
| 66865 | 80 | -0.462446436 | 66865 | | 12 | 150.00 | Yellow -Low End Correction |
| 66934 | 1630 | 0.316778336 | 66934 | | 5.050850448 | 63.14 | |
| 66984 | 17465 | 0.929862256 | 66984 | | 1.720684961 | 21.51 | |
| 66985 | | #NUM! | 66985 | | 12 | 150.00 | Yellow -Low End Correction |
| 67309 | 29789 | 1.067890431 | 67309 | | 1.498281053 | 18.73 | |
| 67340 | 83300 | 1.333717263 | 67340 | | 1.199654563 | 15.00 | |
| 67356 | 52289 | 1.213339486 | 67356 | | 1.318674632 | 16.48 | |
| 67363 | 216261 | 1.580344171 | 67363 | | 1.012437689 | 12.66 | |
| 67382 | 13604 | 0.865277752 | 67382 | | 1.84911723 | 23.11 | |
| 87801 | | #NUM! | 87801 | | 12 | 150.00 | Yellow -Low End Correction |
| 53551 | 2803 | 0.456918511 | 53551 | | 3.501718497 | 43.77 | |
| 41064 | 15619 | 0.900984062 | 41064 | | 1.775836074 | 22.20 | |
| 41408 | 80915 | 1.326207761 | 41408 | | 1.206447472 | 15.08 | |
| 41452 | 1004 | 0.191508162 | 41452 | | 12 | 150.00 | Yellow -Low End Correction |
| 47901 | 964 | 0.180998234 | 47901 | | 12 | 150.00 | Yellow -Low End Correction |
| 47932 | 392782 | 1.734614034 | 47932 | | 1 | 12.50 | Green - High End Correction |
| 48094 | 25642 | 1.029138033 | 48094 | | 1.554699125 | 19.43 | |
| 48095 | 6051.9 | 0.655887942 | 48095 | | 2.439441094 | 30.49 | |
| 53412 | 1010 | 0.193048437 | 53412 | | 8.288075401 | 103.60 | |
| 53475 | 460 | -0.010263195 | 53475 | | 12 | 150.00 | Yellow -Low End Correction |
| 53503 | 943 | 0.175304579 | 53503 | | 9.126972091 | 114.09 | |
| 53540 | 499399 | 1.796695041 | 53540 | | 1 | 12.50 | Green - High End Correction |
| 55560 | 47535 | 1.188698511 | 55560 | | 1.346009931 | 16.83 | |
| 66938 | 3686 | 0.527711506 | 66938 | | 3.03195966 | 37.90 | |
| 47867 | 101408 | 1.384566796 | 47867 | | 1.155596107 | 14.44 | |

FIGURE 17 Cont'd

MAP092701_PCR1_ Optimization

| Snp number | | 10 min | | 20 min | | 40 min. | | 80 min | | 160 min. | | RED-FOZ + FAM-FOZ -2 | | | | |
|---|---|---|---|---|---|---|---|---|---|---|---|---|---|---|---|---|
| 107-plex (102) | Primers not added | Fam FOZ | Red FOZ | Fam FOZ | Red FOZ | Fam FOZ | Red FOZ | Fam FOZ | Red FOZ | Fam FOZ | Red FOZ | 10 | 20 | 40 | 80 | 160 |
| 48083 | | 1.26 | 1.11 | 1.73 | 1.18 | 2.39 | 1.07 | 3.67 | 1.16 | 2.94 | 1.3 | 0.4 | 0.9 | 1.5 | 2.8 | 2.2 |
| 53553 | | 11.7 | 1 | 11 | 1.22 | 15.1 | 4.5 | 7.09 | 2 | 6.68 | 4.31 | 10.7 | 10.3 | 17.6 | 7.1 | 9.0 |
| 37879 | | 3.2 | 1 | 8.12 | 1.22 | 17.2 | 1.36 | 8.79 | 1.5 | 10.7 | 2.5 | 2.2 | 7.3 | 16.6 | 8.3 | 11.2 |
| 41365 | | 1.07 | 1 | 1.18 | 1.17 | 3.83 | 2.91 | 2.79 | 2.4 | 9.88 | 6.07 | 0.1 | 0.3 | 4.7 | 3.2 | 13.9 |
| 41646 | | 1.44 | 1.38 | 1.85 | 1.91 | 1.87 | 1.85 | 4.06 | 5.83 | 5.14 | 8.27 | 0.8 | 1.8 | 1.7 | 7.9 | 11.4 |
| 47852 | | 8.24 | 1.13 | 7.96 | 1.67 | 9.85 | 2.89 | 4.3 | 4.15 | 4.01 | 10.7 | 7.4 | 7.6 | 10.7 | 6.5 | 12.7 |
| 47885 | | 1.07 | 1.14 | 1.29 | 1.25 | 3.81 | 1.43 | 3.09 | 1.5 | 8.51 | 1.91 | 0.2 | 0.5 | 3.2 | 2.6 | 8.4 |
| 47892 | | 1.59 | 1.13 | 2.68 | 1.22 | 13.5 | 1.29 | 5.97 | 1.45 | 6.59 | 1.81 | 0.7 | 1.9 | 12.8 | 5.4 | 6.4 |
| 47915 | | 4.57 | 1 | 6.63 | 1.1 | 7.13 | 1.5 | 3.62 | 1.38 | 3.05 | 2.15 | 3.6 | 5.7 | 6.6 | 3.0 | 3.2 |
| 47925 | | 10.3 | 1.75 | 9.86 | 4 | 13.4 | 29.5 | 6.1 | 11.1 | 5.43 | 14.6 | 10.0 | 11.9 | 40.9 | 15.2 | 18.0 |
| 47980 | | 12.3 | 1.38 | 12.8 | 2.22 | 16.1 | 6.75 | 8.07 | 8.73 | 7.43 | 16.6 | 11.7 | 13.0 | 20.9 | 14.8 | 22.1 |
| 37319 | | 8.75 | 1.29 | 11.6 | 1.75 | 20.7 | 1.63 | 10.3 | 6.45 | 15.3 | 12.9 | 8.0 | 11.4 | 20.3 | 14.7 | 26.2 |
| 29043 | | 1.69 | 1.14 | 2.73 | 1.25 | 2.54 | 1.3 | 7.96 | 1.54 | 7.81 | 1.89 | 0.8 | 2.0 | 1.8 | 7.5 | 7.7 |
| 53445 | | 11.7 | 1.29 | 14.1 | 1.88 | 18.6 | 9.08 | 9.26 | 6.5 | 8.65 | 21.2 | 11.0 | 13.9 | 25.6 | 13.8 | 27.8 |
| 41409 | | 1.08 | 1.14 | 1.23 | 1.29 | 1.84 | 1.46 | 1.65 | 1.56 | 3.71 | 2.43 | 0.2 | 0.5 | 1.3 | 1.2 | 4.1 |
| 47897 | | 1.07 | 1.14 | 1.27 | 1.38 | 1.48 | 1.42 | 3.47 | 1.8 | 12.5 | 2.76 | 0.2 | 0.6 | 0.9 | 3.3 | 13.2 |
| 41164 | | 1.14 | 2.13 | 1.06 | 5 | 1.75 | 36.2 | 1.26 | 16.2 | 1.84 | 16.2 | 1.3 | 4.1 | 35.9 | 15.4 | 16.1 |
| 66902 | | 1.15 | 1.14 | 1.31 | 1.25 | 15.9 | 1.5 | 3.39 | 1.7 | 8.94 | 2.75 | 0.3 | 0.6 | 15.4 | 3.1 | 9.7 |
| 53464 | | 1.77 | 1.14 | 3.73 | 1.25 | 3.44 | 1.58 | 8.6 | 2.56 | 15.5 | 10.4 | 0.9 | 3.0 | 3.0 | 9.2 | 23.9 |
| 53470 | | 10.2 | 1.29 | 12.8 | 1.22 | 24.3 | 1.37 | 10.9 | 1.67 | 15.3 | 2.54 | 9.5 | 12.0 | 23.7 | 10.6 | 15.8 |
| 47910 | | 3.4 | 1.25 | 7.28 | 1.3 | 17.5 | 1.29 | 8.31 | 1.65 | 10.2 | 3.25 | 2.7 | 6.6 | 16.8 | 8.0 | 11.4 |

FIGURE 17 Cont'd

MAP092701_PCR1_ Optimization

| Snp number | Limited RED-FOZ + FAM-FOZ -2 | | | | | Calculation of Amplification Factor (F) | | | | |
|---|---|---|---|---|---|---|---|---|---|---|
| 107-plex (102) | 10 | 20 | 40 | 80 | 160 | 10 | 20 | 40 | 80 | 160 |
| 48083 | 0 | 0 | 0 | 2.82456 | 2.24106 | 0 | 0 | 0 | 1118.88 | 221.936 |
| 53553 | 10.6667 | 10.2677 | 0 | 7.08571 | 8.99197 | 270423 | 65076.8 | 0 | 2806.84 | 890.49 |
| 37879 | 2.2 | 7.33987 | 0 | 8.29167 | 11.2368 | 55774.6 | 46520.3 | 0 | 3284.55 | 1112.8 |
| 41365 | 0 | 0 | 4.74638 | 3.19167 | 0 | 0 | 0 | 7520.67 | 1264.3 | 0 |
| 41646 | 0 | 0 | 0 | 7.89394 | 11.4082 | 0 | 0 | 0 | 3127 | 1129.77 |
| 47852 | 7.3631 | 7.6282 | 10.7481 | 6.45617 | 0 | 186670 | 48347.8 | 17030.4 | 2557.46 | 0 |
| 47885 | 0 | 0 | 3.23502 | 2.58696 | 8.42744 | 0 | 0 | 5125.92 | 1024.76 | 834.584 |
| 47892 | 0 | 0 | 0 | 5.42229 | 6.40266 | 0 | 0 | 0 | 2147.91 | 634.067 |
| 47915 | 3.57143 | 5.72963 | 6.62632 | 2.99764 | 3.1993 | 90543.3 | 36314.6 | 10499.4 | 1187.45 | 316.832 |
| 47925 | 10.0441 | 11.8571 | 0 | 0 | 0 | 254640 | 75150.9 | 0 | 0 | 0 |
| 47980 | 11.6875 | 0 | 0 | 0 | 0 | 296303 | 0 | 0 | 0 | 0 |
| 37319 | 8.03571 | 11.3654 | 0 | 0 | 0 | 203722 | 72034.1 | 0 | 0 | 0 |
| 29043 | 0 | 0 | 0 | 7.49498 | 7.69406 | 0 | 0 | 0 | 2968.96 | 761.955 |
| 53445 | 10.9524 | 0 | 0 | 0 | 0 | 277666 | 0 | 0 | 0 | 0 |
| 41409 | 0 | 0 | 0 | 0 | 4.14286 | 0 | 0 | 0 | 0 | 410.274 |
| 47897 | 0 | 0 | 0 | 3.27368 | 0 | 0 | 0 | 0 | 1296.79 | 0 |
| 41164 | 0 | 4.05882 | 0 | 0 | 0 | 0 | 25724.9 | 0 | 0 | 0 |
| 66902 | 0 | 0 | 0 | 3.0913 | 9.69118 | 0 | 0 | 0 | 1224.55 | 959.734 |
| 53464 | 0 | 2.98333 | 3.02778 | 9.15556 | 0 | 0 | 18908.5 | 4797.54 | 3626.76 | 0 |
| 53470 | 9.51648 | 0 | 0 | 10.6111 | 0 | 241263 | 0 | 0 | 4203.35 | 0 |
| 47910 | 2.65 | 6.57778 | 0 | 7.95475 | 11.4352 | 67183.1 | 41690.1 | 0 | 3151.09 | 1132.45 |

FIGURE 17 Cont'd

MAP092701_PCR1_ Optimization

| Snp number | Selected Value of F | Apparent Primer Concentration | Snp number | | Corrected Primer Concentration (Rel 1.6) | Amount of Primers in Optimized Mix (1x=25ul) | |
|---|---|---|---|---|---|---|---|
| 107-plex (102) | | | 107-plex (101) | Primers not added | 3.06 | 3864.18 | |
| **48083** | 1118.9 | 0.219518615 | **48083** | | 7.288675711 | 91.11 | |
| **53553** | 270423 | 1.638121206 | **53553** | | 1 | 12.50 | Green - High End Correction |
| **37879** | 55774 | 1.230018924 | **37879** | | 1.300792995 | 16.26 | |
| **41365** | 7520 | 0.712034429 | **41365** | | 2.247082353 | 28.09 | |
| **41646** | 3127 | 0.485195167 | **41646** | | 3.297642078 | 41.22 | |
| **47852** | 186670 | 1.542306266 | **47852** | | 1.037407443 | 12.97 | |
| **47885** | 5125 | 0.612913018 | **47885** | | 2.61048461 | 32.63 | |
| **47892** | 2147 | 0.387995265 | **47892** | | 4.12376167 | 51.55 | |
| **47915** | 90543 | 1.355270762 | **47915** | | 1.1805759 | 14.76 | |
| **47925** | 254640 | 1.622575372 | **47925** | | 1 | 12.50 | Green - High End Correction |
| **47980** | 296303 | 1.661747648 | **47980** | | 1 | 12.50 | Green - High End Correction |
| **37319** | 203722 | 1.56490353 | **37319** | | 1.022427242 | 12.78 | |
| **29043** | 2969 | 0.471791784 | **29043** | | 3.391326541 | 42.39 | |
| **53445** | 277666 | 1.64495399 | **53445** | | 1 | 12.50 | Green - High End Correction |
| **41409** | 410 | -0.040009609 | **41409** | | 12 | 150.00 | Yellow -Low End Correction |
| **47897** | 1296 | 0.257502977 | **47897** | | 6.213520395 | 77.67 | |
| **41164** | 32142 | 1.087543391 | **41164** | | 1.471205667 | 18.39 | |
| **66902** | 1224 | 0.242727034 | **66902** | | 6.591766772 | 82.40 | |
| **53464** | 4797 | 0.595815309 | **53464** | | 2.685395922 | 33.57 | |
| **53470** | 241263 | 1.608625431 | **53470** | | 1 | 12.50 | Green - High End Correction |
| **47910** | 67183 | 1.278130591 | **47910** | | 1.251828265 | 15.65 | |

Primer Design Algorithm for Highly-Multiplexed PCR

SNP sequences selected for multiplex PCR are used as an input for the Primer Designer program.

PCR primers are designed using the following rules:

- All PCR primer have the same $T_m$
- Avoid GC-rich or AT-rich regions.
- Avoid complementarity at the 3' ends of any two primers in the multiplex mixture to reduce a probability of primer-dimer formation

CYP2D6 PCR amplification:

Primers:

Triplex PCR protocol

Exons 1 & 2 (2036 nt)

2D6L1F1: 5' – CTGGGCTGGGAGCAGCCTC - 3' (SEQ ID NO:733)
2D6L1R1: 5' – CACTCGCTGGCCTGTTTCATGTC – 3' (SEQ ID NO:734)

Exons 3, 4, 5, & 6 (1683 nt)

2D6L2F: 5' – CTGGAATCCGGTGTCGAAGTGG – 3' (SEQ ID NO:735)
2D6L2R2: 5' – CTCGGCCCCTGCACTGTTTC – 3' (SEQ ID NO:736)

Exons 7, 8, & 9 (1754 nt)

2D6L3F: 5' – GAGGCAAGAAGGAGTGTCAGGG – 3' (SEQ ID NO:737)
2D6L3R5B: 5' – AGTCCTGTGGTGAGGTGACGAGG – 3' (SEQ ID NO:738)

Monoplex PCR protocol

CYP2D6 nucleotides 506 – 856 (*10 & *21)

forward (1221-09-01): 5' – ggtagtgaggcaggt –3' (SEQ ID NO:739)
reverse (1221-09-02): 5' – gcttctggtaggggag – 3' (SEQ ID NO:740)

CYP2D6 nucleotides 1335 – 1616 (*11 & *17)

forward (1221-09-03): 5' – aaataggactaggacctgt –3' (SEQ ID NO:741)
reverse (1221-09-04): 5' – gggtcccacggaaat – 3' (SEQ ID NO:742)

CYP2D6 nucleotides 2092 – 2582 (*4, *6 & *37)

forward (1221-09-05): 5' – catggccacgcg –3' (SEQ ID NO:743)
reverse (1221-09-06): 5' – ccggcacctctcg – 3' (SEQ ID NO:744)

CYP2D6 nucleotides 2977 – 3146 (*3 & *33)

forward (1221-09-07): 5' – ccgtcctcctgcat –3' (SEQ ID NO:745)
reverse (1221-09-08): 5' – cactctcaccttctcca – 3' (SEQ ID NO:746)

FIGURE 20 (cont.)

CYP2D6 nucleotides 3294 – 3494 (*2 R296C & *7)

forward (1221-09-09): 5' – gttctgtcccgagtatg –3' (SEQ ID NO:747)
reverse (1221-09-10): 5' – tgcactgtttcccaga – 3' (SEQ ID NO:748)

CYP2D6 nucleotides 3589 – 3918 (*25, *26 & *29)

forward (1221-09-11): 5' – ctgacctcctccaacat –3' (SEQ ID NO:749)
reverse (1221-09-12): 5' – gggctatcaccaggt – 3' (SEQ ID NO:750)

CYP2D6 nucleotides 4316 – 5226 (*2, *27, *31 & *32)

forward (1221-09-13): 5' – ctgacctcctccaacat –3' (SEQ ID NO:751)
reverse (1221-09-15): 5' – gggctatcaccaggt – 3' (SEQ ID NO:752)

AMPLIFICATION METHODS AND COMPOSITIONS

The present application is a continuation of U.S. application Ser. No. 10/321,039, filed Dec. 17, 2002, which is a continuation-in-part of U.S. application Ser. No. 09/998,157, filed Nov. 30, 2001, which claims priority to both U.S. Provisional Application 60/360,489 filed Oct. 19, 2001, and U.S. Provisional Application 60/329,113, filed Oct. 12, 2001, all of which are herein incorporated by reference.

FIELD OF THE INVENTION

The present invention provides methods for developing and optimizing nucleic acid detection assays for use in basic research, clinical research, and for the development of clinical detection assays. In particular, the present invention provides methods for designing oligonucleotide primers to be used in multiplex amplification reactions. The present invention also provides methods to optimize multiplex amplification reactions. The present invention also provides methods to perform Highly Multiplexed PCR in Combination with the INVADER Assay.

BACKGROUND

With the completion of the nucleic acid sequencing of the human genome, the demand for fast, reliable, cost-effective and user-friendly tests for genomics research and related drug design efforts has greatly increased. A number of institutions are actively mining the available genetic sequence information to identify correlations between genes, gene expression and phenotypes (e.g., disease states, metabolic responses, and the like). These analyses include an attempt to characterize the effect of gene mutations and genetic and gene expression heterogeneity in individuals and populations. However, despite the wealth of sequence information available, information on the frequency and clinical relevance of many polymorphisms and other variations has yet to be obtained and validated. For example, the human reference sequences used in current genome sequencing efforts do not represent an exact match for any one person's genome. In the Human Genome Project (HGP), researchers collected blood (female) or sperm (male) samples from a large number of donors. However, only a few samples were processed as DNA resources, and the source names are protected so neither donors nor scientists know whose DNA is being sequenced. The human genome sequence generated by the private genomics company Celera was based on DNA samples collected from five donors who identified themselves as Hispanic, Asian, Caucasian, or African-American. The small number of human samples used to generate the reference sequences does not reflect the genetic diversity among population groups and individuals. Attempts to analyze individuals based on the genome sequence information will often fail. For example, many genetic detection assays are based on the hybridization of probe oligonucleotides to a target region on genomic DNA or mRNA. Probes generated based on the reference sequences will often fail (e.g., fail to hybridize properly, fail to properly characterize the sequence at specific position of the target) because the target sequence for many individuals differs from the reference sequence. Differences may be on an individual-by-individual basis, but many follow regional population patterns (e.g., many correlate highly to race, ethnicity, geographic local, age, environmental exposure, etc.). With the limited utility of information currently available, the art is in need of systems and methods for acquiring, analyzing, storing, and applying large volumes of genetic information with the goal of providing an array of detection assay technologies for research and clinical analysis of biological samples.

SUMMARY OF THE INVENTION

The present invention provides methods and routines for developing and optimizing nucleic acid detection assays for use in basic research, clinical research, and for the development of clinical detection assays.

In some embodiments, the present invention provides methods comprising; a) providing target sequence information for at least Y target sequences, wherein each of the target sequences comprises; i) a footprint region, ii) a 5' region immediately upstream of the footprint region, and iii) a 3' region immediately downstream of the footprint region, and b) processing the target sequence information such that a primer set is generated, wherein the primer set comprises a forward and a reverse primer sequence for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide A or C, and N[2]-N[1]-3' of each of the forward and reverse primers is not complementary to N[2]-N[1]-3' of any of the forward and reverse primers in the primer set.

In other embodiments, the present invention provides methods comprising; a) providing target sequence information for at least Y target sequences, wherein each of the target sequences comprises; i) a footprint region, ii) a 5' region immediately upstream of the footprint region, and iii) a 3' region immediately downstream of the footprint region, and b) processing the target sequence information such that a primer set is generated, wherein the primer set comprises a forward and a reverse primer sequence for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide G or T, and N[2]-N[1]-3' of each of the forward and reverse primers is not complementary to N[2]-N[1]-3' of any of the forward and reverse primers in the primer set.

In particular embodiments, a method comprising; a) providing target sequence information for at least Y target sequences, wherein each of the target sequences comprises; i) a footprint region, ii) a 5' region immediately upstream of the footprint region, and iii) a 3' region immediately downstream of the footprint region, and b) processing the target sequence information such that a primer set is generated, wherein the primer set comprises; i) a forward primer sequence identical to at least a portion of the 5' region for each of the Y target sequences, and ii) a reverse primer sequence identical to at least a portion of a complementary sequence of the 3' region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide A or C, and N[2]-N[1]-3' of each of the forward and reverse primers is not complementary to N[2]-N[1]-3' of any of the forward and reverse primers in the primer set.

In other embodiments, the present invention provides methods comprising a) providing target sequence information for at least Y target sequences, wherein each of the target sequences comprises; i) a footprint region, ii) a 5' region immediately upstream of the footprint region, and iii) a 3' region immediately downstream of the footprint region, and b) processing the target sequence information such that a primer set is generated, wherein the primer set comprises; i) a forward primer sequence identical to at least a portion of the 5' region for each of the Y target sequences, and ii) a reverse primer sequence identical to at least a portion of a complementary sequence of the 3' region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide G or T, and N[2]-N[1]-3' of each of the forward and reverse primers is not complementary to N[2]-N[1]-3' of any of the forward and reverse primers in the primer set.

In particular embodiments, the present invention provides methods comprising a) providing target sequence information for at least Y target sequences, wherein each of the target sequences comprises a single nucleotide polymorphism, b) determining where on each of the target sequences one or more assay probes would hybridize in order to detect the single nucleotide polymorphism such that a footprint region is located on each of the target sequences, and c) processing the target sequence information such that a primer set is generated, wherein the primer set comprises; i) a forward primer sequence identical to at least a portion of the target sequence immediately 5' of the footprint region for each of the Y target sequences, and ii) a reverse primer sequence identical to at least a portion of a complementary sequence of the target sequence immediately 3' of the footprint region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide A or C, and N[2]-N[1]-3' of each of the forward and reverse primers is not complementary to N[2]-N[1]-3' of any of the forward and reverse primers in the primer set.

In some embodiments, the present invention provides methods comprising a) providing target sequence information for at least Y target sequences, wherein each of the target sequences comprises a single nucleotide polymorphism, b) determining where on each of the target sequences one or more assay probes would hybridize in order to detect the single nucleotide polymorphism such that a footprint region is located on each of the target sequences, and c) processing the target sequence information such that a primer set is generated, wherein the primer set comprises; i) a forward primer sequence identical to at least a portion of the target sequence immediately 5' of the footprint region for each of the Y target sequences, and ii) a reverse primer sequence identical to at least a portion of a complementary sequence of the target sequence immediately 3' of the footprint region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide T or G, and N[2]-N[1]-3' of each of the forward and reverse primers is not complementary to N[2]-N[1]-3' of any of the forward and reverse primers in the primer set.

In certain embodiments, the primer set is configured for performing a multiplex PCR reaction that amplifies at least Y amplicons, wherein each of the amplicons is defined by the position of the forward and reverse primers. In other embodiments, the primer set is generated as digital or printed sequence information. In some embodiments, the primer set is generated as physical primer oligonucleotides.

In certain embodiments, N[3]-N[2]-N[1]-3' of each of the forward and reverse primers is not complementary to N[3]-N[2]-N[1]-3' of any of the forward and reverse primers in the primer set. In other embodiments, the processing comprises initially selecting N[1] for each of the forward primers as the most 3' A or C in the 5' region. In certain embodiments, the processing comprises initially selecting N[1] for each of the forward primers as the most 3' G or T in the 5' region. In some embodiments, the processing comprises initially selecting N[1] for each of the forward primers as the most 3' A or C in the 5' region, and wherein the processing further comprises changing the N[1] to the next most 3' A or C in the 5' region for the forward primer sequences that fail the requirement that each of the forward primer's N[2]-N[1]-3' is not complementary to N[2]-N[1]-3' of any of the forward and reverse primers in the primer set.

In other embodiments, the processing comprises initially selecting N[1] for each of the reverse primers as the most 3' A or C in the complement of the 3' region. In some embodiments, the processing comprises initially selecting N[1] for each of the reverse primers as the most 3' G or T in the complement of the 3' region. In further embodiments, the processing comprises initially selecting N[1] for each of the reverse primers as the most 3' A or C in the 3' region, and wherein the processing further comprises changing the N[1] to the next most 3' A or C in the 3' region for the reverse primer sequences that fail the requirement that each of the reverse primer's N[2]-N[1]-3' is not complementary to N[2]-N[1]-3' of any of the forward and reverse primers in the primer set.

In particular embodiments, the footprint region comprises a single nucleotide polymorphism. In some embodiments, the footprint comprises a mutation. In some embodiments, the footprint region for each of the target sequences comprises a portion of the target sequence that hybridizes to one or more assay probes configured to detect the single nucleotide polymorphism. In certain embodiments, the footprint is this region where the probes hybridize. In other embodiments, the footprint further includes additional nucleotides on either end.

In some embodiments, the processing further comprises selecting N[5]-N[4]-N[3]-N[2]-N[1]-3' for each of the forward and reverse primers such that less than 80 percent homology with a assay component sequence is present. In preferred embodiments, the assay component is a FRET probe sequence. In certain embodiments, the target sequence is about 300-500 base pairs in length, or about 200-600 base pair in length. In certain embodiments, Y is an integer between 2 and 500, or between 2-10,000.

In certain embodiments, the processing comprises selecting x for each of the forward and reverse primers such that each of the forward and reverse primers has a melting temperature with respect to the target sequence of approximately 50 degrees Celsius (e.g. 50 degrees, Celsius, or at least 50 degrees Celsius, and no more than 55 degrees Celsius). In preferred embodiments, the melting temperature of a primer (when hybridized to the target sequence) is at least 50 degrees Celsius, but at least 10 degrees different than a selected detection assay's optimal reaction temperature.

In some embodiments, the forward and reverse primer pair optimized concentrations are determined for the primer set. In other embodiments, the processing is automated. In further embodiments, the processing is automated with a processor.

In other embodiments, the present invention provides a kit comprising the primer set generated by the methods of the present invention, and at least one other component. (e.g. cleavage agent, polymerase, INVADER oligonucleotide). In certain embodiments, the present invention provides compositions comprising the primers and primer sets generated by the methods of the present invention.

In particular embodiments, the present invention provides methods comprising; a) providing; i) a user interface configured to receive sequence data, ii) a computer system having stored therein a multiplex PCR primer software application, and b) transmitting the sequence data from the user interface to the computer system, wherein the sequence data comprises target sequence information for at least Y target sequences, wherein each of the target sequences comprises; i) a footprint region, ii) a 5' region immediately upstream of the footprint region, and iii) a 3' region immediately downstream of the footprint region, and c) processing the target sequence information with the multiplex PCR primer pair software application to generate a primer set, wherein the primer set comprises; i) a forward primer sequence identical to at least a portion of the target sequence immediately 5' of the footprint region for each of the Y target sequences, and ii) a reverse primer sequence identical to at least a portion of a complementary sequence of the target sequence immediately 3' of the footprint region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide A or C, and N[2]-N[1]-3' of each of the forward and reverse primers is not complementary to N[2]-N[1]-3' of any of the forward and reverse primers in the primer set.

In some embodiments, the present invention provides methods comprising; a) providing; i) a user interface configured to receive sequence data, ii) a computer system having stored therein a multiplex PCR primer software application, and b) transmitting the sequence data from the user interface to the computer system, wherein the sequence data comprises target sequence information for at least Y target sequences, wherein each of the target sequences comprises; i) a footprint region, ii) a 5' region immediately upstream of the footprint region, and iii) a 3' region immediately downstream of the footprint region, and c) processing the target sequence information with the multiplex PCR primer pair software application to generate a primer set, wherein the primer set comprises; i) a forward primer sequence identical to at least a portion of the target sequence immediately 5' of the footprint region for each of the Y target sequences, and ii) a reverse primer sequence identical to at least a portion of a complementary sequence of the target sequence immediately 3' of the footprint region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide G or T, and N[2]-N[1]-3' of each of the forward and reverse primers is not complementary to N[2]-N[1]-3' of any of the forward and reverse primers in the primer set.

In certain embodiments, the present invention provides systems comprising; a) a computer system configured to receive data from a user interface, wherein the user interface is configured to receive sequence data, wherein the sequence data comprises target sequence information for at least Y target sequences, wherein each of the target sequences comprises; i) a footprint region, ii) a 5' region immediately upstream of the footprint region, and iii) a 3' region immediately downstream of the footprint region, b) a multiplex PCR primer pair software application operably linked to the user interface, wherein the multiplex PCR primer software application is configured to process the target sequence information to generate a primer set, wherein the primer set comprises; i) a forward primer sequence identical to at least a portion of the target sequence immediately 5' of the footprint region for each of the Y target sequences, and ii) a reverse primer sequence identical to at least a portion of a complementary sequence of the target sequence immediately 3' of the footprint region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide A or C, and N[2]-N[1]-3' of each of the forward and reverse primers is not complementary to N[2]-N[1]-3' of any of the forward and reverse primers in the primer set, and c) a computer system having stored therein the multiplex PCR primer pair software application, wherein the computer system comprises computer memory and a computer processor.

In other embodiments, the present invention provides systems comprising; a) a computer system configured to receive data from a user interface, wherein the user interface is configured to receive sequence data, wherein the sequence data comprises target sequence information for at least Y target sequences, wherein each of the target sequences comprises; i) a footprint region, ii) a 5' region immediately upstream of the footprint region, and iii) a 3' region immediately downstream of the footprint region, b) a multiplex PCR primer pair software application operably linked to the user interface, wherein the multiplex PCR primer software application is configured to process the target sequence information to generate a primer set, wherein the primer set comprises; i) a forward primer sequence identical to at least a portion of the target sequence immediately 5' of the footprint region for each of the Y target sequences, and ii) a reverse primer sequence identical to at least a portion of a complementary sequence of the target sequence immediately 3' of the footprint region for each of the at least Y target sequences, wherein each of the forward and reverse primer sequences comprises a nucleic acid sequence represented by 5'-N[x]-N[x−1]- . . . -N[4]-N[3]-N[2]-N[1]-3', wherein N represents a nucleotide base, x is at least 6, N[1] is nucleotide G or T, and N[2]-N[1]-3' of each of the forward and reverse primers is not complementary to N[2]-N[1]-3' of any of the forward and reverse primers in the primer set, and c) a computer system having stored therein the multiplex PCR primer pair software application, wherein the computer system comprises computer memory and a computer processor. In certain embodiments, the computer system is configured to return the primer set to the user interface.

DESCRIPTION OF THE FIGURES

The following figures form part of the present specification and are included to further demonstrate certain aspects and embodiments of the present invention. The invention may be better understood by reference to one or more of these figures in combination with the description of specific embodiments presented herein.

FIG. 2 shows an input target sequence and the result of processing this sequence with systems and routines of the present invention.

FIG. 3 shows an example of a basic work flow for highly multiplexed PCR using the INVADER Medically Associated Panel.

FIGS. 5-9 show sequences used and data generated in connection with Example 1.

FIGS. 10-17 show sequences used and data generated in connection with Example 2. It is note that each sheet in FIG. 10 shows the same sequence twice, with only the first occurrence of the sequence labeled with a sequence identifier. FIG. 14 specifically shows an example of INVADER assay analysis of highly multiplexed PCR. Multiplex PCR was carried out under standard conditions using only 10 ng of hgDNA as template. After 10 min at 95° C., Taq (2.5 units) was added to the 50 ul reaction and additional 3 ul of PCR carried out for 50 cycles. The PCR reaction was diluted and loaded directly onto an INVADER MAP plate (3 ul/well). A 15 mM $MgCl_2$ was added to each reaction on the INVADER MAP plate and covered with 6 ul of mineral oil. The entire plate was heated to 95° C. for 5 min. and incubated at 63° C. for 40 min. FAM and RED fluorescence was measured on a Cytofluor 4000 fluorescent plate reader and "Fold Over Zero" (FOZ) values were calculated for each amplicon. Results from each SNP are color coded in the table above as "pass" (dark gray), "mis-call" (light pink), or "no-call" (white).

FIG. 19 shows certain criteria that can be employed in certain embodiments of the present invention in order to design multiplex primers.

FIG. 20 shows certain PCR primers useful for amplifying various regions of CYP2D6.

DEFINITIONS

Figure 1:
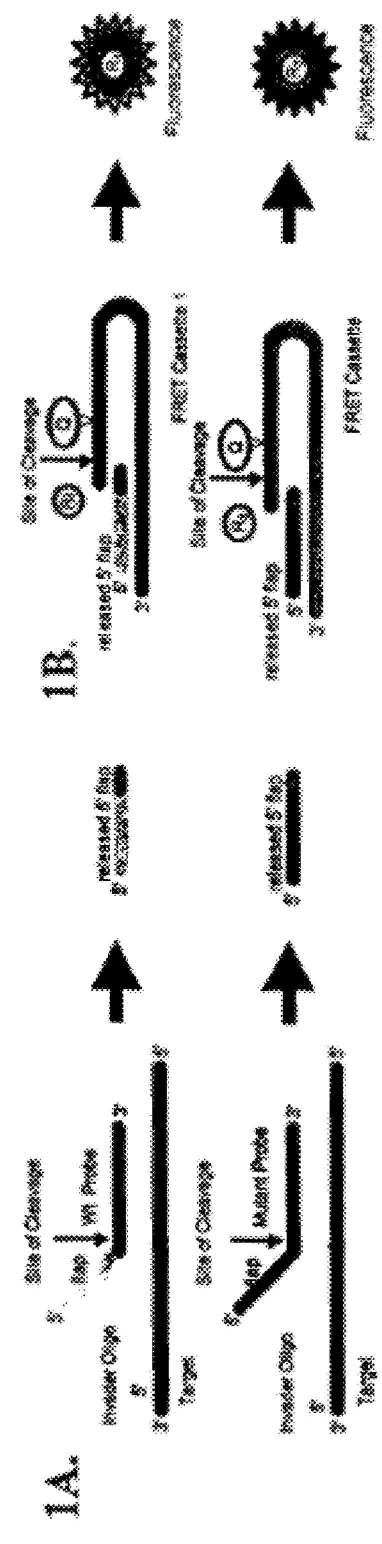
FIG. 1 shows one embodiments of SNP detection using the INVADER assay in biplex format.

To facilitate an understanding of the present invention, a number of terms and phrases are defined below:

As used herein, the terms "SNP," "SNPs" or "single nucleotide polymorphisms" refer to single base changes at a specific location in an organism's (e.g., a human) genome. "SNPs" can be located in a portion of a genome that does not code for a gene. Alternatively, a "SNP" may be located in the coding region of a gene. In this case, the "SNP" may alter the structure and function of the RNA or the protein with which it is associated.

As used herein, the term "allele" refers to a variant form of a given sequence (e.g., including but not limited to, genes containing one or more SNPs). A large number of genes are present in multiple allelic forms in a population. A diploid organism carrying two different alleles of a gene is said to be heterozygous for that gene, whereas a homozygote carries two copies of the same allele.

As used herein, the term "linkage" refers to the proximity of two or more markers (e.g., genes) on a chromosome.

As used herein, the term "allele frequency" refers to the frequency of occurrence of a given allele (e.g., a sequence containing a SNP) in given population (e.g., a specific gender, race, or ethnic group). Certain populations may contain a given allele within a higher percent of its members than other populations. For example, a particular mutation in the breast cancer gene called BRCA1 was found to be present in one percent of the general Jewish population. In comparison, the percentage of people in the general U.S. population that have any mutation in BRCA1 has been estimated to be between 0.1 to 0.6 percent. Two additional mutations, one in the BRCA1 gene and one in another breast cancer gene called BRCA2, have a greater prevalence in the Ashkenazi Jewish population, bringing the overall risk for carrying one of these three mutations to 2.3 percent.

As used herein, the term "in silico analysis" refers to analysis performed using computer processors and computer memory. For example, "insilico SNP analysis" refers to the analysis of SNP data using computer processors and memory.

As used herein, the term "genotype" refers to the actual genetic make-up of an organism (e.g., in terms of the particular alleles carried at a genetic locus). Expression of the genotype gives rise to an organism's physical appearance and characteristics—the "phenotype."

As used herein, the term "locus" refers to the position of a gene or any other characterized sequence on a chromosome.

As used herein the term "disease" or "disease state" refers to a deviation from the condition regarded as normal or average for members of a species, and which is detrimental to an affected individual under conditions that are not inimical to the majority of individuals of that species (e.g., diarrhea, nausea, fever, pain, and inflammation etc).

As used herein, the term "treatment" in reference to a medical course of action refer to steps or actions taken with respect to an affected individual as a consequence of a suspected, anticipated, or existing disease state, or wherein there is a risk or suspected risk of a disease state. Treatment may be provided in anticipation of or in response to a disease state or suspicion of a disease state, and may include, but is not limited to preventative, ameliorative, palliative or curative steps. The term "therapy" refers to a particular course of treatment.

The term "gene" refers to a nucleic acid (e.g., DNA) sequence that comprises coding sequences necessary for the production of a polypeptide, RNA (e.g., rRNA, tRNA, etc.), or precursor. The polypeptide, RNA, or precursor can be encoded by a full length coding sequence or by any portion of the coding sequence so long as the desired activity or functional properties (e.g., ligand binding, signal transduction, etc.) of the full-length or fragment are retained. The term also encompasses the coding region of a structural gene and the including sequences located adjacent to the coding region on both the 5' and 3' ends for a distance of about 1 kb on either end such that the gene corresponds to the length of the full-length mRNA. The sequences that are located 5' of the coding region and which are present on the mRNA are referred to as 5' untranslated sequences. The sequences that are located 3' or downstream of the coding region and that are present on the mRNA are referred to as 3' untranslated sequences. The term "gene" encompasses both cDNA and genomic forms of a gene. A genomic form or clone of a gene contains the coding region interrupted with non-coding sequences termed "introns" or "intervening regions" or "intervening sequences." Introns are segments included when a gene is transcribed into heterogeneous nuclear RNA (hnRNA); introns may contain regulatory elements such as enhancers. Introns are removed or "spliced out" from the nuclear or primary transcript; introns therefore are generally absent in the messenger RNA (mRNA) transcript. The mRNA functions during translation to specify the sequence or order of amino acids in a nascent polypeptide. Variations (e.g., mutations, SNPS, insertions, deletions) in transcribed portions of genes are reflected in, and can generally be detected in corresponding portions of the produced RNAs (e.g., hnRNAs, mRNAs, rRNAs, tRNAs).

Where the phrase "amino acid sequence" is recited herein to refer to an amino acid sequence of a naturally occurring protein molecule, amino acid sequence and like terms, such as polypeptide or protein are not meant to limit the amino acid sequence to the complete, native amino acid sequence associated with the recited protein molecule.

In addition to containing introns, genomic forms of a gene may also include sequences located on both the 5' and 3' end of the sequences that are present on the RNA transcript. These sequences are referred to as "flanking" sequences or regions (these flanking sequences are located 5' or 3' to the non-translated sequences present on the mRNA transcript). The 5' flanking region may contain regulatory sequences such as promoters and enhancers that control or influence the transcription of the gene. The 3' flanking region may contain sequences that direct the termination of transcription, post-transcriptional cleavage and polyadenylation.

The term "wild-type" refers to a gene or gene product that has the characteristics of that gene or gene product when isolated from a naturally occurring source. A wild-type gene is that which is most frequently observed in a population and is thus arbitrarily designed the "normal" or "wild-type" form of the gene. In contrast, the terms "modified," "mutant," and "variant" refer to a gene or gene product that displays modifications in sequence and or functional properties (i.e., altered characteristics) when compared to the wild-type gene or gene product. It is noted that naturally-occurring mutants can be isolated; these are identified by the fact that they have altered characteristics when compared to the wild-type gene or gene product.

As used herein, the terms "nucleic acid molecule encoding," "DNA sequence encoding," and "DNA encoding" refer to the order or sequence of deoxyribonucleotides along a strand of deoxyribonucleic acid. The order of these deoxyribonucleotides determines the order of amino acids along the polypeptide (protein) chain. In this case, the DNA sequence thus codes for the amino acid sequence.

DNA and RNA molecules are said to have "5' ends" and "3' ends" because mononucleotides are reacted to make oligonucleotides or polynucleotides in a manner such that the 5' phosphate of one mononucleotide pentose ring is attached to the 3' oxygen of its neighbor in one direction via a phosphodiester linkage. Therefore, an end of an oligonucleotides or polynucleotide, referred to as the "5' end" if its 5' phosphate is not linked to the 3' oxygen of a mononucleotide pentose ring and as the "3' end" if its 3' oxygen is not linked to a 5' phosphate of a subsequent mononucleotide pentose ring. As used herein, a nucleic acid sequence, even if internal to a larger oligonucleotide or polynucleotide, also may be said to have 5' and 3' ends. In either a linear or circular DNA molecule, discrete elements are referred to as being "upstream" or 5' of the "downstream" or 3' elements. This terminology reflects the fact that transcription proceeds in a 5' to 3' fashion along the DNA strand. The promoter and enhancer elements that direct transcription of a linked gene are generally located 5' or upstream of the coding region. However, enhancer elements can exert their effect even when located 3' of the promoter element and the coding region. Transcription termination and polyadenylation signals are located 3' or downstream of the coding region.

As used herein, the terms "an oligonucleotide having a nucleotide sequence encoding a gene" and "polynucleotide having a nucleotide sequence encoding a gene," means a nucleic acid sequence comprising the coding region of a gene or, in other words, the nucleic acid sequence that encodes a gene product. The coding region may be present in either a cDNA, genomic DNA, or RNA form. When present in a DNA form, the oligonucleotide or polynucleotide may be single-stranded (i.e., the sense strand) or double-stranded. Suitable control elements such as enhancers/promoters, splice junctions, polyadenylation signals, etc. may be placed in close proximity to the coding region of the gene if needed to permit proper initiation of transcription and/or correct processing of the primary RNA transcript. Alternatively, the coding region utilized in the expression vectors of the present invention may contain endogenous enhancers/promoters, splice junctions, intervening sequences, polyadenylation signals, etc. or a combination of both endogenous and exogenous control elements.

As used herein, the terms "complementary" or "complementarity" are used in reference to polynucleotides (i.e., a sequence of nucleotides) related by the base-pairing rules. For example, for the sequence "5'-A-G-T-3'," is complementary to the sequence "3'-T-C-A-5'." Complementarity may be "partial," in which only some of the nucleic acids' bases are matched according to the base pairing rules. Or, there may be "complete" or "total" complementarity between the nucleic acids. The degree of complementarity between nucleic acid strands has significant effects on the efficiency and strength of hybridization between nucleic acid strands. This is of particular importance in amplification reactions, as well as detection methods that depend upon binding between nucleic acids.

The term "homology" refers to a degree of complementarity. There may be partial homology or complete homology (i.e., identity). A partially complementary sequence is one that at least partially inhibits a completely complementary sequence from hybridizing to a target nucleic acid and is referred to using the functional term "substantially homologous." The term "inhibition of binding," when used in reference to nucleic acid binding, refers to inhibition of binding caused by competition of homologous sequences for binding to a target sequence. The inhibition of hybridization of the completely complementary sequence to the target sequence may be examined using a hybridization assay (Southern or Northern blot, solution hybridization and the like) under conditions of low stringency. A substantially homologous sequence or probe will compete for and inhibit the binding (i.e., the hybridization) of a completely homologous to a target under conditions of low stringency. This is not to say that conditions of low stringency are such that non-specific binding is permitted; low stringency conditions require that the binding of two sequences to one another be a specific (i.e., selective) interaction. The absence of non-specific binding may be tested by the use of a second target that lacks even a partial degree of complementarity (e.g., less than about 30% identity); in the absence of non-specific binding the probe will not hybridize to the second non-complementary target.

The art knows well that numerous equivalent conditions may be employed to comprise low stringency conditions; factors such as the length and nature (DNA, RNA, base composition) of the probe and nature of the target (DNA, RNA, base composition, present in solution or immobilized, etc.) and the concentration of the salts and other components (e.g., the presence or absence of formamide, dextran sulfate, polyethylene glycol) are considered and the hybridization solution may be varied to generate conditions of low stringency hybridization different from, but equivalent to, the above listed conditions. In addition, the art knows conditions that promote hybridization under conditions of high stringency (e.g., increasing the temperature of the hybridization and/or wash steps, the use of formamide in the hybridization solution, etc.).

When used in reference to a double-stranded nucleic acid sequence such as a cDNA or genomic clone, the term "substantially homologous" refers to any probe that can hybridize to either or both strands of the double-stranded nucleic acid sequence under conditions of low stringency as described above.

A gene may produce multiple RNA species that are generated by differential splicing of the primary RNA transcript. cDNAs that are splice variants of the same gene will contain regions of sequence identity or complete homology (representing the presence of the same exon or portion of the same exon on both cDNAs) and regions of complete non-identity (for example, representing the presence of exon "A" on cDNA 1 wherein cDNA 2 contains exon "B" instead). Because the two cDNAs contain regions of sequence identity they will both hybridize to a probe derived from the entire gene or portions of the gene containing sequences found on both cDNAs; the two splice variants are therefore substantially homologous to such a probe and to each other.

When used in reference to a single-stranded nucleic acid sequence, the term "substantially homologous" refers to any probe that can hybridize (i.e., it is the complement of) the single-stranded nucleic acid sequence under conditions of low stringency as described above.

As used herein, the term "hybridization" is used in reference to the pairing of complementary nucleic acids. Hybridization and the strength of hybridization (i.e., the strength of the association between the nucleic acids) is impacted by such factors as the degree of complementary between the nucleic acids, stringency of the conditions involved, the $T_m$ of the formed hybrid, and the G:C ratio within the nucleic acids.

As used herein, the term "$T_m$" is used in reference to the "melting temperature." The melting temperature is the temperature at which a population of double-stranded nucleic acid molecules becomes half dissociated into single strands. The equation for calculating the $T_m$ of nucleic acids is well known in the art. As indicated by standard references, a simple estimate of the $T_m$ value may be calculated by the equation: $T_m=81.5+0.41(\% G+C)$, when a nucleic acid is in aqueous solution at 1 M NaCl (See e.g., Anderson and Young, Quantitative Filter Hybridization, in *Nucleic Acid Hybridization [*1985]). Other references include more sophisticated computations that take structural as well as sequence characteristics into account for the calculation of $T_m$.

As used herein the term "stringency" is used in reference to the conditions of temperature, ionic strength, and the presence of other compounds such as organic solvents, under which nucleic acid hybridizations are conducted. Those skilled in the art will recognize that "stringency" conditions may be altered by varying the parameters just described either individually or in concert. With "high stringency" conditions, nucleic acid base pairing will occur only between nucleic acid fragments that have a high frequency of complementary base sequences (e.g., hybridization under "high stringency" conditions may occur between homologs with about 85-100% identity, preferably about 70-100% identity). With medium stringency conditions, nucleic acid base pairing will occur between nucleic acids with an intermediate frequency of complementary base sequences (e.g., hybridization under "medium stringency" conditions may occur between homologs with about 50-70% identity). Thus, conditions of "weak" or "low" stringency are often required with nucleic acids that are derived from organisms that are genetically diverse, as the frequency of complementary sequences is usually less.

"High stringency conditions" when used in reference to nucleic acid hybridization comprise conditions equivalent to binding or hybridization at 42 C in a solution consisting of 5×SSPE (43.8 g/l NaCl, 6.9 g/l $NaH_2PO_4H_20$ and 1.85 g/l EDTA, pH adjusted to 7.4 with NaOH), 0.5% SDS, 5×Denhardt's reagent and 100 μg/ml denatured salmon sperm DNA followed by washing in a solution comprising 0.1×SSPE, 1.0% SDS at 42 C when a probe of about 500 nucleotides in length is employed.

"Medium stringency conditions" when used in reference to nucleic acid hybridization comprise conditions equivalent to binding or hybridization at 42 C in a solution consisting of 5×SSPE (43.8 g/l NaCl, 6.9 g/l $NaH_2PO_4H_20$ and 1.85 g/l EDTA, pH adjusted to 7.4 with NaOH), 0.5% SDS, 5×Denhardt's reagent and 100 μg/ml denatured salmon sperm DNA followed by washing in a solution comprising 1.0×SSPE, 1.0% SDS at 42 C when a probe of about 500 nucleotides in length is employed.

"Low stringency conditions" comprise conditions equivalent to binding or hybridization at 42 C in a solution consisting of 5×SSPE (43.8 g/l NaCl, 6.9 g/l $NaH_2PO_4H_20$ and 1.85 g/l EDTA, pH adjusted to 7.4 with NaOH), 0.1% SDS, 5×Denhardt's reagent [50×Denhardt's contains per 500 ml: 5 g Ficoll (Type 400, Pharamcia), 5 g BSA (Fraction V; Sigma)] and 100 g/ml denatured salmon sperm DNA followed by washing in a solution comprising 5×SSPE, 0.1% SDS at 42 C when a probe of about 500 nucleotides in length is employed.

The following terms are used to describe the sequence relationships between two or more polynucleotides: "reference sequence," "sequence identity," "percentage of sequence identity," and "substantial identity." A "reference sequence" is a defined sequence used as a basis for a sequence comparison; a reference sequence may be a subset of a larger sequence, for example, as a segment of a full-length cDNA sequence given in a sequence listing or may comprise a complete gene sequence. Generally, a reference sequence is at least 20 nucleotides in length, frequently at least 25 nucleotides in length, and often at least 50 nucleotides in length. Since two polynucleotides may each (1) comprise a sequence (i.e., a portion of the complete polynucleotide sequence) that is similar between the two polynucleotides, and (2) may further comprise a sequence that is divergent between the two polynucleotides, sequence comparisons between two (or more) polynucleotides are typically performed by comparing sequences of the two polynucleotides over a "comparison window" to identify and compare local regions of sequence similarity. A "comparison window," as used herein, refers to a conceptual segment of at least 20 contiguous nucleotide positions wherein a polynucleotide sequence may be compared to a reference sequence of at least 20 contiguous nucleotides and wherein the portion of the polynucleotide sequence in the comparison window may comprise additions or deletions (i.e., gaps) of 20 percent or less as compared to the reference sequence (which does not comprise additions or deletions) for optimal alignment of the two sequences. Optimal alignment of sequences for aligning a comparison window may be conducted by the local homology algorithm of Smith and Waterman [Smith and Waterman, *Adv. Appl. Math.* 2: 482 (1981)] by the homology alignment algorithm of Needleman and Wunsch [Needleman and Wunsch, *J. Mol. Biol.* 48:443 (1970)], by the search for similarity method of Pearson and Lipman [Pearson and Lipman, *Proc. Natl. Acad. Sci.* (U.S.A.) 85:2444 (1988)], by computerized implementations of these algorithms (GAP, BESTFIT, FASTA, and TFASTA in the Wisconsin Genetics Software Package Release 7.0, Genetics Computer Group, 575 Science Dr., Madison, Wis.), or by inspection, and the best alignment (i.e., resulting in the highest percentage of homology over the comparison window) generated by the various methods is selected. The term "sequence identity" means that two polynucleotide sequences are identical (i.e., on a nucleotide-by-nucleotide basis) over the window of comparison. The term "percentage of sequence identity" is calculated by comparing two optimally aligned sequences over the window of comparison, determining the number of positions at which the identical nucleic acid base (e.g., A, T, C, G, U, or I) occurs in both sequences to yield the number of matched positions, dividing the number of matched positions by the total number of positions in the window of comparison (i.e., the window size), and multiplying the result by 100 to yield the percentage of sequence identity.

As applied to polynucleotides, the term "substantial identity" denotes a characteristic of a polynucleotide sequence, wherein the polynucleotide comprises a sequence that has at least 85 percent sequence identity, preferably at least 90 to 95 percent sequence identity, more usually at least 99 percent sequence identity as compared to a reference sequence over a comparison window of at least 20 nucleotide positions, frequently over a window of at least 25-50 nucleotides, wherein the percentage of sequence identity is calculated by comparing the reference sequence to the polynucleotide sequence which may include deletions or additions which total 20 percent or less of the reference sequence over the window of comparison. The reference sequence may be a subset of a larger sequence, for example, as a splice variant of the full-length sequences.

As applied to polypeptides, the term "substantial identity" means that two peptide sequences, when optimally aligned, such as by the programs GAP or BESTFIT using default gap weights, share at least 80 percent sequence identity, preferably at least 90 percent sequence identity, more preferably at least 95 percent sequence identity or more (e.g., 99 percent sequence identity). Preferably, residue positions that are not identical differ by conservative amino acid substitutions. Conservative amino acid substitutions refer to the interchangeability of residues having similar side chains. For example, a group of amino acids having aliphatic side chains is glycine, alanine, valine, leucine, and isoleucine; a group of amino acids having aliphatic-hydroxyl side chains is serine and threonine; a group of amino acids having amide-containing side chains is asparagine and glutamine; a group of amino acids having aromatic side chains is phenylalanine, tyrosine, and tryptophan; a group of amino acids having basic side chains is lysine, arginine, and histidine; and a group of amino acids having sulfur-containing side chains is cysteine and methionine. Preferred conservative amino acids substitution groups are: valine-leucine-isoleucine, phenylalanine-tyrosine, lysine-arginine, alanine-valine, and asparagine-glutamine.

"Amplification" is a special case of nucleic acid replication involving template specificity. It is to be contrasted with non-specific template replication (i.e., replication that is template-dependent but not dependent on a specific template). Template specificity is here distinguished from fidelity of replication (i.e., synthesis of the proper polynucleotide sequence) and nucleotide (ribo- or deoxyribo-) specificity. Template specificity is frequently described in terms of "target" specificity. Target sequences are "targets" in the sense that they are sought to be sorted out from other nucleic acid. Amplification techniques have been designed primarily for this sorting out.

Template specificity is achieved in most amplification techniques by the choice of enzyme. Amplification enzymes are enzymes that, under conditions they are used, will process only specific sequences of nucleic acid in a heterogeneous mixture of nucleic acid. For example, in the case of Q replicase, MDV-1 RNA is the specific template for the replicase (D. L. Kacian et al., Proc. Natl. Acad. Sci. USA 69:3038 [1972]). Other nucleic acid will not be replicated by this amplification enzyme. Similarly, in the case of T7 RNA polymerase, this amplification enzyme has a stringent specificity for its own promoters (M. Chamberlin et al., Nature 228:227 [1970]). In the case of T4 DNA ligase, the enzyme will not ligate the two oligonucleotides or polynucleotides, where there is a mismatch between the oligonucleotide or polynucleotide substrate and the template at the ligation junction (D. Y. Wu and R. B. Wallace, Genomics 4:560 [1989]). Finally, Taq and Pfu polymerases, by virtue of their ability to function at high temperature, are found to display high specificity for the sequences bounded and thus defined by the primers; the high temperature results in thermodynamic conditions that favor primer hybridization with the target sequences and not hybridization with non-target sequences (H. A. Erlich (ed.), *PCR Technology*, Stockton Press [1989]).

As used herein, the term "amplifiable nucleic acid" is used in reference to nucleic acids that may be amplified by any amplification method. It is contemplated that "amplifiable nucleic acid" will usually comprise "sample template."

As used herein, the term "sample template" refers to nucleic acid originating from a sample that is analyzed for the presence of "target" (defined below). In contrast, "background template" is used in reference to nucleic acid other than sample template that may or may not be present in a sample. Background template is most often inadvertent. It may be the result of carryover, or it may be due to the presence of nucleic acid contaminants sought to be purified away from the sample. For example, nucleic acids from organisms other than those to be detected may be present as background in a test sample.

As used herein, the term "primer" refers to an oligonucleotide, whether occurring naturally as in a purified restriction digest or produced synthetically, which is capable of acting as a point of initiation of synthesis when placed under conditions in which synthesis of a primer extension product which is complementary to a nucleic acid strand is induced, (i.e., in the presence of nucleotides and an inducing agent such as DNA polymerase and at a suitable temperature and pH). The primer is preferably single stranded for maximum efficiency in amplification, but may alternatively be double stranded. If double stranded, the primer is first treated to separate its strands before being used to prepare extension products. Preferably, the primer is an oligodeoxyribonucleotide. The primer should be sufficiently long to prime the synthesis of extension products in the presence of the inducing agent. The exact lengths of the primers will depend on many factors, including temperature, source of primer and the use of the method.

As used herein, the term "probe" or "hybridization probe" refers to an oligonucleotide (i.e., a sequence of nucleotides), whether occurring naturally as in a purified restriction digest or produced synthetically, recombinantly or by PCR amplification, that is capable of hybridizing, at least in part, to another oligonucleotide of interest. A probe may be single-stranded or double-stranded. Probes are useful in the detection, identification and isolation of particular sequences. In some preferred embodiments, probes used in the present invention will be labeled with a "reporter molecule," so that is detectable in any detection system, including, but not limited to enzyme (e.g., ELISA, as well as enzyme-based histochemical assays), fluorescent, radioactive, and luminescent systems. It is not intended that the present invention be limited to any particular detection system or label.

As used herein, the term "target" refers to a nucleic acid sequence or structure to be detected or characterized.

As used herein, the term "polymerase chain reaction" ("PCR") refers to the method of K. B. Mullis (See e.g., U.S. Pat. Nos. 4,683,195, 4,683,202, and 4,965,188, hereby incorporated by reference), which describe a method for increasing the concentration of a segment of a target sequence in a mixture of genomic DNA without cloning or purification. This process for amplifying the target sequence consists of introducing a large excess of two oligonucleotide primers to the DNA mixture containing the desired target sequence, followed by a precise sequence of thermal cycling in the presence of a DNA polymerase. The two primers are complementary to their respective strands of the double stranded target sequence. To effect amplification, the mixture is denatured and the primers then annealed to their complementary sequences within the target molecule. Following annealing, the primers are extended with a polymerase so as to form a new pair of complementary strands. The steps of denaturation, primer annealing, and polymerase extension can be repeated many times (i.e., denaturation, annealing and extension constitute one "cycle"; there can be numerous "cycles") to obtain a high concentration of an amplified segment of the desired target sequence. The length of the amplified segment of the desired target sequence is determined by the relative positions of the primers with respect to each other, and therefore, this length is a controllable parameter. By virtue of the repeating aspect of the process, the method is referred to as the "polymerase chain reaction" (hereinafter "PCR"). Because the desired amplified segments of the target sequence become the predominant sequences (in terms of concentration) in the mixture, they are said to be "PCR amplified."

With PCR, it is possible to amplify a single copy of a specific target sequence in genomic DNA to a level detectable by several different methodologies (e.g., hybridization with a labeled probe; incorporation of biotinylated primers followed by avidin-enzyme conjugate detection; incorporation of $^{32}P$-labeled deoxynucleotide triphosphates, such as dCTP or dATP, into the amplified segment). In addition to genomic DNA, any oligonucleotide or polynucleotide sequence can be amplified with the appropriate set of primer molecules. In particular, the amplified segments created by the PCR process itself are, themselves, efficient templates for subsequent PCR amplifications.

As used herein, the terms "PCR product," "PCR fragment," and "amplification product" refer to the resultant mixture of compounds after two or more cycles of the PCR steps of denaturation, annealing and extension are complete. These terms encompass the case where there has been amplification of one or more segments of one or more target sequences.

As used herein, the term "amplification reagents" refers to those reagents (deoxyribonucleotide triphosphates, buffer, etc.), needed for amplification except for primers, nucleic acid template, and the amplification enzyme. Typically, amplification reagents along with other reaction components are placed and contained in a reaction vessel (test tube, microwell, etc.).

As used herein, the term "recombinant DNA molecule" as used herein refers to a DNA molecule that is comprised of segments of DNA joined together by means of molecular biological techniques.

As used herein, the term "antisense" is used in reference to RNA sequences that are complementary to a specific RNA sequence (e.g., mRNA). The term "antisense strand" is used in reference to a nucleic acid strand that is complementary to the "sense" strand. The designation (−) (i.e., "negative") is sometimes used in reference to the antisense strand, with the designation (+) sometimes used in reference to the sense (i.e., "positive") strand.

The term "isolated" when used in relation to a nucleic acid, as in "an isolated oligonucleotide" or "isolated polynucleotide" refers to a nucleic acid sequence that is identified and separated from at least one contaminant nucleic acid with which it is ordinarily associated in its natural source. Isolated nucleic acid is present in a form or setting that is different from that in which it is found in nature. In contrast, non-isolated nucleic acids are nucleic acids such as DNA and RNA found in the state they exist in nature. For example, a given DNA sequence (e.g., a gene) is found on the host cell chromosome in proximity to neighboring genes; RNA sequences, such as a specific mRNA sequence encoding a specific protein, are found in the cell as a mixture with numerous other mRNAs that encode a multitude of proteins. However, isolated nucleic acids encoding a polypeptide include, by way of example, such nucleic acid in cells ordinarily expressing the polypeptide where the nucleic acid is in a chromosomal location different from that of natural cells, or is otherwise flanked by a different nucleic acid sequence than that found in nature. The isolated nucleic acid, oligonucleotide, or polynucleotide may be present in single-stranded or double-stranded form. When an isolated nucleic acid, oligonucleotide or polynucleotide is to be utilized to express a protein, the oligonucleotide or polynucleotide will contain at a minimum the sense or coding strand (i.e., the oligonucleotide or polynucleotide may single-stranded), but may contain both the sense and anti-sense strands (i.e., the oligonucleotide or polynucleotide may be double-stranded).

As used herein the term "portion" when in reference to a nucleotide sequence (as in "a portion of a given nucleotide sequence") refers to fragments of that sequence. The fragments may range in size from four nucleotides to the entire nucleotide sequence minus one nucleotide (e.g., 10 nucleotides, 11, . . . , 20, . . . ).

As used herein, the term "purified" or "to purify" refers to the removal of contaminants from a sample. As used herein, the term "purified" refers to molecules (e.g., nucleic or amino acid sequences) that are removed from their natural environment, isolated or separated. An "isolated nucleic acid sequence" is therefore a purified nucleic acid sequence. "Substantially purified" molecules are at least 60% free, preferably at least 75% free, and more preferably at least 90% free from other components with which they are naturally associated.

The term "recombinant protein" or "recombinant polypeptide" as used herein refers to a protein molecule that is expressed from a recombinant DNA molecule.

The term "native protein" as used herein to indicate that a protein does not contain amino acid residues encoded by vector sequences; that is the native protein contains only those amino acids found in the protein as it occurs in nature. A native protein may be produced by recombinant means or may be isolated from a naturally occurring source.

As used herein the term "portion" when in reference to a protein (as in "a portion of a given protein") refers to fragments of that protein. The fragments may range in size from four consecutive amino acid residues to the entire amino acid sequence minus one amino acid.

The term "Southern blot," refers to the analysis of DNA on agarose or acrylamide gels to fractionate the DNA according to size followed by transfer of the DNA from the gel to a solid support, such as nitrocellulose or a nylon membrane. The immobilized DNA is then probed with a labeled probe to detect DNA species complementary to the probe used. The DNA may be cleaved with restriction enzymes prior to electrophoresis. Following electrophoresis, the DNA may be partially depurinated and denatured prior to or during transfer to the solid support. Southern blots are a standard tool of molecular biologists (J. Sambrook et al., *Molecular Cloning: A Laboratory Manual*, Cold Spring Harbor Press, NY, pp 9.31-9.58 [1989]).

The term "Western blot" refers to the analysis of protein(s) (or polypeptides) immobilized onto a support such as nitrocellulose or a membrane. The proteins are run on acrylamide gels to separate the proteins, followed by transfer of the protein from the gel to a solid support, such as nitrocellulose or a nylon membrane. The immobilized proteins are then exposed to antibodies with reactivity against an antigen of interest. The binding of the antibodies may be detected by various methods, including the use of labeled antibodies.

The term "test compound" refers to any chemical entity, pharmaceutical, drug, and the like that are tested in an assay (e.g., a drug screening assay) for any desired activity (e.g., including but not limited to, the ability to treat or prevent a disease, illness, sickness, or disorder of bodily function, or otherwise alter the physiological or cellular status of a sample). Test compounds comprise both known and potential therapeutic compounds. A test compound can be determined to be therapeutic by screening using the screening methods of the present invention. A "known therapeutic compound" refers to a therapeutic compound that has been shown (e.g., through animal trials or prior experience with administration to humans) to be effective in such treatment or prevention.

The term "sample" as used herein is used in its broadest sense. A sample suspected of containing a human chromosome or sequences associated with a human chromosome may comprise a cell, chromosomes isolated from a cell (e.g., a spread of metaphase chromosomes), genomic DNA (in solution or bound to a solid support such as for Southern blot analysis), RNA (in solution or bound to a solid support such as for Northern blot analysis), cDNA (in solution or bound to a solid support) and the like. A sample suspected of containing a protein may comprise a cell, a portion of a tissue, an extract containing one or more proteins and the like.

The term "label" as used herein refers to any atom or molecule that can be used to provide a detectable (preferably quantifiable) effect, and that can be attached to a nucleic acid or protein. Labels include but are not limited to dyes; radiolabels such as $^{32}P$; binding moieties such as biotin; haptens such as digoxygenin; luminogenic, phosphorescent or fluorogenic moieties; and fluorescent dyes alone or in combination with moieties that can suppress or shift emission spectra by fluorescence resonance energy transfer (FRET). Labels may provide signals detectable by fluorescence, radioactivity, colorimetry, gravimetry, X-ray diffraction or absorption, magnetism, enzymatic activity, and the like. A label may be a charged moiety (positive or negative charge) or alternatively, may be charge neutral. Labels can include or consist of nucleic acid or protein sequence, so long as the sequence comprising the label is detectable.

The term "signal" as used herein refers to any detectable effect, such as would be caused or provided by a label or an assay reaction.

As used herein, the term "detector" refers to a system or component of a system, e.g., an instrument (e.g. a camera, fluorimeter, charge-coupled device, scintillation counter, etc) or a reactive medium (X-ray or camera film, pH indicator, etc.), that can convey to a user or to another component of a system (e.g., a computer or controller) the presence of a signal or effect. A detector can be a photometric or spectrophotometric system, which can detect ultraviolet, visible or infrared light, including fluorescence or chemiluminescence; a radiation detection system; a spectroscopic system such as nuclear magnetic resonance spectroscopy, mass spectrometry or surface enhanced Raman spectrometry; a system such as gel or capillary electrophoresis or gel exclusion chromatography; or other detection system known in the art, or combinations thereof.

As used herein, the term "distribution system" refers to systems capable of transferring and/or delivering materials from one entity to another or one location to another. For example, a distribution system for transferring detection panels from a manufacturer or distributor to a user may comprise, but is not limited to, a packaging department, a mail room, and a mail delivery system. Alternately, the distribution system may comprise, but is not limited to, one or more delivery vehicles and associated delivery personnel, a display stand, and a distribution center. In some embodiments of the present invention interested parties (e.g., detection panel manufactures) utilize a distribution system to transfer detection panels to users at no cost, at a subsidized cost, or at a reduced cost.

As used herein, the term "at a reduced cost" refers to the transfer of goods or services at a reduced direct cost to the recipient (e.g. user). In some embodiments, "at a reduced cost" refers to transfer of goods or services at no cost to the recipient.

As used herein, the term "at a subsidized cost" refers to the transfer of goods or services, wherein at least a portion of the recipient's cost is deferred or paid by another party. In some embodiments, "at a subsidized cost" refers to transfer of goods or services at no cost to the recipient.

As used herein, the term "at no cost" refers to the transfer of goods or services with no direct financial expense to the recipient. For example, when detection panels are provided by a manufacturer or distributor to a user (e.g. research scientist) at no cost, the user does not directly pay for the tests.

The term "detection" as used herein refers to quantitatively or qualitatively identifying an analyte (e.g., DNA, RNA or a protein) within a sample. The term "detection assay" as used herein refers to a kit, test, or procedure performed for the purpose of detecting an analyte nucleic acid within a sample. Detection assays produce a detectable signal or effect when performed in the presence of the target analyte, and include but are not limited to assays incorporating the processes of hybridization, nucleic acid cleavage (e.g., exo- or endonuclease), nucleic acid amplification, nucleotide sequencing, primer extension, or nucleic acid ligation.

As used herein, the term "functional detection oligonucleotide" refers to an oligonucleotide that is used as a component of a detection assay, wherein the detection assay is capable of successfully detecting (i.e., producing a detectable signal) an intended target nucleic acid when the functional detection oligonucleotide provides the oligonucleotide component of the detection assay. This is in contrast to a non-functional detection oligonucleotides, which fail to produce a detectable signal in a detection assay for the particular target nucleic acid when the non-functional detection oligonucleotide is provided as the oligonucleotide component of the detection assay. Determining if an oligonucleotide is a functional oligonucleotide can be carried out experimentally by testing the oligonucleotide in the presence of the particular target nucleic acid using the detection assay.

As used herein, the term "derived from a different subject," such as samples or nucleic acids derived from a different subjects refers to a samples derived from multiple different individuals. For example, a blood sample comprising genomic DNA from a first person and a blood sample comprising genomic DNA from a second person are considered blood samples and genomic DNA samples that are derived from different subjects. A sample comprising five target nucleic acids derived from different subjects is a sample that includes at least five samples from five different individuals. However, the sample may further contain multiple samples from a given individual.

As used herein, the term "treating together", when used in reference to experiments or assays, refers to conducting experiments concurrently or sequentially, wherein the results of the experiments are produced, collected, or analyzed together (i.e., during the same time period). For example, a plurality of different target sequences located in separate wells of a multiwell plate or in different portions of a microarray are treated together in a detection assay where detection reactions are carried out on the samples simultaneously or sequentially and where the data collected from the assays is analyzed together.

The terms "assay data" and "test result data" as used herein refer to data collected from performance of an assay (e.g., to detect or quantitate a gene, SNP or an RNA). Test result data may be in any form, i.e., it may be raw assay data or analyzed assay data (e.g., previously analyzed by a different process). Collected data that has not been further processed or analyzed is referred to herein as "raw" assay data (e.g., a number corresponding to a measurement of signal, such as a fluorescence signal from a spot on a chip or a reaction vessel, or a number corresponding to measurement of a peak, such as peak height or area, as from, for example, a mass spectrometer, HPLC or capillary separation device), while assay data that has been processed through a further step or analysis (e.g., normalized, compared, or otherwise processed by a calculation) is referred to as "analyzed assay data" or "output assay data".

As used herein, the term "database" refers to collections of information (e.g., data) arranged for ease of retrieval, for example, stored in a computer memory. A "genomic information database" is a database comprising genomic information, including, but not limited to, polymorphism information (i.e., information pertaining to genetic polymorphisms), genome information (i.e., genomic information), linkage information (i.e., information pertaining to the physical location of a nucleic acid sequence with respect to another nucleic acid sequence, e.g., in a chromosome), and disease association information (i.e., information correlating the presence of or susceptibility to a disease to a physical trait of a subject, e.g., an allele of a subject). "Database information" refers to information to be sent to a databases, stored in a database, processed in a database, or retrieved from a database. "Sequence database information" refers to database information pertaining to nucleic acid sequences. As used herein, the term "distinct sequence databases" refers to two or more databases that contain different information than one another. For example, the dbSNP and GenBank databases are distinct sequence databases because each contains information not found in the other.

As used herein the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein, the term "hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

As used herein, the term "hypertext system" refers to a computer-based informational system in which documents (and possibly other types of data entities) are linked together via hyperlinks to form a user-navigable "web."

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein, the terms "World Wide Web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

As used herein, the term "web site" refers to a computer system that serves informational content over a network using the standard protocols of the World Wide Web. Typically, a Web site corresponds to a particular Internet domain name and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

As used herein, the term "HTML" refers to HyperText Markup Language that is a standard coding convention and set of codes for attaching presentation and linking attributes to informational content within documents. HTML is based on SGML, the Standard Generalized Markup Language. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally, in specifying how the Web browser is to display the document, HTML tags can be used to create links to other Web documents (commonly referred to as "hyperlinks").

As used herein, the term "XML" refers to Extensible Markup Language, an application profile that, like HTML, is based on SGML. XML differs from HTML in that: information providers can define new tag and attribute names at will; document structures can be nested to any level of complexity; any XML document can contain an optional description of its grammar for use by applications that need to perform structural validation. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure, to define constraints on the logical structure and to support the use of predefined storage units. A software module called an XML processor is used to read XML documents and provide access to their content and structure.

As used herein, the term "HTTP" refers to HyperText Transport Protocol that is the standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET, causes the server to return the document or file located at the specified URL.

As used herein, the term "URL" refers to Uniform Resource Locator that is a unique address that fully specifies the location of a file or other resource on the Internet. The general format of a URL is protocol://machine address:port/path/filename. The port specification is optional, and if none is entered by the user, the browser defaults to the standard port for whatever service is specified as the protocol. For example, if HTTP is specified as the protocol, the browser will use the HTTP default port of 80.

As used herein, the term "PUSH technology" refers to an information dissemination technology used to send data to users over a network. In contrast to the World Wide Web (a "pull" technology), in which the client browser should request a Web page before it is sent, PUSH protocols send the informational content to the user computer automatically, typically based on information pre-specified by the user.

As used herein, the term "communication network" refers to any network that allows information to be transmitted from one location to another. For example, a communication network for the transfer of information from one computer to another includes any public or private network that transfers information using electrical, optical, satellite transmission, and the like. Two or more devices that are part of a communication network such that they can directly or indirectly transmit information from one to the other are considered to be "in electronic communication" with one another. A computer network containing multiple computers may have a central computer ("central node") that processes information to one or more sub-computers that carry out specific tasks ("sub-nodes"). Some networks comprises computers that are in "different geographic locations" from one another, meaning that the computers are located in different physical locations (i.e., aren't physically the same computer, e.g., are located in different countries, states, cities, rooms, etc.).

As used herein, the term "detection assay component" refers to a component of a system capable of performing a detection assay. Detection assay components include, but are not limited to, hybridization probes, buffers, and the like.

As used herein, the term "a detection assays configured for target detection" refers to a collection of assay components that are capable of producing a detectable signal when carried out using the target nucleic acid. For example, a detection assay that has empirically been demonstrated to detect a particular single nucleotide polymorphism is considered a detection assay configured for target detection.

As used herein, the phrase "unique detection assay" refers to a detection assay that has a different collection of detection assay components in relation to other detection assays located on the same detection panel. A unique assay doesn't necessarily detect a different target (e.g. SNP) than other assays on the same detection panel, but it does have a least one difference in the collection of components used to detect a given target (e.g. a unique detection assay may employ a probe sequences that is shorter or longer in length than other assays on the same detection panel).

As used herein, the term "candidate" refers to an assay or analyte, e.g., a nucleic acid, suspected of having a particular feature or property. A "candidate sequence" refers to a nucleic acid suspected of comprising a particular sequence, while a "candidate oligonucleotide" refers to an oligonucleotide suspected of having a property such as comprising a particular sequence, or having the capability to hybridize to a target nucleic acid or to perform in a detection assay. A "candidate detection assay" refers to a detection assay that is suspected of being a valid detection assay.

As used herein, the term "detection panel" refers to a substrate or device containing at least two unique candidate detection assays configured for target detection.

As used herein, the term "valid detection assay" refers to a detection assay that has been shown to accurately predict an association between the detection of a target and a phenotype (e.g. medical condition). Examples of valid detection assays include, but are not limited to, detection assays that, when a target is detected, accurately predict the phenotype medical 95%, 96%, 97%, 98%, 99%, 99.5%, 99.8%, or 99.9% of the time. Other examples of valid detection assays include, but are not limited to, detection assays that quality as and/or are marketed as Analyte-Specific Reagents (i.e. as defined by FDA regulations) or In-Vitro Diagnostics (i.e. approved by the FDA).

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers) and/or supporting materials (e.g., buffers, written instructions for performing the assay etc.) from one location to another. For example, kits include one or more enclosures (e.g., boxes) containing the relevant reaction reagents and/or supporting materials. As used herein, the term "fragmented kit" refers to a delivery systems comprising two or more separate containers that each contain a subportion of the total kit components. The containers may be delivered to the intended recipient together or separately. For example, a first container may contain an enzyme for use in an assay, while a second container contains oligonucleotides. The term "fragmented kit" is intended to encompass kits containing Analyte specific reagents (ASR's) regulated under section 520(e) of the Federal Food, Drug, and Cosmetic Act, but are not limited thereto. Indeed, any delivery system comprising two or more separate containers that each contains a subportion of the total kit components are included in the term "fragmented kit." In contrast, a "combined kit" refers to a delivery system containing all of the components of a reaction assay in a single container (e.g., in a single box housing each of the desired components). The term "kit" includes both fragmented and combined kits.

As used herein, the term "information" refers to any collection of facts or data. In reference to information stored or processed using a computer system(s), including but not limited to internets, the term refers to any data stored in any format (e.g., analog, digital, optical, etc.). As used herein, the term "information related to a subject" refers to facts or data pertaining to a subject (e.g., a human, plant, or animal). The term "genomic information" refers to information pertaining to a genome including, but not limited to, nucleic acid sequences, genes, allele frequencies, RNA expression levels, protein expression, phenotypes correlating to genotypes, etc. "Allele frequency information" refers to facts or data pertaining allele frequencies, including, but not limited to, allele identities, statistical correlations between the presence of an allele and a characteristic of a subject (e.g., a human subject), the presence or absence of an allele in a individual or population, the percentage likelihood of an allele being present in an individual having one or more particular characteristics, etc.

As used herein, the term "assay validation information" refers to genomic information and/or allele frequency information resulting from processing of test result data (e.g. processing with the aid of a computer). Assay validation information may be used, for example, to identify a particular candidate detection assay as a valid detection assay.

DETAILED DESCRIPTION OF THE INVENTION

Since its introduction in 1988 (Chamberlain, et al. Nucleic Acids Res., 16:11141 (1988)), multiplex PCR has become a routine means of amplifying multiple genetic loci in a single reaction. This approach has found utility in a number of research, as well as clinical, applications. Multiplex PCR has been described for use in diagnostic virology (Elnifro, et al. Clinical Microbiology Reviews, 13: 559 (2000)), paternity testing (Hidding and Schmitt, Forensic Sci. Int., 113: 47 (2000); Bauer et al., Int. J. Legal Med. 116: 39 (2002)), preimplantation genetic diagnosis (Ouhibi, et al., Curr Womens Health Rep. 1: 138 (2001)), microbial analysis in environmental and food samples (Rudi et al., Int J Food Microbiology, 78: 171 (2002)), and veterinary medicine (Zarlenga and Higgins, Vet Parasitol. 101: 215 (2001)), among others. Most recently, expansion of genetic analysis to whole genome levels, particularly for single nucleotide polymorphisms, or SNPs, has created a need highly multiplexed PCR capabilities. Comparative genome-wide association and candidate gene studies require the ability to genotype between 100,000-500,000 SNPs per individual (Kwok, Molecular Medicine Today, 5: 538-5435 (1999); Kwok, Pharmacogenomics, 1: 231 (2000); Risch and Merikangas, Science, 273: 1516 (1996)). Moreover, SNPs in coding or regulatory regions alter gene function in important ways (Cargill et al. Nature Genetics, 22: 231 (1999); Halushka et al., Nature Genetics, 22: 239 (1999)), making these SNPs useful diagnostic tools in personalized medicine (Hagmann, Science, 285: 21 (1999); Cargill et al. Nature Genetics, 22: 231 (1999); Halushka et al., Nature Genetics, 22: 239 (1999)). Likewise, validating the medical association of a set of SNPs previously identified for their potential clinical relevance as part of a diagnostic panel will mean testing thousands of individuals for thousands of markers at a time.

Despite its broad appeal and utility, several factors complicate multiplex PCR amplification. Chief among these is the phenomenon of PCR or amplification bias, in which certain loci are amplified to a greater extent than others. Two classes of amplification bias have been described. One, referred to as PCR drift, is ascribed to stochastic variation in such steps as primer annealing during the early stages of the reaction (Polz and Cavanaugh, Applied and Environmental Microbiology, 64: 3724 (1998)), is not reproducible, and may be more prevalent when very small amounts of target molecules are being amplified (Walsh et al., PCR Methods and Applications, 1: 241 (1992)). The other, referred to as PCR selection, pertains to the preferential amplification of some loci based on primer characteristics, amplicon length, G-C content, and other properties of the genome (Polz, supra).

Another factor affecting the extent to which PCR reactions can be multiplexed is the inherent tendency of PCR reactions to reach a plateau phase. The plateau phase is seen in later PCR cycles and reflects the observation that amplicon generation moves from exponential to pseudo-linear accumulation and then eventually stops increasing. This effect appears to be due to non-specific interactions between the DNA polymerase and the double stranded products themselves. The molar ratio of product to enzyme in the plateau phase is typically consistent for several DNA polymerases, even when different amounts of enzyme are included in the reaction, and is approximately 30:1 product:enzyme. This effect thus limits the total amount of double-stranded product that can be generated in a PCR reaction such that the number of different loci amplified must be balanced against the total amount of each amplicon desired for subsequent analysis, e.g. by gel electrophoresis, primer extension, etc.

Because of these and other considerations, although multiplexed PCR including 50 loci has been reported (Lindblad-Toh et al, Nature Genet. 4: 381 (2000)), multiplexing is typically limited to fewer than ten distinct products. However, given the need to analyze as many as 100,000 to 450,000 SNPs from a single genomic DNA sample there is a clear need for a means of expanding the multiplexing capabilities of PCR reactions.

The present invention provides methods for substantial multiplexing of PCR reactions by, for example, combining the INVADER assay with multiplex PCR amplification. The INVADER assay provides a detection step and signal amplification that allows very large numbers of targets to be detected in a multiplex reaction. As desired, hundreds to thousands to hundreds of thousands of targets may be detected in a multiplex reaction.

Direct genotyping by the INVADER assay typically uses from 5 to 100 ng of human genomic DNA per SNP, depending on detection platform. For a small number of assays, the reactions can be performed directly with genomic DNA without target pre-amplification, however, with more than 100,000 INVADER assays being developed and even larger number expected for genome-wide association studies, the amount of sample DNA may become a limiting factor.

Because the INVADER assay provides from $10^6$ to $10^7$ fold amplification of signal, multiplexed PCR in combination with the INVADER assay would use only limited target amplification as compared to a typical PCR. Consequently, low target amplification level alleviates interference between individual reactions in the mixture and reduces the inhibition of PCR by it's the accumulation of its products, thus providing for more extensive multiplexing. Additionally, it is contemplated that low amplification levels decrease a probability of target cross-contamination and decrease the number of PCR-induced mutations.

Uneven amplification of different loci presents one of biggest challenges in the development of multiplexed PCR. Difference in amplification factors between two loci may result in a situation where the signal generated by an INVADER reaction with a slow-amplifying locus is below the limit of detection of the assay, while the signal from a fast-amplifying locus is beyond the saturation level of the assay. This problem can be addressed in several ways. In some embodiments, the INVADER reactions can be read at different time points, e.g., in real-time, thus significantly extending the dynamic range of the detection. In other embodiments, multiplex PCR can be performed under conditions that allow different loci to reach more similar levels of amplification. For example, primer concentrations can be limited, thereby allowing each locus to reach a more uniform level of amplification. In yet other embodiments, concentrations of PCR primers can be adjusted to balance amplification factors of different loci.

The present invention provides for the design and characteristics of highly multiplex PCR including hundreds to thousands of products in a single reaction. For example, the target pre-amplification provided by hundred-plex PCR reduces the amount of human genomic DNA required for INVADER-based SNP genotyping to less than 0.1 ng per assay. The specifics of highly multiplex PCR optimization and a computer program for the primer design are described below.

The following discussion provides a description of certain preferred illustrative embodiments of the present invention and is not intended to limit the scope of the present invention.

I. Multiplex PCR Primer Design

The INVADER assay can be used for the detection of single nucleotide polymorphisms (SNPs) with as little as 100-10 ng of genomic DNA without the need for target pre-amplification. However, with more than 50,000 INVADER assays being developed and the potential for whole genome association studies involving hundreds of thousands of SNPs, the amount of sample DNA becomes a limiting factor for large scale analysis. Due to the sensitivity of the INVADER assay on human genomic DNA (hgDNA) without target amplification, multiplex PCR coupled with the INVADER assay requires only limited target amplification ($10^3$-$10^4$) as compared to typical multiplex PCR reactions which require extensive amplification ($10^9$-$10^{12}$) for conventional gel detection methods. The low level of target amplification used for INVADER™ detection provides for more extensive multiplexing by avoiding amplification inhibition commonly resulting from target accumulation.

The present invention provides methods and selection criteria that allow primer sets for multiplex PCR to be generated (e.g. that can be coupled with a detection assay, such as the INVADER assay). In some embodiments, software applications of the present invention automated multiplex PCR primer selection, thus allowing highly multiplexed PCR with the primers designed thereby. Using the INVADER Medically Associated Panel (MAP) as a corresponding platform for SNP detection, as shown in example 2, the methods, software, and selection criteria of the present invention allowed accurate genotyping of 94 of the 101 possible amplicons (~93%) from a single PCR reaction. The original PCR reaction used only 10 ng of hgDNA as template, corresponding to less than 150 pg hgDNA per INVADER assay.

FIG. 1 described the general principles of the INVADER assay. The INVADER assay allows for the simultaneous detection of two distinct alleles in the same reaction using an isothermal, single addition format. (A) Allele discrimination takes place by "structure specific" cleavage of the Probe, releasing a 5' flap which corresponds to a given polymorphism. (B) In the second reaction, the released 5' flap mediates signal generation by cleavage of the appropriate FRET cassette.

FIG. 2 illustrates creation of one of the primer pairs (both a forward and reverse primer) for a 101 primer sets from sequences available for analysis on the INVADER Medically Associated Panel using one embodiment of the software application of the present invention. FIG. 2A shows a sample input file of a single entry (e.g. shows target sequence information for a single target sequence containing a SNP that is processed the method and software of the present invention). The target sequence information in FIG. 2 includes Third Wave Technologies's SNP#, short name identifier, and sequence with the SNP location indicated in brackets. FIG. 2B shows the sample output file of a the same entry (e.g. shows the target sequence after being processed by the systems and methods and software of the present invention. The output information includes the sequence of the footprint region (capital letters flanking SNP site, showing region where INVADER assay probes hybridize to this target sequence in order to detect the SNP in the target sequence), forward and reverse primer sequences (bold), and their corresponding Tm's.

In some embodiments, the selection of primers to make a primer set capable of multiplex PCR is performed in automated fashion (e.g. by a software application). Automated primer selection for multiplex PCR may be accomplished employing a software program designed as shown by the flow chart in FIG. 4A.

Multiplex PCR commonly requires extensive optimization to avoid biased amplification of select amplicons and the amplification of spurious products resulting from the formation of primer-dimers. In order to avoid these problems, the present invention provides methods and software application that provide selection criteria to generate a primer set configured for multiplex PCR, and subsequent use in a detection assay (e.g. INVADER detection assays).

Figure 4A:
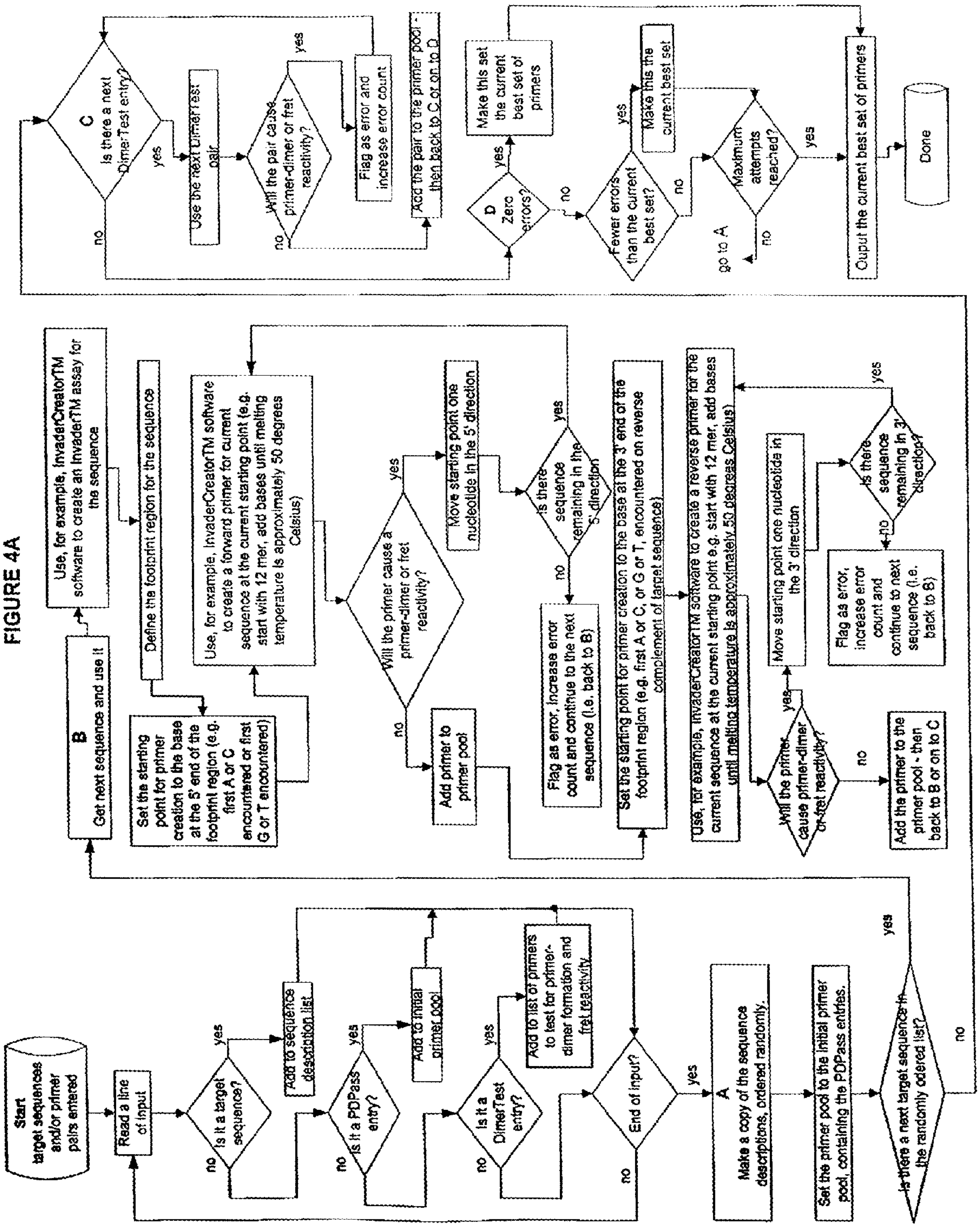
FIG. 4 shows a flow chart outlining the steps that may be performed in order to generated a primer set useful in multiplex PCR.

In some embodiments, the methods and software applications of the present invention start with user defined sequences and corresponding SNP locations. In certain embodiments, the methods and/or software application determines a footprint region within the target sequence (the minimal amplicon required for INVADER detection) for each sequence (shown in capital letters in FIG. 2B). The footprint region includes the region where assay probes hybridize, as well as any user defined additional bases extending outward therefore (e.g. 5 additional bases included on each side of where the assay probes hybridize). Next, primers are designed outward from the footprint region and evaluated against several criteria, including the potential for primer-dimer formation with previously designed primers in the current multiplexing set (See, primers in bold in FIG. 2A, and selection steps in FIG. 4A). This process may be continued, as shown in FIG. 4A, through multiple iterations of the same set of sequences until primers against all sequences in the current multiplexing set can be designed.

Once a primer set is designed for multiplex PCR, this set may be employed as shown in the basic workflow scheme shown in FIG. 3. Multiplex PCR may be carried out, for example, under standard conditions using only 10 ng of hgDNA as template. After 10 min at 95° C., Taq (2.5 units) may be added to a 50 ul reaction and PCR carried out for 50 cycles. The PCR reaction may be diluted and loaded directly onto an INVADER MAP plate (3 ul/well) (See FIG. 3). An additional 3 ul of 15 mM $MgCl_2$ may be added to each reaction on the INVADER MAP plate and covered with 6 ul of mineral oil. The entire plate may then be heated to 95° C. for 5 min. and incubated at 63° C. for 40 min. FAM and RED fluorescence may then be measured on a Cytofluor 4000 fluorescent plate reader and "Fold Over Zero" (FOZ) values calculated for each amplicon. Results from each SNP may be color coded in a table as "pass" (green), "mis-call" (pink), or "no-call" (white) (See, Example 2 below).

In some embodiments the number of PCR reactions is from about 1 to about 10 reactions. In some embodiments, the number of PCR reactions is from about 10 to about 50 reactions. In further embodiments, the number of PCR reactions is from about 50 to about 100. In additional embodiments, the number of PCR reactions is from about than 100 to 1,000. In still other embodiments, the number of PCR reactions is greater than 1,000.

The present invention also provides methods to optimize multiplex PCR reactions (e.g. once a primer set is generated, the concentration of each primer or primer pair may be optimized). For example, once a primer set has been generated and used in a multiplex PCR at equal molar concentrations, the primers may be evaluated separately such that the optimum primer concentration is determined such that the multiplex primer set performs better.

Multiplex PCR reactions are being recognized in the scientific, research, clinical and biotechnology industries as potentially time effective and less expensive means of obtaining nucleic acid information compared to standard, monoplex PCR reactions. Instead of performing only a single amplification reaction per reaction vessel (tube or well of a multiwell plate for example), numerous amplification reactions are performed in a single reaction vessel.

The cost per target is theoretically lowered by eliminating technician time in assay set-up and data analysis, and by the substantial reagent savings (especially enzyme cost). Another benefit of the multiplex approach is that far less target sample is required. In whole genome association studies involving hundreds of thousands of single nucleotide polymorphisms (SNPs), the amount of target or test sample is limiting for large scale analysis, so the concept of performing a single reaction, using one sample aliquot to obtain, for example, 100 results, versus using 100 sample aliquots to obtain the same data set is an attractive option.

To design primers for a successful multiplex PCR reaction, the issue of aberrant interaction among primers should be addressed. The formation of primer dimers, even if only a few bases in length, may inhibit both primers from correctly hybridizing to the target sequence. Further, if the dimers form at or near the 3' ends of the primers, no amplification or very low levels of amplification will occur, since the 3' end is required for the priming event. Clearly, the more primers utilized per multiplex reaction, the more aberrant primer interactions are possible. The methods, systems and applications of the present help prevent primer dimers in large sets of primers, making the set suitable for highly multiplexed PCR.

When designing primer pairs for numerous site (for example 100 sites in a multiplex PCR reaction), the order in which primer pairs are designed can influence the total number of compatible primer pairs for a reaction. For example, if a first set of primers is designed for a first target region that happens to be an A/T rich target region, these primer will be A/T rich. If the second target region chosen also happens to be an A/T rich target region, it is far more likely that the primers designed for these two sets will be incompatible due to aberrant interactions, such as primer dimers. If, however, the second target region chosen is not A/T rich, it is much more likely that a primer set can be designed that will not interact with the first A/T rich set. For any given set of input target sequences, the present invention randomizes the order in which primer sets are designed (See, FIG. 4A). Furthermore, in some embodiments, the present invention re-orders the set of input target sequences in a plurality of different, random orders to maximize the number of compatible primer sets for any given multiplex reaction (See, FIG. 4A).

The present invention provides criteria for primer design that minimize 3' interactions while maximizing the number of compatible primer pairs for a given set of reaction targets in a multiplex design. For primers described as 5'-N[x]-N[x−1]- . . . -N[4]-N[3]-N[2]-N[1]-3', N[l] is an A or C (in alternative embodiments, N[1] is a G or T). N[2]-N[1] of each of the forward and reverse primers designed should not be complementary to N[2]-N[1] of any other oligonucleotide. In certain embodiments, N[3]-N[2]-N[1] should not be complementary to N[3]-N[2]-N[1] of any other oligonucleotide. In preferred embodiments, if these criteria are not met at a given N[1], the next base in the 5' direction for the forward primer or the next base in the 3' direction for the reverse primer may be evaluated as an N[1] site. This process is repeated, in conjunction with the target randomization, until all criteria are met for all, or a large majority of, the targets sequences (e.g. 95% of target sequences can have primer pairs made for the primer set that fulfill these criteria).

Another challenge to be overcome in a multiplex primer design is the balance between actual, required nucleotide sequence, sequence length, and the oligonucleotide melting temperature (Tm) constraints. Importantly, since the primers in a multiplex primer set in a reaction should function under the same reaction conditions of buffer, salts and temperature, they need therefore to have substantially similar Tm's, regardless of GC or AT richness of the region of interest. The present invention allows for primer design which meet minimum Tm and maximum Tm requirements and minimum and maximum length requirements. For example, in the formula for each primer 5'-N[x]-N[x−1]- . . . -N[4]-N[3]-N[2]-N[1]-3', x is selected such the primer has a predetermined melting temperature (e.g. bases are included in the primer until the primer has a calculated melting temperature of about 50 degrees Celsius).

Often the products of a PCR reaction are used as the target material for another nucleic acid detection means, such as a hybridization-type detection assays, or the INVADER reaction assays for example. Consideration should be given to the location of primer placement to allow for the secondary reaction to successfully occur, and again, aberrant interactions between amplification primers and secondary reaction oligonucleotides should be minimized for accurate results and data. Selection criteria may be employed such that the primers designed for a multiplex primer set do not react (e.g. hybridize with, or trigger reactions) with oligonucleotide components of a detection assay. For example, in order to prevent primers from reacting with the FRET oligonucleotide of a bi-plex INVADER assay, certain homology criteria is employed. In particular, if each of the primers in the set are defined as 5'-N[x]-N[x−1]- . . . -N[4]-N[3]-N[2]-N[1]-3', then N[4]-N[3]-N[2]-N[1]-3' is selected such that it is less than 90% homologous with the FRET or INVADER oligonucleotides. In other embodiments, N[4]-N[3]-N[2]-N[1]-3' is selected for each primer such that it is less than 80% homologous with the FRET or INVADER oligonucleotides. In certain embodiments, N[4]-N[3]-N[2]-N[1]-3' is selected for each primer such that it is less than 70% homologous with the FRET or INVADER oligonucleotides.

While employing the criteria of the present invention to develop a primer set, some primer pairs may not meet all of the stated criteria (these may be rejected as errors). For example, in a set of 100 targets, 30 are designed and meet all listed criteria, however, set 31 fails. In the method of the present invention, set 31 may be flagged as failing, and the method could continue through the list of 100 targets, again flagging those sets which do not meet the criteria (See FIG. 4A). Once all 100 targets have had a chance at primer design, the method would note the number of failed sets, re-order the 100 targets in a new random order and repeat the design process (See, FIG. 4A). After a configurable number of runs, the set with the most passed primer pairs (the least number of failed sets) are chosen for the multiplex PCR reaction (See FIG. 4A).

FIG. 4A shows a flow chart with the basic flow of certain embodiments of the methods and software application of the present invention. In preferred embodiments, the processes detailed in FIG. 4A are incorporated into a software application for ease of use (although, the methods may also be performed manually using, for example, FIG. 4A as a guide).

Target sequences and/or primer pairs are entered into the system shown in FIG. 4A. The first set of boxes show how target sequences are added to the list of sequences that have a footprint determined (See "B" in FIG. 4A), while other sequences are passed immediately into the primer set pool (e.g. PDPass, those sequences that have been previously processed and shown to work together without forming Primer dimers or having reactivity to FRET sequences), as well as DimerTest entries (e.g. pair or primers a user wants to use, but that has not been tested yet for primer dimer or fret reactivity). In other words, the initial set of boxes leading up to "end of input" sort the sequences so they can be later processed properly.

Starting at "A" in FIG. 4A, the primer pool is basically cleared or "emptied" to start a fresh run. The target sequences are then sent to "B" to be processed, and DimerTest pairs are sent to "C" to be processed. Target sequences are sent to "B", where a user or software application determines the footprint region for the target sequence (e.g. where the assay probes will hybridize in order to detect the mutation (e.g. SNP) in the target sequence). This region is generally shown in capital letters in figures, such as FIG. 2B. It is important to design this region (which the user may further expand by defining that additional bases past the hybridization region be added) such that the primers that are designed fully encompass this region. In FIG. 4A, the software application INVADER CREATOR is used to design the INVADER oligonucleotide and downstream probes that will hybridize with the target region (although any type of program of system could be used to create any type of probes a user was interested in designing probes for, and thus determining the footprint region for on the target sequence). Thus the core footprint region is then defined by the location of these two assay probes on the target.

Next, the system starts from the 5' edge of the footprint and travels in the 5' direction until the first base is reached, or until the first A or C (or G or T) is reached. This is set as the initial starting point for defining the sequence of the forward primer (i.e. this serves as the initial N[1] site). From this initial N[1] site, the sequence of the primer for the forward primer is the same as those bases encountered on the target region. For example, if the default size of the primer is set as 12 bases, the system starts with the bases selected as N[1] and then adds the next 11 bases found in the target sequences. This 12-mer primer is then tested for a melting temperature (e.g. using INVADER CREATOR), and additional bases are added from the target sequence until the sequence has a melting temperature that is designated by the user as the default minimum and maximum melting temperatures (e.g. about 50 degrees Celsius, and not more than 55 degrees Celsius). For example, the system employs the formula 5'-N[x]-N[x−1] . . . -N[4]-N[3]-N[2]-N[1]-3', and x is initially 12. Then the system adjusts x to a higher number (e.g. longer sequences) until the pre-set melting temperature is found. In certain embodiments, a maximum primer size is employed as a default parameter to serve as an upper limit on the length of the primers designed. In some embodiments, the maximum primer size is about 30 bases (e.g. 29 bases, 30, bases, or 31 bases). On other embodiments, the default settings (e.g. minimum and maximum primer size, and minimum and maximum Tm) are able to be modified using standard database manipulation tools.

The next box in FIG. 4*a*, is used to determine if the primer that has been designed so far will cause primer-dimer and/or fret reactivity (e.g. with the other sequences already in the pool). The criteria used for this determination are explained above. If the primer passes this step, the forward primer is added to the primer pool. However, if the forward primer fails this criteria, as shown in FIG. 4A, the starting point (N[1] is moved) one nucleotide in the 5' direction (or to the next A or C, or next G or T). The system first checks to make sure shifting over leaves enough room on the target sequence to successfully make a primer. If yes, the system loops back and check this new primer for melting temperature. However, if no sequence can be designed, then the target sequence is flagged as an error (e.g. indicating that no forward primer can be made for this target).

This same process is then repeated for designing the reverse primer, as shown in FIG. 4A. If a reverse primer is successfully made, then the pair or primers is put into the primer pool, and the system goes back to "B" (if there are more target sequences to process), or goes onto "C" to test DimerTest pairs.

Starting a "C" in FIG. 4A shows how primer pairs that are entered as primers (DimerTest) are processed by the system. If there are no DimerTest pairs, as shown in FIG. 4*a*, the system goes on to "D". However, if there are DimerTest pairs, these are tested for primer-dimer and/or FRET reactivity as described above. If the DimerTest pair fails these criteria they are flagged as errors. If the DimerTest pair passes the criteria, they are added to the primer set pool, and then the system goes back to "C" if there are more DimerTest pairs to be evaluated, or or goes on to "D" if there are no more DimerTest pairs to be evaluated.

Starting at "D" in FIG. 4*a*, the pool of primers that has been created is evaluated. The first step in this section is to examine the number of error (failures) generated by this particular randomized run of sequences. If there were no errors, this set is the best set as maybe outputted to a user. If there are more than zero errors, the system compares this run to any other previous runs to see what run resulted in the fewest errors. If the current run has fewer errors, it is designated as the current best set. At this point, the system may go back to "A" to start the run over with another randomized set of the same sequences, or the pre-set maximum number of runs (e.g. 5 runs) may have been reached on this run (e.g. this was the 5th run, and the maximum number of runs was set as 5). If the maximum has been reached, then the best set is outputted as the best set. This best set of primers may then be used to generate as physical set of oligonucleotides such that a multiplex PCR reaction may be carried out.

Another challenge to be overcome with multiplex PCR reactions is the unequal amplicon concentrations that result in a standard multiplex reaction. The different loci targeted for amplification may each behave differently in the amplification reaction, yielding vastly different concentrations of each of the different amplicon products. The present invention provides methods, systems, software applications, computer systems, and a computer data storage medium that may be used to adjust primer concentrations relative to a first detection assay read (e.g. INVADER assay read), and then with balanced primer concentrations come close to substantially equal concentrations of different amplicons.

The concentrations for various primer pairs may be determined experimentally. In some embodiments, there is a first run conducted with all of the primers in equimolar concentrations. Time reads are then conducted. Based upon the time reads, the relative amplification factors for each amplicon are determined. Then based upon a unifying correction equation, an estimate of what the primer concentration should be obtained to get the signals closer within the same time point. These detection assays can be on an array of different sizes (384 well plates).

It is appreciated that combining the invention with detection assays and arrays of detection assays provides substantial processing efficiencies. Employing a balanced mix of primers or primer pairs created using the invention, a single point read can be carried out so that an average user can obtain great efficiencies in conducting tests that require high sensitivity and specificity across an array of different targets.

Having optimized primer pair concentrations in a single reaction vessel allows the user to conduct amplification for a plurality or multiplicity of amplification targets in a single reaction vessel and in a single step. The yield of the single step process is then used to successfully obtain test result data for, for example, several hundred assays. For example, each well on a 384 well plate can have a different detection assay thereon. The results of the single step mutliplex PCR reaction has amplified 384 different targets of genomic DNA, and provides you with 384 test results for each plate. Where each well has a plurality of assays even greater efficiencies can be obtained.

Therefore, the present invention provides the use of the concentration of each primer set in highly multiplexed PCR as a parameter to achieve an unbiased amplification of each PCR product. Any PCR includes primer annealing and primer extension steps. Under standard PCR conditions, high concentration of primers in the order of 1 uM ensures fast kinetics of primers annealing while the optimal time of the primer extension step depends on the size of the amplified product and can be much longer than the annealing step. By reducing primer concentration, the primer annealing kinetics can become a rate limiting step and PCR amplification factor should strongly depend on primer concentration, association rate constant of the primers, and the annealing time.

The binding of primer P with target T can be described by the following model:

$$P + T \xrightarrow{k_a} PT \qquad (1)$$

where $k_a$ is the association rate constant of primer annealing. We assume that the annealing occurs at the temperatures below primer melting and the reverse reaction can be ignored.

The solution for this kinetics under the conditions of a primer excess is well known:

$$[PT]=T_0(1-e^{-k_a ct}) \qquad (2)$$

where [PT] is the concentration of target molecules associated with primer, $T_0$ is initial target concentration, c is the initial primer concentration, and t is primer annealing time. Assuming that each target molecule associated with primer is replicated to produce full size PCR product, the target amplification factor in a single PCR cycle is $$Z=\frac{T_0+[PT]}{T_0}=2-e^{-k_a ct} \qquad (3)$$

The total PCR amplification factor after n cycles is given by $$F=Z^n=(2-e^{-k_a ct})^n \qquad (4)$$

As it follows from equation 4, under the conditions where the primer annealing kinetics is the rate limiting step of PCR, the amplification factor should strongly depend on primer concentration. Thus, biased loci amplification, whether it is caused by individual association rate constants, primer extension steps or any other factors, can be corrected by adjusting primer concentration for each primer set in the multiplex PCR. The adjusted primer concentrations can be also used to correct biased performance of INVADER assay used for analysis of PCR pre-amplified loci. Employing this basic principle, the present invention has demonstrated a linear relationship between amplification efficiency and primer concentration and used this equation to balance primer concentrations of different amplicons, resulting in the equal amplification of ten different amplicons in Example 1. This technique may be employed on any size set of multiplex primer pairs.

II. Detection Assay Design

The following section describes detection assays that may be employed with the present invention. For example, many different assays may be used to determine the footprint on the target nucleic sequence, and then used as the detection assay run on the output of the multiplex PCR (or the detection assays may be run simultaneously with the multiplex PCR reaction).

There are a wide variety of detection technologies available for determining the sequence of a target nucleic acid at one or more locations. For example, there are numerous technologies available for detecting the presence or absence of SNPs. Many of these techniques require the use of an oligonucleotide to hybridize to the target. Depending on the assay used, the oligonucleotide is then cleaved, elongated, ligated, disassociated, or otherwise altered, wherein its behavior in the assay is monitored as a means for characterizing the sequence of the target nucleic acid. A number of these technologies are described in detail, in Section IV, below.

The present invention provides systems and methods for the design of oligonucleotides for use in detection assays. In particular, the present invention provides systems and methods for the design of oligonucleotides that successfully hybridize to appropriate regions of target nucleic acids (e.g., regions of target nucleic acids that do not contain secondary structure) under the desired reaction conditions (e.g., temperature, buffer conditions, etc.) for the detection assay. The systems and methods also allow for the design of multiple different oligonucleotides (e.g., oligonucleotides that hybridize to different portions of a target nucleic acid or that hybridize to two or more different target nucleic acids) that all function in the detection assay under the same or substantially the same reaction conditions. These systems and methods may also be used to design control samples that work under the experimental reaction conditions.

While the systems and methods of the present invention are not limited to any particular detection assay, the following description illustrates the invention when used in conjunction with the INVADER assay (Third Wave Technologies, Madison Wis.; See e.g., U.S. Pat. Nos. 5,846,717, 5,985,557, 5,994,069, and 6,001,567, PCT Publications WO 97/27214 and WO 98/42873, and de Arruda et al., Expert. Rev. Mol. Diagn. 2(5), 487-496 (2002), all of which are incorporated herein by reference in their entireties) to detect a SNP. The INVADER assay provides ease-of-use and sensitivity levels that, when used in conjunction with the systems and methods of the present invention, find use in detection panels, ASRs, and clinical diagnostics. One skilled in the art will appreciate that specific and general features of this illustrative example are generally applicable to other detection assays.

A. INVADER Assay

The INVADER assay provides means for forming a nucleic acid cleavage structure that is dependent upon the presence of a target nucleic acid and cleaving the nucleic acid cleavage structure so as to release distinctive cleavage products. 5' nuclease activity, for example, is used to cleave the target-dependent cleavage structure and the resulting cleavage products are indicative of the presence of specific target nucleic acid sequences in the sample. When two strands of nucleic acid, or oligonucleotides, both hybridize to a target nucleic acid strand such that they form an overlapping invasive cleavage structure, as described below, invasive cleavage can occur. Through the interaction of a cleavage agent (e.g., a 5' nuclease) and the upstream oligonucleotide, the cleavage agent can be made to cleave the downstream oligonucleotide at an internal site in such a way that a distinctive fragment is produced.

The INVADER assay provides detections assays in which the target nucleic acid is reused or recycled during multiple rounds of hybridization with oligonucleotide probes and cleavage of the probes without the need to use temperature cycling (i.e., for periodic denaturation of target nucleic acid strands) or nucleic acid synthesis (i.e., for the polymerization-based displacement of target or probe nucleic acid strands). When a cleavage reaction is run under conditions in which the probes are continuously replaced on the target strand (e.g. through probe-probe displacement or through an equilibrium between probe/target association and disassociation, or through a combination comprising these mechanisms, (Reynaldo, et al., J. Mol. Biol. 97: 511-520 [2000]), multiple probes can hybridize to the same target, allowing multiple cleavages, and the generation of multiple cleavage products.

B. Oligonucleotide Design for the INVADER assay

In some embodiments where an oligonucleotide is designed for use in the INVADER assay to detect a SNP, the sequence(s) of interest are entered into the INVADERCREATOR program (Third Wave Technologies, Madison, Wis.). As described above, sequences may be input for analysis from any number of sources, either directly into the computer hosting the INVADERCREATOR program, or via a remote computer linked through a communication network (e.g., a LAN, Intranet or Internet network). The program designs probes for both the sense and antisense strand. Strand selection is generally based upon the ease of synthesis, minimization of secondary structure formation, and manufacturability. In some embodiments, the user chooses the strand for sequences to be designed for. In other embodiments, the software automatically selects the strand. By incorporating thermodynamic parameters for optimum probe cycling and signal generation (Allawi and SantaLucia, Biochemistry, 36:10581 [1997]), oligonucleotide probes may be designed to operate at a pre-selected assay temperature (e.g., 63° C.). Based on these criteria, a final probe set (e.g., primary probes for 2 alleles and an INVADER oligonucleotide) is selected.

In some embodiments, the INVADERCREATOR system is a web-based program with secure site access that contains a link to BLAST (available at the National Center for Biotechnology Information, National Library of Medicine, National Institutes of Health website) and that can be linked to RNAstructure (Mathews et al., RNA 5:1458 [1999]), a software program that incorporates mfold (Zuker, Science, 244:48 [1989]). RNAstructure tests the proposed oligonucleotide designs generated by INVADERCREATOR for potential uni- and bimolecular complex formation. INVADERCREATOR is open database connectivity (ODBC)-compliant and uses the Oracle database for export/integration. The INVADERCREATOR system was configured with Oracle to work well with UNIX systems, as most genome centers are UNIX-based.

In some embodiments, the INVADERCREATOR analysis is provided on a separate server (e.g., a Sun server) so it can handle analysis of large batch jobs. For example, a customer can submit up to 2,000 SNP sequences in one email. The server passes the batch of sequences on to the INVADERCREATOR software, and, when initiated, the program designs detection assay oligonucleotide sets. In some embodiments, probe set designs are returned to the user within 24 hours of receipt of the sequences.

Each INVADER reaction includes at least two target sequence-specific, unlabeled oligonucleotides for the primary reaction: an upstream INVADER oligonucleotide and a downstream Probe oligonucleotide. The INVADER oligonucleotide is generally designed to bind stably at the reaction temperature, while the probe is designed to freely associate and disassociate with the target strand, with cleavage occurring only when an uncut probe hybridizes adjacent to an overlapping INVADER oligonucleotide. In some embodiments, the probe includes a 5' flap or "arm" that is not complementary to the target, and this flap is released from the probe when cleavage occurs. In some embodiments, the released flap participates as an INVADER oligonucleotide in a secondary reaction.

The following discussion provides one example of how a user interface for an INVADERCREATOR program may be configured.

The user opens a work screen (FIG. 8), e.g., by clicking on an icon on a desktop display of a computer (e.g., a Windows desktop). The user enters information related to the target sequence for which an assay is to be designed. In some embodiments, the user enters a target sequence. In other embodiments, the user enters a code or number that causes retrieval of a sequence from a database. In still other embodiments, additional information may be provided, such as the user's name, an identifying number associated with a target sequence, and/or an order number. In preferred embodiments, the user indicates (e.g. via a check box or drop down menu) that the target nucleic acid is DNA or RNA. In other preferred embodiments, the user indicates the species from which the nucleic acid is derived. In particularly preferred embodiments, the user indicates whether the design is for monoplex (i.e., one target sequence or allele per reaction) or multiplex (i.e., multiple target sequences or alleles per reaction) detection. When the requisite choices and entries are complete, the user starts the analysis process. In one embodiment, the user clicks a "Go Design It" button to continue.

In some embodiments, the software validates the field entries before proceeding. In some embodiments, the software verifies that any required fields are completed with the appropriate type of information. In other embodiments, the software verifies that the input sequence meets selected requirements (e.g., minimum or maximum length, DNA or RNA content). If entries in any field are not found to be valid, an error message or dialog box may appear. In preferred embodiments, the error message indicates which field is incomplete and/or incorrect. Once a sequence entry is verified, the software proceeds with the assay design.

In some embodiments, the information supplied in the order entry fields specifies what type of design will be created. In preferred embodiments, the target sequence and multiplex check box specify which type of design to create. Design options include but are not limited to SNP assay, Multiplexed SNP assay (e.g., wherein probe sets for different alleles are to be combined in a single reaction), Multiple SNP assay (e.g., wherein an input sequence has multiple sites of variation for which probe sets are to be designed), and Multiple Probe Arm assays.

In some embodiments, the INVADERCREATOR software is started via a Web Order Entry (WebOE) process (i.e., through an Intra/Internet browser interface) and these parameters are transferred from the WebOE via applet <param> tags, rather than entered through menus or check boxes.

In the case of Multiple SNP Designs, the user chooses two or more designs to work with. In some embodiments, this selection opens a new screen view (e.g., a Multiple SNP Design Selection view FIG. 9). In some embodiments, the software creates designs for each locus in the target sequence, scoring each, and presents them to the user in this screen view. The user can then choose any two designs to work with. In some embodiments, the user chooses a first and second design (e.g., via a menu or buttons) and clicks a "Go Design It" button to continue.

To select a probe sequence that will perform optimally at a pre-selected reaction temperature, the melting temperature ($T_m$) of the SNP to be detected is calculated using the nearest-neighbor model and published parameters for DNA duplex formation (Allawi and SantaLucia, Biochemistry, 36:10581 [1997]). In embodiments wherein the target strand is RNA, parameters appropriate for RNA/DNA heteroduplex formation may be used. Because the assay's salt concentrations are often different than the solution conditions in which the nearest-neighbor parameters were obtained (1M NaCl and no divalent metals), and because the presence and concentration of the enzyme influence optimal reaction temperature, an adjustment should be made to the calculated $T_m$ to determine the optimal temperature at which to perform a reaction. One way of compensating for these factors is to vary the value provided for the salt concentration within the melting temperature calculations. This adjustment is termed a 'salt correction'. As used herein, the term "salt correction" refers to a variation made in the value provided for a salt concentration for the purpose of reflecting the effect on a $T_m$ calculation for a nucleic acid duplex of a non-salt parameter or condition affecting said duplex. Variation of the values provided for the strand concentrations will also affect the outcome of these calculations. By using a value of 0.5 M NaCl (SantaLucia, Proc Natl Acad Sci USA, 95:1460 [1998]) and strand concentrations of about 1 mM of the probe and 1 fM target, the algorithm for used for calculating probe-target melting temperature has been adapted for use in predicting optimal INVADER assay reaction temperature. For a set of 30 probes, the average deviation between optimal assay temperatures calculated by this method and those experimentally determined is about 1.5° C.

The length of the downstream probe to a given SNP is defined by the temperature selected for running the reaction (e.g., 63° C.). Starting from the position of the variant nucleotide on the target DNA (the target base that is paired to the probe nucleotide 5' of the intended cleavage site), and adding on the 3' end, an iterative procedure is used by which the length of the target-binding region of the probe is increased by one base pair at a time until a calculated optimal reaction temperature ($T_m$ plus salt correction to compensate for enzyme effect) matching the desired reaction temperature is reached. The non-complementary arm of the probe is preferably selected to allow the secondary reaction to cycle at the same reaction temperature. The entire probe oligonucleotide is screened using programs such as mfold (Zuker, Science, 244: 48 [1989]) or Oligo 5.0 (Rychlik and Rhoads, Nucleic Acids Res, 17: 8543 [1989]) for the possible formation of dimer complexes or secondary structures that could interfere with the reaction. The same principles are also followed for INVADER oligonucleotide design. Briefly, starting from the position N on the target DNA, the 3' end of the INVADER oligonucleotide is designed to have a nucleotide not complementary to either allele suspected of being contained in the sample to be tested. The mismatch does not adversely affect cleavage (Lyamichev et al., Nature Biotechnology, 17: 292 [1999]), and it can enhance probe cycling, presumably by minimizing coaxial stabilization effects between the two probes. Additional residues complementary to the target DNA starting from residue N-1 are then added in the 5' direction until the stability of the INVADER oligonucleotide-target hybrid exceeds that of the probe (and therefore the planned assay reaction temperature), generally by 15-20° C.

It is one aspect of the assay design that the all of the probe sequences may be selected to allow the primary and secondary reactions to occur at the same optimal temperature, so that the reaction steps can run simultaneously. In an alternative embodiment, the probes may be designed to operate at different optimal temperatures, so that the reaction steps are not simultaneously at their temperature optima.

In some embodiments, the software provides the user an opportunity to change various aspects of the design including but not limited to: probe, target and INVADER oligonucleotide temperature optima and concentrations; blocking groups; probe arms; dyes, capping groups and other adducts; individual bases of the probes and targets (e.g., adding or deleting bases from the end of targets and/or probes, or changing internal bases in the INVADER and/or probe and/or target oligonucleotides). In some embodiments, changes are made by selection from a menu. In other embodiments, changes are entered into text or dialog boxes. In preferred embodiments, this option opens a new screen (e.g., a Designer Worksheet view, FIG. 10).

In some embodiments, the software provides a scoring system to indicate the quality (e.g., the likelihood of performance) of the assay designs. In one embodiment, the scoring system includes a starting score of points (e.g., 100 points) wherein the starting score is indicative of an ideal design, and wherein design features known or suspected to have an adverse affect on assay performance are assigned penalty values. Penalty values may vary depending on assay parameters other than the sequences, including but not limited to the type of assay for which the design is intended (e.g., monoplex, multiplex) and the temperature at which the assay reaction will be performed. The following example provides an illustrative scoring criteria for use with some embodiments of the INVADER assay based on an intelligence defined by experimentation. Examples of design features that may incur score penalties include but are not limited to the following (penalty values are indicated in brackets, first number is for lower temperature assays (e.g., 62-64° C.), second is for higher temperature assays (e.g., 65-66° C.)]:

1. [100:100] 3' end of INVADER oligonucleotide resembles the probe arm:

| ARM SEQUENCE: | | PENALTY AWARDED IF IF INVADER ENDS IN: |
|---|---|---|
| Arm 1: CGCGCCGAGG | (SEQ ID NO: 753) | 5' GAGGX or 5' GAGGXX |
| Arm 2: ATGACGTGGCAGAC | (SEQ ID NO: 754) | 5' CAGACX or 5' CAGACXX |
| Arm 3: ACGGACGCGGAG | (SEQ ID NO: 755) | 5' GGAGX or 5' GGAGXX |
| Arm 4: TCCGCGCGTCC | (SEQ ID NO: 756) | 5' GTCCX or 5' GTCCXX |

2. [70:70] a probe has 5-base stretch (i.e., 5 of the same base in a row) containing the polymorphism;

3. [60:60] a probe has 5-base stretch adjacent to the polymorphism;

4. [50:50] a probe has 5-base stretch one base from the polymorphism;

5. [40:40] a probe has 5-base stretch two bases from the polymorphism;

6. [50:50] probe 5-base stretch is of Gs—additional penalty;

7. [100:100] a probe has 6-base stretch anywhere;

8. [90:90] a two or three base sequence repeats at least four times;

9. [100:100] a degenerate base occurs in a probe;

10. [60:90] probe hybridizing region is short (13 bases or less for designs 65-67° C.; 12 bases or less for designs 62-64° C.)

11. [40:90] probe hybridizing region is long (29 bases or more for designs 65-67° C., 28 bases or more for designs 62-64° C.)

12. [5:5] probe hybridizing region length—per base additional penalty

13. [80:80] Ins/Del design with poor discrimination in first 3 bases after probe arm 14. [100:100] calculated INVADER oligonucleotide Tm within 7.5° C. of probe target Tm (designs 65-67° C. with INVADER oligonucleotide less than ≦70.5° C., designs 62-64° C. with INVADER oligonucleotide ≦69.5° C.

15. [20:20] calculated probes Tms differ by more than 2.0° C.

16. [100:100] a probe has calculated Tm 2° C. less than its target Tm

17. [10:10] target of one strand 8 bases longer than that of other strand

18. [30:30] INVADER oligonucleotide has 6-base stretch anywhere—initial penalty

19. [70:70] INVADER oligonucleotide 6-base stretch is of Gs—additional penalty

20. [15:15] probe hybridizing region is 14, 15 or 24-28 bases long (65-67° C.) or 13,14 or 26,27 bases long (62-64° C.)

21. [15:15] a probe has a 4-base stretch of Gs containing the polymorphism

In particularly preferred embodiments, temperatures for each of the oligonucleotides in the designs are recomputed and scores are recomputed as changes are made. In some embodiments, score descriptions can be seen by clicking a "descriptions" button. In some embodiments, a BLAST search option is provided. In preferred embodiments, a BLAST search is done by clicking a "BLAST Design" button. In some embodiments, this action brings up a dialog box describing the BLAST process. In preferred embodiments, the BLAST search results are displayed as a highlighted design on a Designer Worksheet.

In some embodiments, a user accepts a design by clicking an "Accept" button. In other embodiments, the program approves a design without user intervention. In preferred embodiments, the program sends the approved design to a next process step (e.g., into production; into a file or database). In some embodiments, the program provides a screen view (e.g., an Output Page, FIG. 11), allowing review of the final designs created and allowing notes to be attached to the design. In preferred embodiments, the user can return to the Designer Worksheet (e.g., by clicking a "Go Back" button) or can save the design (e.g., by clicking a "Save It" button) and continue (e.g., to submit the designed oligonucleotides for production).

In some embodiments, the program provides an option to create a screen view of a design optimized for printing (e.g., a text-only view) or other export (e.g., an Output view, FIG. 12). In preferred embodiments, the Output view provides a description of the design particularly suitable for printing, or for exporting into another application (e.g., by copying and pasting into another application). In particularly preferred embodiments, the Output view opens in a separate window.

The present invention is not limited to the use of the INVADERCREATOR software. Indeed, a variety of software programs are contemplated and are commercially available, including, but not limited to GCG Wisconsin Package (Genetics computer Group, Madison, Wis.) and Vector NTI (Informax, Rockville, Md.). Other detection assays may be used in the present invention.

1. Direct Sequencing Assays

In some embodiments of the present invention, variant sequences are detected using a direct sequencing technique. In these assays, DNA samples are first isolated from a subject using any suitable method. In some embodiments, the region of interest is cloned into a suitable vector and amplified by growth in a host cell (e.g., a bacteria). In other embodiments, DNA in the region of interest is amplified using PCR.

Following amplification, DNA in the region of interest (e.g., the region containing the SNP or mutation of interest) is sequenced using any suitable method, including but not limited to manual sequencing using radioactive marker nucleotides, or automated sequencing. The results of the sequencing are displayed using any suitable method. The sequence is examined and the presence or absence of a given SNP or mutation is determined.

2. PCR Assay

In some embodiments of the present invention, variant sequences are detected using a PCR-based assay. In some embodiments, the PCR assay comprises the use of oligonucleotide primers that hybridize only to the variant or wild type allele (e.g., to the region of polymorphism or mutation). Both sets of primers are used to amplify a sample of DNA. If only the mutant primers result in a PCR product, then the patient has the mutant allele. If only the wild-type primers result in a PCR product, then the patient has the wild type allele.

3. Fragment Length Polymorphism Assays

In some embodiments of the present invention, variant sequences are detected using a fragment length polymorphism assay. In a fragment length polymorphism assay, a unique DNA banding pattern based on cleaving the DNA at a series of positions is generated using an enzyme (e.g., a restriction enzyme or a CLEAVASE I [Third Wave Technologies, Madison, Wis.] enzyme). DNA fragments from a sample containing a SNP or a mutation will have a different banding pattern than wild type.

a. RFLP Assay

In some embodiments of the present invention, variant sequences are detected using a restriction fragment length polymorphism assay (RFLP). The region of interest is first isolated using PCR. The PCR products are then cleaved with restriction enzymes known to give a unique length fragment for a given polymorphism. The restriction-enzyme digested PCR products are generally separated by gel electrophoresis and may be visualized by ethidium bromide staining. The length of the fragments is compared to molecular weight markers and fragments generated from wild-type and mutant controls.

b. CFLP Assay

In other embodiments, variant sequences are detected using a CLEAVASE fragment length polymorphism assay (CFLP; Third Wave Technologies, Madison, Wis.; See e.g., U.S. Pat. Nos. 5,843,654; 5,843,669; 5,719,208; and 5,888,780; each of which is herein incorporated by reference). This assay is based on the observation that when single strands of DNA fold on themselves, they assume higher order structures that are highly individual to the precise sequence of the DNA molecule. These secondary structures involve partially duplexed regions of DNA such that single stranded regions are juxtaposed with double stranded DNA hairpins. The CLEAVASE I enzyme, is a structure-specific, thermostable nuclease that recognizes and cleaves the junctions between these single-stranded and double-stranded regions.

The region of interest is first isolated, for example, using PCR. In preferred embodiments, one or both strands are labeled. Then, DNA strands are separated by heating. Next, the reactions are cooled to allow intrastrand secondary structure to form. The PCR products are then treated with the CLEAVASE I enzyme to generate a series of fragments that are unique to a given SNP or mutation. The CLEAVASE enzyme treated PCR products are separated and detected (e.g., by denaturing gel electrophoresis) and visualized (e.g., by autoradiography, fluorescence imaging or staining). The length of the fragments is compared to molecular weight markers and fragments generated from wild-type and mutant controls.

4. Hybridization Assays

In preferred embodiments of the present invention, variant sequences are detected a hybridization assay. In a hybridization assay, the presence of absence of a given SNP or mutation is determined based on the ability of the DNA from the sample to hybridize to a complementary DNA molecule (e.g., a oligonucleotide probe). A variety of hybridization assays using a variety of technologies for hybridization and detection are available. A description of a selection of assays is provided below.

a. Direct Detection of Hybridization

In some embodiments, hybridization of a probe to the sequence of interest (e.g., a SNP or mutation) is detected directly by visualizing a bound probe (e.g., a Northern or Southern assay; See e.g., Ausabel et al. (eds.), Current Protocols in Molecular Biology, John Wiley & Sons, NY [1991]). In a these assays, genomic DNA (Southern) or RNA (Northern) is isolated from a subject. The DNA or RNA is then cleaved with a series of restriction enzymes that cleave infrequently in the genome and not near any of the markers being assayed. The DNA or RNA is then separated (e.g., on an agarose gel) and transferred to a membrane. A labeled (e.g., by incorporating a radionucleotide) probe or probes specific for the SNP or mutation being detected is allowed to contact the membrane under a condition or low, medium, or high stringency conditions. Unbound probe is removed and the presence of binding is detected by visualizing the labeled probe.

b. Detection of Hybridization Using "DNA Chip" Assays

In some embodiments of the present invention, variant sequences are detected using a DNA chip hybridization assay. In this assay, a series of oligonucleotide probes are affixed to a solid support. The oligonucleotide probes are designed to be unique to a given SNP or mutation. The DNA sample of interest is contacted with the DNA "chip" and hybridization is detected.

In some embodiments, the DNA chip assay is a GeneChip (Affymetrix, Santa Clara, Calif.; See e.g., U.S. Pat. Nos. 6,045,996; 5,925,525; and 5,858,659; each of which is herein incorporated by reference) assay. The GeneChip technology uses miniaturized, high-density arrays of oligonucleotide probes affixed to a "chip." Probe arrays are manufactured by Affymetrix's light-directed chemical synthesis process, which combines solid-phase chemical synthesis with photolithographic fabrication techniques employed in the semiconductor industry. Using a series of photolithographic masks to define chip exposure sites, followed by specific chemical synthesis steps, the process constructs high-density arrays of oligonucleotides, with each probe in a predefined position in the array. Multiple probe arrays are synthesized simultaneously on a large glass wafer. The wafers are then diced, and individual probe arrays are packaged in injection-molded plastic cartridges, which protect them from the environment and serve as chambers for hybridization.

The nucleic acid to be analyzed is isolated, amplified by PCR, and labeled with a fluorescent reporter group. The labeled DNA is then incubated with the array using a fluidics station. The array is then inserted into the scanner, where patterns of hybridization are detected. The hybridization data are collected as light emitted from the fluorescent reporter groups already incorporated into the target, which is bound to the probe array. Probes that perfectly match the target generally produce stronger signals than those that have mismatches. Since the sequence and position of each probe on the array are known, by complementarity, the identity of the target nucleic acid applied to the probe array can be determined.

In other embodiments, a DNA microchip containing electronically captured probes (Nanogen, San Diego, Calif.) is utilized (See e.g., U.S. Pat. Nos. 6,017,696; 6,068,818; and 6,051,380; each of which are herein incorporated by reference). Through the use of microelectronics, Nanogen's technology enables the active movement and concentration of charged molecules to and from designated test sites on its semiconductor microchip. DNA capture probes unique to a given SNP or mutation are electronically placed at, or "addressed" to, specific sites on the microchip. Since DNA has a strong negative charge, it can be electronically moved to an area of positive charge.

First, a test site or a row of test sites on the microchip is electronically activated with a positive charge. Next, a solution containing the DNA probes is introduced onto the microchip. The negatively charged probes rapidly move to the positively charged sites, where they concentrate and are chemically bound to a site on the microchip. The microchip is then washed and another solution of distinct DNA probes is added until the array of specifically bound DNA probes is complete.

A test sample is then analyzed for the presence of target DNA molecules by determining which of the DNA capture probes hybridize, with complementary DNA in the test sample (e.g., a PCR amplified gene of interest). An electronic charge is also used to move and concentrate target molecules to one or more test sites on the microchip. The electronic concentration of sample DNA at each test site promotes rapid hybridization of sample DNA with complementary capture probes (hybridization may occur in minutes). To remove any unbound or nonspecifically bound DNA from each site, the polarity or charge of the site is reversed to negative, thereby forcing any unbound or nonspecifically bound DNA back into solution away from the capture probes. A laser-based fluorescence scanner is used to detect binding, In still further embodiments, an array technology based upon the segregation of fluids on a flat surface (chip) by differences in surface tension (ProtoGene, Palo Alto, Calif.) is utilized (See e.g., U.S. Pat. Nos. 6,001,311; 5,985,551; and 5,474,796; each of which is herein incorporated by reference). Protogene's technology is based on the fact that fluids can be segregated on a flat surface by differences in surface tension that have been imparted by chemical coatings. Once so segregated, oligonucleotide probes are synthesized directly on the chip by ink-jet printing of reagents. The array with its reaction sites defined by surface tension is mounted on a X/Y translation stage under a set of four piezoelectric nozzles, one for each of the four standard DNA bases. The translation stage moves along each of the rows of the array and the appropriate reagent is delivered to each of the reaction site. For example, the A amidite is delivered only to the sites where amidite A is to be coupled during that synthesis step and so on. Common reagents and washes are delivered by flooding the entire surface and then removing them by spinning.

DNA probes unique for the SNP or mutation of interest are affixed to the chip using Protogene's technology. The chip is then contacted with the PCR-amplified genes of interest. Following hybridization, unbound DNA is removed and hybridization is detected using any suitable method (e.g., by fluorescence de-quenching of an incorporated fluorescent group).

In yet other embodiments, a "bead array" is used for the detection of polymorphisms (Illumina, San Diego, Calif.; See e.g., PCT Publications WO 99/67641 and WO 00/39587, each of which is herein incorporated by reference). Illumina uses a BEAD ARRAY technology that combines fiber optic bundles and beads that self-assemble into an array. Each fiber optic bundle contains thousands to millions of individual fibers depending on the diameter of the bundle. The beads are coated with an oligonucleotide specific for the detection of a given SNP or mutation. Batches of beads are combined to form a pool specific to the array. To perform an assay, the BEAD ARRAY is contacted with a prepared subject sample (e.g., DNA). Hybridization is detected using any suitable method.

c. Enzymatic Detection of Hybridization

In some embodiments of the present invention, hybridization is detected by enzymatic cleavage of specific structures (INVADER assay, Third Wave Technologies; See e.g., U.S. Pat. Nos. 5,846,717, 6,090,543; 6,001,567; 5,985,557; and 5,994,069; each of which is herein incorporated by reference). The INVADER assay detects specific DNA and RNA sequences by using structure-specific enzymes to cleave a complex formed by the hybridization of overlapping oligonucleotide probes. Elevated temperature and an excess of one of the probes enable multiple probes to be cleaved for each target sequence present without temperature cycling. These cleaved probes then direct cleavage of a second labeled probe. The secondary probe oligonucleotide can be 5'-end labeled with a fluorescent dye that is quenched by a second dye or other quenching moiety. Upon cleavage, the de-quenched dye-labeled product may be detected using a standard fluorescence plate reader, or an instrument configured to collect fluorescence data during the course of the reaction (i.e., a "real-time" fluorescence detector, such as an ABI 7700 Sequence Detection System, Applied Biosystems, Foster City, Calif.).

The INVADER assay detects specific mutations and SNPs in unamplified genomic DNA. In an embodiment of the INVADER assay used for detecting SNPs in genomic DNA, two oligonucleotides (a primary probe specific either for a SNP/mutation or wild type sequence, and an INVADER oligonucleotide) hybridize in tandem to the genomic DNA to form an overlapping structure. A structure-specific nuclease enzyme recognizes this overlapping structure and cleaves the primary probe. In a secondary reaction, cleaved primary probe combines with a fluorescence-labeled secondary probe to create another overlapping structure that is cleaved by the enzyme. The initial and secondary reactions can run concurrently in the same vessel. Cleavage of the secondary probe is detected by using a fluorescence detector, as described above. The signal of the test sample may be compared to known positive and negative controls.

In some embodiments, hybridization of a bound probe is detected using a TaqMan assay (PE Biosystems, Foster City, Calif.; See e.g., U.S. Pat. Nos. 5,962,233 and 5,538,848, each of which is herein incorporated by reference). The assay is performed during a PCR reaction. The TaqMan assay exploits the 5'-3' exonuclease activity of DNA polymerases such as AMPLITAQ DNA polymerase. A probe, specific for a given allele or mutation, is included in the PCR reaction. The probe consists of an oligonucleotide with a 5'-reporter dye (e.g., a fluorescent dye) and a 3'-quencher dye. During PCR, if the probe is bound to its target, the 5'-3' nucleolytic activity of the AMPLITAQ polymerase cleaves the probe between the reporter and the quencher dye. The separation of the reporter dye from the quencher dye results in an increase of fluorescence. The signal accumulates with each cycle of PCR and can be monitored with a fluorimeter.

In still further embodiments, polymorphisms are detected using the SNP-IT primer extension assay (Orchid Biosciences, Princeton, N.J.; See e.g., U.S. Pat. Nos. 5,952,174 and 5,919,626, each of which is herein incorporated by reference). In this assay, SNPs are identified by using a specially synthesized DNA primer and a DNA polymerase to selectively extend the DNA chain by one base at the suspected SNP location. DNA in the region of interest is amplified and denatured. Polymerase reactions are then performed using miniaturized systems called microfluidics. Detection is accomplished by adding a label to the nucleotide suspected of being at the SNP or mutation location. Incorporation of the label into the DNA can be detected by any suitable method (e.g., if the nucleotide contains a biotin label, detection is via a fluorescently labelled antibody specific for biotin).

III. Detection Assay Production

The present invention provides a high-throughput detection assay production system, allowing for high-speed, efficient production of thousands of detection assays. The high-throughput production systems and methods allow sufficient production capacity to facilitate full implementation of the funnel process described above-allowing comprehensive of all known (and newly identified) markers.

In some embodiments of the present invention, oligonucleotides and/or other detection assay components (e.g., those designed by the INVADERCREATOR software and directed to target sequences analyzed by the in silico systems and methods) are synthesized. In preferred embodiments, oligonucleotide synthesis is performed in an automated and coordinated manner. As discussed in more detail below, in some embodiments, produced detection assay are tested against a plurality of samples representing two or more different individuals or alleles (e.g., samples containing sequences from individuals with different ethnic backgrounds, disease states, etc.) to demonstrate the viability of the assay with different individuals.

In some embodiments, the present invention provides an automated DNA production process. In some embodiments, the automated DNA production process includes an oligonucleotide synthesizer component and an oligonucleotide processing component. In some embodiments, the oligonucleotide production component includes multiple components, including but not limited to, an oligonucleotide cleavage and deprotection component, an oligonucleotide purification component, an oligonucleotide dry down component; an oligonucleotide de-salting component, an oligonucleotide dilute and fill component, and a quality control component. In some embodiments, the automated DNA production process of the present invention further includes automated design software and supporting computer terminals and connections, a product tracking system (e.g., a bar code system), and a centralized packaging component. In some embodiments, the components are combined in an integrated, centrally controlled, automated production system. The present invention thus provides methods of synthesizing several related oligonucleotides (e.g., components of a kit) in a coordinated manner. The automated production systems of the present invention allow large scale automated production of detection assays for numerous different target sequences.

A. Oligonucleotide Synthesis Component

Once a particular oligonucleotide sequence or set of sequences has been chosen, sequences are sent (e.g., electronically) to a high-throughput oligonucleotide synthesizer component. In some preferred embodiments, the high-throughput synthesizer component contains multiple DNA synthesizers.

In some embodiments, the synthesizers are arranged in banks. For example, a given bank of synthesizers may be used to produce one set of oligonucleotides (e.g., for an INVADER or PCR reaction). The present invention is not limited to any one synthesizer. Indeed, a variety of synthesizers are contemplated, including, but not limited to MOSS EXPEDITE 16-channel DNA synthesizers (PE Biosystems, Foster City, Calif.), OligoPilot (Amersham Pharmacia,), the 3900 and 3948 48-Channel DNA synthesizers (PE Biosystems, Foster City, Calif.), and the high-throughput synthesizer described in PCT Publication WO 01/41918. In some embodiments, synthesizers are modified or are wholly fabricated to meet physical or performance specifications particularly preferred for use in the synthesis component of the present invention. In some embodiments, two or more different DNA synthesizers are combined in one bank in order to optimize the quantities of different oligonucleotides needed. This allows for the rapid synthesis (e.g., in less than 4 hours) of an entire set of oligonucleotides (all the oligonucleotide components needed for a particular assay, e.g., for detection of one SNP using an INVADER assay).

In some embodiments the DNA synthesizer component includes at least 100 synthesizers. In other embodiments, the DNA synthesizer component includes at least 200 synthesizers. In still other embodiments, the DNA synthesizer component includes at least 250 synthesizers. In some embodiments, the DNA synthesizers are run 24 hours a day.

1. Automated Reagent Supply

In some embodiments, the DNA synthesizers in the oligonucleotide synthesis component further comprise an automated reagent supply system. The automated reagent supply system delivers reagents necessary for synthesis to the synthesizers from a central supply area. For example, in some embodiments, acetonitrile is supplied via tubing (e.g., stainless steel tubing) through the automated supply system. Deblocking solution may also be supplied directly to DNA synthesizers through tubing. In some preferred embodiments, the reagent supply system tubing is designed to connect directly to the DNA synthesizers without modifying the synthesizers. Additionally, in some embodiments, the central reagent supply is designed to deliver reagents at a constant and controlled pressure. The amount of reagent circulating in the central supply loop is maintained at 8 to 12 times the level needed for synthesis in order to allow standardized pressure at each instrument. The excess reagent also allows new reagent to be added to the system without shutting down. In addition, the excess of reagent allows different types of pressurized reagent containers to be attached to one system. The excess of reagents in one centralized system further allows for one central system for chemical spills and fire suppression.

In some embodiments, the DNA synthesis component includes a centralized argon delivery system. The system includes high-pressure argon tanks adjacent to each bank of synthesizers. These tanks are connected to large, main argon tanks for backup. In some embodiments, the main tanks are run in series. In other embodiments, the main tanks are set up in banks. In some embodiments, the system further includes an automated tank switching system. In some preferred embodiments, the argon delivery system further comprises a tertiary backup system to provide argon in the case of failure of the primary and backup systems.

In some embodiments, one or more branched delivery components are used between the reagent tanks and the individual synthesizers or banks of synthesizers. For example, in some embodiments, acetonitrile is delivered through a branched metal structure. Where more than one branched delivery component is used, in preferred embodiments, each branched delivery component is individually pressurized.

The present invention is not limited by the number of branches in the branched delivery component. In preferred embodiments, each branched delivery component contains ten or more branches. Reagent tanks may be connected to the branched delivery components using any number of configurations. For example, in some embodiments, a single reagent tank is matched with a single branched component. In other embodiments, a plurality of reagent tanks is used to supply reagents to one or more branched components. In some such embodiments, the plurality of tanks may be attached to the branched components through a single feed line, wherein one or a subset of the tanks feeds the branched components until empty (or substantially empty), whereby a second tank or subset of tanks is accessed to maintain a continuous supply of reagent to the one or more branched components. To automate the monitoring and switching of tanks, an ultrasonic level sensor may be applied.

In some embodiments, each branch of the branched delivery component provides reagent to one synthesizer or to a bank of synthesizers through connecting tubing. In preferred embodiments, tubing is continuous (i.e., provides a direct connection between the delivery branch and the synthesizer). In some preferred embodiments, the tubing comprises an interior diameter of 0.25 inches or less (e.g., 0.125 inches). In some embodiments, each branch contains one or more valves (preferably one). While the valve may be located at any position along the delivery line, in preferred embodiments, the valve is located in close proximity to the synthesizer. In other embodiments, reagent is provided directly to synthesizers without any joints or valves between the branched delivery component and the synthesizers.

In some embodiments, the solvent is contained in a cabinet designed for the safe storage of flammable chemicals (a "flammables cabinet") and the branched structure is located outside of the cabinet and is fed by the solvent container through a tube passed through the wall of the cabinet. In other embodiments, the reagent and branched system is stored in an explosion proof room or chamber and the solvent is pumped via tubing through the wall of the explosion proof room. In preferred embodiments, all of the tubing from each of the branches is fed through the wall in at a single location (e.g., through a single hole in the wall).

The reagent delivery system of the present invention provides several advantages. For example, such a system allows each synthesizer to be turned off (e.g., for servicing) independent of the other synthesizers. Use of continuous tubing reduces the number of joints and couplings, the areas most vulnerable to failure, between the reagent sources and the synthesizers, thereby reducing the potential for leakage or blockage in the system. Use of continuous tubing through inaccessible or difficult-to-access areas reduces the likelihood that repairs or service will be needed in such areas. In addition, fewer valves results in cost savings.

In some embodiments, the branched tubing structure further provides a sight glass. In preferred embodiments, the sight glass is located at the top of the branched delivery structure. The sight glass provides the opportunity for visual and physical sampling of the reagent. For example, in some embodiments, the sight glass includes a sampling valve (e.g., to collect samples for quality control). In some embodiments, the site glass serves as a trap for gas bubbles, to prevent bubbles from entering the connecting tubing. In other embodiments, the sight glass contains a vent (e.g., a solonoid valve) for de-gassing of the system. In some embodiments, scanning of the sight glass (e.g., spectrophotometrically) and sampling are automated. The automated system provides quality control and feedback (e.g., the presence of contamination).

In other embodiments, the present invention provides a portable reagent delivery system. In some embodiments, the portable reagent delivery system comprises a branched structure connected to solvent tanks that are contained in a flammables cabinet. In preferred embodiments, one reagent delivery system is able to provide sufficient reagent for 40 or more synthesizers. These portable reagent delivery systems of the present invention facilitate the operation of mobile (portable) synthesis facilities. In another embodiment, these portable reagent delivery systems facilitate the operation of flexible synthesis facilities that can be easily re-configured to meet particular needs of individual synthesis projects or contracts. In some embodiments, a synthesis facility comprises multiple portable reagent delivery systems.

2. Waste Collection

In some embodiments, the DNA synthesis component further comprises a centralized waste collection system. The centralized waste collection system comprises cache pots for central waste collection. In some embodiments, the cache pots include level detectors such that when waste level reaches a preset value, a pump is activated to drain the cache into a central collection reservoir. In preferred embodiments, ductwork is provided to gather fumes from cache pots. The fumes are then vented safely through the roof, avoiding exposure of personnel to harmful fumes. In preferred embodiments, the air handling system provides an adequate amount of air exchange per person to ensure that personnel are not exposed to harmful fumes. The coordinated reagent delivery and waste removal systems increase the safety and health of workers, as well as improving cost savings.

In some embodiments, the solvent waste disposal system comprises a waste transfer system. In some preferred embodiments, the system contains no electronic components. In some preferred embodiments, the system comprises no moving parts. For example, in some embodiments, waste is first collected in a liquid transfer drum designed for the safe storage of flammable waste. In some embodiments, waste is manually poured into the drum through a waste channel. In preferred embodiments, solvent waste is automatically transported (e.g., through tubing) directly from synthesizers to the drum. To drain the liquid transfer drum, argon is pumped from a pressurized gas line into the drum through a first opening, forcing solvent waste out an output channel at a second opening (e.g., through tubing) into a centralized waste collection area. In preferred embodiments, the argon is pumped at low pressure (e.g., 3-10 pounds per square inch (psi), preferably 5 psi or less). In some embodiments, the drum contains a sight glass to visualize the solvent level. In some embodiments, the level is visualized manually and the disposal system is activated when the drum has reached a selected threshold level. In other embodiments, the level is automatically detected and the disposal system is automatically activated when the drum has reached the threshold level.

The solvent waste transfer system of the present invention provides several advantages over manual collection and complex systems. The solvent waste system of the present invention is intrinsically safe, as it can be designed with no moving or electrical parts. For example, the system described above is suitable for use in Division I/Class I space under EPA regulations.

3. Centralized Control System

In some embodiments, all of the DNA synthesizers in the synthesis component are attached to a centralized control system. The centralized control system controls all areas of operation, including, but not limited to, power, pressure, reagent delivery, waste, and synthesis. In some preferred embodiments, the centralized control system includes a clean electrical grid with uninterrupted power supply. Such a system minimizes power level fluctuations. In additional preferred embodiments, the centralized control system includes alarms for air flow, status of reagents, and status of waste containers. The alarm system can be monitored from the central control panel. The centralized control system allows additions, deletions, or shutdowns of one synthesizer or one block of synthesizers without disrupting operations of other instruments. The centralized power control allows user to turn instruments off instrument by instrument, bank by bank, or the entire module.

B. Oligonucleotide Processing Components

In some embodiments, the automated DNA production process further comprises one or more oligonucleotide production components, including, but not limited to, an oligonucleotide cleavage and deprotection component, an oligonucleotide purification component, a dry-down component, a desalting component, a dilution and fill component, and a quality control component.

1. Oligonucleotide Cleavage and Deprotection

After synthesis is complete, the oligonucleotides are moved to the cleavage and deprotection station. In some embodiments, the transfer of oligonucleotides to this station is automated and controlled by robotic automation. In some embodiments, the entire cleavage and deprotection process is performed by robotic automation. In some embodiments, $NH_4OH$ for deprotection is supplied through the automated reagent supply system.

Accordingly, in some embodiments, oligonucleotide deprotection is performed in multi-sample containers (e.g., 96 well covered dishes) in an oven. This method is designed for the high-throughput system of the present invention and is capable of the simultaneous processing of large numbers of samples. This method provides several advantages over the standard method of deprotection in vials. For example, sample handling is reduced (e.g., labeling of vials dispensing of concentrated $NH_4OH$ to individual vials, as well as the associated capping and uncapping of the vials, is eliminated). This reduces the risks of contamination or mislabeling and decreases processing time. Where such methods are used to replace human pipetting of samples and capping of vials, the methods save many labor hours per day. The method also reduces consumable requirements by eliminating the need for vials and pipette tips, reduces equipment needs by eliminating the need for pipettes, and improves worker safety conditions by reducing worker exposure to ammonium hydroxide. The potential for repetitive motion disorders is also reduced. Deprotection in a multi-well plate further has the advantage that the plate can be directly placed on an automated desalting apparatus (e.g., TECAN Robot).

During the development of the present invention, the plate was optimized to be functional and compatible with the deprotection methods. In some embodiments, the plate is designed to be able to hold as much as two milliliters of oligonucleotide and ammonium hydroxide. If deep well plates are used, automated downstream processing steps may need to be altered to ensure that the full volume of sample is extracted from the wells. In some embodiments, the multi-well plates used in the methods of the present invention comprise a tight sealing lid/cover to protect from evaporation, provide for even heating, and are able to withstand temperatures necessary for deprotection. Attempts with initial plates were not successful, having problems with lids that were not suitably sealed and plates that did not withstand deprotection temperatures.

In some embodiments (e.g., processing of target and INVADER oligonucleotides), oligonucleotides are cleaved from the synthesis support in the multi-well plates. In other embodiments (e.g., processing of probe oligonucleotides), oligonucleotides are first cleaved from the synthesis column and then transferred to the plate for deprotection.

2. Oligonucleotide Purification

In some embodiments, following deprotection and cleavage from the solid support, oligonucleotides are further purified. Any suitable purification method may be employed, including, but not limited to, high pressure liquid chromatography (HPLC) (e.g., using reverse phase C18 and ion exchange), reverse phase cartridge purification, and gel electrophoresis. However, in preferred embodiments, purification is carried out using ion exchange HPLC chromatography.

In some embodiments, multiple HPLC instruments are utilized, and integrated into banks (e.g., banks of 8 HPLC instruments). Each bank is referred to as an HPLC module. Each HPLC module consists of an automated injector (e.g., including, but not limited to, Leap Technologies 8-port injector) connected to each bank of automated HPLC instruments (e.g., including, but not limited to, Beckman-Coulter HPLC instruments). The automatic Leap injector can handle four 96-well plates of cleaved and deprotected oligonucleotides at a time. The Leap injector automatically loads a sample onto each of the HPLCs in a given bank. The use of one injector with each bank of HPLC provides the advantage of reducing labor and allowing integrated processing of information.

In some embodiments, oligonucleotides are purified on an ion exchange column using a salt gradient. Any suitable ion exchange functionality or support may be utilized, including but not limited to, Source 15 Q ion exchange resin (Pharmacia). Any suitable salt may be utilized for elution of oligonucleotides from the ion exchange column, including but not limited to, sodium chloride, acetonitrile, and sodium perchlorate. However, in preferred embodiments, a gradient of sodium perchlorate in acetonitrile and sodium acetate is utilized.

In some embodiments, the gradient is run for a sufficient time course to capture a broad range of sizes of oligonucleotides. For example, in some embodiments, the gradient is a 54 minute gradient carried out using the method described in Tables 1 and 2. Table 1 describes the HPLC protocol for the gradient. The time column represents the time of the operation. The module column represents the equipment that controls the operation. The function column represents the function that the HPLC is performing. The value column represents the value of the HPLC function at the time specified in the time column. Table 2 describes the gradient used in HPLC purification. The column temperature is 65° C. Buffer A is 20 mM Sodium Perchlorate, 20 mM Sodium Acetate, 10 Acetonitrile, pH 7.35. Buffer B is 600 mM Sodium Perchlorate, 20 mM Sodium Acetate, 10 Acetonitrile, pH 7.35.

In some embodiments, the gradient is shortened. In preferred embodiments, the gradient is shortened so that a particular gradient range suitable for the elution of a particular oligonucleotide being purified is accomplished in a reduced amount of time. In other preferred embodiments, the gradient is shortened so that a particular gradient range suitable for the elution of any oligonucleotide having a size within a selected size range is accomplished in a reduced amount of time. This latter embodiment provides the advantages that the worker performing HPLC need not have foreknowledge of the size of an oligonucleotide within the selected size range, and the protocol need not be altered for purification of any oligonucleotide having a size within the range.

In a particularly preferred embodiment, the gradient is a 34 minute gradient described in the Tables 3 and 4. The parameters and buffer compositions are as described for Tables 1 and 2 above. Reducing the gradient to 34 minutes increases the capacity of synthesis per HPLC instrument and reduces buffer usage by 50% compared to the 54 minute protocol described above. The 34 minute HPLC method of the present invention has the further advantage of being optimized to be able to separate oligonucleotides of a length range of 23-39 nucleotides without any changes in the protocol for the different lengths within the range. Previous methods required changes for every 2-3 nucleotide change in length. In yet other embodiments, the gradient time is reduced even further (e.g., to less than 30 minutes, preferably to less than 20 minutes, and even more preferably, to less than 15 minutes). Any suitable method may be utilized that meets the requirements of the present invention (e.g., able to purify a wide range of oligonucleotide lengths using the same protocol).

In some embodiments, separate sets of HPLC conditions, each selected to purify oligonucleotides within a different size range, may be provided (e.g., may be run on separate HPLCs or banks of HPLCs). Thus, in some embodiments of the present invention, a first bank of HPLCs are configured to purify oligonucleotides using a first set of purification conditions (e.g., for 23-39 mers), while second and third banks are used for the shorter and longer oligonucleotides. Use of this system allows for automated purification without the need to change any parameters from purification to purification and decreases the time required for oligonucleotide production.

In some embodiments, the HPLC station is equipped with a central reagent supply system. In some embodiments, the central reagent system includes an automated buffer preparation system. The automated buffer preparation system includes large vat carboys that receive pre-measured reagents and water for centralized buffer preparation. The buffers (e.g., a high salt buffer and a low salt buffer) are piped through a circulation loop directly from the central preparation area to the HPLCs. In some embodiments, the conductivity of the solution in the circulation loop is monitored to verify correct content and adequate mixing. In addition, in some embodiments, circulation lines are fitted with venturis for static mixing of the solutions as they are circulated through the piping loop. In still further embodiments, the circulation lines are fitted with 0.05 μm filters for sterilization.

In some preferred embodiments, the HPLC purification step is carried out in a clean room environment. The clean room includes a HEPA filtration system. All personnel in the clean room are outfitted with protective gloves, hair coverings, and foot coverings.

In preferred embodiments, the automated buffer prep system is located in a non-clean room environment and the prepared buffer is piped through the wall into the clean room.

Each purified oligonucleotide is collected into a tube (e.g., a 50-ml conical tube) in a carrying case in the fraction collector. Collection is based on a set method, which is triggered by an absorbance rate change within a predetermined time window. In some embodiments, the method uses a flow rate of 5 ml/min (the maximum rate of the pumps is 10 ml/min.) and each column is automatically washed before the injector loads the next sample.

TABLE 1

54 Minute HPLC Method

| Time (min) | Module | Function | Value | Duration (min) |
|---|---|---|---|---|
| 0 | Pump | % B | 22.00 | 4.0 |
| 0 | Det 166-3 | Autozero ON | | |
| 0 | Det 166-3 | Relay ON | 3.0 | 0.10 |
| 4 | Pump | % B | 37.00 | 43.00 |
| 47 | Pump | % B | 100.00 | 0.50 |
| 47.5 | Pump | Flow Rate | 7.5 | 0.00 |
| 50.0 | Pump | % B | 5.0 | 0.50 |
| 53.45 | Det 166-3 | Stop Data | | |

(Det = detector; % B = percent of buffer B; flow rate values in ml/min)

TABLE 2

54 Minute HPLC Method

| Time | Gradient | Flow Rate |
|---|---|---|
| 0 | 5% B/95% A | 5 ml/min |
| 0-4 min | 5-22% B | 5 ml/min |
| 4-47 min | 22-37% B | 5 ml/min |
| 47-47.5 min | 37-100% B | 7.5 ml/min |
| 47.5-50 min | 100% B | 7.5 ml/min |
| 50-50.5 min | 100-5% B | 7.5 ml/min |
| 50.5-53.5 min | 5% B | 7.5 ml/min |

TABLE 3

34 Minute HPLC Method

| Time (min) | Module | Function | Value | Duration |
|---|---|---|---|---|
| 0 | Pump | % B | 26.00 | 2.0 |
| 0 | Det 166-3 | Autozero ON | | |
| 0 | Det 166-3 | Relay ON | 3.0 | 0.10 |
| 2 | Pump | % B | 36.00 | 27.00 |
| 29 | Pump | % B | 100.00 | 0.50 |
| 29.5 | Pump | Flow Rate | 7.5 | 0.00 |
| 32 | Pump | % B | 5.0 | 0.50 |
| 33.45 | Det 166-3 | Stop Data | | |

TABLE 4

34 Minute HPLC Method

| Time | Gradient | Flow Rate |
|---|---|---|
| 0 | 5% B/95% A | 5 ml/min |
| 0-2 min | 5-26% B | 5 ml/min |
| 2-29 min | 26-36% B | 5 ml/min |
| 29-29.5 min | 36-100% B | 6.5 ml/min |
| 29.5-32 min | 100% B | 7.5 ml/min |
| 32-32.5 min | 100-5% B | 7.5 ml/min |
| 32.5-33.5 min | 5% B | 7.5 ml/min |

3. Dry-Down Component

When the fraction collector is full of eluted oligonucleotides, they are transferred (e.g., by automated robotics or by hand) to a drying station. For example, in some embodiments, the samples are transferred to customized racks for Genevac centrifugal evaporator to be dried down. In preferred embodiments, the Genevac evaporator is equipped with racks designed to be used in both the Genevac and the subsequent desalting step. The Genevac evaporator decreases drying time, relative to other commercially available evaporators, by 60%.

4. Desalting Component

In some embodiments, following HPLC, oligonucleotides are desalted. In other embodiments, oligonucleotides are not HPLC purified, but instead proceed directly from deprotection to desalting. In some embodiments, the desalting stations have TECAN robot systems for automated desalting. The system employs a rack that has been designed to fit the TECAN robot and the Genevac centrifugal evaporator without transfer to a different rack or holder. The racks are designed to hold the different sizes of desalting columns, such as the NAP-5 and NAP-10 columns. The TECAN robot loads each oligonucleotide onto an individual NAP-5 or NAP-10 column, supplies the buffer, and collects the eluate. If desired, desalted oligonucleotides may be frozen or dried down at this point.

In some embodiments, following desalting, INVADER and target oligonucleotides are analyzed by mass spectroscopy. For example, in some embodiments, a small sample from the desalted oligonucleotide sample is removed (e.g., by a TECAN robot) and spotted on an analysis plate, which is then placed into a mass spectrometer. The results are analyzed and processed by a software routine. Following the analysis, failed oligonucleotides are automatically reordered, while oligonucleotides that pass the analysis are transported to the next processing step. This preliminary quality control analysis removes failed oligonucleotides earlier in the processing, thus resulting in cost savings and improving cycle times.

5. Oligonucleotide Dilution and Fill Component

In some embodiments, the oligonucleotide production process further includes a dilute and fill module. In some embodiments, each module consists of three automated oligonucleotide dilution and normalization stations. Each station consists of a network-linked computer and an automated robotic system (e.g., including but not limited to Biomek 2000). In one embodiment, the pipetting station is physically integrated with a spectrophotometer to allow machine handling of every step in the process. All manipulations are carried out in a HEPA-filtered environment. Dissolved oligonucleotides are loaded onto the Biomek 2000 deck the sequence files are transferred into the Biomek 2000. The Biomek 2000 automatically transfers a sample of each oligonucleotide to an optical plate, which the spectrophotometer reads to measure the A260 absorbance. Once the A260 has been determined, an Excel program integrated with the Biomek software uses absorbance and the sequence information to prepare a dilution table for each oligonucleotide. The Biomek employs that dilution table to dilute each oligonucleotide appropriately. The instrument then dispenses oligonucleotides into an appropriate vessel (e.g., 1.5 ml microtubes).

In some preferred embodiments, the automated dilution and fill system is able to dilute different components of a kit (e.g., INVADER and probe oligonucleotides) to different concentrations. In other preferred embodiments, the automated dilution and fill module is able to dilute different components to different concentrations specified by the end user.

6. Quality Control Component

In some embodiments, oligonucleotides undergo a quality control assay before distribution to the user. The specific quality control assay chosen depends on the final use of the oligonucleotides. For example, if the oligonucleotides are to be used in an INVADER SNP detection assay, they are tested in the assay before distribution.

In some embodiments, each SNP set is tested in a quality control assay utilizing the Beckman Coulter SAGIAN CORE System. In some embodiments, the results are read on a real-time instrument (e.g., a ABI 7700 fluorescence reader). The QC assay uses two no target blanks as negative controls and five untyped genomic samples as targets. For consistency, every SNP set is tested with the same genomic samples. In preferred embodiment, the ADS system is responsible for tracking tubes through the QC module. Thus, in some embodiments, if a tube is missing, the ADS program discards, reorders, or searches for the missing tube.

In some preferred embodiments, the user chooses which QC method to run. The operator then chooses how many sets are needed. Then, in some embodiments, the application auto-selects the correct number of SNPs based on priority and prints output (picklist). If a picklist needs to be regenerated, the operator inputs which picklist they are replacing as well as which sets are not valid. The system auto-selects the valid SNPs plus replacement SNPs and print output. Additionally, in some embodiments, picklists are manually generated by SNP number.

The auto-selected SNPs are then removed from being listed as available for auto-selection. In some embodiments, the software prints the following items: SNP/Oligo list (picklist), SNP/Oligo layout (rack setup). The operator then takes the picklist into inventory and removes the completed oligonucleotide sets. In some embodiments, a completed set is unavailable. In this case, the operator regenerates a picklist. Then, in preferred embodiments, the missing SNP set or tube is flagged in the system. Once a picklist is full, the oligonucleotides are moved to the next step.

In some embodiments, the operator then takes the rack setup generated by the picklist and loads the rack. Alternatively, a robotic handling system loads the rack. In preferred embodiments, tubes are scanned as they are placed onto the rack. The scan checks to make sure it is the correct tube and displays the location in the rack where the tube is to be placed.

Completed racks are then placed in a holding area to await the robot prep and robot run. Then, in some embodiments, the operator views what racks are in the queue and determines what genomics and reagent stock will be loaded onto the robot. The robot is then programmed to perform a specific method. Additionally, in some embodiments, the robot or operator records genomics and reagents lot numbers.

In preferred embodiments, a carousel location map is printed that outlines where racks are to be placed. The operator then loads the robot carousel according to the method layout. The rack is scanned (e.g., by the operator or by the ADS program). If the rack is not valid for the current robot method, the operator will be informed. The carousel location for the rack is then displayed. The output plates are then scanned (e.g., by the operator or by the ADS program). If the plate is not valid for the current method the operator is informed. The carousel location for the plate is then displayed.

Then, in some embodiments, the robot is run. The robot then places the plates onto heatblocks for a period of time specified in the method. In some embodiments, the robot then scans the plates on the Cytofluor. Output from the cytofluor is read into the database and attached to the output plate record.

In other embodiments, the output is read on the ABI 7700 real time instrument. In some embodiments, the operator loads the plate on to the 7700. Alternatively, in other embodiments, the robot loads the plate onto the ABI 7700. A scan is then started using the 7700 software. When the scan is completed the output file is saved onto a computer hard drive. The operator then starts the application and scans in the plate bar code. The software instructs the user to browse to the saved output file. The software then reads the file into the database and deletes the file (or tells the operator to delete the file).

The plate reader results (e.g., from a Cytofluor or a ABI 7700) are then analyzed (e.g., by a software program or by the operator). Additionally, in some embodiments, the operator reviews the results of the software analysis of each SNP and takes one of several actions. In some embodiments, the operator approves all automated actions. In other embodiments, the operator reviews and approves individual actions. In some embodiments, the operator marks actions as needing additional review. Alternatively, in other embodiments, the operator passes on reviewing anything. Additionally, in some embodiments, the operator overrides all automated actions.

Depending on the results of the QC analysis, one of several actions is next taken. If the software marks ready for Full Fill, the operator forwards discards diluted Probe/INVADER oligonucleotide mixes and forwards the samples to the packaging module.

If an oligonucleotide set fails quality control, the data is interpreted to determine the cause of the failure. The course of action is determined by such data interpretation. If the software marks an oligonucleotide Reassess Failed Oligonucleotide, no action by user is required, the reassess is handled by automation. In the software marks an oligonucleotide Redilute Failed Oligonucleotide, the operator discards diluted tubes. No other action is required. If the software marks an oligonucleotide Order Target Oligonucleotide, no action by user is required. In this case, a synthetic target oligonucleotide is ordered for further testing. If the software marks an oligonucleotide Fail Oligo(s) Discard Oligo(s), the operator discards the diluted tubes and un-diluted tubes. No other action is required. If the software marks an oligonucleotide Fail SNP, the operator discards the diluted and un-diluted tubes. No other action is required. If the software marks an oligonucleotide Full SNP Redesign, the operator discards the diluted and un-diluted tubes. No other action is required. If the software marks an oligonucleotide Partial SNP Redesign the operator discards diluted tubes and discards some un-diluted tubes. No other action is required.

In some embodiments, the software marks an oligonucleotide Manual Intervention. This step occurs if the operator or software has determined the SNP requires manual attention. This step puts the SNP "on hold" in the tracking system while the operator investigates the source of the failure.

When a set of oligonucleotides (e.g., a INVADER assay set) is completed, the set is transferred to the packaging station.

In some embodiments of the present invention, the produced detection assays are tested against a plurality of samples representing two or more different alleles (samples containing sequences from individuals with different ethnic backgrounds, disease states, etc.) to demonstrate the viability of the assay with different individuals. In preferred embodiments, the produced assays are tested against a sufficient number of alleles (e.g., 100 or more) to identify which members of the population can be tested by the assay and to identify the allele frequency in the population of the genotype for which the assay is designed. In some embodiments, where certain individuals or classes of individuals are not detected by the detection assay, the target sequence of the individuals is characterized to determine whether the intended SNP is not present and/or whether additional mutations are present the prevent the proper detection of the sample. Any such information may be collected and stored in databases. In some embodiments, target selection, in silico analysis, and oligonucleotide design are repeated to generate assays capable of detecting the corresponding sequence of these individuals, as desired. In some embodiments, allele frequency information is stored in a database and made available to users of the detection assays upon request (e.g., made available over a communication network).

C. Packaging Component

In some embodiments, one or more components generated using the system of the present invention are packaged using any suitable means. In some embodiments, the packaging system is automated. In some embodiments, the packaging component is controlled by the centralized control network of the present invention.

D. Centralized Control Network

In some embodiments, the automated DNA production process further comprises a centralized control system. In some embodiments, the centralized control system comprises a computer system.

In some embodiments, the computer system comprises computer memory or a computer memory device and a computer processor. In some embodiments, the computer memory (or computer memory device) and computer processor are part of the same computer. In other embodiments, the computer memory device or computer memory are located on one computer and the computer processor is located on a different computer. In some embodiments, the computer memory is connected to the computer processor through the Internet or World Wide Web. In some embodiments, the computer memory is on a computer readable medium (e.g., floppy disk, hard disk, compact disk, DVD, etc). In other embodiments, the computer memory (or computer memory device) and computer processor are connected via a local network or intranet. In certain embodiments, the computer system comprises a computer memory device, a computer processor, an interactive device (e.g., keyboard, mouse, voice recognition system), and a display system (e.g., monitor, speaker system, etc.).

In preferred embodiments, the systems and methods of the present invention comprise a centralized control system, wherein the centralized control system comprises a computer tracking system. As discussed above, the items to be manufactured (e.g. oligonucleotide probes, targets, etc) are subjected to a number of processing steps (e.g. synthesis, purification, quality control, etc). Also as discussed above, various components of a single order (e.g. one type of SNP detection kit) are manufactured in separate tubes, and may be subjected to a different number of processing steps. Consequently, the present invention provides systems and methods for tracking the location and status of the items to be manufactured such that multiple components of a single order can be separately manufactured and brought back together at the appropriate time. The tracking system and methods of the present invention also allow for increased quality control and production efficiency.

In some embodiments, the computer tracking system comprises a central processing unit (CPU) and a central database. The central database is the central repository of information about manufacturing orders that are received (e.g. SNP sequence to be detected, final dilution requirements, etc), as well as manufacturing orders that have been processed (e.g. processed by software applications that determine optimal nucleic acid sequences, and applications that assign unique identifiers to orders). Manufacturing orders that have been processed may generate, for example, the number and types of oligonucleotides that need to be manufactured (e.g. probe, INVADER oligonucleotide, synthetic target), and the unique identifier associated with the entire order as well as unique identifiers for each component of an order (e.g. probe, INVADER oligonucleotide, etc). In certain embodiments, the components of an order proceed through the manufacturing process in containers that have been labeled with unique identifiers (e.g. bar coded test tubes, color coded test tubes, etc.).

In certain embodiments, the computer tracking system further comprises one or more scanning units capable of reading the unique identifier associated with each labeled container. In some embodiments, the scanning units are portable (e.g. hand held scanner employed by an operator to scan a labeled container). In other embodiments, the scanning units are stationary (e.g. built into each module). In some embodiments, at least one scanning unit is portable and at least one scanning unit is stationary (e.g. hand held human implemented device).

Stationary scanning units may, for example, collect information from the unique identifier on a labeled container (i.e. the labeled container is 'red') as it passes through part of one of the production modules. For example, a rack of 100 labeled containers may pass from the purification module to the dilute and fill module on a conveyor belt or other transport means, and the 100 labeled containers may be read by the stationary scanning unit. Likewise, a portable scanning unit may be employed to collect the information from the labeled containers as they pass from one production module to the next, or at different points within a production module. The scanning units may also be employed, for example, to determine the identity of a labeled container that has been tested (e.g. concentration of sample inside container is tested and the identity of the container is determined).

The scanning units are capable of transmitting the information they collect from the labeled containers to a central database. The scanning units may be linked to a central database via wires, or the information may be transmitted to the central database. The central database collects and processes this information such that the location and status of individual orders and components of orders can be tracked (e.g. information about when the order is likely to complete the manufacturing process may be obtained from the system). The central database also collects information from any type of sample analysis performed within each module (e.g. concentration measurements made during dilute and fill module). This sample analysis is correlated with the unique identifiers on each labeled container such that the status of each labeled container is determined. This allows labeled containers that are unsatisfactory to be removed from the production process (e.g. information from the central database is communicated to robotic or human container handlers to remove the unsatisfactory sample). Likewise, containers that are automatically removed from the production process as unsatisfactory may be identified, and this information communicated to a central database (e.g. to update the status of an order, allow a re-order to be generated, etc). Allowing unsatisfactory samples to be removed prevents unnecessary manufacturing steps, and allows the production of a replacement to begin as early as possible.

As mentioned above, the tracking system of the present invention allows the production of single orders that have multiple components that may proceed through different production modules, and/or that may be processed (at least in part) in separate containers. For example, an order may be for the production of an INVADER detection kit. An INVADER detection kit is composed of at least 2 components (the INVADER oligonucleotide, and the downstream probe), and generally includes a second downstream probe (e.g. for a different allele), and one or two synthetic targets so controls may be run (i.e. an INVADER kit may have 5 separate oligonucleotide sequences that need to be generated). The generation of separate sequences, in separate containers, generally necessitates that the tracking system track the location and status of each container, and direct the proper association of completed oligonucleotides into a single container or kit. Providing each container with a unique identifier corresponding to a single type of oligonucleotide (e.g. an INVADER oligonucleotide), and also corresponding to a single order (a SNP detection kit for diagnosing a certain SNP) allows separate, high through-put manufacture of the various components of a kit without confusion as to what components belong with each kit.

Tracking the location and status of the components of a kit (e.g. a kit composed of 5 different oligonucleotides) has many advantages. For example, near the end of the purification module HPLC is employed, and a simple sample analysis may be employed on each sample in each container to determine if a sample is collected in each tube. If no sample is collected after HPLC is performed, the unique identifier on the container, in connection with the central database, identifies the type of sample that should have been produced (e.g. INVADER oligonucleotide) and a re-order is generated. Identification of this particular oligonucleotide allows the manufacturing process for this oligonucleotide to start over from the beginning (e.g. this order gets priority status over other orders to begin the manufacturing process again). Importantly, the other components of the order may continue the manufacturing process without being discarded as part of a defective order (e.g. the manufacturing process may continue for these oligonucleotides up to the point where the defective oligonucleotide is required). Likewise, additional manufacturing resources are not wasted on the defective component (i.e. additional reagents and time are not spent on this portion of the order in further manufacturing steps).

The unique identifier on each of the containers allows the various components of a given order to be grouped together at a step when this is required (likewise, there is no need to group the components of an order in the manufacturing process until it is required). For example, prior to the dilute and fill module, the various components of a single order may be grouped together such that the contents of the proper containers are combined in the proper fashion in the dilute and fill module. This identification and grouping also allows re-orders to 'find' the other components of a particular order. This type of grouping, for example, allows the automated mixing, in the dilute and fill stage, of the first and second downstream probes with the INVADER oligonucleotide, all from the same order. This helps prevent human errors in reading containers and accidentally providing probes intended for one SNP being labeled as specific for a different SNP (i.e. this helps prevent components of different kits from being accidentally mixed together). The identification of individual containers not only allows for the proper grouping of the various components of a single order, but also allows for an order to be customized for a particular customer (e.g. a certain concentration or buffer employed in the second dilute and fill procedure). Finally, containers with finished products in them (e.g. containers with probes, and containers with synthetic targets) need to be associated with each other so they are properly assayed in the quality control module, and packaged together as a single kit (otherwise, quality control and/or a final end-user may find false negative and false positives when attempting to test/use the kit). The ability to track the individual containers allows the components of a kit to be associated together by directing a robot or human operator what tubes belong together. Consequently, final kits are produced with the proper components. Therefore, the tracking systems and methods of the present invention allow high through-put production of kits with many components, while assuring quality production.

E. Example

This Example describes the production of an INVADER assay kit for SNP detection using the automated DNA production system of the present invention.

1. Oligonucleotide Design

The sequence of the SNP to be detected is first submitted through the automated web-based user interface or through e-mail. The sequences are then transferred to the INVADER CREATOR software. The software designs the upstream INVADER oligonucleotide and downstream probe oligonucleotide. The sequences are returned to the user for inspection. At this point, the sequences are assigned a bar code and entered into the automated tracking system. The bar codes of the probe and INVADER oligonucleotide are linked so that their synthesis, analysis, and packaging can be coordinated.

2. Oligonucleotide Synthesis

Once the probe and INVADER oligonucleotide sequences have been designed, the sequences are transferred to the synthesis component. The bar codes are read and the sequences are logged into the synthesis module. Each module consists of 14 MOSS EXPEDITE 16-channel DNA synthesizers (PE Biosystems, Foster City, Calif.), that prepare the primary probes, and two ABI 3948 48-Channel DNA synthesizers (PE Biosystems, Foster City, Calif.), that prepare the INVADER oligonucleotides. Synthesizing a set of two primary and INVADER probes is complete 3-4 hours. The instruments run 24 h/day. Following synthesis, the automating tracking system reads the bar codes and logs the oligonucleotides as having completed the synthesis module.

The synthesis room is equipped with centralized reagent delivery. Acetonitrile is supplied to the synthesizers through stainless steel tubing. De-blocking solution (3% TCA in methylene chloride) is supplied through Teflon tubing. Tubing is designed to attach to the synthesizers without any modification of the synthesizers. The synthesis room is also equipped with an automated waste removal system. Waste containers are equipped with ventilation and contain sensors that trigger removal of waste through centralized tubing when the cache pots are full. Waste is piped to a centralized storage facility equipped with a blow out wall. The pressure in the synthesis instruments is controlled with argon supplied through a centralized system. The argon delivery system includes local tanks supplied from a centralized storage tank.

During synthesis, the efficiency of each step of the reaction is monitored. If an oligonucleotide fails the synthesis process, it is re-synthesized. The bar coding system scans the container of the oligonucleotide and marks it as being sent back for re-synthesis.

Following synthesis, the oligonucleotides are transported to the cleavage and deprotection station. At this stage, completed oligonucleotides are subjected to a final deprotection step and are cleaved from the solid support used for synthesis. The cleavage and deprotection may be performed manually or through automated robotics. The oligonucleotides are cleaved from the solid support used for synthesis by incubation with concentrated NaOH and collected. The cleavage step takes 12 hours. Following cleavage, the bar code scanner scans the oligonucleotide tubes and logs them as having completed the cleavage and deprotection step.

3. Purification

Following synthesis and cleavage, probe oligonucleotides are further purified using HPLC. INVADER oligonucleotides are not purified, but instead proceed directly to desalting (see below).

HPLC is performed on instruments integrated into banks (modules) of 8. Each HPLC module consists of a Leap Technologies 8-port injector connected to 8 automated Beckman-Coulter HPLC instruments. The automatic Leap injector can handle four 96-well plates of cleaved and deprotected primary probes at a time. The Leap injector automatically loads a sample onto each of the 8 HPLCs.

Buffers for HPLC purification are produced by the automated buffer preparation system. The buffer prep system is in a general access area. Prepared buffer is then piped through the wall in to clean room (HEPA environment). The system includes large vat carboys that receive premeasured reagents and water for centralized buffer preparation. The buffers are piped from central prep to HPLCs. The conductivity of the solution in the circulation loop is monitored as a means of verifying both correct content and adequate mixing. The circulation lines are fitted with venturis for static mixing of the solutions; additional mixing occurs as solutions are circulated through the piping loop. The circulation lines are fitted with 0.05 μm filters for sterilization and removal of any residual particulates.

Each purified probe is collected into a 50-ml conical tube in a carrying case in the fraction collector. Collection is based on a set method, which is triggered by an absorbance rate change within a predetermined time window. The HPLC is run at a flow rate of 5-7.5 ml/min (the maximum rate of the pumps is 10 ml/min.) and each column is automatically washed before the injector loads the next sample. The gradient used is described in Tables 3 and 4 and takes 34 minutes to complete (including wash steps to prepare the column for the next sample). When the fraction collector is full of eluted probes, the tubes are transferred manually to customized racks for concentration in a Genevac centrifugal evaporator. The Genevac racks, containing dry oligonucleotide, are then transferred to the TECAN Nap10 column handler for desalting.

4. Desalting

Following HPLC purification (probe oligonucleotides) or cleavage (INVADER oligonucleotides), oligonucleotides move to the desalting station. The dried oligonucleotides are resuspended in a small volume of water. Desalting steps are performed by a TECAN robot system. The racks used in Genevac centrifugation are also used in the desalting step, eliminating the need for transfer of tubes at this step. The racks are also designed to hold the different sizes of desalting columns, such as the NAP-5 and NAP-10 columns. The TECAN robot loads each oligonucleotide onto an individual NAP-5 or NAP-10 column, supplies the buffer, and collects the eluate.

5. Dilution

Following desalting, the oligonucleotides are transferred to the dilute and fill module for concentration normalization and dispenation. Each module consists of three automated probe dilution and normalization stations. Each station consists of a network-linked computer and a Biomek 2000 interfaced with a SPECTRAMAX spectrophotometer Model 190 or PLUS 384 (Molecular Devices Corp., Sunnyvale Calif.) in a HEPA-filtered environment.

The probe and INVADER oligonucleotides are transferred onto the Biomek 2000 deck and the sequence files are downloaded into the Biomek 2000. The Biomek 2000 automatically transfers a sample of each oligonucleotide to an optical plate, which the spectrophotometer reads to measure the A260 absorbance. Once the A260 has been determined, an Excel program integrated with the Biomek software uses the measured absorbance and the sequence information to calculate the concentration of each oligonucleotide. The software then prepares a dilution table for each oligonucleotide. The probe and INVADER oligonucleotide are each diluted by the Biomek to a concentration appropriate for their intended use. The instrument then combines and dispenses the probe and INVADER oligonucleotides into 1.5 ml microtubes for each SNP set. The completed set of oligonucleotides contains enough material for 5,000 SNP assays.

If an oligonucleotide fails the dilution step, it is first re-diluted. If it again fails dilution, the oligonucleotide is re-purified or returned for re-synthesis. The progress of the oligonucleotide through the dilution module is tracked by the bar coding system. Oligonucleotides that pass the dilution module are scanned as having completed dilution and are moved to the next module.

6. Quality Control

Before shipping, the SNP set is subjected to a quality control assay in a SAGIAN CORE System (Beckman Coulter), which is read on a ABI 7700 real time fluorescence reader (PE Biosystems). The QC assay uses two no target blanks as negative controls and five untyped genomic samples as targets.

The quality control assay is performed in segments. In each segment, the operator or automated system performs the following steps: log on; select location; step specific activity; and log off. The ADS system is responsible for tracking tubes. If a tube is missing, existing ADS program routines will be used to discard/reorder/search for the tube.

In the first step, a picklist is generated. The list includes the identity of the SNPs that are being tested and the QC method chosen. The tubes containing the oligonucleotide are selected by the automated software and a copy of the picklist is printed. The tubes are removed from inventory by the operator and scanned with the bar code reader and being removed from inventory.

The operator or the automated system then takes the rack setup generated by the picklist and loads the rack. Tubes are scanned as they are placed onto the rack. The scan checks to make sure it is the correct tube and displays the location in the rack where the tube is to be placed. Completed racks are placed in a holding area to await the robot prep and robot run.

The operator or the automated system then chooses the genomics and reagent stock to be loaded onto the robot. The robot is programmed with the specific method for the SNP set generated. Lot numbers of the genomics and reagents are recorded. Racks are placed in the proper carousel location. After all the carousel locations have been loaded the robot is run.

Places are then incubated on the robot. The plates are placed onto heatblocks for a period of time specified in the method. The operator then takes the plate and loads it into the ABI 7700. A scan is started using the 7700 software. When the scan is completed the operator transfers the output file onto a Macintosh computer hard drive. The then starts the analysis application and scans in the plate bar code. The software instructs the operator to browse to the saved output file. The software then reads the file into the database and deletes the file.

The results of the QC assay are then analyzed. The operator scans plate in at workstation PC and reviews automated analysis. The automated actions are performed using a spreadsheet system. The automated spreadsheet program returns one of the following results:

1) Mark SNP Oligonucleotide ready for full fill (Operator discards diluted Probe/INVADER mixes. Requires no other action).
2) ReAssess Failed Oligonucleotide (Requires no action by operator, handled by automation).
3) Redilute Failed Oligonucleotide (Operator discards diluted tubes. Requires no other action).
4) Order Target Oligonucleotide (Requires no action by operator, handled by automation).
5) Fail Oligo(s) Discard Oligo(s) (Operator discards diluted tubes. Operator discards un-diluted tubes. Requires no other action).
6) Fail SNP (Operator discards diluted tubes. Operator discards un-diluted tubes. Requires no other action).
7) Full SNP Redesign (Operator discards diluted tubes. Operator discards un-diluted tubes. Requires no other action).
8) Partial SNP Redesign (Operator discards diluted tubes. Operator discards some un-diluted tubes. Requires no other action).
9) Manual Intervention (This step occurs if the operator or software has determined the SNP requires manual attention. This step puts the SNP "on hold" in the tracking system).

The operator then views each SNP analysis and either approves all automated actions, approves individual actions, marks actions as needing additional review, passes on reviewing anything, or over rides automated actions.

Once the SNP set has passed the QC analysis, the oligonucleotides are transferred to the packaging station.

In some embodiments, the produced detection assay is screened against a plurality of known sequences designed to represent one or more population groups, e.g., to determine the ability of the detection assay to detect the intended target among the diverse alleles found in the general population. In preferred embodiments, the frequency of occurrence of the SNP allele in each of the one or more population groups is determined using the produced detection assay. Data collected may be used to satisfy regulatory requirements, if the detection assay is to be used as a clinical product.

IV. Sequence Inputs and User Interfaces

Sequences may be input for analysis from any number of sources. In many embodiments, sequence information is entered into a computer. The computer need not be the same computer system that carries out in silico analysis. In some preferred embodiments, candidate target sequences may be entered into a computer linked to a communication network (e.g., a local area network, Internet or Intranet). In such embodiments, users anywhere in the world with access to a communication network may enter candidate sequences at their own locale. In some embodiments, a user interface is provided to the user over a communication network (e.g., a World Wide Web-based user interface), containing entry fields for the information required by the in silico analysis (e.g., the sequence of the candidate target sequence). The use of a Web based user interface has several advantages. For example, by providing an entry wizard, the user interface can ensure that the user inputs the requisite amount of information in the correct format. In some embodiments, the user interface requires that the sequence information for a target sequence be of a minimum length (e.g., 20 or more, 50 or more, 100 or more nucleotides) and be in a single format (e.g., FASTA). In other embodiments, the information can be input in any format and the systems and methods of the present invention edit or alter the input information into a suitable form for analysis. For example, if an input target sequence is too short, the systems and methods of the present invention search public databases for the short sequence, and if a unique sequence is identified, convert the short sequence into a suitably long sequence by adding nucleotides on one or both of the ends of the input target sequence. Likewise, if sequence information is entered in an undesirable format or contains extraneous, non-sequence characters, the sequence can be modified to a standard format (e.g., FASTA) prior to further in silico analysis. The user interface may also collect information about the user, including, but not limited to, the name and address of the user. In some embodiments, target sequence entries are associated with a user identification code.

In some embodiments, sequences are input directly from assay design software (e.g., the INVADERCREATOR software.

In preferred embodiments, each sequence is given an ID number. The ID number is linked to the target sequence being analyzed to avoid duplicate analyses. For example, if the in silico analysis determines that a target sequence corresponding to the input sequence has already been analyzed, the user is informed and given the option of by-passing in silico analysis and simply receiving previously obtained results.

Web-Ordering Systems and Methods

Users who wish to order detection assays, have detection assay designed, or gain access to databases or other information of the present invention may employ a electronic communication system (e.g., the Internet). In some embodiments, an ordering and information system of the present invention is connected to a public network to allow any user access to the information. In some embodiments, private electronic communication networks are provided. For example, where a customer or user is a repeat customer (e.g., a distributor or large diagnostic laboratory), the full-time dedicated private connection may be provided between a computer system of the customer and a computer system of the systems of the present invention. The system may be arranged to minimize human interaction. For example, in some embodiments, inventory control software is used to monitor the number and type of detection assays in possession of the customer. A query is sent at defined intervals to determine if the customer has the appropriate number and type of detection assay, and if shortages are detected, instructions are sent to design, produce, and/or deliver additional assays to the customer. In some embodiments, the system also monitors inventory levels of the seller and in preferred embodiments, is integrated with production systems to manage production capacity and timing.

In some embodiments, a user-friendly interface is provided to facilitate selection and ordering of detection assays. Because of the hundreds of thousands of detection assays available and/or polymorphisms that the user may wish to interrogate, the user-friendly interface allows navigation through the complex set of option. For example, in some embodiments, a series of stacked databases are used to guide users to the desired products. In some embodiments, the first layer provides a display of all of the chromosomes of an organism. The user selects the chromosome or chromosomes of interest. Selection of the chromosome provides a more detailed map of the chromosome, indicating banding regions on the chromosome. Selection of the desired band leads to a map showing gene locations. One or more additional layers of detail provide base positions of polymorphisms, gene names, genome database identification tags, annotations, regions of the chromosome with pre-existing developed detection assays that are available for purchase, regions where no pre-existing developed assays exist but that are available for design and production, etc. Selecting a region, polymorphism, or detection assay takes the user to an ordering interface, where information is collected to initiate detection assay design and/or ordering. In some embodiments, a search engine is provided, where a gene name, sequence range, polymorphism or other query is entered to more immediately direct the user to the appropriate layer of information.

In some embodiments, the ordering, design, and production systems are integrated with a finance system, where the pricing of the detection assay is determined by one or more factors: whether or not design is required, cost of goods based on the components in the detection assay, special discounts for certain customers, discounts for bulk orders, discounts for re-orders, price increases where the product is covered by intellectual property or contractual payment obligations to third parties, and price selection based on usage. For example, where detection assays are to be used for or are certified for clinical diagnostics rather than research applications, pricing is increased. In some embodiments, the pricing increase for clinical products occurs automatically. For example, in some embodiments, the systems of the present invention are linked to FDA, public publication, or other databases to determine if a product has been certified for clinical diagnostic or ASR use.

EXAMPLES

The following examples are provided in order to demonstrate and further illustrate certain preferred embodiments and aspects of the present invention and are not to be construed as limiting the scope thereof.

In the experimental disclosure which follows, the following abbreviations apply: N (normal); M (molar); mM (millimolar); μM (micromolar); mol (moles); mmol (millimoles); μmol (micromoles); nmol (nanomoles); pmol (picomoles); g (grams); mg (milligrams); μg (micrograms); ng (nanograms); l or L (liters); ml (milliliters); μl (microliters); cm (centimeters); mm (millimeters); μm (micrometers); nm (nanometers); DS (dextran sulfate); C (degrees Centigrade); and Sigma (Sigma Chemical Co., St. Louis, Mo.).

Example 1

Designing a 10-PLEX (Manual)

Test for Invader Assays

The following experimental example describes the manual design of amplification primers for a multiplex amplification reaction, and the subsequent detection of the amplicons by the INVADER assay.

Ten target sequences were selected from a set of pre-validated SNP-containing sequences, available in a TWT in-house oligonucleotide order entry database (see FIG. 5). Each target contains a single nucleotide polymorphism (SNP) to which an INVADER assay had been previously designed. The INVADER assay oligonucleotides were designed by the INVADER CREATOR software (Third Wave Technologies, Inc. Madison, Wis.), thus the footprint region in this example is defined as the INVADER "footprint", or the bases covered by the INVADER and the probe oligonucleotides, optimally positioned for the detection of the base of interest, in this case, a single nucleotide polymorphism (See FIG. 5). About 200 nucleotides of each of the 10 target sequences were analyzed for the amplification primer design analysis, with the SNP base residing about in the center of the sequence. The sequences are shown in FIG. 5.

Criteria of maximum and minimum probe length (defaults of 30 nucleotides and 12 nucleotides, respectively) were defined, as was a range for the probe melting temperature Tm of 50-60° C. In this example, to select a probe sequence that will perform optimally at a pre-selected reaction temperature, the melting temperature ($T_m$) of the oligonucleotide is calculated using the nearest-neighbor model and published parameters for DNA duplex formation (Allawi and SantaLucia, Biochemistry, 36:10581 [1997], herein incorporated by reference). Because the assay's salt concentrations are often different than the solution conditions in which the nearest-neighbor parameters were obtained (1 M NaCl and no divalent metals), and because the presence and concentration of the enzyme influence optimal reaction temperature, an adjustment should be made to the calculated $T_m$ to determine the optimal temperature at which to perform a reaction. One way of compensating for these factors is to vary the value provided for the salt concentration within the melting temperature calculations. This adjustment is termed a 'salt correction'. The term "salt correction" refers to a variation made in the value provided for a salt concentration for the purpose of reflecting the effect on a $T_m$ calculation for a nucleic acid duplex of a non-salt parameter or condition affecting said duplex. Variation of the values provided for the strand concentrations will also affect the outcome of these calculations. By using a value of 280 nM NaCl (SantaLucia, Proc Natl Acad Sci USA, 95:1460 [1998], herein incorporated by reference) and strand concentrations of about 10 pM of the probe and 1 fM target, the algorithm for used for calculating probe-target melting temperature has been adapted for use in predicting optimal primer design sequences.

Next, the sequence adjacent to the footprint region, both upstream and downstream were scanned and the first A or C was chosen for design start such that for primers described as 5'-N[x]-N[x−1]- . . . -N[4]-N[3]-N[2]-N[1]-3', where N[1] should be an A or C. Primer complementarity was avoided by using the rule that: N[2]-N[1] of a given oligonucleotide primer should not be complementary to N[2]-N[1] of any other oligonucleotide, and N[3]-N[2]-N[1] should not be complementary to N[3]-N[2]-N[1] of any other oligonucleotide. If these criteria were not met at a given N[1], the next base in the 5' direction for the forward primer or the next base in the 3' direction for the reverse primer will be evaluated as an N[1] site. In the case of manual analysis, A/C rich regions were targeted in order to minimize the complementarity of 3' ends.

In this example, an INVADER assay was performed following the multiplex amplification reaction. Therefore, a section of the secondary INVADER reaction oligonucleotide (the FRET oligonucleotide sequence, see FIG. 2) was also incorporated as criteria for primer design; the amplification primer sequence should be less than 80% homologous to the specified region of the FRET oligonucleotide.

The output primers for the 10-plex multiplex design are shown in FIG. 5). All primers were synthesized according to standard oligonucleotide chemistry, desalted (by standard methods) and quantified by absorbance at A260 and diluted to 50 μM concentrated stock. Multiplex PCR was then carried out using 10-plex PCR using equimolar amounts of primer (0.01 uM/primer) under the following conditions; 100 mM KCl, 3 mM $MgCl_2$, 10 mM Tris pH8.0, 200 uM dNTPs, 2.5 U Taq DNA polymerase, and 10 ng of human genomic DNA (hgDNA) template in a 50 ul reaction. The reaction was incubated for (94 C/30 sec, 50 C/44 sec.) for 30 cycles. After incubation, the multiplex PCR reaction was diluted 1:10 with water and subjected to INVADER analysis using INVADER Assay FRET Detection Plates, 96 well genomic biplex, 100 ng CLEAVASE VIII enzyme, INVADER assays were assembled as 15 ul reactions as follows; 1 ul of the 1:10 dilution of the PCR reaction, 3 ul of PPI mix, 5 ul of 22.5 mM MgCl2, 6 ul of dH20, covered with 15 ul of CHILLOUT liquid wax. Samples were denatured in the INVADER biplex by incubation at 95 C for 5 min., followed by incubation at 63 C and fluorescence measured on a Cytofluor 4000 at various timepoints.

Using the following criteria to accurately make genotyping calls (FOZ_FAM+FOZ_RED-2>0.6), only 2 of the 10 INVADER assay calls can be made after 10 minutes of incubation at 63 C, and only 5 of the 10 calls could be made following an additional 50 min of incubation at 63 C (60 min.) (See, FIG. 6A). At the 60 min time point, the variation between the detectable FOZ values is over 100 fold between the strongest signal (FIG. 6A, 41646, FAM_FOZ+RED_FOZ−2=54.2, which is also is far outside of the dynamic range of the reader) and the weakest signal (FIG. 6A, 67356, FAM_FOZ+RED_FOZ−2=0.2). Using the same INVADER assays directly against 100 ng of human genomic DNA (where equimolar amounts of each target would be available), all reads could be made with in the dynamic range of the reader and variation in the FOZ values was approximately seven fold between the strongest (FIG. 6, 53530, FAM_FOZ+RED_FOZ−2=3.1) and weakest (FIG. 6, 53530, FAM_FOZ+RED_FOZ−2=0.43) of the assays. This suggests that the dramatic discrepancies in FOZ values seen between different amplicons in the same multiplex PCR reaction is a function of biased amplification, and not variability attributable to INVADER assay. Under these conditions, FOZ values generated by different INVADER assays are directly comparable to one another and can reliably be used as indicators of the efficiency of amplification.

Estimation of amplification factor of a given amplicon using FOZ values. In order to estimate the amplification factor (F) of a given amplicon, the FOZ values of the INVADER assay can be used to estimate amplicon abundance. The FOZ of a given amplicon with unknown concentration at a given time (FOZm) can be directly compared to the FOZ of a known amount of target (e.g. 100 ng of genomic DNA=30,000 copies of a single gene) at a defined point in time ($FOZ_{240}$, 240 min) and used to calculate the number of copies of the unknown amplicon. In equation 1, FOZm represents the sum of RED_FOZ and FAM_FOZ of an unknown concentration of target incubated in an INVADER assay for a given amount of time (m). $FOZ_{240}$ represents an empirically determined value of RED_FOZ (using INVADER assay 41646), using for a known number of copies of target (e.g. 100 ng of hgDNA≅30,000 copies) at 240 minutes.

$$F=((FOZ_m-1)*500/(FOZ_{240}-1))*(240/m)^2 \qquad \text{(equation 1a)}$$

Although equation 1a is used to determine the linear relationship between primer concentration and amplification factor F, equation 1a' is used in the calculation of the amplification factor F for the 10-plex PCR (both with equimolar amounts of primer and optimized concentrations of primer), with the value of D representing the dilution factor of the PCR reaction. In the case of a 1:3 dilution of the 50 ul multiplex PCR reaction. D=0.3333.

$$F=((FOZ_m-2)*500/(FOZ_{240}-1)*D)*(240/m)^2 \qquad \text{(equation 1a')}$$

Although equations 1a and 1a' will be used in the description of the 10-plex multiplex PCR, a more correct adaptation of this equation was used in the optimization of primer concentrations in the 107-plex PCR. In this case, $FOZ_{240}$=the average of $FAM\_FOZ_{240}+RED\_FOZ_{240}$ over the entire INVADER MAP plate using hgDNA as target ($FOZ_{240}$=3.42) and the dilution factor D is set to 0.125.

$$F=((FOZ_m-2)*500/(FOZ_{240}-2)*D)*(240/m)^2 \qquad \text{(equation 1b)}$$

It should be noted that in order for the estimation of amplification factor F to be more accurate, FOZ values should be within the dynamic range of the instrument on which the reading are taken. In the case of the Cytofluor 4000 used in this study, the dynamic range was between about 1.5 and about 12 FOZ.

Section 3. Linear Relationship between Amplification Factor and Primer Concentration.

Figure 7:
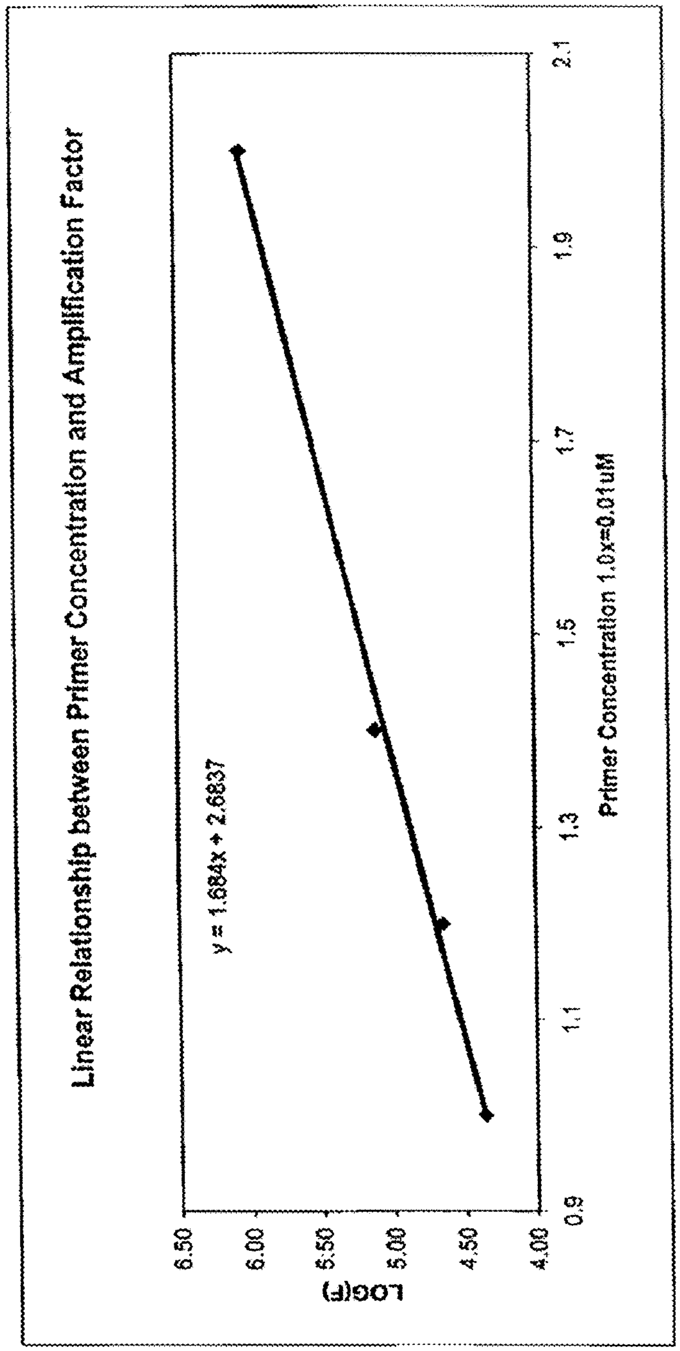
Figure 18:
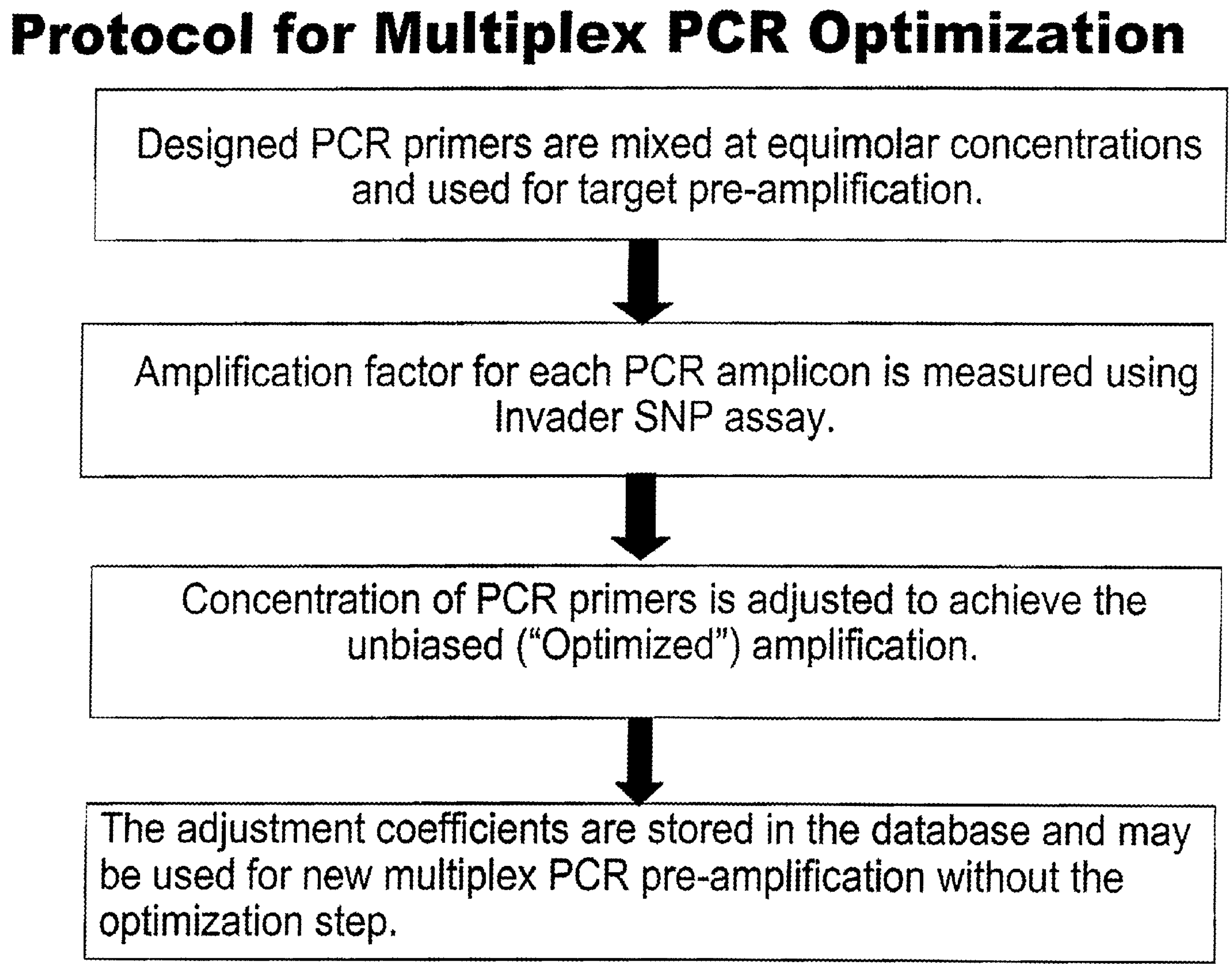
FIG. 18 shows one protocol for Multiplex PCR optimization according to the present invention.

In order to determine the relationship between primer concentration and amplification factor (F), four distinct uniplex PCR reactions were run at using primers 1117-70-17 and 1117-70-18 at concentrations of 0.01 uM, 0.012 uM, 0.014 uM, 0.020 uM respectively. The four independent PCR reactions were carried out under the following conditions; 100 mM KCl, 3 mM MgCl, 10 mM Tris pH 8.0, 200 uM dNTPs using 10 ng of hgDNA as template. Incubation was carried out at (94 C/30 sec., 50 C/20 sec.) for 30 cycles. Following PCR, reactions were diluted 1:10 with water and run under standard conditions using INVADER Assay FRET Detection Plates, 96 well genomic biplex, 100 ng CLEAVASE VIII enzyme. Each 15 ul reaction was set up as follows; 1 ul of 1:10 diluted PCR reaction, 3 ul of the PPI mix SNP#47932, 5 ul 22.5 mM MgCl2, 6 ul of water, 15 ul of CHILLOUT liquid wax. The entire plate was incubated at 95 C for 5 min, and then at 63 C for 60 min at which point a single read was taken on a Cytofluor 4000 fluorescent plate reader. For each of the four different primer concentrations (0.01 uM, 0.012 uM, 0.014 uM, 0.020 uM) the amplification factor F was calculated using equation 1a, with FOZm=the sum of FOZ_FAM and FOZ_RED at 60 minutes, m=60, and $FOZ_{240}$=1.7. In plotting the primer concentration of each reaction against the log of the amplification factor Log(F), a strong linear relationship was noted (FIG. 7). Using the data points in FIG. 7, the formula describing the linear relationship between amplification factor and primer concentration is described in equation 2:

$$Y=1.684X+2.6837 \quad \text{(equation 2a)}$$

Using equation 2, the amplification factor of a given amplicon Log(F)=Y could be manipulated in a predictable fashion using a known concentration of primer (X). In a converse manner, amplification bias observed under conditions of equimolar primer concentrations in multiplex PCR, could be measured as the "apparent" primer concentration (X) based on the amplification factor F. In multiplex PCR, values of "apparent" primer concentration among different amplicons can be used to estimate the amount of primer of each amplicon required to equalize amplification of different loci:

$$X=(Y-2.6837)/1.68 \quad \text{(equation 2b)}$$

Section 4. Calculation of Apparent Primer Concentrations from a Balanced Multiplex Mix.

As described in a previous section, primer concentration can directly influence the amplification factor of given amplicon. Under conditions of equimolar amounts of primers, FOZm readings can be used to calculate the "apparent" primer concentration of each amplicon using equation 2. Replacing Y in equation 2 with log(F) of a given amplification factor and solving for X, gives an "apparent" primer concentration based on the relative abundance of a given amplicon in a multiplex reaction. Using equation 2 to calculate the "apparent" primer concentration of all primers (provided in equimolar concentration) in a multiplex reaction (FIG. 3A), provides a means of normalizing primer sets against each other. In order to derive the relative amounts of each primer that should be added to an "Optimized" multiplex primer mix R, each of the "apparent" primer concentrations should be divided into the maximum apparent primer concentration ($X_{max}$), such that the strongest amplicon is set to a value of 1 and the remaining amplicons to values equal or greater than 1

$$R[n]=Xmax/X[n] \quad \text{(equation 3)}$$

Using the values of R[n] as an arbitrary value of relative primer concentration, the values of R[n] are multiplied by a constant primer concentration to provide working concentrations for each primer in a given multiplex reaction. In the example shown, the amplicon corresponding to SNP assay 41646 has an R[n] value equal to 1. All of the R[n] values were multiplied by 0.01 uM (the original starting primer concentration in the equimolar multiplex PCR reaction) such that lowest primer concentration is R[n] of 41646 which is set to 1, or 0.01 uM. The remaining primer sets were also proportionally increased as shown in FIG. 8. The results of multiplex PCR with the "optimized" primer mix are described below.

Section 5 Using Optimized Primer Concentrations in Multiplex PCR, Variation in FOZ's Among 10 INVADER Assays are Greatly Reduced.

Multiplex PCR was carried out using 10-plex PCR using varying amounts of primer based on the volumes indicated in FIG. 8 (X[max] was SNP41646, setting 1×=0.01 uM/primer). Multiplex PCR was carried out under conditions identical to those used in with equimolar primer mix; 100 mMKCl, 3 mMMgCl, 10 mM Tris pH8.0, 200 uM dNTPs, 2.5 U taq, and 10 ng of hgDNA template in a 50 ul reaction. The reaction was incubated for (94 C/30 sec, 50 C/44 sec.) for 30 cycles. After incubation, the multiplex PCR reaction was diluted 1:10 with water and subjected to INVADER analysis. Using INVADER Assay FRET Detection Plates, (96 well genomic biplex, 100 ng CLEAVSE VIII enzyme), reactions were assembled as 15 ul reactions as follows; 1 ul of the 1:10 dilution of the PCR reaction, 3 ul of the appropriate PPI mix, 5 ul of 22.5 mM MgCl2, 6 ul of dH20. An additional 15 ul of CHILL OUT was added to each well, followed by incubation at 95 C for 5 min. Plates were incubated at 63 C and fluorescence measured on a Cytofluor 4000 at 10 min.

Using the following criteria to accurately make genotyping calls (FOZ_FAM+FOZ_RED−2>0.6), all 10 of 10 (100%) INVADER calls can be made after 10 minutes of incubation at 63 C. In addition, the values of FAM+RED−2 (an indicator of overall signal generation, directly related to amplification factor (see equation 2)) varied by less than seven fold between the lowest signal (FIG. 9, 67325, FAM+RED−2=0.7) and the highest (FIG. 9, 47892, FAM+RED−2=4.3).

Example 2

Design of 101-plex PCR using the Software Application

Using the TWT Oligo Order Entry Database, 144 sequences of less than 200 nucleotides in length were obtained, with SNPs annotated using brackets to indicate the SNP position for each sequence (e.g. NNNNNNN[$N_{(wt)}$/$N_{(mt)}$]NNNNNNNN). In order to expand sequence data flanking the SNP of interest, sequences were expanded to approximately 1 kB in length (500 nts flanking each side of the SNP) using BLAST analysis. Of the 144 starting sequences, 16 could not expanded by BLAST, resulting in a final set of 128 sequences expanded to approximately 1 kB length (See, FIG. 10). These expanded sequences were provided to the user in Excel format with the following information for each sequence; (1) TWT Number, (2) Short Name Identifier, and (3) sequence (see FIG. 10). The Excel file was converted to a comma delimited format and used as the input file for Primer Designer INVADER CREATOR v1.3.3. software (this version of the program does not screen for FRET reactivity of the primers, nor does it allow the user to specify the maximum length of the primer). INVADER CREATOR Primer Designer v1.3.3., was run using default conditions (e.g. minimum primer size of 12, maximum of 30), with the exception of $Tm_{low}$ which was set to 60 C. The output file (see FIG. 10, bottom of each sheet shows footprint region in upper case letters and SNP in brackets) contained 128 primer sets (256 primers, See FIG. 12), four of which were thrown out due to excessively long primer sequences (SNP # 47854, 47889, 54874, 67396), leaving 124 primers sets (248 primers) available for synthesis. The remaining primers were synthesized using standard procedures at the 200 nmol scale and purified by desalting. After synthesis failures, 107 primer sets were available for assembly of an equimolar 107-plex primer mix (214 primers, See FIG. 12). Of the 107 primer sets available for amplification, only 101 were present on the INVADER MAP plate to evaluate amplification factor.

Multiplex PCR was carried out using 101-plex PCR using equimolar amounts of primer (0.025 uM/primer) under the following conditions; 100 mMKCl, 3 mM MgCl, 10 mM Tris pH8.0, 200 uM dNTPs, and 10 ng of human genomic DNA (hgDNA) template in a 50 ul reaction. After denaturation at 95 C for 10 min, 2.5 units of Taq was added and the reaction incubated for (94 C/30 sec, 50 C/44 sec.) for 50 cycles. After incubation, the multiplex PCR reaction was diluted 1:24 with water and subjected to INVADER assay analysis using INVADER MAP detection platform. Each INVADER MAP assay was run as a 6 ul reaction as follows; 3 ul of the 1:24 dilution of the PCR reaction (total dilution 1:8 equaling D=0.125), 3 ul of 15 mM MgCl2 covered with covered with 6 ul of CHILLOUT. Samples were denatured in the INVADER MAP plate by incubation at 95 C for 5 min., followed by incubation at 63 C and fluorescence measured on a Cytofluor 4000 (384 well reader) at various timepoints over 160 minutes. Analysis of the FOZ values calculated at 10, 20, 40, 80, 160 min. shows that correct calls (compared to genomic calls of the same DNA sample) could be made for 94 of the 101 amplicons detectable by the INVADER MAP platform (FIG. 13 and FIG. 14). This provides proof that the INVADER CREATOR Primer Designer software can create primer sets which function in highly multiplex PCR.

In using the FOZ values obtained throughout the 160 min. time course, amplification factor F and R[n] were calculated for each of the 101 amplicons (FIG. 15). R[nmax] was set at 1.6, which although Low end corrections were made for amplicons which failed to provide sufficient FOZm signal at 160 min., assigning an arbitrary value of 12 for R[n]. High end corrections for amplicons whose FOZm values at the 10 min. read, an R[n] value of 1 was arbitrarily assigned. Optimized primer concentrations of the 101-plex were calculated using the basic principles outlined in the 10-plex example and equation 1b, with an R[n] of 1 corresponding to 0.025 uM primer (see FIG. 15 for various primer concentrations). Multiplex PCR was under the following conditions; 100 mMKCl, 3 mM MgCl, 10 mM Tris pH8.0, 200 uM dNTPs, and 10 ng of human genomic DNA (hgDNA) template in a 50 ul reaction. After denaturation at 95 C for 10 min, 2.5 units of Taq was added and the reaction incubated for (94 C/30 sec, 50 C/44 sec.) for 50 cycles. After incubation, the multiplex PCR reaction was diluted 1:24 with water and subjected to INVADER analysis using INVADER MAP detection platform. Each INVADER MAP assay was run as a 6 ul reaction as follows; 3 ul of the 1:24 dilution of the PCR reaction (total dilution 1:8 equaling D=0.125), 3 ul of 15 mM MgCl2 covered with covered with 6 ul of CHILLOUT. Samples were denatured in the INVADER MAP plate by incubation at 95 C for 5 min., followed by incubation at 63 C and fluorescence measured on a Cytofluor 4000 (384 well reader) at various timepoints over 160 minutes. Analysis of the FOZ values was carried out at 10, 20, and 40 min. and compared to calls made directly against the genomic DNA. Shown in FIG. 13, is a comparison between calls made at 10 min. with a 101-plex PCR with the equimolar primer concentrations versus calls that were made at 10 min. with a 101-plex PCR run under optimized primer concentrations. Additional data for this example is shown in FIGS. 16*a*, 16*b*, and 17). Under equimolar primer concentration, multiplex PCR results in only 50 correct calls at the 10 min time point, where under optimized primer concentrations multiplex PCR results in 71 correct calls, resulting in a gain of 21 (42%) new calls. Although all 101 calls could not be made at the 10 min timepoint, 94 calls could be made at the 40 min. timepoint suggesting the amplification efficiency of the majority of amplicons had improved. Unlike the 10-plex optimization that only required a single round of optimization, multiple rounds of optimization may be required for more complex multiplexing reactions to balance the amplification of all loci.

Example 3

Use of the Invader Assay to Determine Amplification Factor of PCR

The INVADER assay can be used to monitor the progress of amplification during PCR reactions, i.e., to determine the amplification factor F that reflects efficiency of amplification of a particular amplicon in a reaction. In particular, the INVADER assay can be used to determine the number of molecules present at any point of a PCR reaction by reference to a standard curve generated from quantified reference DNA molecules. The amplification factor F is measured as a ratio of PCR product concentration after amplification to initial target concentration. This example demonstrates the effect of varying primer concentration on the measured amplification factor.

PCR reactions were conducted for variable numbers of cycles in increments of 5, i.e., 5, 10, 15, 20, 25, 30, so that the progress of the reaction could be assessed using the INVADER assay to measure accumulated product. The reactions were diluted serially to assure that the target amounts did not saturate the INVADER assay, i.e., so that the measurements could be made in the linear range of the assay. INVADER assay standard curves were generated using a dilution series containing known amounts of the amplicon. This standard curve was used to extrapolate the number of amplified DNA fragments in PCR reactions after the indicated number of cycles. The ratio of the number of molecules after a given number of PCR cycles to the number present prior to amplification is used to derive the amplification factor, F, of each PCR reaction.

PCR Reactions

PCR reactions were set up using equimolar amounts of primers (e.g., 0.02 μM or 0.1 μM primers, final concentration). Reactions at each primer concentration were set up in triplicate for each level of amplification tested, i.e., 5, 10, 15, 20, 25, and 30 PCR cycles. One master mix sufficient for 6 standard PCR reactions (each in triplicate×2 primer concentrations) plus 2 controls×6 tests (5, 10, 15, 20, 25, or 30 cycles of PCR) plus enough for extra reactions to allow for overage.

Serial Dilutions of PCR Reaction Products

In order to ensure that the amount of PCR product added as target to the INVADER assay reactions would not exceed the dynamic range of the real time assay on the PERCEPTIVE BIOSYSTEMS CYTOFLUOR 4000, the PCR reaction products were diluted prior to addition to the INVADER assays. An initial 20-fold dilution was made of each reaction, followed by subsequent five-fold serial dilutions.

To create standards, amplification products generated with the same primers used in the tests of different numbers of cycles were isolated from non-denaturing polyacrylimide gels using standard methods and quantified using the PICOGREEN assay. A working stock of 200 pM was created, and serial dilutions of these concentration standards were created in $dH_2O$ containing tRNA at 30 ng/μl to yield a series with final amplicon concentrations of 0.5, 1, 2.5, 6.25, 15.62, 39, and 100 fM.

INVADER Assay Reactions

Appropriate dilutions of each PCR reaction and the no target control were made in triplicate, and tested in standard, singlicate INVADER assay reactions. One master mix was made for all INVADER assay reactions. In all, there were 6 PCR cycle conditions×24 individual test assays [(1 test of triplicate dilutions×2 primer conditions×3 PCR replicates)=18+6 no target controls]. In addition, there were 7 dilutions of the quantified amplicon standards and 1 no target control in the standard series. The standard series was analyzed in replicate on each of two plates, for an additional 32 INVADER assays. The total number of INVADER assays is 6×24+32=176. The master mix included coverage for 32 reactions. INVADER assay master mix and comprised the following standard components:FRET buffer/Cleavase XI/Mg/PPI mix for 192 plus 16 wells.

The following oligonucleotides were included in the PPI mix.

```
0.25 mM INVADER for assay 2
(GAAGCGGCGCCGGTTACCACCA)           (SEQ ID NO: 757)

2.5 mM A Probe for assay 2
(CGCGCCGAGGTGGTTGAGCAATTCCAA)      (SEQ ID NO: 758)

2.5 mM G Probe for assay 2
(ATGACGTGGCAGACCGGTTGAGCAATTCCA)  (SEQ ID NO: 759)
```

All wells were overlaid with 15 μl mineral oil, incubated at 95° C. 5 min, then at 63° C. read at various intervals, eg. 20, 40, 80, or 160 min, depending on the level of signal generated. The reaction plate was read on a CytoFluor® Series 4000 Fluorescence Multi-Well Plate Reader. The settings used were: 485/20 nm excitation/bandwidth and 530/25 nm emission/bandwidth for F dye detection, and 560/20 nm excitation/bandwidth and 620/40 nm emission/bandwidth for R dye detection. The instrument gain was set for each dye so that the No Target Blank produced between 100-200 Absolute Fluorescence Units (AFUs).

Figure 21:
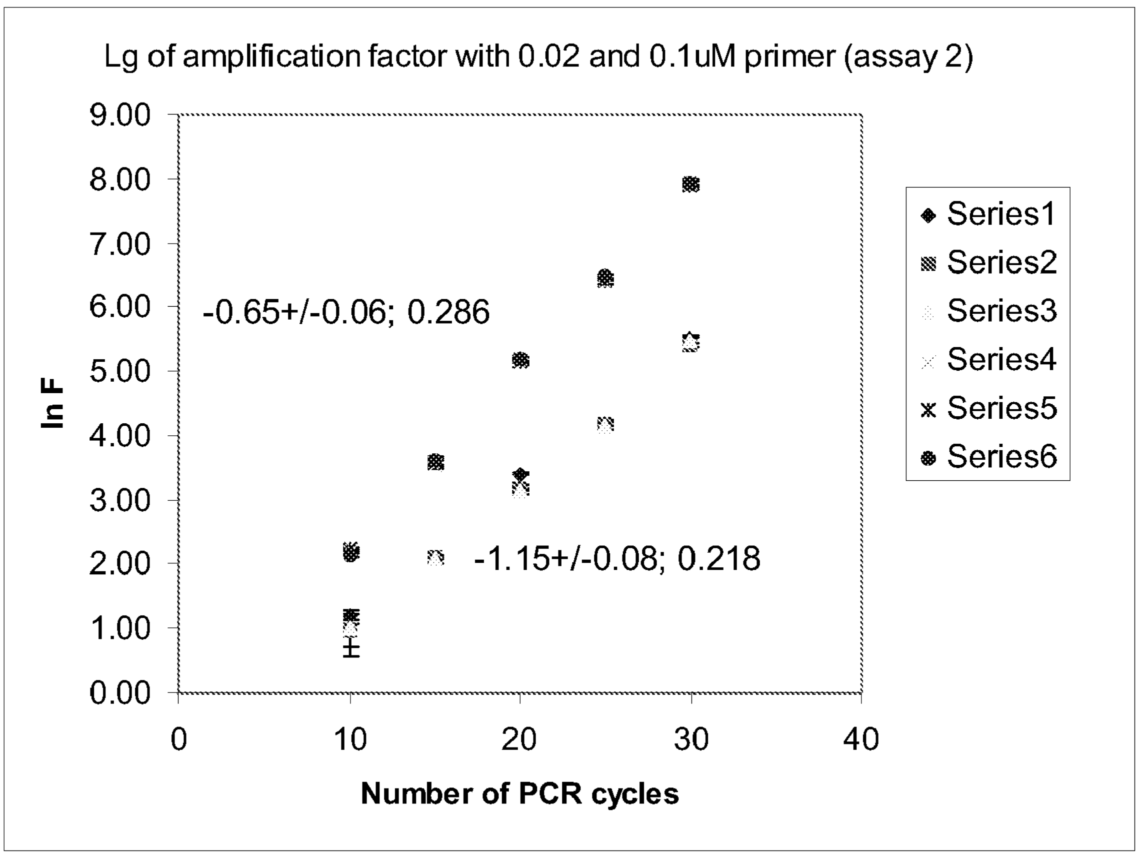
FIG. 21 shows certain results from Example 3.

Results:

FIG. 21 presents the results of the triplicate INVADER assays in a plot of $\log_{10}$ of amplification factor (y-axis) as a function of cycle number (x-axis). The PCR product concentration was estimated from the INVADER assays by extrapolation to the standard curve. The data from the replicate assays were not averaged but instead were presented as multiple, overlapping points in the figure.

These results indicate that the PCR reactions were exponential over the range of cycles tested. The use of different primer concentrations resulted in different slopes such that the slope generated from INVADER assay analysis of PCR reactions carried out with the higher primer concentration (0.1 μM) is steeper than that with the lower (0.02 μM) concentration. In addition, the slope obtained using 0.1 μM approaches that anticipated for perfect doubling (0.301). The amplification factors from the PCR reactions at each primer concentration were obtained from the slopes:

For 0.1 μM primers, slope=0.286; amplification factor: 1.93

For 0.02 μM primers, slope=0.218; amplification factor: 1.65.

The lines do not appear to extend to the origin but rather intercept the X-axis between 0 and 5 cycles, perhaps reflective of errors in estimating the starting concentration of human genomic DNA.

Thus, these data show that primer concentration affects the extent of amplification during the PCR reaction. These data further demonstrate that the INVADER assay is an effective tool for monitoring amplification throughout the PCR reaction.

Example 4

Dependence of Amplification Factor on Primer Concentration

This example demonstrates the correlation between amplification factor, F, and primer concentration, c. In this experiment, F was determined for 2 alleles from each of 6 SNPs amplified in monoplex PCR reactions, each at 4 different primer concentrations, hence 6 primer pairs×2 genomic samples×4 primer concentrations=48 PCR reactions.

Whereas the effect of PCR cycle number was tested on a single amplified region, at two primer concentrations, in Example 3, in this example, all test PCR reactions were run for 20 cycles, but the effect of varying primer concentration was studied at 4 different concentration levels: 0.01 μM, 0.025 μM, 0.05 μM, 0.1 μM. Furthermore, this experiment examines differences in amplification of different genomic regions to investigate (a) whether different genomic regions are amplified to different extents (i.e. PCR bias) and (b) how amplification of different genomic regions depends on primer concentration.

As in Example 3, F was measured by generating a standard curve for each locus using a dilution series of purified, quantified reference amplicon preparations. In this case, 12 different reference amplicons were generated: one for each allele of the SNPs contained in the 6 genomic regions amplified by the primer pairs. Each reference amplicon concentration was tested in an INVADER assay, and a standard curve of fluorescence counts versus amplicon concentration was created. PCR reactions were also run on genomic DNA samples, the products diluted, and then tested in an INVADER assay to determine the extent of amplification, in terms of number of molecules, by comparison to the standard curve.

a. Generation of Standard Curves Using Quantified Reference Amplicons

A total of 8 genomic DNA samples isolated from whole blood were screened in standard biplex INVADER assays to determine their genotypes at 24 SNPs in order to identify samples homozygous for the wild-type or variant allele at a total of 6 different loci.

Once these loci were identified, wild-type and variant genomic DNA samples were analyzed in separate PCR reactions with primers flanking the genomic region containing each SNP. At each SNP, one allele reported to FAM dye and one to RED.

Suitable genomic DNA preparations were then amplified in standard individual, monoplex PCR reactions to generate amplified fragments for use as PCR reference standards as described in Example 3.

Following PCR, amplified DNA was gel isolated using standard methods and previously quantified using the PICOGREEN assay. Serial dilutions of these concentration standards were created as follows:

Each purified amplicon was diluted to create a working stock at a concentration of 200 pM. These stocks were then serially diluted as follows. A working stock solution of each amplicon was prepared with a concentration of 1.25 μM in $dH_2O$ containing tRNA at 30 ng/μl. The working stock was diluted in 96-well microtiter plates and then serially diluted to yield the following final concentrations in the INVADER assay: 1, 2.5, 6.25, 15.6, 39, 100, and 250 fM. One plate was prepared for the amplicons to be detected in the INVADER assay using probe oligonucleotides reporting to FAM dye and one plate for those to be tested with probe oligonucleotides reporting to RED dye. All amplicon dilutions were analyzed in duplicate.

Aliquots of 100 μl were transferred, in this layout, to 96 well MJ Research plates and denatured for 5 min at 95° C. prior to addition to INVADER assays.

b. PCR Amplification of Genomic Samples at Different Primer Concentrations.

PCR reactions were set up for individual amplification of the 6 genomic regions described in the previous example on each of 2 alleles at 4 different primer concentrations, for a total of 48 PCR reactions. All PCRs were run for 20 cycles. The following primer concentrations were tested: 0.01 μM, 0.025 μM, 0.05 μM, and 0.1 μM.

A master mix for all 48 reactions was prepared according to standard procedures, with the exception of the modified primer concentrations, plus overage for an additional 23 reactions (16 reactions were prepared but not used, and overage of 7 additional reactions was prepared).

c. Dilution of PCR Reactions

Prior to analysis by the INVADER assay, it was necessary to dilute the products of the PCR reactions, as described in Examples 1 and 2. Serial dilutions of each of the 48 PCR reactions were made using one 96-well plate for each SNP. The left half of the plate contained the SNPs to be tested with probe oligonucleotides reporting to FAM; the right half, with probe oligonucleotides reporting to RED. The initial dilution was 1:20; a subsequent dilutions were 1:5 up to 1:62,500.

d. INVADER Assay Analysis of PCR Dilutions and Reference Amplicons

INVADER analysis was carried out on all dilutions of the products of each PCR reaction as well as the indicated dilutions of each quantified reference amplicon (to generate a standard curve for each amplicon) in standard biplex INVADER assays.

All wells were overlaid with 15 μl of mineral oil. Samples were heated to 95° C. for 5 min to denature and then incubated at 64° C. Fluorescence measurements were taken at 40 and 80 minutes in a CytoFluor® 4000 fluorescence plate reader (Applied Biosystems, Foster City, Calif.). The settings used were: 485/20 nm excitation/bandwidth and 530/25 nm emission/bandwidth for F dye detection, and 560/20 nm excitation/bandwidth and 620/40 nm emission/bandwidth for R dye detection. The instrument gain was set for each dye so that the No Target Blank produced between 100-200 Absolute Fluorescence Units (AFUs). The raw data is that generated by the device/instrument used to measure the assay performance (real-time or endpoint mode).

Figure 22:
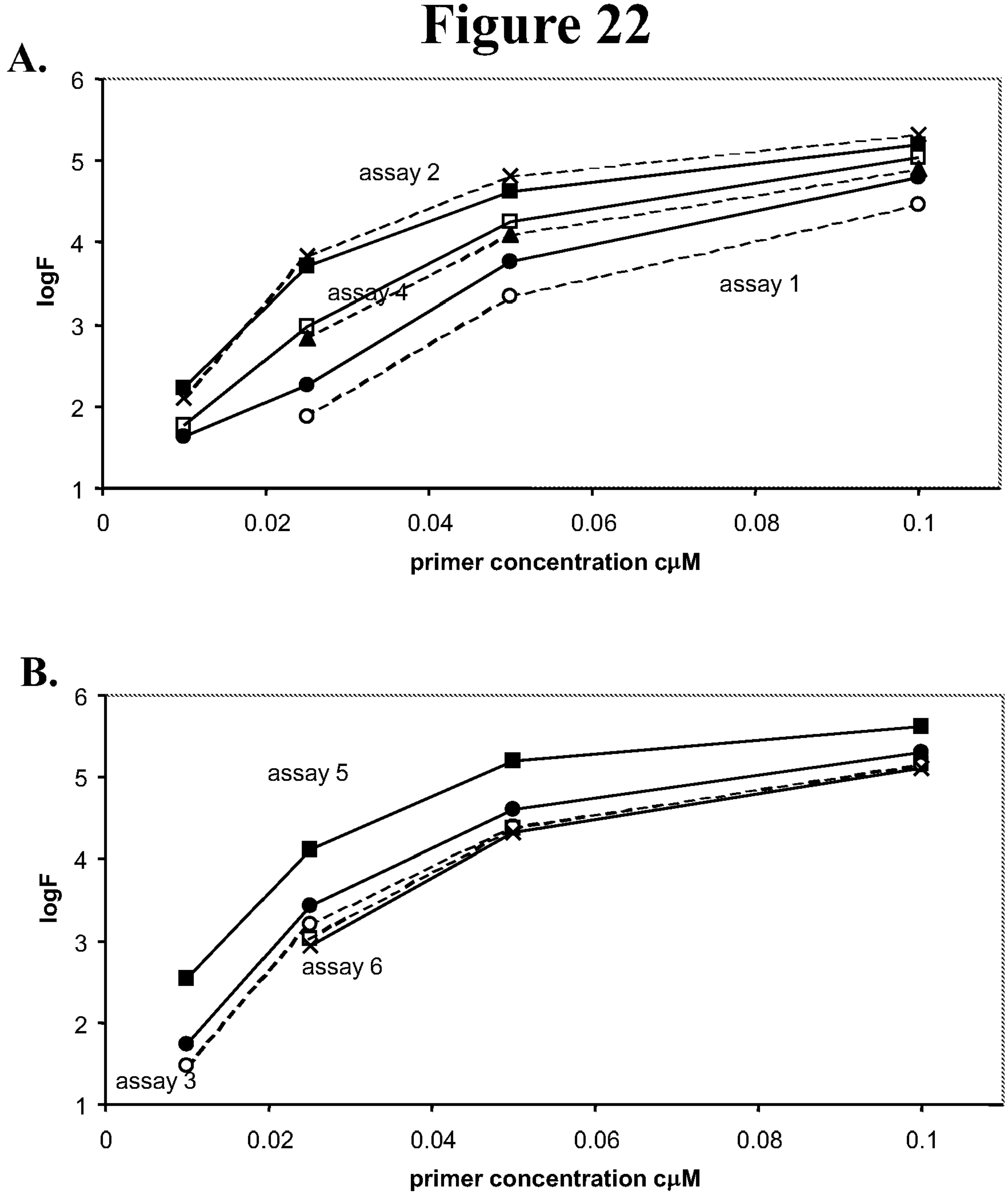
FIG. 22 shows certain results from Example 4.

These results indicate that the dependence of InF on c shown in FIG. 22 demonstrates different amplification rates for the 12 PCRs under the same reaction conditions, although the difference is much smaller within each pair of targets representing the same SNP. The upper plot (22A) illustrates the results obtained from the alleles detected with the INVADER probe oligonucleotide reporting to FAM dye; the lower plot (22B) illustrates those obtained from the alleles reporting to RED (Note: one amplicon expected to report to RED is missing because it mistakenly contained the allele reporting to FAM). The amplification factor strongly depends on c at low primer concentrations with a trend to plateau at higher primer concentrations. This phenomenon can be explained in terms of the kinetics of primer annealing. At high primer concentrations, fast annealing kinetics ensures that primers are bound to all targets and maximum amplification rate is achieved, on the contrary, at low primer concentrations the primer annealing kinetics become a rate limiting step decreasing F.

Figure 23:
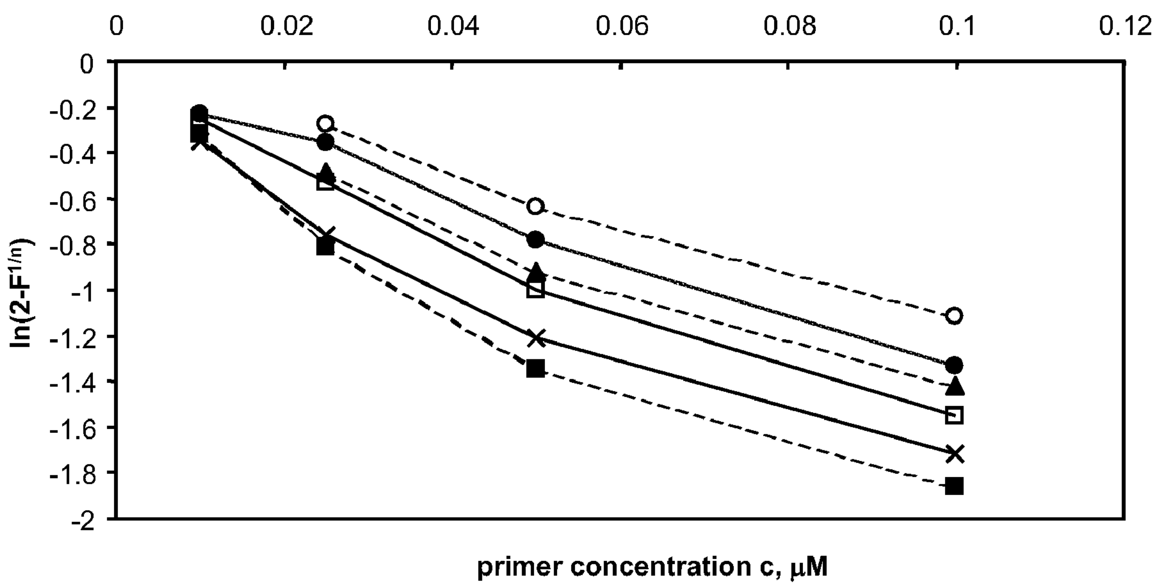
FIG. 23 shows additional results from Example 4.

This analysis suggests that plotting amplification factor as a function of primer concentration in $$\ln\left(2 - F^{\frac{1}{n}}\right)$$

vs. c coordinates should produce a straight line with a slope $-k_a t_a$. Re-plotting of the data shown in FIG. 23 in the $$\ln\left(2 - F^{\frac{1}{n}}\right)$$

vs. c coordinates demonstrates the expected linear dependence for low primer concentrations (low amplification factor) which deviates from the linearity at 0.1 μM primer concentration (F is $10^5$ or larger) due to lower than expected amplification factor. The $k_a t_a$. values can be calculated for each PCR using the following equation.

$$F = z^n = (2 - e^{-k_a c t_a})^n$$

Example 5

Invader Assay Analysis of 192-Plex PCR Reaction

This example describes the use of the INVADER assay to detect the products of a highly multiplexed PCR reaction designed to amplify 192 distinct loci in the human genome.

Genomic DNA Extraction

Genomic DNA was isolated from 5 mls of whole blood and purified using the Autopure, manufactured by Gentra Systems, Inc. (Minneapolis, Minn.). The purified DNA was in 500 μl of $dH_2O$.

Primer Design

Forward and reverse primer sets for the 192 loci were designed using Primer Designer, version 1.3.4 (See Primer Design section above, including FIG. 4A). Target sequences used for INVADER designs, with no more than 500 bases flanking the relevant SNP site, were converted into a comma-delimited text file for use as an input file for PrimerDesigner. PrimerDesigner was run using default parameters, with the exception of oligo $T_m$, which was set at 60° C.

Primer Synthesis

Oligonucleotide primers were synthesized using standard procedures in a Polyplex (GeneMachines, San Carlos, Calif.). The scale was 0.2 μmole, desalted only (not purified) on NAP-10 and not dried down.

PCR Reactions

Two master mixes were created. Master mix 1 contained primers to amplify loci 1-96; master mix 2, 97-192. The mixes were made according to standard procedures and contained standard components. All primers were present at a final concentration of 0.025 μM, with KCl at 100 mM, and MgCl at 3 mM. PCR cycling conditions were as follows in a MJ PTC-100 thermocycler (MJ Research, Waltham, Mass.): 95° C. for 15 min; 94° C. for 30 sec, then 55° C. 44 sec×50 cycles Following cycling, all 4 PCR reactions were combined and aliquots of 3 μl were distributed into a 384 deep-well plate using a CYBI-well 2000 automated pipetting station (CyBio AG, Jena, Germany). This instrument makes individual reagent additions to each well of a 384-well microplate. The reagents to be added are themselves arrayed in 384-well deep half plates.

INVADER Assay Reactions

INVADER assays were set up using the CYBI-well 2000. Aliquots of 3 μl of the genomic DNA target were added to the appropriate wells. No target controls were comprised of 3 μl of Te (10 mM Tris, pH 8.0, 0.1 mM EDTA). The reagents for use in the INVADER assays were standard PPI mixes, buffer, FRET oligonucleotides, and Cleavase VIII enzyme and were added individually to each well by the CYBI-well 2000.

Following the reagent additions, 6 μl of mineral oil were overlaid in each well. The plates were heated in a MJ PTC-200 DNA ENGINE thermocycler (MJ Research) to 95° C. for 5 minutes then cooled to the incubation temperature of 63° C. Fluorescence was read after 20 minutes and 40 minutes using the Safire microplate reader (Tecan, Zurich, Switzerland) using the following settings. 495/5 nm excitation/bandwidth and 520/5 nm emission/bandwidth for F dye detection; and 600/5 nm emission/bandwidth, 575/5 nm excitation/bandwidth Z position, 5600 μs; number of flashes, 10; lag time, 0; integration time, 40 μsec for R dye detection. Gain was set for F dye at 90 nm and R dye at 120. The raw data is that generated by the device/instrument used to measure the assay performance (real-time or endpoint mode).

Of the 192 reactions, genotype calls could be made for 157 after 20 minutes and 158 after 40 minutes, or a total of 82%. For 88 of the assays, genotyping results were available for comparison from data obtained previously using either monoplex PCR followed by INVADER analysis or INVADER results obtained directly from analysis of genomic DNA. For 69 results, no corroborating genotype results were available.

This example shows that it is possible to amplify more than 150 loci in a single multiplexed PCR reaction. This example further shows that the amount of each amplified fragment generated in such a multiplexed PCR reaction is sufficient to produce discernable genotype calls when used as a target in an INVADER assay. In addition, many of the amplicons generated in this multiplex PCR assay gave high signal, measured as FOZ, in the INVADER assay, while some gave such low signal that no genotype call could be made. Still others amplicons were present at such low levels, or not at all, that they failed to yield any signal in the INVADER assay.

Example 6

Optimization of Primer Concentration to Improve Performance of Highly Multiplexed PCR Reactions Competition between individual reactions in multiplex PCR may aggravate amplification bias and cause an overall decrease in amplification factor compared with uniplex PCR. The dependence of amplification factor on primer concentration can be used to alleviate PCR bias. The variable levels of signal produced from the different loci amplified in the 192-plex PCR of the previous example, taken with the results from Example 3 that show the effect of primer concentration on amplification factor, further suggest that it may be possible to improve the percentage of PCR reactions that generate sufficient target for use in the INVADER assay by modulating primer concentrations.

For example, one particular sample analyzed in Example 5 yielded FOZ results, after a 40 minute incubation in the INVADER assay, of 29.54 FAM and 66.98 RED, while another sample gave FOZ results after 40 min of 1.09 and 1.22, respectively, prompting a determination that there was insufficient signal to generate a genotype call. Modulation of primer concentrations, down in the case of the first sample and up in the case of the second, should make it possible to bring the amplification factors of the two samples closer to the same value. It is envisioned that this sort of modulation may be an iterative process, requiring more than one modification to bring the amplification factors sufficiently close to one another to enable most or all loci in a multiplex PCR reaction to be amplified with approximately equivalent efficiency.

All publications and patents mentioned in the above specification are herein incorporated by reference as if expressly set forth herein. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in relevant fields are intended to be within the scope of the following claims.

We claim:

1. A method of multiplex amplification of nucleic acid target regions, comprising:

a) providing a sample containing genomic DNA, wherein said genomic DNA comprises a plurality nucleic acid target regions, wherein each nucleic acid target region comprises a footprint region that is at least twenty bases in length and is suspected of containing a SNP;

b) amplifying said plurality of nucleic acid target regions from said genomic DNA to produce a first set of amplified products comprising amplified nucleic acid target regions, wherein said amplifying is in a first polymerase chain reaction mixture comprising a plurality of primer pairs, wherein each primer in said plurality of primer pairs in said first polymerase chain reaction mixture is present at essentially the same initial molar concentration, and wherein said primer pairs are each configured to amplify a nucleic acid target region;

c) determining an amplification factor F for each amplified nucleic acid target region in said first set of amplified products, wherein said amplification factor F is the ratio of amplified nucleic acid target region concentration after amplification to initial nucleic acid target region concentration, d) determining an apparent initial primer concentration from said determined amplification factor F for each nucleic acid target region, wherein:

$$F=(2-e^{-k_a ct})^n$$

wherein $k_a$ is the association rate constant of primer annealing, c is the initial primer concentration, t is the primer annealing time and n is the number of PCR cycles, e) determining a relative primer concentration value R[n] for each given nucleic acid target region, wherein R[n] is equal to the highest observed apparent primer concentration of all amplified nucleic acid target regions in said first set of amplified products, divided by the apparent primer concentration for the given amplified nucleic acid target region;

f) determining a normalized primer concentration, wherein the normalized primer concentration for each given nucleic target region, is the value of R[n] for the corresponding amplified nucleic acid target region of step e) multiplied by the initial molar concentration of primers used in step b);

g) amplifying said plurality of nucleic acid target regions from said genomic DNA to produce a second set of amplified products, wherein said amplifying is in a second polymerase chain reaction mixture comprising a plurality of primer pairs, wherein said primers in said plurality of primer pairs in said second polymerase chain reaction mixture are present in said normalized primer concentrations so as to balance the amplification factors for said amplified nucleic acid target regions in said second set of amplified products.

2. The method of claim 1, further comprising step h) of detecting said second set of amplified products.

3. The method of claim 1, wherein said determining an amplification factor F for each amplified nucleic acid target region comprises exposing said first set of amplified products to invasive cleavage assay reagents.

4. The method of claim 1, wherein said detecting comprises exposing said second set of amplified products to invasive cleavage assay reagents.

5. The method of claim 1, wherein said plurality of primer pairs in step b) comprises at least 150 primer pairs.

6. The method of claim 3, wherein said invasive cleavage assay reagents comprise a plurality of an upstream oligonucleotides and a downstream probe oligonucleotides configured to hybridize to said footprint regions to form invasive cleavage structures.

7. The method of claim 6, wherein said invasive cleavage assays reagents comprise 150 or more probe oligonucleotides.

8. The method of claim 6, wherein said invasive cleavage assay reagents further comprise a cleavage agent.

9. The method of claim 3, wherein the presence or absence of SNPs in said footprint regions is detected by said invasive cleavage assay reagents.

10. The method of claim 1, wherein said detecting comprises detection of fluorescence.

* * * * *

SEQUENCE LISTING

```
<160> NUMBER OF SEQ ID NOS: 759

<210> SEQ ID NO 1
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or t.

<400> SEQUENCE: 1

cactagaccg cctgtcccca agggagcctc agtggggcga cagggtgctc ggcggactcc      60

acctcaggcc ctccccactg ttgctgtgca ttcctgtgca ggtgcatctc tttcttacta     120
```

-continued

```
actggtattt attaagggag gtgctctgta ggtctggagc ctttccctca tcctttttgc    180

gagtccccac ctttttgttt tttttttttt ctttgaggct cactagagga cgcagaacct    240

tgggagattg atttgcacag aactccccac ctcccacttt tacaatttcc agtttctgat    300

tgaaaatttt agggtttctc cccactgccc ttccctatct ttccttcccc tcaacaccat    360

gaaggaaaaa cacacacggc agggcttttt gtagccctga aggcaacttt agacatttaa    420

aatccagcac tttaatctct tgttctctgt gaatcactat gagaagtgaa tggttttaaa    480

ggctgtaatg ctatgttgga aattggtttg ttttgccttt tattgaaaag gtaagatcat    540

gtgattggaa gaacacaact nttggcttgg gaagaggact ttgctgctga agtgttttct    600

accttctgag tgtgtttaag gcaggatttg gagggaagga ccagcttagg gagagtgtct    660

gagccacagc gtcaggatgg gggaaaccac atgggatcca tcaagttcca gttgaacagg    720

agcaagatca gaacttagga gggcagtgtc agctcccttg ttggctgtca aggaacaccg    780

atctagtaga aacccacttg gttgtgaccc aggtagaggt agatgccata catttgagat    840

atgcgtcctt aaggaacctg acaagcagac tgaagggatg gtaagtgtga cagcctgata    900

agttttctca aagcccagga tacagagcca gtgttttctg taactggaga cctcagttag    960

gccaacttcg aattccagag caacgtagga agtctattca gcagaaactc gacattgttc   1020

a                                                                   1021
```

```
<210> SEQ ID NO 2
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 2

ataccaaaag taattgtagt actgaatttt gctgtcattt aagccaatgg tttgcactga     60

aactctgtag acaactctga tactgccatt ccctgttctt actgcctaca atgatagtga    120

gcacaccaag tagcaatcac ctgttcattg ttttcttaca tagactttag gtccctatgg    180

tttactaaag gctggcagat aataagtatt caataatatg tcttaaggca ttttaatact    240

ctagatgctc tgaatcctaa tctcaaaagg attaacttta aaatagaagt tagaagaacc    300

aagactatct tgtcaggggt gtattttgag agtggcagac ttttcagtgc ctttccattc    360

atgacacttc ttgaatctct ggcagaacca gccagccgtg ttcacagtgt caaatgaagg    420

gatgtctttg attgcttcca ggtgttcctc agcaccaccg gagggggatg ggtgatcagc    480

cgaatctttg actcgggcta cccatgggac atggtgttca tgacacgctt tcagaacatg    540

ttgagaaatt ccctcccaac nccaattgtg acttggttga tggagcgaaa gataaacaac    600

tggctcaatc atgcaaatta cggcttaata ccagaagaca ggtaaatata atgtgactgc    660

caagggcttt taggaagaag gagcctctgc ctgtccagca gcctatacaa gccaggcagt    720

accacagcaa catggctgaa tgtgtgggaa cacttgatac aaatttgctt gataataaca    780

gctaactgtt cttaagtact cagaaagtga aattatgtat ttcaccttgt cagcaacact    840

ttacgtatta ttataataat ccttttatta tggagaaact gaaacagcaa aattcagcca    900

tttacccaag ctcactgagt agtaagtgaa ctctgtgacc ttggcaagtt acttgatcct    960

cagctgtagc aaccaaaaga gaatgatttg tctatgactt tgttgataaa agaaacacac   1020

t                                                                   1021
```

```
<210> SEQ ID NO 3
<211> LENGTH: 1021
<212> TYPE: DNA
<213> ORGANISM: Homo sapiens
<220> FEATURE:
<221> NAME/KEY: misc_feature
<222> LOCATION: (438)..(438)
<223> OTHER INFORMATION: n is a, c, g, or t
<220> FEATURE:
<221> NAME/KEY: misc_feature
<222> LOCATION: (504)..(504)
<223> OTHER INFORMATION: n is a, c, g, or t
<220> FEATURE:
<221> NAME/KEY: misc_feature
<222> LOCATION: (561)..(561)
<223> OTHER INFORMATION: n can be c or t.

<400> SEQUENCE: 3

cagctgtggg gtcaggaagg gcttgaagta tgggacacta gcctgcccca cctccactct     60

gcagcaccca caggaccacc ctcatgcccc tggcaacagc atgcagggca gctgcaggat    120

ccaggtggga cccagatact atatgaagga gccaccttac ctgctttttg caaagctact    180

gggatggcat aggcaggtcc aatgcccatg atgtcaggtg ggaccccaac cactgcataa    240

gacctcagga ccccaaggat gggaaggccc aactcttctg ccttggacct ccgggccagc    300

aggatggcag ctgccccatc actcacctgg ctagagtttc ctaggggcaa actgttgggg    360

taagaaggca tcggggtggg gatgaggaga tcccagccct cccacttcta ctttgcagag    420

gggcctggtc tattccangt tcccagagta cagcacccag catggccatg gcctgctttc    480

tcatacccct accccggacc agtntcacca gctgtggtag aaccatcttt cttgaaggca    540

ggcttcagtt tggccaggcc ntccatggtg gtgctggggc ggataccctc atcctgggtc    600

acagtgatgc tcctcttggt gcccttgtca tcatggaccg tggtggtcac aggcacaatc    660

tcagcttgga aacagccctt gctctgggct cttgctgccc tgccagcacc atggacagcc    720

agcttcagac tcccttgggg ttcccttcct tccctgcccc caacccctat ccatttgggt    780

agacacaagc tcaggctgct aaattcaggg acatgctcga ctttggggga gctctgaggg    840

catggctaag gccttacagg gccttcttca ccatcagccc cagacctcca gatcgtggcc    900

aatcccaacc tcaaaggggg gaaagggtgt ttggaagtgg tgcctccact tagagccctt    960

tgtccaagag ggattaagcc tgcttgattc tctctgctaa actgaggatg gaaccccaga   1020

a                                                                   1021


<210> SEQ ID NO 4
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 4

gaggatcaaa gcacctggta caatgcctgg ccagaaagtt gaataatcga atatagctaa     60

cgtcactatt gcaggctggc tatgtgcctg gcggtgttct tagccattta caagtatgaa    120

ctcatttaat cctcataaga tcctgtatga ggtgagtaag ctgttaattc ccttccttgc    180

ccatactctg tgactccaac ccaccacagt tgaatttctc cttatgaatt ataaatcaga    240

aaacggcccc aaattctgtc atgtctaagt gggaaaatgg aagaaggcat tgatttctcc    300
```

-continued

```
cctactcaag cagaagagaa ttaacctcag tccctgcttt gcccatattc cttccccagg    360

gccccaggaa gaagacatgg aaaaacaata tttccaccaa agtttatttc tctgaaacaa    420

tcaccagttg ctgtcctcta tggcacactg agagccccag gagggtcttt aactcccttc    480

ctcagattat attcatccca gaaatatagc cttggacaat aatttggtta cagcatagtc    540

ccaggaatga ggtcccccaa nttgctaagt tttacatagg ggagactggg aaattcaaag    600

aattggatgg agaaaccata ggatccaaga taatgtcagg gggttgaaga tgttggagag    660

gcatggtagc atcattgagt ttgaatctcc ttctcacttg gagtggaagt tgtaggattc    720

tgcctctagg aaatgtgcca tcctacagaa taaataaaag ggagataatg aggcttcaac    780

ccaacttgcc cccatcgttt gtcactgtaa ccatcccatg ccttaataca gtgatactga    840

aaactccagg gcaccaacaa ctaatacaaa ggaagcacct tcagcctcct ctccacagac    900

atcccacttg gtagaagagg aggatgctcc ttcctgctct taatcctagc aatggcagct    960

taaatcatgc ccttgcctag atcctcatgg aagctcaccc atataataat caagattagt   1020

t                                                                   1021
```

```
<210> SEQ ID NO 5
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or a.
<220> FEATURE:
<221> NAME/KEY: misc_feature
<222> LOCATION: (933)..(933)
<223> OTHER INFORMATION: n is a, c, g, or t

<400> SEQUENCE: 5

aggtgcactt tttccaggac ctcctgcaca ggtgtgatat ttagcctgga agcaatgtgt     60

acatggaatg ccctacaggc acaggaggca tccctggaga ctgaatggtg tctgggaaga    120

gtagggccac agagctgagc ccctatggac tgcagcagag ggcctggctc caatcctagc    180

ctaccatatc ccagtcccat gatcgtgagt agtcccatgg gatcaagtgc tctcattcat    240

aaaagaaggg aggtaacagc tgccccactc acgccccagg atcatccggc agtcaaaggg    300

gattcaggtg cttcctggaa gacagagtca caggggaccc tccttttccc agccacccat    360

atcagtccac cttttgggtt ttgaccttta ctatgtggtt ttctagactt ctattgacaa    420

atcctgcttt atggacaggg atgcttttca tttagattgg gggccactcc ccaacatctc    480

atttattttt cacagctctg gtcccatgga gtcttgtttg agtgcaagtg aactgaattt    540

cccaattcct caaaaagagc natagtaata aaaaccataa tagtgacact tacatatgga    600

tagtgctttg tagtttagaa aatgctttca ccaactgatt gccatgacag ccctgagaag    660

taacctactc tacagatgag gagcctagag agagaaagtg actttcctgg gcacataggc    720

ccatgaggtt ctggtgccag cataatagac tagtcaaatt tccagactct ggagtcagac    780

tgcctgagtt caaaccatgg gtcctcttgg tcaggtttta taaccactct aaaactctgt    840

ttgcccatct gtaaagtgag cacaattaca gaatctacct aatagggctg tctgtatgtc    900

aatgggcttg gcctgtgcct gaggaaatgc tancccatg atcctgcagc catggttagg    960

aaggacatgg cagggaatgg gacctttcac agaccgggct gtggccagca gccagggccg   1020

a                                                                   1021
```

-continued

<210> SEQ ID NO 6
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 6

```
tcatacaact ccttgcagtt catgtaagga ctcggatttt acctggagtg gaaaaagaag     60

cactgaaaga tttgagcagg ggagtaacct gatagcgttt atgtttagtc ctgccacttc    120

gacagataaa cgcaccaatg ggcttgatga gatttaggcc aacccataac cgcccctcaa    180

cttctttcct ttcaatttca aaactcctct atggcttcct ccatctgttc ttccttctga    240

gaagtgctct ctctgcccct ttacagaact aaccacttcg gcaactcctt ggacactttc    300

cttcttgtta ataatttgct ttctccgccc ctcaaaagct tgctgtttct gtaaatcatt    360

acctgtaaga ggaaccgctg ggagtcctgt aaactttagc ccagagcttg gctcctcctc    420

cagaatgtct ccaccaatca aggaaagtgt tttgggccag tcttgctcct ccggattgtc    480

agactgctcc tccctcttct ttagactgcc acgaggaaaa agcagatgtg agaactcaag    540

gttcagggct gctcttctaa naaacaagtc tgccataatc tccatctgtg ttggaatctg    600

ttaactagtg agtacctcat ctcccctcct gtgtaagatt tcctgaactg gcacatctgt    660

tttttgagca aagataacaa acagatgaac aaaaccaaca atcaaaaatg ctgtcattaa    720

agtcttgggc agccaaagtt tctctcagaa tttctcagtt gtgtgatact atctattaag    780

tgatgaggag tatgcacaca caaaaggcta taaatgtagc agctgagttt tcatgttgag    840

ccttttggtg ctatttgatt ttttgaaaaa ctatgtacat gtattaagtt gataaatttt    900

ttttttaatt ttaattgaac cagatgcggt ggctcaagcc tgtaatccca ccactttagg    960

aggctatggt gggcagatgc agatcacttg aggccaggag ttcgagacca gcttggccaa   1020

c                                                                   1021
```

<210> SEQ ID NO 7
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or t.

<400> SEQUENCE: 7

```
tatgtgttga atgaaaggct gggtcatatg tgacccttgt gagcagctgt ttccgtggac     60

tgctcctggg tcccctcctc cacccgccct gcctctccca tttcatccta ggaggtgcct    120

gtggccgggc gcagtagctc atgcctgtaa tcccagcact ttgggaggcc gaggcgggcg    180

gaccacctga ggtcaggaat ttgagactag ccggcccaac atggcgaaac cccatctcta    240

ctaaacatac aaaaaattag ccaggcgtcg tggcgggcgc ctgtaatccc agctactcag    300

gaggctgagg caggagaatc gcttgaaccc aggaggcgga gcttgcagtg ggccgagatt    360

gcgccactgc actctagcct gggggacaac agcgaaactc cgtctcaaaa atatatatat    420

atattaatta aataaaaaaa cgaggtgcct tctcctgact ccctgatccc cgcgctctcc    480

agctctgccc tcgcgatcgc tggagccccc tgaggaactc acgcagacgc ggctgcaccg    540

cctcatcaat cccaacttct ncggctatca ggacgccccc tggaagatct tcctgcgcaa    600
```

-continued

```
agaggtgccg agcacagccg tagccagggg aggggctgaa gcggggcagg ggaggggctg    660

aagcgagcag aggagggtct aggacttggg gagggagccc aggaggacag aaaaaggccg    720

ggctgaaacc aggggtgggg ttacagccgg ggcggaactg catttagggg gcggggccgg    780

gtgtgaagca aggccagggg gcagtcggac agtacccact gaagccccgc ccctgcaggt    840

gttttacccc aaggacagct acagccatcc tgtgcagctt gacctcctgt tccggcaggt    900

gaggtcctgt ctcccctttc tgcctcagtg aactcagcag ggctgtgtgg acgcaaagat    960

gagctagctg caaagcctgc ctctgcatgt tgggatttgg ggtccttgac aggggtgagg   1020

a                                                                   1021
```

```
<210> SEQ ID NO 8
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 8

ctatatgctt gaaagaattt ataattaaaa ttttttttaa aaaaagagca tgaagacttg     60

cacagcaaga tatcagaaag ctaaatggaa attttcttct tagctatgtg aaagacacag    120

gcagagcacc agatggttca gtagcctgag ttctagaaat aatctcaaca tggtaagagg    180

gtctgtaagc tagcctacac ctatgcgaaa cagggtttta tgcatgggac actattccag    240

tagaaaatgc aggatttgag tagacttcta gagttggttt taaaatgatt taatgtaagg    300

catcaaatct agacaatcag taagagagta acccatacag gctatatttt cacatgttct    360

ataaagtata gtttggtgtc tacagcctgc aaaccacagc caggccccaa atctttcaag    420

ttggcccctg actctttcct gctgtctcca tatgaccgag tatgcactga actatcagcg    480

tttccaggtt cctctccagg caccgcagag tggtggcgct ctcacaaagg catgacagga    540

agacagggtg tgaggttgga nggagagagg ctgtagctga ggaaaagcac agcccatggc    600

attttactgt aatgcctgaa caaatgcact taatgaatat gtggcaaatg taggctcaga    660

agtatcattt ctttcctgta aatgtaaatg ctctccctct gaagttcctg tgggaatggc    720

ttctggattc tgggggtgag tgtggggcca ccctccacga ggcctctgcc tacctgaaag    780

catcattcca tagaccctcc cattgttcac acacagtgga cctaactctc cactttcact    840

ttttcttctg taatagttta taacagtcaa tagaactccc acattagctt ttagggtcat    900

cacagaatac aaaatgttga agatacatat tttatctttt ctatctttct ccttagtatc    960

caggtacact aactctgata ttctaacaga aattatacag acaccatgat caccatcttg   1020

a                                                                   1021
```

```
<210> SEQ ID NO 9
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 9

ggttcactca cccctcctcc cacctcggca gccctgggat gtcgctgctg actcaggagg     60

aacccgaggt gccgtagcgg ctgctccaat attgcagaag aggttcctca ggcagctctg    120
```

-continued

```
cccacagccc caagtcacga attccgtgac tccagctcca tcccaggccc cagggtacct    180
ggcccagggt tgtgctgccg cagacttggc ctgtaccatc caggcggcgg tggggagctg    240
gggttggaaa ggcttcttgg agtggactcc tgggtctgtc tgggagacgg ggaggaaggg    300
acactctgaa catcaccagg ggctgctggg gggccctggc cacccccaga gtcagaacag    360
gcaggtgggg caggatctca ggtcatccta tgctacactc agccattgcg tggcccctct    420
cctccctgtg cctggccttt tggccagccc tggggccacc gagaggatgc agcaccgaac    480
cctccaggag cccccagtgc tgccgtctgt gggacaggga caatcccatc cccactgcta    540
ctgtctgtgc tgtgctgggc ncagagctgg acacctccaa ggcccagcgc ccgtagtggc    600
tctcatcatg gacaattcac aggcagatgg tggccagctc tgtggcctgc agggactggg    660
agcggcgcca gaccatctag gccccaacct atctgcatta tcctggaaga cttcctggag    720
gaggcttcta agctgaggcc caaggaccat gtcaggtcta ggactaggac cagtgcaggc    780
cgaggccaga gagacagctg ggcttccagg tagggtcaaa gtgaggtggg cagcaggtgt    840
gggggccagg ggactcgggg acttcctctc cggctgggcc cgcctgacgt gggaggcagc    900
cagggttaat catttccacg aagccttgac cccacctgcc ttggcgctct gctcccgcct    960
cccactgccc ctcaggccag ctcaggagcc atggggcgct gggcctgggt ccccagcccc   1020
t                                                                   1021
```

<210> SEQ ID NO 10
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 10

```
tttatggcac aaatggggcc gggggcaggc ccaggggcaa ttcaacagga ggcaagagcc     60
cagggctcca gagtggagag acaggaggca gctcagtccc cagaccccag cagagcatct    120
ggggcctcgg ccccactcca gagcttcttc ctgagggagc catgcacagc aatgctggga    180
gagggactga tggggtgggg tcaggcctcc tgccacagag ctgggctgca gagcccagat    240
ggaaagacac agtgaagagc tcaacctcct tccaagctct ccttctcagg gcttcaggtt    300
ccagagcccc aggggagctc ccagccaggg gcagggtcac cttgatattc acaactgggc    360
ttgtgggggc catcttcagt gcaaccgttg tgacaaagtc aagaggctgc ctccctgaag    420
cagacccact gcctacgcca cactgacggt ccagaggccc cctcctgagg gcggccagca    480
aggggcactg tggcagctcc cactgtgcct gtcccagact gggtcagcag gtctctctgg    540
acagcacact gcaccaagta ngcccaccaa aaacgcatca ggtgtggcca tggcccacag    600
taccttcttc attccctgcc tctaacatgt gcggtctgaa tgaattttgt cactcttctg    660
ccatttataa aggagaagac agtgatccaa agctatgcat gtttctgaag ccctcaagga    720
agctcggtgc aggccatcac ttcttttggc agaaggcggg ctgtggtctc tatgtacaca    780
cgcgagcccg ccagtgacgt gcggcagtgc gtggcgtcca ggctgggaca ggggcctttc    840
aagtctcccc agggaccggt gttttctaca acagacaggt gctcccagac cgttggggta    900
caggccaggc cgtctacacc acagtattga gggagctgcg gctgtggcgg ccaccccctg    960
gcagtgcctc tgcagctggg gtgctcccgc tctgggcagg gtcagggggc acgagcaggg   1020
```

-continued c 1021

<210> SEQ ID NO 11
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or c.

<400> SEQUENCE: 11
ttaatataaa taggatatca taataaatag aaatcatgcc aggtcagacg cacagcacgc 60
ttggagctca gggttccctg agaccctgac cctaagttct gctgttccct tgccctgggg 120
accagagacg gcctccagtc cccctcaagt acctctgtgt gacctcacaa ggcctcccag 180
ggcctcagat gtgagctgct actctgagct accccagccc cttcttacag acctttaccc 240
agaggaagag cctgggtccc tcagaacctc tgcacctgac ttagcaacct gcccctgccc 300
tacccacctc cacaaacccc tgctgcaggt ccagccatca gaccctggcc atcccaggct 360
gcagggaaga tcacggggaa gagaacgaag aacctaccaa agctttccag gcctctcctc 420
ctcccagtgt cttccttccc aggcctgaag gtggcttctc tgcctcccca agagcctgaa 480
tgccaagtga cctccttctg gaaacttctg ccagattgtt cctatgccca agttctctga 540
tcatcctcaa aagaagacag ncttccatcc cagaggcccc tctctatctt ccactcatca 600
aacttctagg ggacaaggag tcctttggga tcctagcccc tctggcccac ctaagtccca 660
acctaagggg cagcaaaggc acagatggtg ataatttgct gggggctggt ccactcccct 720
gggccctgct gtctcaccct gtggtcaggg ctcttgtaga tgacttgtgt agtttgttca 780
ctgcacaaag tgagcaaggg gccaaaggga caagtagagg cagaagtcca gcccacgctc 840
cccagtccac aatctcccag aggaaggggc accttcttct agctccctcc ctatggaagt 900
ttccactctg ctcagcttca tcacagccca gcccagagtg gagtggactg gccaggcacc 960
ctcggggtct gccagcagcc cccatttggg tttagcgatg ccctgggccc cagccaccct 1020
t 1021

<210> SEQ ID NO 12
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or c.

<400> SEQUENCE: 12
tgtgacaatc agcaaagccc cacccaggcc cccatctggg atgatgggag agctctggca 60
gatgtcccaa tcctggaggt catccattag gaattaaatt ctccagcctc actctcggct 120
ctttcctact tgttagtagt cttgggatgg tggtagtcag aggcagggac tgaagaggtg 180
agggaatgac agaaccgaca tttaccaggc accagctgta tacattacac atgccatctc 240
ctttaatctg catcacaacc ctgtgagatc agtgctattc ttagacccat ttcacaggtg 300
agcgaactga ggcctttaaa aggttacatc aacctctcaa gatcagacac caaaccatag 360
ttcagctagg tgtcgcaggg gggaatactt attaagtgct aagcactgta tatgtattgg 420
ttcacttaat cctcaacaac cctatgaggt agctcctgtt tagagacccc ctttttttag 480
aggaggaaac taaggcttag agtgcaagag ggaggtcctt tgcgcaaagg catggaggag 540

-continued

```
atttgaattt aggtttaggg ntgggccagg aagggcacgg cagccgttaa aaaaagaggc    600

ccccctggga ggaggggagc tgaaagccct ctccaacacc caccccaatc ctggattcag    660

acacagacat ttctgtgaca tccctaactt cccacctgct acctcaggcc acagcaccca    720

ggcactaggg ctcccctagg caggtttttg aggcatgtat tatttttgca acacggacat    780

acatgtacct cctcctggta ctgcctgggg ctgctgcaat aagttaccct ttccccattc    840

tcatctgtat gtgaagttcc ctggcaaggc caaagcccag ggcatcagaa tgagcttcct    900

gaacaccaca tccaggcata gaagagttgt gtcatacata gctcaaggtt acccagaaca    960

gcaggagatg tggtccagca tttgggcctt gagatccccc cattcatcct cttgattgtc   1020

c                                                                   1021


<210> SEQ ID NO 13
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or t.

<400> SEQUENCE: 13

ccaccaccga ggccgagctg ctggtgtcgg gcgacgagaa ctgcgcctac ttcgaggtgt     60

cggccaagaa gaacaccaac gtggacgaga tgttctacgt gctcttcagc atggccaagc    120

tgccacacga gatgagcccc gccctgcatc gcaagatctc cgtgcagtac ggtgacgcct    180

tccaccccag gcccttctgc atgcgccgcg tcaaggagat ggacgcctat ggcatggtct    240

cgcccttcgc ccgccgcccc agcgtcaaca gtgacctcaa gtacatcaag gccaaggtcc    300

ttcgggaagg ccaggcccgt gagagggaca agtgcaccat ccagtgagcg agggatgctg    360

gggcggggct tggccagtgc cttcagggag gtggccccag atgcccactg tgcgcatctc    420

cccaccgagg ccccggcagc agtcttgttc acagacctta ggcaccagac tggaggcccc    480

cgggcgctgg cctccgcaca ttcgtctgcc ttctcacagc tttcctgagt ccgcttgtcc    540

acagctcctt ggtggtttca nctcctctgt gggaggacac atctctgcag cctcaagagt    600

taggcagaga ctcaagttac accttcctct cctggggttg gaagaaatgt tgatgccaga    660

ggggtgagga ttgctgcgtc atatggagcc tcctgggaca agcctcagga tgaaaaggac    720

acagaaggcc agatgagaaa ggtctcctct ctcctggcat aacacccagc ttggtttggg    780

tggcagctgg gagaacttct ctcccagccc tgcaactctt acgctctggt tcagctgcct    840

ctgcaccccc tcccaccccc agcacacaca caagttggcc cccagctgcg cctgacattg    900

agccagtgga ctctgtgtct gaagggggcg tggccacacc tcctagacca cgcccaccac    960

ttagaccacg cccacctcct gaccgcgttc ctcagcctcc tctcctaggt ccctccgccc   1020

g                                                                   1021


<210> SEQ ID NO 14
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 14
```

-continued

```
gcctatggtg cagggctggc agaggcgggg ccaggattct agcttcccca cacaccagcc      60

ctgtggcatc attcttccca acgtccaaac gtttttccaa gggggagaaa tggactgggt     120

catgtaaaga aatactcatt tttagggctt tttatgtggc cttcaaagca cgttgcaaac     180

aaatcccttt cactcctcag aggaggagcc attaggaagg taggggcga caggcacagc      240

ctacagcctc tcctcaggag gacagagggg gtcatcgcat ttgagccccc tgcagtcatc     300

tcgggggctc ctgagggtcc aggtccacat gttcgagggt ctgcagcaca tccacggcgc     360

tgtaggactt ccaggcctgc atgttacagc tcttcaggat ggctcccagc tgcctgccag     420

ggcctacttc gaaagtttgg gggaaccccc tgccctttt cctttcgtat atggcatgca      480

tcgtctgctc ccacttcact ggggagacca gctgctgggc cagcagcttg tggatgtgcc     540

cgggatgcct gtatctatgc ncgtggacgt tggagtagac agaaaccaga ggcttcttaa     600

tgtcgactgc ctttaaagct tgcgtcaggg gctccacggc tggctccatg aggcgggtgt     660

ggaatgcgcc actaaccggc aacatcctgg tgcgtctgaa atgaaactta gaggaattct     720

tctggagaaa ccgtagagcc tggggaagga aggaggtttc agccgagcaa tgtcccagaa     780

atccgccttt acagatctga ccattcacag ggccaaactg ggagggtgac cacaaagaga     840

cccacagctg ctagatgtgg acatgtgacc tgtctgtccc agcaccatcc ccaggcaatt     900

cacttaacat cctggaatct cttctgtccc agccttcaaa taagcacagt tccatctact     960

tcacaacgct gccaggaaga gcaaacccta caaggcatgc aacagtgtct ggtagaggaa    1020

a                                                                    1021


<210> SEQ ID NO 15
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 15

acgttatcag gcacaaaccc cctccagaca cctgagcctc ccccacaggc tcccagtgag      60

gagccatcac atgcccaggc cagccgaggg gccctcaggc atggggatct gggcaatggc     120

agcaagctgg gcggggggtg cagccaggat gacagcagat ctgcagggcg gggtcctcgc     180

cccgggccac ctggctgggg ccgaaggtca cagctgcgtc taactgggcc ttgagcagct     240

gaagctgttt cagggcttgc agcacctctg gggtggcccc ggccacaccc cccagcaggt     300

tgtagttctc accagggtcc ttggacaggt catagagcag cgggggctca tgagcagtca     360

gagagctgga ggcgtggcag gcagggtctg cagtggtatc actgtgggca gagcctgggg     420

agggggccaa ttctgtgcac agggcaaggg cgagaggagg ggccagggat ctagggctcc     480

ggggaggggt cagcaggtcg gggggaggga tccacgggga ggggttaccc tgggtgaaga     540

agtgagcctt gtactttcca ntccgcacag caaaaacccc acggacctcg tctgggtagg     600

acgggtagaa gaagagagac tgccgagggc tctgggggca gagtcagggg tcacggggcg     660

gggcaggccc caagcactgc acatacctgg ggctgccagc cctggtggga ggccctggac     720

gtgcaccgct tcttgcccac ccaggaacct gagaggtggc gccacttgga tgccactcag     780

tgcaggaggc actgaggcac agactctcag gcactgccca cactcacccc aggggaaggc     840

caggacaggg gccaaggatc tgggatcagg ggtcaccggc cctaccttgc ctgtgcccag     900

cagcaggggg ctgaggtcaa agccatccaa ggtgacattg ggcagtgggg ccccagccag     960
```

ggctgccagg gtaggcagca ggtccaggga gctggccagc tcgtgggtca cgcctggggg 1020
c 1021

<210> SEQ ID NO 16
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 16
gaatggtaag aaacattctt cagctcaaga tggtgaccag aggcatccag cactcacttc 60
cttcacaaag gactcaaaca gcaaatgaat aatcacatgt caagtagagc agcttagaaa 120
gaacactgga attcagaggg aaaggacaag gaacttcgga aacatgcaaa gagaatgatg 180
tgaagcagcc ggcccagcca ggatcagctc agatccaaga gaaactgccc aacgtaggga 240
aaaggtaaat gagagatccc cgcaaggctg cattcccacc acagactcct gtggccctag 300
ccacagagag cccccttggcc ctcatgggct ttgagactag tatagagagc cgcctgcatt 360
gttccaaaga gggattttat gatgggtcct acacatcctc tgagacctga gcagctgcag 420
cacagcacca ttttgagagc ccacccctga ccagacccca tcccgccctg ggctcaaca 480 gcccctgcat ctccacatcc atggagtcct gctgacattc cgccatgtcc acccagaagg 540
ctgcagcctc acaatgcagg ntgactgggt ccccagcaat ctagtctaca catgtcctat 600
aacctgggaa tgggtggtgc accacaccag ggaggctgcc cctgggacaa agggagccaa 660
agcccatgtt tcccagagcc gcagagctgc ccgcctggga ccactgccac tgacagcacc 720
cccaccatcc ccccagcagc ggggtcactg tgcacttgtg atatggtttg gctgtgtccc 780
cacccaaatc tcatctccag ttgtaatcca aattgtaatc cccacgtgtc aggggaggga 840
cctggtggga ggtcattgga ttacaggggc ggtttcctcc atgttgttct catgatagtg 900
agtaaattct catgagatct gatggtttta taagtgtttg atagttcctt cttcacacac 960
actctctcct gtcgccatgt gaaaatgtcc ttgcttcccc tttgccttcc gccatgactg 1020
t 1021

<210> SEQ ID NO 17
<211> LENGTH: 1021
<212> TYPE: DNA
<213> ORGANISM: Homo sapiens
<220> FEATURE:
<221> NAME/KEY: misc_feature
<222> LOCATION: (508)..(508)
<223> OTHER INFORMATION: n can be g or t.

<400> SEQUENCE: 17
cacctccctt aactccccag ccatgccccg tgggtatctg ttttcccagt tttgtagatg 60
aaagcacagc tcagagaggt ttactcagtt gcctggagtc acacagtcaa caagtggaga 120
gccagtcatt gaatctggta ccacaaactc ttcctgctgc aacagctgtg cttttgcagg 180
cactgacttt ggaataccct cagctgattc acagggtcct ttgtcctggg gaatggcctt 240
ccctgtctcc ttcagggaaa gggtttcatc cttcagggaa gattcattga atcaggattt 300
gctgggtttt tttcattttt ttttttcatt tcttttttttt ttacacgaat gggcttcctg 360
gcccgcattt tgatttgcgc ttgggtttat gaattgagga atcacagtca gccttgggaa 420

-continued

```
ttagttgcaa gataaatatt gcaatcctgg ttaaggactt aagaattgtc acttgtgtgt    480

gtatattgtt gttgttgttg caacggtnct gtgtacgcac ggttacagtg gatcaaattt    540

ggggagttag gaagtggcgt tggtttgtgg ttagacttgg gggaggtgtc gctttcggtt    600

gttggtgtgc tggtggctgt gttcctgtga tatggaatgt actgtctgag aatgtgttca    660

ggggtctgtg gttatgtgga tatgggtgtg tagctgctga tgacatggat ggagggatgt    720

atctgggtgt gtttctgcag aacaagtgat acctgtacca tgtgactttg tcagttccac    780

catgtccagg cacaggtcgg gggggttgtc catggttctg aacgtatctg cccccatttt    840

acagatagga aaccaagact tagagaggcc aagtcatctg cttgaagtca tctagctgag    900

aagcggctga gcctgaaggg aaaccagggc tgccttcaga gtccagcctc ttttccctgc    960

tccccaggaa aggttttagt aacaataaaa ggtttaaatg ccagcaaaag gtctaaacgc   1020

c                                                                   1021
```

<210> SEQ ID NO 18
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 18

```
ttgccccaca gacaagatga tccccccctgg catgttgtta ggggcaaatt gctgtcctgc     60

tcagagtggc atctttcaat gttgcctcca tcttggccaa gaggtccctg cctcctgatc    120

cggcacagct gagctgaggc agatgtgacc agttttcaag ctaccagccc tgggcagagg    180

aagatgtcaa caattccaga gcagagggaa gaggcacctt ccttgaccac accagtggcc    240

tcctgaagtt ccatgctttt aagagctggg accttgggag gatgattcaa accctcaatt    300

cctcctccct gggaactttt taccaccttt acctatttat caaaatcata ttcatcttta    360

ccatcactgt cactgtaatc tacattccat cacctttatc aggtgctgct gagtacaaag    420

cacttgggat gggagacaca gcactgaatt cacaaacatt ggaccaaact gtttgtcccc    480

atctgggttc atgaggccac ctctttgctc aatccatgcc tcttgccctc agtcaacaag    540

acattcctag agggaaaggg ntgctgctct gggagtcaac ctgagttcct ccctcctggg    600

aagctgggtt ggcaagattc taggacactc acctgcatgg acatcacctc tgtgacaaat    660

gcttacctgt ttctcatctt cagacttggc gatatcaagc ctgttctgga ccatgaccag    720

gctggctcat atctctggtt tagagaaacc tatgaataac tggggacaaa cagactcttt    780

ggtagcagca gacacatgtg atccatcaag atcaaccaag gttgcaactg gagcgtccac    840

tgccagagac ctttggctct tcaagctcgg gacaaaaaag aagactctgt tgtcccttgg    900

taacccagtc cctgcttttg tagctatcac agcagaaagc aactcttcct gaagaccaaa    960

cactcgtcat ccacattcct tgaatggcca atccttccat ctggaggcct ggctcagaaa   1020

g                                                                   1021
```

<210> SEQ ID NO 19
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

-continued

<400> SEQUENCE: 19
gtttgatggg acaagatagg acagtggtta agagtgtgac ctcagcagct gactgcctgg 60
gtgtaaagcc taccatgtgg tcaagcacac gggtggctct accacttacc aaccatgtga 120
ccttgggcgg ttaacagccc tgtgactcgg tttccccatc tgaaaagtga ggatcatagc 180
agtatctacc tcctgcggtg gtcggaaggc agaaaagaat tggcacatgt gaaagtactt 240
agcacaggct tggtgcatag caagtcctga ggaaatgtat tcactgtcat cagtttcacc 300
cgctttgaaa ggcaggcaaa gaaagcacct gacaaaacct tttgatcccc cacgccttgt 360
ctcccacacc caggacattc ccctgactcc catcttcacg gacaccgtga tattccggat 420
tgctccgtgg atcatgaccc ccaacatcct gcctcccgtg tcggtgtttg tgtgctggta 480
aggggtgacc ccagcctgga gaggcagcgt ggcagagtgg ccaagggccg agtcagatgg 540
acatgagtct agttcctggc nccgtcactt accactgtgt taccttgagc aactctcttg 600
gcctctctga aatgcccaca tcgtagagtc actgtgagaa ttaaatgaga tgaagcaggc 660
aaagcattta tccaaggccc agcacacagg gtatgctcta aaaataatag ctgccattct 720
gttctcttgc ttaaccctct accaggcagt tagcaacctc ctatgcagtg gaaatgcagc 780
tcatctgact cattcattaa acagactttt attgaccacc tattatgagc taggtccaca 840
acagcaagat gagaaccaag ggaaaaagtg cctgtgatta gatggctagc aacccaaaag 900
ggacccttgg ggtcctcacg tccatcccat cttcatgcca ggcagagctc ttctttgaaa 960
atctgtggag tcagaggtgt aaggcattgg gacaggtggg ggtgagagtt ccccccctca 1020
t 1021

<210> SEQ ID NO 20
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 20
gccctgccct gtagtggctt ctcaatgaat atgtagttgc cttattctca caaacaccag 60
gctttcctca catcagcacc cggtgtgata ggtaagagtg tgtgatacta gaaacgtcag 120
cttatccaaa aatgtatttc tttctctcat gagagcctcg tgagctctcc agcttgctgg 180
aactttctaa gacctaacac ttgccaaatt ccttgcagca attgtctggt ttgtggtacc 240
acaatcgaac ccaccaccct gacgtatttg ctgctcagaa ccaccgatct tccaagttct 300
catcactcca gtgcagctcc tgtgacaaaa ccttccccaa caccattgag cacaagaagc 360
acatcaaagc agaacatgca ggtggagttt gggtaccgcc ggcagagagc gggaggggct 420
tgatggtgta gcctcctggg ccccaccaga aatccccact tctaatagtc tagtgtgatg 480
tgcagtggtc attgcctttg ttctgcccca gcgcacctgt ccgtagcagc agcagtcagt 540
agcagcagct tgagtggcag nggttctcaa acctggaagc gtagcgcagt gtaagctccc 600
accagccctg agtgagagct tgttggggca cctgggaagg gtgtcagcct cagtggtagg 660
caggcctgag tggaaatcct gattccagca cttatcagct acatgacctt ggcaagtgac 720
ttccctttc tgagcctgtt tccttctctc caggatggca gttattaaaa cctactttgc 780
aggtaaattt ggtgataatc acaacagctg tcagttacag agtgtttcct atgtgcaaga 840

-continued caccatgcta agcacctcgt gtatattttc tcatttcatt ctcacaacat ccctctgagc 900
atccaggcag tctggatcca gatctcatgc tctttaccac tagattgtac aaatatacca 960
taggttataa gattcctggc acttggtaga tgcttgctaa gtattggcca tcgccccaac 1020
c 1021

<210> SEQ ID NO 21
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 21
taaatttctt acaaggtctc ttctagttct aattttttaa aaaatgttat gacctctgcc 60
cagatttttt gtctcactgg aattttatga aatcaaatag tttgtaagtg gaccattata 120
ggactgtttt gcccagttct ttgttgtaag ggtgtttgac cggttgaatc atggtattta 180
aaaaattctt atacaactcc agatctaatg gtaggctaag ttgtggtgat gcttatactc 240
agtgatattg ggtgtgtatt ataagaatga agagagcgga gaacaaacat aaacattaat 300
gttaatgaca aacattaacc caagtacaag gttaatgttt agtcaatata gcaaacatgt 360
aatttacaag attaaaaata attaggcttg tgataaagtc aatgaatttc ctacgtaatt 420
gtaacattag actgttttat tatttgtcct gacattttgc agaatccaag attaattaaa 480
gaaatggttt caagaagagg gtgaatacta taaaaataga cttaccttcc tgaattgagg 540
aattcatcag gaaagcctca ngtgtgcaaa tgagccatcc ttccagaggg aaatttctta 600
gaattatccc acgatttgag ccaaagcact tccgatagaa tttttaacct ctagttggtt 660
ctgctccttc catttttact aatttttaag aaaatactat gacttataat tgtatctgga 720
atgattatca actccttttc atccactgac ttaaatttga ttataaatat gctttacata 780
aagatctaga ccttataatt tgaattcaag tgaattgttg tgactagcat gtaaattatt 840
attatggatt gtaaatctta acataggtag ttctgtgccc ttaaattgat aaaccagtta 900
tctcttgtaa tcatgtgtac taagatatac gtagtaaagt gattgtatca gtttttatca 960
taagcagtca tagttcagat agttcagaag tttagtgtct gctgtttcta ttaggaaagt 1020
g 1021

<210> SEQ ID NO 22
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 22
acttggtgac tttctctgca ccaggtgagc ccctagtcta cactgcactg cacccccccc 60
ccaccccggc gcacgcacac acacacacac acacacacac acacacacac acacaggcat 120
gcacaggccc tcctgtgaga gatagcccta aggagggaac cgtccctaga gccggtcccc 180
agccgctcgg cacttcccgc ccacgcgccc ggtcccacag tgcagcggac cctcactcac 240
cccgcggatg tcccagtacc ccagtgtcat ggacatgatg ctggttggtg tcgattctgc 300
agacaggcct cagctgggct gaactgcgac ctcctctggg gttcccggca cgcaggggct 360

-continued

```
ggacctagcg ccagacccgc cccctcggcc ccgctgcgcc cgccgatctt caaggtcgtc    420

acttccaacc ggccgatctt caaggtcgtc acttccaacc aacaggcgcg ggaggcacgg    480

agcaggttgc tggatcctca ctggctggaa ggagtaagat ccaccgccac ctccgagtgt    540

tcagggagca aggtccggaa ncactaggag gggctcggcc tcgccagctt ccgtagcccc    600

gccccgcccc gctccgcttc ggacctctgc tgggtcccca gggactcggc tgtgcgcgtg    660

agagtaaagc cagatcgtaa gagaaaagtt cttccccgt ttcttcttct ccggacgtcg    720

cccagccttc tgcctctcgg ctgccgagtt cccacaggct ctgggagact gaggctgcca    780

gggtcagact aaagagaggt ctcagagagt ttaattcaac acttcttggc tactaagtct    840

tagaagtctg atggtgtgct ctctctgctg agttggggag cgtgaatgga ggctatgtca    900

ccgaagctga tagagctcag tctctgttgc agatgctccc gaccctttg cattgggcca    960

gttccccagc tctgagactg ggtccaggct caggaagtgg cctatgtgtc aaggtggatt   1020

c                                                                   1021
```

<210> SEQ ID NO 23
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 23

```
gaatggtcat tttgatgtt ttgttgttgt tgctattttc gttgttgagg ataactataa     60

tttttgtgc caaaaatgtg gcaaaccttt ctatggggaa aacgatagaa atggcactta    120

accctaaccc attggacata atctattatc tgtttttact aaaatccact gaacctgtag    180

aaatcttaga ttaatcagaa acacactctt ttcttgtgct tctcaataaa taattgaatt    240

gtttttgccc aggaattacc cctgagcaac taaaatgttt accttcctgc agttataaaa    300

atctcggtgg gggttgtttt tcagctcctt taactcgtcc atctcgttaa gcatctgatg    360

gacctggaac ttggaggaga ggaacttcag gcgccggtgg gtataggtct tactgtgaaa    420

aataaaatca cataattcca aaaagtttca ggcattcaag aaaaacagtc acaatttcaa    480

aactatcagg acctttatca ttcataggaa ataattgttg gaacaaacct tttagtttac    540

tctgcagtta atcccactga naagtagtgg gctccaaagg cttaatcttt tcaataatgt    600

tggacataag aatgagggag aacttggaaa ggtatcttaa aactcaatgg agagagtgtt    660

attcaaagtt tggggtcagc agattcgagt gtgaatcctg gctcagccag ctgtgtcact    720

ttaggcaagt tacttaagtc atcaaagtct cagctcataa aactggaatt atgaaaataa    780

ccacctcaca gtgaaaagtg taagcaataa aaggaacaat gtgcatgaag ggcttaatac    840

agtgtttgaa catagtaagc atttagtaaa tacttagtct cactatcagt agaagtagta    900

ctagttgttg tttaggtctt gtagtactag ttgttgttgt ttaggtctca ctaaacactt    960

acacaggtcc ttgagcaatt aaagcaagta aaaaattcat atcgtctaag aaggtgtcca   1020

g                                                                   1021
```

<210> SEQ ID NO 24
<211> LENGTH: 1021
<212> TYPE: DNA
<213> ORGANISM: Homo sapiens
<220> FEATURE:

-continued

<221> NAME/KEY: misc_feature
<222> LOCATION: (561)..(561)
<223> OTHER INFORMATION: n can be t or c.

<400> SEQUENCE: 24
gaaagctgag aaagaggcac accaagacta agggaaagag gccgggaagg gtaaaaaggt 60
gaaatgaaaa gaggttggtg aatgactaag aacggttgga taggacaaat aagttccaat 120
gttcgatagc agacgagggt gactacagtt agcaatatat tgtatatttc aaagtagcta 180
gaagacttaa aatgttatca acacatagaa atgaaatata cctaaggtga tgtatccttc 240
aaatacccgg acttgatcat tacacattcc gggcatgtaa aaaacgcttc catgtacccc 300
atttcataaa tatgtaaaat attatgtatc attaaaagaa agaacaaaaa agacagggaa 360
aatgcatatg ctgtgctcca ctcagccaac aaacttctgc tctaagcagg gatattgatt 420
ccaaaggcta gcttgcgttt cttaaaaata attaaaaaca acaacatgtc atttatttca 480
gagctggagg ctagaaataa attactcaaa tctcgcaact atgtaaacta tgaaaatgaa 540
acaagctagt taccttttat ngttcagttt aaaaaagttc ttcttctttg ctcctccatt 600
gcggtcccct tcaagatcca ttccgacctg aagagaaacc gcagctcatt agccaaatgc 660
atgagcctca ggcgcgctgg aggtgagact aacctctagt cccccgtcga agccagagag 720
cagtaagagg gagcgcccgc cgttgatgcc ccagctgctc tggccgcgat gggcactgca 780
ggggctttcc tgtgcgcggg gtctccagca tctccacgaa ggcagagttg ggggtctggc 840
agcgcgttct ggactttgcc cgccgccagt gcgattctcc ctcccggttc cagtcgccgc 900
ggacgatgct tcctcccacc caccgcccgc gggctcagag agcaggtccc cgcaccgcgc 960
gggctgtgcg cgctccgggc aacatggtcc agtgccacta cggtttgggc gctgctccag 1020
g 1021

<210> SEQ ID NO 25
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 25
gtgagttttg aggcttggga gagagctgca aggaggaaga aggaagagaa ataggggaga 60
gacatgggga gagacagtca tgcctacttc ctcagcaggc cagaagcagc atgtgcaggt 120
ggggacccag actctgtact tggacttaaa gtgaaaggct ttccagatat tgtacttacc 180
cctaaggctg acaaaggtgg agcctcaagc ctatagcttt ggatcaagac aattgttcca 240
gttctcctat cccagaaatg ttcctctctc ctaaacctga agtggtcgaa cactttcatc 300
ccttcctcac aaggagggtc aggtgatcag gtaaaggtaa caactaaccc aaacaggaag 360
tgtggccaga tgcttgtata caggtaaggg tgtgatttgg ttgctaattt ctcttcactt 420
ctgggagacc agccccttat aaatcaaact ataggccaga gaggctgcca catgctccca 480
ggctgtttat ttgaagagag acttacatta ggcagtgact cgatgaaggc atgtatgttg 540
gcctcctttg ctgccctcac natctcttcc tgtgacacca cccggctgtt gtctccatag 600
gcaatgttct cagcaatgct gcagtcaaac aggatgggct cctgggacac gatgcccagg 660
tgtgctcgga gccactgaac attcagtcgc tttatttctt tgccatcaag cagctgaaaa 720
caagagttca cagatcaact tcaggaccag cacactttga atgtagcaca attaacatca 780

-continued

```
ttatttctta cactgaaact gccaagttac tgtgagatta aggaaaagtt tgtgtgatta    840

aaatttggat agtgaaggtt aacccaacaa ggtcataatt gtatgccttg aggaactgtc    900

atgtttcctg tgtttcaacc atggtttctg atgtatgcat gtggtaggca gaataatgtt    960

ccctctccca caagacatct gtgtcctaat ccctggatcc tgtgaatgtg ttatgttaca   1020

t                                                                   1021
```

```
<210> SEQ ID NO 26
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 26

gccttgcctt cccccaggca ggtttgagag gtctgggtct caactgactg gggcagcagg     60

acctcatccc ctccctgccc tacacccagc ctgccccagc cctgcagtct gttgttcctt    120

agtcagggag gagcccaaaa gtgtgaccaa accaagggaa cactcaactt ctggcttcct    180

ccctctttgg gtagccctca agccactgga ctttgaagtc agcaggtaat tctccaaatg    240

gaagaacttt tttttttttt tttaaaagca gagccaagga agccacattt tgagtgatgt    300

ggtttttgaa gaaaaaagaa aaagagatcc cagataaaaa tgatcttatg tgaagggagt    360

aaatggatgc acagaaacag cagcagctcc cgagccacct ggtggagcac aggggccctc    420

cctggcctcc cccaacactg gggctggggt ctgggggctg cccagcaggg tgatgtggct    480

cccttgggcc tgagagcacc ctggagggag ttgaccctgg ggggcaatgt tcccaggacg    540

cagtacctga tatccaagtc ngtcgctgtc tcccgctctg ggctgcagca ggggaggaaa    600

ggcatactga gctctcatgg gagtgaacca tatcctccag gaagatcctg agctccctcc    660

aacccaacat gagcatgcct ttacaatccc ctggacccag tctgtagcca caaatgctgc    720

atagagaggt gtggagagtg gggtgtgccc atcttgggga agcctctgct gcctgaccac    780

gtgggtgtgt gaggagggcc ctggaggacc cagttaagag ggagaatggg gagaggtgcc    840

attggtgcag gctctggggg gaaaacttgt cagatcagga gtatgaagcc cgcaatgtgg    900

ctcctccaga cccagcctct gcattcaggt tggaatgaat aggctgaggt ctgaggctga    960

tacagctgca caaacagctg ggcaaggag tgctctggac agagccaggc caggccaggc   1020

a                                                                   1021
```

```
<210> SEQ ID NO 27
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 27

tgtcaggcaa gattcaaatc aaaataatta attttaaatg acatgcatac tttttggaga     60

gaaaagtttg ggttacaatt agccaatctg ttaaaactca aagaaatcta atccaaacgt    120

aatacacatg tctgtaccat tttttttagc ctattctctc ttcagactta tacttaatca    180

caaataacat tcttctttct attaattaat tccaaaaact ggctcacagc catatatgac    240
```

-continued

```
agtcatttat tgctactagg gacataaaat ttctaaataa tcagaaatcc acgttgtcat    300

ttatgaatat tctctctcct tgcaaaccaa aaaaatcatc tttaacctta cctgatagat    360

tttggcatcc ctcattagtt tttctacagg atattctgta ttaaatccat tgcctccaag    420

tatctgcaca gcatcagtag ctaactgatt tgcaatatct ccagcaaatg cctttgcaat    480

agaagcataa taggtatttc gacgaccaga atcaacctcc caagctgctc tctggtaact    540

cattctagct agttcaactt ncattgccat ttcagccagc ataaatgata ttgcttggtg    600

ctagaattaa aaagaaaaaa attaaaggat atttattgag aaaacttaaa agttttttcc    660

tggggctttt tcatttttat agtgacgggg tcttgctatg ttgcccaggc tggtctgcaa    720

ctcctggcct caagcaatcc tcctacttag gcctctcaaa gtgctgagat tacaggcgtg    780

agccactgtg cctgaccttt ttattttta aacttttcat taacgaattt taggtttata     840

gaagttacac ccagcttcct ctaatgttaa catattacca aaccatagtg ccatgatcga    900

gaacaggaca ttaacactgg tatagtatta acaactaaac tataagcctt actcaaatct    960

ggtcaagttt tctactaatg ttctttttcc accattatac gttgaattta gttatttctt   1020

c                                                                   1021


<210> SEQ ID NO 28
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 28

aggtagcggc cacagaagag ccaaaagctc ccgggttggc tggtaaggac accacctcca     60

gctttagccc tctggggcca gccagggtag ccgggaagca gtggtggccc gccctccagg    120

gagcagttgg gccccgcccg ggccagcccc aggagaagga gggcgagggg aggggaggga    180

aaggggagga gtgcctcgcc ccttcgcggc tgccggcgtg ccattggccg aaagttcccg    240

tacgtcacgg cgagggcagt tcccctaaag tcctgtgcac ataacgggca gaacgcactg    300

cgaagcggct tcttcagagc acgggctgga actggcaggc accgcgagcc cctagcaccc    360

gacaagctga gtgtgcagga cgagtcccca ccacacccac accacagccg ctgaatgagg    420

cttccaggcg tccgctcgcg gcccgcagag ccccgccgtg ggtccgcccg ctgaggcgcc    480

cccagccagt gcgctcacct gccagactgc gcgccatggg gcaacccggg aacggcagcg    540

ccttcttgct ggcacccaat ngaagccatg cgccggacca cgacgtcacg caggaaaggg    600

acgaggtgtg ggtggtgggc atgggcatcg tcatgtctct catcgtcctg gccatcgtgt    660

ttggcaatgt gctggtcatc acagccattg ccaagttcga gcgtctgcag acggtcacca    720

actacttcat cacttcactg gcctgtgctg atctggtcat gggcctggca gtggtgccct    780

ttggggccgc ccatattctt atgaaaatgt ggacttttgg caacttctgg tgcgagtttt    840

ggacttccat tgatgtgctg tgcgtcacgg ccagcattga gaccctgtgc gtgatcgcag    900

tggatcgcta ctttgccatt acttcacctt tcaagtacca gagcctgctg accaagaata    960

aggcccgggt gatcattctg atggtgtgga ttgtgtcagg ccttacctcc ttcttgccca   1020

t                                                                   1021


<210> SEQ ID NO 29
<211> LENGTH: 1021
```

<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 29
cagagccccg ccgtgggtcc gcccgctgag gcgcccccag ccagtgcgct cacctgccag 60
actgcgcgcc atggggcaac ccgggaacgg cagcgccttc ttgctggcac ccaatagaag 120
ccatgcgccg gaccacgacg tcacgcagga aagggacgag gtgtgggtgg tgggcatggg 180
catcgtcatg tctctcatcg tcctggccat cgtgtttggc aatgtgctgg tcatcacagc 240
cattgccaag ttcgagcgtc tgcagacggt caccaactac ttcatcactt cactggcctg 300
tgctgatctg gtcatgggcc tggcagtggt gccctttggg gccgcccata ttcttatgaa 360
aatgtggact tttggcaact tctggtgcga gttttggact tccattgatg tgctgtgcgt 420
cacggccagc attgagaccc tgtgcgtgat cgcagtggat cgctactttg ccattacttc 480
acctttcaag taccagagcc tgctgaccaa gaataaggcc cgggtgatca ttctgatggt 540
gtggattgtg tcaggcctta nctccttctt gcccattcag atgcactggt accgggccac 600
ccaccaggaa gccatcaact gctatgccaa tgagacctgc tgtgacttct tcacgaacca 660
agcctatgcc attgcctctt ccatcgtgtc cttctacgtt cccctggtga tcatggtctt 720
cgtctactcc agggtctttc aggaggccaa aaggcagctc cagaagattg acaaatctga 780
gggccgcttc catgtccaga accttagcca ggtggagcag gatgggcgga cggggcatgg 840
actccgcaga tcttccaagt tctgcttgaa ggagcacaaa gccctcaaga cgttaggcat 900
catcatgggc actttcaccc tctgctggct gcccttcttc atcgttaaca ttgtgcatgt 960
gatccaggat aacctcatcc gtaaggaagt ttacatcctc ctaaattgga taggctatgt 1020
c 1021

<210> SEQ ID NO 30
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 30
ccactccgga gcacctggct ctgccctcag gaactccctg agctttgcac acagggccga 60
gacacctgga tttctctggt tccctgagtg ggccagcttt ggaagaattt cccaaagcct 120
attagagcaa cggctgcctc ctgcctgcct ccttgggctg ggcagggctg agggcggagg 180
gagagagaga gagagggagg gggagaggag gaaggaaaaa gttggcaggc cgacagcaca 240
gccgtgtctg catccatcca gaggaggtct gtgtggtgtg gggcgggcca ggagcgaaga 300
gaggccttcc tccctttgtg ctccccccgc cccccggccc tataaatagg cccagcccag 360
gctgtggctc agctctcaga gggaattgag cacccggcag cggtctcagg ccaagccccc 420
tgccagcatg gccagcgagt tcaagaagaa gctcttctgg agggcagtgg tggccgagtt 480
cctggccacg accctctttg tcttcatcag catcggttct gccctgggct tcaaataccc 540
ggtggggaac aaccagacgg nggtccagga caacgtgaag gtgtcgctgg ccttcgggct 600
gagcatcgcc acgctggcgc agagtgtggg ccacatcagc ggcgcccacc tcaacccggc 660

-continued tgtcacactg gggctgctgc tcagctgcca gatcagcatc ttccgtgccc tcatgtacat 720
catcgcccag tgcgtggggg ccatcgtcgc caccgccatc ctctcaggca tcacctcctc 780
cctgactggg aactcgcttg gccgcaatga cgtgagtggg gtgtccctgg gcttgggggg 840
gttctagaat gatgctgaaa ggcactggtt ccatcctctg cccattgtgc agatggggac 900
actgaggaac ggagaggaca agaggttgct ggaggtcacg tagagagctg gggggaagag 960
ctggggctgg aactcagcta tgcatgcctc ccaaagcctg ttttctgcca ggcactgtgg 1020
g 1021

<210> SEQ ID NO 31
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or c.

<400> SEQUENCE: 31
ctcctcacca gtcctcacca cctctctccc ctgcagctgg ctgatggtgt gaactcgggc 60
cagggcctgg gcatcgagat catcgggacc ctccagctgg tgctatgcgt gctggctact 120
accgaccgga ggcgccgtga ccttggtggc tcagcccccc ttgccatcgg cctctctgta 180
gcccttggac acctcctggc tgtgagtcag gggccctccc agatggaggt gggggaaggg 240
agggcggggg ctggtggggt gccctgccat gggcagccag tgggactccc gacagggctc 300
ttgccattgg gtggaggatg gcgggtcagc gctgggggct gggggcaggg tcctgccctg 360
gagaggagca cagggacctc ctgcccagct tggggtcagc actcctcttt ccctgggtct 420
cattgtcccc caccctgatt gttctctttc tccctccaac ctctccctcc tctcactctc 480
tcttcaccta tgactctctg ccttcgcccc tccctctgtt tctttccctc acagattgac 540
tacactggct gtgggattaa ncctgctcgg tcctttggct ccgcggtgat cacacacaac 600
ttcagcaacc actgggtagg agacccacgg ggggtggggt gggaagcttt ggtgtcccat 660
ggtaagcctg accccaccct cacagtgtcc cttcctgttc tggaggctct gggagacagc 720
cagaggacag gaaatcagga aactgaggcc tgccatgtag aggcaggctg gggtcacac 780 tgccagcact ttcaggccta gtctctgccc tcccagctcg gccctgcccc atgctgcctg 840
gcctccaggt cttcccagct gcgtggttaa aagtggggct ccaaatcctg gctcagccac 900
tttcgggttt agcatgacct tgcgcagtgt gcttgagctt tggtttcctg agctgcggag 960
ggggatatgg tggtgcccac ctctcagggt ggccgagaag aggaaagggc tcactcccca 1020
t 1021

<210> SEQ ID NO 32
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 32
tttgactccc tgtaccttta agagggaccc ttaaatttaa aaatctattg tatttttttt 60
ttagtagggg tagggaatat ttagggaatt tggaaggggt tatatagttc tttaagaatc 120
aaatagcaca tcttcctgaa aatagcacgt agacaaagtt tttttggaga taaccttagg 180

-continued

```
aatatcgtaa ctctctgatg ccacctccat atgtgatcct atgttgatta taagattttg    240

atcagtggct ttcagacttt tttgactgca acctagaata aaagattcat ttacattgtg    300

acctagaaca cacacacaca cacacactct ctctccgcca ctctcctgca cacagaaatc    360

attgatgctt acaacaattc ttactcttac tatgggtgat ttactttgat atgctctgtt    420

tttttttca tttacaaaac tgtggattaa tttttttga catgctaaat tgatctcagt    480

aatagattgt atttattctt ccttagattc ttctttggag cagaataaaa gatctggccc    540

atcagttcac acaggtccag ngggacatgt tcaccctgga ggacacgctg ctaggctacc    600

ttgctgatga cctcacatgg tgtggtgaat tcaacacttc cagtgaggct ctgggccctg    660

tgggattgcc cagggatgtg gagggtgaac agagtgactt ctgctggagg ccctgaatga    720

ttagtgtgga ggacagagcc acaggcaccc atcctgatgc catctatact tatattagtc    780

catttgtgtt gctattaagg aatacctgag gctgcgtaat ttataaagaa aagaggttta    840

tttgactcac agttacgcag gctgtacaag aagtagggta ccagcatcca cttcgggtga    900

aggcctgagg ctgtttccac tcatggagaa ggggaagggg agctggcatt tacagagatc    960

acatggtgag ggaggaaagc aaggagaggt caggggaggt gccaggctgt ttgtaatgac   1020

c                                                                   1021
```

<210> SEQ ID NO 33
<211> LENGTH: 1021
<212> TYPE: DNA
<213> ORGANISM: Homo sapiens
<220> FEATURE:
<221> NAME/KEY: misc_feature
<222> LOCATION: (562)..(562)
<223> OTHER INFORMATION: n can be a or g.

<400> SEQUENCE: 33

```
tcaaattatc atcgcttttt tatttcagga ttacaccaaa gactgtttcc aacttgactg     60

aggtaggtag tcttggatag actgggggaa ataagtcctg tgggacctcc tgccttaaag    120

aaagcaggcg gagggcccta aaggaaatca ggcaaccaga ccaaaagaat gtggaccagg    180

tggtccatgc tgtgtctctt gtgacccttc ttctccctgc catgtctttt gggagagccc    240

ttgtgttgca aaaatgagag tgtggtggta tggattgggg tttaggcaga acagtactgg    300

ccaagcagcg cctccctgga cctcaatttt ccctctgtgg aatgggctag caatcctggg    360

cctccccagg gcgaaggaaa gaccactcag gaagggcacc gtctggggca ggaaaacgga    420

gtgggttgga tgtatttttt tcacggatgg gcatgaggat gaatgcttgt ccaggccgtg    480

cagcatctgc cttgtgggtc acttctgtgc tccagggagg actcaccatg ggcatttgat    540

tggcagagca gctccgagtc cntccagagc ttcctgcagt caatgatcac cgctgtgggc    600

atccctgagg tcatgtctcg taagtgtggg ctggagggga aactgggtgc cgaggctgac    660

agagcttccc atttcacctt gtgggccctt cccaggcaga gcttcaggtg cccctcttcc    720

cagtcattga tacttagcgg tcctggcccc ctttcctctc cctgctggtg gtattgcacg    780

ccaatgactc ggccagatgc ccagacccct gttcttggtt tacctgcaga atattatctt    840

tgccaccccg cgggatggct caacccactt tcaggatgca ggtctcctaa tagcaacctg    900

atatagcaga aagacccctg ggctgggagt ctgagaccta gttctagccc agccctgaac    960

ctcagtttcc ctttctgtga aacaagaatg ttgaacttga tgattcccaa ttttcctttt   1020

g                                                                   1021
```

<210> SEQ ID NO 34
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 34

```
gggccaaggc cacaaagtct caggacaagg cagactgcag acccagggga cgtgcgcgga     60
ccggggcttg tttcggtcct gggtgttctc agccttgatg tggacactag cggctctggt    120
gcacttgctc ggaggaagca gccacgtgtg ggtgtcctgg cctcagccgg cagtaaccag    180
cagacacaca gcacggaacc ctccacccta ccaggaagcc caggcaagac cccccagcag    240
tgcatgctga ccccagaccc tggcgacgga tcggagctcc tcggatttgg agtggatcct    300
tacaaatcct gcacactaga cagcagacac aggccctgcc agagccaggg acccgaattt    360
ttgtttggaa aaacactgag gtaagtgggg ggtggctcct gtccaggcag cccggccggt    420
gggacagtgg ggagggtcgg ctccaagccc tcctgagccc tagagggggt gcgggacggg    480
gactcacagg agatgcagga cggcccgaac atagtaattc ctggtaaagg gcccgaacag    540
cttcaccacg gcggtcatgt ncttctgtcc cctgggggag ggaggaaggc gagacggcgc    600
ggctgggcct ctcccactcg ggactccttt gctgccctgc tgaccacccc agggcaccca    660
ggcctctttc ctcccacaaa acacaccggg caggcaccgg ccttggttta cccacaagca    720
ccaaagggtt ggttccggag cctccaagtg agaaaccaag ctccacccaa ccctgtgagc    780
cctgcctggg ccccgcagcc cccggagaga ccccagagca ggaggagact caccagcgct    840
ccatggtgga gcccttcttc ctcttccccc gggggtactc cagcaggcac acaaacacgc    900
ccgccacact gaagccatgt ggttaaggaa cagcccagct cagcctgagg ggccacaggg    960
aactcccttt actgaagaca acacagagag gggcccgagc acggtggctc atgcctggaa   1020
t                                                                   1021
```

<210> SEQ ID NO 35
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or t.

<400> SEQUENCE: 35

```
taatacatga aagaagaagc tagtcaatgt ggagctctat tgtgtcccgg gatcaacaaa     60
gacaagatat ctttaaaatc gtcttctaaa tttaccctaa tgtaaaacaa atccaataaa    120
actctaatgt aattttttaa gaatttaaat ttggaataat tccaaagaac aatttttctt    180
aattttctac agccagaata tataccttta aaaaaaatga aaacagagat taactttctc    240
agaattggtt gactcactct ttccttttat ttttcttcca tggaattttc cagttaactt    300
gagaaagtgg aatcgaattc cgatgttgaa ttttccttct ggccccattc atgtggcagg    360
tggtgattca ggtactactg gggctgctc agacaaacct cctcatcaga catcaagagg    420
ctgttgcacc aggagggccg gtaccgtgtc tagaggtggt cggcatgggg ttggagttgt    480
attacataaa ccctactcca aacaaatgca tggggatgtg gctggagttc cccgttgtct    540
aaccagtgcc aaagggcagg ncggtacctc accccacgtt cttaactatg ggttggcaac    600
```

atgttcctgg atgtgtttgc tggcacagtg acaggtgcta gcaaccaggg tgttgacaca 660
gtccaactcc atcctcacca ggtcactggc tggaacccct gggggccacc attgcgggaa 720
tcagcctttg aaacgatggc caacagcagc taataataaa ccagtaattt gggatagacg 780
agtagcaaga gggcattggt tggtgggtca ccctccttct cagaacacat tataaaaacc 840
ttccgtttcc acaggattgt ctcccgggct ggcagcaggg ccccagcggc accatgtctg 900
ccctcggagt caccgtggcc ctgctggtgt gggcggcctt cctcctgctg gtgtccatgt 960
ggaggcaggt gcacagcagc tggaatctgc ccccaggccc tttcccgctt cccatcatcg 1020
g 1021

<210> SEQ ID NO 36
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 36
aaaaagagga attaaattgt gtagatgcct ttaaagaaca tttttctagc atctttctac 60
atctttccct aagtggcctc ttgagcccag tcggattttg gttatatgcc atgatagtaa 120
tcataagaat cagttaaaaa tgatccaaaa atgcacgaat acagtcgatt ccctctcatt 180
tattccttgt ggaaaaagaa aaacacaaat cttaaaaact aaagcaagtc agggaagcct 240
ggaaagatac ccagatttga taacatgtta gaaggaaatc caggctaagg aatctcattt 300
tctagctttg atctggttgt cagttgggat ggacttgccc aagtgatggc ccacagaaag 360
gccaaatttc ttgtttttct cctcatcctg tacctctttt ttcattaaga atcctgcctg 420
gaagtttagg tcaaagaggc tgcttggagc aaaatacagt ggtgtctcat cccaaatatt 480
ctccaggcgt ttcttccatc cttccaggat ttgaattcgg gcgtctgctg gagtgtgccc 540
aatgctatat gtcagttgag nttctaagac ttggaagcca cagaaatgca gaatgccact 600
ctgaggatac agaaagcaca gagaggtaag tcaaccaatt ccatgcagtt gtactataaa 660
caacagaagt tggtctgggc ttctcagtaa gacactctga taaggaggcc tcaggcacac 720
tagagaatca gttcagagct agcgtctctc tcttaccctc tacctagccg ttaccaattt 780
tagccttctc aggtgtgttc ttctttaaat gcataaacct tgaaactgtg ccaacctgga 840
tcctttgcca agaaggctgg aagttctgtt actttaggga gtctcagttt cttggcaggt 900
gactcaccaa gacctgcgtg ggtgcatttc tctgcctctc catataacta gatgagtcct 960
tttttctttt ttcttttttt ttttttttt gaggcagagt ctcgctcggt cgtccaggct 1020
g 1021

<210> SEQ ID NO 37
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 37
ctcatgtagg aaccagcagg ctactagaaa ttaaagttta aatctgggag aaggttagcg 60

-continued

```
ttaagtgtgt gtatacgaga gtcaagccag agaggagggc agtaatgctg tggggttgca    120

tgaaattcac caaaggagag catgcaaagt gaagagggag gcaaatgaag atggagcccc    180

aaggagcact tacatttaaa aatatgggca gaggaagagg aatcgtcaaa ggagactaaa    240

aagtagccaa ggcagggagc atttcaagaa ggagagaaag atccactttg ccatatgctg    300

cagaaagagt ccaacaggtt gagaaatgac agtactcgtg attccaaagg taatgaaaaa    360

aatccccaga attctatgca tgaattaatt acgtgattaa acatacaaat gtactgttct    420

ccaagaaaac tgagctgttt ccatattcag cattgaatac caagatatta ttttcttgtt    480

tgtagagata ttcatgatct aaagagagaa aacacccaga tcaaaatttc aagttgttat    540

taaacatctt cataagctga naattacaga atacagttta agctcacaaa taccaaatag    600

gcatttctaa gttgagaaaa catgaatgat attatactaa cattcattca ttttttcatc    660

attattgtca aggtttcaat tcacatttaa ttttttatta tacatgtcaa agaaatactt    720

gggttccttt cagtctttct ccctttgcac ttcaagtaga aaaagaaaaa aaaaactctc    780

tatagaattt ttaaaaacaa ggattacctc ttctcagtgc cataaaagcc cacatctcga    840

cttaactaga atgaatgtaa gcataaaatc tgccctaccc caaaaaattc ttacctgaaa    900

tccatcttaa ggagtataac ttcagtctat aagtattttt taagtaatca gttagagtgt    960

aagttttgcg actgtcagct gtagcatcat ctgctggttg aaagaaagag ccaaatgttc   1020

a                                                                   1021
```

<210> SEQ ID NO 38
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or g.

<400> SEQUENCE: 38

```
agcgttcaga gaaggagcgc aggcagaagt caccgcgggc ggcggagacg cgcgtcctgc     60

accgctgctc cgggcggtgg agtcactcgc cgctggcaag tttcggcccc gagttaaaca    120

ttagtgagcg ccgagcccgc tgggtataaa ggcgccgcgg gcaggctgca gggcaggcgg    180

cgcgggagca ggcgcgcgtg gcgcggggca ctggcatccc ggccgggggg agcccgcgag    240

ggccccctga gggcggtgta gggcgctggg cggcagccgg ggcgcagagt gcggggcccg    300

gaggagccgt gggggagggg aaagggcgcg cggcctcgga tgcgcagacc ctgggccggc    360

gactcgggga ccctgctccc tcttagctaa aaatgacgtc ggcgttcagc tcctccaacc    420

tcacgtggac aggcgaggga accgagaccc agagagggca ggggactttg gcaaactcac    480

acagcccacc gcaggcaact ggaactgaaa cccaggactc cgtctcttgc cagtgaaagt    540

tatgttagga agcagtgagg ngtctaaagc agtatgaaag gcaaagagaa aaggtgattg    600

ttccctcttg aatggccctt ggaagctgag tatctggatt caccctccct agggaatttc    660

ccgattgtct tgcaggctta cacactcatc aagatgacaa aaataatgac agtaacactt    720

atgtggaact tgactttttc ccaggtgctg ctctaagcat ttactgtgtt tgttttacag    780

gaaggaagac tgtacacaga gaataaataa cttggccaag ccattcagct aggaagttgt    840

agatcctaaa ttaagagttc aaggtcttaa tggctactct atgcggcctc tcatagtctt    900

ttcaagggtt ttggagaaga ataaaagatc aggtatggct tctccctccc ccagctctct    960

attgttccct aaaggattat tcattcgttc attcattcct acatcctccc atttattcca   1020
```

-continued

```
g                                                                 1021

<210> SEQ ID NO 39
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 39

ttctgatcag ttttctatgt taaataaata tacatctacc ttgtcagttt agatgactgt     60

actggactcc agtatactgt caaactatac ttgattaatc ctgtattgct ggatacgtgg    120

ggctttctcc ctaccctcca gattttaaat tattgaacaa gtatttatgg aggcctgctg    180

tgagccagga gctgtcctga gccctggaaa cccagcagtg gctgtacaga cctggcccag    240

ctgtcagggg gcacctctaa ggaaaccggg aggcaataat cgtagctccc ttgcagggag    300

gttgtgaagg ctgagtgagg acatctgtgc acctggagca cagtgtgagt gtgaaaccag    360

tgtcagccct tattactgtc aataccatga aggggcggcg ggggcactaa gggtggcagg    420

actcaatatc taggctctgg ggggtgccag agcctgaccg tgcagggtct tctctctccc    480

tccaccctga ctgtgctctg tccccccagg gctggacatc cacttcatcc acgtgaagcc    540

cccccagctg cccgcaggcc ntaccccgaa gcccttgctg atggtgcacg gctggcccgg    600

ctctttctac gagttttata agatcatccc actcctgact gaccccaaga accatggcct    660

gagcgatgag cacgtttttg aagtcatctg cccttccatc cctggctatg gcttctcaga    720

ggcatcctcc aagaagggta cggggctgct agaggttcca taactgcccc gtcctcgcca    780

agggtgggcc cggtgttccc accaggctct ccttccggcg gggtgagcag ggagttggcc    840

cgaggaagct gggaaaggag gggcctgaga ggccggcccc agacacaccg ccctccgggg    900

ctggagatgc cacccctata tttgggctcc aggattcctt cttgcctctg tgagcttttc    960

tgacctccac ctgggggtag gcgggcctga gaaatttcat agaacaccag agggcccaag   1020

g                                                                 1021

<210> SEQ ID NO 40
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 40

tttctggatc acgttttcat atattctggt tcagtacatc tatctttgag ttatctttaa     60

tatactgaac cagaacatac aggaatgtga tccagaacat cattggccat cagattttct    120

agtatatgtg atgtgcacct cttataaatt ataattgaat tcactgccat atctccaagg    180

ggtgtcactc ttgtactcca gaagatactg gttatgcaca agaaatcatg cagggacaaa    240

tagacagata ccatttagtg ttttgattta ttctgaggga attttaaatt tgtaatatgt    300

atcttaatca ttaaatattt ttcttaaccc acttttcttt tttcatactg tatctgccaa    360

aaccatttgc tagcatagaa aagagggatt tctttctgta tttctcttag acatttgtat    420

ccagtgtaaa taaacatcct gattttgcaa ctactggcca gtgggatgtt accactgaaa    480
```

-continued

```
gggatggtaa aaaagaatcg gctgtctttg atgctgtaat ggtttgttcc ggacatcatg    540

tgtatcccaa cctaccaaaa nagtcctttc caggtaaggc caaaatttaa gctgctagcc    600

acataactga caaaaatgaa tatcttgata atgtcttctt ttttctaaaa gtataagcag    660

gttaaattaa aatatacttc tgttatatct aatatgcttg gtgtgttaaa atagcacatt    720

attgtgactg catctattca caaggtcgct tctgttaaag tctttgttta aatatatgac    780

tcaaactgcc atgtatttct cacttttcac tcaggactaa accactttaa aggcaaatgc    840

ttccacagca gggactataa agaaccaggt gtattcaatg gaaagcgtgt cctggtggtt    900

ggcctgggga attcgggctg tgatattgcc acagaactca gccgcacagc agaacaggta    960

ctactccccg ggtactcggg tgactctcgt tactgacaga agagttatta tcgtttgaaa   1020

g                                                                   1021
```

<210> SEQ ID NO 41
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 41

```
tcaaagaaaa tccaacatta aaatgtatgc cttacgatag gcttgtgttc ttatttgctg     60

ccttctctct ctatgctgtg cagctaggct gtaattttaa atgcatgtct tggattttat    120

tctacaagaa aaggaatgca tctgtttcca ttccttaccc ttggctgggg gataatttta    180

atgttgggtt tgaaccccac gaaagaatgt tatatttgct ctatcttttg gtagaaatta    240

gattggtaac ctcgtaggtc cacaaaagta aactttcact ttaagggaaa atgagtaagc    300

aagtaaatat tgctaggact accactggga aaataattta aaggctatgt cacactggag    360

gttgggtaag tggtttagag gggtgcgggt taagacattc gggggcataa tactaaggag    420

agcatcccca accctaaaca tcttcaaaat gatcagggct tatgggcact atttgacgag    480

cataagaact taataatgtc aagagaaatt ttagacctat ttaatacatt tataagcaag    540

ttttgagcca ggcttagact nttacctgtt cctcttggta ttcatcaacc actgcacaaa    600

atcttgggca cgcctggagt ccagatactt gctgtagtca ctggtgaatg tgccctgtga    660

atggcgcttg tcctcgttca tctgatcagg atcactgagt gggtctgcct gggaagctga    720

gaatgatctg tgaagaacag tgattggtac aacataaatc tctcctcaag agtagactca    780

cttgagaagc atcttcacta caaaatacaa gaccatataa aacagtaagg caggcatcta    840

gagtatttca ataggtagtt tagaaagatc ttccttagct tgtcatgaga atcccttcgt    900

tttagtatag ttgcatacgc tattattctg aattctagaa acatgtttct caactgactt    960

cttttttttct gaaataggat taaacaaatc tttttctact aattaatcta ctcatgatta   1020

t                                                                   1021
```

<210> SEQ ID NO 42
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 42

-continued tctgcctgtc cgtctgcctg tctgtctgcc tgtccatctg tccatctgcc tatccatctg 60
cctgcctgtc tgtcggcctg cctgcctgcc tgtctgtctg ctgcctgtct gtccgtctgc 120
ctgtctgcct gtccgtctgc ctgcctgtcc gtctgcctgt ccgtctgcct gcctgcctgt 180
ctgtctgcct gcctgtctgc ctgcctgtcc gtctgcctgt ccgtctgcct gcctgtctgc 240
ctgcctgtct gcctgtctgc ccgtctgcct gtctgtctgc ctgtccgtct gcctgtctgt 300
ccgtctgtcc atctgcctat ccatctgcct gcctatctgt ctgtccgtct gcctgcctgt 360
ctgtctgcct gtctgcctgt ctgtctgcct gtctgtccat ctgcctatcc atctacctgc 420
ctgcctgtct gcctgtctgt ctgcctgtct gtctgcctgc ctgtctgtct gtctgtctgg 480
ttgcttgtgc atgtgtcccc cagccacagg tcccctccgc tcaggtgatg gacttcctgt 540
ttgagaagtg gaagctctac ngtgaccagt gtcaccacaa cctgagcctg ctgcccccctc 600 ccacgggtga gccccccacc cagagccttt cagcctgtgc ctggcctcag cacttcctga 660
gttctcttca tgggaaggtt cctgggtgct tatgcagcct ttgaggaccc cgccaagggg 720
ccctgtcatt cctcaggccc ccaccaccgt gggcaggtga ggtaacgagg taactgagcc 780
acagagctgg ggacttgcct caggccgcag agccaggaaa taacagaacg gtggcattgc 840
cccagaaccg gctgctgctg ctgcccccag gcccagatgg gtaataccac ctacagcccc 900
gtggagtttt cagtgggcag acagtgccag ggcgtggaag ctgggaccca ggggcctggg 960
agggctcggg tggagagtgt atatcatggc ctggacactt ggggtgcagg gagaggatag 1020
g 1021

<210> SEQ ID NO 43
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 43
ctgctttcca aatcagcttg gagagacagg ctgactcctt tccctcttcc tcaggcatcc 60
tctctggcca cgataacagg gtgagctgcc tgggagtcac agctgacggg atggctgtgg 120
ccacaggttc ctgggacagc ttcctcaaaa tctggaactg aggaggctgg agaaagggaa 180
gtggaaggca gtgaacacac tcagcagccc cctgcccgac cccatctcat tcaggtgttc 240
tcttctatat tccgggtgcc attcccacta agctttctcc tttgagggca gtggggagca 300
tgggactgtg cctttgggag gcagcatcag ggacacaggg gcaaagaact gccccatctc 360
ctcccatggc cttccctccc cacagtcctc acagcctctc ccttaatgag caaggacaac 420
ctgcccctcc ccagcccttt gcaggcccag cagacttgag tctgaggccc caggccctag 480
gattcctccc ccagagccac tacctttgtc caggcctggg tggtataggg cgtttggccc 540
tgtgactatg gctctggcac nactagggtc ctggccctct tcttattcat gctttctcct 600
ttttctacct ttttttctct cctaagacac ctgcaataaa gtgtagcacc ctggtacatc 660
tgtgatgttt gccttctact ctcttctgtt ccaaaaagac ccaggtccca tttaagggca 720
gtaatgtgtt acaggtgctg tgataaaggc tgggtactgg atagcttgtg ggcttatggg 780
aggaggcctg agatgggtca gggggagaag gtattcagca ggtggctggg ggactgtgtg 840
cagcagttcg ctatggcctg cctgtggtgc ccatgtgttt gtacgggagg gttagcttga 900

-continued gaaggaatca gattataaaa ggtcttgaat gtcaagccag agagtccaga ctttttccta 960
agggcaatga gaagccattg aggagttctg agcagagtag taacatgatc agttatgctt 1020
c 1021

<210> SEQ ID NO 44
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 44
accattgttc ctgttttgca aagaaggcaa caggctcaga gaaggccagt gcctcgcccc 60
aagacatgct agctctgact aggatgccat gaccacgctg tcccctgccc actacactca 120
cccggtgtgt agccccaagg ctcatagtag gaggggaaga ctccaaggtg acagccacgg 180
acaaactcct catagtccac agggagcagg gggcttgtgg aggagaggaa ctccgggtgg 240
aaaatcacct ggtagtgaaa aagaaggact cagcccaagt gccttattta gctaagccct 300
gagatcccaa ggtggcccag agagggtaaa aagcttgtct agcatcacac agcatgtgtt 360
tggcaggacc aatgttcaaa cccaggtctg cctgcctcag aagccagggt tctttctaac 420
cacagcaata cctttgataa aacttatagg ggaatggagt gtgtgaggcc caggacccaa 480
ccccttccct ctgccgtgcc caacccagcc ctgaccaaat gccctcacct tcaccctgtc 540
ggcactgcta ttgaagaggc ngattcggcg gatggtggtc aggatggggt ctgaggagtc 600
atccagcata ttgtgggtgc acacaggggg gaaagactgc cgctgcagga gccacaagaa 660
gggtaagggg tcatggaagg gacagagaac tccctacttc ctcatgagcc atgcggaccc 720
tgggggagcc aaggagacca caaatgcacc ggacgtgggg caacaaaccc aagtgatcac 780
caggagttgt ggattcccac tagtacaacc tgtaaaggtt ttctttcttt tcttttaaat 840
tattattatt tatttttgag gcggagtctc gctctgtcgc ccaggctgga atgcagtggc 900
acaatctcgg ctcactgcaa gctccacctc ccaggatcat gccattctcc tgcctcagcc 960
tcccgagtag ctggaactac aggcgcctac caccacgccc ggttaatttt ttgtattttt 1020
a 1021

<210> SEQ ID NO 45
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 45
caaactcaca gttggatggc acaacaatta catcctgtgt ggtcagcagt gatggagggg 60
ccgcagagat ttggaaacag gagggacaca ggatacagat ataggagggt agaaggcaga 120
cttcctggag gaggtgaaac ctaacctgag tccctaaggt gataggaagc aggaaccagg 180
gaaggggagc ctattctaac acagtagaag cagcaactgc tgaggtctgg atgaggggac 240
ctcaactgtg gcccaaaacc ccaagttccc attgtggctc tgccaacaac tggctgtgcg 300
acccaggaca agtcctatct ttgcactgtg tctgggtttc cccgtgtgta agatgaggcg 360
gttgctaggt gcttattgga tgcattcctc aagtcccgcc ctccatctcc tattcccctc 420

```
tcttctggtt tagtgcttta ggaaatgtgg cagaaatctt tttctgcctg tgtctaggaa    480

atcataattc atgctggcgt accctggttg ttgaggtccc tgaatccttg tgcccacact    540

gctgaagact ccttgtgtga nacaagtcag gggacatctg ggtcttgact ccccagatgc    600

tccagctgga ccctgctgcc ctcccttgcc caccctcttc cattgtagat gccaaggggc    660

tgagcgatcc agggaagatc aagcggctgc gttcccaggt gcaggtgagc ttggaggact    720

acatcaacga ccgccagtat gactcgcgtg gccgctttgg agagctgctg ctgctgctgc    780

ccaccttgca gagcatcacc tggcagatga tcgagcagat ccagttcatc aagctcttcg    840

gcatggccaa gattgacaac ctgttgcagg agatgctgct gggaggtccg tgccaagccc    900

aggaggggcg gggttggagt ggggactccc caggagacag gcctcacaca gtgagctcac    960

ccctcagctc cttggcttcc ccactgtgcc gctttgggca agttgcttaa cctgtctgtg   1020

c                                                                   1021
```

```
<210> SEQ ID NO 46
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 46

tcatttttac acaggatgta cgcgttttga agcacaaaac tctccagtga tcacaggtca     60

tagactgtct gatttttatg tgaaatccca ttttaagagt aaaatataag taacatagta    120

ggctctagtc tataaacaaa gacttctatt tatagtttgt ttgccccctg agccccatct    180

catctgctgg tggcatgcac atgctcttta ttaccagtgc gaatatagct gggaaactaa    240

tgccactcac catacaggat ggttaacatg gacacgggca tgacaaggaa acccagcagc    300

atatcagcta tggcaagtga catcaggaaa tagttggtgg cattctgcag ctttttctct    360

agggacactg ccatgatgac gagtatgttt ccagcaatag ttagaataat cactacggct    420

gtcagtaaag cagaccagtt tttttcctgg agatgaagta aggagagaca cgacggtgag    480

aggcaccctt cacaggaaag gttggttcga ttttcagagt cgactgtcca gttaaatgca    540

tcagaagtgt tagcttctcc ngagttaaag tcattactgt agagcctggt gtcatcattt    600

aattgcatta gggagttcgt agttgagctc aaagaagtat tttcttcaca aagaatatcc    660

atgtctaagc cagaacttgt agcagatgag gtgtagaagg actaacaggt tatagtttct    720

gctcaccatt caccttgatg tacccacact ctgtaacact gaggctggtg tacatgctgt    780

tctcccgggg ctggattttt gtcttccatt attacaatga tagttaaaga actgaactgt    840

ggtggctgta agttttcttc attcacaatt ttaggagagt ccactgtttg gttttattat    900

tttctcacca aaccgaggac aaaaaagcag aatgaacttt tagcatagag gttgcagggt    960

tttttttgag cgctcgggaa gataaatgtc ctggacaaag aagaaaagtt ttataactac   1020

t                                                                   1021
```

```
<210> SEQ ID NO 47
<211> LENGTH: 1021
<212> TYPE: DNA
<213> ORGANISM: Homo sapiens
<220> FEATURE:
<221> NAME/KEY: misc_feature
<222> LOCATION: (561)..(561)
```

-continued

<223> OTHER INFORMATION: n can be c or t.

<400> SEQUENCE: 47

```
gaagattgtg gaaaatgatg gaagattccg gaaagtggtg gaagattcca gaaaatgatg      60
gaagattcca gaaagtgatg aaagattctg gaaagcaatg aaacattcca gaaagtgatg     120
agacagtgat agagtctggt tccaggcgaa gtgggagagg atgggatttg agaagggaat     180
gatccctcct cacacctcta ggatgggaag cttagtggag tgaggggtgg gtaggaggtt     240
acaccctgtg tcctctgtcg ctctgtgcag gaggaggagg cagagaaagg gaagggtcag     300
gaaagccagc ccatgtccca cccccactgg actcaccacg tgatggcagg tgaagccctt     360
catgaccgag gcctcattga ggaactcaat ccgctctcgg agactggctg actcgttgac     420
cgtcttcacc gccacgcggg tctctgcctc acccttgatg atgtccctgg cattgccctc     480
atacaccatg ccgaaggagc cctgccccag ctctcgaagg agggtgatct tctctcgaga     540
cacctcccac tcgtccggca ngtacacaga gcatggaaac actacttctt acttatctac     600
acagcatcct tggaggatcc cttgggggtc tgcagccacc ttccacccaa gccctcaccc     660
aaaccccctc gaaaacactc atgaaatgag ttctgtgatc caggacccat gccgggcact     720
gggcatatgg ccgagaacag gacaggcatc tgcacccatg gagagggcat ggcagagact     780
caaggaagga gccacaactg gtccaagatc ctggccaata tgtcctgagg caaacctgca     840
tccccatcct tcttgtctga tttcagaccc ttgctatgga atgatgctac ttcccacctg     900
agactactgt ttctgcaaag tgccaagggg atggaagaca ggttgtaata ggttggggaa     960
aaaaaaagcc aggatacttg gagctcttcc catgaaaagg tggagtctat ctcaccaccc    1020
c                                                                    1021
```

<210> SEQ ID NO 48
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 48

```
tgtatttttg tagagatggg gtttcaccat gttggccagg ctggtctcaa actcctggcc      60
tcaagtgatc tgcctgcctc ggcctcccaa agtgcttgga ttacaggtgt gagccactgt     120
acccagcaat ttataaggtt ttaagactca aataactcct tctaaagtga aatgagtctc     180
ctgttgtggt gggaggcaga catcattcaa cttagaggac acagctggaa agcaatgtga     240
gaaactaaga aaagtaacaa gctggtagat tggcatttct gacccatctt cctgcgaagt     300
caggtatcaa ggctttaagt actaatagca cagtacctga tgagagaagc actggaatca     360
aaatttcagc agaggaagga ggtaccaagt gcaactctga aggggcatgc tgaagtgtgc     420
aggggcatgc ccaagagtca agggccttac ctcatcacca tatcgccgat aactcacttc     480
atacagcacg atcagaccat tgggctcctt cggctcctgc cacatcaagt ggacgacgtt     540
gttctcaaag atttcatgcg ncacagggcc aacaatgtca tcagccttgg ctgtaaggag     600
aggaagtgag aggcagggat gtaactcttg gatgagatcc cacttctgcc acctgtccat     660
ggtgcaacct tgggctggtg acgtcatttt cccacaaccc attttcctcg tcagagaacg     720
gacatctaaa actcatccca caagattgtt aggaagatta aatgggttac tttctgcgta     780
taactttttt ttttttttga gacagagtct tgctctgtca cccaggcggg agtgcagtgg     840
```

```
tgtattttct aaagtttaca taatgattgc ctatgactca taattttaaa atatgacctg    900

gcatggtggc tcatgcctgt aatcccagca ctttgggagc tcaaggttgg cggaccactt    960

gagctcaggc attggagacc agcctgggca acatggtgga accatctcta ctgaaaatac   1020

a                                                                   1021
```

<210> SEQ ID NO 49
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 49

```
gactgaggtt cacccgggtg aaggcgctca tgcccccagg tccttgtggg ccccccagca     60

gggacgagtg ggcagccagc tctgctgccc cttgaggccc agtcggggaa gcagaggctg    120

ctgaggatga ggaggcagca gccatggtgg ccctgggcag gctcacctcc tctgcagcaa    180

tgcctgttcg catgtcagca tagcttacag gggcagctgg cgaggtgtcc acgtagctct    240

gacggggaca actcatctgc atggtcatgt agtcaccccg gctgctgggc actgcccggg    300

taggcctgca aatgctagca gccccgggag gtgcagggcc cagtctgccc atctcgaccc    360

cagtgctctc ctgccaggct gccctccgcc cggccccagg tccatcttca tgtactcctc    420

agtgccagtc tcttcctctc tgggagctgg ctggagctgg gatggacacc tgacagaagg    480

tgagctgtgg aaagccaccg ggccagacaa gtagccagac tgatcactcc caaattcaat    540

attgacatat tcccccgggc ncttgggctc tggagggtgc agcaagggct gctgctgctg    600

ctgctgctct cgggcccgag gtaaggtgct ggccttggga tcccccaggg acagcctcgt    660

gggccgggcc aggcggctat tggtctgagc agctgtgtcc acctttcgag gcagatgggg    720

ctgcagaacc tgatggtggg gatgtggaag gctgggctcc agcctagccc cgcagtatcc    780

cccacccagg ctgtcgctgc tggtggaaga ggaagaatca tctgctgttg cagcatagag    840

aaggcgacca gagctagtgg aaaggcggag gtgctgatgc cgggcaccct cctccggctc    900

cccggggcgc tgggtgtgct taaaggatct tggcaatgag tagtaggaga ggactggctt    960

gtgctggggg tcctcagggc cgtagtagca gtcggagggg ctgctggtgt tggagtcccc   1020

c                                                                   1021
```

<210> SEQ ID NO 50
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 50

```
gattggggat ctggtggaag cggatgaact cccgcacccg cagcatctgt gtgtggtagc     60

gggctgtgcc cgagtacagc cgctggatga tggccgacac gttgccgaag atgctagcat    120

acatgagggc tgggggcgtg ggcacgtggg gccgtcagcc tctgcaggga ccccacccac    180

ccacagggac cctgctcagg ccccgcacca ggtcagtgtc tcagtctcag cgtcgacatg    240

cccacgagac gcccttgtac atctgcgctc cagcacaccc cacccttcag tagtccccgc    300
```

-continued

```
cctggtgacc cagcccccaa accatgtcac gatggtggcc cctggagtct ctaagttcca    360

gggcctcact ctggcccggc tagcagcctc agtttcctcc aacttgggtt cctccaccgt    420

gggctctccc cgccgcccgc ccctgggcac actcacagcc aatgagcatg acgcagatgg    480

agaagatctt ctctgagttg gtgttgggag agacgttgcc gaagcccaca ctggtgaggc    540

tgctgaaggt gaagtagagc nccgtcacat acttgtcctt gatggagggg ccgcccaggc    600

cgctgctgtt gtagggtttg cctatctggt cgcccaggtt gtgcagccag ccgatgcgtg    660

agtccatgtg tggctgctcc atgttgccga tggcgtacca gatgcaggct agccagtgcg    720

cgatgagcgc aaaggtgcac atgagcaaga acagcacggc cgcgccgtac tctgagtagc    780

gatccagctt ccgcgccacg cgcaccagcc gcagcagccg cgcagtcttc agcagcccga    840

tcagctgggg gacagggaag gggcacattc cgttgatggg gcaagggggg caagggagga    900

ggggaggtgc tgcggccctc agagcgagca tcagaggtca gatccccaaa gacttcctag    960

accctcctcc taagaggtga agcccacact gggcccagca caggtgtctc attaatctta   1020

g                                                                   1021
```

<210> SEQ ID NO 51
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 51

```
catgctcttg cggaggtcac ccacacgtag catgaagcag aggcggccgt ggcgcagggc     60

gatcaccgca tgcttgctga agatgagggt ctcagccctg cggtgggctt gggcagtctt    120

catgaagatg cagccaagca tgatggcgtt gatcatgagc cccacgatgt tctgcacgat    180

gaggatcagg atggccagtg ggcactcctc agtcaccatg cgcccccaa agccaatagt     240

cacttggacc tcaatggaga aaaggaaggc agacgagaag gagtggatgc tggtgacaca    300

gggctcagca gtgccctcgc tgggggccag gtcaccgtgg gcgaaggcga tgagccacca    360

ggccatggcg aagagcagcc agctgcacag gaaggacatg gtgaagatga gcaatgtgtg    420

tggccacttg aggtccacca gcgtggtgaa cacgtcctgc aggaagcggc cctgctcccg    480

gatgttcttg tgggccacgt tgcagttgcc tttcttggac acaaagcggg ccctccgctg    540

gcgggcacgg tacctgggct nggcagggtc ctctgccagg cgtgtcagca cgtattcctc    600

ggggatgatg cccttgcggg acagcatggc tccggtgacc cccagggagg ggcttccccc    660

atcggaggca cccctcggac gtggcctagg gcctcactgc agagtcctct cggtgggcac    720

cttctcaccc tggggctgca ctcagcctgt gctggcctca cttctgagat aactccccac    780

cagactcttc cttacctcca cctgggtccc acttcacttc ttaataccag cctcaggccg    840

ggcgcggtgg ctcacgcctg taatcccagt acgttgggag gctgaggagg gcagatcact    900

aggtcaggag ttcgagacca gcctgaccaa catggtgaaa ccccatctct actaaaaata    960

caaaagttag ccgggcatgg tggtgcgcac ctgtaatccc agctactcag gaagctgagg   1020

c                                                                   1021
```

<210> SEQ ID NO 52
<211> LENGTH: 1021
<212> TYPE: DNA
<213> ORGANISM: Homo sapiens -continued
<220> FEATURE:
<221> NAME/KEY: misc_feature
<222> LOCATION: (561)..(561)
<223> OTHER INFORMATION: n can be c or t.

<400> SEQUENCE: 52
cacttcttgg agccacagac gcaaagcagc agccctcggg gattgttctt ccccagccac 60
cggcccagag tgtggctggt caatcgtggg gacccaggac tggctggacg cacagctcta 120
gggcccagta cctcccacag cctctgcagc cttgggcggg ggagaggggt gagccagtcc 180
tgaattgggt tgggaggagc agggacaaaa ataacccagt acaggttcct gctgaggcca 240
gaaatagcat agtgacaagt gccttgtaac accctggatg agcagcaggg ggaggctgag 300
ctgaggctgg cccagcctca caccaggccc tggccgggct acataccaca tggtccgtgt 360
gtacacacgc gtgtgggggg cccgagagac catggctcag gacagggaat ctggagagat 420
gctgaacttg ggcttggcct tggccatggg cacgctgcgc ttgcgcaggg gcccgcgggc 480
tgaggcgagg gtcagagctt ccagtaggct gtggtcctca tcaagctggc gggccgtgca 540
gagtggtgtg ggcactttga nggtgttgcc aaacttggag tagtccacag agtaacgtcc 600
gtcctcctca gctacaatgg gcacaaagcg ctggccccac aggatctcat cggccaggta 660
ggaggtgcgg gcctgggtgg tgatgcccgt ggtttccacc acgccttcca ggatgacgat 720
gatctcgagg tcctggtggt ggtgcaggtc gctgggtgcc aggtcgtaga gtgggctgtt 780
ggcatcaatg acatggtaga tgatcagcgg ggccaccagg aagatgctgt tgccacccac 840
gccgttctcc atggggatgt ccacctggtg gaggggcacc acctcgccct cggggctggt 900
ggtcttgcgt accacctgca tgtggatggt ggcgctgatg atcatgctct tgcggaggtc 960
acccacacgt agcatgaagc agaggcggcc gtggcgcagg gcgatcaccg catgcttgct 1020
g 1021

<210> SEQ ID NO 53
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 53
atctggtatt gtacaacaca tgcaggtaag taactgaaat ctccaggagt tggatgtgta 60
gtattttggg aggagaccag gcttgggcca caaatgaggg cactttgcac tttcatcaaa 120
tccatgtcta ccttgtcaat ctgaataact gagagagggc aggtagatat tttacacctt 180
gaagatttgt tttctggtca tgtaaaaatt aaatataaac aaataaagaa caaagcaaga 240
gagacagaaa aagaaagaga atgagagaca aggaaagatt gtgttggggg gagaagagaa 300
gggtttgccc agctagggca ctaaactttg gattcattct ccaggtttgc cacatcacca 360
tttctttctg tttgctcttc gaggttcttt tcttcctctt cagtctccag ttctgcatgt 420
tggttgagtt tgctggatac agaccaactc aggggcagct ctgccctgct ggctaactcg 480
gccagctctt tggcactaag ggatggggtg ctggtctcat aggtctcatg gaagctgttg 540
tagtcaactt cgtagaaccc ntcctccagg gtcaggacag gtgtgaaccg gtaaccccac 600
aggatctcac tggtgatgta ggagcttcga gcttggcatg tcatccctgc agagagaaga 660
atggaggctt tagcatatgt aagtgtgggc tttccatggc caaggagtca cagagagcca 720

-continued

```
ggaggagtac tgcatgcagc tgttgagact gacctgcata cgatgccaca cttagtaggt    780

gtcattcatg ttgtagacac atgctaatgt gccatggaga ttccaggcct cttaagggag    840

tcctggggaa caatgagaga gtcctggccc acatcaagcc acatttgcct gcatggccat    900

gcacatgcaa aggaaatcaa gtgtgcaaat gcacacaagt tttcgcatgt gcatggctat    960

gtctggtcca ctctgctctg ggagaaccct gaagccatga ctctggcctc ctactgctct   1020

t                                                                   1021
```

<210> SEQ ID NO 54
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or g.

<400> SEQUENCE: 54

```
acgggtgccg gtcaagagag gggggcaccc cgtgcctccc taccacacct tctggaagac     60

atagcccccg ctggggcccc agcccacgat ggggtcggag gacggcttcc cgttgatgtt    120

gggctgtgag ttgatggtga ggatgccctg gcggttcacc cgcagcagct cctccttcag    180

caggctggtc tcagccgcca ggggctcatc gttccagggc aggcaagtca cctgggagag    240

acggtgagct ggctggggcg accatcaggt ttggcaccct gagtccctct cacggccccc    300

aacaaagacc cagcctgtct ttgcctccct aagcccttcc aggtggaggt ctcccaactt    360

acccttctcc ctttgccatg tccacagcat ggaggggagg gcacaggatg gggaagtcac    420

agccccgcag cctggcctgc agctggggtc aggccagggg caggggatga accagggtcc    480

ccactccagc atcactcact ttgtgaccat tccggtttgg ttctcccgag aggtaaagaa    540

caaagacttc aaagacactt ncttcactgg tcagctcctc cccccacatc ttcagcagct    600

cctccttggg ggacttgctc ttcaggtaga agaggtagta gtccttcagc tccccaaagg    660

caggggaaga ggaattgccc ctggcagagg ggtgcccaga ggtcagggca cactcctgac    720

agagggcagt gccaccacat gcccaggagg ccattcctgt aaattctgcc cctgactcct    780

cccaggtcaa ccacaagcat gcaaacttct tctgccctcc cgctcccaag aacaaagatg    840

tatttgcaag gaaggtctgc aggccctcac cagcggccgt tagggaactc gtcccactcc    900

tgggtacggt agatgtaact ctttggtctg gaggcccaga agatgggacg tacatcttcc    960

tctcggcgct tggggtgggc gctgagagcc cagggtaggg gacgcctggg tgaggatggg   1020

g                                                                   1021
```

<210> SEQ ID NO 55
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 55

```
gccacctccc tggattcttg ggctccaaat ctctttggag caattctggc ccagggagca     60

attctctttc cccttcccca ccgcagtcgt caccccgagg tgatctctgc tgtcagcgtt    120

gatcccctga agctaggcag accagaagta acagagaaga aacttttctt cccagacaag    180

agtttgggca agaagggaga aaagtgaccc agcaggaaga acttccaatt cggttttgaa    240
```

tgctaaactg gcggggcccc caccttgcac tctcgccgcg cgcttcttgg tccctgagac 300
ttcgaacgaa gttgcgcgaa gttttcaggt ggagcagagg ggcaggtccc gaccggacgg 360
cgcccggagc ccgcaaggtg gtgctagcca ctcctgggtt ctctctgcgg gactgggacg 420
agagcggatt gggggtcgcg tgtggtagca ggaggaggag cgcggggggc agaggaggga 480
ggtgctgcgc gtgggtgctc tgaatcccca agcccgtccg ttgagccttc tgtgcctgca 540
gatgctaggt aacaagcgac nggggctgtc cggactgacc ctcgccctgt ccctgctcgt 600
gtgcctgggt gcgctggccg aggcgtaccc ctccaagccg gacaacccgg gcgaggacgc 660
accagcggag gacatggcca gatactactc ggcgctgcga cactacatca acctcatcac 720
caggcagagg tgggtgggac cgcgggaccg attccgggag cgccagtgcc tgcacaccag 780
gagatcctgg ggatgttagg gaaagggatt gtttcttttc cttcgctcta tcccagggca 840
ggacagtatc aggcacttag tcagctctag gtaaatgttt gtacagggca cactctacac 900
aaaatgggta ccttccattt tgtgcaacta cagtcacaga gtcgtgatcc ccagattcag 960
gttccccagg ctggtaggct ggcaatctcc tctcactcac ctcttatggt ttgttgtggt 1020
t 1021

<210> SEQ ID NO 56
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 56
acccagaatc ctgcagtttc tcctgattaa cagctaagta aattctatag cactgtactg 60
aaaatataaa aaatttagaa tatagggctg atcatccctg atcctaagat tgtcctctga 120
agttgatttt cagggtaaat ctttcatatc cactttttaa attgccgatt gtttcttatg 180
aaacaagtag taaaatgtac aaaagaaaaa gaatctagct taaattatag agttcagaca 240
tattttttag taggaggaag aggaatagaa taacaaaata gagtgtgaaa tttggagtaa 300
attgacagat tttcagaata aaatgtttct tttttctctg tacatgttaa aaatatactt 360
tgtattgata ctttcatgtg ccatcactaa tattacatat atagcatatt aaagagtgac 420
attttaaacc attgttaaat tattcaacag ggactaaata ggaatagttt gccaactcca 480
cagctgagga gaagctcagg aacttcagga ttgctacctg ttgaacagtc ttcaaggtgg 540
gatcgtaata atggcaaaag ncctcaccaa gaatttggca tttcaaggta aaatctgcag 600
agccttttaa gaaacttgaa tcaaatgcat ctactttgtt tctgtcaata atgtttcaaa 660
tagttctgga agcagaaagg aatggttgaa gtattttagg tataggacaa catgtgtagt 720
aataatatgg taaaatagag aaactgatta ttaaagagaa gctaatgtgt cttgtcctaa 780
aactttgata ggctgggtac aaaatgtgct ggatccctga gaacatgaga tagtttaggg 840
aaatcaggat caactcagga ctggatgctg gggaagtttt taaatcgata gaagtggcca 900
ttacagggtt agccaccaat ccaatgaata gtatccaaag gtaggtctgc agaattactg 960
acttctgaaa agaggagcac gtttccaagg ctcatcacaa ttgttaggtt taaggtaacc 1020
a 1021

<210> SEQ ID NO 57

<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 57
ctcctttaac ataagatata tgggtaagaa aattccaatt taatgatatt caaatatata 60
aatatttgtt gcatcctcag gtttctagtt atgtgttaaa aaaatgatat gttgaaatct 120
cttcaatttt agaagaacct tgttataaag aacagagcta aaaatattag aaccacctgc 180
cctttagtgt aacaaaataa actagccttt ttggtttact taattacagt cttaccatca 240
aaaatatatt ctctaactta aaaaaatact tttttggtaa tatttgatga catttctgat 300
gagagcacat aaaaataaaa caatacttaa agatgtggat ataaaatgct caaggaatca 360
tcatttaaaa acagacggtt cccttattgt ttctgttcat gtcaaaaagc agggtttttt 420
ttttacacag tctctgtagc tcctaggaat ttcatttcta cagcagcttt tggcctgtgg 480
gctgagccac tcttcttttg gaattctgca gcaatttcct caaaagactt tcctttggtt 540
tctggaactt taaaaaatgt naacagggta aaggccagga gcactccagc aaagaggaaa 600
aacacataag gtccacagaa gtcctggata gaaagcaaac acagactttg agttagcagt 660
tttttgaccc tctcttctgt tcagtaaatc tgtggaatat taggctgctt accgcaatgt 720
actggaaaca cagagctaca atgaaattgc aggtccaatt gctgaatgca gctattgcta 780
aagcagcagg acgtggtcct tgactgaaaa actcagccac catgaaccag gggatcgggc 840
ctggcccaat ttcaaagaag ctgacaaaga ggaagatggc tatcatgctc acataactca 900
tccaagagaa cttattctga ggaaaaaaac aaaaacaata gtgggactga gatcatttgg 960
ctgctttttc ctttagctaa gtagcctctg agttcacagg cggcatacaa ctttttctaa 1020
t 1021

<210> SEQ ID NO 58
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 58
atggaataca ggggacgttt aagaagatat ggccacacac tggggccctg agaagtgaga 60
gcttcatgaa aaaaatcagg gaccccagag ttccttggaa gccaagactg aaaccagcat 120
tatgagtctc cgggtcagaa tgaaagaaga aggcctgccc cagtggggtc tgtgaattcc 180
cgggggtgat ttcactcccc ggggctgtcc caggcttgtc cctgctaccc ccacccagcc 240
tttcctgagg cctcaagcct gccaccaagc ccccagctcc ttctccccgc agggacccaa 300
acacaggcct caggactcaa cacagctttt ccctccaacc ccgttttctc tccctcaagg 360
actcagcttt ctgaagcccc tcccagttct agttctatct ttttcctgca tcctgtctgg 420
aagttagaag gaaacagacc acagacctgg tccccaaaag aaatggaggc aataggtttt 480
gaggggcatg gggacggggt tcagcctcca gggtcctaca cacaaatcag tcagtggccc 540
agaagacccc cctcggaatc ngagcaggga ggatggggag tgtgaggggt atccttgatg 600
cttgtgtgtc cccaactttc caaatccccg cccccgcgat ggagaagaaa ccgagacaga 660

```
aggtgcaggg cccactaccg cttcctccag atgagctcat gggtttctcc accaaggaag    720

ttttccgctg gttgaatgat tctttccccg ccctcctctc gccccaggga catataaagg    780

cagttgttgg cacacccagc cagcagacgc tccctcagca aggacagcag aggaccagct    840

aagagggaga gaagcaacta cagaccccc ctgaaaacaa ccctcagacg ccacatcccc     900

tgacaagctg ccaggcaggt tctcttcctc tcacatactg acccacggct ccaccctctc    960

tcccctggaa aggacaccat gagcactgaa agcatgatcc gggacgtgga gctggccgag   1020

g                                                                   1021
```

<210> SEQ ID NO 59
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 59

```
gagtcccctc cttactgggg tccctgcccc agcctgaggg gagggaaagc tctgcctaag     60

accgcctgcg tccagagtcc agacctacct ttccacaggc ccctgactcc ttcctccctg    120

gcgatggttc tgtaggcgtc catagtcccg ctgtattttc tgtcgctcct ggatggcccg    180

aggtgtatgc tggcctgaaa tcggaccttc accacatctg tgggctgggc acaggtcacc    240

gccatggctc ctgtggtgca gccggccaaa atccgggtag tgaggctgga gtctgggagg    300

ggcagagaga gtgggccagt gtcccctact aagcagcatt ctgggacatg ctgttctctg    360

cggggctgcc cctgcagctt ccttgatgtc cactcagagc ctcctcataa gcgtccggta    420

ccagcttccc cccgcccctg gctctgcctc tgagtctaga cttccctggt ctcttgaccc    480

acacactttc agccacccct ttggtgttca gggacctggt cactcactgt ccgcgccttt    540

gggggtgtac acctgcttga nggagtcata gaggccgatg cggatggagg cgaagctcat    600

ctggcgctgc aggccggcca ccagcccatt gtaggggctg cagggaccct cagtccgcac    660

catggtcagg atggtgccca gcacgccacg gtactgcacg agccgggccg tctggaccgc    720

ctggttctcc ccctggatct gagggacaat agcagggggt gaggactcag atgggaaggc    780

aagaaggggc tgcgtgcaca ggaaccctgc tggggctggg cctgcctggg ctgggcctga    840

gaacaaccat gctggtcaca gtagaaatca ctggtgtctg cgcagcattt taccattcac    900

aaagcagtat tatacacatg gcttggtgtt tgatcctcag agtaaatcag agggacagat    960

tgtttttccc attttataag tgcttcgtgg cttgcccaag gtcacacagt taattcctta   1020

c                                                                   1021
```

<210> SEQ ID NO 60
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 60

```
aagaaaatca aacttaactc ggacccagag acattttagt atgtgttgga aactttagca     60

tctggtcacc atcctccaaa gaattatttg gattggaact cggtcagagc tgtcactctt    120
```

-continued cagctaggaa tctaagagga tcatgtcttg gatgttacgg agtatagaca accaagttcc 180
ctgccctcaa aagcccgatc acttataaga cagcttatgg agctttgaca gagggcagca 240
gttgatggca ttatcctttg aactcatagc ttagttggac tcctactggc ttgtgggacc 300
aaatctttcc ctaccacagt tggctatagc aaaagttgtg aaaaatgcca ctaggatata 360
ctggtgaggg aaaaggaggt ccatttgtag ttatagtata attgaaaaga aaagctctga 420
agaaaactct agcctactct tttcagccc aaggggaagg cagagcacct gctgacagat 480
gctggcgtag cgagccaggg cgttggcgtt ttcctggata gcgaggctgg atggacactg 540
gtcggcaatc ctcagcacag nacgccactt cccaaagtca acaccatctt tcttgtactg 600
agcacagcgc tctgagaggc catcaagccc tgcaagtcac aaaagagaga aaggcttctt 660
tgtacctttg tacctgatcc atggggcttc taataaaggg aaggagttct ccctttgctt 720
agctttcaat ccactgtgct tgaggattga aaacagccaa gcatatcagc attaatcaca 780
acactgaacc agaagactta gatttaataa atagtgtttt gacatacata ctatctactc 840
catatataga atagaagaaa ccaatagtta atatgatact cattttacaa aggtggaaac 900
tgaagctcct aatggttaag caactttacc aagtttgaat tgctcaagag tgacagagct 960
gggattcaaa ttctgcttag ctaacccaat gttgtgagtt aatgcttgtc tacttgggca 1020
g 1021

<210> SEQ ID NO 61
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 61
gccttagttt tggtaatctg caaaaccaag ggccctgccc tgggtgctgc tctcccagtg 60
caaagtccct aactttggtg tgacccttac cagagtcaag gctgtctggg cctggctcct 120
tgtgacatcc atcgccatct ctccgagggg ctaagaggta gatgctttgg gaggcagaga 180
tgctcctgcc tgctgaggcc tagcacatgc tgtagccttg gagcgtaagg cccgcctgtg 240
gcagcaacgg ctgcttggat ggagagctgc ctgaggctgg cagcccaggg cttctgcact 300
gaaagggctc agcctggcgg ctgctcaaat actctgcccc ctgccatggg gtcagaggca 360
gggcagaaag ggagggtagg ccatgtgggt aacagttgac agggccacgg ggacagagcc 420
atggggcagc cggccacact ctgtgaacat ggggtaggga ttgctgccca gcaggagggg 480
gtgtgcagag ccagcctacc catcttccat tcctcagcct tgtgcgggca gaaagtcacc 540
aggctgcctt ggccacagaa nacttactga aatgcccttg gacagggagg gggtcctaag 600
ggggcctggc ccgcgctggt gcaggtctgg acttgctctt ggaggcaagg ggatccccag 660
tggattttca tctgcagaga ggttcgattt gcatttcata caatccaggg gtctgtatgg 720
aacttgggga aggggtggtg gaggaaggtg gccaactgat caaaaacaaa caaaaaacag 780
gggtatcatt cttaattttg tgactgcaaa gtccaggcct caggcttgct ttgggtgcct 840
ccatgggcat agaccatgac ttccaggctc tggcccaggc ctctccttgg gctcacctgg 900
gagtgacatc cacatgctat gtacttgctg gcacctgcca aagcctgcta aaattagctg 960
gagctggcaa gtgggtcagg gtatggaggg tgccttgtca gaatgccagg tctctcgcca 1020
a 1021

<210> SEQ ID NO 62
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 62

```
ataaaagccc caggccaggc cccggacact ggtgtcctgg gtcaccgtta gctccaggaa     60

taagtaccct agaacccctc gagaggctgg acactggata gccacagtga ggaggggtgg    120

tgggcagagg gccagtggca ggcacagctg ccctagccag gacccccaag gcccatgtgc    180

ctccttccaa ggtgccccaa gcctgctcgc cttccctgcc cccagcctta gttttggtaa    240

tctgcaaaac caagggccct gccctgggtg ctgctctccc agtgcaaagt ccctaacttt    300

ggtgtgaccc ttaccagagt caaggctgtc tgggcctggc tccttgtgac atccatcgcc    360

atctctccga ggggctaaga ggtagatgct ttgggaggca gagatgctcc tgcctgctga    420

ggcctagcac atgctgtagc cttggagcgt aaggcccgcc tgtggcagca acggctgctt    480

ggatggagag ctgcctgagg ctggcagccc agggcttctg cactgaaagg gctcagcctg    540

gcggctgctc aaatactctg ncccctgcca tggggtcaga ggcagggcag aaagggaggg    600

taggccatgt gggtaacagt tgacagggcc acggggacag agccatgggg cagccggcca    660

cactctgtga acatggggta gggattgctg cccagcagga gggggtgtgc agagccagcc    720

tacccatctt ccattcctca gccttgtgcg ggcagaaagt caccaggctg ccttggccac    780

agaacactta ctgaaatgcc cttggacagg gagggggtcc taagggggcc tggcccgcgc    840

tggtgcaggt ctggacttgc tcttggaggc aaggggatcc ccagtggatt ttcatctgca    900

gagaggttcg atttgcattt catacaatcc aggggtctgt atggaacttg ggaaggggt     960

ggtggaggaa ggtggccaac tgatcaaaaa caaacaaaaa acaggggtat cattcttaat   1020

t                                                                   1021
```

<210> SEQ ID NO 63
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 63

```
caggcagggt ctgcagtggt atcactgtgg gcagagcctg gggagggggc caattctgtg     60

cacagggcaa gggcgagagg aggggccagg gatctagggc tccggggagg ggtcagcagg    120

tcggggggag ggatccacgg ggaggggtta ccctgggtga agaagtgagc cttgtacttt    180

ccagtccgca cagcaaaaac cccacggacc tcgtctgggt aggacgggta gaagaagaga    240

gactgccgag ggctctgggg gcagagtcag gggtcacggg gcggggcagg ccccaagcac    300

tgcacatacc tggggctgcc agccctggtg ggaggccctg gacgtgcacc gcttcttgcc    360

cacccaggaa cctgagaggt ggcgccactt ggatgccact cagtgcagga ggcactgagg    420

cacagactct caggcactgc ccacactcac cccagggggaa ggccaggaca ggggccaagg    480

atctgggatc aggggtcacc ggccctacct tgcctgtgcc cagcagcagg gggctgaggt    540
```

-continued

```
caaagccatc caaggtgaca ntgggcagtg gggccccagc cagggctgcc agggtaggca    600

gcaggtccag ggagctggcc agctcgtggg tcacgcctgg gggcaggagg ctggtcagtc    660

actcagttcg ccatcaaggt tggggtggtg gggccagggt tccaaggaga gggcctgcgg    720

actgaccggg agcgatatga cctggccaga aggccaaggc aggctctcgg acaccgccct    780

cgtaggtcgt tccctttcca caccgcaaga gaccggagca gccgcctcgg gacatacgca    840

tggtctcagg tctgggacac aggaggcgct catgagccat ggagccacag cctctgagcc    900

accgagggtg accagtggcc ccacacctct aagtcacaaa gcttgcccgg aggtgcccag    960

catgagcccg gcacctccca ggcctaccaa gaccagctct ctgtgcactg tgtctcctga   1020

c                                                                   1021
```

<210> SEQ ID NO 64
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 64

```
gtccagcaat gagtcacaga cctatgcacc acctgcaaag gagccagaga aaacaaacgc     60

ccagcgcttt tagcctgaaa atgagaatct ggtttgctgg ggaagataaa gggtgtcgga    120

aaatggctgt tgggtaaatc attgatgtct gccactagga atgaaaggca aatcaggaac    180

tggcacacat gctttcaggg agatggctgc aagggagagg gcaaagactg ggaagttgct    240

tatgtggtgc cagactattt ggaagatcat ggattgcggt gtttgtgttg tgtggtcatc    300

attttgttct ttgtttacag aacagagaaa gtggattgaa caaggacgca tttccccagt    360

acatccacaa catgctgtcc acatctcgtt ctcggtttat cagaaatacc aacgagagcg    420

gtgaagaagt caccaccttt tttgattatg attacggtgc tccctgtcat aaatttgacg    480

tgaagcaaat tggggcccaa ctcctgcctc cgctctactc gctggtgttc atctttggtt    540

ttgtgggcaa catgctggtc ntcctcatct taataaactg caaaaagctg aagtgcttga    600

ctgacattta cctgctcaac ctggccatct ctgatctgct tttccttatt actctcccat    660

tgtgggctca ctctgctgca aatgagtggg tctttgggaa tgcaatgtgc aaattattca    720

cagggctgta tcacatcggt tattttggcg gaatcttctt catcatcctc ctgacaatcg    780

atagatacct ggctattgtc catgctgtgt ttgctttaaa agccaggacg gtcacctttg    840

gggtggtgac aagtgtgatc acctggttgg tggctgtgtt tgcttctgtc ccaggaatca    900

tctttactaa atgccagaaa gaagattctg tttatgtctg tggcccttat tttccacgag    960

gatggaataa tttccacaca ataatgagga acattttggg gctggtcctg ccgctgctca   1020

t                                                                   1021
```

<210> SEQ ID NO 65
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 65

```
cggggtccca gaaggtggtt taaggactgg tgtggacaca cacagttctg ttgtctgccc     60
```

-continued

```
agcggagggg cctcacgggg ggccgttggg agccagattg tcagcttttg gatttaccag    120

ctgtgggtgg cagtgggcgt gtaactcagc atcttgctgc ctcagtttct ctcatctgta    180

aagtggggat aataacattt acctcataaa gttcctgcga ggattcgatg acttgataca    240

tcagttgctt agcacagggc tcagcactca gtacatgttc cctgtcagga aggcagggag    300

gcctcactgg cagcatcagg acatgggaca tcaggacata caccgtggct ctcagggaaa    360

ggaaaaagac cctctcccag gtgtacaagc tcgattctaa acctcatggg accctgcatt    420

gttcgctccc tcattcattc actagtccat gcgtgtactc agtagtggca taagcagact    480

gctcgggtcg gacctgaatt agcctcaccc actctcctcc tacactgtcc ctccccaggg    540

cacattcgcc tcccaggtga ngctggaggg ggacaagttg aaagtggagc gggagatcga    600

tgggggcctg gagaccctgc gcctgaagct gccagctgtg gtgacagctg acctgaggct    660

caacgagccc cgctacgcca cgctgcccaa catcatggtg agcccctggc cagcgggcac    720

tgagggcctg gggtggcaa gcacattgcc agcccagtgc cccccggtgg tcgcacgtgg    780

ggagggaagg atccaaagga ggtctcgtgc acaggaagcc gtcacctgga gtttggctga    840

tagagagagt ttgctgggtc atctctgcca atactgagag ttcatggggg ctgctttggc    900

tagcagggag ggcttgctgg tatctaggcc agtagaaagc cttcgctggg cagcagaagg    960

tgttcccttt gtcattccag ccagtggaac aagttcactg ggtcatctag gttcattagg   1020

g                                                                   1021
```

<210> SEQ ID NO 66
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 66

```
tactaaaaat atataaatta gctgggtgtg gtggcatgtg cctgtaatcc caggtacttg     60

ggaggccaag gcaggagtat tgcttgaacc caggaggcag aggttgcagt gagccgagat    120

cgtgccactg cactccagcc tgggcgacag agcgagactc catctcaaaa taaataaata    180

aatataataa aaataaataa acaaataagc ttccttttgc tcattgaccc cagaatccca    240

gagaaaccac acgtcccagc aaccctcgtg gcagaataag ccacagaaaa cagcccaccc    300

taagtgcctc gcctccagca actgaagttg cacgagtcag cacgtgccct tctgtggacc    360

tcagaataga tcccttcata caagggctgc aggagaaagc aggactccca gcaatctctg    420

gggtctgagc tggcctggca agctgcctct ggggctgcca ggaactgcta tctctctgca    480

cagaggtcca atccatacct gcgttgcaaa gatggctctc ttcatcatag tgaagtcttc    540

cttatccagc atcttgttca ngtcgggaag gctcccactg caaggcaagc agggggcatg    600

catgtgagaa cggagtaatg agaggggtta gtcagggcct aggagggcac agggctgagg    660

gtggggcact cacaccagta aggattcata aagcttcctc ccgaactttt ccttcaccgt    720

gttggccgtg tccctggagg aagcagagca acagggtcac atacacacca gctgccattt    780

actgttaggc ttctttagtt agtttgtttg tttattttga gacggagttt ggctcttgtt    840

gcccaggctg gaatgcaatg gcgtgatctc ggctcactgc aacctctgcc tcccaggttc    900

aagcaattct cctgcctcag cctcccgagt agctgggatt acaggcatga gccaccgcgc    960
```

-continued ccggctaatt ttctattttt agtagagacg gggtttctcc atgttggtca ggctggtctc 1020
a 1021

<210> SEQ ID NO 67
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 67
ccctccccac agtactgtgc agccctggaa tccctgatca acgtgtcagg ctgcagtgcc 60
atcgagaaga cccagaggat gctgagcgga ttctgcccgc acaaggtctc agctggggta 120
aggcatcccc caccctctca cacccaccct gcacccccctc ctgccaaccc tgggctcgct 180
gaagggaagc tggctgaata tccatggtgt gtgtccaccc aggggtgggg ccattgtggc 240
agcagggacg tggccttcgg gatttacagg atctgggctc aagggctcct aactcctacc 300
tgggcctcaa tttccacatc tgtacagtag aggtactaac agtacccacc tcatggggac 360
ttccgtgagg actgaatgag acagtccctg gaaagcccct ggtttgtgcg agtcgtcccg 420
gcctctggcg ttctactcac gtgctgacct ctttgtcctg cagcagtttt ccagcttgca 480
tgtccgagac accaaaatcg aggtggccca gtttgtaaag gacctgctct tacatttaaa 540
gaaacttttt cgcgagggac ngttcaactg aaacttcgaa agcatcatta tttgcagaga 600
caggacctga ctattgaagt tgcagattca tttttctttc tgatgtcaaa aatgtcttgg 660
gtaggcggga aggagggtta gggaggggta aaattcctta gcttagacct cagcctgtgc 720
tgcccgtctt cagcctagcc gacctcagcc ttccccttgc ccagggctca gcctggtggg 780
cctcctctgt ccagggccct gagctcggtg gacccaggga tgacatgtcc ctacacccct 840
cccctgccct agagcacact gtagcattac agtgggtgcc ccccttgcca gacatgtggt 900
gggacaggga cccacttcac acacaggcaa ctgaggcaga cagcagctca ggcacacttc 960
ttcttggtct tatttattat tgtgtgttat ttaaatgagt gtgtttgtca ccgttgggga 1020
t 1021

<210> SEQ ID NO 68
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 68
gtacatacac acccatgtga tacatataca catacccata gtatacaggt aacataaaat 60
tatacacaca caacacaaac acatattatg cacatacgca cataacacac acacacacac 120
ccacatacag gcattgtgaa ctagacacat caccttacaa tctgtggttt actggaagga 180
catggaacaa aacccccccca gccacagcgt ggaagtgccc tctccaggca caagattctg 240
cctccatggg gcgtggtagc agcattgccc acccacccag ggctgagtga gcaggcctgc 300
cccacactgc gcccatgcac agccactcca ggctgcctcc cacactgcct gcaaggaccc 360
cagtggggac tgcaaacggg aagtctgcat ccagggcccc agggagggca ggtggggctc 420
tggagtatag cactttctag aagggaagca ccctcttggt tctgaacgta agtgggtctg 480

-continued

```
ctcacaggga ggggcgtgca gccaccccag gaccccagct gtccaaggag ccagggaaaa    540

cgcacccacg gggcacctac ngctgggagc gcaaagaagg agatggcaaa gacagagaag    600

caggaggcga tggtcttccc gacccacgtc tggggcacct tgtccccata gccgatggtg    660

gtgactgtga cctgcaggga gagggacagt ggtcagccac ggatgggact ggagcctcgg    720

gagggccaac tgcctaaccc aaacccacca ctctgatgag cggagaggcc ggcaagagac    780

cctgaccacc aggacgaccc cgtgtgactc ggcgaaagca ccaggaacag agccgcggga    840

tggcacatgt ctcccaggct ctcggcgtca cacacaaggt atgtcccacc agcacatgta    900

aggagcccag cacccacgaa gggccaggcc tgctggctgg gaacgtgggc ctgggagctc    960

gccccacacc ggctgcctca tctgcctgcc tgtccccagg aggctgggcc cctgggccac   1020

c                                                                   1021
```

```
<210> SEQ ID NO 69
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 69

agcctgggtg acaagagcaa aactccacat caaaaaaaat aataataaat aaattaatta     60

attaattaaa taaaacaaga gcttttcttt ttgcttaata agagagagtg gtggtggtgc    120

ttttttattc ctgaagatgg gaagtcctct tttgcccact aacctcagaa gaaagggatg    180

aggtgtaccg tacaggggca gtcaccttct cctctgttta gcttccattt tggcctcatg    240

tctaccccaa agttgtagct tagatggggg gaaaattcag aattttgcat agaccatagg    300

tagcaccccc tagaaaaaga atgtttctcc ccagatgtct cccactagta ccctaaccat    360

ctgcttgtct gtctagtgag gacccttgga gggctgctaa aatgatcaag ggttacatgc    420

agcaacacaa catcccccag agggaggtgg tcgatgtcac cggcctgaac cagtcgcacc    480

tctcccagca tctcaacaag ggcacccccta tgaagaccca gaagcgtgcc gctctgtaca    540

cctggtacgt cagaaagcaa ngagagatcc tccgacgtaa gtgttttcat cctgcctctg    600

cctcaacctg aagtgacctt tgccctctca ccccattggc tgcctcagtt tccctttcat    660

cgacaaggcc ttgtgagcac ttggcagata tgaggaaggt ggcaagtaga tttggccttg    720

gtggttgctg tacaatggat tggcttctgt catgttcttc agtcacagcc cccttgctac    780

ccagccagtt gctctgagga gcctgtcagt gtatgcagca taccttaaac tttttggccc    840

ctccttccac ctccttctct ttgaaaccaa gtaggtgaca gagtgaaatg tcttccctga    900

gagaaaaccc agcatctccc cttgatacgt gaccatcagt caatttccaa agaagacatt    960

tcgttgcagt caataatatt gattactatt actgttaatt tcctcctctc tggaaaaagt   1020

a                                                                   1021
```

```
<210> SEQ ID NO 70
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.
```

<400> SEQUENCE: 70

```
ctgacttagc tgggtgatat tgggcgggtt tcctctctct ggccgtttcc cacacctgca     60

ggctgggagt ggtgcctgct gcctcctgac agtgctgcag tgagcatcaa gtgagacaag    120

cccatgaaaa ccctctgcag ccccagaatg ccacggaaat gcagcattat tgtattgagc    180

tttgctttga gtttattata tcatcaaaca tattattaaa tgactgagtt gggtgggggg    240

ttggtcaaga gggcctatac aagaccccag gattctgtgg gacctgagat tctagaattc    300

tgccaccctg attccaaagc aagagaagag tctctgacat gatcagggcc agaaaactgg    360

ctggagaggc agacagtaca gtgcgttcat ataaatgact ctaattcagg tggtggcgtg    420

agactgtggg catgtgtgat gtgcaacaga gcaggctggt gtccataagc caacgatggc    480

acagtactca ccttctgggg ggcattgatg actccagtgt tgtagccaaa ctgcagggag    540

ccaagcactg ctcctcccac ngccagcatg aggcgacccg tcagcttctg cggagaaaca    600

aaccacactg ttataggcgt gtctgggagc aggttactac agggcagggc ctggactggc    660

aagtttctgt gttcagatat cttgcctgac tcttggcacc acaccagtct ttctcccagg    720

aaacttggcc aattcctgac cttaggtgcc caaaccagcc tagctgactt caagatactg    780

ggctggccgg gccatttcct ggggagagag gggaagtatg atcttctctc tctgtagcca    840

ggtctcagag agggagaggc tttggattct tgggggtctc atttccctgg tggagccatg    900

cctagggtct ggtggttcta gactctctga ctgggaggcc caggaaccag ccctcctatg    960

cgagggggcc caaattactt ggtaggaata gcacagatat agataggaga agcaccctgg   1020

a                                                                   1021
```

<210> SEQ ID NO 71
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or a.

<400> SEQUENCE: 71

```
cataattttt ctcaaactcg gcggacggtt cgtgtttgaa agagaagttg ccattgatgc     60

tgagcggcgg gctgaggggt ccatcaaagg aagggctggt gcaatcagtc agagggcttt    120

caaagaaggg ctccagcgct gcgctgtagg cgtgcggcgg aggcttaacg tggaagacat    180

gggagctgtc catggtaccg taaggcggac tgggcagccc aggcgactgg taggagtagg    240

ggtgtacagg gaaggaagcg ctggccgtcg gcaggtgggg gggcatgtcc tggttctgct    300

caggcagaaa agtccgagga ttgagttgca ggcagcccgc aaccaggttg gtggtgggtt    360

gggataagcc cttgcaaagc gtctgaacga aggagaccag gtctgggctt ttgcctgagc    420

gcaggatctc cgacagagcc cagatgtagt tcttggccaa gcgcagagtc tcgattttgg    480

acagcttctg cgtcttagaa tagcaaggca ccaccttgcg caggttgtct agcgccgcgt    540

tcagtccgtg catgcggttc ngctcccggg cgttagcctt catgcgtctc aatttaaaac    600

gctccaggcg agccttagtc atcttcttct ttttggggcc gcgtctcttg ggcttttgat    660

cgtcatcctc ctcttcctct tcttcctcct cttccaggtc ctcatcttcg tcctcctcct    720

ctcccccgtt cctcagtgag tcctcctctg cgttcatggt ttcgaggtcg tcctccttct    780

tgtctgcctc gtgctcctcg tcctgagaac tgagacactc gtctgtccag cttggaggac    840

cttggggctg aggctcgccc atcagcccac tctcgctgta cgatttggtc atgtttcgat    900
```

ttcctacatt caacaaggga gaggcaaaca gaaagaaaag cagaaaaacg ctatattcaa 960
aagccagata cgccttcagc ttccactccc taaacctgta caaatgcttg cgaaaagtac 1020
c 1021

<210> SEQ ID NO 72
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 72
ggatttatct agtataacaa accatcggtc tgataataca tatctgatag tgttgctgtg 60
aatataattg aggtaataca tgtaaaagag ctggcacaca aaaagaagct caaaaaattg 120
ttctttcctt accaggtgtt gccctggttc ctgccatatc gctccccaaa ggtgctgtag 180
gagccatcat agtgtttgta gttcaactgt ctctggtaac ctggaaagga agattaacga 240
aacagcacaa tggattaatg tgcatgctga gggtggagaa attactaaaa gtaccttggc 300
ttctcttgtg acatttctta aattttgttg tcatagatta ggagtttctg agccttaaat 360
attttattgg aggttggaga gtggatagtt tccttgaaat taactatcat agcagctatc 420
atagtgagct aagctaatgt atcataatat tcataagtaa ctgaaaccta ctgggaaatc 480
cagttgaaat aacattcaag ttttccctta ctcaagtaat cactcaccag tgttgagata 540
gccaatggcc ttggacttga nctctggagt aagctgctgt gtttcattta gataatccag 600
tacatagatg ttaggagcaa agaggaccat attctgctct ccacagccat agggcatctg 660
gagaagattt tgtgtgtttt gcatggcaga gcctaatatg tctcctagag aatgggagag 720
atgggaagtc ataaagcttg gagattatca tctatcaaag tcattaagca gaaataatta 780
gttgagctta gaaattgaga atttttagga aggatgattc ttccagggat agaagtatga 840
ttgaaagcaa taaacaagcc caaagaagaa gagaagaaag aagttaaaat tatagtatta 900
tttttagtaa atatttatgg gaaataaaaa tagtataata gaagctgtta atgcccggat 960
ccactagggg ctggagactc acccaaaact gagacagaag ctcgggcaga ttcttctacc 1020
a 1021

<210> SEQ ID NO 73
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 73
gaaaacagtc tgggttccct gtggaacatc atttctcaaa actgtatttt ggggcttgct 60
ttctcatttt tcctttccat ttcagatatc cttactgctg tctttgggct ctttaaacac 120
tgcctttttt ccttttttcga tcacacccaa aaacttttct caaaaattac atgtaaattt 180
aaaaatttac aaattaaatt taaaattgaa attttaaaaa tcccgactct ccctaatttc 240
aggaagcatg catttattat acataacaag acgtgaaagc cgcaagagtt tcagcctaaa 300
cactgaagac cccgcgaagt gaatccagct gctgctctac aagcagcaac aacaactggg 360

-continued

```
aagccttctc agctacactt cggggcactg gtccaacccc acgcaaaatc cctcgtttcc    420

cttagcgtgg taagacggag cctgacctga gctccaactg tcctatcttt ttcaaatgtt    480

tcaaacttac tgcctttgtt cagcagaacc acgggcacgg tgatgatggt gacaagcgca    540

gcagcaccca gcagtcccag nagaaccttc cacggtgtct gcaagccgag cagatcaagt    600

ccaattagag ggaagcgtgt ggccccagtt tccgtaggag ggtcggggct gctccagagg    660

cagcaggatt tgcaggtggg agtgcgttag aagagggaga ccgcgggctg ggggtggggg    720

tggcgtctgg agtgcgccag ttggagttct ctaaggcggg tgcccttgaa cttgtgcctt    780

cagagcacat tagcgttggt ttctctaccc ctgcccgggt tcgggcgtgc gttctgtgag    840

tggctctccg ggacattcaa agctcgacgc cagggtccta gcagaagcca gggtccgaaa    900

gctaagcgag agctctggga cgtcccttca cctgtcagag ggtggccttg gggcttccgc    960

ctaaggggag tccctggtcc ggtttcgcca gcttttgggc catttgggga gtttggcgaa   1020

g                                                                   1021
```

```
<210> SEQ ID NO 74
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 74

agaggcacaa gaaattacct tgaaaaaatg gaattcagtg actgccatct aggaaagaca     60

gtgatactgt ccagcagcat gcagttccga gagctcaact cttaggccac cctccctcca    120

ctctactcta ggaacaagga gcattaggtc tgttttctct ccatacacct caatcgctcg    180

tcctctcgtc ttattaaaac acagacacag aaccaaactt tttgacagtt aaagacaaac    240

aattacatct aattaaaatg ctaagagatc ctgagctgtt agagatgagg agagtagata    300

gtatgacctg atcttccccc ctcttttttt tcctttaaca gtattctgtt tcagcataaa    360

gcacactttc tgaagaggtt cctggtggag actggaaatc tgactgtgtc ctgtggcaac    420

acacagtccc ttgcataact ttggcttcag tccctggatc tgtcctttgc agctacgtca    480

ggttccatgg aaggaggaaa gagctggagg gcagtatcac tcagccaaag ctcccatggg    540

gtcccatgct ggcaggataa ngggttcctg ctctaacaca gctagcacct cttcagggac    600

atgcttcctg tccaccacca cttcgtagac atactcagag aaccactcat ctgtcatgca    660

caggtaacct ggagaaaaga acagaagact tatgagtcca gagggcaagg gacaaagagc    720

agaaaccctt tttgtaggat aaacctttta caaaactaat attcatacat atttttcagc    780

tttcccatct gtaatttcat ttaatctaaa tcttattagc aattctgtga agcagatagg    840

acaggcatgg ctctattttt agaaaaatta gaaaaccggg tcttgagtaa ctaggtgatg    900

tgcccaggtc acatggtgag gttcagagct gggccttgga cctaaggcta acaccagatc    960

ctgtactgat gctctcttcc tccgctgcct tggtgatggt gagtgatgac ctgtatacta   1020

g                                                                   1021
```

```
<210> SEQ ID NO 75
<211> LENGTH: 1021
<212> TYPE: DNA
<213> ORGANISM: Homo sapiens
<220> FEATURE:
<221> NAME/KEY: misc_feature
```

-continued

<222> LOCATION: (561)..(561)
<223> OTHER INFORMATION: n can be c or t.

<400> SEQUENCE: 75
catacgcaca taacacacac acacacaccc acatacaggc attgtgaact agacacatca 60
ccttacaatc tgtggtttac tggaaggaca tggaacaaaa cccccccagc cacagcgtgg 120
aagtgccctc tccaggcaca agattctgcc tccatggggc gtggtagcag cattgcccac 180
ccacccaggg ctgagtgagc aggcctgccc cacactgcgc ccatgcacag ccactccagg 240
ctgcctccca cactgcctgc aaggacccca gtggggactg caaacgggaa gtctgcatcc 300
agggccccag ggagggcagg tggggctctg gagtatagca ctttctagaa gggaagcacc 360
ctcttggttc tgaacgtaag tggtctgct cacagggagg ggcgtgcagc caccccagga 420
ccccagctgt ccaaggagcc agggaaaacg cacccacggg gcacctaccg ctgggagcgc 480
aaagaaggag atggcaaaga cagagaagca ggaggcgatg gtcttcccga cccacgtctg 540
gggcaccttg tccccatagc ngatggtggt gactgtgacc tgcagggaga gggacagtgg 600
tcagccacgg atgggactgg agcctcggga gggccaactg cctaacccaa acccaccact 660
ctgatgagcg gagaggccgg caagagaccc tgaccaccag gacgaccccg tgtgactcgg 720
cgaaagcacc aggaacagag ccgcgggatg gcacatgtct cccaggctct cggcgtcaca 780
cacaaggtat gtcccaccag cacatgtaag gagcccagca cccacgaagg gccaggcctg 840
ctggctggga acgtgggcct gggagctcgc cccacaccgg ctgcctcatc tgcctgcctg 900
tccccaggag gctgggcccc tggccaccg acgttgctgt gcgccggccc ccaggagacc 960
gggagctccc actgaggctg gtcgtcaaca aagagcaggg gctgggatga cgcgctgctt 1020
c 1021

<210> SEQ ID NO 76
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or t.

<400> SEQUENCE: 76
tcagtttgtc cagtaagatg ggtggtctg tttccaccag gtccagctat ccactggtgg 60
ttctatgggg agcagtgggg gtggttaaag gagctctgtg tggccgggag cggtggctga 120
tgcctgtaat cccagctctt tgggatgcca aggcaggagg atcgcttgag cccaggagtt 180
tgagatcagg ctgggcaata tagtgaaacc ttgtctctac gacaaataaa attagctagg 240
catactggtg gtgcacctgt ggtaccagct atagggggc gctgagacag gaggattgct 300
tgagctcagg aggttgaggc tgcagtgagc cctgattgtg tcactgcatt ctagcctggg 360
tgacagagtg agaccctgtt taaaaaaaaa aatagaactc tgtgtggctg aggacagctc 420
tccaggggcc cccacactgc cttccaaatt cccctaggcg gctacattgc actagaaact 480
atatccacat caacctgttc acgtctttca tgctgcgagc tgcggccatt ctcagccgag 540
accgtctgct acctcgacct ngcccctacc ttggggacca ggcccttgcg ctgtggaacc 600
aggtgggcat cctccttccg ttcctccaaa tgggaatctt gcttctctgg tgggaccagg 660
aagttctcag tccatttcct atctcctaca ctctccacag tttatctgag ttgggagggt 720
ccctctccaa atgtgtcttg ggtggggga tcaagacaca tttggagagg gaacctccca 780

```
actcggcctc tgccatcatt taactctccc agcctatcac tcccatactg gaattttccg    840

ttcctctccc tcattatttc acccatcatt gaactttttc accaatgaga gaatccacct    900

gctggcggtg aggcatggca ggatacgaga aagtaagtgg gggtggggat gtggcaggtg    960

ccagtttgtt actaggagac agggtgggag agactagagt ctgggagcag acgtggtaag   1020

a                                                                   1021
```

<210> SEQ ID NO 77
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 77

```
tgtttccacc aggtccagct atccactggt ggttctatgg ggagcagtgg gggtggttaa     60

aggagctctg tgtggccggg agcggtggct gatgcctgta atcccagctc tttgggatgc    120

caaggcagga ggatcgcttg agcccaggag tttgagatca ggctgggcaa tatagtgaaa    180

ccttgtctct acgacaaata aaattagcta ggcatactgg tggtgcacct gtggtaccag    240

ctataggggg gcgctgagac aggaggattg cttgagctca ggaggttgag gctgcagtga    300

gccctgattg tgtcactgca ttctagcctg ggtgacagag tgagaccctg tttaaaaaaa    360

aaaatagaac tctgtgtggc tgaggacagc tctccagggg cccccacact gccttccaaa    420

ttcccctagg cggctacatt gcactagaaa ctatatccac atcaacctgt tcacgtcttt    480

catgctgcga gctgcggcca ttctcagccg agaccgtctg ctacctcgac ctggccccta    540

ccttggggac caggcccttg ngctgtggaa ccaggtgggc atcctccttc cgttcctcca    600

aatgggaatc ttgcttctct ggtgggacca ggaagttctc agtccatttc ctatctccta    660

cactctccac agtttatctg agttgggagg gtccctctcc aaatgtgtct tggggtgggg    720

gatcaagaca catttggaga gggaacctcc caactcggcc tctgccatca tttaactctc    780

ccagcctatc actcccatac tggaattttc cgttcctctc cctcattatt tcacccatca    840

ttgaactttt tcaccaatga gagaatccac ctgctggcgg tgaggcatgg caggatacga    900

gaaagtaagt gggggtgggg atgtggcagg tgccagtttg ttactaggag acagggtggg    960

agagactaga gtctgggagc agacgtggta agaactaact tgttgaaagt tggaccatac   1020

c                                                                   1021
```

<210> SEQ ID NO 78
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can  be g or t.

<400> SEQUENCE: 78

```
ccttttattt ttcttccatg gaattttcca gttaacttga gaaagtggaa tcgaattccg     60

atgttgaatt ttccttctgg ccccattcat gtggcaggtg gtgattcagg tactactggg    120

ggctgctcag acaaacctcc tcatcagaca tcaagaggct gttgcaccag gagggccggt    180

accgtgtcta gaggtggtcg gcatggggtt ggagttgtat tacataaacc ctactccaaa    240

caaatgcatg gggatgtggc tggagttccc cgttgtctaa ccagtgccaa agggcaggac    300
```

ggtacctcac cccacgttct taactatggg ttggcaacat gttcctggat gtgtttgctg 360
gcacagtgac aggtgctagc aaccagggtg ttgacacagt ccaactccat cctcaccagg 420
tcactggctg gaacccctgg gggccaccat tgcgggaatc agcctttgaa acgatggcca 480
acagcagcta ataataaacc agtaatttgg gatagacgag tagcaagagg gcattggttg 540
gtgggtcacc ctccttctca naacacatta taaaaacctt ccgtttccac aggattgtct 600
cccgggctgg cagcagggcc ccagcggcac catgtctgcc ctcggagtca ccgtggccct 660
gctggtgtgg gcggccttcc tcctgctggt gtccatgtgg aggcaggtgc acagcagctg 720
gaatctgccc ccaggcccttt tcccgcttcc catcatcggg aacctcttcc agttggaatt 780
gaagaatatt cccaagtcct tcacccgggt aagagaaata gtgttgattt tagggagaat 840
aactcagcaa ttggatctgg tatgtgtgta ttcaactcat ttgcagacaa attgtggttg 900
ttcaatacca gcctgttgtg aattacctga attgatagca tcctggagcg acactcaaaa 960
tgtgtcgcct gtggtgcagc tggagcccgg agcctgcgtg ccaggccccg gaggcccccg 1020
c 1021

<210> SEQ ID NO 79
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 79
aagcagtacc agcagccaga aaccgcataa caaatacatt gggcaattgg gagttgggga 60
tgttgactga acctttgaac ttgactgatc cgaatgccaa attctaattt aaaaagggaa 120
aactggatgt ttgagacata gtgtgatttg gtgaagcaaa caatggactc ccaggttaaa 180
aactctaatt agtctcttct gctgagttcc tgagttaacc gtttgtgtag tggtctccta 240
gtatatttta taacttacaa agctagagga tcaaagcaat tatctagaaa tacacacaaa 300
actcatgttt ggtataaatg tctgaacaat taaccaaact gtcgcaacag ctttttttcat 360 tgatttgatc taacactgat atgcctcata gggtcatgag ttgaaaaaac aactctaaag 420
ctattccaca agaagaaaga taatattttt ctaaacaagt gttaggaaaa tgaaaatatg 480
aaagtttctg tttatgctta tttatgaaat ttgcctacct tccaagtgtg tccccaagcc 540
acccaccaaa gaatgatgca ntcattccac caactgcaaa gctggataca gacagggacc 600
agagcatggt gattagttga gcagctgcca cagtctcttc ctcagcccaa ggggttggtt 660
ttgggttcat tgagtatgag attgtgggca gttcatctgt actgttgata acatagttgt 720
tgatagcttt tcggtcatcc agtggaacac ccaaaacatg tctatagtga gatattatta 780
cctaggagat aaagaaaaat agctttacta tttcaaacat tctatgtatt tttgtttttg 840
tctttaaagt gtttgttacg tgtttaaata gtaccatctc aattatgtgt tttatataca 900
tataaacatg gatagatttg tttacagttg gccatatcct ataaaagaaa ggttataaat 960
tacattgcca acaagaacca ggcaggaaca aataaatgaa gggaacatgt aatactttga 1020
t 1021

<210> SEQ ID NO 80
<211> LENGTH: 1021
<212> TYPE: DNA

-continued

<213> ORGANISM: Homo sapiens
<220> FEATURE:
<221> NAME/KEY: misc_feature
<222> LOCATION: (561)..(561)
<223> OTHER INFORMATION: n can be g or t.

<400> SEQUENCE: 80

```
atgccctttg gcctaaaccc tggacttgac taagaaatgc agcctccaat gacattgcgg     60
gaaaagggaa tctgggaact tctatgacac aattcagtct tgctgagcat ttggggctaa    120
tatttaactc tgaacatata ttgacatagg caattcttcc ataacagatt catacaaaat    180
ttaaaaatgc atatagaagc cttaattttt atttaaattc ttttatttaa ttgtgtttta    240
gaggcagaga atagtgtgtc tttttttgcc tcttttataa tttttatttt ttttttttcat   300
ttttgccact gtctttcttt gcgctttcta gggcattaca tttttctttt ccgttttctc    360
catgtttctt agcgagattc tctaaaaggt tacttctatt tccatcacat catcatctag    420
ctccagcagg cctacttttc ttcatttcct ctattgtatt ttctgctttt cattcttgct    480
gtctgctcct ctctcatcat ccttgcctct gtctgtttaa tcctcctgtc cttcattttc    540
ctttttttgcc tctgcattca ncatttctac ttccaatctc cctcctctgc tctttcttct   600
ttcctctgat ctgcagactt gcttctgtcc cctccttctg ttcccctcct ggatgtgtct    660
ttggccaacc tttccttctc tgagacttcg tgttcttgtt ggtagatggg ggctgatact    720
gtaaacatca caaaaaataat tgcattgaga acaagtggtt cccatggtgt ccctttgaat   780
gagctcagaa tgcccaggct ccatatgatg caggagacag cactcatgct ggagaggggt    840
ctagacctca gtcacaagac ccaccattcc agaactttgg gactcatctc ttgacaccta    900
ccccctcccc agttagaaac caagaggcgc tgggtcacct gggaagagaa agaatgaatc    960
tgcctttgcc ccagcaagca cgctttcctg ccacattcac ctaaaagtct tttctgagat   1020
c                                                                   1021
```

<210> SEQ ID NO 81
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 81

```
ccatagcgaa tgttttcagc tatcgtggtg gcaaacaata caggttcctg actcaccaca     60
ccaatgattt cccgtagaaa ccttacattt atggtcctaa tatcctgtcc atcaacactg    120
acctggaata aaaagtaagt gtgactttca tacatttgta attgaaaggg caacatcaga    180
aagatgtgca atgtgactgc tgatcaccgc agggtctagc tcgcatgggt catctcacca    240
tcccctctgt ggggtcatag agcctctgca tcagctggac tgttgtgctc ttcccacagc    300
cactgtttcc aaccagggcc accgtctgcc cactctgcac cttcaggttc agacccttca    360
agatctacca ggacgagtga gaaaaaaact tcaaggcaat tcacagacac aggatatagg    420
aactgactgt tcactaggtt taaatataca tgcacttttt tataatctct acaagaaaac    480
atcagaaact cttcattcaa tagattaatt gttgattaat catttatcac tgtaccttaa    540
cttcttttcg agatgggtaa ntgaagtgaa catttctgaa ttccaaattt cccttaatat    600
tatctggttt gtgcccactc ttcgaatagc tgtcaatact tggcttctaa acagaatcaa    660
attttaagag attactaggt tacaataact acttttagtg atattttgtg gagagctgga    720
```

-continued

```
taaagtgaca aagaaattga cttaactgga caatctttta gataggtgga tagatggcca    780

actcagactt acattatcaa ttatcttgaa gatttcataa gctgctcctc ttgcatttgc    840

aaatgcttca atgcttggag atgcctgtcc aacactaaaa gccccaatta atacagaaaa    900

gaatacctga ggaatgtgaa gaaaaaccat caggctactg agatagtgac agcaattttt    960

tttcatactt cttctgtctt tttctaacat aggtaattaa aatttaaaat ggcgaggcaa   1020

c                                                                   1021
```

<210> SEQ ID NO 82
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 82

```
ggacaagagc agggctttaa atgccccata aatatgtgtg gcaaggatga aagcacatag     60

gactcaaaga ggaacaaagg agcagaaagg caggaagagt tggtgctgcc ttcaaaggag    120

agtaggaacg agggcaggtg gtatcaggtg gacctctatg tggtcctggg ttacaaaggt    180

gccaggaaaa agcaagaaat ggaagagtct aaaaagcaat ggaagattgt ggaaaatgat    240

ggaagattcc ggaaagtggt ggaagattcc agaaaatgat ggaagattcc agaaagtgat    300

gaaagattct ggaaagcaat gaaacattcc agaaagtgat gagacagtga tagagtctgg    360

ttccaggcga agtgggagag gatgggattt gagaagggaa tgatccctcc tcacacctct    420

aggatgggaa gcttagtgga gtgaggggtg ggtaggaggt tacaccctgt gtcctctgtc    480

gctctgtgca ggaggaggag gcagagaaag ggaagggtca ggaaagccag cccatgtccc    540

acccccactg gactcaccac ntgatggcag gtgaagccct tcatgaccga ggcctcattg    600

aggaactcaa tccgctctcg gagactggct gactcgttga ccgtcttcac cgccacgcgg    660

gtctctgcct cacccttgat gatgtccctg gcattgccct catacaccat gccgaaggag    720

ccctgcccca gctctcgaag gagggtgatc ttctctcgag acacctccca ctcgtccggc    780

acgtacacag agcatggaaa cactacttct tacttatcta cacagcatcc ttggaggatc    840

ccttgggggt ctgcagccac cttccaccca agccctcacc caaacccccct cgaaaacact    900

catgaaatga gttctgtgat ccaggaccca tgccgggcac tggcatatg gccgagaaca    960

ggacaggcat ctgcacccat ggagagggca tggcagagac tcaaggaagg agccacaact   1020

g                                                                   1021
```

<210> SEQ ID NO 83
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 83

```
tcccacctcc tgggcagcct ggtagaggag acattccttt aattcttcct gcctaattta     60

gaggctgggt gggggtctga aggttcactc ccttcacatc atcccactag tctactttgg    120

gaagaattac aggttgttgg agctggaagc cccattctag gcatggtctg aagacctgaa    180
```

-continued

```
caatcccagg gggtggtgaa gggggcaggg aggagatggg caccacttac catttgaggc    240
cgcccagaga agtccttgcc cttcttaata agcacctcct tggccagctg gtggtggccg    300
acaatcactg tagtcttggt gcccatacga accgaataga tggggccata tttttctgc     360
agcttgaaga agttgttatg catatggccg tgtctgggga ggaatggcag gctgcccacc    420
aggggcaggg acaggaggct cttggggtac ttggcaccag ggcaccttct cttgggccaa    480
aacaaataag ctagggtaag cagcaagaga gccacgagct cccacatggt ggctgggtgc    540
cggcaggcaa gatagacagc ngtggagtag aagagctgtg gcaactctag ggcacaagga    600
ggccttttaa agggctaccc tgatcttcac cttgactttg tgttatctct tgccttgtgg    660
aaagattctc ctggagccca gccaggcctg agctcatatc cagaagggag agaggcggtg    720
ggagtgaagg cctcctcaag ggctggctca actccagggc aaacctccgg aggaggagct    780
aggtaaggga ggtcagttga tcaccctctg aggagctccc catgcttgaa tgactccaga    840
gtgcgaatgg tatctgggct caggagtcaa ggcttggaac tttccatgtt gcaaaatcaa    900
aatcactgga cagatgacag attcaggagg gtcacaagta gcagggactg ttaaaggtct    960
tttatgcttc tttttttttt tttcagagtc ttgctccatc accaggctgg tgtgcagtgg   1020
t                                                                   1021
```

```
<210> SEQ ID NO 84
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or a.

<400> SEQUENCE: 84

caatagctag gctaattctc cccagcagct ttcatggagg acagtagtca ctgcccccat     60
tttccatgaa aagtaacatg aatcctggct gtataagggg cacttactgt gctgggtgct    120
aggctaagtg ctgtacatgc accttctcag tccattagag aagtctaggc tcagagagag    180
gagtggagtg aggattcctt gacccctcag accactgtgg tcctcccatc ccacctcctg    240
ggcagcctgg tagaggagac attcctttaa ttcttcctgc ctaatttaga ggctgggtgg    300
gggtctgaag gttcactccc ttcacatcat cccactagtc tactttggga agaattacag    360
gttgttggag ctggaagccc cattctaggc atggtctgaa gacctgaaca atcccagggg    420
gtggtgaagg gggcagggag gagatgggca ccacttacca tttgaggccg cccagagaag    480
tccttgccct tcttaataag cacctccttg gccagctggt ggtggccgac aatcactgta    540
gtcttggtgc ccatacgaac ngaatagatg gggccatatt ttttctgcag cttgaagaag    600
ttgttatgca tatggccgtg tctggggagg aatggcaggc tgcccaccag gggcagggac    660
aggaggctct tggggtactt ggcaccaggg caccttctct tgggccaaaa caaataagct    720
agggtaagca gcaagagagc cacgagctcc cacatggtgg ctgggtgccg gcaggcaaga    780
tagacagcgg tggagtagaa gagctgtggc aactctaggg cacaaggagg ccttttaaag    840
ggctaccctg atcttcacct tgactttgtg ttatctcttg ccttgtggaa agattctcct    900
ggagcccagc caggcctgag ctcatatcca gaagggagag aggcggtggg agtgaaggcc    960
tcctcaaggg ctggctcaac tccagggcaa acctccggag gaggagctag gtaagggagg   1020
t                                                                   1021
```

-continued

<210> SEQ ID NO 85
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or c.

<400> SEQUENCE: 85
gggtttcctg tttccttttc tgatcattct tacaagttat actcttattt ggaaggccct 60
aaagaaggct tatgaaattc agaagaacaa accaagaaat gatgatattt ttaagataat 120
tatggcaatt gtgcttttct ttttcttttc ctggattccc caccaaatat tcacttttct 180
ggatgtattg attcaactag gcatcatacg tgactgtaga attgcagata ttgtggacac 240
ggccatgcct atcaccattt gtatagctta ttttaacaat tgcctgaatc ctcttttta 300 tggctttctg ggaaaaaat ttaaaagata ttttctccag cttctaaaat atattcccc 360 aaaagccaaa tcccactcaa acctttcaac aaaaatgagc acgctttcct accgcccctc 420
agataatgta agctcatcca ccaagaagcc tgcaccatgt tttgaggttg agtgacatgt 480
tcgaaacctg tccataaagt aattttgtga aagaaggagc aagagaacat tcctctgcag 540
cacttcacta ccaaatgagc nttagctact tttcagaatt gaaggagaaa atgcattatg 600
tggactgaac cgacttttct aaagctctga acaaaagctt ttctttcctt ttgcaacaag 660
acaaagcaaa gccacatttt gcattagaca gatgacggct gctcgaagaa caatgtcaga 720
aactcgatga atgtgttgat ttgagaaatt ttactgacag aaatgcaatc tccctagcct 780
gcttttgtcc tgttattttt tatttccaca taaaggtatt tagaatatat taaatcgtta 840
gaggagcaac aggagatgag agttccagat tgttctgtcc agtttccaaa gggcagtaaa 900
gttttcgtgc cggttttcag ctattagcaa ctgtgctaca cttgcacctg gtactgcaca 960
ttttgtacaa agatatgcta agcagtagtc gtcaagttgc agatcttttt gtgaaattca 1020
a 1021

<210> SEQ ID NO 86
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 86
gggagagagg acctgtgaca ggataaaggg gctgccttat ttaaacctgg aaggaagaac 60
gacagtataa gcttccagga tattaatatc aggctaacat ggacagttaa gagcctttgc 120
caggagatag tatgactgta gttcaatggt gactgagcac ctgggatgtg ctagacacaa 180
gagtgacttc taagggtcac aggagaagct gacgtcaaaa acttcacaca aggggaccct 240
gagaggtcac agaagttcaa gattctgaaa gtagttctgg attccaagga gcaggctggc 300
ttcaccactt ctgacaggct ctgggaagta ggagaaagtt tgcctcaggt tggagagagc 360
agtaggggag agggtggtat ccccaaaggg tcagatttct actcttctgg cacaaagaag 420
aagcagagag gtaaagaata ggtcagtatg agcaagggca actgaccctt tatgacgtag 480
caaaggagtg gcagcaagtt ctgaatgtaa caaattctcc tttccttttt gaaaatgtag 540
aacacattaa caaatgcact ngatcaaact gtggtcaatc agaaatcgct gcacaaaatg 600

-continued

```
tcttcctatt aaataaaaat catacagtgc tttgcatttg aatagtgttc tatactttcc    660

cataattctc tcattagcca ccactgggaa ataccctgtt ataattatac agataaatgt    720

gcaaatgaca gaagaatcaa tttctaaaag aagaaataca aacttttata atgggagaga    780

ggatatattt attatcacta ataaaaaagc atatacttca cctaataaat taatactttg    840

tcactaccaa agttataatt actataacat ttatatataa tatacattta cattaatatt    900

ataaatagta ataaattatg aatgttataa ttacaaatta tgaattttaa aatgtaataa    960

ccataatatc aatactatat tagtgatggt gttatacatt gacacaattt ttttggaaaa   1020

c                                                                   1021
```

<210> SEQ ID NO 87
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 87

```
ttttctgtag actctccctc cgtttgagct tatctgacat ttgctcgccg tgagatccag     60

gccttgcatt tgtactggac cctgttctta cacaccctga tccagcccac ttgtgtagtc    120

tgggagtctg ggacaacctc cgtccgccct tctagccggg tcactgcagg caagccttgg    180

tgctcttgcc tgcgacgtgg aaatgatgcc tgcctgcagc gctgtatagt gcagagcggg    240

cgaggggcat agggaagtca ctggcacgtg gtatgtgttg gcagggctgc ttctcacccc    300

aaaccaaggg agggacaggc agggaggctg agagcagcgg cttgccctgg agctgtcagg    360

tgggaggcag agggcgggag aggctgtggg ctgcccaggt ctgatccctg acccacttgc    420

cacccgtgcc ctcagttctt ccccaatgga gaggccatct gcacgggctc ggatgacgct    480

tcctgccgct tgtttgacct gcgggcagac caggagctga tctgcttctc ccacgagagc    540

atcatctgcg gcatcacgtc ngtggccttc tccctcagtg gccgcctact attcgctggc    600

tacgacgact tcaactgcaa tgtctgggac tccatgaagt ctgagcgtgt gggtaagggc    660

cagccctggc tgctgcttcc tcagctggaa ggaccctccc cagccctccc tccccattct    720

gtaccccccca tcagctccca tttcggactc tcttactgct gtcccttgtc actgggtgac    780

tccacccctg gaatccagta ccccttggtt cccaactagg actgttttcc ctcagtgttg    840

ctctaagcag cctctctcca ctgcccaatg ccatgactgc tccctgccct aggagatctg    900

tggaccatga ctgtccagtc agttctgggt tcctggcatt tcaggggcac ccactgagag    960

gcaagacagc ctcagggaaa catggaatca aggcagaatc aaggagatct ggagtggccc   1020

g                                                                   1021
```

<210> SEQ ID NO 88
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 88

```
tgcctcaggt aagaaagacc tgggcttccc tggctaaacg catgagtccc taggaggcca     60

ggaaagcccc caaaccccag cttcgggccc tcctccctgg cagtgcttcc tgggccccgg    120
```

agcctaccca ctgaggactc agtgcaggag ttagggtctg gagagtataa atgatcagag 180
tggctaaaaa tttccaccac ctcccagttc tccaggcatt tgagttgtga actcacctgc 240
tttttctccc atcttggacc cccctgggaa atgtccccct tgcccaagga ctgggctaaa 300
ggcctgggct catgggattt gggactctgc agaggagcag ttcaggggct ggaggctcaa 360
acctccaagc aaggacccct gggctctcat gggccctgtc cccccttccca gcaactaggc 420 taaaggctga aggtcatggg gactcaactc agaagggggg ctcgttagga gctgaggggg 480
gcccctctag gctctcctgg gagcggggac ggggcagggc tccttactgc agaagggtct 540
ccaccacggc tttctggtgg nccgcctcct cagggctgag gttctccagc tctttgagga 600
tgggtggcgt gaagtcttcc ccatcgtcgt ccgtctcgtc ctcggagccc cgagtctccc 660
ccagcccatt gggcagctca gccagctccc ctcgaccgcc gccgcaggac tccccccttgt 720 ccagggggcc ttctccagcc aggaggtagg gccccggctc acccagtgcc tggatcagtg 780
cctctttgct cagccctgac tcgagcaggg ccgccaggag ctccgtctgc agctggctca 840
gtttagaaac catggctcgg ctgccacagg gccacgcggc ccgggtccac cacgctagcc 900
gcctccccca ccgcgtgggt tgcgtttgcc tgccggccgg cagacacaaa ccaaactcct 960
tgcacccact gcccccccaa aaccccacta gccaagccct gtgggcaccc ccaaccccca 1020
a 1021

<210> SEQ ID NO 89
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 89
cctcagcctc ccaagtagct gggactacag gcacgtgcct ccacgcctgg ctaatttttg 60
tacttttagt agagacgggg tttcaccgtg ttggccaggc tggtcttgaa ctcctgacct 120
caagtgatct gcccacctcg gccttccaaa gtgctgggat tacaggcatg agccaccacg 180
cctggcccca gattaccttt ctaaaatctg aatagatttt agaaattcat atggccctaa 240
gagtttcaga gaaacacagg catgcacaca aatgcatgca caaccgatac acacccagac 300
acgcactagg gatctgctca cacaagcagt cgtgcacaca cacagatacg tgcattcaca 360
tgggaacaca ctggcctgca gacaccctca atcacggaaa cacacttgtc ccagagacac 420
atgcagactg caatgcctgc caggcacccc tttcccctgc atccattgac agccaacctc 480
tatcatcatc tcctgctgtg tggggcacag ggcgctcacc gtgggggctc tgcagctgag 540
ccatggtggc catgaagggg ntctgggtca catggctctg cacaggtggc atgagcggct 600
gctggtagga ggggtgcagc ggctgggaga actggacggg ctgcagggtg gtcaggctgc 660
tgcccatgct gttgatgacc ggcacactct gtgcctgcgt ggaggccagg cctggagtgg 720
aaggggaggg aatcagctgg gccccccagt tatatcccac ccctgcccaa gacctcccaa 780
gggcaccacc tctccttccc agagcccgtg gtttggagga gggggcaggg tggtcaggaa 840
acagccctcc actgggacct gccactaatt taagtggctc tggcaagtca ttccccctct 900
ctgagccttt agctctttgt ctaggctagt gggagaggca ggcggtgact tgttcaaaag 960
ttgtcaaact gcggttccct ggagccctgg gttccacagc agtgcaaagg ccatggggtc 1020

-continued a 1021

<210> SEQ ID NO 90
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 90
gtgtagatgc agtagctttt gcctgtggga tgggagggat gggagatgtg tccagaccct 60
cctaggaggc cacatgagtg tgactgttct cggcccaagt ctttctcgtt cctcagagaa 120
tttgcggggc ccctgggcac acaagctgag atccacccag ccctggtccc ttggcaagaa 180
ctgagggaca ggacctggtt ctggggaaaa tgcaggggaa tgtttctccc ttccacagcc 240
cccttgcgag ttaggaggcc ggctcccacc ccagaaggtg gccaggtttt catgccttcc 300
tagagaaagc tggggctcgt ggcctccacc acaggaagac gcagaccctc agaaacaagt 360
ctgtgaagtc acaaccagcc ccagtttaca gatgtgaaac tgaagctcca aaaagtcagg 420
aggtcactga gtggggaggt gatggagtgg gaacagcccc cagatctggc tgaggccgaa 480
gccctggaga gatccccgca aggctccctt agatgcctga cattctgttc ttcctgaagc 540
ctcactccct tctctcctgg ngcagacacg tccccatcag aaggcaccaa cctcaacgcg 600
cccaacagcc tgggtgtcag cgccctgtgt gccatctgcg gggaccgggc cacgggcaaa 660
cactacggtg cctcgagctg tgacggctgc aagggcttct tccggaggag cgtgcggaag 720
aaccacatgt actcctgcag gtgaggagcc tcaatttctt cagctgggaa atgggcacac 780
ttgggctcat ggccccaagg tctgtcttct ccctgagtgg gtaggtccca gagacagctg 840
cccttcaggg ccttcaaggc tcttctggtt ttgtaaaaga ctttgtgaat ccaagaagag 900
catctattct aggaaccaca tttactgatc atcaagctac tggctgccgt ttattgagct 960
cttatcatat gccaggcaca atactaagtc tttgtgtgta tttacccatc cccttgagcc 1020
c 1021

<210> SEQ ID NO 91
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 91
atacaccaaa tttgtttact ttgaatagct ttctttggac agaggaattt tgagtactta 60
atattttttg catatttttc atactttcca tcatgaacat gtatggcttt tacatttagg 120
aagaaataat gctatttttt aaaggaggaa aaaagagaaa agagttggtg cgaataattg 180
aagtaatcta ttatgcagtg tgtgagtaat gaattgatag ataggatcat ctgtagattt 240
caaggagcta taatttcccc tgtaacatgt ttttcaacat ttctctcccc ttttattata 300
aaaaacacaa actctgatct acactccaac aaagtctgct tttatcacaa ggatacttta 360
aacatttgat cattgtgcag aatatttatt ctaaattact gagaccttat tcactaatca 420
tagttttcac aggctttatt ccaaccatat tgatatgtta gttcgagact acggatttaa 480
tacctggatt tctcctctgt gtcttgaagg gaacgttgcc agctgccttg taccagcatt 540

-continued

```
acaaataatc cagccacaaa ntaaatgctt ttcatttctg ctgtctgtca gaacacagaa    600

tgggggtagg gtgagggggg caggcaagga tttttaaaca tgtcaggcta aattaattag    660

atttgactag ataaatatca taagtagaag gaaaaagcta gtgttatcac ttttattctg    720

attatatttt cagcttaatt ttaaatagtg ggttatatta tttccccaga ttttttggag    780

gcaaaaaagg acacaaaaga tgtgttccac cattaagctt tttcattaat gtagggacac    840

ttctgtttaa taattagaag gctcatttcc agactggaaa ttaaaatgtc cacaatcaac    900

atttaaaata cccactgtag atgatatgct acatatggtt agcctgaatg gcaccttatc    960

catcatgcca ccccctcac tatcagtctg gctttcaatt aatagtcctt cacttccaag    1020

c                                                                    1021
```

<210> SEQ ID NO 92
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 92

```
taggaattgt gcatcaggaa agtgaagagg attgctagac atttagtcct gttataagag     60

cactaaagat ttggcagtca ccaggtatgg agtctcagga ggagcttacc gatggatggg    120

gcatagccat tatatttgcc cgagtccagg gcatctttca ttgcctgggt aacttcaggg    180

tctgtaggca ggtttccaaa cacagtaggg tccccttttt atgggaggaa aacacaaaag    240

gagccaagag gttattctcc catgttcagt actcagactc acccccaact gccatcttct    300

ccaaccagcc tgtgaacatg agagtagagg aggacaatga cagcccctca gtagtgtccc    360

caactcacca atggacaggg aaatcatggt tttgtttgga tttggtttca ccttcatgtt    420

gtccacaatg gctcggatgg ggttgaaagt tttcttggcc atgtctgagg gcctcacaga    480

ccacctggcc tttctgcctt tcatttttcc cggcacagag cttctcccac caacgttgac    540

atgcacgtcc agaattgagg ngaggttgcc tttgctgctc atctgaatca tgtatgggtc    600

catcactagc gaagcctgcg aggggaaaga agttccctgt gatgttgata acatagcgct    660

gggggacaga ggagctacat ttggacctaa acattgggtg acttcactaa aagtgtcttt    720

ccaaactctc tctttatttt tttttctact ttctgttgta aagtagcttt actatgaatg    780

ggggagtttt aagagttttt actgagatgg aaaataaagc aagaacccat tctacttaag    840

taggatttgc tacacgcatc tgcaattcct gtcaaagctt aaccatgctc tatgtgaaac    900

caagaaggaa taagatgaaa attgttcatc agtcaaagca taggttctcc ttcctttcca    960

tgcgagccta tccaagaaaa tctacctaat gcttcttgtc atctgcagag gaccaggaag   1020

a                                                                    1021
```

<210> SEQ ID NO 93
<211> LENGTH: 1021
<212> TYPE: DNA
<213> ORGANISM: Homo sapiens
<220> FEATURE:
<221> NAME/KEY: misc_feature
<222> LOCATION: (540)..(540)
<223> OTHER INFORMATION: n can be c or t.

<400> SEQUENCE: 93

-continued

```
ccaactagaa tacagcttcc tgagaggcag gatcttgact gacttgttca ttcctaattt     60

ctcagcatct agaagaaggt atggcacata gtaggtgctt gttagatact tgctaataaa    120

tggaaataaa catatcccta gttcctattc cagctttttc cctgctgttt tgtcctccat    180

tcttccagca gacaacagga ctagttccct gaccccctgc aggaagctaa caatacccta    240

gcctacttct aagcaaaacg tcgcagcttc aaagactttc catggagggc gatgggctga    300

ggacaatctt gttcttcacg taaaacacag gcccacaatc tcaaatttat aatttaaaaa    360

tatatatact tacaatgtct ctaaaggcac ttatttttct taaaaatcat gtatttgtaa    420

gctgaactat cattttaaca caaaagctat cattcttgct caatggagtc aggctgctct    480

tggagtttct gtcctgggag gaaaaagggc agggtgtagg tacctgatgg ttttccacan    540

gtcgaagcca tccagaggct ttgtgccatt ggtgtgtccc ctggccagct tcacgagtgt    600

tggcagccag tcagagatgt ggatgagctc ccggttcttc acgcccttct gcttcagcaa    660

ggggcttgcc acaaagccca cccctcggac gcctccttcc cacaggctcc attttcttcc    720

tcgaaggggc cagttattac cccctgccaa agtctgccct ccgttatctg aaacacagta    780

aggtcttggc atgaggatga tgttaactct taaatacatt taagaacaga gactgtatgt    840

acattgttac taaatggtgc ttaaataata aaaaaaaaga aaattccttg ccttttccca    900

ccctaaattc ccttttccca ttgacatagc ctttcattat tcagacataa gtaaggccca    960

gtgtgataca tatctacctt taaatcctcc atggagagag ccactggaaa acaaggcagt   1020

c                                                                   1021
```

```
<210> SEQ ID NO 94
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 94

ctgtggggag cgtggctttg ctactcaatg gcaactggat ttcaagagtt tcaggaaggg     60

tgggggagca agatatcaaa ggctcaagct cactcccctt cgtccagaca gacttttcat    120

tttttgtttg atgaagatta ggaagaaaag agtgaggatt aggcctaatt tactgcctct    180

gtcaaaagcc agcgcagagt agaagggaag ggagtaagtg gattatgaaa agaaaacaaa    240

cggagggaaa gggggccgag gatgaactgc attcagtgat atttatttat ctgattgcaa    300

aaggaaaaga agggatctgt tctaatggtt caccttctta tgaaccctgg agctcccaaa    360

accctggcga agtccttctg acactgctgt gaggtagatc ggagccattc catggctaaa    420

gtgagagagg ccactgcttg agagcagtaa taagggaacc agagataaaa ccccaaatct    480

tggtcttttc taccctgctg ctctcagcct gggccacaga gcctggagaa cactaaggtc    540

tcatcagggt ttgggtggca naaggaatgg aaccagggga gctctctttg ccctaagcac    600

tcactgactg cacaggcaag ccgggtgatg ggtgccccta ccaaagccag cctgctgctc    660

cacggcacct ggacactacc actgagggag gagtgaagtt caaggctggg gtttagaaaa    720

catctctcag acagagagca agaggatggt gaaaacccac ttggtaagga tccctccttg    780

ggtcacatgg cccagtcgtc aggttctgga gggtagagtg tcacagccgg ggaatcccat    840

gggactcatt ctgaacagag gccagaggtt ttccacaggt tctgatcaac agagttgttg    900

cttcttgtcc ttcaggccta agaaactccc caagaagccc tgggaaaaaa agtggagata    960
```

-continued atagaccctg gggtgaaagg agcaacaggt gcactgaggg gaatgacaga gatcagagac 1020
c 1021

<210> SEQ ID NO 95
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 95
ctttagaaac ggctctaggt tgagaccgcc ggcatggatc tccacctcta ctgcagacac 60
acactggaag gcttcggacc agtcgggctg aggttcggag aagttgcaga cgcagcggaa 120
atcttcatcg tccagctcac aaggttctgg cgtggtcgca gagacgtgca ccagcggcag 180
cagcagcagc aacaagcagg acgcgcgctc ctggggagag agcagaggtc taggaggccc 240
catccaaccc ctgtggctcc cgagtggcac gcgttcgacc ccaagaccct acactcacca 300
tggtcgataa gtcttccgaa cctctgagct ccggacaggc tctggaagtg ctttacgttc 360
tttcctacac agcggcaccc gccggcttcc aggcttcaca cttgtgaact cttcggctgc 420
ctctgacagt ttatgtaatc ctgggatgtc attcagttcc ctcctctgtg aaccctgatc 480
acctccccac ctctcttcct ccgagccagc ccccttcctt tcctggaaat attgcaatga 540
aggatgtttc agggaggggg nccgtaacag gaaggattct gcagggcatc tagggttctg 600
tgtctcctgg cagtgtcctg atgactcagg cgccccaggc ggtgaatgcc ctgttgactc 660
gggagcctaa gccttctctg gtgggtgtgg gaaaaggatg atcctcagtg ccttaggcca 720
gtaccatact ctgcactatc caaccccccca atccccctac cttatatccc agagaatcta 780
cttgattcat ttctttgact tcttccttgt cttggtttat gttgatctcc tgccaccaaa 840
tccaagtccc tgaatatcct cagatattta actgcatgtt ttgtggaaga gattgtgaac 900
ctcatctgtt ggcaccaagg ggggtagaat taggttcaag aaaaggaagt tggtctaaag 960
aaaaattccc ccttcctttt tttttccttg ctcctttgat taagtaataa ctttctttct 1020
t 1021

<210> SEQ ID NO 96
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 96
gcagggctca gcctgcctcc ctgctgctga ggcccctacc aaattggaac ccgagtagca 60
ccagggaagc agggcctgca ggggatgcca ttctcacccc tgcctgcaaa acgctgcagt 120
gcccgagtct gctgtgggct ggtgggggaa gggcatcgct aggttggtgg ctgcccccac 180
cccagcacac tccccccatt ctctttagat tgtctcacag ggggacccac ttggttctca 240
ttctgaactt tcagtgaatg gattctgctc cctgccttgc gtgtgtaccc ttgggtggcc 300
tttgcccgta tcttagtctc agtttcctga gtttgggcag gaaggagagg aggggttctg 360
actgatgagt tacctcttct ccctctcccc acctcgcagg gggctcctga gagtgtgatc 420

```
gagcgctgta gctcagtccg cgtggggagc cgcacagcac ccctgacccc cacctccagg    480

gagcagatcc tggcaaagat ccgggattgg ggctcaggct cagacacgct gcgctgcctg    540

gcactggcca cccgggacgc ncccccaagg aaggaggaca tggagctgga cgactgcagc    600

aagtttgtgc agtacgaggt gggtgcagga gccgattctc cctgcagtac gaggtgggtg    660

caggagccaa gtctccctgc agcagctgag caggtggtag gtcagggatg ggctcaggcc    720

ccgcttgaat ctgccccctc cctacagacg gacctgacct tcgtgggctg cgtaggcatg    780

ctggacccgc cgcgacctga ggtggctgcc tgcatcacac gctgctacca ggcgggcatc    840

cgcgtggtca tgatcacggg ggataacaaa ggcactgccg tggccatctg ccgcaggctt    900

ggcatctttg gggacacgga agacgtggcg ggcaaggcct acacgggccg cgagtttgat    960

gacctcagcc ccgagcagca gcgccaggcc tgccgcaccg cccgctgctt cgcccgcgtg   1020

g                                                                   1021
```

<210> SEQ ID NO 97
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or g.

<400> SEQUENCE: 97

```
agcagagaag acaaataata gatactgcga agataggatg attgaagaat gcagtgatat     60

aaatttgggg gaagaggagg gaggcagagc aaagaaattc aaggccttgg ccagacgtaa    120

tgtctcacac cttgtaatcc cagcagtttg ggaggctgag gcaggctgat agcttgtgtc    180

caggagttcg agaccagcct gggcaatcca gcaaaaccct gtgtctacaa aaaaatacaa    240

aaattagcca ggcatggtgg catgcgcctg tggtcccagc tacttgggag gctgaggtgg    300

gagaatcgcc gggacgtcga gattgcagtg agctgagatc gtgccactgc actcctgcct    360

gggtgacaga gcaagaacgt ctcaaagaaa aaacaacaac aacaacaaca acaacaacaa    420

caaaaacaca aggcctgtgg ttgggggaag gttgtaactc taaaaaagac ccatgtggct    480

acagcgaggg acactgggtg taggtagaga taagaagagt gatactcagt tctcacatca    540

cggcggactg aatacaggcc nggggagtga gagaccatcc acccctgtga tctggggcaa    600

gtcaccagcc ctttcagaga agcttccgtc ttctctgcaa aatgggacaa taccttgctt    660

cacaagcttg caaggatcaa aagaactggt agtgggccgg gcgcggtggt tcacgcccgt    720

aatcccagca ctttgggagg tcgaggcagg tggatcactt acttgaggtc acgggttcga    780

gaccagcctg ggcaaaatgg tgaaaccccg tgtctgctaa aaatacaaac attagcctgg    840

cgtggtggca ggtgccagtg atcccagcta ctcgggaggc agaggcagga ggatcgcttg    900

aacccaaggg gtggaggttg cagtgagctg agatcgcgcg ctgcactcca gtctgggcaa    960

cagatcaaga ctgtctcaga aaaaacaaac aaaaaagaac tggtagagga agcgctttgc   1020

a                                                                   1021
```

<210> SEQ ID NO 98
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 98

```
aaaaaaaaag tggctggaac tgccatcact atcctagaga tggaaggtta ggccaatgct     60

acagcaaggt agctgtggtc agacactaag aatgctcctt ctatctggct gccagccaat    120

ggatctccat tctggaccag cccacgagaa gcaaacctca aaggaaacta atctgaggtc    180

ttagctcaat ctgtggggaa cggcattaaa gcctctccct ctgagtgacc tctgctagct    240

tctctacctc ctgcttcctc atctgcttct gctacacacc cgcacactga aaaccctgta    300

tattgtatga gtcctccctg aaccccacat cagtcctgag gtgcaattct gcctagtcat    360

ctttcctctt ccctcaacag cagcttactt tatgttcttc aagcttcact gaggcctctt    420

ttgcaaatcc tcccagatct cctcagctgg gatggggccc ctctaggctt cctgagcccc    480

atgcttcctc ccttcatggc atctgtcata atgcagtggg attgccatgt aactcccttg    540

actgtctccc caacacagag ntgtacactt cacatctggg cagggtcacc atgactgtgt    600

ccaccattgc cagcttggaa cctggcatac tggcatcagt aaatgtttgc tgaaagaata    660

aatgataaca agctgtcctg cccaccgtga cctttgggag aatgggcata tgcttttgat    720

tacctgcagg gccatcaagg tgttggccag ggcttgacca taggtgtcat ggcagtggac    780

agccagggca gccagaggca cttcctgcat gacagcagat agcatgtctt tcatgatccc    840

tggggtgccc acaccaatgg tgtcccccag ggagatctcg tagcagccca ttgagtagaa    900

cttcttggtg acctaaggaa gcaagcaggc acttggagga tacagaatcc accagccagg    960

ggatccatgc actcagaaga gggggccttt gcctgggcag aacacttctg ggtatgacgc   1020

a                                                                   1021
```

<210> SEQ ID NO 99
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 99

```
attggccttg ttccccaggg tggagctgtc acaaaataga gtgggaactg tctggctttc     60

agcccaagag aatctgcatg gcaagttgca ttaacaacca ggcatttccg gcagttccca    120

acatttctgg gaattttctc atccaaacga ctgaaagccc actccattct cttgcttctt    180

actcatgctt tctttgtata atggtaatta tgttttaaaa aatcctgggc tatgttgttt    240

catggaacaa tttagaactt attggtcaaa ctctgaagca aaggtatata aaaggtagtt    300

agagatgttt agggaatatt caaagcacat ttttgggtca ctcataattg atctttatat    360

tcatatatgt atatatatat atataacata atgtacccat cttaacatat caaagctaaa    420

ccagtattaa aaacaactga ctatggtcta ttgatacaat atatgatgcc caagtacact    480

cttcattgct actgcatatc taaaatcatt tatttattta tccatccatc aagagtgtat    540

tgagagcctg acaacatacc ngcatcaagc cctggaggtc tttttaaggc tgagccaata    600

tagctatgga taacattcta aaactgatag catattttca tgttttatag tctttccaca    660

gactagttca aaatgaacac tgcctgagag gggctttaag atgactgact agaggtactg    720

gacacctgtt tccccagcaa agaagagcca aaatagcaag tagataatca tactttgaat    780

agacatctaa gagagaatgc tggaattcag cagagaagtg acagaaaaca cctgagatac    840
```

-continued

```
tgaaggagag ggaggcaagg tagacagcct ggctggaatc agctgggagc ccagagaggg    900

tccctagtga gaggaaaggg taagtgagag attcccagtg gtacatgttc ccatgttgac    960

tgctgaaatc ctagtcataa gagtctctca aaccccaagg accctgaaac tggtattccc   1020

g                                                                   1021
```

<210> SEQ ID NO 100
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 100

```
gtttaaattt gccgattagt ttcgatgatt caccagtgct tgatgattaa ggggtattgg     60

tgcagtgcca ctgagttgct gttcatagtc tccagtaagg gcagtacaag agaggagaaa    120

agtaaagttg cacatcaggc caatacattt ccatgtccct acagcccatg ggtatttttc    180

tctgaagttt aaaattacag ctcaagaaga tcatatgtat ttatgtaatc tgcctttaac    240

caggccacct tgcttcccta atgctgttgt ttttttccct tcgtttattt atctttaatt    300

gacacctgtt gctattctta tgcctgctca ccttcacata aatgtcagca tccatgcacc    360

atgtatgtca cacacacaca cacacacaca cacacacaca cacacacccc tctaaaagtt    420

ctgatgagta tttgataaat agtagagttt tgaggagaga tggaggaaag tgtttacaag    480

tttaactttt tgaatttgct tttaactctc tgctgttccc tcacctgtaa aatctgcctc    540

atctctgccc ctctttcttc ntgcaaacct cacttctcat agcctcctcc agcagcactg    600

acttctggag attccctgtc agtgaaataa aactggaaag ctggtctcat aataaaagcc    660

caacagttta tgggcaaagc ccaaccacct gtggttcttc aggtgtggtt ttcttgagga    720

gtgcttattt accctgccac attttcctct ctttctctcc aaggaggctt tctctccagg    780

gtggattaag tgaaattatg ctgttactta gggactgatt tacatatttc ttatccctca    840

cactctgggt ttctctatgt tagctacatc taggaaaaaa atggggaaaa aaatcacctt    900

gattggaagt gcagttaatt cctgaaaata aagcctgatc acgagtggta atcacagatc    960

aattagttac tggatcccta gataatgcat ccctgtcatt gtgagacaaa agaggggaaa   1020

g                                                                   1021
```

<210> SEQ ID NO 101
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be g or a.

<400> SEQUENCE: 101

```
cccaaaatct taggatgctg ccttaaacat catggtagaa taatgtaact agctacccac     60

gatttccttc tttaattcat tttgtgtttt atctccccag gaaagtattt caagcctaaa    120

cctttgggtg aaaagaactc ttgaagtcat gattgcttca cagtttctct cagctctcac    180

tttgggtaag tcagtgccat tagaccaaga tttctcattc tcgcactata gatatttcag    240

actgaaatat ccttgcttgt ctggggctgt cctgcacagg atatctggca gcatccttga    300

cctctacctg caatgtgttc ttccctgggc ttggggtcat ttactttacc tcttggtgtc    360
```

-continued tccctttcct taagtgtaaa gtgtggatca taatgaccta tttcccagat gcattgtgag 420
gattcaatag catggttcat ggaaagtacc tcatacagtg cttcttggtg catactaagt 480
gctcaataaa gcttagttat tctgattatt attctactac aaaatgggta tactataatg 540
ttgtgagtga gtgtggataa ngtacctagt gggtggcagt cacaaaagag ataaacaata 600
agtcgctgtt tcttcatacg tacttcttac ttttgaaaag atgagaaaag tctgggccat 660
gtcacaaaca ttgccaaaaa taagacaata aaaagcacag ttgtcagagt taaaccacaa 720
cagtaccaaa ctctaccatt tcttttcttt ttctcccact agtgcttctc attaaagaga 780
gtggagcctg gtcttacaac acctccacgg aagctatgac ttatgatgag gccagtgctt 840
attgtcagca aaggtacaca cacctggttg caattcaaaa caaagaagag attgagtacc 900
taaactccat attgagctat tcaccaagtt attactggat tggaatcaga aaagtcaaca 960
atgtgtgggt ctgggtagga acccagaaac ctctgacaga agaagccaag aactgggctc 1020
c 1021

<210> SEQ ID NO 102
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be t or c.

<400> SEQUENCE: 102
gcaggactgc agacatgact catggcaggg tagctgctga ggcacgtccc atctcctttc 60
agttcaggag aggctgtggg aagagggaag aactgagcac acatgaagat ttggcagagg 120
gaggaggcca agtagggagg aagtggaata attgatattg gagccagaca tataatcaga 180
tgaaacctgg gcaaaaccaa acgaggtcca gacataagga gaaggagagc aggcgaaaag 240
gcaatagaga tctgtggcat gagataatcc tatgtccgtg ggattttccc atggatggta 300
caactggcac aggacgatgt tattcctccc ctctggtgaa accaatatgg cagcagaagg 360
cagggagggt ggggaggagg gtgtagtttg tctgcacaag catcatcagc atattttcag 420
gagcttctga gagctgatga aggatcattt gctgcagata ctttatattc actcggtcag 480
ccaacttgta ttgagcaatt gctggggcac agcagtgagt gaggtgcgct acagaaacac 540
agttgaaaag aatctgactt ngccctcaat gaacctgcag tcaagttaga agcacagagg 600
tcaacagaca aataagataa aggcattagt ttctgtactg gagcataaca ccaatactgc 660
cattgctcag aatgtttcta gaacccctaa aagttcagaa ctgtcttcag catcatttca 720
ggagccagac aagaaaacca gtctcatttc tttattgtca tgacctgggt ttgaccagaa 780
acaatattac tcacttggag cacctcactc ctcagatctg gctctagttc taaatatcaa 840
accattctca aatagcaaag ctttgtcacc tccctataca tatctcattt aaatatgtaa 900
aggatctgta ggcaattcca aaaagaaggc tctaaaaata tttaaaaagc aatggtcgta 960
ccttatagtt ttaccttata gtgtatatca ataatagcct tgtaattaaa aaacaatcat 1020
c 1021

<210> SEQ ID NO 103
<211> LENGTH: 1021
<212> TYPE: DNA
<213> ORGANISM: Homo sapiens
<220> FEATURE:

<221> NAME/KEY: misc_feature
<222> LOCATION: (561)..(561)
<223> OTHER INFORMATION: n can be a or g.

<400> SEQUENCE: 103

```
caggaagttg ttggtgtttg gatggatgaa tggactaatg gatggatgaa taatagatag     60

atggattgtt gagagagaca gagaagagaa aagccttgcc cccaaaagct cacagactac    120

ttggagagag aagaaagcta cctggaggga gaaccagatg catgaagcag tgcagatgtg    180

gtgcctaatg agtgtgtagt ctggaagggc agcaaaagtc gagtggagtg agaggttcct    240

gtgtcctgga gcactgagta gagactccct catgggggtg aatcttaaag gataaagggg    300

cctctataat gaaaaggagg aggatgggat ttctggtaga ggaaattgct tgagcaaaac    360

ctccaaggtt ggaatgacta tggtgtgttc agggatgtta gcagacccag atgggtggag    420

cgttgagtgt gtgtgtgtag gaaggaagag gggaggtggc tggatgagca cagtgagacc    480

tgatttgatt gagagccttg aacgccacgc tgaataatgg aggcaatggg acgccataga    540

gggcttttga gtagacatat ntcagtgtag aagggtgaat ttcagatttt tagacagaat    600

agagtaagga gaggagctct tagaaatcat ctagtccagg gcttgtggca gagccctgag    660

gttttaagaa ggcatgtcag gggctaccat gacaggcacg gagaggctga gtgaattggg    720

gttcttgcca caattccctt gcctgagatt caacaagagc agctgtatta caatctgtgc    780

aaaatgtcat taggagaaac tagttagtag ctgggcgtgg tggcatgcaa ctgttgtccc    840

agctactcgg gaggctgagg ccggagaatc gcttgaagct gggaggcgga ggttgcagtg    900

agcagagact gtgccactgc actccagcct ggatgacaga gcaagactct gtttcaaaaa    960

aaaaaaaaaa aaaaactagt caggactctt tcagatacaa gtaatagaaa ccaactcaaa   1020

c                                                                   1021
```

<210> SEQ ID NO 104
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be a or g.

<400> SEQUENCE: 104

```
taccaaaggg caagtaggga aacagaccaa cagagatgtt accttctgaa taattggacc     60

caggaagagg agtgtaacct aagagaggaa gatacttgat tataccagtc tttgtggatg    120

aaaatatcta gcagtattca tagcaaatgc agtaggaagg agagagttaa tcacaaacag    180

aaagtaagca gagagtggga ccaagagtgg ggatgggagt tcagcgagtc actcactaga    240

gtggccagct ctccgccagc tgatcacacc aagagagaag atgatgaggc ccaggcccag    300

agtcactgca gacacagaaa ccttcagggt ctgcatgggg gacagcccag gtgctgcaaa    360

aaatagaaac ttacttgacc cagtttctgt tgctcacccc cagggcaatt ccatttattg    420

cagccacctc tcagtgggtt aaaaggtcct ttatcccagc tccaagggtc tagctcacac    480

cacccactcc caagaaaatg atctttctca aatcaaaccc tcgtcccatg gacctctact    540

cctagagtaa gcctggggaa nccatctccc cagaattagc atcctggctt ccaggtcctc    600

tctaatacag tggggcctct caaggcatcc tctttccttc ctttacctca aagccaccct    660

tatcaggata aagggctcct cactgtcctc tccattgccc ccacggtaac aatgtttgct    720

tccttacttt ctccaactga gcagcttcct attacactgt cttaccacat gtcttaacct    780
```

-continued

```
ccagtggatc catcctgtga gttatcctac tacttgtgta ccttctacat ctagatctcc    840

catgtgtcct ttcagagctt gtctccatcc cactccacag cccctgcact tccttgggcc    900

ggtcctgttc tgaatcatgt cccactcaga ttcttttccc atgataaaat gaacactcca    960

tttctaaagg gaggctcttg tgcacgctgt gaggagacgt tccccaggaa agttcaagtg   1020

a                                                                   1021
```

<210> SEQ ID NO 105
<211> LENGTH: 1021
<212> TYPE: DNA
<213> ORGANISM: Homo sapiens
<220> FEATURE:
<221> NAME/KEY: misc_feature
<222> LOCATION: (614)..(614)
<223> OTHER INFORMATION: n can be c or t.

<400> SEQUENCE: 105

```
caaaaggtca ccccacagtc cccactccaa ggcaggttga tagcagggat ctcagggtgc     60

ccatggatca aggactaagt cagagtcggg gtccctcagg ccgagggtaa cgtaggtggt    120

gcctgccagg ctctcctcgc ccaggggggc tgagaatgtc taaacccggg tggctgtgac    180

ccctaggcag agccagccca gcccttgcca gggatggaga ccggcctcga ggaggccaag    240

ccctggggggt ccacaggcct gtgggcttcg gggaggctct gctccctgtg gccctgtgtg   300

gcccaggctg ctgagtcatc agaacctcgg gggcgccgcg ggccccacat tccgcccagg    360

cctctctctg accccccttcc cagcccatct gtgtttttgg aaaacagagc cagagccccc   420

cgcggccctg ccagcttgcg gctgctcacg ctgggactca aatcgcaccc ttctgtcttc    480

aaagtccacc ttcacttcaa agctcggtcc caccccagcc cggcctccac agggccacca    540

cctgcccaca cccaggcccg ctgctgccca gtttcggagg gaccttgggc atcccctgat    600

cctctctaga gcgnggggtt cctggcatgg gcccgttaca catgggtggc tcggtgggtg    660

gtgaggacgg ggctgggaga agatcctggg gaccccatgg tggaggcaat gaggcaccca    720

aaccccaact ccagcgatgg ctgcttccac ggggccctcc gagccctgac cttcaaggtg    780

caagaaaagc tttcaggggc aggggtgagt ggaaggtggg cttcctccct tgccacctgg    840

ggggcgggcc caggacagat gctccgtgag agcacttccc aacctaggcc cagctgtggg    900

gaaggaggga gcaggcggct gggctccagg caggggggaag agttgcctga gaactcaggg  960

agagagggag ggctggggca ccccatgcca gctccagctg cagcaccaga gctcagagca   1020

g                                                                   1021
```

<210> SEQ ID NO 106
<211> LENGTH: 1021
<212> TYPE: DNA
<213> ORGANISM: Homo sapiens
<220> FEATURE:
<221> NAME/KEY: misc_feature
<222> LOCATION: (638)..(638)
<223> OTHER INFORMATION: n can be c or t.

<400> SEQUENCE: 106

```
attccctgac cagggccctg ggacccaccg cacagctgag ctggcccgag ctgaagagtt     60

gttggagcag cagctggagc tgtaccaggc cctccttgaa gggcaggagg gagcctggga    120

ggcccaagcc ctggtgctca agatccagaa gctgaaggaa cagatgagga ggcaccaaga    180

gagccttgga ggaggtgcct aagtttcccc cagtgcccac agcaccctcc ggcactgaaa    240
```

-continued

```
atacacgcac cacccaccag gagccttggg atcataaaca ccccagcgtc ttcccaggcc    300

agagaaagtg gaagagacca caaaccgcag gcaattggca ggcagtgggg gagccagggc    360

tctgcagtct tagtcccatt cccctttgat ctcacagcag gcagggcacc caggccttat    420

aggaattcac cctggaccat gccctaaaat aacctcaccc caaatacaat aaagggacga    480

agcacttata gataccacag acacatgtgt ttcattttta gttttgttaa aaaaaaattc    540

tgacaaatca gaaatggggg ttcaggagtg gtggtgatgc aaaagatgga agccatgggg    600

tgggggctgt caggggtggg ggcagtagtg tctccttnac cccacccctg gtgtcctctc    660

ctgaaggaca gacggtcaca ttccaaaatg ggcgagtctt ctaccgtgtc tgttcaactg    720

agaagaaaac gtagcatggt cagaataagg catgaaaagg ggaaagtgag gcaggaacac    780

acggcacaca tgcagacact ggtgtactgc ctgggttcag aggacggacg tgggggtgag    840

ggaagggatg taatatgatg agagaagaca gaaaccccac ataaaggtca gaaaaacatc    900

ccaacacagc atcaaagacc agggggcatg aaccagtcaa gtgtccatta tgcatcagat    960

gcccatgacc tatgtgatgg gatttaggac aaacacacta aggaacaggg aggacctaaa   1020

g                                                                   1021
```

<210> SEQ ID NO 107
<211> LENGTH: 1021
<212> TYPE: DNA
<213> ORGANISM: Homo sapiens
<220> FEATURE:
<221> NAME/KEY: misc_feature
<222> LOCATION: (573)..(573)
<223> OTHER INFORMATION: n can be g or t.

<400> SEQUENCE: 107

```
ctctgaaggc ttgcctggtg ctcactcagc ccgtgaagag ggcctgctgg tcctctggag     60

cccacagccc tttgtccaga ggcgactcct aacctttagc aggctctgcc ctaacttaca    120

gtcccaccat tgtctgcccc acatcctgtc tgcctgtctg tgctccattc tggcccatcc    180

taggtgtctc tggctgcaaa gcctttcctg ggctcagcct tctgccttga acgggccctg    240

accatgagtc cccatgtgcc cagcccatac cttttccctg tccagccagg agccaacaca    300

ggcctggagc attgcctgtg gtatggcctg ctcgctgctg ttcccggcct gggtggtcac    360

ggacatgcag aggtggcact cagagtctcg cggcagccat tctcctgtcg gcgaccctgg    420

agatgtgagc attaggggga aagcaggcaa ggccacccta cagaggtgtt tggtttctgt    480

cctccttggt gcattgcagt gggaccacag agggagaggg tcatgcagtg gcagggtagg    540

gggaggagga gagcaggcat tgggctaagg agngggcagt gggctcactt gggccagcgc    600

tgtcatccat ggagcaccgg aggacgaggc ggcagaccag ctggggcagc atgcggccca    660

gcagcgtgtc gagcaggatg acggagtagc gctcagccag gcactggcag atgccgcccg    720

ccaccagagg taccacgcgg cacacctggg ccactgccac agctagcgca ccctggggcg    780

ggggcggaga gaggccagca tgggaccttc acttggcaag cctccactct ctgcccagca    840

cccagctggg cacttcctac gcattccctc attctcttct agaagggagg gcaaggctat    900

tcacaaataa ggacactggg gatcagagag tccaggggat gcaggggact cacacagggt    960

cactgagtgt aggagccagc ttcagaccta cgtctggccc caaaggctct ggcccacagc   1020

t                                                                   1021
```

<210> SEQ ID NO 108
<211> LENGTH: 1021

-continued

```
<212> TYPE: DNA
<213> ORGANISM: Homo sapiens
<220> FEATURE:
<221> NAME/KEY: misc_feature
<222> LOCATION: (531)..(531)
<223> OTHER INFORMATION: n can be t or c.

<400> SEQUENCE: 108

ggagagcagc agctggaggg caggctggga gcgcttgtga gggagaggag ctatggacgt     60

ctgcttctct gccaagggag agagtgaggt aggcctgggc ccgctgactt cagggtgagg    120

ccacagctac tgcagcgctt tttatttatt tatttattta ctgagatgga gtcttgctct    180

gtcacccagg ctggagtgca gtggtgcaat ctcggctcac tgcaacctct gcctcctggg    240

ctgcagtgat tctcctgcgt tcaagtaatt ctcctgcctc ggccttctga gtagttggga    300

ttacaggcat atgccaccac acttggctaa ttttttgtat ttttagtaga aatggggttt    360

caccatgttg gcgaggctgg tctcgaactc ctgacctcaa ggatcctcct gcctcggcct    420

cctaaggtgc tgggattgca ggtgtgagcc accacgtctg gccatactgc agcactttaa    480

aggacggtgt ctttttcttt ctcataaaag agaataggac tttattagca ntggtgcaga    540

cattgtatta cacaggaatg ggtccctagc ttgcacaacc ccagctgagc tttcagcaga    600

taaatcacag cagaaataga atcaccctag gactttcaat caaaagctgg aagtccacct    660

tacagaaaga caaaaagaaa ccccttttta tatcttaaca aagcaatagc tctcaagcag    720

cagagcatct cgaggaagaa agcttgcccg gtcgccatcc catcatgcca gagcgtgcag    780

tgtccaccct tgactacgct ggggaattgc tgattttttg aaaaagctta acttaacaat    840

ttctgatgtc tatcttttag agttctgtat gttcccattt tttattcttc tgaattttga    900

attgcaagta gctgtaaaat ccaatctttg agtgcatggg ggtgggtgtg aggcggggct    960

cagcttcaac cccctgtcct gtaaagcagt ggctggtttt tcctgagccc agccctggga   1020

g                                                                   1021


<210> SEQ ID NO 109
<211> LENGTH: 1021
<212> TYPE: DNA
<213> ORGANISM: Homo sapiens
<220> FEATURE:
<221> NAME/KEY: misc_feature
<222> LOCATION: (592)..(592)
<223> OTHER INFORMATION: n can be c or t.

<400> SEQUENCE: 109

cagccatggt tcgcggtgcc ctcggctgcc ctgggccaga gctggggcta gctttcacct     60

tgttgagacc caggactctg tcccccaagc ctgtcttcgc cagcgccttg accccacccc    120

tcatatactg tgtcctggaa aacgtggaca cgggagacca cagccagggc gaggtatcgc    180

ccctccatcc ccccaggccc aatgagaagc agttggccaa ggtgatccag gtggcagagg    240

cagcatcaga cccagtctcc tgtcaggcac caccttgggt gccggtcccc agatgccctg    300

gcggggagtg tgcatgctcc cggagccccc aggtcacccc atgtgagcca ggcccacaga    360

gcttggctct gcaatgcctg ctgggctgct gcccatgctc cacccccttct gggaagctaa    420

aagacagccc ttcagtgtcc agagacctgc ctggccttgg agcctgggtt tcacatgccc    480

accgggctgg caggggcact cagctgcctc cagccccggc ggtcaccctg gcattgggtc    540

catctaactg ctccccagtc acaaggcagc tgctccccaa gtctccccaa anctgctggc    600

ccctctagaa gcctctgtcc attcctggag gaccgagggc agcctgcatg ccatcccgca    660
```

```
cacagccttc tgtctgggca tcctgccttc acacatgctg cacagggagg aaactcttat    720

accacattcc ttaagcagag actgaagcct ggagccaggc acatggcaca tgctcccacc    780

cacccaggac acactgcggt gtggctgcct ccaggctggc ccctagatt gcgtctgctc    840

ctggcatgga taactggcgc ctttgcctgg ccgttggggc agtgtttgcc ttcccctgtc    900

ggcagcaaat atttactgtc ctccgtctcc aggactctcc aggcctgagc agaccccggg    960

gggatgagtg tggactcagc ggtgctgagg gtagccccct gcccttcggg tcctggtgcc   1020

c                                                                   1021
```

<210> SEQ ID NO 110
<211> LENGTH: 1021
<212> TYPE: DNA
<213> ORGANISM: Homo sapiens
<220> FEATURE:
<221> NAME/KEY: misc_feature
<222> LOCATION: (601)..(601)
<223> OTHER INFORMATION: n can be g or a.

<400> SEQUENCE: 110

```
ggcagaggca gcatcagacc cagtctcctg tcaggcacca ccttgggtgc cggtccccag     60

atgccctggc ggggagtgtg catgctcccg gagcccccag gtcaccccat gtgagccagg    120

cccacagagc ttggctctgc aatgcctgct gggctgctgc ccatgctcca ccccttctgg    180

gaagctaaaa gacagccctt cagtgtccag agacctgcct ggccttggag cctgggtttc    240

acatgcccac cgggctggca ggggcactca gctgcctcca gccccggcgg tcaccctggc    300

attgggtcca tctaactgct ccccagtcac aaggcagctg ctccccaagt ctccccaaac    360

ctgctggccc ctctagaagc ctctgtccat tcctggagga ccgagggcag cctgcatgcc    420

atcccgcaca cagccttctg tctgggcatc ctgccttcac acatgctgca cagggaggaa    480

actcttatac cacattcctt aagcagagac tgaagcctgg agccaggcac atggcacatg    540

ctcccaccca cccaggacac actgcggtgt ggctgcctcc aggctggccc cctagattgc    600

ntctgctcct ggcatggata actggcgcct ttgcctggcc gttggggcag tgtttgcctt    660

cccctgtcgg cagcaaatat ttactgtcct ccgtctccag gactctccag gcctgagcag    720

accccggggg gatgagtgtg gactcagcgg tgctgagggt agccccctgc ccttcgggtc    780

ctggtgccca gcaggggtcc agcccaggga agagactgag gccaggacag gcagtgttta    840

agcctgagtt tctgggaaag gtagccctgg gcagaacttg ggccgaacgt tggccagtgt    900

ctctctccag ccaggctgtg aggtagctgt ttccaggatg ggcacctttc cacacccagc    960

aatgtggcca ggagccgcca ttcacgggtg cgaccagcag atggcatcag agcctcactt   1020

t                                                                   1021
```

<210> SEQ ID NO 111
<211> LENGTH: 1021
<212> TYPE: DNA
<213> ORGANISM: Homo sapiens
<220> FEATURE:
<221> NAME/KEY: misc_feature
<222> LOCATION: (629)..(629)
<223> OTHER INFORMATION: n can be c or t.

<400> SEQUENCE: 111

```
agagactgag gccaggacag gcagtgttta agcctgagtt tctgggaaag gtagccctgg     60

gcagaacttg ggccgaacgt tggccagtgt ctctctccag ccaggctgtg aggtagctgt    120

ttccaggatg ggcacctttc cacacccagc aatgtggcca ggagccgcca ttcacgggtg    180
```

-continued

```
cgaccagcag atggcatcag agcctcactt ttgatgcact ccggccacca gccacgggtc    240

caggttctgg ccaccaccca gggtctgagc agctgcatcc tgcccctgcc gggcactccc    300

gggggctgtg gggcctgtgg gggccctgcc agacactctt gggggctgtg gggggccctg    360

ccaggcactc ccagggacta tgggggctgt ggggggccct gctgggcact ctgaagggca    420

tggggcttag gaatgagagg agctgtctga tgatgatggt gggggcactg cagaggcccc    480

cggcctgctc aggtccagtc tcggccccta agtcaagcct caggccagcc tctcaccagc    540

ctgggtttct cagagggccg ggacaaatgt tctgggtctc taatattcca agaaagcctc    600

tggctggact ctgagcccca cctgcgagnc cctagaatca cagagagcta gggtgagaag    660

accaggggga ctccgtccca ccctcgtcgt ggctgagccc actgtggccg gtggtggacc    720

aggctgtggc ctttgctgag ggtccccagg gcccctgggg gctactgagg ctggaggcca    780

gcggtggcca ggagggtccc tccctcagcc actcaagcca gaaggtcgag tcctggtttc    840

tatgtgagga gggggcttca ggggctggga cctgggggca ccgaaggcct ggagctgggg    900

tccaggcggc tgagggttag tgcgttccca cgctcccctc cgccagcgcc gtgaggagag    960

ggaggtccac tctggaaaga atgtttgagg gcaggggtag acagggtctg ggaacgcgga   1020

g                                                                   1021
```

<210> SEQ ID NO 112
<211> LENGTH: 1021
<212> TYPE: DNA
<213> ORGANISM: Homo sapiens
<220> FEATURE:
<221> NAME/KEY: misc_feature
<222> LOCATION: (563)..(563)
<223> OTHER INFORMATION: n can be g or a.

<400> SEQUENCE: 112

```
atgcccctcc taacatgaaa gggatttaag caagccaatt gcttatttct gcctgggcca     60

gggaccccag ttcctgacct tctcaagaga tatgaacctg acccttctga gtgtagaact    120

gggctgtggg gccaggagat gtgggtttca atcccaggac ccccactggt ggctgtgcca    180

tcttgagcaa ggcactttgt ttctccgagt ctctatttct tcactggtaa acaaaggcac    240

aaatacctct tcaccacatc ataaggggat taaatgatgt aggaaaaagg atgttgtata    300

gtcgtgcaca tagtagggca gcaggtccag gaggtggacg gcccatccag ggacccagcg    360

gagcagccac ttccccactt ctcaagggtg gtcaccaggt atgtccgcag ggctgccccc    420

tgcccatctc caaggcctga ctggctgatc tcagctacac attggatact aagtcctagg    480

gccagagcca gcagagaggt ttgccttacc ttggaagtgg acgtaggtgt tgaaagccag    540

ggtgctgtcc acactggctc ccntcaggga gcagccagtc ttccatcctg tcacagcctg    600

catgaacctg tcaatcttct cagcagcaac atccagttct gtgaagtcca gagagcgtgg    660

gaggaccaca ggggtataga gagccaggcc ctgcacaaac ggctgcttca ggtgcaggcc    720

tggggctgtg aacacgccca ccaccgtgga cagcagcagc tgggcctggc tatcagccct    780

gccctgggcc actagcaggc cctgtacagc ctgcagggca gacaggacct tgtgcgcatc    840

cagccgggag gtgcagttct tgtccttcca aggaacaccc aggattgcct gtagcctgtc    900

agctgtgtgg tccaaggctc ccagatagag agaggccagg gtgccaaaga cagccgttgg    960

ggagaggacg gtggccccat ggaccacgcc ccatagctca ctgtgcatgc catatatacg   1020

g                                                                   1021
```

<210> SEQ ID NO 113
<211> LENGTH: 1021
<212> TYPE: DNA
<213> ORGANISM: Homo sapiens
<220> FEATURE:
<221> NAME/KEY: misc_feature
<222> LOCATION: (551)..(551)
<223> OTHER INFORMATION: n can be a or g.

<400> SEQUENCE: 113
aggagaggaa gggcgtggaa actggaatga tcctagtggg gtgtcttggc atctcttggc 60
ctcattttcc ccatctgaac catgaagcta aaactagggg atgtggatta aatggttcct 120
acaactactt gcaaggagac cactctgtgt ggttgcaaag aacactttga gaagctgtgt 180
gggaaagttt ccttcctagc agggtagact cagctaactg caggtcatgt ggccattgtg 240
gatgggttgg gagctcaagt ttggggcaga agggaatttt ttttggcagc agagtggcaa 300
gccctgccgc caggcaaact ctgctcttcc tcatcctcag aagcacttgc tcactctgct 360
aaatcaaagt gaaacgcatg tttacagaat attggtccaa aagggtctca gcatctccca 420
ctacccaggg tggcagagcc tcgggccggc cttgctcccc aagaagggct gactggggct 480
ctgtcccctg ccccagggct cgaggtagtg tttacagccc tcatgaacag caaaggcgtg 540
agcctcttcg ncatcatcaa ccctgagatt atcactcgag atgtgagtac aaagcccccc 600
tcaccagccc ctgttcctgg ggagagaggc ccagacagga ttcctggggt gactgggggc 660
tgttggggag acagacagag ggcctctac cagcttggct ccctcctggt ggcctgggag 720
tcagcccagc tcgcccctct ctcctactgc ccctcccttc agggcttcct gctgctgcag 780
atggactttg gcttccctga gcacctgctg gtggatttcc tccagagctt gagctagaag 840
tctccaagga ggtcgggatg gggcttgtag cagaaggcaa gcaccaggct cacagctgga 900
accctggtgt ctcctccagc gatggtggaa gttgggttag gagtacggag atggagattg 960
gctcccaact cctccctatc ctaaaggccc actggcatta aagtgctgta tccaagagct 1020
g 1021

<210> SEQ ID NO 114
<211> LENGTH: 1021
<212> TYPE: DNA
<213> ORGANISM: Homo sapiens
<220> FEATURE:
<221> NAME/KEY: misc_feature
<222> LOCATION: (548)..(548)
<223> OTHER INFORMATION: n can be g or a.

<400> SEQUENCE: 114
ttggatagac tgggggaaat aagtcctgtg ggacctcctg ccttaaagaa agcaggcgga 60
gggccctaaa ggaaatcagg caaccagacc aaaagaatgt ggaccaggtg gtccatgctg 120
tgtctcttgt gacccttctt ctccctgcca tgtcttttgg gagagccctt gtgttgcaaa 180
aatgagagtg tggtggtatg gattggggtt taggcagaac agtactggcc aagcagcgcc 240
tccctggacc tcaattttcc ctctgtggaa tgggctagca atcctgggcc tccccagggc 300
gaaggaaaga ccactcagga agggcaccgt ctggggcagg aaaacggagt gggttggatg 360 tattttttc acggatgggc atgaggatga atgcttgtcc aggccgtgca gcatctgcct 420
tgtgggtcac ttctgtgctc cagggaggac tcaccatggg catttgattg gcagagcagc 480
tccgagtccg tccagagctt cctgcagtca atgatcaccg ctgtgggcat ccctgaggtc 540
atgtctcnta agtgtgggct ggaggggaaa ctgggtgccg aggctgacag agcttcccat 600

-continued

```
ttcaccttgt gggcccttcc caggcagagc ttcaggtgcc cctcttccca gtcattgata    660
cttagcggtc ctggccccct ttcctctccc tgctggtggt attgcacgcc aatgactcgg    720
ccagatgccc agacccctgt tcttggttta cctgcagaat attatctttg ccacccccgcg    780
ggatggctca acccactttc aggatgcagg tctcctaata gcaacctgat atagcagaaa    840
gacccctggg ctgggagtct gagacctagt tctagcccag ccctgaacct cagtttccct    900
ttctgtgaaa caagaatgtt gaacttgatg attcccaatt ttccttttga ccttgaaatg    960
gtagaatatt tatccctttg aggtgactcg gatggtagac tctcagacac catagcacac   1020
g                                                                   1021
```

<210> SEQ ID NO 115
<211> LENGTH: 1021
<212> TYPE: DNA
<213> ORGANISM: Homo sapiens
<220> FEATURE:
<221> NAME/KEY: misc_feature
<222> LOCATION: (544)..(544)
<223> OTHER INFORMATION: n can be g or a.

<400> SEQUENCE: 115

```
ggggcagggc tggtggtcag ctggggcggg gtgggagctg gaggtccgtg gtcaccagct     60
gccctgacta atgtcgttac ttgaatataa ccctgtgaag gcaggaacca cgtctgtctg    120
gttcacttcc cacggtggtt gagacatagt gggcactccg gaagtatttg ttgaatgagt    180
gaaagccccg ctgggggaaa ctgggtacag ctctttcctc agtttcccca tctgcactct    240
gggctgaatg ctggggctcc tcccaatctc cctgaagctg gacctgagcc cagtagggac    300
acacagggtc cagccagcgt cctggcttcc tccagggtca tttcatctac aagaatgtct    360
cagaggacct ccccctcccc accttctcgc ccacactgct gggggactcc cgcatgctgt    420
acttctggtt ctctgagcga gtcttccact cgctggccaa ggtagctttc caggatggcc    480
gcctcatgct cagcctgatg ggagacgagt tcaaggtgag tgggtggggc tgggctgcta    540
gggnatccag atggcatgtg gtatgtgtgt gtgtgcacac gcatggggag gagggaggaa    600
actcggaaac ttggtggtgg gcaaaagaac taagctggag caatagcagt gaagtccaga    660
ctgggcacag tggctcacac ctgtaatccc aatcctttgg gaggctgaga tgtagcagga    720
cgaaccgcag acaaaactcc tcagacactg agttaaagaa ggaaagagtt tattcagccg    780
ggagcatggg taagactcct gtctcaagag cggagctctc cgagtgagca attcctgtcc    840
cttttaaggg ctcacaactc taagggggtc tgcatgagag ggtcgtgatc tattgagcaa    900
gtagcaggta cgtgactggg ggctgcatgc accggtaatc agaacgaaac agaacaggac    960
agggattttt acaatgctct ttcatgcaat gtctggaatc tatagataac ataactggtt   1020
a                                                                   1021
```

<210> SEQ ID NO 116
<211> LENGTH: 1021
<212> TYPE: DNA
<213> ORGANISM: Homo sapiens
<220> FEATURE:
<221> NAME/KEY: misc_feature
<222> LOCATION: (542)..(542)
<223> OTHER INFORMATION: n can be t or c.

<400> SEQUENCE: 116

```
gcaaatccat agagacagaa agcacattta tggttgccag gagctgggaa agggcaggat     60
```

-continued

```
gggggaatgac tgtttattgg atgtggggct ctattttggg gtgatgagaa tgttctggaa    120

ttaaattcat ggctgcataa cactgtgaac atactaaatg cccctgaatt gtacacttta    180

aaatggttaa agtggcaagt tttcactaag cagtaaatta aattctacta caattttaaa    240

aagactaaaa aataatttaa aaaagattaa atgagataac gcaaaaaagc attatctcga    300

aaatacagct gatattagta taattcttac taagttttaa gagtctaagg tgcaggattc    360

taagtttaaa gggataggct cttttggttt tttggtttag ttatttggtt ttttttttta    420

atccattatc cccacccttg ggaggccccc agcacccagt ctgcactaga ggatggggcc    480

cacctccctt ttctctccag gcccagccac tgaccaccag taccctggcc aggggcaccc    540

tnggtcattg ccctccgtgg cccaaggaag ggaacagaaa caacagccaa gaagacaata    600

gccgccggga agtcctcaca tttctggaga aatagagccc attaatgaat gaagttcctc    660

cagcctgatc ggaggacggg gtgctgggga ggcctgggct aaagggctca cctccagccc    720

ccaccctggc agggccgatg gtacatgctc actcagtgag gggggctccag aggtctgtgg    780

gtacgaaccc aagggctggt gcccaggggc aatcagctta tgtctctgag ccttgggaaa    840

cagtgagggt cagcccggct ccccacgtgc ttctgggcag ctttggtatt ggagcaggtg    900

caaactcggg actagggcag gaccccctga gaggcgactg agcaaggcca tcccgactca    960

tgtttccttg gccctgcccg gggcacagca tcctgcccac atccctgcag ccctggctcc   1020

t                                                                   1021
```

<210> SEQ ID NO 117
<211> LENGTH: 1021
<212> TYPE: DNA
<213> ORGANISM: Homo sapiens
<220> FEATURE:
<221> NAME/KEY: misc_feature
<222> LOCATION: (551)..(551)
<223> OTHER INFORMATION: n can be a or g.

<400> SEQUENCE: 117

```
gggaactagt gccgccccag ggccccaagg tgggcggttc ggtgattcag agagggcagc     60

tctgtgttag gacacactgg ggccagccag gaagggtgga aaagataggg accagcgtga    120

gcatagaggc taagggacca tgggagctcc aagcgcgctc acagtgggga ccaggtcctg    180

ggggctgggg acaccaggga ggtgaaatac ccctccagcg ggtagggagg gtgggcagag    240

gagggccagc ggccaggcat ttgggagggg ctcctgctct ttgggagagg tgggggggccg    300

tgcctgggga tccaagttcc cctctctcca cctgtgctca cctctcctcc gtccccaacc    360

ctgcacaggc aagatcgtgg acgccgtgat tcaggagcac cagccctccg tgctgctgga    420

gctgggggcc tactgtggct actcagctgt gcgcatggcc cgcctgctgt caccaggggc    480

gaggctcatc accatcgaga tcaaccccga ctgtgccgcc atcacccagc ggatggtgga    540

tttcgctggc ntgaaggaca aggtgtgcat gcctgacccg ttgtcagacc tggaaaaagg    600

gccggctgtg ggcagggagg gcatgcgcac tttgtcctcc ccaccaggtg ttcacaccac    660

gttcactgaa aacccactat caccaggccc ctcagtgctt cccagcctgg ggctgaggaa    720

agaccccccc agcagctcag tgagggtctc acagctctgg gtaaactgcc aaggtggcac    780

caggaggggc agggacagag tggggccttg tcatcccaga accctaaaga aaactgatga    840

atgcttgtat gggtgtgtaa agatggcctc ctgtctgtgt gggcgtgggc actgacaggc    900

gctgttgtat aggtgtgtag ggatggcctc ctgtctgtga ggacgtgggc actgacaggc    960

gctgttccag gtcacccttg tggttggagc gtcccaggac atcatccccc agctgaagaa   1020
```

-continued g 1021

<210> SEQ ID NO 118
<211> LENGTH: 1021
<212> TYPE: DNA
<213> ORGANISM: Homo sapiens
<220> FEATURE:
<221> NAME/KEY: misc_feature
<222> LOCATION: (554)..(554)
<223> OTHER INFORMATION: n can be c or t.

<400> SEQUENCE: 118
agcttcctga gtagctggga ttacaggcac tcacctccac gcccagctaa cttttgtatt 60
tttagtacag atggggtttc accatgttgg tcaggctggt ctcgaactcc tgacctcgtg 120
atccgccctc ctcgcctccc aaagtgctgt gattacagga gtgagccacc gctcctggcc 180
agaaatctct tctttattat gtctactgtc cgttatccaa ctccagaagg taagaacctc 240
cactgataca taaggacttg tataccccac gtgcctgcaa cagtgcttgg cacctagtag 300
gcataccaaa atatataaat gttgaacaaa tgaagaaagt taaagtaaaa ctagaggtcc 360
aaaaatatca caaaagccat ctatggtcgc cttttcccta cctgattttg ctgagtggcc 420
ttacttttca gtcctctaca cagctggaac attaatgaac acagaggggg aagaagtgtg 480
tttactctag gatcacctct caatgggtca cttggcaagg gcatctttgc ttcttcgtca 540
gctccttttg acanggggggt gaagggtttt ctgcaccaca ctttgaccac aagcatcacc 600
aatttcactg aacccaacag aaatttggac cctctggggg ctctctgcgt ggcagggccc 660
ttttcttttt ctttgggctt aggctgcaat ttgaaacacc actttcctga gccagcatcc 720
cccttgcagc gctgtcacag ggaggcttag gcagccacgt ggaagccacc taccccgacc 780
tttggcagaa tttccaaaca caacacagta gctttaagtt gattaatttg gaactctgac 840
cttggcccca aaaggtaaga atacataaca aggtatttta ttctcaaaat gtgtcaggat 900
aagaagcact tctgtaaatc gaccttttta aaatagatat aattagattt gcagttgggg 960
gcagtaaaga aagggtctga acagtggata acatgttgag aggttaatta ttaatgggca 1020
g 1021

<210> SEQ ID NO 119
<211> LENGTH: 1021
<212> TYPE: DNA
<213> ORGANISM: Homo sapiens
<220> FEATURE:
<221> NAME/KEY: misc_feature
<222> LOCATION: (548)..(548)
<223> OTHER INFORMATION: n can be a or g.

<400> SEQUENCE: 119
gcagcctgtt gtgccttgtg cctcgaagag gtttggtatc tgccagtttc tccctcgctg 60
tttttatggc tttcaaaagc agaagtagga ggctgagaaa tttctctgtt gaatacctga 120
tttcacaatc aagttaaagg aaaggggaaa agagtattgg tggaagcttc ttaggggagg 180
ggactaataa actgagataa ttctctggtt catggaaggg caaggagtag caaactatga 240
cacattttgc aaatgtatca ccatgcaaat atgcattgtt ttcctgacaa tcgttgtgca 300
gttgatgtcc acattaaaat actggatttt cccacgttag aagaatgttt aaatttagta 360
tatgtgggac aaagtggaag acacacagat ttatacatgc acatactttt cttcattcac 420
ttctttgtac ttaagtttag gaatcttccc acttacagat ggataaatgg gtacaatgaa 480

-continued

```
gggccaatag ccctccctgt ctgtattgag ggtgtgggtc tctaccttgg gtgctgttct    540

ctgcctcngg agctctctgt caattgcagg agcctctgag gagaaaattg acctttcttg    600

gctggggcag agaacatacg gtatgcaggg ttcaggctcc tgacggagtt ggggcaaccc    660

tggagataag ctcacacaac cctgcaagac caggtgctgt taccctagcc aatctcatgg    720

atgaaccaga tcaatgccag atgagctctg cctaaaatga tttttggtg aactctgaaa     780

agtggaatat tgtttctgta agaatatcca tctgagactc tatctcttgg taataccaac    840

caagagttat cagtttctct ttaaccgaga caccagcaaa gtgcctgctc cagggtactg    900

cccaggggag ccctccattt gtagaatgaa tgagagtcca ggttatgaac agtgcctgga    960

gtgtaggaac accctccttt gcctctttga caggtctgca tcataacact ttttttttt    1020

t                                                                  1021
```

<210> SEQ ID NO 120
<211> LENGTH: 1021
<212> TYPE: DNA
<213> ORGANISM: Homo sapiens
<220> FEATURE:
<221> NAME/KEY: misc_feature
<222> LOCATION: (546)..(546)
<223> OTHER INFORMATION: n can be a or g.

<400> SEQUENCE: 120

```
gaaataccat attgcatcaa acctaagacg ccatcaagaa taaaaggcac ttttctttac     60

attactaccc agacgcaaac agagctgcca attcaaccat gatgagtcac cagttatagg    120

aggtttgatt tcagagctat aagagtgtat gtcctagaac caatgagcta tcgtagatcc    180

aagaatctac atatctgagt tggaagggct gccagccctt ggggcatgat cttccatcct    240

caaagacttc ttcagatttg aagagcaagg ggaaggactg cctggtgtct taacgaagtg    300

tctcctactc agccagtagg accctgagca ctctggggca tcctggcatc tgttgcccag    360

ctaatggttc ccaccagtca cccgtcccaa cccatgccac catccagtgc ccagcagctc    420

tcagagatac tcacttacta caggagacac actcgttttc tcttagaaag aaacctgcat    480

ggcaggtgca cacggtgttc tgtttctcct ggcctgtagg gagaagtgcg gcacagctaa    540

aggagnagcg cctgcacccc caccccacag gacagaggaa gtgacgaggg acagggtggg    600

ggcggccaga gaggagttgg ttgtcagacc cacagaatac aggaggggga aggaaaggaa    660

gtgccaccgc atggggaagg ggccaacccc tggggtgggg agagggcttg gcctcaggag    720

agctgcgctc acaggagagg tgcacggtcc cattgaggca gaggctgcaa ttgaagcact    780

ggaaaaggtt ttcactccaa taatgccggt actggttctt cctgcagcca cacacggtgt    840

cccggtccac tgtgcaagaa gagatctcca cctgacccat ttctggtgag gggagaagat    900

ggggtatgag tcctgcatcc tcctgtccct gcatcccctt cctgacatac ccctaagtgt    960

gtgtctctgt aatacacact cacatccatg cagtgtccca ccaaaacaca caccttcctg   1020

c                                                                  1021
```

<210> SEQ ID NO 121
<211> LENGTH: 1021
<212> TYPE: DNA
<213> ORGANISM: Homo sapiens
<220> FEATURE:
<221> NAME/KEY: misc_feature
<222> LOCATION: (553)..(553)
<223> OTHER INFORMATION: n can be c or a.

<400> SEQUENCE: 121

-continued

```
agatccagaa gctgaaggaa cagatgagga ggcaccaaga gagccttgga ggaggtgcct     60
aagtttcccc cagtgcccac agcaccctcc ggcactgaaa atacacgcac cacccaccag    120
gagccttggg atcataaaca ccccagcgtc ttcccaggcc agagaaagtg gaagagacca    180
caaaccgcag gcaattggca ggcagtgggg gagccagggc tctgcagtct tagtcccatt    240
cccctttgat ctcacagcag gcagggcacc caggccttat aggaattcac cctggaccat    300
gccctaaaat aacctcaccc caaatacaat aaagggacga agcacttata gataccacag    360
acacatgtgt ttcattttta gttttgttaa aaaaaaattc tgacaaatca gaaatggggg    420
ttcaggagtg gtggtgatgc aaaagatgga agccatgggg tgggggctgt caggggtggg    480
ggcagtagtg tctccttcac ccccaccctg gtgtcctctc ctgaaggaca gacggtcaca    540
ttccaaaatg ggngagtctt ctaccgtgtc tgttcaactg agaagaaaac gtagcatggt    600
cagaataagg catgaaaagg ggaaagtgag gcaggaacac acggcacaca tgcagacact    660
ggtgtactgc ctgggtttcag aggacggacg tgggggtgag ggaagggatg taatatgatg   720
agagaagaca gaaaccccac ataaaggtca gaaaaacatc ccaacacagc atcaaagacc    780
agggggcatg aaccagtcaa gtgtccatta tgcatcagat gcccatgacc tatgtgatgg    840
gatttaggac aaacacacta aggaacaggg aggacctaaa gggtttcatg agatcagtac    900
tcactgtagg aggagatgtc tatctcatca ggcagctcac taatattgac ctcaaagcga    960
tcctgcacat cattgaggat cttggcatca ttctcatcgg acacaaatgt gatagccaag   1020
c                                                                   1021
```

<210> SEQ ID NO 122
<211> LENGTH: 1021
<212> TYPE: DNA
<213> ORGANISM: Homo sapiens
<220> FEATURE:
<221> NAME/KEY: misc_feature
<222> LOCATION: (551)..(551)
<223> OTHER INFORMATION: n can be c or t.

<400> SEQUENCE: 122

```
aggtgtgtgc caccatgcac ggctaatttt tgcattttta gtagagagag ggtttcatcc     60
tgttggccac attggtctta aactcctgac ctcaaataat ccacacgcct tggcctccca    120
aactgctgag attacaggtg taagccattg tgcacttggc cagaatcctc aatattcaca    180
caccactgga gctgttttaa agtttccggc tttctctgcc acatacccca aaattattaa    240
actgatatga ttcaaagtca gtataaagta gtaagaaaag ggtggtcttg tgttaagcat    300
catccatagc ccaattacga atcctcctgt tacataggaa ctcaacactc tgttacacca    360
cagcaaacta aagcttctcc aaaattaaag agactattgg cctacaagtt tcttatccct    420
ccaacttgcc acaccctcac tctcaggtct ctttaccttg gcttaccttg acattgggca    480
tgtatttaga gaagcgctca tattccttgc tgatctgaaa agccaactcc cgagtgtgac    540
acatcaccag nacagacacc ttaggcagga agtatacgga gacatatggt aaatgtagct    600
cttcattatc ccctctaggg aagtgactgt cacaaaaaca cacctgggcc gataataaat    660
gacttcaatt ctgtgatcta aatcatgaac cccacgcttg cgacagaaca tcccccacag    720
ctgtcaggtt gtcaagggta acagaggtca tgtgctcatg gctctgcaag catcatgtag    780
ttaggacaaa aacacccttc ccttatagtc ctaaccaaaa tcccctcccc agcactctcc    840
ccaaatatac ctgcccagta actggctcca gctgttgcag tgtggccaag acaaacactg    900
```

-continued ctgtctttcc catgcccgac ttggcctggc acaggacatc cattcccaga atggcctgag 960
ggatgcactc atgctggact aaaagttggg gggggaggaa gataaattag acttcagtct 1020
c 1021

<210> SEQ ID NO 123
<211> LENGTH: 1021
<212> TYPE: DNA
<213> ORGANISM: Homo sapiens
<220> FEATURE:
<221> NAME/KEY: misc_feature
<222> LOCATION: (569)..(569)
<223> OTHER INFORMATION: n can be g or a.

<400> SEQUENCE: 123
gtgtaatgta ttagagcaaa tcctcttgat taggcttgag aatggagcca tggagcccca 60
ttttttcccc acccttcatg cagtagtgtt taattaaata tttaaaatat ttaatgccct 120
gcacaggcat catttaattg gaatgaacaa ctgctaactg ctggcacagg gctctagaag 180
gccccagata tcagtaattt accactgttt gcttgctctt gggataggaa ggatccgggg 240
atcctagagg aggagctagg gcagttgggt gctggaggag gcacatgggg gctcagcaca 300
gccacttgtt tgccagctgg tggagcagtg tggaactcgc cttcttggga ggaagaaaca 360
cgtctccaga cttccataac aaagtaccca gagttgctgg gctagttaca gttccaatga 420
ccattcctcc ccagcaggat aagcccaggg ccccacccta cctgggtccc ccttctcgcc 480
ccgagggccc tctctcccat cccgtccatc gcgaccaggc aggccactct ccactgagct 540
acacatgacc agggtgcaag cactgggcnt tgttctgtgg gagtaggtct tcatttctgc 600
ttccaggtag cccaggggct gtgtgagcag gaccagtgca gagaggagga agagcagcat 660
ggcctggaga ggtgaacaga aagagaaaag acatgcttat gcttcatgga catggtttag 720
ggcttggctc agcttctaga ggtgacaaga agccccccatt ccctccttct gtcctctgct 780
atggggccta gagcagcagg aatccaaaag cagtttaagg acaaggaggg cacaaggtct 840
ggatggagag catgagttac ccagctggaa ctctgacata ggttgacagc agcatccccc 900
attcccaggt gctcatgtct tcccttcttg tgccttccct tgggcactaa gtttggcaca 960
gtggctagga tgtagcattc ctcactgggg ccatctgtca catcaagaag ggttcattga 1020
g 1021

<210> SEQ ID NO 124
<211> LENGTH: 1021
<212> TYPE: DNA
<213> ORGANISM: Homo sapiens
<220> FEATURE:
<221> NAME/KEY: misc_feature
<222> LOCATION: (553)..(553)
<223> OTHER INFORMATION: n can be c or t.

<400> SEQUENCE: 124
atggcacctg ccctttggca ccccaaggtg gagcccccag cgaccttccc cttccagctg 60
agcattgctg tgggggagag ggggaagacg ggaggaaaga agggagtggt tccatcacgc 120
ctcctcactc ctctcctccc gtcttctcct ctcctgccct tgtctccctg tctcagcagc 180
tccaggggtg gtgtgggccc ctccagcctc ctaggtggtg ccaggccaga gtccaagctc 240
agggacagca gtccctcctg tgggggcccc tgaactgggc tcacatccca cacattttcc 300
aaaccactcc cattgtgagc ctttggtcct ggtggtgtcc ctctggttgt gggaccaaga 360
gcttgtgccc atttttcatc tgaggaagga ggcagcagag gccacgggct ggtctgggtc 420

-continued

```
ccactcacct cccctctcac ctctcttctt cctgggacgc ctctgcctgc cagctctcac    480

ttccctcccc tgacccgcag ggtggctgcg tccttccagg gcctggcctg agggcagggg    540

tggtttgctc ccncttcagc ctccgggggc tggggtcagt gcggtgctaa cacggctctc    600

tctgtgctgt gggacttcca ggcaggcccg caagccgtgt gagccgtcgc agccgtggca    660

tcgttgagga gtgctgtttc cgcagctgtg acctggccct cctggagacg tactgtgcta    720

cccccgccaa gtccgagagg gacgtgtcga cccctccgac cgtgcttccg gtgagggtcc    780

tgggcccctt tcccactctc tagagacaga gaaatagggc ttcgggcgcc cagcgtttcc    840

tgtggcctct gggacctctt ggccagggac aaggacccgt gacttccttg cttgctgtgt    900

ggcccgggag cagctcagac gctggctcct tctgtccctc tgcccgtgga cattagctca    960

agtcactgat cagtcacagg ggtggcctgt caggtcaggc gggcggctca ggcggaagag   1020

c                                                                   1021
```

```
<210> SEQ ID NO 125
<211> LENGTH: 1021
<212> TYPE: DNA
<213> ORGANISM: Homo sapiens
<220> FEATURE:
<221> NAME/KEY: misc_feature
<222> LOCATION: (601)..(601)
<223> OTHER INFORMATION: n can be c or t.

<400> SEQUENCE: 125

gagctggccc gagctgaaga gttgttggag cagcagctgg agctgtacca ggccctcctt     60

gaagggcagg agggagcctg ggaggcccaa gccctggtgc tcaagatcca gaagctgaag    120

gaacagatga ggaggcacca agagagcctt ggaggaggtg cctaagtttc cccagtgcc    180

cacagcaccc tccggcactg aaaatacacg caccacccac caggagcctt gggatcataa    240

acaccccagc gtcttcccag gccagagaaa gtggaagaga ccacaaaccg caggcaattg    300

gcaggcagtg gggagccag ggctctgcag tcttagtccc attcccctt gatctcacag    360

caggcagggc acccaggcct tataggaatt caccctggac catgccctaa aataacctca    420

ccccaaatac aataaaggga cgaagcactt atagatacca cagacacatg tgtttcattt    480

ttagttttgt taaaaaaaaa ttctgacaaa tcagaaatgg gggttcagga gtggtggtga    540

tgcaaaagat ggaagccatg gggtgggggc tgtcaggggt gggggcagta gtgtctcctt    600

nacccccacc ctggtgtcct ctcctgaagg acagacggtc acattccaaa atgggcgagt    660

cttctaccgt gtctgttcaa ctgagaagaa aacgtagcat ggtcagaata aggcatgaaa    720

aggggaaagt gaggcaggaa cacacggcac acatgcagac actggtgtac tgcctgggtt    780

cagaggacgg acgtgggggt gagggaaggg atgtaatatg atgagagaag acagaaaccc    840

cacataaagg tcagaaaaac atcccaacac agcatcaaag accagggggc atgaaccagt    900

caagtgtcca ttatgcatca gatgcccatg acctatgtga tgggatttag gacaaacaca    960

ctaaggaaca gggaggacct aaagggtttc atgagatcag tactcactgt aggaggagat   1020

g                                                                   1021
```

```
<210> SEQ ID NO 126
<211> LENGTH: 1021
<212> TYPE: DNA
<213> ORGANISM: Homo sapiens
<220> FEATURE:
<221> NAME/KEY: misc_feature
<222> LOCATION: (564)..(564)
```

-continued

<223> OTHER INFORMATION: n can be c or a.

<400> SEQUENCE: 126

```
tttcaatcaa aagctggaag tccaccttac agaaagacaa aaagaaaccc ctttttatat     60
cttaacaaag caatagctct caagcagcag agcatctcga ggaagaaagc ttgcccggtc    120
gccatcccat catgccagag cgtgcagtgt ccacccttga ctacgctggg gaattgctga    180
ttttttgaaa aagcttaact taacaatttc tgatgtctat cttttagagt tctgtatgtt    240
cccatttttt attcttctga attttgaatt gcaagtagct gtaaaatcca atctttgagt    300
gcatgggggt gggtgtgagg cggggctcag cttcaacccc ctgtcctgta aagcagtggc    360
tggtttttcc tgagcccagc cctgggaggt cgtggtaggt gtggaggctg cagagctcct    420
ccagatgctg ccctcgctgt gcctcacacc agagaggatg gaagtgggct ctggtgtcag    480
actgtggttg agctgagaca gacaaggccg acacagggct gggggcccgt ggtccaccag    540
tggaagtgac tgccgaggaa gggnggtgag gagggcggtg tgggagctga ggcttctttt    600
cagcctggca gctggcgagg gccagggagc aggggaagag cctggtcacc atggtcccag    660
agcccgtctc acttggcttt tcctttgcag ctgaggagga tgagggccag agagggactg    720
tgtgtatgtc ctgcctgggg acccacagcc aggtgatagc agaggtggtt tgaagcccag    780
gcctcccacg ccaacccact ggtcttgctg tttcagcagg gaaggccggg agccctagga    840
gctggggaaa ggcgactgcc cgggtcctgg gtgactcccc acccccagat ccccagctgt    900
catcactggg gcaaggacac attaaactgg tccctgtggg tcaggtctga gtgggggagg    960
acctcccctc cccactgcct cccacagggg cttgtgatgc agggtttcag gaacagggct   1020
g                                                                   1021
```

<210> SEQ ID NO 127
<211> LENGTH: 1021
<212> TYPE: DNA
<213> ORGANISM: Homo sapiens
<220> FEATURE:
<221> NAME/KEY: misc_feature
<222> LOCATION: (607)..(607)
<223> OTHER INFORMATION: n can be c or t.

<400> SEQUENCE: 127

```
ttggtttttg ttgtattcaa ttctaattat ttattacaca gttaccatcc tttgatgaga     60
tgttactctt catctgtgat tgcttatagt tgttcgcgag cttctgtcca ttggtaatta    120
gaaagtttat ttatatcaag tttaatcttc ctgttaaaaa cagtgttcta atagtcatcc    180
atattaaaat attatatggc agtattaaaa actacaaata ttactcttgg gaatcaaatc    240
atacactgta gcacatcatc tttcttggca atagtactgc tgttgtacac tgatggcctc    300
taacagagaa gaaatcattc cattgaaaga aaagtaacta tcaagaacaa agttggaagt    360
gatgccttaa agctaccggc ccatgtctaa atgtactttt gatttttatt ttattggtta    420
agtagaaatt atttttaatg taatgacagc ccattaataa atgtctcctc tgttgaaggt    480
agggttaatt cagtatgcca ataatccaag agttgtgttt aacttgaaca catataaaac    540
caaagaagaa atgattgtag caacatccca gacatcccaa tatggtgggg acctcacaaa    600
cacattngga gcaattcaat atgcaaggta agttttggtg ctaataggcc aatgttttca    660
taatgtaaaa cattatattt atgtaataaa tatgaaaaag taaggaaaag acaaagaaaa    720
ataatatacc tggtacctaa tttaaatcag aactaataaa gaaaaaaaca tcagagcatt    780
ctatgtcttg aatactttga gaaggcagct gggaaagtta aatctttgat tttaggatat    840
```

-continued

```
ttataagata tcacatgata tttaaatgaa tttatgtgaa gtaaatgaaa tgagaagacc    900

ttagattaaa acagtaggaa atggggcaat ctgtcataat ttgttaatat tcatcagaga    960

ttcagacaaa ttgagctcat ggatcacttg gtgcaaatta acaaagacca cagaatctta   1020

a                                                                   1021
```

<210> SEQ ID NO 128
<211> LENGTH: 1021
<212> TYPE: DNA
<213> ORGANISM: Homo sapiens
<220> FEATURE:
<221> NAME/KEY: misc_feature
<222> LOCATION: (561)..(561)
<223> OTHER INFORMATION: n can be c or t.

<400> SEQUENCE: 128

```
tggatctgca gctccagaga agggcctggg tcagatgtca ctgaagccct atggtggcgg     60

aaaggcgaga aatagtgggt tgagattcca agtgcaatcc actgcggctc ctcgctcgcc    120

ctccaggtgg cagcacaacc ctgcgcttcc gaagcccgtt ttctgagcca gacactctcc    180

acgctctggg tatttcggct tctctctccc cacacgccga ccctaggtcg cgcactttct    240

gcctggcaga atttggccga ggatccaaac ccggagcagc ctccagagag cgtgtcgttc    300

acgcggccag catatgctca gagacctcag aggctcagag acctcagggc tggtggtgtg    360

gtcggttgtg accacttgtc cctcggaccg gctccaggaa ccaacctggg gaatgtgtgt    420

aggggaaggg cgggatagac agtgcccgga gcagggaggc gctgaaagac aggaccaagc    480

agcccggcca ccagacccgt tgtgggaacg gaatttcctg gcccccaggg ccacactcgc    540

gtgggaagca tgtcgcggac nctttaaggc gtcatctccc tgtctctccg cccccgcctg    600

ggacaggccg ggacgcccgg gacctgacat ttggaggctc ccaacgtggg agctaaaaat    660

agcagccccg ggttactttg gggcattgct cctctcccaa cccgcgcgcc ggctcgcgag    720

ccgtctcagg ccgctggagt ttccccgggg caagtacacc tggcccgtcc tctcctctca    780

gaccccactg tccagacccg cagagtttaa gatgcttctg cagcccggga tcctagctgg    840

tgggcggagt cctaacacgt gggtgggcgg ggccttttgt tccagggact cttttctcaa    900

aacttcccag tcggaggctg gcgggaaccc gagaggcgtg tctcgccagc cacgcggagg    960

ggcgtggcct cattggcccg ccccaccaac tccagccaaa ctctaaaccc caggcggagg   1020

g                                                                   1021
```

<210> SEQ ID NO 129
<211> LENGTH: 42
<212> TYPE: DNA
<213> ORGANISM: Artificial Sequence
<220> FEATURE:
<223> OTHER INFORMATION: Synthetic

<400> SEQUENCE: 129

```
cagttgttta tctttcgctc catcaaccaa gtcacaattg gt                        42
```

<210> SEQ ID NO 130
<211> LENGTH: 29
<212> TYPE: DNA
<213> ORGANISM: Artificial Sequence
<220> FEATURE:
<223> OTHER INFORMATION: Synthetic

<400> SEQUENCE: 130
cgcgccgagg agttgggagg gaatttctv 29

<210> SEQ ID NO 131
<211> LENGTH: 32
<212> TYPE: DNA
<213> ORGANISM: Artificial Sequence
<220> FEATURE:
<223> OTHER INFORMATION: Synthetic

<400> SEQUENCE: 131
atgacgtggc agacggttgg gagggaattt cv 32

<210> SEQ ID NO 132
<211> LENGTH: 25
<212> TYPE: DNA
<213> ORGANISM: Artificial Sequence
<220> FEATURE:
<223> OTHER INFORMATION: Synthetic

<400> SEQUENCE: 132
ggcaggcttc agtttggcca ggcca 25

<210> SEQ ID NO 133
<211> LENGTH: 30
<212> TYPE: DNA
<213> ORGANISM: Artificial Sequence
<220> FEATURE:
<223> OTHER INFORMATION: Synthetic

<400> SEQUENCE: 133
atgacgtggc agacctccat ggtggtgctv 30

<210> SEQ ID NO 134
<211> LENGTH: 26
<212> TYPE: DNA
<213> ORGANISM: Artificial Sequence
<220> FEATURE:
<223> OTHER INFORMATION: Synthetic

<400> SEQUENCE: 134
cgcgccgagg ttccatggtg gtgctv 26

<210> SEQ ID NO 135
<211> LENGTH: 30
<212> TYPE: DNA
<213> ORGANISM: Artificial Sequence
<220> FEATURE:
<223> OTHER INFORMATION: Synthetic

<400> SEQUENCE: 135
agcatagtcc caggaatgag gtcccccaat 30

<210> SEQ ID NO 136
<211> LENGTH: 36
<212> TYPE: DNA
<213> ORGANISM: Artificial Sequence
<220> FEATURE:
<223> OTHER INFORMATION: Synthetic

<400> SEQUENCE: 136
atgacgtggc agacgttgct aagttttaca tagggv 36

<210> SEQ ID NO 137
<211> LENGTH: 33
<212> TYPE: DNA
<213> ORGANISM: Artificial Sequence -continued
<220> FEATURE:
<223> OTHER INFORMATION: Synthetic

<400> SEQUENCE: 137
cgcgccgagg attgctaagt tttacatagg ggv 33

<210> SEQ ID NO 138
<211> LENGTH: 34
<212> TYPE: DNA
<213> ORGANISM: Artificial Sequence
<220> FEATURE:
<223> OTHER INFORMATION: Synthetic

<400> SEQUENCE: 138
ccaacacaga tggagattat ggcagacttg tttt 34

<210> SEQ ID NO 139
<211> LENGTH: 32
<212> TYPE: DNA
<213> ORGANISM: Artificial Sequence
<220> FEATURE:
<223> OTHER INFORMATION: Synthetic

<400> SEQUENCE: 139
atgacgtggc agacgttaga agagcagccc tv 32

<210> SEQ ID NO 140
<211> LENGTH: 28
<212> TYPE: DNA
<213> ORGANISM: Artificial Sequence
<220> FEATURE:
<223> OTHER INFORMATION: Synthetic

<400> SEQUENCE: 140
cgcgccgagg cttagaagag cagccctv 28

<210> SEQ ID NO 141
<211> LENGTH: 30
<212> TYPE: DNA
<213> ORGANISM: Artificial Sequence
<220> FEATURE:
<223> OTHER INFORMATION: Synthetic

<400> SEQUENCE: 141
gctgcaccgc ctcatcaatc ccaacttctc 30

<210> SEQ ID NO 142
<211> LENGTH: 26
<212> TYPE: DNA
<213> ORGANISM: Artificial Sequence
<220> FEATURE:
<223> OTHER INFORMATION: Synthetic

<400> SEQUENCE: 142
cgcgccgagg tcggctatca ggacgv 26

<210> SEQ ID NO 143
<211> LENGTH: 30
<212> TYPE: DNA
<213> ORGANISM: Artificial Sequence
<220> FEATURE:
<223> OTHER INFORMATION: Synthetic

<400> SEQUENCE: 143
atgacgtggc agacacggct atcaggacgv 30

<210> SEQ ID NO 144
<211> LENGTH: 32
<212> TYPE: DNA
<213> ORGANISM: Artificial Sequence
<220> FEATURE:
<223> OTHER INFORMATION: Synthetic

<400> SEQUENCE: 144
gcatgacagg aagacagggt gtgaggttgg at 32

<210> SEQ ID NO 145
<211> LENGTH: 27
<212> TYPE: DNA
<213> ORGANISM: Artificial Sequence
<220> FEATURE:
<223> OTHER INFORMATION: Synthetic

<400> SEQUENCE: 145
cgcgccgagg aggagagagg ctgtagv 27

<210> SEQ ID NO 146
<211> LENGTH: 31
<212> TYPE: DNA
<213> ORGANISM: Artificial Sequence
<220> FEATURE:
<223> OTHER INFORMATION: Synthetic

<400> SEQUENCE: 146
atgacgtggc agacgggaga gaggctgtag v 31

<210> SEQ ID NO 147
<211> LENGTH: 28
<212> TYPE: DNA
<213> ORGANISM: Artificial Sequence
<220> FEATURE:
<223> OTHER INFORMATION: Synthetic

<400> SEQUENCE: 147
actgctactg tctgtgctgt gctgggct 28

<210> SEQ ID NO 148
<211> LENGTH: 30
<212> TYPE: DNA
<213> ORGANISM: Artificial Sequence
<220> FEATURE:
<223> OTHER INFORMATION: Synthetic

<400> SEQUENCE: 148
atgacgtggc agacgcagag ctggacaccv 30

<210> SEQ ID NO 149
<211> LENGTH: 26
<212> TYPE: DNA
<213> ORGANISM: Artificial Sequence
<220> FEATURE:
<223> OTHER INFORMATION: Synthetic

<400> SEQUENCE: 149
cgcgccgagg acagagctgg acaccv 26

<210> SEQ ID NO 150
<211> LENGTH: 32
<212> TYPE: DNA
<213> ORGANISM: Artificial Sequence
<220> FEATURE:
<223> OTHER INFORMATION: Synthetic

<400> SEQUENCE: 150
ggtctctctg gacagcacac tgcaccaagt at 32

<210> SEQ ID NO 151
<211> LENGTH: 26
<212> TYPE: DNA
<213> ORGANISM: Artificial Sequence
<220> FEATURE:
<223> OTHER INFORMATION: Synthetic

<400> SEQUENCE: 151
cgcgccgagg agcccaccaa aaacgv 26

<210> SEQ ID NO 152
<211> LENGTH: 30
<212> TYPE: DNA
<213> ORGANISM: Artificial Sequence
<220> FEATURE:
<223> OTHER INFORMATION: Synthetic

<400> SEQUENCE: 152
atgacgtggc agacggccca ccaaaaacgv 30

<210> SEQ ID NO 153
<211> LENGTH: 42
<212> TYPE: DNA
<213> ORGANISM: Artificial Sequence
<220> FEATURE:
<223> OTHER INFORMATION: Synthetic

<400> SEQUENCE: 153
tcctatgccc aagttctctg atcatcctca aaagaagaca gt 42

<210> SEQ ID NO 154
<211> LENGTH: 27
<212> TYPE: DNA
<213> ORGANISM: Artificial Sequence
<220> FEATURE:
<223> OTHER INFORMATION: Synthetic

<400> SEQUENCE: 154
cgcgccgagg acttccatcc cagaggv 27

<210> SEQ ID NO 155
<211> LENGTH: 31
<212> TYPE: DNA
<213> ORGANISM: Artificial Sequence
<220> FEATURE:
<223> OTHER INFORMATION: Synthetic

<400> SEQUENCE: 155
atgacgtggc agacccttcc atcccagagg v 31

<210> SEQ ID NO 156
<211> LENGTH: 23
<212> TYPE: DNA
<213> ORGANISM: Artificial Sequence
<220> FEATURE:
<223> OTHER INFORMATION: Synthetic

<400> SEQUENCE: 156
ctgccrtgcc cttcctggcc cac 23

<210> SEQ ID NO 157

-continued

<211> LENGTH: 34
<212> TYPE: DNA
<213> ORGANISM: Artificial Sequence
<220> FEATURE:
<223> OTHER INFORMATION: Synthetic

<400> SEQUENCE: 157
cgcgccgagg tccctaaacc taaattcaaa tctv 34

<210> SEQ ID NO 158
<211> LENGTH: 37
<212> TYPE: DNA
<213> ORGANISM: Artificial Sequence
<220> FEATURE:
<223> OTHER INFORMATION: Synthetic

<400> SEQUENCE: 158
atgacgtggc agacgcccta aacctaaatt caaatcv 37

<210> SEQ ID NO 159
<211> LENGTH: 31
<212> TYPE: DNA
<213> ORGANISM: Artificial Sequence
<220> FEATURE:
<223> OTHER INFORMATION: Synthetic

<400> SEQUENCE: 159
gctgcagaga tgtgtcctcc cacagaggag t 31

<210> SEQ ID NO 160
<211> LENGTH: 32
<212> TYPE: DNA
<213> ORGANISM: Artificial Sequence
<220> FEATURE:
<223> OTHER INFORMATION: Synthetic

<400> SEQUENCE: 160
atgacgtggc agacctgaaa ccaccaagga gv 32

<210> SEQ ID NO 161
<211> LENGTH: 28
<212> TYPE: DNA
<213> ORGANISM: Artificial Sequence
<220> FEATURE:
<223> OTHER INFORMATION: Synthetic

<400> SEQUENCE: 161
cgcgccgagg atgaaaccac caaggagv 28

<210> SEQ ID NO 162
<211> LENGTH: 33
<212> TYPE: DNA
<213> ORGANISM: Artificial Sequence
<220> FEATURE:
<223> OTHER INFORMATION: Synthetic

<400> SEQUENCE: 162
gcctctggtt tctgtctact ccaacgtcca cgt 33

<210> SEQ ID NO 163
<211> LENGTH: 29
<212> TYPE: DNA
<213> ORGANISM: Artificial Sequence
<220> FEATURE:
<223> OTHER INFORMATION: Synthetic

<400> SEQUENCE: 163
cgcgccgagg cgcatagata caggcatcv 29

<210> SEQ ID NO 164
<211> LENGTH: 33
<212> TYPE: DNA
<213> ORGANISM: Artificial Sequence
<220> FEATURE:
<223> OTHER INFORMATION: Synthetic

<400> SEQUENCE: 164
atgacgtggc agacggcata gatacaggca tcv 33

<210> SEQ ID NO 165
<211> LENGTH: 26
<212> TYPE: DNA
<213> ORGANISM: Artificial Sequence
<220> FEATURE:
<223> OTHER INFORMATION: Synthetic

<400> SEQUENCE: 165
gtccgtgggg tttttgctgt gcggat 26

<210> SEQ ID NO 166
<211> LENGTH: 33
<212> TYPE: DNA
<213> ORGANISM: Artificial Sequence
<220> FEATURE:
<223> OTHER INFORMATION: Synthetic

<400> SEQUENCE: 166
atgacgtggc agacgtggaa agtacaaggc tcv 33

<210> SEQ ID NO 167
<211> LENGTH: 29
<212> TYPE: DNA
<213> ORGANISM: Artificial Sequence
<220> FEATURE:
<223> OTHER INFORMATION: Synthetic

<400> SEQUENCE: 167
cgcgccgagg ctggaaagta caaggctcv 29

<210> SEQ ID NO 168
<211> LENGTH: 28
<212> TYPE: DNA
<213> ORGANISM: Artificial Sequence
<220> FEATURE:
<223> OTHER INFORMATION: Synthetic

<400> SEQUENCE: 168
cagaaggctg cagcctcaca atgcaggt 28

<210> SEQ ID NO 169
<211> LENGTH: 25
<212> TYPE: DNA
<213> ORGANISM: Artificial Sequence
<220> FEATURE:
<223> OTHER INFORMATION: Synthetic

<400> SEQUENCE: 169
cgcgccgagg atgactgggt ccccv 25

<210> SEQ ID NO 170
<211> LENGTH: 29
<212> TYPE: DNA

-continued

<213> ORGANISM: Artificial Sequence
<220> FEATURE:
<223> OTHER INFORMATION: Synthetic

<400> SEQUENCE: 170
atgacgtggc agacgtgact gggtccccv 29

<210> SEQ ID NO 171
<211> LENGTH: 36
<212> TYPE: DNA
<213> ORGANISM: Artificial Sequence
<220> FEATURE:
<223> OTHER INFORMATION: Synthetic

<400> SEQUENCE: 171
cccaaatttg atccactgta accgtgcgta cacagt 36

<210> SEQ ID NO 172
<211> LENGTH: 31
<212> TYPE: DNA
<213> ORGANISM: Artificial Sequence
<220> FEATURE:
<223> OTHER INFORMATION: Synthetic

<400> SEQUENCE: 172
atgacgtggc agaccaccgt tgcaacaaca v 31

<210> SEQ ID NO 173
<211> LENGTH: 27
<212> TYPE: DNA
<213> ORGANISM: Artificial Sequence
<220> FEATURE:
<223> OTHER INFORMATION: Synthetic

<400> SEQUENCE: 173
cgcgccgagg aaccgttgca acaacav 27

<210> SEQ ID NO 174
<211> LENGTH: 37
<212> TYPE: DNA
<213> ORGANISM: Artificial Sequence
<220> FEATURE:
<223> OTHER INFORMATION: Synthetic

<400> SEQUENCE: 174
gagagttgct caaggtaaca cagtggtaag tgacggt 37

<210> SEQ ID NO 175
<211> LENGTH: 31
<212> TYPE: DNA
<213> ORGANISM: Artificial Sequence
<220> FEATURE:
<223> OTHER INFORMATION: Synthetic

<400> SEQUENCE: 175
atgacgtggc agacggccag gaactagact v 31

<210> SEQ ID NO 176
<211> LENGTH: 28
<212> TYPE: DNA
<213> ORGANISM: Artificial Sequence
<220> FEATURE:
<223> OTHER INFORMATION: Synthetic

<400> SEQUENCE: 176
cgcgccgagg agccaggaac tagactcv 28

<210> SEQ ID NO 177
<211> LENGTH: 30
<212> TYPE: DNA
<213> ORGANISM: Artificial Sequence
<220> FEATURE:
<223> OTHER INFORMATION: Synthetic

<400> SEQUENCE: 177
gcagtcagta gcagcagctt gagtggcaga 30

<210> SEQ ID NO 178
<211> LENGTH: 31
<212> TYPE: DNA
<213> ORGANISM: Artificial Sequence
<220> FEATURE:
<223> OTHER INFORMATION: Synthetic

<400> SEQUENCE: 178
atgacgtggc agaccggttc tcaaacctgg v 31

<210> SEQ ID NO 179
<211> LENGTH: 28
<212> TYPE: DNA
<213> ORGANISM: Artificial Sequence
<220> FEATURE:
<223> OTHER INFORMATION: Synthetic

<400> SEQUENCE: 179
cgcgccgagg tggttctcaa acctggav 28

<210> SEQ ID NO 180
<211> LENGTH: 30
<212> TYPE: DNA
<213> ORGANISM: Artificial Sequence
<220> FEATURE:
<223> OTHER INFORMATION: Synthetic

<400> SEQUENCE: 180
ccctctggaa ggatggctma tttgcacaca 30

<210> SEQ ID NO 181
<211> LENGTH: 32
<212> TYPE: DNA
<213> ORGANISM: Artificial Sequence
<220> FEATURE:
<223> OTHER INFORMATION: Synthetic

<400> SEQUENCE: 181
atgacgtggc agacctgagg ctttcctgat gv 32

<210> SEQ ID NO 182
<211> LENGTH: 29
<212> TYPE: DNA
<213> ORGANISM: Artificial Sequence
<220> FEATURE:
<223> OTHER INFORMATION: Synthetic

<400> SEQUENCE: 182
cgcgccgagg ttgaggcttt cctgatgav 29

<210> SEQ ID NO 183
<211> LENGTH: 24
<212> TYPE: DNA
<213> ORGANISM: Artificial Sequence
<220> FEATURE:

-continued

<223> OTHER INFORMATION: Synthetic

<400> SEQUENCE: 183
gcgaggccga gcccctccta gtgt 24

<210> SEQ ID NO 184
<211> LENGTH: 30
<212> TYPE: DNA
<213> ORGANISM: Artificial Sequence
<220> FEATURE:
<223> OTHER INFORMATION: Synthetic

<400> SEQUENCE: 184
atgacgtggc agacgttccg gaccttgctv 30

<210> SEQ ID NO 185
<211> LENGTH: 26
<212> TYPE: DNA
<213> ORGANISM: Artificial Sequence
<220> FEATURE:
<223> OTHER INFORMATION: Synthetic

<400> SEQUENCE: 185
cgcgccgagg cttccggacc ttgctv 26

<210> SEQ ID NO 186
<211> LENGTH: 39
<212> TYPE: DNA
<213> ORGANISM: Artificial Sequence
<220> FEATURE:
<223> OTHER INFORMATION: Synthetic

<400> SEQUENCE: 186
acaaaccttt tagtttactc tgcagttaat cccactgat 39

<210> SEQ ID NO 187
<211> LENGTH: 31
<212> TYPE: DNA
<213> ORGANISM: Artificial Sequence
<220> FEATURE:
<223> OTHER INFORMATION: Synthetic

<400> SEQUENCE: 187
atgacgtggc agacgaagta gtgggctcca v 31

<210> SEQ ID NO 188
<211> LENGTH: 28
<212> TYPE: DNA
<213> ORGANISM: Artificial Sequence
<220> FEATURE:
<223> OTHER INFORMATION: Synthetic

<400> SEQUENCE: 188
cgcgccgagg aaagtagtgg gctccaav 28

<210> SEQ ID NO 189
<211> LENGTH: 30
<212> TYPE: DNA
<213> ORGANISM: Artificial Sequence
<220> FEATURE:
<223> OTHER INFORMATION: Synthetic

<400> SEQUENCE: 189
tgtatgttgg cctcctttgc tgccctcact 30

<210> SEQ ID NO 190
<211> LENGTH: 33
<212> TYPE: DNA
<213> ORGANISM: Artificial Sequence
<220> FEATURE:
<223> OTHER INFORMATION: Synthetic

<400> SEQUENCE: 190
atgacgtggc agacgatctc ttcctgtgac acv 33

<210> SEQ ID NO 191
<211> LENGTH: 29
<212> TYPE: DNA
<213> ORGANISM: Artificial Sequence
<220> FEATURE:
<223> OTHER INFORMATION: Synthetic

<400> SEQUENCE: 191
cgcgccgagg aatctcttcc tgtgacacv 29

<210> SEQ ID NO 192
<211> LENGTH: 23
<212> TYPE: DNA
<213> ORGANISM: Artificial Sequence
<220> FEATURE:
<223> OTHER INFORMATION: Synthetic

<400> SEQUENCE: 192
gcccagagcg ggagacagcg aca 23

<210> SEQ ID NO 193
<211> LENGTH: 34
<212> TYPE: DNA
<213> ORGANISM: Artificial Sequence
<220> FEATURE:
<223> OTHER INFORMATION: Synthetic

<400> SEQUENCE: 193
atgacgtggc agaccgactt ggatatcagg tacv 34

<210> SEQ ID NO 194
<211> LENGTH: 31
<212> TYPE: DNA
<213> ORGANISM: Artificial Sequence
<220> FEATURE:
<223> OTHER INFORMATION: Synthetic

<400> SEQUENCE: 194
cgcgccgagg tgacttggat atcaggtact v 31

<210> SEQ ID NO 195
<211> LENGTH: 23
<212> TYPE: DNA
<213> ORGANISM: Artificial Sequence
<220> FEATURE:
<223> OTHER INFORMATION: Synthetic

<400> SEQUENCE: 195
tcgtggtccg gcgcatggct tca 23

<210> SEQ ID NO 196
<211> LENGTH: 26
<212> TYPE: DNA
<213> ORGANISM: Artificial Sequence
<220> FEATURE:
<223> OTHER INFORMATION: Synthetic

<400> SEQUENCE: 196
cgcgccgagg tattgggtgc cagcav 26

<210> SEQ ID NO 197
<211> LENGTH: 29
<212> TYPE: DNA
<213> ORGANISM: Artificial Sequence
<220> FEATURE:
<223> OTHER INFORMATION: Synthetic

<400> SEQUENCE: 197
atgacgtggc agaccattgg gtgccagcv 29

<210> SEQ ID NO 198
<211> LENGTH: 38
<212> TYPE: DNA
<213> ORGANISM: Artificial Sequence
<220> FEATURE:
<223> OTHER INFORMATION: Synthetic

<400> SEQUENCE: 198
gtgatcattc tgatggtgtg gattgtgtca ggccttaa 38

<210> SEQ ID NO 199
<211> LENGTH: 30
<212> TYPE: DNA
<213> ORGANISM: Artificial Sequence
<220> FEATURE:
<223> OTHER INFORMATION: Synthetic

<400> SEQUENCE: 199
atgacgtggc agaccctcct tcttgcccav 30

<210> SEQ ID NO 200
<211> LENGTH: 28
<212> TYPE: DNA
<213> ORGANISM: Artificial Sequence
<220> FEATURE:
<223> OTHER INFORMATION: Synthetic

<400> SEQUENCE: 200
cgcgccgagg tctccttctt gcccattv 28

<210> SEQ ID NO 201
<211> LENGTH: 28
<212> TYPE: DNA
<213> ORGANISM: Artificial Sequence
<220> FEATURE:
<223> OTHER INFORMATION: Synthetic

<400> SEQUENCE: 201
agcgacacct tcacgttgtc ctggacct 28

<210> SEQ ID NO 202
<211> LENGTH: 30
<212> TYPE: DNA
<213> ORGANISM: Artificial Sequence
<220> FEATURE:
<223> OTHER INFORMATION: Synthetic

<400> SEQUENCE: 202
atgacgtggc agacgccgtc tggttgttcv 30

<210> SEQ ID NO 203
<211> LENGTH: 27

<212> TYPE: DNA
<213> ORGANISM: Artificial Sequence
<220> FEATURE:
<223> OTHER INFORMATION: Synthetic

<400> SEQUENCE: 203
cgcgccgagg accgtctggt tgttccv 27

<210> SEQ ID NO 204
<211> LENGTH: 24
<212> TYPE: DNA
<213> ORGANISM: Artificial Sequence
<220> FEATURE:
<223> OTHER INFORMATION: Synthetic

<400> SEQUENCE: 204
gcggagccaa aggaccgagc aggc 24

<210> SEQ ID NO 205
<211> LENGTH: 28
<212> TYPE: DNA
<213> ORGANISM: Artificial Sequence
<220> FEATURE:
<223> OTHER INFORMATION: Synthetic

<400> SEQUENCE: 205
cgcgccgagg tttaatccca cagccagv 28

<210> SEQ ID NO 206
<211> LENGTH: 32
<212> TYPE: DNA
<213> ORGANISM: Artificial Sequence
<220> FEATURE:
<223> OTHER INFORMATION: Synthetic

<400> SEQUENCE: 206
atgacgtggc agacgttaat cccacagcca gv 32

<210> SEQ ID NO 207
<211> LENGTH: 28
<212> TYPE: DNA
<213> ORGANISM: Artificial Sequence
<220> FEATURE:
<223> OTHER INFORMATION: Synthetic

<400> SEQUENCE: 207
gcgtgtcctc cagggtgaac atgtccct 28

<210> SEQ ID NO 208
<211> LENGTH: 30
<212> TYPE: DNA
<213> ORGANISM: Artificial Sequence
<220> FEATURE:
<223> OTHER INFORMATION: Synthetic

<400> SEQUENCE: 208
atgacgtggc agacgctgga cctgtgtgav 30

<210> SEQ ID NO 209
<211> LENGTH: 27
<212> TYPE: DNA
<213> ORGANISM: Artificial Sequence
<220> FEATURE:
<223> OTHER INFORMATION: Synthetic

<400> SEQUENCE: 209

-continued cgcgccgagg actggacctg tgtgaav 27

<210> SEQ ID NO 210
<211> LENGTH: 30
<212> TYPE: DNA
<213> ORGANISM: Artificial Sequence
<220> FEATURE:
<223> OTHER INFORMATION: Synthetic

<400> SEQUENCE: 210
gcatttgatt gcagagcagc tccgagtcct 30

<210> SEQ ID NO 211
<211> LENGTH: 27
<212> TYPE: DNA
<213> ORGANISM: Artificial Sequence
<220> FEATURE:
<223> OTHER INFORMATION: Synthetic

<400> SEQUENCE: 211
cgcgccgagg atccagagct tcctgcv 27

<210> SEQ ID NO 212
<211> LENGTH: 31
<212> TYPE: DNA
<213> ORGANISM: Artificial Sequence
<220> FEATURE:
<223> OTHER INFORMATION: Synthetic

<400> SEQUENCE: 212
atgacgtggc agacgtccag agcttcctgc v 31

<210> SEQ ID NO 213
<211> LENGTH: 27
<212> TYPE: DNA
<213> ORGANISM: Artificial Sequence
<220> FEATURE:
<223> OTHER INFORMATION: Synthetic

<400> SEQUENCE: 213
gaacagcttc accacggcgg tcatgtt 27

<210> SEQ ID NO 214
<211> LENGTH: 30
<212> TYPE: DNA
<213> ORGANISM: Artificial Sequence
<220> FEATURE:
<223> OTHER INFORMATION: Synthetic

<400> SEQUENCE: 214
atgacgtggc agacgcttct gtcccctggv 30

<210> SEQ ID NO 215
<211> LENGTH: 26
<212> TYPE: DNA
<213> ORGANISM: Artificial Sequence
<220> FEATURE:
<223> OTHER INFORMATION: Synthetic

<400> SEQUENCE: 215
cgcgccgagg acttctgtcc cctggv 26

<210> SEQ ID NO 216
<211> LENGTH: 34
<212> TYPE: DNA
<213> ORGANISM: Artificial Sequence -continued
<220> FEATURE:
<223> OTHER INFORMATION: Synthetic

<400> SEQUENCE: 216
aacccatagt taagaacgtg gggtgaggta ccgc 34

<210> SEQ ID NO 217
<211> LENGTH: 25
<212> TYPE: DNA
<213> ORGANISM: Artificial Sequence
<220> FEATURE:
<223> OTHER INFORMATION: Synthetic

<400> SEQUENCE: 217
cgcgccgagg tcctgccctt tggcv 25

<210> SEQ ID NO 218
<211> LENGTH: 29
<212> TYPE: DNA
<213> ORGANISM: Artificial Sequence
<220> FEATURE:
<223> OTHER INFORMATION: Synthetic

<400> SEQUENCE: 218
atgacgtggc agacacctgc cctttggcv 29

<210> SEQ ID NO 219
<211> LENGTH: 35
<212> TYPE: DNA
<213> ORGANISM: Artificial Sequence
<220> FEATURE:
<223> OTHER INFORMATION: Synthetic

<400> SEQUENCE: 219
gctggagtgt gcccaatgct atatgtcagt tgagt 35

<210> SEQ ID NO 220
<211> LENGTH: 34
<212> TYPE: DNA
<213> ORGANISM: Artificial Sequence
<220> FEATURE:
<223> OTHER INFORMATION: Synthetic

<400> SEQUENCE: 220
atgacgtggc agacgttcta agacttggaa gccv 34

<210> SEQ ID NO 221
<211> LENGTH: 30
<212> TYPE: DNA
<213> ORGANISM: Artificial Sequence
<220> FEATURE:
<223> OTHER INFORMATION: Synthetic

<400> SEQUENCE: 221
cgcgccgagg attctaagac ttggaagccv 30

<210> SEQ ID NO 222
<211> LENGTH: 45
<212> TYPE: DNA
<213> ORGANISM: Artificial Sequence
<220> FEATURE:
<223> OTHER INFORMATION: Synthetic

<400> SEQUENCE: 222
gggaacaatc accttttctc tttgcctttc atactgcttt agact 45

-continued

<210> SEQ ID NO 223
<211> LENGTH: 28
<212> TYPE: DNA
<213> ORGANISM: Artificial Sequence
<220> FEATURE:
<223> OTHER INFORMATION: Synthetic

<400> SEQUENCE: 223
cgcgccgagg acctcactgc ttcctaav 28

<210> SEQ ID NO 224
<211> LENGTH: 32
<212> TYPE: DNA
<213> ORGANISM: Artificial Sequence
<220> FEATURE:
<223> OTHER INFORMATION: Synthetic

<400> SEQUENCE: 224
atgacgtggc agacccctca ctgcttccta av 32

<210> SEQ ID NO 225
<211> LENGTH: 39
<212> TYPE: DNA
<213> ORGANISM: Artificial Sequence
<220> FEATURE:
<223> OTHER INFORMATION: Synthetic

<400> SEQUENCE: 225
tttgttccgg acatcatgtg tatcccaacc taccaaaat 39

<210> SEQ ID NO 226
<211> LENGTH: 30
<212> TYPE: DNA
<213> ORGANISM: Artificial Sequence
<220> FEATURE:
<223> OTHER INFORMATION: Synthetic

<400> SEQUENCE: 226
cgcgccgagg aagtcctttc caggtaaggv 30

<210> SEQ ID NO 227
<211> LENGTH: 33
<212> TYPE: DNA
<213> ORGANISM: Artificial Sequence
<220> FEATURE:
<223> OTHER INFORMATION: Synthetic

<400> SEQUENCE: 227
atgacgtggc agacgagtcc tttccaggta agv 33

<210> SEQ ID NO 228
<211> LENGTH: 40
<212> TYPE: DNA
<213> ORGANISM: Artificial Sequence
<220> FEATURE:
<223> OTHER INFORMATION: Synthetic

<400> SEQUENCE: 228
tttgtgcagt ggttgatgaa taccaacagg aacaggtaat 40

<210> SEQ ID NO 229
<211> LENGTH: 27
<212> TYPE: DNA
<213> ORGANISM: Artificial Sequence
<220> FEATURE:
<223> OTHER INFORMATION: Synthetic

<400> SEQUENCE: 229
cgcgccgagg aagtctaagc ctggctv 27

<210> SEQ ID NO 230
<211> LENGTH: 31
<212> TYPE: DNA
<213> ORGANISM: Artificial Sequence
<220> FEATURE:
<223> OTHER INFORMATION: Synthetic

<400> SEQUENCE: 230
atgacgtggc agacgagtct aagcctggct v 31

<210> SEQ ID NO 231
<211> LENGTH: 30
<212> TYPE: DNA
<213> ORGANISM: Artificial Sequence
<220> FEATURE:
<223> OTHER INFORMATION: Synthetic

<400> SEQUENCE: 231
caggctcagg ttgtggtgac actggtcaca 30

<210> SEQ ID NO 232
<211> LENGTH: 29
<212> TYPE: DNA
<213> ORGANISM: Artificial Sequence
<220> FEATURE:
<223> OTHER INFORMATION: Synthetic

<400> SEQUENCE: 232
cgcgccgagg tgtagagctt ccacttctv 29

<210> SEQ ID NO 233
<211> LENGTH: 33
<212> TYPE: DNA
<213> ORGANISM: Artificial Sequence
<220> FEATURE:
<223> OTHER INFORMATION: Synthetic

<400> SEQUENCE: 233
atgacgtggc agaccgtaga gcttccactt ctv 33

<210> SEQ ID NO 234
<211> LENGTH: 27
<212> TYPE: DNA
<213> ORGANISM: Artificial Sequence
<220> FEATURE:
<223> OTHER INFORMATION: Synthetic

<400> SEQUENCE: 234
tggccctgtg actatggctc tggcaca 27

<210> SEQ ID NO 235
<211> LENGTH: 30
<212> TYPE: DNA
<213> ORGANISM: Artificial Sequence
<220> FEATURE:
<223> OTHER INFORMATION: Synthetic

<400> SEQUENCE: 235
atgacgtggc agaccactag ggtcctggcv 30

<210> SEQ ID NO 236

-continued

<211> LENGTH: 27
<212> TYPE: DNA
<213> ORGANISM: Artificial Sequence
<220> FEATURE:
<223> OTHER INFORMATION: Synthetic

<400> SEQUENCE: 236
cgcgccgagg tactagggtc ctggccv 27

<210> SEQ ID NO 237
<211> LENGTH: 28
<212> TYPE: DNA
<213> ORGANISM: Artificial Sequence
<220> FEATURE:
<223> OTHER INFORMATION: Synthetic

<400> SEQUENCE: 237
cccatcctga ccaccatccg ccgaatct 28

<210> SEQ ID NO 238
<211> LENGTH: 29
<212> TYPE: DNA
<213> ORGANISM: Artificial Sequence
<220> FEATURE:
<223> OTHER INFORMATION: Synthetic

<400> SEQUENCE: 238
cgcgccgagg agcctcttca atagcagtv 29

<210> SEQ ID NO 239
<211> LENGTH: 32
<212> TYPE: DNA
<213> ORGANISM: Artificial Sequence
<220> FEATURE:
<223> OTHER INFORMATION: Synthetic

<400> SEQUENCE: 239
atgacgtggc agacggcctc ttcaatagca gv 32

<210> SEQ ID NO 240
<211> LENGTH: 32
<212> TYPE: DNA
<213> ORGANISM: Artificial Sequence
<220> FEATURE:
<223> OTHER INFORMATION: Synthetic

<400> SEQUENCE: 240
ggagtcaaga cccagatgtc ccctgacttg tt 32

<210> SEQ ID NO 241
<211> LENGTH: 33
<212> TYPE: DNA
<213> ORGANISM: Artificial Sequence
<220> FEATURE:
<223> OTHER INFORMATION: Synthetic

<400> SEQUENCE: 241
atgacgtggc agacgtcaca caaggagtct tcv 33

<210> SEQ ID NO 242
<211> LENGTH: 30
<212> TYPE: DNA
<213> ORGANISM: Artificial Sequence
<220> FEATURE:
<223> OTHER INFORMATION: Synthetic

<400> SEQUENCE: 242
cgcgccgagg atcacacaag gagtcttcav 30

<210> SEQ ID NO 243
<211> LENGTH: 41
<212> TYPE: DNA
<213> ORGANISM: Artificial Sequence
<220> FEATURE:
<223> OTHER INFORMATION: Synthetic

<400> SEQUENCE: 243
cgactgtcca gttaaatgca tcagaagtgt tagcttctcc t 41

<210> SEQ ID NO 244
<211> LENGTH: 38
<212> TYPE: DNA
<213> ORGANISM: Artificial Sequence
<220> FEATURE:
<223> OTHER INFORMATION: Synthetic

<400> SEQUENCE: 244
atgacgtggc agacggagtt aaagtcatta ctgtagav 38

<210> SEQ ID NO 245
<211> LENGTH: 35
<212> TYPE: DNA
<213> ORGANISM: Artificial Sequence
<220> FEATURE:
<223> OTHER INFORMATION: Synthetic

<400> SEQUENCE: 245
cgcgccgagg agagttaaag tcattactgt agagv 35

<210> SEQ ID NO 246
<211> LENGTH: 25
<212> TYPE: DNA
<213> ORGANISM: Artificial Sequence
<220> FEATURE:
<223> OTHER INFORMATION: Synthetic

<400> SEQUENCE: 246
gagacacctc ccactcgtcc ggcaa 25

<210> SEQ ID NO 247
<211> LENGTH: 28
<212> TYPE: DNA
<213> ORGANISM: Artificial Sequence
<220> FEATURE:
<223> OTHER INFORMATION: Synthetic

<400> SEQUENCE: 247
cgcgccgagg tgtacacaga gcatggav 28

<210> SEQ ID NO 248
<211> LENGTH: 31
<212> TYPE: DNA
<213> ORGANISM: Artificial Sequence
<220> FEATURE:
<223> OTHER INFORMATION: Synthetic

<400> SEQUENCE: 248
atgacgtggc agaccgtaca cagagcatgg v 31

<210> SEQ ID NO 249
<211> LENGTH: 30
<212> TYPE: DNA

<213> ORGANISM: Artificial Sequence
<220> FEATURE:
<223> OTHER INFORMATION: Synthetic

<400> SEQUENCE: 249
ccaaggctga tgacattgtt ggccctgtgt 30

<210> SEQ ID NO 250
<211> LENGTH: 30
<212> TYPE: DNA
<213> ORGANISM: Artificial Sequence
<220> FEATURE:
<223> OTHER INFORMATION: Synthetic

<400> SEQUENCE: 250
cgcgccgagg acgcatgaaa tctttgagav 30

<210> SEQ ID NO 251
<211> LENGTH: 33
<212> TYPE: DNA
<213> ORGANISM: Artificial Sequence
<220> FEATURE:
<223> OTHER INFORMATION: Synthetic

<400> SEQUENCE: 251
atgacgtggc agacgcgcat gaaatctttg agv 33

<210> SEQ ID NO 252
<211> LENGTH: 37
<212> TYPE: DNA
<213> ORGANISM: Artificial Sequence
<220> FEATURE:
<223> OTHER INFORMATION: Synthetic

<400> SEQUENCE: 252
cactcccaaa ttcaatattg acatattccc ccgggca 37

<210> SEQ ID NO 253
<211> LENGTH: 26
<212> TYPE: DNA
<213> ORGANISM: Artificial Sequence
<220> FEATURE:
<223> OTHER INFORMATION: Synthetic

<400> SEQUENCE: 253
cgcgccgagg tcttgggctc tggagv 26

<210> SEQ ID NO 254
<211> LENGTH: 30
<212> TYPE: DNA
<213> ORGANISM: Artificial Sequence
<220> FEATURE:
<223> OTHER INFORMATION: Synthetic

<400> SEQUENCE: 254
atgacgtggc agacccttgg gctctggagv 30

<210> SEQ ID NO 255
<211> LENGTH: 22
<212> TYPE: DNA
<213> ORGANISM: Artificial Sequence
<220> FEATURE:
<223> OTHER INFORMATION: Synthetic

<400> SEQUENCE: 255
cgcctggcag aggaccctgc ct 22

<210> SEQ ID NO 256
<211> LENGTH: 25
<212> TYPE: DNA
<213> ORGANISM: Artificial Sequence
<220> FEATURE:
<223> OTHER INFORMATION: Synthetic

<400> SEQUENCE: 256
cgcgccgagg aagcccaggt accgv 25

<210> SEQ ID NO 257
<211> LENGTH: 29
<212> TYPE: DNA
<213> ORGANISM: Artificial Sequence
<220> FEATURE:
<223> OTHER INFORMATION: Synthetic

<400> SEQUENCE: 257
atgacgtggc agacgagccc aggtaccgv 29

<210> SEQ ID NO 258
<211> LENGTH: 28
<212> TYPE: DNA
<213> ORGANISM: Artificial Sequence
<220> FEATURE:
<223> OTHER INFORMATION: Synthetic

<400> SEQUENCE: 258
ccgtgcagag tggtgtgggc actttgaa 28

<210> SEQ ID NO 259
<211> LENGTH: 28
<212> TYPE: DNA
<213> ORGANISM: Artificial Sequence
<220> FEATURE:
<223> OTHER INFORMATION: Synthetic

<400> SEQUENCE: 259
cgcgccgagg tggtgttgcc aaacttgv 28

<210> SEQ ID NO 260
<211> LENGTH: 31
<212> TYPE: DNA
<213> ORGANISM: Artificial Sequence
<220> FEATURE:
<223> OTHER INFORMATION: Synthetic

<400> SEQUENCE: 260
atgacgtggc agaccggtgt tgccaaactt v 31

<210> SEQ ID NO 261
<211> LENGTH: 43
<212> TYPE: DNA
<213> ORGANISM: Artificial Sequence
<220> FEATURE:
<223> OTHER INFORMATION: Synthetic

<400> SEQUENCE: 261
ggttctcccg agaggtaaag aacaaagact tcaaagacac ttc 43

<210> SEQ ID NO 262
<211> LENGTH: 28
<212> TYPE: DNA
<213> ORGANISM: Artificial Sequence
<220> FEATURE:

<223> OTHER INFORMATION: Synthetic

<400> SEQUENCE: 262
cgcgccgagg tcttcactgg tcagctcv 28

<210> SEQ ID NO 263
<211> LENGTH: 30
<212> TYPE: DNA
<213> ORGANISM: Artificial Sequence
<220> FEATURE:
<223> OTHER INFORMATION: Synthetic

<400> SEQUENCE: 263
atgacgtggc agacgcttca ctggtcagcv 30

<210> SEQ ID NO 264
<211> LENGTH: 43
<212> TYPE: DNA
<213> ORGANISM: Artificial Sequence
<220> FEATURE:
<223> OTHER INFORMATION: Synthetic

<400> SEQUENCE: 264
tgttgaacag tcttcaaggt gggatcgtaa taatggcaaa agt 43

<210> SEQ ID NO 265
<211> LENGTH: 29
<212> TYPE: DNA
<213> ORGANISM: Artificial Sequence
<220> FEATURE:
<223> OTHER INFORMATION: Synthetic

<400> SEQUENCE: 265
cgcgccgagg acctcaccaa gaatttggv 29

<210> SEQ ID NO 266
<211> LENGTH: 33
<212> TYPE: DNA
<213> ORGANISM: Artificial Sequence
<220> FEATURE:
<223> OTHER INFORMATION: Synthetic

<400> SEQUENCE: 266
atgacgtggc agacgcctca ccaagaattt ggv 33

<210> SEQ ID NO 267
<211> LENGTH: 53
<212> TYPE: DNA
<213> ORGANISM: Artificial Sequence
<220> FEATURE:
<223> OTHER INFORMATION: Synthetic

<400> SEQUENCE: 267
cagcaatttc ctcaaaagac tttcctttgg tttctggaac tttaaaaaat gtt 53

<210> SEQ ID NO 268
<211> LENGTH: 31
<212> TYPE: DNA
<213> ORGANISM: Artificial Sequence
<220> FEATURE:
<223> OTHER INFORMATION: Synthetic

<400> SEQUENCE: 268
atgacgtggc agacgaacag ggtaaaggcc v 31

-continued

<210> SEQ ID NO 269
<211> LENGTH: 28
<212> TYPE: DNA
<213> ORGANISM: Artificial Sequence
<220> FEATURE:
<223> OTHER INFORMATION: Synthetic

<400> SEQUENCE: 269
cgcgccgagg aaacagggta aaggccav 28

<210> SEQ ID NO 270
<211> LENGTH: 26
<212> TYPE: DNA
<213> ORGANISM: Artificial Sequence
<220> FEATURE:
<223> OTHER INFORMATION: Synthetic

<400> SEQUENCE: 270
ggcccagaag acccccctcg gaatct 26

<210> SEQ ID NO 271
<211> LENGTH: 26
<212> TYPE: DNA
<213> ORGANISM: Artificial Sequence
<220> FEATURE:
<223> OTHER INFORMATION: Synthetic

<400> SEQUENCE: 271
cgcgccgagg agagcaggga ggatgv 26

<210> SEQ ID NO 272
<211> LENGTH: 30
<212> TYPE: DNA
<213> ORGANISM: Artificial Sequence
<220> FEATURE:
<223> OTHER INFORMATION: Synthetic

<400> SEQUENCE: 272
atgacgtggc agacggagca gggaggatgv 30

<210> SEQ ID NO 273
<211> LENGTH: 29
<212> TYPE: DNA
<213> ORGANISM: Artificial Sequence
<220> FEATURE:
<223> OTHER INFORMATION: Synthetic

<400> SEQUENCE: 273
ctccatccgc atcggcctct atgactcct 29

<210> SEQ ID NO 274
<211> LENGTH: 28
<212> TYPE: DNA
<213> ORGANISM: Artificial Sequence
<220> FEATURE:
<223> OTHER INFORMATION: Synthetic

<400> SEQUENCE: 274
cgcgccgagg atcaagcagg tgtacacv 28

<210> SEQ ID NO 275
<211> LENGTH: 32
<212> TYPE: DNA
<213> ORGANISM: Artificial Sequence
<220> FEATURE:
<223> OTHER INFORMATION: Synthetic

<400> SEQUENCE: 275
atgacgtggc agacgtcaag caggtgtaca cv 32

<210> SEQ ID NO 276
<211> LENGTH: 29
<212> TYPE: DNA
<213> ORGANISM: Artificial Sequence
<220> FEATURE:
<223> OTHER INFORMATION: Synthetic

<400> SEQUENCE: 276
ggacactggt cggcaatcct cagcacagt 29

<210> SEQ ID NO 277
<211> LENGTH: 29
<212> TYPE: DNA
<213> ORGANISM: Artificial Sequence
<220> FEATURE:
<223> OTHER INFORMATION: Synthetic

<400> SEQUENCE: 277
atgacgtggc agacgacgcc acttcccav 29

<210> SEQ ID NO 278
<211> LENGTH: 25
<212> TYPE: DNA
<213> ORGANISM: Artificial Sequence
<220> FEATURE:
<223> OTHER INFORMATION: Synthetic

<400> SEQUENCE: 278
cgcgccgagg cacgccactt cccav 25

<210> SEQ ID NO 279
<211> LENGTH: 25
<212> TYPE: DNA
<213> ORGANISM: Artificial Sequence
<220> FEATURE:
<223> OTHER INFORMATION: Synthetic

<400> SEQUENCE: 279
caccaggctg ccttggccac agaaa 25

<210> SEQ ID NO 280
<211> LENGTH: 31
<212> TYPE: DNA
<213> ORGANISM: Artificial Sequence
<220> FEATURE:
<223> OTHER INFORMATION: Synthetic

<400> SEQUENCE: 280
cgcgccgagg tacttactga aatgcccttg v 31

<210> SEQ ID NO 281
<211> LENGTH: 34
<212> TYPE: DNA
<213> ORGANISM: Artificial Sequence
<220> FEATURE:
<223> OTHER INFORMATION: Synthetic

<400> SEQUENCE: 281
atgacgtggc agaccactta ctgaaatgcc cttv 34

<210> SEQ ID NO 282
<211> LENGTH: 23

<212> TYPE: DNA
<213> ORGANISM: Artificial Sequence
<220> FEATURE:
<223> OTHER INFORMATION: Synthetic

<400> SEQUENCE: 282
gcctctgacc ccatggcagg ggt 23

<210> SEQ ID NO 283
<211> LENGTH: 29
<212> TYPE: DNA
<213> ORGANISM: Artificial Sequence
<220> FEATURE:
<223> OTHER INFORMATION: Synthetic

<400> SEQUENCE: 283
cgcgccgagg acagagtatt tgagcagcv 29

<210> SEQ ID NO 284
<211> LENGTH: 33
<212> TYPE: DNA
<213> ORGANISM: Artificial Sequence
<220> FEATURE:
<223> OTHER INFORMATION: Synthetic

<400> SEQUENCE: 284
atgacgtggc agacgcagag tatttgagca gcv 33

<210> SEQ ID NO 285
<211> LENGTH: 20
<212> TYPE: DNA
<213> ORGANISM: Artificial Sequence
<220> FEATURE:
<223> OTHER INFORMATION: Synthetic

<400> SEQUENCE: 285
gctggggccc cactgcccat 20

<210> SEQ ID NO 286
<211> LENGTH: 28
<212> TYPE: DNA
<213> ORGANISM: Artificial Sequence
<220> FEATURE:
<223> OTHER INFORMATION: Synthetic

<400> SEQUENCE: 286
cgcgccgagg atgtcacctt ggatggcv 28

<210> SEQ ID NO 287
<211> LENGTH: 31
<212> TYPE: DNA
<213> ORGANISM: Artificial Sequence
<220> FEATURE:
<223> OTHER INFORMATION: Synthetic

<400> SEQUENCE: 287
atgacgtggc agacgtgtca ccttggatgg v 31

<210> SEQ ID NO 288
<211> LENGTH: 35
<212> TYPE: DNA
<213> ORGANISM: Artificial Sequence
<220> FEATURE:
<223> OTHER INFORMATION: Synthetic

<400> SEQUENCE: 288

-continued gttcatcttt ggttttgtgg gcaacatgct ggtct 35

<210> SEQ ID NO 289
<211> LENGTH: 33
<212> TYPE: DNA
<213> ORGANISM: Artificial Sequence
<220> FEATURE:
<223> OTHER INFORMATION: Synthetic

<400> SEQUENCE: 289
cgcgccgagg atcctcatct taataaactg cav 33

<210> SEQ ID NO 290
<211> LENGTH: 37
<212> TYPE: DNA
<213> ORGANISM: Artificial Sequence
<220> FEATURE:
<223> OTHER INFORMATION: Synthetic

<400> SEQUENCE: 290
atgacgtggc agacgtcctc atcttaataa actgcav 37

<210> SEQ ID NO 291
<211> LENGTH: 30
<212> TYPE: DNA
<213> ORGANISM: Artificial Sequence
<220> FEATURE:
<223> OTHER INFORMATION: Synthetic

<400> SEQUENCE: 291
gctccacttt caacttgtcc ccctccagct 30

<210> SEQ ID NO 292
<211> LENGTH: 29
<212> TYPE: DNA
<213> ORGANISM: Artificial Sequence
<220> FEATURE:
<223> OTHER INFORMATION: Synthetic

<400> SEQUENCE: 292
atgacgtggc agacgtcacc tgggaggcv 29

<210> SEQ ID NO 293
<211> LENGTH: 25
<212> TYPE: DNA
<213> ORGANISM: Artificial Sequence
<220> FEATURE:
<223> OTHER INFORMATION: Synthetic

<400> SEQUENCE: 293
cgcgccgagg atcacctggg aggcv 25

<210> SEQ ID NO 294
<211> LENGTH: 47
<212> TYPE: DNA
<213> ORGANISM: Artificial Sequence
<220> FEATURE:
<223> OTHER INFORMATION: Synthetic

<400> SEQUENCE: 294
gctctcttca tcatagtgaa gtcttcctta tccagcatct tgttcaa 47

<210> SEQ ID NO 295
<211> LENGTH: 31
<212> TYPE: DNA
<213> ORGANISM: Artificial Sequence -continued
<220> FEATURE:
<223> OTHER INFORMATION: Synthetic

<400> SEQUENCE: 295
cgcgccgagg atgaacaaga tgctggataa v 31

<210> SEQ ID NO 296
<211> LENGTH: 34
<212> TYPE: DNA
<213> ORGANISM: Artificial Sequence
<220> FEATURE:
<223> OTHER INFORMATION: Synthetic

<400> SEQUENCE: 296
atgacgtggc agacgtgaac aagatgctgg atav 34

<210> SEQ ID NO 297
<211> LENGTH: 46
<212> TYPE: DNA
<213> ORGANISM: Artificial Sequence
<220> FEATURE:
<223> OTHER INFORMATION: Synthetic

<400> SEQUENCE: 297
gtcctgtctc tgcaaataat gatgctttcg aagtttcagt tgaaca 46

<210> SEQ ID NO 298
<211> LENGTH: 26
<212> TYPE: DNA
<213> ORGANISM: Artificial Sequence
<220> FEATURE:
<223> OTHER INFORMATION: Synthetic

<400> SEQUENCE: 298
cgcgccgagg tgtccctcgc gaaaav 26

<210> SEQ ID NO 299
<211> LENGTH: 28
<212> TYPE: DNA
<213> ORGANISM: Artificial Sequence
<220> FEATURE:
<223> OTHER INFORMATION: Synthetic

<400> SEQUENCE: 299
atgacgtggc agaccgtccc tcgcgaav 28

<210> SEQ ID NO 300
<211> LENGTH: 27
<212> TYPE: DNA
<213> ORGANISM: Artificial Sequence
<220> FEATURE:
<223> OTHER INFORMATION: Synthetic

<400> SEQUENCE: 300
gccatctcct tctttgcgct cccagct 27

<210> SEQ ID NO 301
<211> LENGTH: 25
<212> TYPE: DNA
<213> ORGANISM: Artificial Sequence
<220> FEATURE:
<223> OTHER INFORMATION: Synthetic

<400> SEQUENCE: 301
cgcgccgagg agtaggtgcc ccgtv 25

<210> SEQ ID NO 302
<211> LENGTH: 28
<212> TYPE: DNA
<213> ORGANISM: Artificial Sequence
<220> FEATURE:
<223> OTHER INFORMATION: Synthetic

<400> SEQUENCE: 302
atgacgtggc agacggtagg tgccccgv 28

<210> SEQ ID NO 303
<211> LENGTH: 36
<212> TYPE: DNA
<213> ORGANISM: Artificial Sequence
<220> FEATURE:
<223> OTHER INFORMATION: Synthetic

<400> SEQUENCE: 303
ggcaggatga aaacacttac gtcggaggat ctctct 36

<210> SEQ ID NO 304
<211> LENGTH: 33
<212> TYPE: DNA
<213> ORGANISM: Artificial Sequence
<220> FEATURE:
<223> OTHER INFORMATION: Synthetic

<400> SEQUENCE: 304
atgacgtggc agacgttgct ttctgacgta ccv 33

<210> SEQ ID NO 305
<211> LENGTH: 29
<212> TYPE: DNA
<213> ORGANISM: Artificial Sequence
<220> FEATURE:
<223> OTHER INFORMATION: Synthetic

<400> SEQUENCE: 305
cgcgccgagg attgctttct gacgtaccv 29

<210> SEQ ID NO 306
<211> LENGTH: 25
<212> TYPE: DNA
<213> ORGANISM: Artificial Sequence
<220> FEATURE:
<223> OTHER INFORMATION: Synthetic

<400> SEQUENCE: 306
ggagccaagc actgctcctc ccact 25

<210> SEQ ID NO 307
<211> LENGTH: 29
<212> TYPE: DNA
<213> ORGANISM: Artificial Sequence
<220> FEATURE:
<223> OTHER INFORMATION: Synthetic

<400> SEQUENCE: 307
atgacgtggc agacggccag catgaggcv 29

<210> SEQ ID NO 308
<211> LENGTH: 25
<212> TYPE: DNA
<213> ORGANISM: Artificial Sequence
<220> FEATURE:
<223> OTHER INFORMATION: Synthetic

<400> SEQUENCE: 308
cgcgccgagg agccagcatg aggcv 25

<210> SEQ ID NO 309
<211> LENGTH: 26
<212> TYPE: DNA
<213> ORGANISM: Artificial Sequence
<220> FEATURE:
<223> OTHER INFORMATION: Synthetic

<400> SEQUENCE: 309
cgcgttcagt ccgtgcatgc ggttct 26

<210> SEQ ID NO 310
<211> LENGTH: 26
<212> TYPE: DNA
<213> ORGANISM: Artificial Sequence
<220> FEATURE:
<223> OTHER INFORMATION: Synthetic

<400> SEQUENCE: 310
atgacgtggc agaccgctcc cgggcv 26

<210> SEQ ID NO 311
<211> LENGTH: 22
<212> TYPE: DNA
<213> ORGANISM: Artificial Sequence
<220> FEATURE:
<223> OTHER INFORMATION: Synthetic

<400> SEQUENCE: 311
cgcgccgagg agctcccggg cv 22

<210> SEQ ID NO 312
<211> LENGTH: 39
<212> TYPE: DNA
<213> ORGANISM: Artificial Sequence
<220> FEATURE:
<223> OTHER INFORMATION: Synthetic

<400> SEQUENCE: 312
tggattatct aaatgaaaca cagcagctta ctccagagt 39

<210> SEQ ID NO 313
<211> LENGTH: 27
<212> TYPE: DNA
<213> ORGANISM: Artificial Sequence
<220> FEATURE:
<223> OTHER INFORMATION: Synthetic

<400> SEQUENCE: 313
cgcgccgagg atcaagtcca aggccav 27

<210> SEQ ID NO 314
<211> LENGTH: 31
<212> TYPE: DNA
<213> ORGANISM: Artificial Sequence
<220> FEATURE:
<223> OTHER INFORMATION: Synthetic

<400> SEQUENCE: 314
atgacgtggc agacgtcaag tccaaggcca v 31

<210> SEQ ID NO 315

-continued

<211> LENGTH: 28
<212> TYPE: DNA
<213> ORGANISM: Artificial Sequence
<220> FEATURE:
<223> OTHER INFORMATION: Synthetic

<400> SEQUENCE: 315
cggcttgcag acaccgtgga aggttcta 28

<210> SEQ ID NO 316
<211> LENGTH: 29
<212> TYPE: DNA
<213> ORGANISM: Artificial Sequence
<220> FEATURE:
<223> OTHER INFORMATION: Synthetic

<400> SEQUENCE: 316
atgacgtggc agaccctggg actgctggv 29

<210> SEQ ID NO 317
<211> LENGTH: 25
<212> TYPE: DNA
<213> ORGANISM: Artificial Sequence
<220> FEATURE:
<223> OTHER INFORMATION: Synthetic

<400> SEQUENCE: 317
cgcgccgagg tctgggactg ctggv 25

<210> SEQ ID NO 318
<211> LENGTH: 28
<212> TYPE: DNA
<213> ORGANISM: Artificial Sequence
<220> FEATURE:
<223> OTHER INFORMATION: Synthetic

<400> SEQUENCE: 318
ccatggggtc ccatgctggc aggataaa 28

<210> SEQ ID NO 319
<211> LENGTH: 28
<212> TYPE: DNA
<213> ORGANISM: Artificial Sequence
<220> FEATURE:
<223> OTHER INFORMATION: Synthetic

<400> SEQUENCE: 319
cgcgccgagg tgggttcctg ctctaacv 28

<210> SEQ ID NO 320
<211> LENGTH: 31
<212> TYPE: DNA
<213> ORGANISM: Artificial Sequence
<220> FEATURE:
<223> OTHER INFORMATION: Synthetic

<400> SEQUENCE: 320
atgacgtggc agaccgggtt cctgctctaa v 31

<210> SEQ ID NO 321
<211> LENGTH: 29
<212> TYPE: DNA
<213> ORGANISM: Artificial Sequence
<220> FEATURE:
<223> OTHER INFORMATION: Synthetic

<400> SEQUENCE: 321
ctccctgcag gtcacagtca ccaccatct 29

<210> SEQ ID NO 322
<211> LENGTH: 27
<212> TYPE: DNA
<213> ORGANISM: Artificial Sequence
<220> FEATURE:
<223> OTHER INFORMATION: Synthetic

<400> SEQUENCE: 322
cgcgccgagg agctatgggg acaaggv 27

<210> SEQ ID NO 323
<211> LENGTH: 31
<212> TYPE: DNA
<213> ORGANISM: Artificial Sequence
<220> FEATURE:
<223> OTHER INFORMATION: Synthetic

<400> SEQUENCE: 323
atgacgtggc agacggctat ggggacaagg v 31

<210> SEQ ID NO 324
<211> LENGTH: 23
<212> TYPE: DNA
<213> ORGANISM: Artificial Sequence
<220> FEATURE:
<223> OTHER INFORMATION: Synthetic

<400> SEQUENCE: 324
gcctggtccc caaggtaggg gct 23

<210> SEQ ID NO 325
<211> LENGTH: 31
<212> TYPE: DNA
<213> ORGANISM: Artificial Sequence
<220> FEATURE:
<223> OTHER INFORMATION: Synthetic

<400> SEQUENCE: 325
atgacgtggc agaccaggtc gaggtagcag v 31

<210> SEQ ID NO 326
<211> LENGTH: 27
<212> TYPE: DNA
<213> ORGANISM: Artificial Sequence
<220> FEATURE:
<223> OTHER INFORMATION: Synthetic

<400> SEQUENCE: 326
cgcgccgagg aaggtcgagg tagcagv 27

<210> SEQ ID NO 327
<211> LENGTH: 26
<212> TYPE: DNA
<213> ORGANISM: Artificial Sequence
<220> FEATURE:
<223> OTHER INFORMATION: Synthetic

<400> SEQUENCE: 327
ccctaccttg gggaccaggc ccttga 26

<210> SEQ ID NO 328
<211> LENGTH: 29
<212> TYPE: DNA

-continued

<213> ORGANISM: Artificial Sequence
<220> FEATURE:
<223> OTHER INFORMATION: Synthetic

<400> SEQUENCE: 328
atgacgtggc agaccgctgt ggaaccagv 29

<210> SEQ ID NO 329
<211> LENGTH: 26
<212> TYPE: DNA
<213> ORGANISM: Artificial Sequence
<220> FEATURE:
<223> OTHER INFORMATION: Synthetic

<400> SEQUENCE: 329
cgcgccgagg tgctgtggaa ccaggv 26

<210> SEQ ID NO 330
<211> LENGTH: 43
<212> TYPE: DNA
<213> ORGANISM: Artificial Sequence
<220> FEATURE:
<223> OTHER INFORMATION: Synthetic

<400> SEQUENCE: 330
gggaggacaa tcctgtggaa aggaaggttt ttataatgtg ttt 43

<210> SEQ ID NO 331
<211> LENGTH: 32
<212> TYPE: DNA
<213> ORGANISM: Artificial Sequence
<220> FEATURE:
<223> OTHER INFORMATION: Synthetic

<400> SEQUENCE: 331
atgacgtggc agacctgaga aggagggtga cv 32

<210> SEQ ID NO 332
<211> LENGTH: 28
<212> TYPE: DNA
<213> ORGANISM: Artificial Sequence
<220> FEATURE:
<223> OTHER INFORMATION: Synthetic

<400> SEQUENCE: 332
cgcgccgagg atgagaagga gggtgacv 28

<210> SEQ ID NO 333
<211> LENGTH: 36
<212> TYPE: DNA
<213> ORGANISM: Artificial Sequence
<220> FEATURE:
<223> OTHER INFORMATION: Synthetic

<400> SEQUENCE: 333
cctgtctgta tccagctttg cagttggtgg aatgaa 36

<210> SEQ ID NO 334
<211> LENGTH: 33
<212> TYPE: DNA
<213> ORGANISM: Artificial Sequence
<220> FEATURE:
<223> OTHER INFORMATION: Synthetic

<400> SEQUENCE: 334
atgacgtggc agacctgcat cattctttgg tgv 33

<210> SEQ ID NO 335
<211> LENGTH: 30
<212> TYPE: DNA
<213> ORGANISM: Artificial Sequence
<220> FEATURE:
<223> OTHER INFORMATION: Synthetic

<400> SEQUENCE: 335
cgcgccgagg ttgcatcatt ctttggtggv 30

<210> SEQ ID NO 336
<211> LENGTH: 44
<212> TYPE: DNA
<213> ORGANISM: Artificial Sequence
<220> FEATURE:
<223> OTHER INFORMATION: Synthetic

<400> SEQUENCE: 336
ggaaagaaga aagagcagag gagggagatt ggaagtagaa atgt 44

<210> SEQ ID NO 337
<211> LENGTH: 29
<212> TYPE: DNA
<213> ORGANISM: Artificial Sequence
<220> FEATURE:
<223> OTHER INFORMATION: Synthetic

<400> SEQUENCE: 337
cgcgccgagg atgaatgcag aggcaaaav 29

<210> SEQ ID NO 338
<211> LENGTH: 32
<212> TYPE: DNA
<213> ORGANISM: Artificial Sequence
<220> FEATURE:
<223> OTHER INFORMATION: Synthetic

<400> SEQUENCE: 338
atgacgtggc agacctgaat gcagaggcaa av 32

<210> SEQ ID NO 339
<211> LENGTH: 55
<212> TYPE: DNA
<213> ORGANISM: Artificial Sequence
<220> FEATURE:
<223> OTHER INFORMATION: Synthetic

<400> SEQUENCE: 339
ggcacaaacc agataatatt aagggaaatt tggaattcag aaatgttcac ttcat 55

<210> SEQ ID NO 340
<211> LENGTH: 32
<212> TYPE: DNA
<213> ORGANISM: Artificial Sequence
<220> FEATURE:
<223> OTHER INFORMATION: Synthetic

<400> SEQUENCE: 340
cgcgccgagg attacccatc tcgaaaagaa gv 32

<210> SEQ ID NO 341
<211> LENGTH: 35
<212> TYPE: DNA
<213> ORGANISM: Artificial Sequence
<220> FEATURE:

<223> OTHER INFORMATION: Synthetic

<400> SEQUENCE: 341
atgacgtggc agacgttacc catctcgaaa agaav 35

<210> SEQ ID NO 342
<211> LENGTH: 25
<212> TYPE: DNA
<213> ORGANISM: Artificial Sequence
<220> FEATURE:
<223> OTHER INFORMATION: Synthetic

<400> SEQUENCE: 342
tcccaccccc actggactca ccact 25

<210> SEQ ID NO 343
<211> LENGTH: 31
<212> TYPE: DNA
<213> ORGANISM: Artificial Sequence
<220> FEATURE:
<223> OTHER INFORMATION: Synthetic

<400> SEQUENCE: 343
atgacgtggc agacgtgatg gcaggtgaag v 31

<210> SEQ ID NO 344
<211> LENGTH: 27
<212> TYPE: DNA
<213> ORGANISM: Artificial Sequence
<220> FEATURE:
<223> OTHER INFORMATION: Synthetic

<400> SEQUENCE: 344
cgcgccgagg atgatggcag gtgaagv 27

<210> SEQ ID NO 345
<211> LENGTH: 26
<212> TYPE: DNA
<213> ORGANISM: Artificial Sequence
<220> FEATURE:
<223> OTHER INFORMATION: Synthetic

<400> SEQUENCE: 345
ggtgccggca ggcaagatag acagct 26

<210> SEQ ID NO 346
<211> LENGTH: 32
<212> TYPE: DNA
<213> ORGANISM: Artificial Sequence
<220> FEATURE:
<223> OTHER INFORMATION: Synthetic

<400> SEQUENCE: 346
atgacgtggc agacggtgga gtagaagagc tv 32

<210> SEQ ID NO 347
<211> LENGTH: 29
<212> TYPE: DNA
<213> ORGANISM: Artificial Sequence
<220> FEATURE:
<223> OTHER INFORMATION: Synthetic

<400> SEQUENCE: 347
cgcgccgagg agtggagtag aagagctgv 29

-continued

<210> SEQ ID NO 348
<211> LENGTH: 51
<212> TYPE: DNA
<213> ORGANISM: Artificial Sequence
<220> FEATURE:
<223> OTHER INFORMATION: Synthetic

<400> SEQUENCE: 348
ggttcagtcc acataatgca ttttctcctt caattctgaa aagtagctaa c 51

<210> SEQ ID NO 349
<211> LENGTH: 30
<212> TYPE: DNA
<213> ORGANISM: Artificial Sequence
<220> FEATURE:
<223> OTHER INFORMATION: Synthetic

<400> SEQUENCE: 349
cgcgccgagg tgctcatttg gtagtgaagv 30

<210> SEQ ID NO 350
<211> LENGTH: 34
<212> TYPE: DNA
<213> ORGANISM: Artificial Sequence
<220> FEATURE:
<223> OTHER INFORMATION: Synthetic

<400> SEQUENCE: 350
atgacgtggc agacggctca tttggtagtg aagv 34

<210> SEQ ID NO 351
<211> LENGTH: 24
<212> TYPE: DNA
<213> ORGANISM: Artificial Sequence
<220> FEATURE:
<223> OTHER INFORMATION: Synthetic

<400> SEQUENCE: 351
cggccactga gggagaaggc cact 24

<210> SEQ ID NO 352
<211> LENGTH: 28
<212> TYPE: DNA
<213> ORGANISM: Artificial Sequence
<220> FEATURE:
<223> OTHER INFORMATION: Synthetic

<400> SEQUENCE: 352
atgacgtggc agacggacgt gatgccgv 28

<210> SEQ ID NO 353
<211> LENGTH: 25
<212> TYPE: DNA
<213> ORGANISM: Artificial Sequence
<220> FEATURE:
<223> OTHER INFORMATION: Synthetic

<400> SEQUENCE: 353
cgcgccgagg agacgtgatg ccgcv 25

<210> SEQ ID NO 354
<211> LENGTH: 27
<212> TYPE: DNA
<213> ORGANISM: Artificial Sequence
<220> FEATURE:
<223> OTHER INFORMATION: Synthetic -continued

<400> SEQUENCE: 354
gggtctccac cacggctttc tggtggt 27

<210> SEQ ID NO 355
<211> LENGTH: 28
<212> TYPE: DNA
<213> ORGANISM: Artificial Sequence
<220> FEATURE:
<223> OTHER INFORMATION: Synthetic

<400> SEQUENCE: 355
atgacgtggc agacgccgcc tcctcagv 28

<210> SEQ ID NO 356
<211> LENGTH: 24
<212> TYPE: DNA
<213> ORGANISM: Artificial Sequence
<220> FEATURE:
<223> OTHER INFORMATION: Synthetic

<400> SEQUENCE: 356
cgcgccgagg accgcctcct cagv 24

<210> SEQ ID NO 357
<211> LENGTH: 26
<212> TYPE: DNA
<213> ORGANISM: Artificial Sequence
<220> FEATURE:
<223> OTHER INFORMATION: Synthetic

<400> SEQUENCE: 357
ctgagccatg gtggccatga agggga 26

<210> SEQ ID NO 358
<211> LENGTH: 27
<212> TYPE: DNA
<213> ORGANISM: Artificial Sequence
<220> FEATURE:
<223> OTHER INFORMATION: Synthetic

<400> SEQUENCE: 358
cgcgccgagg ttctgggtca catggcv 27

<210> SEQ ID NO 359
<211> LENGTH: 31
<212> TYPE: DNA
<213> ORGANISM: Artificial Sequence
<220> FEATURE:
<223> OTHER INFORMATION: Synthetic

<400> SEQUENCE: 359
atgacgtggc agacctctgg gtcacatggc v 31

<210> SEQ ID NO 360
<211> LENGTH: 28
<212> TYPE: DNA
<213> ORGANISM: Artificial Sequence
<220> FEATURE:
<223> OTHER INFORMATION: Synthetic

<400> SEQUENCE: 360
ggtgccttct gatggggacg tgtctgct 28

<210> SEQ ID NO 361
<211> LENGTH: 30

-continued

<212> TYPE: DNA
<213> ORGANISM: Artificial Sequence
<220> FEATURE:
<223> OTHER INFORMATION: Synthetic

<400> SEQUENCE: 361
atgacgtggc agacgccagg agagaagggv 30

<210> SEQ ID NO 362
<211> LENGTH: 27
<212> TYPE: DNA
<213> ORGANISM: Artificial Sequence
<220> FEATURE:
<223> OTHER INFORMATION: Synthetic

<400> SEQUENCE: 362
cgcgccgagg accaggagag aagggav 27

<210> SEQ ID NO 363
<211> LENGTH: 39
<212> TYPE: DNA
<213> ORGANISM: Artificial Sequence
<220> FEATURE:
<223> OTHER INFORMATION: Synthetic

<400> SEQUENCE: 363
ctgccttgta ccagcattac aaataatcca gccacaaat 39

<210> SEQ ID NO 364
<211> LENGTH: 37
<212> TYPE: DNA
<213> ORGANISM: Artificial Sequence
<220> FEATURE:
<223> OTHER INFORMATION: Synthetic

<400> SEQUENCE: 364
atgacgtggc agacgtaaat gcttttcatt tctgctv 37

<210> SEQ ID NO 365
<211> LENGTH: 33
<212> TYPE: DNA
<213> ORGANISM: Artificial Sequence
<220> FEATURE:
<223> OTHER INFORMATION: Synthetic

<400> SEQUENCE: 365
cgcgccgagg ataaatgctt ttcatttctg ctv 33

<210> SEQ ID NO 366
<211> LENGTH: 33
<212> TYPE: DNA
<213> ORGANISM: Artificial Sequence
<220> FEATURE:
<223> OTHER INFORMATION: Synthetic

<400> SEQUENCE: 366
accaacgttg acatgcacgt ccagaattga ggt 33

<210> SEQ ID NO 367
<211> LENGTH: 30
<212> TYPE: DNA
<213> ORGANISM: Artificial Sequence
<220> FEATURE:
<223> OTHER INFORMATION: Synthetic

<400> SEQUENCE: 367

-continued atgacgtggc agacggaggt tgcctttgcv 30

<210> SEQ ID NO 368
<211> LENGTH: 27
<212> TYPE: DNA
<213> ORGANISM: Artificial Sequence
<220> FEATURE:
<223> OTHER INFORMATION: Synthetic

<400> SEQUENCE: 368
cgcgccgagg agaggttgcc tttgctv 27

<210> SEQ ID NO 369
<211> LENGTH: 32
<212> TYPE: DNA
<213> ORGANISM: Artificial Sequence
<220> FEATURE:
<223> OTHER INFORMATION: Synthetic

<400> SEQUENCE: 369
acactaaggt ctcatcaggg tttgggtggc at 32

<210> SEQ ID NO 370
<211> LENGTH: 32
<212> TYPE: DNA
<213> ORGANISM: Artificial Sequence
<220> FEATURE:
<223> OTHER INFORMATION: Synthetic

<400> SEQUENCE: 370
atgacgtggc agacgaagga atggaaccag gv 32

<210> SEQ ID NO 371
<211> LENGTH: 28
<212> TYPE: DNA
<213> ORGANISM: Artificial Sequence
<220> FEATURE:
<223> OTHER INFORMATION: Synthetic

<400> SEQUENCE: 371
cgcgccgagg aaaggaatgg aaccaggv 28

<210> SEQ ID NO 372
<211> LENGTH: 34
<212> TYPE: DNA
<213> ORGANISM: Artificial Sequence
<220> FEATURE:
<223> OTHER INFORMATION: Synthetic

<400> SEQUENCE: 372
cctagatgcc ctgcagaatc cttcctgtta cgga 34

<210> SEQ ID NO 373
<211> LENGTH: 28
<212> TYPE: DNA
<213> ORGANISM: Artificial Sequence
<220> FEATURE:
<223> OTHER INFORMATION: Synthetic

<400> SEQUENCE: 373
atgacgtggc agaccccccc tccctgav 28

<210> SEQ ID NO 374
<211> LENGTH: 25
<212> TYPE: DNA
<213> ORGANISM: Artificial Sequence -continued
<220> FEATURE:
<223> OTHER INFORMATION: Synthetic

<400> SEQUENCE: 374
cgcgccgagg tcccctccc tgaav 25

<210> SEQ ID NO 375
<211> LENGTH: 21
<212> TYPE: DNA
<213> ORGANISM: Artificial Sequence
<220> FEATURE:
<223> OTHER INFORMATION: Synthetic

<400> SEQUENCE: 375
gcactggcca cccgggacgc t 21

<210> SEQ ID NO 376
<211> LENGTH: 25
<212> TYPE: DNA
<213> ORGANISM: Artificial Sequence
<220> FEATURE:
<223> OTHER INFORMATION: Synthetic

<400> SEQUENCE: 376
cgcgccgagg ccccccaagg aaggv 25

<210> SEQ ID NO 377
<211> LENGTH: 29
<212> TYPE: DNA
<213> ORGANISM: Artificial Sequence
<220> FEATURE:
<223> OTHER INFORMATION: Synthetic

<400> SEQUENCE: 377
atgacgtggc agacgccccc aaggaaggv 29

<210> SEQ ID NO 378
<211> LENGTH: 27
<212> TYPE: DNA
<213> ORGANISM: Artificial Sequence
<220> FEATURE:
<223> OTHER INFORMATION: Synthetic

<400> SEQUENCE: 378
caggggtgga tggtctctca ctcccct 27

<210> SEQ ID NO 379
<211> LENGTH: 31
<212> TYPE: DNA
<213> ORGANISM: Artificial Sequence
<220> FEATURE:
<223> OTHER INFORMATION: Synthetic

<400> SEQUENCE: 379
atgacgtggc agacgggcct gtattcagtc v 31

<210> SEQ ID NO 380
<211> LENGTH: 27
<212> TYPE: DNA
<213> ORGANISM: Artificial Sequence
<220> FEATURE:
<223> OTHER INFORMATION: Synthetic

<400> SEQUENCE: 380
cgcgccgagg cggcctgtat tcagtcv 27

-continued

<210> SEQ ID NO 381
<211> LENGTH: 31
<212> TYPE: DNA
<213> ORGANISM: Artificial Sequence
<220> FEATURE:
<223> OTHER INFORMATION: Synthetic

<400> SEQUENCE: 381
tggtgaccct gcccagatgt gaagtgtaca t 31

<210> SEQ ID NO 382
<211> LENGTH: 27
<212> TYPE: DNA
<213> ORGANISM: Artificial Sequence
<220> FEATURE:
<223> OTHER INFORMATION: Synthetic

<400> SEQUENCE: 382
cgcgccgagg actctgtgtt ggggagv 27

<210> SEQ ID NO 383
<211> LENGTH: 30
<212> TYPE: DNA
<213> ORGANISM: Artificial Sequence
<220> FEATURE:
<223> OTHER INFORMATION: Synthetic

<400> SEQUENCE: 383
atgacgtggc agacgctctg tgttggggav 30

<210> SEQ ID NO 384
<211> LENGTH: 34
<212> TYPE: DNA
<213> ORGANISM: Artificial Sequence
<220> FEATURE:
<223> OTHER INFORMATION: Synthetic

<400> SEQUENCE: 384
ctcagcctta aaaagacctc cagggcttga tgca 34

<210> SEQ ID NO 385
<211> LENGTH: 28
<212> TYPE: DNA
<213> ORGANISM: Artificial Sequence
<220> FEATURE:
<223> OTHER INFORMATION: Synthetic

<400> SEQUENCE: 385
cgcgccgagg tggtatgttg tcaggctv 28

<210> SEQ ID NO 386
<211> LENGTH: 31
<212> TYPE: DNA
<213> ORGANISM: Artificial Sequence
<220> FEATURE:
<223> OTHER INFORMATION: Synthetic

<400> SEQUENCE: 386
atgacgtggc agaccggtat gttgtcaggc v 31

<210> SEQ ID NO 387
<211> LENGTH: 33
<212> TYPE: DNA
<213> ORGANISM: Artificial Sequence
<220> FEATURE:
<223> OTHER INFORMATION: Synthetic

<400> SEQUENCE: 387
gctggaggag gctatgagaa gtgaggtttg cat 33

<210> SEQ ID NO 388
<211> LENGTH: 28
<212> TYPE: DNA
<213> ORGANISM: Artificial Sequence
<220> FEATURE:
<223> OTHER INFORMATION: Synthetic

<400> SEQUENCE: 388
cgcgccgagg agaagaaaga ggggcagv 28

<210> SEQ ID NO 389
<211> LENGTH: 31
<212> TYPE: DNA
<213> ORGANISM: Artificial Sequence
<220> FEATURE:
<223> OTHER INFORMATION: Synthetic

<400> SEQUENCE: 389
atgacgtggc agacggaaga aagaggggca v 31

<210> SEQ ID NO 390
<211> LENGTH: 38
<212> TYPE: DNA
<213> ORGANISM: Artificial Sequence
<220> FEATURE:
<223> OTHER INFORMATION: Synthetic

<400> SEQUENCE: 390
caatgggacg ccatagaggg cttttgagta gacatatt 38

<210> SEQ ID NO 391
<211> LENGTH: 30
<212> TYPE: DNA
<213> ORGANISM: Artificial Sequence
<220> FEATURE:
<223> OTHER INFORMATION: Synthetic

<400> SEQUENCE: 391
cgcgccgagg atcagtgtag aagggtgaav 30

<210> SEQ ID NO 392
<211> LENGTH: 33
<212> TYPE: DNA
<213> ORGANISM: Artificial Sequence
<220> FEATURE:
<223> OTHER INFORMATION: Synthetic

<400> SEQUENCE: 392
atgacgtggc agacgtcagt gtagaagggt gav 33

<210> SEQ ID NO 393
<211> LENGTH: 51
<212> TYPE: DNA
<213> ORGANISM: Artificial Sequence
<220> FEATURE:
<223> OTHER INFORMATION: Synthetic

<400> SEQUENCE: 393
acacatgtgt ttcattttta gttttgttaa aaaaaaattc tgacaaatca t 51

<210> SEQ ID NO 394

-continued

<211> LENGTH: 31
<212> TYPE: DNA
<213> ORGANISM: Artificial Sequence
<220> FEATURE:
<223> OTHER INFORMATION: Synthetic

<400> SEQUENCE: 394
atgacgtggc agacgaaatg ggggttcagg v 31

<210> SEQ ID NO 395
<211> LENGTH: 28
<212> TYPE: DNA
<213> ORGANISM: Artificial Sequence
<220> FEATURE:
<223> OTHER INFORMATION: Synthetic

<400> SEQUENCE: 395
cgcgccgagg aaaatggggg ttcaggav 28

<210> SEQ ID NO 396
<211> LENGTH: 29
<212> TYPE: DNA
<213> ORGANISM: Artificial Sequence
<220> FEATURE:
<223> OTHER INFORMATION: Synthetic

<400> SEQUENCE: 396
ggaggagagc aggcattggg ctaaggagc 29

<210> SEQ ID NO 397
<211> LENGTH: 27
<212> TYPE: DNA
<213> ORGANISM: Artificial Sequence
<220> FEATURE:
<223> OTHER INFORMATION: Synthetic

<400> SEQUENCE: 397
atgacgtggc agacggggca gtgggcv 27

<210> SEQ ID NO 398
<211> LENGTH: 23
<212> TYPE: DNA
<213> ORGANISM: Artificial Sequence
<220> FEATURE:
<223> OTHER INFORMATION: Synthetic

<400> SEQUENCE: 398
cgcgccgagg tgggcagtgg gcv 23

<210> SEQ ID NO 399
<211> LENGTH: 36
<212> TYPE: DNA
<213> ORGANISM: Artificial Sequence
<220> FEATURE:
<223> OTHER INFORMATION: Synthetic

<400> SEQUENCE: 399
gggacccatt cctgtgtaat acaatgtctg caccat 36

<210> SEQ ID NO 400
<211> LENGTH: 35
<212> TYPE: DNA
<213> ORGANISM: Artificial Sequence
<220> FEATURE:
<223> OTHER INFORMATION: Synthetic

<400> SEQUENCE: 400
cgcgccgagg atgctaataa agtcctattc tcttv 35

<210> SEQ ID NO 401
<211> LENGTH: 38
<212> TYPE: DNA
<213> ORGANISM: Artificial Sequence
<220> FEATURE:
<223> OTHER INFORMATION: Synthetic

<400> SEQUENCE: 401
atgacgtggc agacgtgcta ataaagtcct attctctv 38

<210> SEQ ID NO 402
<211> LENGTH: 28
<212> TYPE: DNA
<213> ORGANISM: Artificial Sequence
<220> FEATURE:
<223> OTHER INFORMATION: Synthetic

<400> SEQUENCE: 402
gacagaggct tctagagggg ccagcagt 28

<210> SEQ ID NO 403
<211> LENGTH: 31
<212> TYPE: DNA
<213> ORGANISM: Artificial Sequence
<220> FEATURE:
<223> OTHER INFORMATION: Synthetic

<400> SEQUENCE: 403
atgacgtggc agacgtttgg ggagacttgg v 31

<210> SEQ ID NO 404
<211> LENGTH: 28
<212> TYPE: DNA
<213> ORGANISM: Artificial Sequence
<220> FEATURE:
<223> OTHER INFORMATION: Synthetic

<400> SEQUENCE: 404
cgcgccgagg atttggggag acttgggv 28

<210> SEQ ID NO 405
<211> LENGTH: 26
<212> TYPE: DNA
<213> ORGANISM: Artificial Sequence
<220> FEATURE:
<223> OTHER INFORMATION: Synthetic

<400> SEQUENCE: 405
cctccaggct ggccccctag attgct 26

<210> SEQ ID NO 406
<211> LENGTH: 29
<212> TYPE: DNA
<213> ORGANISM: Artificial Sequence
<220> FEATURE:
<223> OTHER INFORMATION: Synthetic

<400> SEQUENCE: 406
atgacgtggc agacgtctgc tcctggcav 29

<210> SEQ ID NO 407
<211> LENGTH: 26
<212> TYPE: DNA

-continued

<213> ORGANISM: Artificial Sequence
<220> FEATURE:
<223> OTHER INFORMATION: Synthetic

<400> SEQUENCE: 407
cgcgccgagg atctgctcct ggcatv 26

<210> SEQ ID NO 408
<211> LENGTH: 25
<212> TYPE: DNA
<213> ORGANISM: Artificial Sequence
<220> FEATURE:
<223> OTHER INFORMATION: Synthetic

<400> SEQUENCE: 408
tggactctga gccccacctg cgaga 25

<210> SEQ ID NO 409
<211> LENGTH: 33
<212> TYPE: DNA
<213> ORGANISM: Artificial Sequence
<220> FEATURE:
<223> OTHER INFORMATION: Synthetic

<400> SEQUENCE: 409
atgacgtggc agacccccta gaatcacaga gav 33

<210> SEQ ID NO 410
<211> LENGTH: 30
<212> TYPE: DNA
<213> ORGANISM: Artificial Sequence
<220> FEATURE:
<223> OTHER INFORMATION: Synthetic

<400> SEQUENCE: 410
cgcgccgagg tccctagaat cacagagagv 30

<210> SEQ ID NO 411
<211> LENGTH: 24
<212> TYPE: DNA
<213> ORGANISM: Artificial Sequence
<220> FEATURE:
<223> OTHER INFORMATION: Synthetic

<400> SEQUENCE: 411
gggtgctgtc cacactggct ccct 24

<210> SEQ ID NO 412
<211> LENGTH: 29
<212> TYPE: DNA
<213> ORGANISM: Artificial Sequence
<220> FEATURE:
<223> OTHER INFORMATION: Synthetic

<400> SEQUENCE: 412
atgacgtggc agacgtcagg gagcagccv 29

<210> SEQ ID NO 413
<211> LENGTH: 25
<212> TYPE: DNA
<213> ORGANISM: Artificial Sequence
<220> FEATURE:
<223> OTHER INFORMATION: Synthetic

<400> SEQUENCE: 413
cgcgccgagg atcagggagc agccv 25

<210> SEQ ID NO 414
<211> LENGTH: 31
<212> TYPE: DNA
<213> ORGANISM: Artificial Sequence
<220> FEATURE:
<223> OTHER INFORMATION: Synthetic

<400> SEQUENCE: 414
tcatgaacag caaaggcgtg agcctcttcg t 31

<210> SEQ ID NO 415
<211> LENGTH: 29
<212> TYPE: DNA
<213> ORGANISM: Artificial Sequence
<220> FEATURE:
<223> OTHER INFORMATION: Synthetic

<400> SEQUENCE: 415
cgcgccgagg acatcatcaa ccctgagav 29

<210> SEQ ID NO 416
<211> LENGTH: 32
<212> TYPE: DNA
<213> ORGANISM: Artificial Sequence
<220> FEATURE:
<223> OTHER INFORMATION: Synthetic

<400> SEQUENCE: 416
atgacgtggc agacgcatca tcaaccctga gv 32

<210> SEQ ID NO 417
<211> LENGTH: 22
<212> TYPE: DNA
<213> ORGANISM: Artificial Sequence
<220> FEATURE:
<223> OTHER INFORMATION: Synthetic

<400> SEQUENCE: 417
ggtggggctg ggctgctagg gt 22

<210> SEQ ID NO 418
<211> LENGTH: 32
<212> TYPE: DNA
<213> ORGANISM: Artificial Sequence
<220> FEATURE:
<223> OTHER INFORMATION: Synthetic

<400> SEQUENCE: 418
atgacgtggc agacgatcca gatggcatgt gv 32

<210> SEQ ID NO 419
<211> LENGTH: 28
<212> TYPE: DNA
<213> ORGANISM: Artificial Sequence
<220> FEATURE:
<223> OTHER INFORMATION: Synthetic

<400> SEQUENCE: 419
cgcgccgagg aatccagatg gcatgtgv 28

<210> SEQ ID NO 420
<211> LENGTH: 25
<212> TYPE: DNA
<213> ORGANISM: Artificial Sequence
<220> FEATURE:

<223> OTHER INFORMATION: Synthetic

<400> SEQUENCE: 420
cttgggccac ggagggcaat gacct 25

<210> SEQ ID NO 421
<211> LENGTH: 24
<212> TYPE: DNA
<213> ORGANISM: Artificial Sequence
<220> FEATURE:
<223> OTHER INFORMATION: Synthetic

<400> SEQUENCE: 421
cgcgccgagg aagggtgccc ctgv 24

<210> SEQ ID NO 422
<211> LENGTH: 28
<212> TYPE: DNA
<213> ORGANISM: Artificial Sequence
<220> FEATURE:
<223> OTHER INFORMATION: Synthetic

<400> SEQUENCE: 422
atgacgtggc agacgagggt gcccctgv 28

<210> SEQ ID NO 423
<211> LENGTH: 29
<212> TYPE: DNA
<213> ORGANISM: Artificial Sequence
<220> FEATURE:
<223> OTHER INFORMATION: Synthetic

<400> SEQUENCE: 423
agtgtggtgc agaaaaccct tcaccccct 29

<210> SEQ ID NO 424
<211> LENGTH: 33
<212> TYPE: DNA
<213> ORGANISM: Artificial Sequence
<220> FEATURE:
<223> OTHER INFORMATION: Synthetic

<400> SEQUENCE: 424
atgacgtggc agacgtgtca aaaggagctg acv 33

<210> SEQ ID NO 425
<211> LENGTH: 29
<212> TYPE: DNA
<213> ORGANISM: Artificial Sequence
<220> FEATURE:
<223> OTHER INFORMATION: Synthetic

<400> SEQUENCE: 425
cgcgccgagg atgtcaaaag gagctgacv 29

<210> SEQ ID NO 426
<211> LENGTH: 32
<212> TYPE: DNA
<213> ORGANISM: Artificial Sequence
<220> FEATURE:
<223> OTHER INFORMATION: Synthetic

<400> SEQUENCE: 426
ggtctctacc ttgggtgctg ttctctgcct ct 32

-continued

<210> SEQ ID NO 427
<211> LENGTH: 29
<212> TYPE: DNA
<213> ORGANISM: Artificial Sequence
<220> FEATURE:
<223> OTHER INFORMATION: Synthetic

<400> SEQUENCE: 427
cgcgccgagg aggagctctc tgtcaattv 29

<210> SEQ ID NO 428
<211> LENGTH: 31
<212> TYPE: DNA
<213> ORGANISM: Artificial Sequence
<220> FEATURE:
<223> OTHER INFORMATION: Synthetic

<400> SEQUENCE: 428
atgacgtggc agacgggagc tctctgtcaa v 31

<210> SEQ ID NO 429
<211> LENGTH: 31
<212> TYPE: DNA
<213> ORGANISM: Artificial Sequence
<220> FEATURE:
<223> OTHER INFORMATION: Synthetic

<400> SEQUENCE: 429
gtagggagaa gtgcggcaca gctaaaggag t 31

<210> SEQ ID NO 430
<211> LENGTH: 28
<212> TYPE: DNA
<213> ORGANISM: Artificial Sequence
<220> FEATURE:
<223> OTHER INFORMATION: Synthetic

<400> SEQUENCE: 430
atgacgtggc agacgagcgc ctgcaccv 28

<210> SEQ ID NO 431
<211> LENGTH: 24
<212> TYPE: DNA
<213> ORGANISM: Artificial Sequence
<220> FEATURE:
<223> OTHER INFORMATION: Synthetic

<400> SEQUENCE: 431
cgcgccgagg aagcgcctgc accv 24

<210> SEQ ID NO 432
<211> LENGTH: 43
<212> TYPE: DNA
<213> ORGANISM: Artificial Sequence
<220> FEATURE:
<223> OTHER INFORMATION: Synthetic

<400> SEQUENCE: 432
gctacgtttt cttctcagtt gaacagacac ggtagaagac tcc 43

<210> SEQ ID NO 433
<211> LENGTH: 33
<212> TYPE: DNA
<213> ORGANISM: Artificial Sequence
<220> FEATURE:
<223> OTHER INFORMATION: Synthetic

<400> SEQUENCE: 433
atgacgtggc agacgcccat tttggaatgt gav 33

<210> SEQ ID NO 434
<211> LENGTH: 30
<212> TYPE: DNA
<213> ORGANISM: Artificial Sequence
<220> FEATURE:
<223> OTHER INFORMATION: Synthetic

<400> SEQUENCE: 434
cgcgccgagg tcccattttg gaatgtgacv 30

<210> SEQ ID NO 435
<211> LENGTH: 26
<212> TYPE: DNA
<213> ORGANISM: Artificial Sequence
<220> FEATURE:
<223> OTHER INFORMATION: Synthetic

<400> SEQUENCE: 435
catgaccagg gtgcaagcac tgggct 26

<210> SEQ ID NO 436
<211> LENGTH: 33
<212> TYPE: DNA
<213> ORGANISM: Artificial Sequence
<220> FEATURE:
<223> OTHER INFORMATION: Synthetic

<400> SEQUENCE: 436
atgacgtggc agacgttgtt ctgtgggagt agv 33

<210> SEQ ID NO 437
<211> LENGTH: 30
<212> TYPE: DNA
<213> ORGANISM: Artificial Sequence
<220> FEATURE:
<223> OTHER INFORMATION: Synthetic

<400> SEQUENCE: 437
cgcgccgagg attgttctgt gggagtaggv 30

<210> SEQ ID NO 438
<211> LENGTH: 24
<212> TYPE: DNA
<213> ORGANISM: Artificial Sequence
<220> FEATURE:
<223> OTHER INFORMATION: Synthetic

<400> SEQUENCE: 438
ggagaggaca ccagggtggg ggtt 24

<210> SEQ ID NO 439
<211> LENGTH: 33
<212> TYPE: DNA
<213> ORGANISM: Artificial Sequence
<220> FEATURE:
<223> OTHER INFORMATION: Synthetic

<400> SEQUENCE: 439
atgacgtggc agacgaagga gacactactg ccv 33

<210> SEQ ID NO 440
<211> LENGTH: 29

<212> TYPE: DNA
<213> ORGANISM: Artificial Sequence
<220> FEATURE:
<223> OTHER INFORMATION: Synthetic

<400> SEQUENCE: 440
cgcgccgagg aaaggagaca ctactgccv 29

<210> SEQ ID NO 441
<211> LENGTH: 31
<212> TYPE: DNA
<213> ORGANISM: Artificial Sequence
<220> FEATURE:
<223> OTHER INFORMATION: Synthetic

<400> SEQUENCE: 441
gcggagagac agggagatga cgccttaaag t 31

<210> SEQ ID NO 442
<211> LENGTH: 28
<212> TYPE: DNA
<213> ORGANISM: Artificial Sequence
<220> FEATURE:
<223> OTHER INFORMATION: Synthetic

<400> SEQUENCE: 442
atgacgtggc agacggtccg cgacatgv 28

<210> SEQ ID NO 443
<211> LENGTH: 25
<212> TYPE: DNA
<213> ORGANISM: Artificial Sequence
<220> FEATURE:
<223> OTHER INFORMATION: Synthetic

<400> SEQUENCE: 443
cgcgccgagg agtccgcgac atgcv 25

<210> SEQ ID NO 444
<211> LENGTH: 33
<212> TYPE: DNA
<213> ORGANISM: Artificial Sequence
<220> FEATURE:
<223> OTHER INFORMATION: Synthetic

<400> SEQUENCE: 444
ttggaaattg gtttgttttg ccttttattg aaa 33

<210> SEQ ID NO 445
<211> LENGTH: 29
<212> TYPE: DNA
<213> ORGANISM: Artificial Sequence
<220> FEATURE:
<223> OTHER INFORMATION: Synthetic

<400> SEQUENCE: 445
gccttaaaca cactcagaag gtagaaaac 29

<210> SEQ ID NO 446
<211> LENGTH: 18
<212> TYPE: DNA
<213> ORGANISM: Artificial Sequence
<220> FEATURE:
<223> OTHER INFORMATION: Synthetic

<400> SEQUENCE: 446

-continued

```
cgggctaccc atgggaca                                                  18


<210> SEQ ID NO 447
<211> LENGTH: 28
<212> TYPE: DNA
<213> ORGANISM: Artificial Sequence
<220> FEATURE:
<223> OTHER INFORMATION: Synthetic

<400> SEQUENCE: 447

gtcttctggt attaagccgt aatttgca                                       28


<210> SEQ ID NO 448
<211> LENGTH: 26
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (5)..(5)
<223> OTHER INFORMATION: n is a, c, g, or t

<400> SEQUENCE: 448

cagtntcacc agctgtggta gaacca                                         26


<210> SEQ ID NO 449
<211> LENGTH: 23
<212> TYPE: DNA
<213> ORGANISM: Artificial Sequence
<220> FEATURE:
<223> OTHER INFORMATION: Synthetic

<400> SEQUENCE: 449

aagaggagca tcactgtgac cca                                            23


<210> SEQ ID NO 450
<211> LENGTH: 31
<212> TYPE: DNA
<213> ORGANISM: Artificial Sequence
<220> FEATURE:
<223> OTHER INFORMATION: Synthetic

<400> SEQUENCE: 450

tcccttcctc agattatatt catcccagaa a                                   31


<210> SEQ ID NO 451
<211> LENGTH: 27
<212> TYPE: DNA
<213> ORGANISM: Artificial Sequence
<220> FEATURE:
<223> OTHER INFORMATION: Synthetic

<400> SEQUENCE: 451

tcaacccccct gacattatct tggatcc                                       27


<210> SEQ ID NO 452
<211> LENGTH: 30
<212> TYPE: DNA
<213> ORGANISM: Artificial Sequence
<220> FEATURE:
<223> OTHER INFORMATION: Synthetic

<400> SEQUENCE: 452

cactccccaa catctcattt atttttcaca                                     30
```

-continued

<210> SEQ ID NO 453
<211> LENGTH: 26
<212> TYPE: DNA
<213> ORGANISM: Artificial Sequence
<220> FEATURE:
<223> OTHER INFORMATION: Synthetic

<400> SEQUENCE: 453
gtcatggcaa tcagttggtg aaagca 26

<210> SEQ ID NO 454
<211> LENGTH: 27
<212> TYPE: DNA
<213> ORGANISM: Artificial Sequence
<220> FEATURE:
<223> OTHER INFORMATION: Synthetic

<400> SEQUENCE: 454
tcttctttag actgccacga ggaaaaa 27

<210> SEQ ID NO 455
<211> LENGTH: 27
<212> TYPE: DNA
<213> ORGANISM: Artificial Sequence
<220> FEATURE:
<223> OTHER INFORMATION: Synthetic

<400> SEQUENCE: 455
gggagatgag gtactcacta gttaaca 27

<210> SEQ ID NO 456
<211> LENGTH: 21
<212> TYPE: DNA
<213> ORGANISM: Artificial Sequence
<220> FEATURE:
<223> OTHER INFORMATION: Synthetic

<400> SEQUENCE: 456
ccctgaggaa ctcacgcaga c 21

<210> SEQ ID NO 457
<211> LENGTH: 21
<212> TYPE: DNA
<213> ORGANISM: Artificial Sequence
<220> FEATURE:
<223> OTHER INFORMATION: Synthetic

<400> SEQUENCE: 457
gcacctcttt gcgcaggaag a 21

<210> SEQ ID NO 458
<211> LENGTH: 20
<212> TYPE: DNA
<213> ORGANISM: Artificial Sequence
<220> FEATURE:
<223> OTHER INFORMATION: Synthetic

<400> SEQUENCE: 458
agtggtggcg ctctcacaaa 20

<210> SEQ ID NO 459
<211> LENGTH: 30
<212> TYPE: DNA
<213> ORGANISM: Artificial Sequence
<220> FEATURE:
<223> OTHER INFORMATION: Synthetic -continued

<400> SEQUENCE: 459
catttgttca ggcattacag taaaatgcca 30

<210> SEQ ID NO 460
<211> LENGTH: 20
<212> TYPE: DNA
<213> ORGANISM: Artificial Sequence
<220> FEATURE:
<223> OTHER INFORMATION: Synthetic

<400> SEQUENCE: 460
cagggacaat cccatcccca 20

<210> SEQ ID NO 461
<211> LENGTH: 28
<212> TYPE: DNA
<213> ORGANISM: Artificial Sequence
<220> FEATURE:
<223> OTHER INFORMATION: Synthetic

<400> SEQUENCE: 461
gtgaattgtc catgatgaga gccactac 28

<210> SEQ ID NO 462
<211> LENGTH: 20
<212> TYPE: DNA
<213> ORGANISM: Artificial Sequence
<220> FEATURE:
<223> OTHER INFORMATION: Synthetic

<400> SEQUENCE: 462
tgtcccagac tgggtcagca 20

<210> SEQ ID NO 463
<211> LENGTH: 24
<212> TYPE: DNA
<213> ORGANISM: Artificial Sequence
<220> FEATURE:
<223> OTHER INFORMATION: Synthetic

<400> SEQUENCE: 463
gaatgaagaa ggtactgtgg gcca 24

<210> SEQ ID NO 464
<211> LENGTH: 27
<212> TYPE: DNA
<213> ORGANISM: Artificial Sequence
<220> FEATURE:
<223> OTHER INFORMATION: Synthetic

<400> SEQUENCE: 464
ctggaaactt ctgccagatt gttccta 27

<210> SEQ ID NO 465
<211> LENGTH: 24
<212> TYPE: DNA
<213> ORGANISM: Artificial Sequence
<220> FEATURE:
<223> OTHER INFORMATION: Synthetic

<400> SEQUENCE: 465
caaaggactc cttgtcccct agaa 24

<210> SEQ ID NO 466
<211> LENGTH: 19

<212> TYPE: DNA
<213> ORGANISM: Artificial Sequence
<220> FEATURE:
<223> OTHER INFORMATION: Synthetic

<400> SEQUENCE: 466
ggtcctttgc gcaaaggca 19

<210> SEQ ID NO 467
<211> LENGTH: 20
<212> TYPE: DNA
<213> ORGANISM: Artificial Sequence
<220> FEATURE:
<223> OTHER INFORMATION: Synthetic

<400> SEQUENCE: 467
tttcagctcc cctcctccca 20

<210> SEQ ID NO 468
<211> LENGTH: 22
<212> TYPE: DNA
<213> ORGANISM: Artificial Sequence
<220> FEATURE:
<223> OTHER INFORMATION: Synthetic

<400> SEQUENCE: 468
gtctgccttc tcacagcttt cc 22

<210> SEQ ID NO 469
<211> LENGTH: 26
<212> TYPE: DNA
<213> ORGANISM: Artificial Sequence
<220> FEATURE:
<223> OTHER INFORMATION: Synthetic

<400> SEQUENCE: 469
aggtgtaact tgagtctctg cctaac 26

<210> SEQ ID NO 470
<211> LENGTH: 16
<212> TYPE: DNA
<213> ORGANISM: Artificial Sequence
<220> FEATURE:
<223> OTHER INFORMATION: Synthetic

<400> SEQUENCE: 470
agctgctggg ccagca 16

<210> SEQ ID NO 471
<211> LENGTH: 28
<212> TYPE: DNA
<213> ORGANISM: Artificial Sequence
<220> FEATURE:
<223> OTHER INFORMATION: Synthetic

<400> SEQUENCE: 471
caagctttaa aggcagtcga cattaaga 28

<210> SEQ ID NO 472
<211> LENGTH: 19
<212> TYPE: DNA
<213> ORGANISM: Artificial Sequence
<220> FEATURE:
<223> OTHER INFORMATION: Synthetic

<400> SEQUENCE: 472
gccagggatc tagggctcc 19

<210> SEQ ID NO 473
<211> LENGTH: 18
<212> TYPE: DNA
<213> ORGANISM: Artificial Sequence
<220> FEATURE:
<223> OTHER INFORMATION: Synthetic

<400> SEQUENCE: 473
cccgtcctac ccagacga 18

<210> SEQ ID NO 474
<211> LENGTH: 19
<212> TYPE: DNA
<213> ORGANISM: Artificial Sequence
<220> FEATURE:
<223> OTHER INFORMATION: Synthetic

<400> SEQUENCE: 474
tcctgctgac attccgcca 19

<210> SEQ ID NO 475
<211> LENGTH: 19
<212> TYPE: DNA
<213> ORGANISM: Artificial Sequence
<220> FEATURE:
<223> OTHER INFORMATION: Synthetic

<400> SEQUENCE: 475
ggtgcaccac ccattccca 19

<210> SEQ ID NO 476
<211> LENGTH: 31
<212> TYPE: DNA
<213> ORGANISM: Artificial Sequence
<220> FEATURE:
<223> OTHER INFORMATION: Synthetic

<400> SEQUENCE: 476
gcaatcctgg ttaaggactt aagaattgtc a 31

<210> SEQ ID NO 477
<211> LENGTH: 23
<212> TYPE: DNA
<213> ORGANISM: Artificial Sequence
<220> FEATURE:
<223> OTHER INFORMATION: Synthetic

<400> SEQUENCE: 477
acaaaccaac gccacttcct aac 23

<210> SEQ ID NO 478
<211> LENGTH: 21
<212> TYPE: DNA
<213> ORGANISM: Artificial Sequence
<220> FEATURE:
<223> OTHER INFORMATION: Synthetic

<400> SEQUENCE: 478
ctcaatccat gcctcttgcc c 21

<210> SEQ ID NO 479
<211> LENGTH: 20
<212> TYPE: DNA
<213> ORGANISM: Artificial Sequence -continued
<220> FEATURE:
<223> OTHER INFORMATION: Synthetic

<400> SEQUENCE: 479
cttgccaacc cagcttccca 20

<210> SEQ ID NO 480
<211> LENGTH: 17
<212> TYPE: DNA
<213> ORGANISM: Artificial Sequence
<220> FEATURE:
<223> OTHER INFORMATION: Synthetic

<400> SEQUENCE: 480
cagcgtggca gagtggc 17

<210> SEQ ID NO 481
<211> LENGTH: 26
<212> TYPE: DNA
<213> ORGANISM: Artificial Sequence
<220> FEATURE:
<223> OTHER INFORMATION: Synthetic

<400> SEQUENCE: 481
actctacgat gtgggcattt cagaga 26

<210> SEQ ID NO 482
<211> LENGTH: 18
<212> TYPE: DNA
<213> ORGANISM: Artificial Sequence
<220> FEATURE:
<223> OTHER INFORMATION: Synthetic

<400> SEQUENCE: 482
gcgcacctgt ccgtagca 18

<210> SEQ ID NO 483
<211> LENGTH: 21
<212> TYPE: DNA
<213> ORGANISM: Artificial Sequence
<220> FEATURE:
<223> OTHER INFORMATION: Synthetic

<400> SEQUENCE: 483
gccccaacaa gctctcactc a 21

<210> SEQ ID NO 484
<211> LENGTH: 37
<212> TYPE: DNA
<213> ORGANISM: Artificial Sequence
<220> FEATURE:
<223> OTHER INFORMATION: Synthetic

<400> SEQUENCE: 484
gaagagggtg aatactataa aaatagactt accttcc 37

<210> SEQ ID NO 485
<211> LENGTH: 31
<212> TYPE: DNA
<213> ORGANISM: Artificial Sequence
<220> FEATURE:
<223> OTHER INFORMATION: Synthetic

<400> SEQUENCE: 485
ttggctcaaa tcgtgggata attctaagaa a 31

<210> SEQ ID NO 486
<211> LENGTH: 16
<212> TYPE: DNA
<213> ORGANISM: Artificial Sequence
<220> FEATURE:
<223> OTHER INFORMATION: Synthetic

<400> SEQUENCE: 486
ccaccgccac ctccga 16

<210> SEQ ID NO 487
<211> LENGTH: 19
<212> TYPE: DNA
<213> ORGANISM: Artificial Sequence
<220> FEATURE:
<223> OTHER INFORMATION: Synthetic

<400> SEQUENCE: 487
gacccagcag aggtccgaa 19

<210> SEQ ID NO 488
<211> LENGTH: 40
<212> TYPE: DNA
<213> ORGANISM: Artificial Sequence
<220> FEATURE:
<223> OTHER INFORMATION: Synthetic

<400> SEQUENCE: 488
tttcaaaact atcaggacct ttatcattca taggaaataa 40

<210> SEQ ID NO 489
<211> LENGTH: 30
<212> TYPE: DNA
<213> ORGANISM: Artificial Sequence
<220> FEATURE:
<223> OTHER INFORMATION: Synthetic

<400> SEQUENCE: 489
ttttaagata cctttccaag ttctccctca 30

<210> SEQ ID NO 490
<211> LENGTH: 32
<212> TYPE: DNA
<213> ORGANISM: Artificial Sequence
<220> FEATURE:
<223> OTHER INFORMATION: Synthetic

<400> SEQUENCE: 490
cagagctgga ggctagaaat aaattactca aa 32

<210> SEQ ID NO 491
<211> LENGTH: 27
<212> TYPE: DNA
<213> ORGANISM: Artificial Sequence
<220> FEATURE:
<223> OTHER INFORMATION: Synthetic

<400> SEQUENCE: 491
tctcttcagg tcggaatgga tcttgaa 27

<210> SEQ ID NO 492
<211> LENGTH: 28
<212> TYPE: DNA
<213> ORGANISM: Artificial Sequence
<220> FEATURE:
<223> OTHER INFORMATION: Synthetic

<400> SEQUENCE: 492
gacttacatt aggcagtgac tcgatgaa 28

<210> SEQ ID NO 493
<211> LENGTH: 27
<212> TYPE: DNA
<213> ORGANISM: Artificial Sequence
<220> FEATURE:
<223> OTHER INFORMATION: Synthetic

<400> SEQUENCE: 493
cattgctgag aacattgcct atggaga 27

<210> SEQ ID NO 494
<211> LENGTH: 19
<212> TYPE: DNA
<213> ORGANISM: Artificial Sequence
<220> FEATURE:
<223> OTHER INFORMATION: Synthetic

<400> SEQUENCE: 494
ccctggaggg agttgaccc 19

<210> SEQ ID NO 495
<211> LENGTH: 22
<212> TYPE: DNA
<213> ORGANISM: Artificial Sequence
<220> FEATURE:
<223> OTHER INFORMATION: Synthetic

<400> SEQUENCE: 495
gctcagtatg cctttcctcc cc 22

<210> SEQ ID NO 496
<211> LENGTH: 26
<212> TYPE: DNA
<213> ORGANISM: Artificial Sequence
<220> FEATURE:
<223> OTHER INFORMATION: Synthetic

<400> SEQUENCE: 496
aggtatttcg acgaccagaa tcaacc 26

<210> SEQ ID NO 497
<211> LENGTH: 54
<212> TYPE: DNA
<213> ORGANISM: Artificial Sequence
<220> FEATURE:
<223> OTHER INFORMATION: Synthetic

<400> SEQUENCE: 497
ggaaaaaact tttaagtttt ctcaataaat atcctttaat ttttttcttt ttaa 54

<210> SEQ ID NO 498
<211> LENGTH: 17
<212> TYPE: DNA
<213> ORGANISM: Artificial Sequence
<220> FEATURE:
<223> OTHER INFORMATION: Synthetic

<400> SEQUENCE: 498
gcaacccggg aacggca 17

<210> SEQ ID NO 499

-continued

<211> LENGTH: 20
<212> TYPE: DNA
<213> ORGANISM: Artificial Sequence
<220> FEATURE:
<223> OTHER INFORMATION: Synthetic

<400> SEQUENCE: 499
tcgtcccttt cctgcgtgac 20

<210> SEQ ID NO 500
<211> LENGTH: 23
<212> TYPE: DNA
<213> ORGANISM: Artificial Sequence
<220> FEATURE:
<223> OTHER INFORMATION: Synthetic

<400> SEQUENCE: 500
cctgctgacc aagaataagg ccc 23

<210> SEQ ID NO 501
<211> LENGTH: 26
<212> TYPE: DNA
<213> ORGANISM: Artificial Sequence
<220> FEATURE:
<223> OTHER INFORMATION: Synthetic

<400> SEQUENCE: 501
cattggcata gcagttgatg gcttcc 26

<210> SEQ ID NO 502
<211> LENGTH: 20
<212> TYPE: DNA
<213> ORGANISM: Artificial Sequence
<220> FEATURE:
<223> OTHER INFORMATION: Synthetic

<400> SEQUENCE: 502
catcagcatc ggttctgccc 20

<210> SEQ ID NO 503
<211> LENGTH: 18
<212> TYPE: DNA
<213> ORGANISM: Artificial Sequence
<220> FEATURE:
<223> OTHER INFORMATION: Synthetic

<400> SEQUENCE: 503
ggcgatgctc agcccgaa 18

<210> SEQ ID NO 504
<211> LENGTH: 25
<212> TYPE: DNA
<213> ORGANISM: Artificial Sequence
<220> FEATURE:
<223> OTHER INFORMATION: Synthetic

<400> SEQUENCE: 504
tccctctgtt tctttccctc acaga 25

<210> SEQ ID NO 505
<211> LENGTH: 25
<212> TYPE: DNA
<213> ORGANISM: Artificial Sequence
<220> FEATURE:
<223> OTHER INFORMATION: Synthetic

<400> SEQUENCE: 505
ggttgctgaa gttgtgtgtg atcac 25

<210> SEQ ID NO 506
<211> LENGTH: 34
<212> TYPE: DNA
<213> ORGANISM: Artificial Sequence
<220> FEATURE:
<223> OTHER INFORMATION: Synthetic

<400> SEQUENCE: 506
ttccttagat tcttctttgg agcagaataa aaga 34

<210> SEQ ID NO 507
<211> LENGTH: 24
<212> TYPE: DNA
<213> ORGANISM: Artificial Sequence
<220> FEATURE:
<223> OTHER INFORMATION: Synthetic

<400> SEQUENCE: 507
cacaccatgt gaggtcatca gcaa 24

<210> SEQ ID NO 508
<211> LENGTH: 20
<212> TYPE: DNA
<213> ORGANISM: Artificial Sequence
<220> FEATURE:
<223> OTHER INFORMATION: Synthetic

<400> SEQUENCE: 508
gctccaggga ggactcacca 20

<210> SEQ ID NO 509
<211> LENGTH: 22
<212> TYPE: DNA
<213> ORGANISM: Artificial Sequence
<220> FEATURE:
<223> OTHER INFORMATION: Synthetic

<400> SEQUENCE: 509
catgacctca gggatgccca ca 22

<210> SEQ ID NO 510
<211> LENGTH: 27
<212> TYPE: DNA
<213> ORGANISM: Artificial Sequence
<220> FEATURE:
<223> OTHER INFORMATION: Synthetic

<400> SEQUENCE: 510
ggcccgaaca tagtaattcc tggtaaa 27

<210> SEQ ID NO 511
<211> LENGTH: 17
<212> TYPE: DNA
<213> ORGANISM: Artificial Sequence
<220> FEATURE:
<223> OTHER INFORMATION: Synthetic

<400> SEQUENCE: 511
cgagtgggag aggccca 17

<210> SEQ ID NO 512
<211> LENGTH: 33
<212> TYPE: DNA

<213> ORGANISM: Artificial Sequence
<220> FEATURE:
<223> OTHER INFORMATION: Synthetic

<400> SEQUENCE: 512
tgtattacat aaaccctact ccaaacaaat gca 33

<210> SEQ ID NO 513
<211> LENGTH: 23
<212> TYPE: DNA
<213> ORGANISM: Artificial Sequence
<220> FEATURE:
<223> OTHER INFORMATION: Synthetic

<400> SEQUENCE: 513
gccagcaaac acatccagga aca 23

<210> SEQ ID NO 514
<211> LENGTH: 28
<212> TYPE: DNA
<213> ORGANISM: Artificial Sequence
<220> FEATURE:
<223> OTHER INFORMATION: Synthetic

<400> SEQUENCE: 514
cgtttcttcc atccttccag gatttgaa 28

<210> SEQ ID NO 515
<211> LENGTH: 26
<212> TYPE: DNA
<213> ORGANISM: Artificial Sequence
<220> FEATURE:
<223> OTHER INFORMATION: Synthetic

<400> SEQUENCE: 515
acctctctgt gctttctgta tcctca 26

<210> SEQ ID NO 516
<211> LENGTH: 47
<212> TYPE: DNA
<213> ORGANISM: Artificial Sequence
<220> FEATURE:
<223> OTHER INFORMATION: Synthetic

<400> SEQUENCE: 516
caagatatta ttttcttgtt tgtagagata ttcatgatct aaagaga 47

<210> SEQ ID NO 517
<211> LENGTH: 51
<212> TYPE: DNA
<213> ORGANISM: Artificial Sequence
<220> FEATURE:
<223> OTHER INFORMATION: Synthetic

<400> SEQUENCE: 517
ccttgacaat aatgatgaaa aaatgaatga atgttagtat aatatcattc a 51

<210> SEQ ID NO 518
<211> LENGTH: 22
<212> TYPE: DNA
<213> ORGANISM: Artificial Sequence
<220> FEATURE:
<223> OTHER INFORMATION: Synthetic

<400> SEQUENCE: 518
caggcaactg gaactgaaac cc 22

<210> SEQ ID NO 519
<211> LENGTH: 22
<212> TYPE: DNA
<213> ORGANISM: Artificial Sequence
<220> FEATURE:
<223> OTHER INFORMATION: Synthetic

<400> SEQUENCE: 519
ctcagcttcc aagggccatt ca 22

<210> SEQ ID NO 520
<211> LENGTH: 23
<212> TYPE: DNA
<213> ORGANISM: Artificial Sequence
<220> FEATURE:
<223> OTHER INFORMATION: Synthetic

<400> SEQUENCE: 520
ggctggacat ccacttcatc cac 23

<210> SEQ ID NO 521
<211> LENGTH: 19
<212> TYPE: DNA
<213> ORGANISM: Artificial Sequence
<220> FEATURE:
<223> OTHER INFORMATION: Synthetic

<400> SEQUENCE: 521
cgtagaaaga gccgggcca 19

<210> SEQ ID NO 522
<211> LENGTH: 26
<212> TYPE: DNA
<213> ORGANISM: Artificial Sequence
<220> FEATURE:
<223> OTHER INFORMATION: Synthetic

<400> SEQUENCE: 522
agaatcggct gtctttgatg ctgtaa 26

<210> SEQ ID NO 523
<211> LENGTH: 50
<212> TYPE: DNA
<213> ORGANISM: Artificial Sequence
<220> FEATURE:
<223> OTHER INFORMATION: Synthetic

<400> SEQUENCE: 523
cttatacttt tagaaaaaag aagacattat caagatattc atttttgtca 50

<210> SEQ ID NO 524
<211> LENGTH: 40
<212> TYPE: DNA
<213> ORGANISM: Artificial Sequence
<220> FEATURE:
<223> OTHER INFORMATION: Synthetic

<400> SEQUENCE: 524
acgagcataa gaacttaata atgtcaagag aaattttaga 40

<210> SEQ ID NO 525
<211> LENGTH: 26
<212> TYPE: DNA
<213> ORGANISM: Artificial Sequence
<220> FEATURE:

<223> OTHER INFORMATION: Synthetic

<400> SEQUENCE: 525
tgactacagc aagtatctgg actcca 26

<210> SEQ ID NO 526
<211> LENGTH: 18
<212> TYPE: DNA
<213> ORGANISM: Artificial Sequence
<220> FEATURE:
<223> OTHER INFORMATION: Synthetic

<400> SEQUENCE: 526
acaggtcccc tccgctca 18

<210> SEQ ID NO 527
<211> LENGTH: 19
<212> TYPE: DNA
<213> ORGANISM: Artificial Sequence
<220> FEATURE:
<223> OTHER INFORMATION: Synthetic

<400> SEQUENCE: 527
ggccaggcac aggctgaaa 19

<210> SEQ ID NO 528
<211> LENGTH: 22
<212> TYPE: DNA
<213> ORGANISM: Artificial Sequence
<220> FEATURE:
<223> OTHER INFORMATION: Synthetic

<400> SEQUENCE: 528
ccagagccac tacctttgtc ca 22

<210> SEQ ID NO 529
<211> LENGTH: 32
<212> TYPE: DNA
<213> ORGANISM: Artificial Sequence
<220> FEATURE:
<223> OTHER INFORMATION: Synthetic

<400> SEQUENCE: 529
ggtgtcttag gagagaaaaa aaggtagaaa aa 32

<210> SEQ ID NO 530
<211> LENGTH: 22
<212> TYPE: DNA
<213> ORGANISM: Artificial Sequence
<220> FEATURE:
<223> OTHER INFORMATION: Synthetic

<400> SEQUENCE: 530
tgaccaaatg ccctcacctt ca 22

<210> SEQ ID NO 531
<211> LENGTH: 27
<212> TYPE: DNA
<213> ORGANISM: Artificial Sequence
<220> FEATURE:
<223> OTHER INFORMATION: Synthetic

<400> SEQUENCE: 531
cacaatatgc tggatgactc ctcagac 27

<210> SEQ ID NO 532
<211> LENGTH: 23
<212> TYPE: DNA
<213> ORGANISM: Artificial Sequence
<220> FEATURE:
<223> OTHER INFORMATION: Synthetic

<400> SEQUENCE: 532
tggttgttga ggtccctgaa tcc 23

<210> SEQ ID NO 533
<211> LENGTH: 18
<212> TYPE: DNA
<213> ORGANISM: Artificial Sequence
<220> FEATURE:
<223> OTHER INFORMATION: Synthetic

<400> SEQUENCE: 533
cagggtccag ctggagca 18

<210> SEQ ID NO 534
<211> LENGTH: 22
<212> TYPE: DNA
<213> ORGANISM: Artificial Sequence
<220> FEATURE:
<223> OTHER INFORMATION: Synthetic

<400> SEQUENCE: 534
gagaggcacc cttcacagga aa 22

<210> SEQ ID NO 535
<211> LENGTH: 32
<212> TYPE: DNA
<213> ORGANISM: Artificial Sequence
<220> FEATURE:
<223> OTHER INFORMATION: Synthetic

<400> SEQUENCE: 535
aagaaaatac ttctttgagc tcaactacga ac 32

<210> SEQ ID NO 536
<211> LENGTH: 17
<212> TYPE: DNA
<213> ORGANISM: Artificial Sequence
<220> FEATURE:
<223> OTHER INFORMATION: Synthetic

<400> SEQUENCE: 536
gaaggagccc tgcccca 17

<210> SEQ ID NO 537
<211> LENGTH: 20
<212> TYPE: DNA
<213> ORGANISM: Artificial Sequence
<220> FEATURE:
<223> OTHER INFORMATION: Synthetic

<400> SEQUENCE: 537
agacccccaa gggatcctcc 20

<210> SEQ ID NO 538
<211> LENGTH: 20
<212> TYPE: DNA
<213> ORGANISM: Artificial Sequence
<220> FEATURE:
<223> OTHER INFORMATION: Synthetic

<400> SEQUENCE: 538
ttcggctcct gccacatcaa 20

<210> SEQ ID NO 539
<211> LENGTH: 24
<212> TYPE: DNA
<213> ORGANISM: Artificial Sequence
<220> FEATURE:
<223> OTHER INFORMATION: Synthetic

<400> SEQUENCE: 539
tgcctctcac ttcctctcct taca 24

<210> SEQ ID NO 540
<211> LENGTH: 24
<212> TYPE: DNA
<213> ORGANISM: Artificial Sequence
<220> FEATURE:
<223> OTHER INFORMATION: Synthetic

<400> SEQUENCE: 540
gtagccagac tgatcactcc caaa 24

<210> SEQ ID NO 541
<211> LENGTH: 18
<212> TYPE: DNA
<213> ORGANISM: Artificial Sequence
<220> FEATURE:
<223> OTHER INFORMATION: Synthetic

<400> SEQUENCE: 541
gcagcagcag cagcagca 18

<210> SEQ ID NO 542
<211> LENGTH: 18
<212> TYPE: DNA
<213> ORGANISM: Artificial Sequence
<220> FEATURE:
<223> OTHER INFORMATION: Synthetic

<400> SEQUENCE: 542
gacgttgccg aagcccac 18

<210> SEQ ID NO 543
<211> LENGTH: 24
<212> TYPE: DNA
<213> ORGANISM: Artificial Sequence
<220> FEATURE:
<223> OTHER INFORMATION: Synthetic

<400> SEQUENCE: 543
agataggcaa accctacaac agca 24

<210> SEQ ID NO 544
<211> LENGTH: 17
<212> TYPE: DNA
<213> ORGANISM: Artificial Sequence
<220> FEATURE:
<223> OTHER INFORMATION: Synthetic

<400> SEQUENCE: 544
cacaaagcgg gccctcc 17

<210> SEQ ID NO 545
<211> LENGTH: 21

<212> TYPE: DNA
<213> ORGANISM: Artificial Sequence
<220> FEATURE:
<223> OTHER INFORMATION: Synthetic

<400> SEQUENCE: 545
ccccgaggaa tacgtgctga c 21

<210> SEQ ID NO 546
<211> LENGTH: 22
<212> TYPE: DNA
<213> ORGANISM: Artificial Sequence
<220> FEATURE:
<223> OTHER INFORMATION: Synthetic

<400> SEQUENCE: 546
cagtaggctg tggtcctcat ca 22

<210> SEQ ID NO 547
<211> LENGTH: 22
<212> TYPE: DNA
<213> ORGANISM: Artificial Sequence
<220> FEATURE:
<223> OTHER INFORMATION: Synthetic

<400> SEQUENCE: 547
gcccattgta gctgaggagg ac 22

<210> SEQ ID NO 548
<211> LENGTH: 23
<212> TYPE: DNA
<213> ORGANISM: Artificial Sequence
<220> FEATURE:
<223> OTHER INFORMATION: Synthetic

<400> SEQUENCE: 548
gggtgctggt ctcataggtc tca 23

<210> SEQ ID NO 549
<211> LENGTH: 25
<212> TYPE: DNA
<213> ORGANISM: Artificial Sequence
<220> FEATURE:
<223> OTHER INFORMATION: Synthetic

<400> SEQUENCE: 549
agctcctaca tcaccagtga gatcc 25

<210> SEQ ID NO 550
<211> LENGTH: 20
<212> TYPE: DNA
<213> ORGANISM: Artificial Sequence
<220> FEATURE:
<223> OTHER INFORMATION: Synthetic

<400> SEQUENCE: 550
ccggtttggt tctcccgaga 20

<210> SEQ ID NO 551
<211> LENGTH: 22
<212> TYPE: DNA
<213> ORGANISM: Artificial Sequence
<220> FEATURE:
<223> OTHER INFORMATION: Synthetic

<400> SEQUENCE: 551

-continued cccaaggagg agctgctgaa ga 22

<210> SEQ ID NO 552
<211> LENGTH: 19
<212> TYPE: DNA
<213> ORGANISM: Artificial Sequence
<220> FEATURE:
<223> OTHER INFORMATION: Synthetic

<400> SEQUENCE: 552
tgaatcccca agcccgtcc 19

<210> SEQ ID NO 553
<211> LENGTH: 18
<212> TYPE: DNA
<213> ORGANISM: Artificial Sequence
<220> FEATURE:
<223> OTHER INFORMATION: Synthetic

<400> SEQUENCE: 553
ggcacacgag cagggaca 18

<210> SEQ ID NO 554
<211> LENGTH: 25
<212> TYPE: DNA
<213> ORGANISM: Artificial Sequence
<220> FEATURE:
<223> OTHER INFORMATION: Synthetic

<400> SEQUENCE: 554
gctcaggaac ttcaggattg ctacc 25

<210> SEQ ID NO 555
<211> LENGTH: 39
<212> TYPE: DNA
<213> ORGANISM: Artificial Sequence
<220> FEATURE:
<223> OTHER INFORMATION: Synthetic

<400> SEQUENCE: 555
agaaacaaag tagatgcatt tgattcaagt ttcttaaaa 39

<210> SEQ ID NO 556
<211> LENGTH: 29
<212> TYPE: DNA
<213> ORGANISM: Artificial Sequence
<220> FEATURE:
<223> OTHER INFORMATION: Synthetic

<400> SEQUENCE: 556
ggaattctgc agcaatttcc tcaaaagac 29

<210> SEQ ID NO 557
<211> LENGTH: 28
<212> TYPE: DNA
<213> ORGANISM: Artificial Sequence
<220> FEATURE:
<223> OTHER INFORMATION: Synthetic

<400> SEQUENCE: 557
gacttctgtg gaccttatgt gtttttcc 28

<210> SEQ ID NO 558
<211> LENGTH: 25
<212> TYPE: DNA
<213> ORGANISM: Artificial Sequence -continued
<220> FEATURE:
<223> OTHER INFORMATION: Synthetic

<400> SEQUENCE: 558
cagggtccta cacacaaatc agtca 25

<210> SEQ ID NO 559
<211> LENGTH: 24
<212> TYPE: DNA
<213> ORGANISM: Artificial Sequence
<220> FEATURE:
<223> OTHER INFORMATION: Synthetic

<400> SEQUENCE: 559
ccttctgtct cggtttcttc tcca 24

<210> SEQ ID NO 560
<211> LENGTH: 22
<212> TYPE: DNA
<213> ORGANISM: Artificial Sequence
<220> FEATURE:
<223> OTHER INFORMATION: Synthetic

<400> SEQUENCE: 560
gttcagggac ctggtcactc ac 22

<210> SEQ ID NO 561
<211> LENGTH: 16
<212> TYPE: DNA
<213> ORGANISM: Artificial Sequence
<220> FEATURE:
<223> OTHER INFORMATION: Synthetic

<400> SEQUENCE: 561
ggcctgcagc gccaga 16

<210> SEQ ID NO 562
<211> LENGTH: 18
<212> TYPE: DNA
<213> ORGANISM: Artificial Sequence
<220> FEATURE:
<223> OTHER INFORMATION: Synthetic

<400> SEQUENCE: 562
agggcgttgg cgttttcc 18

<210> SEQ ID NO 563
<211> LENGTH: 21
<212> TYPE: DNA
<213> ORGANISM: Artificial Sequence
<220> FEATURE:
<223> OTHER INFORMATION: Synthetic

<400> SEQUENCE: 563
agggcttgat ggcctctcag a 21

<210> SEQ ID NO 564
<211> LENGTH: 24
<212> TYPE: DNA
<213> ORGANISM: Artificial Sequence
<220> FEATURE:
<223> OTHER INFORMATION: Synthetic

<400> SEQUENCE: 564
agcctaccca tcttccattc ctca 24

-continued

<210> SEQ ID NO 565
<211> LENGTH: 18
<212> TYPE: DNA
<213> ORGANISM: Artificial Sequence
<220> FEATURE:
<223> OTHER INFORMATION: Synthetic

<400> SEQUENCE: 565
gccaggcccc cttaggac 18

<210> SEQ ID NO 566
<211> LENGTH: 22
<212> TYPE: DNA
<213> ORGANISM: Artificial Sequence
<220> FEATURE:
<223> OTHER INFORMATION: Synthetic

<400> SEQUENCE: 566
gcttctgcac tgaaagggct ca 22

<210> SEQ ID NO 567
<211> LENGTH: 19
<212> TYPE: DNA
<213> ORGANISM: Artificial Sequence
<220> FEATURE:
<223> OTHER INFORMATION: Synthetic

<400> SEQUENCE: 567
ccacatggcc taccctccc 19

<210> SEQ ID NO 568
<211> LENGTH: 17
<212> TYPE: DNA
<213> ORGANISM: Artificial Sequence
<220> FEATURE:
<223> OTHER INFORMATION: Synthetic

<400> SEQUENCE: 568
gcctgtgccc agcagca 17

<210> SEQ ID NO 569
<211> LENGTH: 17
<212> TYPE: DNA
<213> ORGANISM: Artificial Sequence
<220> FEATURE:
<223> OTHER INFORMATION: Synthetic

<400> SEQUENCE: 569
gcctaccctg gcagccc 17

<210> SEQ ID NO 570
<211> LENGTH: 21
<212> TYPE: DNA
<213> ORGANISM: Artificial Sequence
<220> FEATURE:
<223> OTHER INFORMATION: Synthetic

<400> SEQUENCE: 570
caactcctgc ctccgctcta c 21

<210> SEQ ID NO 571
<211> LENGTH: 24
<212> TYPE: DNA
<213> ORGANISM: Artificial Sequence
<220> FEATURE:
<223> OTHER INFORMATION: Synthetic

<400> SEQUENCE: 571
gccaggttga gcaggtaaat gtca 24

<210> SEQ ID NO 572
<211> LENGTH: 23
<212> TYPE: DNA
<213> ORGANISM: Artificial Sequence
<220> FEATURE:
<223> OTHER INFORMATION: Synthetic

<400> SEQUENCE: 572
ccactctcct cctacactgt ccc 23

<210> SEQ ID NO 573
<211> LENGTH: 19
<212> TYPE: DNA
<213> ORGANISM: Artificial Sequence
<220> FEATURE:
<223> OTHER INFORMATION: Synthetic

<400> SEQUENCE: 573
aggcccccat cgatctccc 19

<210> SEQ ID NO 574
<211> LENGTH: 29
<212> TYPE: DNA
<213> ORGANISM: Artificial Sequence
<220> FEATURE:
<223> OTHER INFORMATION: Synthetic

<400> SEQUENCE: 574
gcaaagatgg ctctcttcat catagtgaa 29

<210> SEQ ID NO 575
<211> LENGTH: 21
<212> TYPE: DNA
<213> ORGANISM: Artificial Sequence
<220> FEATURE:
<223> OTHER INFORMATION: Synthetic

<400> SEQUENCE: 575
cgttctcaca tgcatgcccc c 21

<210> SEQ ID NO 576
<211> LENGTH: 20
<212> TYPE: DNA
<213> ORGANISM: Artificial Sequence
<220> FEATURE:
<223> OTHER INFORMATION: Synthetic

<400> SEQUENCE: 576
accaaaatcg aggtggccca 20

<210> SEQ ID NO 577
<211> LENGTH: 38
<212> TYPE: DNA
<213> ORGANISM: Artificial Sequence
<220> FEATURE:
<223> OTHER INFORMATION: Synthetic

<400> SEQUENCE: 577
catcagaaag aaaaatgaat ctgcaacttc aatagtca 38

<210> SEQ ID NO 578

<211> LENGTH: 19
<212> TYPE: DNA
<213> ORGANISM: Artificial Sequence
<220> FEATURE:
<223> OTHER INFORMATION: Synthetic

<400> SEQUENCE: 578
caggacccca gctgtccaa 19

<210> SEQ ID NO 579
<211> LENGTH: 19
<212> TYPE: DNA
<213> ORGANISM: Artificial Sequence
<220> FEATURE:
<223> OTHER INFORMATION: Synthetic

<400> SEQUENCE: 579
cgggaagacc atcgcctcc 19

<210> SEQ ID NO 580
<211> LENGTH: 22
<212> TYPE: DNA
<213> ORGANISM: Artificial Sequence
<220> FEATURE:
<223> OTHER INFORMATION: Synthetic

<400> SEQUENCE: 580
gcacccctat gaagacccag aa 22

<210> SEQ ID NO 581
<211> LENGTH: 24
<212> TYPE: DNA
<213> ORGANISM: Artificial Sequence
<220> FEATURE:
<223> OTHER INFORMATION: Synthetic

<400> SEQUENCE: 581
caaaggtcac ttcaggttga ggca 24

<210> SEQ ID NO 582
<211> LENGTH: 23
<212> TYPE: DNA
<213> ORGANISM: Artificial Sequence
<220> FEATURE:
<223> OTHER INFORMATION: Synthetic

<400> SEQUENCE: 582
tccagtgttg tagccaaact gca 23

<210> SEQ ID NO 583
<211> LENGTH: 23
<212> TYPE: DNA
<213> ORGANISM: Artificial Sequence
<220> FEATURE:
<223> OTHER INFORMATION: Synthetic

<400> SEQUENCE: 583
gtgtggtttg tttctccgca gaa 23

<210> SEQ ID NO 584
<211> LENGTH: 16
<212> TYPE: DNA
<213> ORGANISM: Artificial Sequence
<220> FEATURE:
<223> OTHER INFORMATION: Synthetic

<400> SEQUENCE: 584
ggcaccacct tgcgca 16

<210> SEQ ID NO 585
<211> LENGTH: 24
<212> TYPE: DNA
<213> ORGANISM: Artificial Sequence
<220> FEATURE:
<223> OTHER INFORMATION: Synthetic

<400> SEQUENCE: 585
cgcctggagc gttttaaatt gaga 24

<210> SEQ ID NO 586
<211> LENGTH: 37
<212> TYPE: DNA
<213> ORGANISM: Artificial Sequence
<220> FEATURE:
<223> OTHER INFORMATION: Synthetic

<400> SEQUENCE: 586
gttgaaataa cattcaagtt ttcccttact caagtaa 37

<210> SEQ ID NO 587
<211> LENGTH: 28
<212> TYPE: DNA
<213> ORGANISM: Artificial Sequence
<220> FEATURE:
<223> OTHER INFORMATION: Synthetic

<400> SEQUENCE: 587
cagaatatgg tcctctttgc tcctaaca 28

<210> SEQ ID NO 588
<211> LENGTH: 18
<212> TYPE: DNA
<213> ORGANISM: Artificial Sequence
<220> FEATURE:
<223> OTHER INFORMATION: Synthetic

<400> SEQUENCE: 588
cagcagaacc acgggcac 18

<210> SEQ ID NO 589
<211> LENGTH: 24
<212> TYPE: DNA
<213> ORGANISM: Artificial Sequence
<220> FEATURE:
<223> OTHER INFORMATION: Synthetic

<400> SEQUENCE: 589
ccacacgctt ccctctaatt ggac 24

<210> SEQ ID NO 590
<211> LENGTH: 22
<212> TYPE: DNA
<213> ORGANISM: Artificial Sequence
<220> FEATURE:
<223> OTHER INFORMATION: Synthetic

<400> SEQUENCE: 590
agctggaggg cagtatcact ca 22

<210> SEQ ID NO 591
<211> LENGTH: 21
<212> TYPE: DNA

<213> ORGANISM: Artificial Sequence
<220> FEATURE:
<223> OTHER INFORMATION: Synthetic

<400> SEQUENCE: 591
ggtggacagg aagcatgtcc c 21

<210> SEQ ID NO 592
<211> LENGTH: 19
<212> TYPE: DNA
<213> ORGANISM: Artificial Sequence
<220> FEATURE:
<223> OTHER INFORMATION: Synthetic

<400> SEQUENCE: 592
gaggcgatgg tcttcccga 19

<210> SEQ ID NO 593
<211> LENGTH: 19
<212> TYPE: DNA
<213> ORGANISM: Artificial Sequence
<220> FEATURE:
<223> OTHER INFORMATION: Synthetic

<400> SEQUENCE: 593
ccgtggctga ccactgtcc 19

<210> SEQ ID NO 594
<211> LENGTH: 19
<212> TYPE: DNA
<213> ORGANISM: Artificial Sequence
<220> FEATURE:
<223> OTHER INFORMATION: Synthetic

<400> SEQUENCE: 594
cgagctgcgg ccattctca 19

<210> SEQ ID NO 595
<211> LENGTH: 19
<212> TYPE: DNA
<213> ORGANISM: Artificial Sequence
<220> FEATURE:
<223> OTHER INFORMATION: Synthetic

<400> SEQUENCE: 595
acctggttcc acagcgcaa 19

<210> SEQ ID NO 596
<211> LENGTH: 20
<212> TYPE: DNA
<213> ORGANISM: Artificial Sequence
<220> FEATURE:
<223> OTHER INFORMATION: Synthetic

<400> SEQUENCE: 596
gaccgtctgc tacctcgacc 20

<210> SEQ ID NO 597
<211> LENGTH: 26
<212> TYPE: DNA
<213> ORGANISM: Artificial Sequence
<220> FEATURE:
<223> OTHER INFORMATION: Synthetic

<400> SEQUENCE: 597
caagattccc atttggagga acggaa 26

<210> SEQ ID NO 598
<211> LENGTH: 35
<212> TYPE: DNA
<213> ORGANISM: Artificial Sequence
<220> FEATURE:
<223> OTHER INFORMATION: Synthetic

<400> SEQUENCE: 598
agcagctaat aataaaccag taatttggga tagac 35

<210> SEQ ID NO 599
<211> LENGTH: 19
<212> TYPE: DNA
<213> ORGANISM: Artificial Sequence
<220> FEATURE:
<223> OTHER INFORMATION: Synthetic

<400> SEQUENCE: 599
gtgactccga gggcagaca 19

<210> SEQ ID NO 600
<211> LENGTH: 36
<212> TYPE: DNA
<213> ORGANISM: Artificial Sequence
<220> FEATURE:
<223> OTHER INFORMATION: Synthetic

<400> SEQUENCE: 600
gtttatgctt atttatgaaa tttgcctacc ttccaa 36

<210> SEQ ID NO 601
<211> LENGTH: 23
<212> TYPE: DNA
<213> ORGANISM: Artificial Sequence
<220> FEATURE:
<223> OTHER INFORMATION: Synthetic

<400> SEQUENCE: 601
ggcagctgct caactaatca cca 23

<210> SEQ ID NO 602
<211> LENGTH: 24
<212> TYPE: DNA
<213> ORGANISM: Artificial Sequence
<220> FEATURE:
<223> OTHER INFORMATION: Synthetic

<400> SEQUENCE: 602
ctgtctgctc ctctctcatc atcc 24

<210> SEQ ID NO 603
<211> LENGTH: 24
<212> TYPE: DNA
<213> ORGANISM: Artificial Sequence
<220> FEATURE:
<223> OTHER INFORMATION: Synthetic

<400> SEQUENCE: 603
ggacagaagc aagtctgcag atca 24

<210> SEQ ID NO 604
<211> LENGTH: 37
<212> TYPE: DNA
<213> ORGANISM: Artificial Sequence
<220> FEATURE:

<223> OTHER INFORMATION: Synthetic

<400> SEQUENCE: 604
tctacaagaa aacatcagaa actcttcatt caataga 37

<210> SEQ ID NO 605
<211> LENGTH: 29
<212> TYPE: DNA
<213> ORGANISM: Artificial Sequence
<220> FEATURE:
<223> OTHER INFORMATION: Synthetic

<400> SEQUENCE: 605
gaagccaagt attgacagct attcgaaga 29

<210> SEQ ID NO 606
<211> LENGTH: 20
<212> TYPE: DNA
<213> ORGANISM: Artificial Sequence
<220> FEATURE:
<223> OTHER INFORMATION: Synthetic

<400> SEQUENCE: 606
gggaagggtc aggaaagcca 20

<210> SEQ ID NO 607
<211> LENGTH: 23
<212> TYPE: DNA
<213> ORGANISM: Artificial Sequence
<220> FEATURE:
<223> OTHER INFORMATION: Synthetic

<400> SEQUENCE: 607
cgagagcgga ttgagttcct caa 23

<210> SEQ ID NO 608
<211> LENGTH: 18
<212> TYPE: DNA
<213> ORGANISM: Artificial Sequence
<220> FEATURE:
<223> OTHER INFORMATION: Synthetic

<400> SEQUENCE: 608
gagccacgag ctcccaca 18

<210> SEQ ID NO 609
<211> LENGTH: 22
<212> TYPE: DNA
<213> ORGANISM: Artificial Sequence
<220> FEATURE:
<223> OTHER INFORMATION: Synthetic

<400> SEQUENCE: 609
ggtagccctt taaaaggcct cc 22

<210> SEQ ID NO 610
<211> LENGTH: 26
<212> TYPE: DNA
<213> ORGANISM: Artificial Sequence
<220> FEATURE:
<223> OTHER INFORMATION: Synthetic

<400> SEQUENCE: 610
cttcttaata agcacctcct tggcca 26

<210> SEQ ID NO 611
<211> LENGTH: 25
<212> TYPE: DNA
<213> ORGANISM: Artificial Sequence
<220> FEATURE:
<223> OTHER INFORMATION: Synthetic

<400> SEQUENCE: 611
cagacacggc catatgcata acaac 25

<210> SEQ ID NO 612
<211> LENGTH: 30
<212> TYPE: DNA
<213> ORGANISM: Artificial Sequence
<220> FEATURE:
<223> OTHER INFORMATION: Synthetic

<400> SEQUENCE: 612
tgacatgttc gaaacctgtc cataaagtaa 30

<210> SEQ ID NO 613
<211> LENGTH: 34
<212> TYPE: DNA
<213> ORGANISM: Artificial Sequence
<220> FEATURE:
<223> OTHER INFORMATION: Synthetic

<400> SEQUENCE: 613
ggaaagaaaa gcttttgttc agagctttag aaaa 34

<210> SEQ ID NO 614
<211> LENGTH: 32
<212> TYPE: DNA
<213> ORGANISM: Artificial Sequence
<220> FEATURE:
<223> OTHER INFORMATION: Synthetic

<400> SEQUENCE: 614
gcaagttctg aatgtaacaa attctccttt cc 32

<210> SEQ ID NO 615
<211> LENGTH: 37
<212> TYPE: DNA
<213> ORGANISM: Artificial Sequence
<220> FEATURE:
<223> OTHER INFORMATION: Synthetic

<400> SEQUENCE: 615
gcaaagcact gtatgatttt tatttaatag gaagaca 37

<210> SEQ ID NO 616
<211> LENGTH: 21
<212> TYPE: DNA
<213> ORGANISM: Artificial Sequence
<220> FEATURE:
<223> OTHER INFORMATION: Synthetic

<400> SEQUENCE: 616
gctgatctgc ttctcccacg a 21

<210> SEQ ID NO 617
<211> LENGTH: 19
<212> TYPE: DNA
<213> ORGANISM: Artificial Sequence
<220> FEATURE:
<223> OTHER INFORMATION: Synthetic

<400> SEQUENCE: 617
agtcgtcgta gccagcgaa 19

<210> SEQ ID NO 618
<211> LENGTH: 21
<212> TYPE: DNA
<213> ORGANISM: Artificial Sequence
<220> FEATURE:
<223> OTHER INFORMATION: Synthetic

<400> SEQUENCE: 618
gcagggctcc ttactgcaga a 21

<210> SEQ ID NO 619
<211> LENGTH: 21
<212> TYPE: DNA
<213> ORGANISM: Artificial Sequence
<220> FEATURE:
<223> OTHER INFORMATION: Synthetic

<400> SEQUENCE: 619
cacgccaccc atcctcaaag a 21

<210> SEQ ID NO 620
<211> LENGTH: 16
<212> TYPE: DNA
<213> ORGANISM: Artificial Sequence
<220> FEATURE:
<223> OTHER INFORMATION: Synthetic

<400> SEQUENCE: 620
gcacagggcg ctcacc 16

<210> SEQ ID NO 621
<211> LENGTH: 18
<212> TYPE: DNA
<213> ORGANISM: Artificial Sequence
<220> FEATURE:
<223> OTHER INFORMATION: Synthetic

<400> SEQUENCE: 621
cctaccagca gccgctca 18

<210> SEQ ID NO 622
<211> LENGTH: 22
<212> TYPE: DNA
<213> ORGANISM: Artificial Sequence
<220> FEATURE:
<223> OTHER INFORMATION: Synthetic

<400> SEQUENCE: 622
aggctccctt agatgcctga ca 22

<210> SEQ ID NO 623
<211> LENGTH: 17
<212> TYPE: DNA
<213> ORGANISM: Artificial Sequence
<220> FEATURE:
<223> OTHER INFORMATION: Synthetic

<400> SEQUENCE: 623
cagggcgctg acaccca 17

<210> SEQ ID NO 624
<211> LENGTH: 27

<212> TYPE: DNA
<213> ORGANISM: Artificial Sequence
<220> FEATURE:
<223> OTHER INFORMATION: Synthetic

<400> SEQUENCE: 624
atttctcctc tgtgtcttga agggaac 27

<210> SEQ ID NO 625
<211> LENGTH: 18
<212> TYPE: DNA
<213> ORGANISM: Artificial Sequence
<220> FEATURE:
<223> OTHER INFORMATION: Synthetic

<400> SEQUENCE: 625
ctgcccccct caccctac 18

<210> SEQ ID NO 626
<211> LENGTH: 23
<212> TYPE: DNA
<213> ORGANISM: Artificial Sequence
<220> FEATURE:
<223> OTHER INFORMATION: Synthetic

<400> SEQUENCE: 626
cctttcattt ttcccggcac aga 23

<210> SEQ ID NO 627
<211> LENGTH: 21
<212> TYPE: DNA
<213> ORGANISM: Artificial Sequence
<220> FEATURE:
<223> OTHER INFORMATION: Synthetic

<400> SEQUENCE: 627
gggaacttct ttcccctcgc a 21

<210> SEQ ID NO 628
<211> LENGTH: 25
<212> TYPE: DNA
<213> ORGANISM: Artificial Sequence
<220> FEATURE:
<223> OTHER INFORMATION: Synthetic

<400> SEQUENCE: 628
ggagtttctg tcctgggagg aaaaa 25

<210> SEQ ID NO 629
<211> LENGTH: 20
<212> TYPE: DNA
<213> ORGANISM: Artificial Sequence
<220> FEATURE:
<223> OTHER INFORMATION: Synthetic

<400> SEQUENCE: 629
aacactcgtg aagctggcca 20

<210> SEQ ID NO 630
<211> LENGTH: 18
<212> TYPE: DNA
<213> ORGANISM: Artificial Sequence
<220> FEATURE:
<223> OTHER INFORMATION: Synthetic

<400> SEQUENCE: 630

-continued ggccacagag cctggaga 18

<210> SEQ ID NO 631
<211> LENGTH: 19
<212> TYPE: DNA
<213> ORGANISM: Artificial Sequence
<220> FEATURE:
<223> OTHER INFORMATION: Synthetic

<400> SEQUENCE: 631
cggcttgcct gtgcagtca 19

<210> SEQ ID NO 632
<211> LENGTH: 19
<212> TYPE: DNA
<213> ORGANISM: Artificial Sequence
<220> FEATURE:
<223> OTHER INFORMATION: Synthetic

<400> SEQUENCE: 632
gccagccccc ttcctttcc 19

<210> SEQ ID NO 633
<211> LENGTH: 22
<212> TYPE: DNA
<213> ORGANISM: Artificial Sequence
<220> FEATURE:
<223> OTHER INFORMATION: Synthetic

<400> SEQUENCE: 633
acactgccag gagacacaga ac 22

<210> SEQ ID NO 634
<211> LENGTH: 23
<212> TYPE: DNA
<213> ORGANISM: Artificial Sequence
<220> FEATURE:
<223> OTHER INFORMATION: Synthetic

<400> SEQUENCE: 634
ggagcagatc ctggcaaaga tcc 23

<210> SEQ ID NO 635
<211> LENGTH: 22
<212> TYPE: DNA
<213> ORGANISM: Artificial Sequence
<220> FEATURE:
<223> OTHER INFORMATION: Synthetic

<400> SEQUENCE: 635
cgtactgcac aaacttgctg ca 22

<210> SEQ ID NO 636
<211> LENGTH: 32
<212> TYPE: DNA
<213> ORGANISM: Artificial Sequence
<220> FEATURE:
<223> OTHER INFORMATION: Synthetic

<400> SEQUENCE: 636
ggtgtaggta gagataagaa gagtgatact ca 32

<210> SEQ ID NO 637
<211> LENGTH: 19
<212> TYPE: DNA
<213> ORGANISM: Artificial Sequence
<220> FEATURE:
<223> OTHER INFORMATION: Synthetic

<400> SEQUENCE: 637
gctggtgact tgccccaga 19

<210> SEQ ID NO 638
<211> LENGTH: 24
<212> TYPE: DNA
<213> ORGANISM: Artificial Sequence
<220> FEATURE:
<223> OTHER INFORMATION: Synthetic

<400> SEQUENCE: 638
tgtcataatg cagtgggatt gcca 24

<210> SEQ ID NO 639
<211> LENGTH: 22
<212> TYPE: DNA
<213> ORGANISM: Artificial Sequence
<220> FEATURE:
<223> OTHER INFORMATION: Synthetic

<400> SEQUENCE: 639
caagctggca atggtggaca ca 22

<210> SEQ ID NO 640
<211> LENGTH: 44
<212> TYPE: DNA
<213> ORGANISM: Artificial Sequence
<220> FEATURE:
<223> OTHER INFORMATION: Synthetic

<400> SEQUENCE: 640
cttcattgct actgcatatc taaaatcatt tatttattta tcca 44

<210> SEQ ID NO 641
<211> LENGTH: 45
<212> TYPE: DNA
<213> ORGANISM: Artificial Sequence
<220> FEATURE:
<223> OTHER INFORMATION: Synthetic

<400> SEQUENCE: 641
actataaaac atgaaaatat gctatcagtt ttagaatgtt atcca 45

<210> SEQ ID NO 642
<211> LENGTH: 26
<212> TYPE: DNA
<213> ORGANISM: Artificial Sequence
<220> FEATURE:
<223> OTHER INFORMATION: Synthetic

<400> SEQUENCE: 642
ttttaactct ctgctgttcc ctcacc 26

<210> SEQ ID NO 643
<211> LENGTH: 25
<212> TYPE: DNA
<213> ORGANISM: Artificial Sequence
<220> FEATURE:
<223> OTHER INFORMATION: Synthetic

<400> SEQUENCE: 643
actgacaggg aatctccaga agtca 25

<210> SEQ ID NO 644
<211> LENGTH: 30
<212> TYPE: DNA
<213> ORGANISM: Artificial Sequence
<220> FEATURE:
<223> OTHER INFORMATION: Synthetic

<400> SEQUENCE: 644
cttcttggtg catactaagt gctcaataaa 30

<210> SEQ ID NO 645
<211> LENGTH: 37
<212> TYPE: DNA
<213> ORGANISM: Artificial Sequence
<220> FEATURE:
<223> OTHER INFORMATION: Synthetic

<400> SEQUENCE: 645
catcttttca aaagtaagaa gtacgtatga agaaaca 37

<210> SEQ ID NO 646
<211> LENGTH: 24
<212> TYPE: DNA
<213> ORGANISM: Artificial Sequence
<220> FEATURE:
<223> OTHER INFORMATION: Synthetic

<400> SEQUENCE: 646
ggtcagccaa cttgtattga gcaa 24

<210> SEQ ID NO 647
<211> LENGTH: 35
<212> TYPE: DNA
<213> ORGANISM: Artificial Sequence
<220> FEATURE:
<223> OTHER INFORMATION: Synthetic

<400> SEQUENCE: 647
gaaactaatg cctttatctt atttgtctgt tgacc 35

<210> SEQ ID NO 648
<211> LENGTH: 27
<212> TYPE: DNA
<213> ORGANISM: Artificial Sequence
<220> FEATURE:
<223> OTHER INFORMATION: Synthetic

<400> SEQUENCE: 648
gacctgattt gattgagagc cttgaac 27

<210> SEQ ID NO 649
<211> LENGTH: 29
<212> TYPE: DNA
<213> ORGANISM: Artificial Sequence
<220> FEATURE:
<223> OTHER INFORMATION: Synthetic

<400> SEQUENCE: 649
acaagccctg gactagatga tttctaaga 29

<210> SEQ ID NO 650
<211> LENGTH: 26
<212> TYPE: DNA
<213> ORGANISM: Artificial Sequence
<220> FEATURE:
<223> OTHER INFORMATION: Synthetic

<400> SEQUENCE: 650
tctttctcaa atcaaaccct cgtccc 26

<210> SEQ ID NO 651
<211> LENGTH: 23
<212> TYPE: DNA
<213> ORGANISM: Artificial Sequence
<220> FEATURE:
<223> OTHER INFORMATION: Synthetic

<400> SEQUENCE: 651
ggccccactg tattagagag gac 23

<210> SEQ ID NO 652
<211> LENGTH: 17
<212> TYPE: DNA
<213> ORGANISM: Artificial Sequence
<220> FEATURE:
<223> OTHER INFORMATION: Synthetic

<400> SEQUENCE: 652
cggagggacc ttgggca 17

<210> SEQ ID NO 653
<211> LENGTH: 21
<212> TYPE: DNA
<213> ORGANISM: Artificial Sequence
<220> FEATURE:
<223> OTHER INFORMATION: Synthetic

<400> SEQUENCE: 653
caccgagcca cccatgtgta a 21

<210> SEQ ID NO 654
<211> LENGTH: 23
<212> TYPE: DNA
<213> ORGANISM: Artificial Sequence
<220> FEATURE:
<223> OTHER INFORMATION: Synthetic

<400> SEQUENCE: 654
ggtgatgcaa aagatggaag cca 23

<210> SEQ ID NO 655
<211> LENGTH: 26
<212> TYPE: DNA
<213> ORGANISM: Artificial Sequence
<220> FEATURE:
<223> OTHER INFORMATION: Synthetic

<400> SEQUENCE: 655
ccattttgga atgtgaccgt ctgtcc 26

<210> SEQ ID NO 656
<211> LENGTH: 20
<212> TYPE: DNA
<213> ORGANISM: Artificial Sequence
<220> FEATURE:
<223> OTHER INFORMATION: Synthetic

<400> SEQUENCE: 656
gagagggtca tgcagtggca 20

<210> SEQ ID NO 657

-continued

<211> LENGTH: 21
<212> TYPE: DNA
<213> ORGANISM: Artificial Sequence
<220> FEATURE:
<223> OTHER INFORMATION: Synthetic

<400> SEQUENCE: 657
tccggtgctc catggatgac a 21

<210> SEQ ID NO 658
<211> LENGTH: 25
<212> TYPE: DNA
<213> ORGANISM: Artificial Sequence
<220> FEATURE:
<223> OTHER INFORMATION: Synthetic

<400> SEQUENCE: 658
gccatactgc agcactttaa aggac 25

<210> SEQ ID NO 659
<211> LENGTH: 28
<212> TYPE: DNA
<213> ORGANISM: Artificial Sequence
<220> FEATURE:
<223> OTHER INFORMATION: Synthetic

<400> SEQUENCE: 659
ctgctgtgat ttatctgctg aaagctca 28

<210> SEQ ID NO 660
<211> LENGTH: 23
<212> TYPE: DNA
<213> ORGANISM: Artificial Sequence
<220> FEATURE:
<223> OTHER INFORMATION: Synthetic

<400> SEQUENCE: 660
catctaactg ctccccagtc aca 23

<210> SEQ ID NO 661
<211> LENGTH: 19
<212> TYPE: DNA
<213> ORGANISM: Artificial Sequence
<220> FEATURE:
<223> OTHER INFORMATION: Synthetic

<400> SEQUENCE: 661
gccctcggtc ctccaggaa 19

<210> SEQ ID NO 662
<211> LENGTH: 19
<212> TYPE: DNA
<213> ORGANISM: Artificial Sequence
<220> FEATURE:
<223> OTHER INFORMATION: Synthetic

<400> SEQUENCE: 662
ccacccaccc aggacacac 19

<210> SEQ ID NO 663
<211> LENGTH: 18
<212> TYPE: DNA
<213> ORGANISM: Artificial Sequence
<220> FEATURE:
<223> OTHER INFORMATION: Synthetic

<400> SEQUENCE: 663
ccccaacggc caggcaaa 18

<210> SEQ ID NO 664
<211> LENGTH: 31
<212> TYPE: DNA
<213> ORGANISM: Artificial Sequence
<220> FEATURE:
<223> OTHER INFORMATION: Synthetic

<400> SEQUENCE: 664
ggacaaatgt tctgggtctc taatattcca a 31

<210> SEQ ID NO 665
<211> LENGTH: 17
<212> TYPE: DNA
<213> ORGANISM: Artificial Sequence
<220> FEATURE:
<223> OTHER INFORMATION: Synthetic

<400> SEQUENCE: 665
gggtgggacg gagtccc 17

<210> SEQ ID NO 666
<211> LENGTH: 24
<212> TYPE: DNA
<213> ORGANISM: Artificial Sequence
<220> FEATURE:
<223> OTHER INFORMATION: Synthetic

<400> SEQUENCE: 666
gtttgcctta ccttggaagt ggac 24

<210> SEQ ID NO 667
<211> LENGTH: 27
<212> TYPE: DNA
<213> ORGANISM: Artificial Sequence
<220> FEATURE:
<223> OTHER INFORMATION: Synthetic

<400> SEQUENCE: 667
tgctgagaag attgacaggt tcatgca 27

<210> SEQ ID NO 668
<211> LENGTH: 16
<212> TYPE: DNA
<213> ORGANISM: Artificial Sequence
<220> FEATURE:
<223> OTHER INFORMATION: Synthetic

<400> SEQUENCE: 668
ctgccccagg gctcga 16

<210> SEQ ID NO 669
<211> LENGTH: 20
<212> TYPE: DNA
<213> ORGANISM: Artificial Sequence
<220> FEATURE:
<223> OTHER INFORMATION: Synthetic

<400> SEQUENCE: 669
ggcctctctc cccaggaaca 20

<210> SEQ ID NO 670
<211> LENGTH: 25
<212> TYPE: DNA

-continued

<213> ORGANISM: Artificial Sequence
<220> FEATURE:
<223> OTHER INFORMATION: Synthetic

<400> SEQUENCE: 670
agagcttcct gcagtcaatg atcac 25

<210> SEQ ID NO 671
<211> LENGTH: 25
<212> TYPE: DNA
<213> ORGANISM: Artificial Sequence
<220> FEATURE:
<223> OTHER INFORMATION: Synthetic

<400> SEQUENCE: 671
caaggtgaaa tgggaagctc tgtca 25

<210> SEQ ID NO 672
<211> LENGTH: 20
<212> TYPE: DNA
<213> ORGANISM: Artificial Sequence
<220> FEATURE:
<223> OTHER INFORMATION: Synthetic

<400> SEQUENCE: 672
ctcagcctga tgggagacga 20

<210> SEQ ID NO 673
<211> LENGTH: 20
<212> TYPE: DNA
<213> ORGANISM: Artificial Sequence
<220> FEATURE:
<223> OTHER INFORMATION: Synthetic

<400> SEQUENCE: 673
agtttcctcc ctcctcccca 20

<210> SEQ ID NO 674
<211> LENGTH: 17
<212> TYPE: DNA
<213> ORGANISM: Artificial Sequence
<220> FEATURE:
<223> OTHER INFORMATION: Synthetic

<400> SEQUENCE: 674
ggcccagcca ctgacca 17

<210> SEQ ID NO 675
<211> LENGTH: 25
<212> TYPE: DNA
<213> ORGANISM: Artificial Sequence
<220> FEATURE:
<223> OTHER INFORMATION: Synthetic

<400> SEQUENCE: 675
cttcttggct gttgtttctg ttccc 25

<210> SEQ ID NO 676
<211> LENGTH: 16
<212> TYPE: DNA
<213> ORGANISM: Artificial Sequence
<220> FEATURE:
<223> OTHER INFORMATION: Synthetic

<400> SEQUENCE: 676
cccgactgtg ccgcca 16

<210> SEQ ID NO 677
<211> LENGTH: 23
<212> TYPE: DNA
<213> ORGANISM: Artificial Sequence
<220> FEATURE:
<223> OTHER INFORMATION: Synthetic

<400> SEQUENCE: 677 gcccttttc caggtctgac aac 23

<210> SEQ ID NO 678
<211> LENGTH: 23
<212> TYPE: DNA
<213> ORGANISM: Artificial Sequence
<220> FEATURE:
<223> OTHER INFORMATION: Synthetic

<400> SEQUENCE: 678
cctctcaatg ggtcacttgg caa 23

<210> SEQ ID NO 679
<211> LENGTH: 28
<212> TYPE: DNA
<213> ORGANISM: Artificial Sequence
<220> FEATURE:
<223> OTHER INFORMATION: Synthetic

<400> SEQUENCE: 679
gtccaaattt ctgttgggtt cagtgaaa 28

<210> SEQ ID NO 680
<211> LENGTH: 20
<212> TYPE: DNA
<213> ORGANISM: Artificial Sequence
<220> FEATURE:
<223> OTHER INFORMATION: Synthetic

<400> SEQUENCE: 680
gaagggccaa tagccctccc 20

<210> SEQ ID NO 681
<211> LENGTH: 21
<212> TYPE: DNA
<213> ORGANISM: Artificial Sequence
<220> FEATURE:
<223> OTHER INFORMATION: Synthetic

<400> SEQUENCE: 681
gccccagcca agaaaggtca a 21

<210> SEQ ID NO 682
<211> LENGTH: 22
<212> TYPE: DNA
<213> ORGANISM: Artificial Sequence
<220> FEATURE:
<223> OTHER INFORMATION: Synthetic

<400> SEQUENCE: 682
ttctcctggc ctgtagggag aa 22

<210> SEQ ID NO 683
<211> LENGTH: 21
<212> TYPE: DNA
<213> ORGANISM: Artificial Sequence
<220> FEATURE:

<223> OTHER INFORMATION: Synthetic

<400> SEQUENCE: 683
ccctcgtcac ttcctctgtc c 21

<210> SEQ ID NO 684
<211> LENGTH: 20
<212> TYPE: DNA
<213> ORGANISM: Artificial Sequence
<220> FEATURE:
<223> OTHER INFORMATION: Synthetic

<400> SEQUENCE: 684
gtgtctcctt cacccccacc 20

<210> SEQ ID NO 685
<211> LENGTH: 29
<212> TYPE: DNA
<213> ORGANISM: Artificial Sequence
<220> FEATURE:
<223> OTHER INFORMATION: Synthetic

<400> SEQUENCE: 685
actttcccct tttcatgcct tattctgac 29

<210> SEQ ID NO 686
<211> LENGTH: 29
<212> TYPE: DNA
<213> ORGANISM: Artificial Sequence
<220> FEATURE:
<223> OTHER INFORMATION: Synthetic

<400> SEQUENCE: 686
gcatgtattt agagaagcgc tcatattcc 29

<210> SEQ ID NO 687
<211> LENGTH: 27
<212> TYPE: DNA
<213> ORGANISM: Artificial Sequence
<220> FEATURE:
<223> OTHER INFORMATION: Synthetic

<400> SEQUENCE: 687
tgtttttgtg acagtcactt ccctaga 27

<210> SEQ ID NO 688
<211> LENGTH: 16
<212> TYPE: DNA
<213> ORGANISM: Artificial Sequence
<220> FEATURE:
<223> OTHER INFORMATION: Synthetic

<400> SEQUENCE: 688
cgaccaggca ggccac 16

<210> SEQ ID NO 689
<211> LENGTH: 19
<212> TYPE: DNA
<213> ORGANISM: Artificial Sequence
<220> FEATURE:
<223> OTHER INFORMATION: Synthetic

<400> SEQUENCE: 689
gtcctgctca cacagcccc 19

-continued

<210> SEQ ID NO 690
<211> LENGTH: 18
<212> TYPE: DNA
<213> ORGANISM: Artificial Sequence
<220> FEATURE:
<223> OTHER INFORMATION: Synthetic

<400> SEQUENCE: 690
ggtggctgcg tccttcca 18

<210> SEQ ID NO 691
<211> LENGTH: 18
<212> TYPE: DNA
<213> ORGANISM: Artificial Sequence
<220> FEATURE:
<223> OTHER INFORMATION: Synthetic

<400> SEQUENCE: 691
gccgtgttag caccgcac 18

<210> SEQ ID NO 692
<211> LENGTH: 23
<212> TYPE: DNA
<213> ORGANISM: Artificial Sequence
<220> FEATURE:
<223> OTHER INFORMATION: Synthetic

<400> SEQUENCE: 692
ggtgatgcaa aagatggaag cca 23

<210> SEQ ID NO 693
<211> LENGTH: 26
<212> TYPE: DNA
<213> ORGANISM: Artificial Sequence
<220> FEATURE:
<223> OTHER INFORMATION: Synthetic

<400> SEQUENCE: 693
ccattttgga atgtgaccgt ctgtcc 26

<210> SEQ ID NO 694
<211> LENGTH: 16
<212> TYPE: DNA
<213> ORGANISM: Artificial Sequence
<220> FEATURE:
<223> OTHER INFORMATION: Synthetic

<400> SEQUENCE: 694
ggcccgtggt ccacca 16

<210> SEQ ID NO 695
<211> LENGTH: 22
<212> TYPE: DNA
<213> ORGANISM: Artificial Sequence
<220> FEATURE:
<223> OTHER INFORMATION: Synthetic

<400> SEQUENCE: 695
gccaggctga aaagaagcct ca 22

<210> SEQ ID NO 696
<211> LENGTH: 37
<212> TYPE: DNA
<213> ORGANISM: Artificial Sequence
<220> FEATURE:
<223> OTHER INFORMATION: Synthetic

<400> SEQUENCE: 696
gaacacatat aaaaccaaag aagaaatgat tgtagca 37

<210> SEQ ID NO 697
<211> LENGTH: 58
<212> TYPE: DNA
<213> ORGANISM: Artificial Sequence
<220> FEATURE:
<223> OTHER INFORMATION: Synthetic

<400> SEQUENCE: 697
cttttcctta ctttttcata tttattacat aaatataatg ttttacatta tgaaaaca 58

<210> SEQ ID NO 698
<211> LENGTH: 19
<212> TYPE: DNA
<213> ORGANISM: Artificial Sequence
<220> FEATURE:
<223> OTHER INFORMATION: Synthetic

<400> SEQUENCE: 698
cggaatttcc tggccccca 19

<210> SEQ ID NO 699
<211> LENGTH: 16
<212> TYPE: DNA
<213> ORGANISM: Artificial Sequence
<220> FEATURE:
<223> OTHER INFORMATION: Synthetic

<400> SEQUENCE: 699
gtcccggcct gtccca 16

<210> SEQ ID NO 700
<211> LENGTH: 537
<212> TYPE: DNA
<213> ORGANISM: Homo sapiens
<220> FEATURE:
<221> NAME/KEY: misc_feature
<222> LOCATION: (275)..(275)
<223> OTHER INFORMATION: n is c or t.

<400> SEQUENCE: 700
aagttagaag aaccaagact atcttgtcag gggtgtattt tgagagtggc agacttttca 60
gtgcctttcc attcatgaca cttcttgaat ctctggcaga accagccagc cgtgttcaca 120
gtgtcaaatg aagggatgtc tttgattgct tccaggtgtt cctcagcacc accggagggg 180
gatgggtgat cagccgaatc tttgactcgg gctacccatg ggacatggtg ttcatgacac 240
gctttcagaa catgttgaga aattccctcc caacnccaat tgtgacttgg ttgatggagc 300
gaaagataaa caactggctc aatcatgcaa attacggctt aataccagaa gacaggtaaa 360
tataatgtga ctgccaaggg cttttaggaa gaaggagcct ctgcctgtcc agcagcctat 420
acaagccagg cagtaccaca gcaacatggc tgaatgtgtg ggaacacttg atacaaattt 480
gcttgataat aacagctaac tgttcttaag tactcagaaa gtgaaattat gtatttc 537

<210> SEQ ID NO 701
<211> LENGTH: 18
<212> TYPE: DNA
<213> ORGANISM: Homo sapiens

<400> SEQUENCE: 701
cgggctaccc atgggaca 18

<210> SEQ ID NO 702
<211> LENGTH: 31
<212> TYPE: DNA
<213> ORGANISM: Homo sapiens

<400> SEQUENCE: 702
tctggtatta agccgtaatt tgcatgattg a 31

<210> SEQ ID NO 703
<211> LENGTH: 19
<212> TYPE: DNA
<213> ORGANISM: Artificial Sequence
<220> FEATURE:
<223> OTHER INFORMATION: Synthetic

<400> SEQUENCE: 703
ctgttcttcc tgaagcctc 19

<210> SEQ ID NO 704
<211> LENGTH: 17
<212> TYPE: DNA
<213> ORGANISM: Artificial Sequence
<220> FEATURE:
<223> OTHER INFORMATION: Synthetic

<400> SEQUENCE: 704
ttgaggttgg tgccttc 17

<210> SEQ ID NO 705
<211> LENGTH: 19
<212> TYPE: DNA
<213> ORGANISM: Artificial Sequence
<220> FEATURE:
<223> OTHER INFORMATION: Synthetic

<400> SEQUENCE: 705
aagagtgtat tgagagcct 19

<210> SEQ ID NO 706
<211> LENGTH: 20
<212> TYPE: DNA
<213> ORGANISM: Artificial Sequence
<220> FEATURE:
<223> OTHER INFORMATION: Synthetic

<400> SEQUENCE: 706
tcagccttaa aaagacctcc 20

<210> SEQ ID NO 707
<211> LENGTH: 19
<212> TYPE: DNA
<213> ORGANISM: Artificial Sequence
<220> FEATURE:
<223> OTHER INFORMATION: Synthetic

<400> SEQUENCE: 707
ctcgtcactt cctctgtcc 19

<210> SEQ ID NO 708
<211> LENGTH: 16
<212> TYPE: DNA
<213> ORGANISM: Artificial Sequence
<220> FEATURE:
<223> OTHER INFORMATION: Synthetic

<400> SEQUENCE: 708
gggagaagtg cggcac 16

<210> SEQ ID NO 709
<211> LENGTH: 18
<212> TYPE: DNA
<213> ORGANISM: Artificial Sequence
<220> FEATURE:
<223> OTHER INFORMATION: Synthetic

<400> SEQUENCE: 709
gaccttatgt gtttttcc 18

<210> SEQ ID NO 710
<211> LENGTH: 22
<212> TYPE: DNA
<213> ORGANISM: Artificial Sequence
<220> FEATURE:
<223> OTHER INFORMATION: Synthetic

<400> SEQUENCE: 710
caatttcctc aaaagacttt cc 22

<210> SEQ ID NO 711
<211> LENGTH: 20
<212> TYPE: DNA
<213> ORGANISM: Artificial Sequence
<220> FEATURE:
<223> OTHER INFORMATION: Synthetic

<400> SEQUENCE: 711
aaggacttaa gaattgtcac 20

<210> SEQ ID NO 712
<211> LENGTH: 17
<212> TYPE: DNA
<213> ORGANISM: Artificial Sequence
<220> FEATURE:
<223> OTHER INFORMATION: Synthetic

<400> SEQUENCE: 712
cctcaatcct tcaccgc 17

<210> SEQ ID NO 713
<211> LENGTH: 19
<212> TYPE: DNA
<213> ORGANISM: Artificial Sequence
<220> FEATURE:
<223> OTHER INFORMATION: Synthetic

<400> SEQUENCE: 713
gaggtagtgt ttacagccc 19

<210> SEQ ID NO 714
<211> LENGTH: 22
<212> TYPE: DNA
<213> ORGANISM: Artificial Sequence
<220> FEATURE:
<223> OTHER INFORMATION: Synthetic

<400> SEQUENCE: 714
tcacatctcg agtgataatc tc 22

<210> SEQ ID NO 715
<211> LENGTH: 17

<212> TYPE: DNA
<213> ORGANISM: Artificial Sequence
<220> FEATURE:
<223> OTHER INFORMATION: Synthetic

<400> SEQUENCE: 715
tgatgggaga cgagttc 17

<210> SEQ ID NO 716
<211> LENGTH: 18
<212> TYPE: DNA
<213> ORGANISM: Artificial Sequence
<220> FEATURE:
<223> OTHER INFORMATION: Synthetic

<400> SEQUENCE: 716
tgcacacaca cacatacc 18

<210> SEQ ID NO 717
<211> LENGTH: 15
<212> TYPE: DNA
<213> ORGANISM: Artificial Sequence
<220> FEATURE:
<223> OTHER INFORMATION: Synthetic

<400> SEQUENCE: 717
aggtcccctc cgctc 15

<210> SEQ ID NO 718
<211> LENGTH: 16
<212> TYPE: DNA
<213> ORGANISM: Artificial Sequence
<220> FEATURE:
<223> OTHER INFORMATION: Synthetic

<400> SEQUENCE: 718
cacagtggtg ttggac 16

<210> SEQ ID NO 719
<211> LENGTH: 18
<212> TYPE: DNA
<213> ORGANISM: Artificial Sequence
<220> FEATURE:
<223> OTHER INFORMATION: Synthetic

<400> SEQUENCE: 719
atcctgaaga gcaagtcc 18

<210> SEQ ID NO 720
<211> LENGTH: 18
<212> TYPE: DNA
<213> ORGANISM: Artificial Sequence
<220> FEATURE:
<223> OTHER INFORMATION: Synthetic

<400> SEQUENCE: 720
attccggttt ggttctcc 18

<210> SEQ ID NO 721
<211> LENGTH: 17
<212> TYPE: DNA
<213> ORGANISM: Artificial Sequence
<220> FEATURE:
<223> OTHER INFORMATION: Synthetic

<400> SEQUENCE: 721
ctgaaaccca ggactcc 17

<210> SEQ ID NO 722
<211> LENGTH: 19
<212> TYPE: DNA
<213> ORGANISM: Artificial Sequence
<220> FEATURE:
<223> OTHER INFORMATION: Synthetic

<400> SEQUENCE: 722
ggaacaatca ccttttctc 19

<210> SEQ ID NO 723
<211> LENGTH: 122
<212> TYPE: DNA
<213> ORGANISM: Homo sapiens

<400> SEQUENCE: 723
aggctccctt agatgcctga cattctgttc ttcctgaagc ctcactccct tctctcctgg 60
ctgcagacac gtccccatca gaaggcacca acctcaacgc gcccaacagc ctgggtgtca 120
gc 122

<210> SEQ ID NO 724
<211> LENGTH: 122
<212> TYPE: DNA
<213> ORGANISM: Homo sapiens

<400> SEQUENCE: 724
taaaatcatt tatttattta tccatccatc aagagtgtat tgagagcctg acaacatacc 60
aggcatcaag ccctggaggt ctttttaagg ctgagccaat atagctatgg ataacattct 120
aa 122

<210> SEQ ID NO 725
<211> LENGTH: 91
<212> TYPE: DNA
<213> ORGANISM: Homo sapiens

<400> SEQUENCE: 725
ccctcgtcac ttcctctgtc ctgtggggtg ggggtgcagg cgctctctcc tttagctgtg 60
ccgcacttct ccctacaggc caggagaaac a 91

<210> SEQ ID NO 726
<211> LENGTH: 122
<212> TYPE: DNA
<213> ORGANISM: Homo sapiens

<400> SEQUENCE: 726
cttctgtgga ccttatgtgt ttttcctctt tgctggagtg ctcctggcct ttaccctgtt 60
ctacattttt taaagttcca gaaaccaaag gaaagtcttt tgaggaaatt gctgcagaat 120
tc 122

<210> SEQ ID NO 727
<211> LENGTH: 122
<212> TYPE: DNA
<213> ORGANISM: Homo sapiens

<400> SEQUENCE: 727
tggttaagga cttaagaatt gtcacttgtg tgtgtatatt gttgttgttg ttgcaacggt 60
gtctgtgtac gcacggttac agtggatcaa atttggggag ttaggaagtg gcgttggttt 120

-continued gt 122

<210> SEQ ID NO 728
<211> LENGTH: 91
<212> TYPE: DNA
<213> ORGANISM: Homo sapiens

<400> SEQUENCE: 728
cgaggtagtg tttacagccc tcatgaacag caaaggcgtg agcctcttcg agcatcatca 60
accctgagat tatcactcga gatgtgagta c 91

<210> SEQ ID NO 729
<211> LENGTH: 91
<212> TYPE: DNA
<213> ORGANISM: Homo sapiens

<400> SEQUENCE: 729
ggagacgagt tcaaggtgag tgggtggggc tgggctgcta ggggaatcca gatggcatgt 60
ggtatgtgtg tgtgtgcaca cgcatgggga g 91

<210> SEQ ID NO 730
<211> LENGTH: 122
<212> TYPE: DNA
<213> ORGANISM: Homo sapiens

<400> SEQUENCE: 730
cagccacagg tcccctccgc tcaggtgatg gacttcctgt ttgagaagtg gaagctctac 60
aggtgaccag tgtcaccaca acctgagcct gctgcccccct cccacgggtg agccccccac 120
cc 122

<210> SEQ ID NO 731
<211> LENGTH: 122
<212> TYPE: DNA
<213> ORGANISM: Homo sapiens

<400> SEQUENCE: 731
agagcaagtc ccccaaggag gagctgctga agatgtgggg ggaggagctg accagtgaag 60
acaagtgtct ttgaagtctt tgttctttac ctctcgggag aaccaaaccg gaatggtcac 120
aa 122

<210> SEQ ID NO 732
<211> LENGTH: 122
<212> TYPE: DNA
<213> ORGANISM: Homo sapiens

<400> SEQUENCE: 732
ggaactgaaa cccaggactc cgtctcttgc cagtgaaagt tatgttagga agcagtgagg 60
tggtctaaag cagtatgaaa ggcaaagaga aaaggtgatt gttccctctt gaatggccct 120
tg 122

<210> SEQ ID NO 733
<211> LENGTH: 19
<212> TYPE: DNA
<213> ORGANISM: Artificial Sequence
<220> FEATURE:
<223> OTHER INFORMATION: Synthetic

<400> SEQUENCE: 733

-continued ctgggctggg agcagcctc 19

<210> SEQ ID NO 734
<211> LENGTH: 23
<212> TYPE: DNA
<213> ORGANISM: Artificial Sequence
<220> FEATURE:
<223> OTHER INFORMATION: Synthetic

<400> SEQUENCE: 734
cactcgctgg cctgtttcat gtc 23

<210> SEQ ID NO 735
<211> LENGTH: 22
<212> TYPE: DNA
<213> ORGANISM: Artificial Sequence
<220> FEATURE:
<223> OTHER INFORMATION: Synthetic

<400> SEQUENCE: 735
ctggaatccg gtgtcgaagt gg 22

<210> SEQ ID NO 736
<211> LENGTH: 20
<212> TYPE: DNA
<213> ORGANISM: Artificial Sequence
<220> FEATURE:
<223> OTHER INFORMATION: Synthetic

<400> SEQUENCE: 736
ctcggcccct gcactgtttc 20

<210> SEQ ID NO 737
<211> LENGTH: 22
<212> TYPE: DNA
<213> ORGANISM: Artificial Sequence
<220> FEATURE:
<223> OTHER INFORMATION: Synthetic

<400> SEQUENCE: 737
gaggcaagaa ggagtgtcag gg 22

<210> SEQ ID NO 738
<211> LENGTH: 23
<212> TYPE: DNA
<213> ORGANISM: Artificial Sequence
<220> FEATURE:
<223> OTHER INFORMATION: Synthetic

<400> SEQUENCE: 738
agtcctgtgg tgaggtgacg agg 23

<210> SEQ ID NO 739
<211> LENGTH: 15
<212> TYPE: DNA
<213> ORGANISM: Artificial Sequence
<220> FEATURE:
<223> OTHER INFORMATION: Synthetic

<400> SEQUENCE: 739
ggtagtgagg caggt 15

<210> SEQ ID NO 740
<211> LENGTH: 16
<212> TYPE: DNA
<213> ORGANISM: Artificial Sequence
<220> FEATURE:
<223> OTHER INFORMATION: Synthetic

<400> SEQUENCE: 740
gcttctggta ggggag 16

<210> SEQ ID NO 741
<211> LENGTH: 19
<212> TYPE: DNA
<213> ORGANISM: Artificial Sequence
<220> FEATURE:
<223> OTHER INFORMATION: Synthetic

<400> SEQUENCE: 741
aaataggact aggacctgt 19

<210> SEQ ID NO 742
<211> LENGTH: 15
<212> TYPE: DNA
<213> ORGANISM: Artificial Sequence
<220> FEATURE:
<223> OTHER INFORMATION: Synthetic

<400> SEQUENCE: 742
gggtcccacg gaaat 15

<210> SEQ ID NO 743
<211> LENGTH: 12
<212> TYPE: DNA
<213> ORGANISM: Artificial Sequence
<220> FEATURE:
<223> OTHER INFORMATION: Synthetic

<400> SEQUENCE: 743
catggccacg cg 12

<210> SEQ ID NO 744
<211> LENGTH: 13
<212> TYPE: DNA
<213> ORGANISM: Artificial Sequence
<220> FEATURE:
<223> OTHER INFORMATION: Synthetic

<400> SEQUENCE: 744
ccggcacctc tcg 13

<210> SEQ ID NO 745
<211> LENGTH: 14
<212> TYPE: DNA
<213> ORGANISM: Artificial Sequence
<220> FEATURE:
<223> OTHER INFORMATION: Synthetic

<400> SEQUENCE: 745
ccgtcctcct gcat 14

<210> SEQ ID NO 746
<211> LENGTH: 17
<212> TYPE: DNA
<213> ORGANISM: Artificial Sequence
<220> FEATURE:
<223> OTHER INFORMATION: Synthetic

<400> SEQUENCE: 746
cactctcacc ttctcca 17

<210> SEQ ID NO 747
<211> LENGTH: 17
<212> TYPE: DNA
<213> ORGANISM: Artificial Sequence
<220> FEATURE:
<223> OTHER INFORMATION: Synthetic

<400> SEQUENCE: 747
gttctgtccc gagtatg 17

<210> SEQ ID NO 748
<211> LENGTH: 16
<212> TYPE: DNA
<213> ORGANISM: Artificial Sequence
<220> FEATURE:
<223> OTHER INFORMATION: Synthetic

<400> SEQUENCE: 748
tgcactgttt cccaga 16

<210> SEQ ID NO 749
<211> LENGTH: 17
<212> TYPE: DNA
<213> ORGANISM: Artificial Sequence
<220> FEATURE:
<223> OTHER INFORMATION: Synthetic

<400> SEQUENCE: 749
ctgacctcct ccaacat 17

<210> SEQ ID NO 750
<211> LENGTH: 15
<212> TYPE: DNA
<213> ORGANISM: Artificial Sequence
<220> FEATURE:
<223> OTHER INFORMATION: Synthetic

<400> SEQUENCE: 750
gggctatcac caggt 15

<210> SEQ ID NO 751
<211> LENGTH: 17
<212> TYPE: DNA
<213> ORGANISM: Artificial Sequence
<220> FEATURE:
<223> OTHER INFORMATION: Synthetic

<400> SEQUENCE: 751
ctgacctcct ccaacat 17

<210> SEQ ID NO 752
<211> LENGTH: 15
<212> TYPE: DNA
<213> ORGANISM: Artificial Sequence
<220> FEATURE:
<223> OTHER INFORMATION: Synthetic

<400> SEQUENCE: 752
gggctatcac caggt 15

<210> SEQ ID NO 753
<211> LENGTH: 10
<212> TYPE: DNA
<213> ORGANISM: Artificial Sequence
<220> FEATURE:
<223> OTHER INFORMATION: Synthetic

<400> SEQUENCE: 753
cgcgccgagg 10

<210> SEQ ID NO 754
<211> LENGTH: 14
<212> TYPE: DNA
<213> ORGANISM: Artificial Sequence
<220> FEATURE:
<223> OTHER INFORMATION: Synthetic

<400> SEQUENCE: 754
atgacgtggc agac 14

<210> SEQ ID NO 755
<211> LENGTH: 12
<212> TYPE: DNA
<213> ORGANISM: Artificial Sequence
<220> FEATURE:
<223> OTHER INFORMATION: Synthetic

<400> SEQUENCE: 755
acggacgcgg ag 12

<210> SEQ ID NO 756
<211> LENGTH: 11
<212> TYPE: DNA
<213> ORGANISM: Artificial Sequence
<220> FEATURE:
<223> OTHER INFORMATION: Synthetic

<400> SEQUENCE: 756
tccgcgcgtc c 11

<210> SEQ ID NO 757
<211> LENGTH: 22
<212> TYPE: DNA
<213> ORGANISM: Artificial Sequence
<220> FEATURE:
<223> OTHER INFORMATION: Synthetic

<400> SEQUENCE: 757
gaagcggcgc cggttaccac ca 22

<210> SEQ ID NO 758
<211> LENGTH: 27
<212> TYPE: DNA
<213> ORGANISM: Artificial Sequence
<220> FEATURE:
<223> OTHER INFORMATION: Synthetic

<400> SEQUENCE: 758
cgcgccgagg tggttgagca attccaa 27

<210> SEQ ID NO 759
<211> LENGTH: 30
<212> TYPE: DNA
<213> ORGANISM: Artificial Sequence
<220> FEATURE:
<223> OTHER INFORMATION: Synthetic

<400> SEQUENCE: 759
atgacgtggc agaccggttg agcaattcca 30